US012650572B2

(12) United States Patent
Chen et al.

(10) Patent No.: US 12,650,572 B2
(45) Date of Patent: Jun. 9, 2026

(54) OPTICAL SYSTEM

(71) Applicant: Actutek Corporation, Taoyuan City (TW)

(72) Inventors: Yi-Ho Chen, Taoyuan City (TW); Chen-Hsin Huang, Taoyuan City (TW); Chao-Chang Hu, Taoyuan City (TW); Chen-Chi Kuo, Taoyuan City (TW); Ying-Jen Wang, Taoyuan City (TW); Ya-Hsiu Wu, Taoyuan City (TW); Sin-Jhong Song, Taoyuan City (TW); Che-Hsiang Chiu, Taoyuan City (TW); Kuen-Wang Tsai, Taoyuan City (TW); Mao-Kuo Hsu, Taoyuan City (TW); Tun-Ping Hsueh, Taoyuan City (TW); I-Hung Chen, Taoyuan City (TW); Chun-Chia Liao, Taoyuan City (TW); Wei-Zhong Luo, Taoyuan City (TW); Wen-Chang Lin, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 84 days.

(21) Appl. No.: 18/178,216

(22) Filed: Mar. 3, 2023

(65) Prior Publication Data

US 2023/0204903 A1 Jun. 29, 2023

Related U.S. Application Data

(63) Continuation of application No. 17/078,535, filed on Oct. 23, 2020, now Pat. No. 11,630,282.
(Continued)

(51) Int. Cl.
G02B 7/09 (2021.01)
G02B 27/64 (2006.01)
G02B 5/00 (2006.01)

(52) U.S. Cl.
CPC ............. G02B 7/09 (2013.01); G02B 27/646 (2013.01); *G02B 5/005* (2013.01)

(58) Field of Classification Search
None
See application file for complete search history.

(56) References Cited

U.S. PATENT DOCUMENTS

2008/0024590 A1 1/2008 Nakajima
2008/0024886 A1* 1/2008 Miyazawa ............. G02B 7/023
359/819
(Continued)

FOREIGN PATENT DOCUMENTS

CN 1645235 A 7/2005
CN 102778802 A 11/2012
(Continued)

OTHER PUBLICATIONS

Chinese Office Action issued on Apr. 15, 2024 for the corresponding Application No. 202011149083.2 in China; pp. 1-9.
(Continued)

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical system is provided, including a first movable part for connecting an optical element; a first base, wherein the first movable part is movable relative to the first base; and a first driving assembly for driving the movable part to move relative to the first base. The optical system further includes a light quantity control mechanism for controlling the quantity of light entering the optical element. The light quantity control mechanism further includes a base seat and a light quantity control assembly at least partially movable relative to the base seat. The optical system further includes a second driving assembly for controlling the light quantity control assembly.

18 Claims, 178 Drawing Sheets

Related U.S. Application Data

(60) Provisional application No. 63/041,459, filed on Jun. 19, 2020, provisional application No. 63/000,604, filed on Mar. 27, 2020, provisional application No. 62/972,259, filed on Feb. 10, 2020, provisional application No. 62/964,377, filed on Jan. 22, 2020, provisional application No. 62/953,773, filed on Dec. 26, 2019, provisional application No. 62/950,520, filed on Dec. 19, 2019, provisional application No. 62/944,496, filed on Dec. 6, 2019, provisional application No. 62/935,926, filed on Nov. 15, 2019, provisional application No. 62/925,958, filed on Oct. 25, 2019.

(56) References Cited

U.S. PATENT DOCUMENTS

| | | |
|---|---|---|
| 2008/0247063 A1 | 10/2008 | Olsuki et al. |
| 2009/0295986 A1 | 12/2009 | Topliss et al. |
| 2011/0091193 A1 | 4/2011 | Lim et al. |
| 2011/0235195 A1* | 9/2011 | Ke .......................... G03B 3/10 |
| | | 359/824 |
| 2012/0050860 A1* | 3/2012 | Sakatani ................ H04N 23/55 |
| | | 359/507 |
| 2013/0002933 A1 | 1/2013 | Topliss et al. |
| 2017/0285362 A1 | 10/2017 | Hu et al. |
| 2018/0059387 A1* | 3/2018 | Ito .......................... G02B 7/023 |
| 2019/0227405 A1* | 7/2019 | Song .................... G02B 6/0066 |

FOREIGN PATENT DOCUMENTS

| | | | | |
|---|---|---|---|---|
| CN | 209117955 U | | 7/2019 | |
| CN | 110174740 A | | 8/2019 | |
| CN | 209525548 U | | 10/2019 | |
| EP | 2899579 A2 | | 7/2015 | |
| EP | 2921892 A2 | | 9/2015 | |
| JP | 2009229781 A | | 10/2009 | |
| JP | 2017138599 A | * | 8/2017 | .......... G02B 27/646 |

OTHER PUBLICATIONS

Chinese Office Action dated Aug. 31, 2023 for the corresponding Application No. 202011149083.2; pp. 1-5.

* cited by examiner 1-100

1-111

1-LS 1-112

1-DS1

1-DS2

1-DS3

1-50

3-523

3-523

3-52

3-52

3-621

3-522

3-521

3-522

3-521

3-525

3-525

3-623

3-100B 3-52G2

3-F 3-52C2

3-O 3-52F2

3-52B2

3-52E2

3-52A2

3-52H2

3-52D2

Z

X

Y 3-100D 3-100E 4-100B

4-O 4-52G2

4-F 4-52C2

4-52H2

4-52D2

4-52F2

4-52B2

4-52E2

4-52A2

Z

X

Y 4-100C 4-52C3

4-52G3

4-52H3
4-52D3

4-52F3

4-52B3

4-52E3
4-52A3

4-O

4-F

Z
X
Y 4-100F

4-O 4-52C6

4-52D6

4-F 4-52B6

4-52A6

Z

Y

X 4-100G 5-100B

5-O 5-52G2

5-F 5-52C2

5-52F2

5-52B2

5-52E2

5-52A2

5-52H2

5-52D2

Z

X

Y 5-100F

5-B

5-B 5-10

5-O 5-101

5-101

5-C2 { 5-80D
       5-80E 5-80D { 5-80D1
        5-80D2

5-80E { 5-80E1
        5-80E2

5-20

5-80D2

5-80E2

5-10

5-80D1

5-80E1

5-103

6-30   6-10

6-20

Y

Z └──→X

6-A-6-A

6-B-6-B 6-10

6-10

6-810

6-800

6-820

6-100    6-500

6-821

Z
X → Y 6-410    6-440    6-103

6-120

6-102

6-430

6-432

6-433

6-AX1

6-430
6-431

6-500

6-102

6-442    6-440    6-411    6-413 6-412    6-101
6-443    6-441    6-410

6-410

6-412

6-413

6-T

6-T 6-411

7-300 { 7-310
7-320
7-330
7-340
7-350

7-610
7-240
7-131
7-130
7-322
7-322
7-200
7-610
7-311
7-310
7-311
7-310
7-312
7-312
7-350
7-330
7-420
7-410
7-430
7-440
7-402
7-330
7-401
7-323
7-340
7-324
7-321
7-324
7-323
7-321
7-340
7-320
7-320

8-10

8-100 { 8-110, 8-120, 8-130 }

8-200 { 8-210, 8-220 }

8-310 (8-300) { 8-311, 8-312, 8-313, 8-314 }

8-400 { 8-410, 8-415, 8-420, 8-425 }

8-500 { 8-510, 8-520 }

8-600 { 8-610, 8-620, 8-630 }

8-110

8-220

8-210

8-510
8-520
8-620
8-630

8-312
8-313
8-314

8-311

8-615
8-616
8-610

8-420

8-425

8-410

8-415

8-130

8-120

8-M
8-D2
8-D1

9-10

9-10

10-1

10-110A
10-114aA
10-320A
10-410A
10-411A
10-310A
10-200A
10-O 10-100B 10-930B
10-520B 10-300B 10-201B 10-910B
10-400B 10-920B 10-510B 10-122B 10-200B

10-O 11-1

11-100

11-100

11-111

11-112

11-112

11-O 11-112

11-112

11-40

11-12

11-112

11-100

11-10 { 11-11, 11-12, 11-13

11-30 { 11-31, 11-32

11-11

11-13     11-40

11-20

11-21

11-31

11-32

11-12

11-13

11-131

11-1322

11-1315

11-1322

OPTICAL SYSTEM

CROSS-REFERENCE TO RELATED APPLICATIONS

The present application is a continuation application of the U.S. patent application Ser. No. 17/078,535, filed on Oct. 23, 2020, which claims priority to U.S. Provisional Patent Application No. 62/925,958, filed 25 Oct. 2019, Applications No. 62/935,926, filed on 15 Nov. 2019, Applications No. 62/944,496, filed on 6 Dec. 2019, Applications No. 62/950,520, filed on 19 Dec. 2019, Applications No. 62/953,773, filed on 26 Dec. 2019, Applications No. 62/964,377, filed on 22 Jan. 2020, Applications No. 62/972,259, filed on 10 Feb. 2020, Applications No. 63/000,604, filed on 27 Mar. 2020, and Applications No. 63/041,459, filed on 19 Jun. 2020, which are incorporated by reference herein in their entirety.

BACKGROUND OF THE DISCLOSURE

Field of the Disclosure

The present invention relates to a driving mechanism, and more particularly to an optical element driving mechanism.

Description of the Related Art

The design of today's electronic devices is continually moving toward miniaturization, so that various elements or structures of optical modules used in such applications as imaging must be continuously reduced in size in order to achieve miniaturization. Therefore, how to design a miniature driving mechanism has become an important issue.

BRIEF SUMMARY OF THE DISCLOSURE

An embodiment of the invention provides an optical element driving mechanism includes a fixed portion, a movable portion, a driving assembly, and a circuit assembly. The movable portion is connected to the optical element and is movable relative to the fixed portion. The driving assembly drives the movable portion to move relative to the fixed portion. The circuit assembly is connected to the driving assembly. The driving assembly is electrically connected to external circuit via the circuit assembly.

According to some embodiments of the present disclosure, the optical element driving mechanism further includes a limiting element, a position sensing assembly, a guiding component, and a magnetically permeable element. The limiting element limits the driving assembly to move within a range of movement relative to the fixed portion, and is disposed on the movable portion or the fixed portion. The position sensing assembly senses the movement of the movable portion relative to the fixed portion. The guiding assembly is disposed between the movable portion and the fixed portion. The magnetically permeable element is disposed on the fixed portion. The fixed portion has a polygonal structure and a first side, and comprises an outer frame and a base. The outer frame has a top surface and a first side wall. The first side wall extends from an edge of the top surface and is parallel to the first side. The base is arranged along a main axis with the outer frame and has an accommodating portion and a first side wall. The accommodating portion accommodates a part of the limiting element. The first side wall of the base is closer to the main axis than the first side wall of the outer frame. The driving assembly comprises a first driving element. The first driving element drives the movable portion to move in a first dimension relative to the fixed portion, and has a shape memory alloy, and has a long strip structure, and extends along a first direction. When viewed along a direction that is parallel to the main axis, the first driving element is disposed on the first side.

According to some embodiments of the present disclosure, the limiting element is disposed on the movable portion, and the movable portion has a first side wall parallel to the first side wall of the outer frame. The first side wall of the movable portion is closer to the main axis than the first side wall of the outer frame. The limiting element is closer to the first side wall of the movable portion than the first side wall of the outer frame. When viewed along a direction that is parallel to the main axis, the limiting element overlaps with a central portion of the first side of the fixed portion. The limiting element is made of metal material. The first driving element has an insulating material, and the insulating material is disposed between the shape memory alloy of the first driving element and the limiting element. The insulating material of the first driving element is fixedly disposed on the shape memory alloy of the first driving element.

According to some embodiments of the present disclosure, the driving assembly further includes a second driving element, a third driving element, and a fourth driving element. The second driving element has a shape memory alloy. When viewed along a direction that is parallel to the main axis, the second driving element is disposed on the first side. The third driving element has a shape memory alloy. When viewed along the direction that is parallel to the main axis, the third driving element is disposed on the first side. The fourth driving element having a shape memory alloy. When viewed along the direction that is parallel to the main axis, the fourth driving element is disposed on the first side. The first driving element, the second driving element, the third driving element, and the fourth driving element are not in contact with each other. When viewed along the direction that is parallel to the main axis: there is a gap greater than zero between the first driving element and the second driving element; there is a gap greater than zero between the first driving element and the fourth driving element; there is a gap greater than zero between the second driving element and the third driving element; there is a gap greater than zero between the third driving element and the fourth driving element. When viewed along a direction that is perpendicular to the first side and the main axis: there is a gap greater than zero between the first driving element and the third driving element; there is a gap greater than zero between the second driving element and the fourth driving element; wherein the second driving element has an strip structure and extends along a second direction. The third driving element has a long strip structure and extends along a third direction. The fourth driving element has an strip structure and extends along a fourth direction. When viewed along a direction that is perpendicular to the first side and the main axis: the first direction is different from the second direction; the first direction and the second direction are neither perpendicular nor parallel; the first direction is parallel to the third direction; the first direction is different from the fourth direction; the first direction and the fourth direction are neither perpendicular nor parallel; the second direction is different from the third direction; the second direction and the third direction are neither perpendicular nor parallel; the second direction is parallel to the fourth direction. The shortest distance between the first driving element and the first side wall of the outer frame is different from the shortest distance between the second driving element and the first side wall of the outer frame. The shortest distance between the first driving element and the first side wall of the outer frame is smaller than the shortest distance between the second driving element and the first side wall of the outer frame. The shortest distance between the third driving element and the first side wall of the outer frame is different from the shortest distance between the fourth driving element and the first side wall of the outer frame. The shortest distance between the third driving element and the first side wall of the outer frame is smaller than the shortest distance between the fourth driving element and the first side wall of the outer frame.

According to some embodiments of the present disclosure, the limiting element comprises a first limiting unit and a second limiting unit. The first limiting unit has an outer curved portion and an inner curved portion, the outer curved portion is curved toward the first side wall of the outer frame, and the inner curved portion is curved toward the first side wall of the movable portion. The second limiting unit has an outer curved portion and an inner curved portion, the outer curved portion is curved toward the first side wall of the outer frame, and the inner curved portion is curved toward the first side wall of the movable portion. When viewed along a direction that is parallel to the main axis, the first limiting unit at least partially overlaps the second limiting unit. When viewed along a direction that is perpendicular to the main axis and the first side, the first limiting unit does not overlap the second limiting unit. The circuit assembly is disposed on the first side of the fixed portion and comprises a first circuit element, a second circuit element, and a third circuit element. The first circuit element has an outer curved portion and an inner curved portion, the outer curved portion is curved toward a direction that is close to the first side wall of the outer frame, and the inner curved portion is curved toward a direction that is away from the first side wall of the outer frame. The second circuit element has an inner curved portion, the inner curved portion is curved toward a direction that is away from the first side wall of the outer frame. The third circuit element, having an outer curved portion, the outer curved portion is curved toward a direction that is close to the first side wall of the outer frame. When viewed along a direction that is parallel to the main axis: the first circuit element and the second circuit element do not overlap; the first circuit element and the third circuit element do not overlap; the second circuit element and the third circuit element at least partially overlap. When viewed along a direction that is parallel to the first side, the first circuit element, the second circuit element and the third circuit element at least partially overlap. The first driving element is connected to the outer curved portion of the second circuit element and the outer curved portion of the first limiting unit. The second driving element is connected to the inner curved portion of the third circuit element and the inner curved portion of the second limiting unit. The third driving element is connected to the outer curved portion of the first circuit element and the outer curved portion of the second limiting unit. The fourth driving element is connected to the inner curved portion of the first circuit element and the inner curved portion of the first limiting unit.

According to some embodiments of the present disclosure, the driving assembly further comprises a second driving element with a shape memory alloy, wherein when viewed along a direction that is parallel to the main axis, the second driving element is disposed on the first side. The limiting element comprises a first limiting unit and a second limiting unit, each having an opening, wherein when viewed along a direction that is parallel to the main axis, the first limiting unit at least partially overlaps the second limiting unit, and the first limiting unit is closer to the first side wall of the outer frame than the second limiting unit. When viewed along a direction that is perpendicular to the main axis, the first limiting unit does not overlap the second limiting unit. The circuit assembly is disposed on the first side of the fixed portion, and comprises a first circuit element, a second circuit element, a third circuit element, and a fourth circuit element, wherein the first circuit element and the fourth circuit element are symmetrically disposed on the fixed portion with the limiting element as the center, and the second circuit element and the third circuit element are symmetrically disposed on the fixed portion with the limiting element as the center. When viewed along a direction that is parallel to the main axis, the first circuit element and the second circuit element at least partially overlap, and the third circuit element and the fourth circuit element at least partially overlap. When viewed along a direction that is parallel to the first side: the first circuit element, the second circuit element, the third circuit element, and the fourth circuit element at least partially overlap; the distance between the first circuit element and the first side wall of the outer frame is greater than the distance between the second circuit element and the first side wall of the outer frame; the distance between the fourth circuit element and the first side wall of the outer frame is greater than the distance between the third circuit element and the first side wall of the outer frame; the distance between the first circuit element and the first side wall of the outer frame is the same as the distance between the fourth circuit element and the first side wall of the outer frame; the distance between the second circuit element and the first side wall of the outer frame is the same as the distance between the third circuit element and the first side wall of the outer frame. The first driving element passes through the opening of the first limiting unit, one end is connected to the third circuit element, and the other end is connected to the second circuit element. The second driving element passes through the opening of the second limiting unit, one end is connected to the first circuit element, and the other end is connected to the fourth circuit element.

According to some embodiments of the present disclosure, the driving assembly further comprises a metal assembly. The metal assembly has a metal material and corresponding to the first driving element, and comprises a movable-portion-fixed-end, a first fixed-portion-fixed-end, a second fixed-portion-fixed-end, a first elastic portion, a second elastic portion, and an external connection portion. The movable-portion-fixed-end is fixedly connected to the movable portion. The first fixed-portion-fixed-end is fixedly connected to the fixed portion. The second fixed-portion-fixed-end is fixedly connected to the fixed portion. The first elastic portion has an elastic material. The movable-portion-fixed-end is movably connected to the first fixed-portion-fixed-end via the first elastic portion. The second elastic portion has an elastic material. The movable-portion-fixed-end is movably connected to the second fixed-portion-fixed-end via the first elastic portion. The external connection portion is fixedly connected to the first fixed-portion-fixed-end, and the external connection portion is electrically connected to the external circuit. The limiting element is disposed on the movable-portion-fixed-end, and the first driving element is fixed to the limiting element and connected to the circuit assembly. The first driving element is electrically connected to the external connection portion via the limiting element. When viewed along a direction that is parallel to the main axis, the metal assembly is disposed on the first side. The metal assembly has a plate-shaped structure. The elastic coefficient of the metal assembly in a direction that is parallel to the main axis is smaller than the elastic coefficient of the metal assembly in a direction that is parallel to the first side. The first fixed-portion-fixed-end is disposed on the first side wall of the fixed portion. The movable-portion-fixed-end is disposed on the first side wall of the movable portion. The second fixed-portion-fixed-end is disposed on the first side wall of the fixed portion. The first side wall of the fixed portion and the first side wall of the movable portion are parallel to each other. There is a distance greater than zero between the first side wall of the fixed portion and the first side wall of the movable portion. The first side wall of the fixed portion and the first side wall of the movable portion are not coplanar. When viewed along a direction that is parallel to the main axis, the first elastic portion and the second elastic portion at least partially overlap. When viewed along a direction that is parallel to the first side: a boundary between the first elastic portion and the first fixed-portion-fixed-end and a boundary between the second elastic portion and the second fixed-portion-fixed-end do not overlap; a boundary between the first elastic portion and the movable-portion-fixed-end and a boundary between the second elastic portion and the movable-portion-fixed-end do not overlap. When viewed along a direction that is perpendicular to the main axis and the first side: the fixed portion has a rectangular structure; a boundary between the first elastic portion and the first fixed-portion-fixed-end and a boundary between the second elastic portion and the second fixed-portion-fixed-end are arranged at different corners of the fixed portion; the boundary between the first elastic portion and the first fixed-portion-fixed-end and the boundary between the second elastic portion and the second fixed-portion-fixed-end are arranged at opposite corners of the fixed portion.

According to some embodiments of the present disclosure, the circuit assembly is disposed on the first side, and comprises a first circuit element and a second circuit element, the first circuit element and the second circuit are symmetrically arranged on the first side wall of the base, and each has an electrical connection portion to electrically connect the first driving element. When viewed along the direction that is parallel to the first side, the electrical connection portion of the first circuit element and the electrical connection portion of the second circuit element do not overlap. When viewed along the direction that is perpendicular to the main axis and the first side, the electrical connection portion of the first circuit element, the electrical connection portion of the second circuit element, the boundary between the first elastic portion and the first fixed-portion-fixed-end, and the boundary between the second elastic portion and the second fixed-portion-fixed-end are respectively arranged at different corners of the fixed portion.

According to some embodiments of the present disclosure, the position sensing assembly is disposed on the first side, and comprises a first reference element, a second reference element, and a position sensing element. The first reference element comprises a first magnet. The second reference element comprises a second magnet. The position sensing element corresponds to the first reference element to sense the movement of the movable portion relative to the fixed portion. The magnetically permeable element has a magnetically permeable material and corresponds to the first reference element. The second reference element does not correspond to the position sensing element. There is a distance greater than zero between the first reference element and the second reference element. The magnetically permeable element corresponds to the second reference element. When viewed along a direction that is parallel to the main axis: the position sensing element is disposed between the first reference element and the magnetically permeable element; the circuit assembly is at least partially disposed between the position sensing element and the magnetically permeable element; the magnetically permeable element is disposed on the first side; the first side wall of the outer frame and the magnetically permeable element at least partially overlap. The outer frame is made of non-magnetically-permeable material. The outer frame is made of metal material. The magnetic permeability of the outer frame is equal to the magnetic permeability of the magnetically permeable element. The first reference element and the second reference element are arranged along a direction that is parallel to the first side. When viewed along the direction that is perpendicular to the main axis and the first side, the first reference element and the second reference element are symmetrically arranged with the main axis as the center. The magnetically permeable element and the first reference element are configured to generate a force on the movable portion, so that the movable portion is moved close to the first side of the fixed portion. The magnetically permeable element and the second reference element are configured to generate another force on the movable portion. The direction of the force is not parallel to the main axis. The direction of the force is perpendicular to the main axis. When viewed along the direction that is parallel to the first side, the limiting element and the first reference element or the position sensing element at least partially overlap.

According to some embodiments of the present disclosure, the outer frame further has an inner top surface and two restricting structures, the fixed portion and the movable portion have two guiding structures respectively, and the restricting structures extend from the inner top surface toward the base, and the guiding structures extend along a direction that is parallel to the main axis. The guiding assembly is disposed on the first side of the fixed portion, and comprises a first intermediate element and a second intermediate element. The first intermediate element is disposed between the inner top surface and the base, and the first intermediate element is disposed between the guiding structure of the fixed portion and the guiding structure of the movable portion. The first intermediate element and the second intermediate element are movable relative to the fixed portion and the movable portion. The first intermediate element is movable relative to the guiding structure of the fixed portion and the guiding structure of the movable portion. When viewed along the direction that is perpendicular to the main axis and the first side, the first intermediate element and the second intermediate element are symmetrically arranged with the main axis as the center.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 84 is a cross-sectional view of the optical element driving mechanism taken along the line 10-A-10-A' in FIG. 82.

FIG. 85 is a cross-sectional view of the optical element driving mechanism taken along the line 10-B-10-B' in FIG. 82.

FIG. 86 is a perspective view of an optical element driving mechanism according to another embodiment of the present disclosure.

FIG. 87 is a schematic diagram of a partial structure of the optical element driving mechanism according to another embodiment of the present disclosure.

FIG. 88 is a cross-sectional view of the optical element driving mechanism taken along the line 10-A-10-A' in FIG. 86.

FIG. 89 is a cross-sectional view of the optical element driving mechanism taken along the line 10-B-10-B' in FIG. 86.

FIG. 90 shows a schematic view of an electrical device with an optical element driving mechanism according to an embodiment of the present disclosure.

FIG. 91 shows a schematic view of the optical element driving mechanism and an optical element according to an embodiment of the present disclosure.

FIG. 92 shows a perspective view of the optical element driving mechanism according to an embodiment of the present disclosure, wherein an outer frame is shown as a dashed line.

FIG. 93 shows an exploded view of the optical element driving mechanism according to an embodiment of the present disclosure.

FIG. 94 shows a partial schematic view of the optical element driving mechanism according to an embodiment of the present disclosure.

FIG. 95 shows a partial schematic view of the optical element driving mechanism according to an embodiment of the present disclosure.

Figure 96:
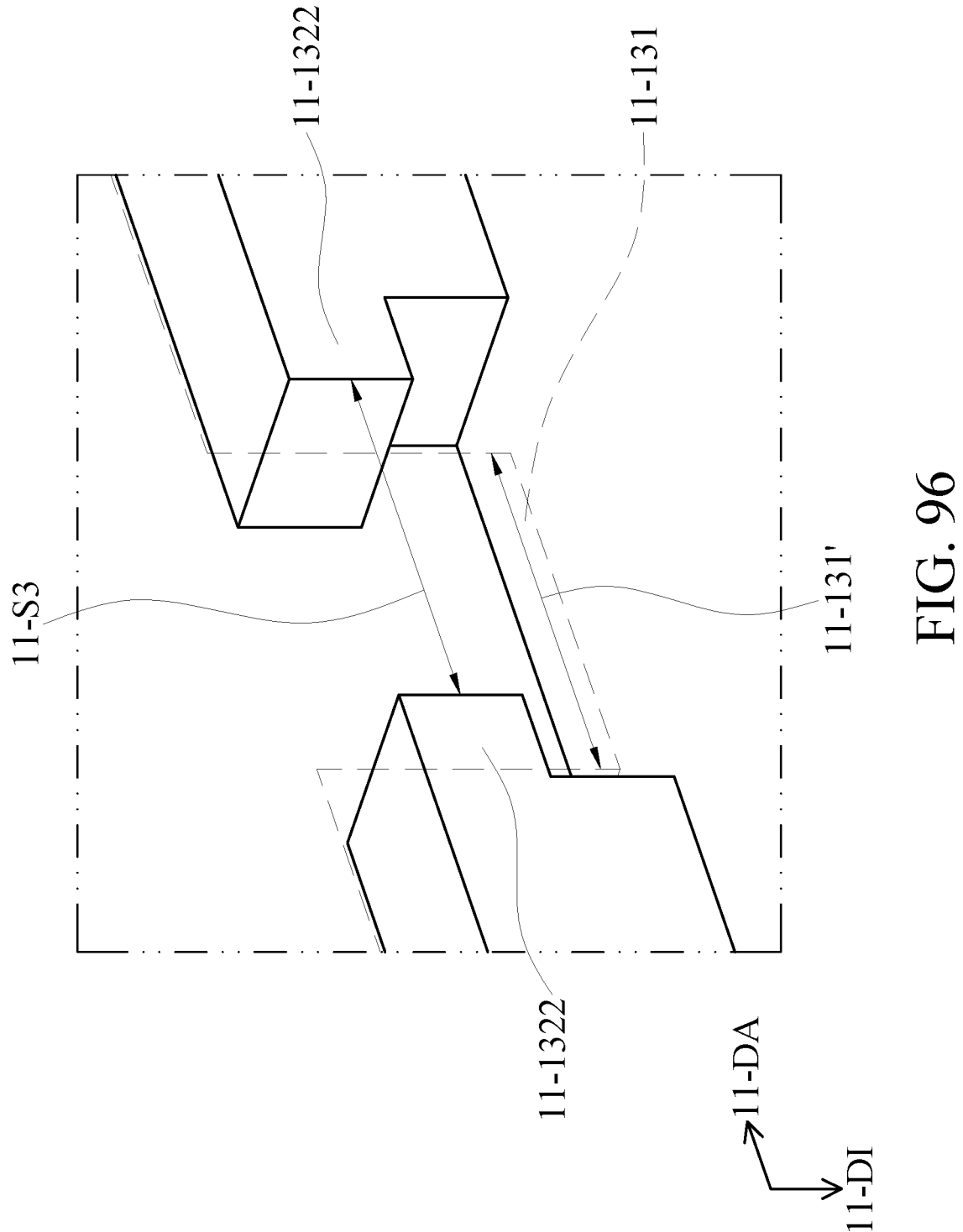

FIG. 96 shows a partial schematic view of the optical element driving mechanism according to an embodiment of the present disclosure.

Figure 97:
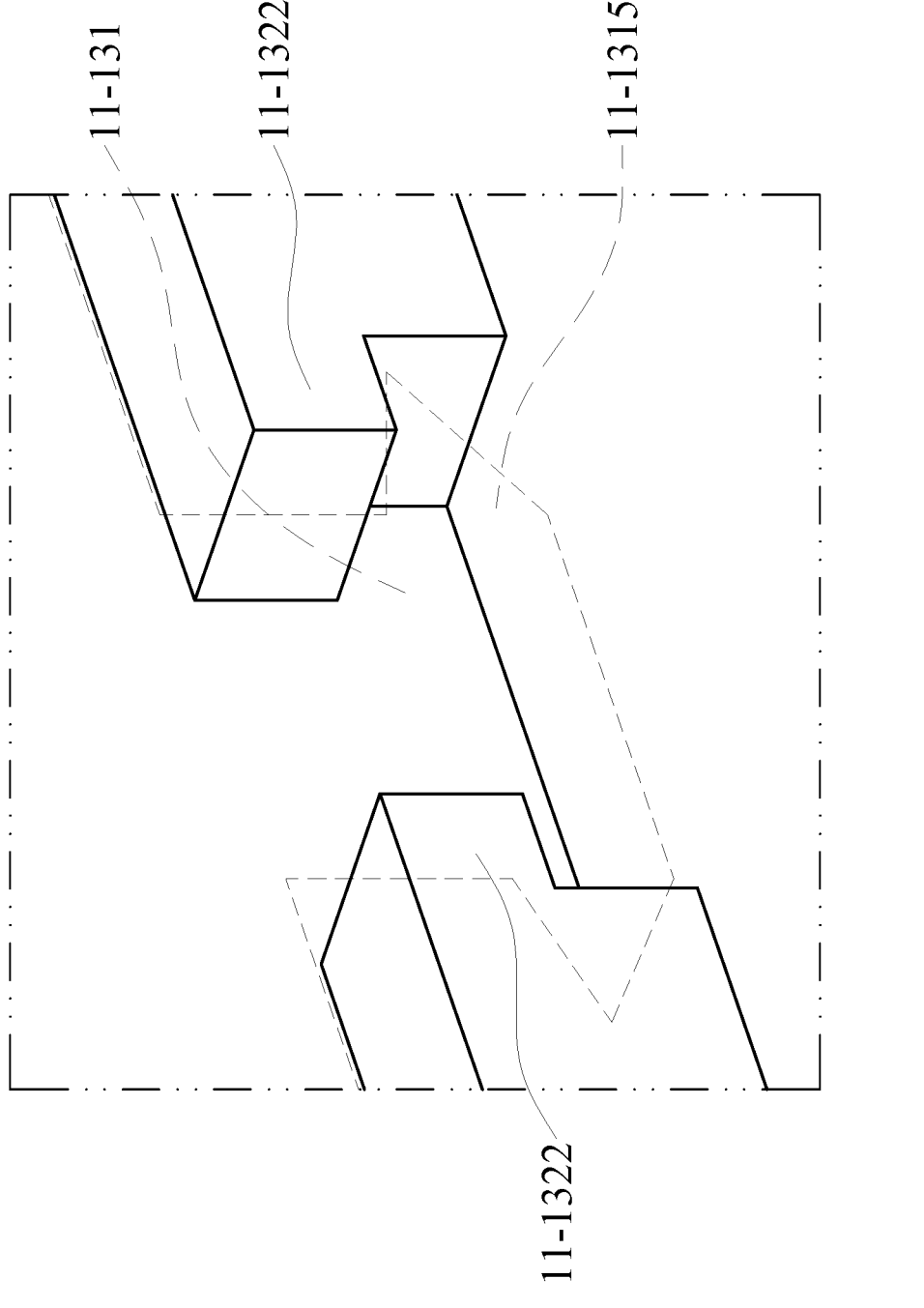

FIG. 97 shows a partial schematic view of the optical element driving mechanism according to an embodiment of the present disclosure.

Figure 98:
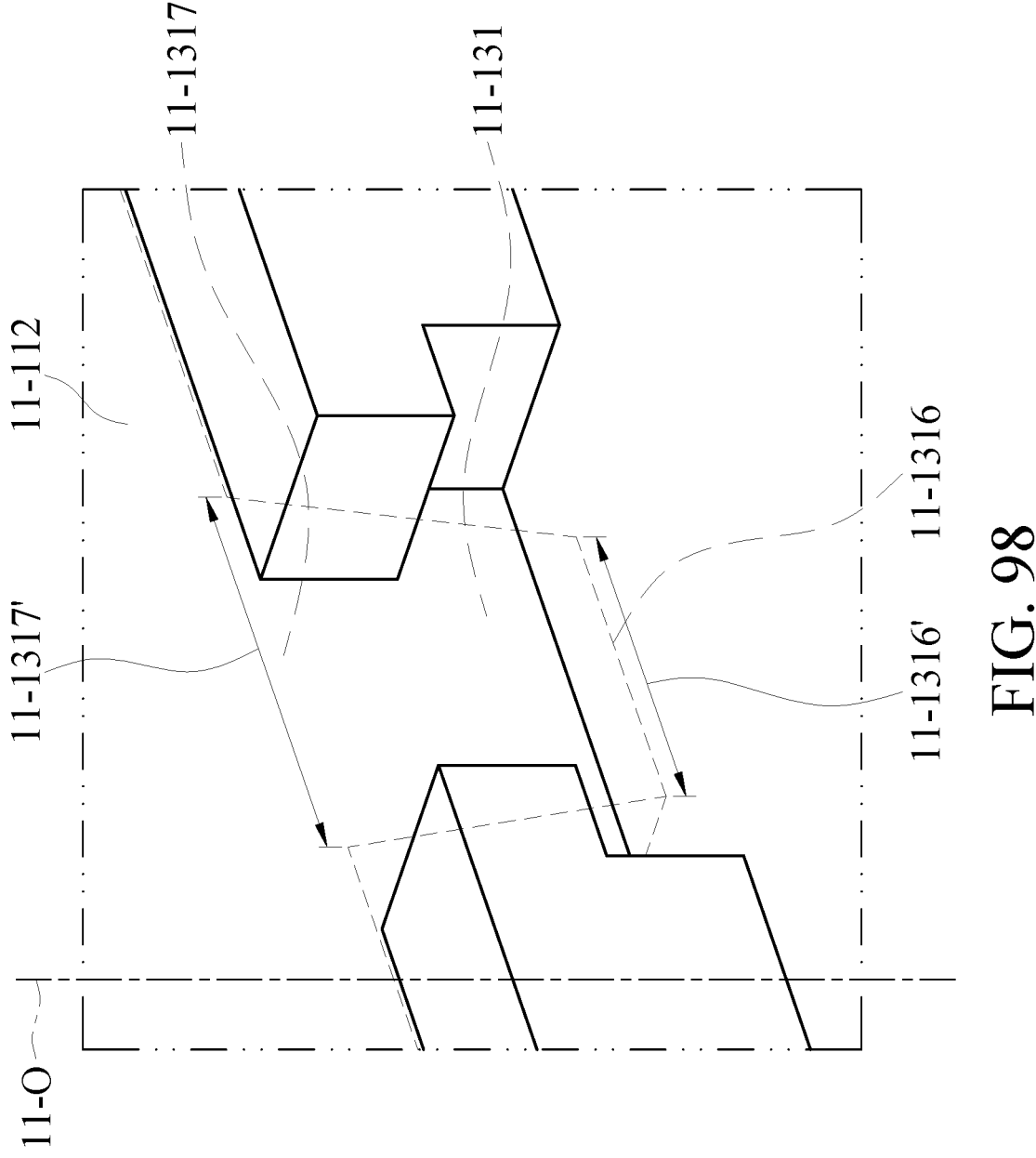

FIG. 98 shows a partial schematic view of the optical element driving mechanism according to an embodiment of the present disclosure.

Figure 99:
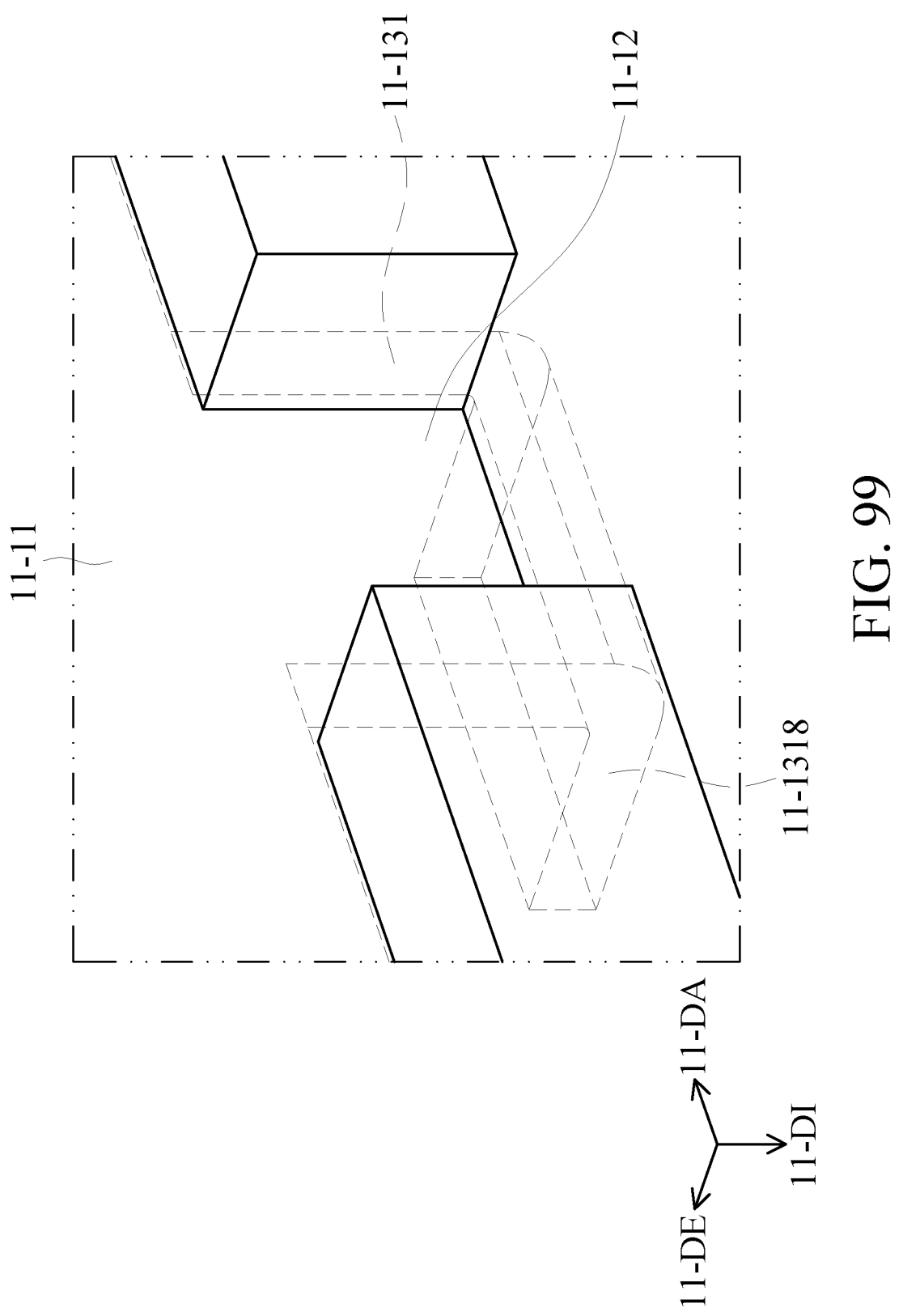

FIG. 99 shows a partial schematic view of the optical element driving mechanism according to an embodiment of the present disclosure.

DETAILED DESCRIPTION OF THE DISCLOSURE

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
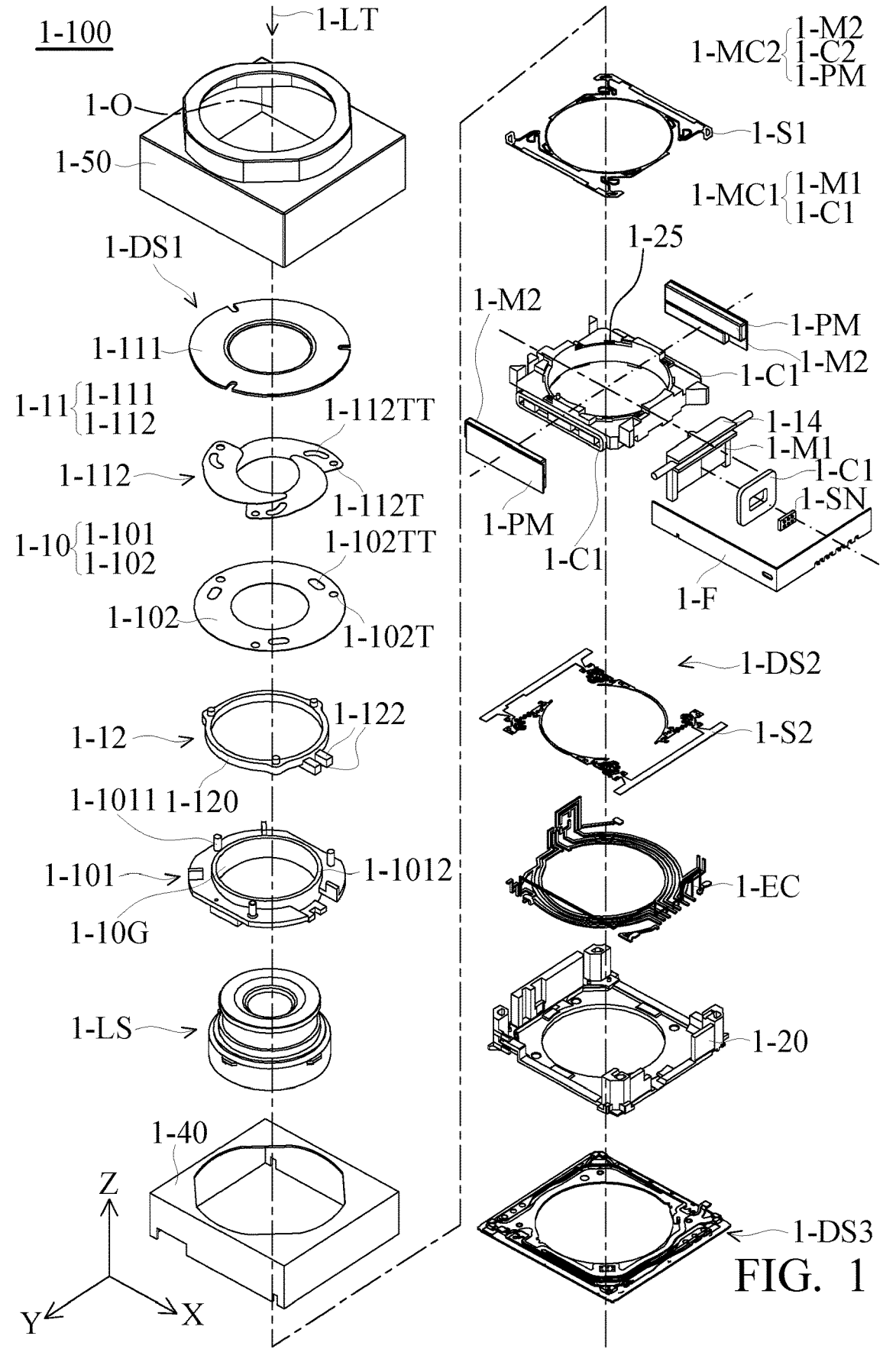
FIG. 1 is an exploded schematic diagram showing an optical system according to an embodiment of the present invention.
Figure 2:
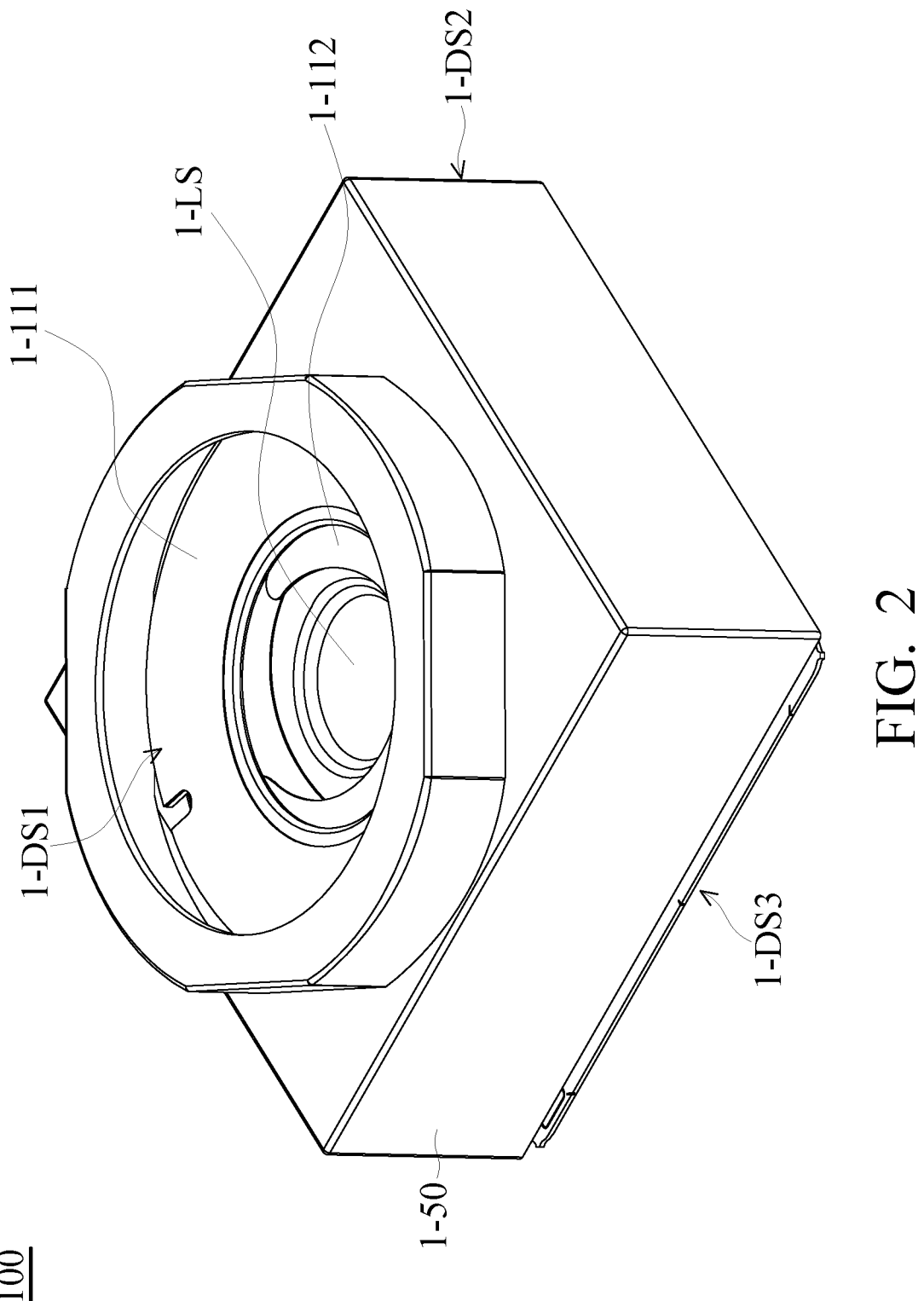
FIG. 2 is a schematic diagram of the optical system after assembly.

Please refer to FIGS. 1 and 2. FIG. 1 is an exploded schematic diagram of the optical system 1-100 according to an embodiment of the invention, and FIG. 2 is a schematic diagram of the optical system 1-100 after assembly. The optical system 1-100 can be installed inside an electronic device (such as a camera, a tablet computer, or a mobile phone) as a mechanism of the camera unit with lens, to provide shooting and video recording functions. For example, when light 1-LT from the outside enters the optical system 1-100 along an optical axis 1-O from the incident end, the light 1-LT can pass through the optical element 1-LS (such as a lens element or a lens assembly containing a plurality of lens elements) and reach the photosensitive element (not shown, such as an image sensor, which may be set in the third driving mechanism DS1) to obtain images. Through the optical system 1-100, the optical element 1-LS and the photosensitive element can move relatively to achieve optical zooming, auto-focusing (AF) or optical image stabilization (OIS). When viewed along the optical axis 1-O direction, the optical system 1-100 has a polygonal structure. The detailed structure of the aforementioned optical system 1-100 will be described below.

Figure 3:
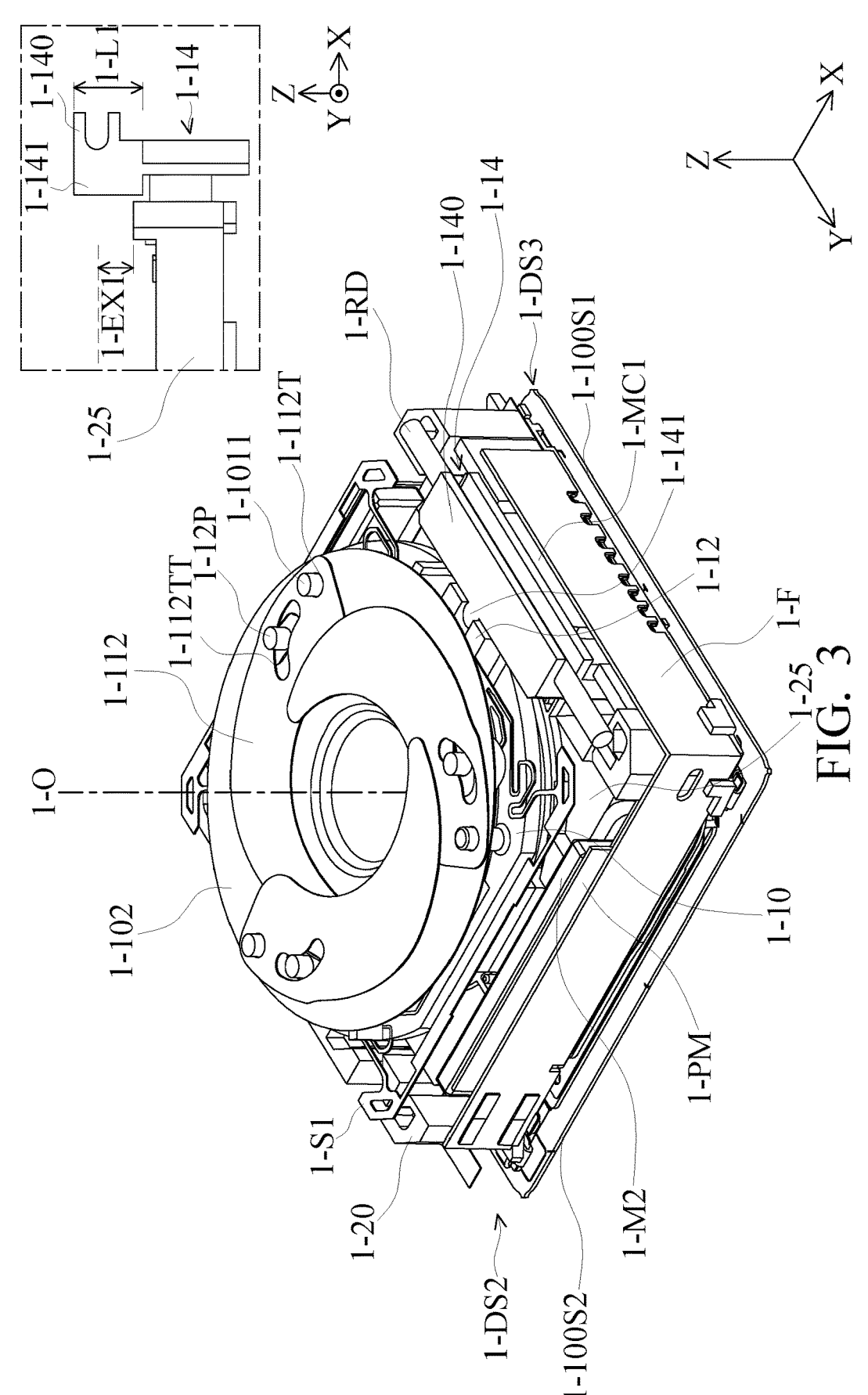
FIG. 3 is a schematic diagram showing a part of components of the optical system.

Refer to FIGS. 1 and 3, where FIG. 3 is a schematic diagram of the optical system 1-100 after assembly, wherein the housing 1-50, the frame 1-40, and the cover sheet 1-111 are omitted. The optical system 1-100 includes a first driving mechanism 1-DS1, a second driving mechanism 1-DS2, and a third driving mechanism 1-DS3. The first driving mechanism 1-DS1 may be an aperture driving mechanism, which is arranged on the second driving mechanism 1-DS2, and the second driving mechanism 1-DS2 may be an optical element driving mechanism, which is arranged on the third driving mechanism 1-DS3. In some embodiments, the first driving mechanism 1-DS1 may be a driving mechanism for driving aperture blades; the second driving mechanism 1-DS2 may be a driving mechanism for driving the optical element 1-LS; and the third driving mechanism 1-DS3 may be carry a photosensitive element.

Figure 4:
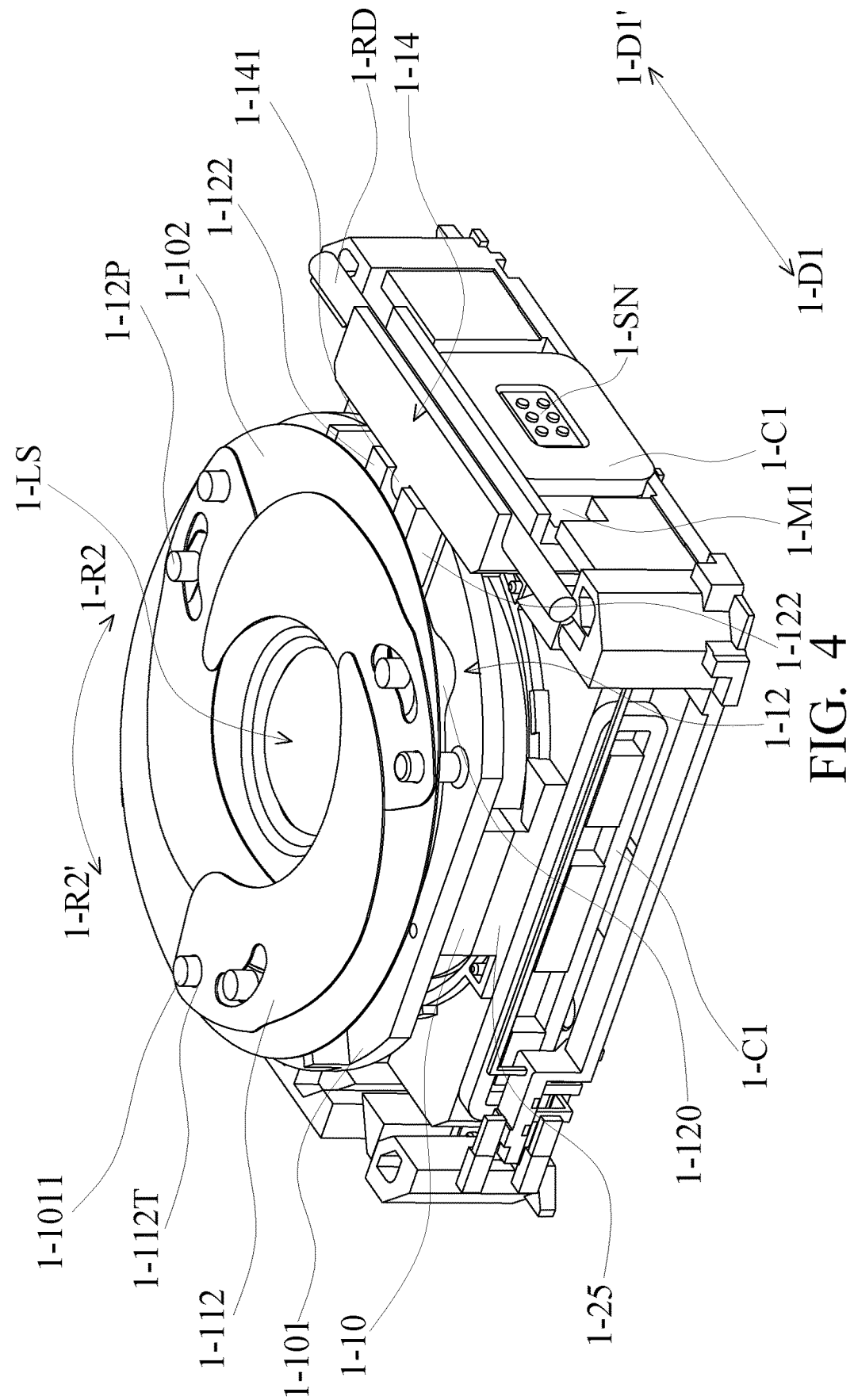
FIG. 4 is a schematic diagram showing a part of components of the optical system.

Referring to FIGS. 1, 3, and 4, the first driving mechanism 1-DS1 includes a first base 1-10, a light quantity control assembly 1-11, a linkage structure 1-12, and a first driving assembly 1-MC1 and a first movable part 1-14, wherein the first driving assembly 1-MC1 is used to drive the first movable part 1-14, the linkage structure 1-12 and the light quantity control assembly 1-11 to move relative to the first base 1-10. In some embodiments, the first driving assembly 1-MC1 drives the first movable part 1-14 relative to the first base 1-10 in a first dimension (such as the Y axis, along the direction 1-D1 or the opposite direction 1-D1'). In some embodiments, the first base 1-10 can be movably connected to the frame 1-40 or the second base 1-20 via the first elastic element 1-S1.

The first base 1-10 includes a first base body 1-101 and a supporting piece 1-102. The supporting piece 1-102 has a plurality of holes 1-102T, which are disposed around the protruding pillars 1-1011 of the first base body 1-101, to be disposed on the first base body 1-101. The light quantity control assembly 1-11 is disposed on the first base 1-10, and includes a cover sheet 1-111 and a plurality of blades 1-112. The cover sheet 1-111 can be used to protect the blades 1-112. In some embodiments, the cover sheet 1-111 is a part of the housing 1-50.

The light quantity control assembly 1-11 is arranged on the supporting piece 1-102, and the protruding pillars 1-1011 of the first base body 1-101 also pass through the plurality of holes 1-112T of the light quantity control assembly 1-11 for positioning. The linkage structure 1-12 has a substantially annular shape and is disposed around the protruding ring 1-1012 of the first base body 1-101, and is movable relative to the first base 1-10. Viewed from the optical axis 1-O direction, the linkage structure 1-12 is located between the protruding ring 1-1012 and the protruding pillars 1-101. The guide body 1-120 of the linkage structure 1-12 has a plurality of protrusions 1-12P which pass through the guide holes 1-102TT of the supporting piece 1-102 and the guide holes 1-112TT of the light quantity control assembly 1-11. When the linkage structure 1-12 is moved, the light quantity control assembly 1-11 can be pushed by the protrusions 1-12P (as shown in FIGS. 5 and 6), and the light quantity control assembly 1-11 changes the range of shielding the first opening 1-10G of the first base 1-10, to achieve the control of the light quantity.

Continue to refer to FIGS. 1 and 3, the first driving assembly 1-MC1 may be an electromagnetic driving assembly, including a first coil 1-C1 and a first magnetic element 1-M1. The first coil 1-C1 is arranged on the circuit board assembly 1-F, the circuit board assembly 1-F can be fixedly arranged on the frame 1-40; the first magnetic element 1-M1 is arranged on the first movable part 1-14. The first movable part 1-14 is connected to the linkage structure 1-12. In some embodiments, the circuit board assembly 1-F may belong to a part of the second base 1-20 and be fixed to the body of the second base 1-20.

When a driving signal is applied to the first driving element 1-MC1, a magnetic force is generated between the first magnetic element 1-M1 and the first coil 1-C1, so that the first magnetic element 1-M1 can be moved relative to the coil 1-C1, and the first movable part 1-14 can be driven to move relative to the first base 1-10. For example, the first movable part 1-14 moves in the first dimension. The first movable part 1-14 then drives the linkage structure 1-12 to move in the second dimension (such as the Z axis), such as rotating in the second dimension or rotating around the Z axis, the optical axis 1-O, or in other words, it rotates around a rotating axis, which is parallel to the optical axis 1-O, such as the direction of rotation 1-R1, 1-R1'. After that, the rotating linkage structure 1-12 drives the light quantity control assembly 1-11 to move, thereby the light quantity control assembly 1-11 shielding the first opening 1-10G of the first base 1-10.

Figure 5:
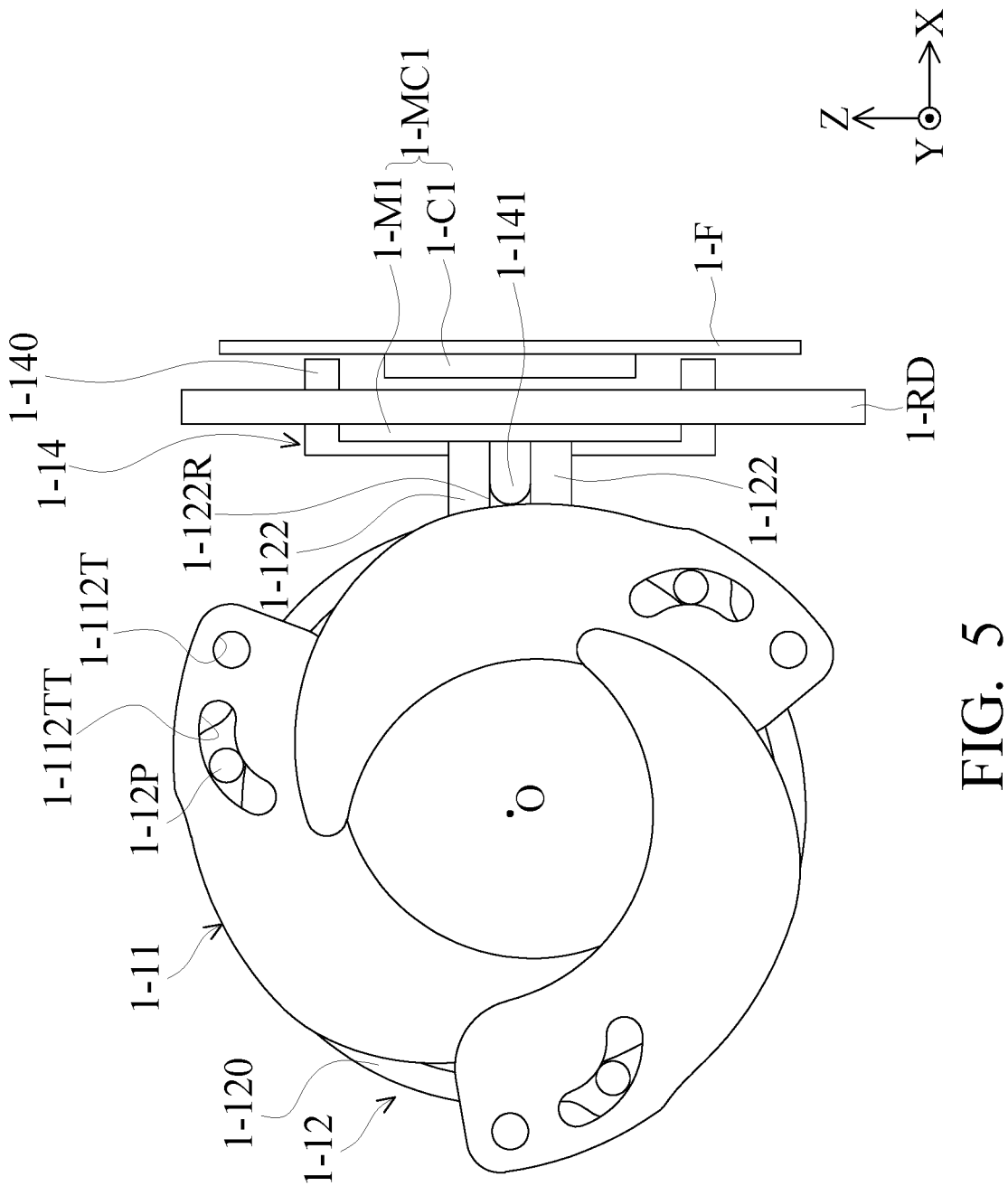
FIG. 5 is a schematic diagram of the light quantity control assembly.
Figure 6:
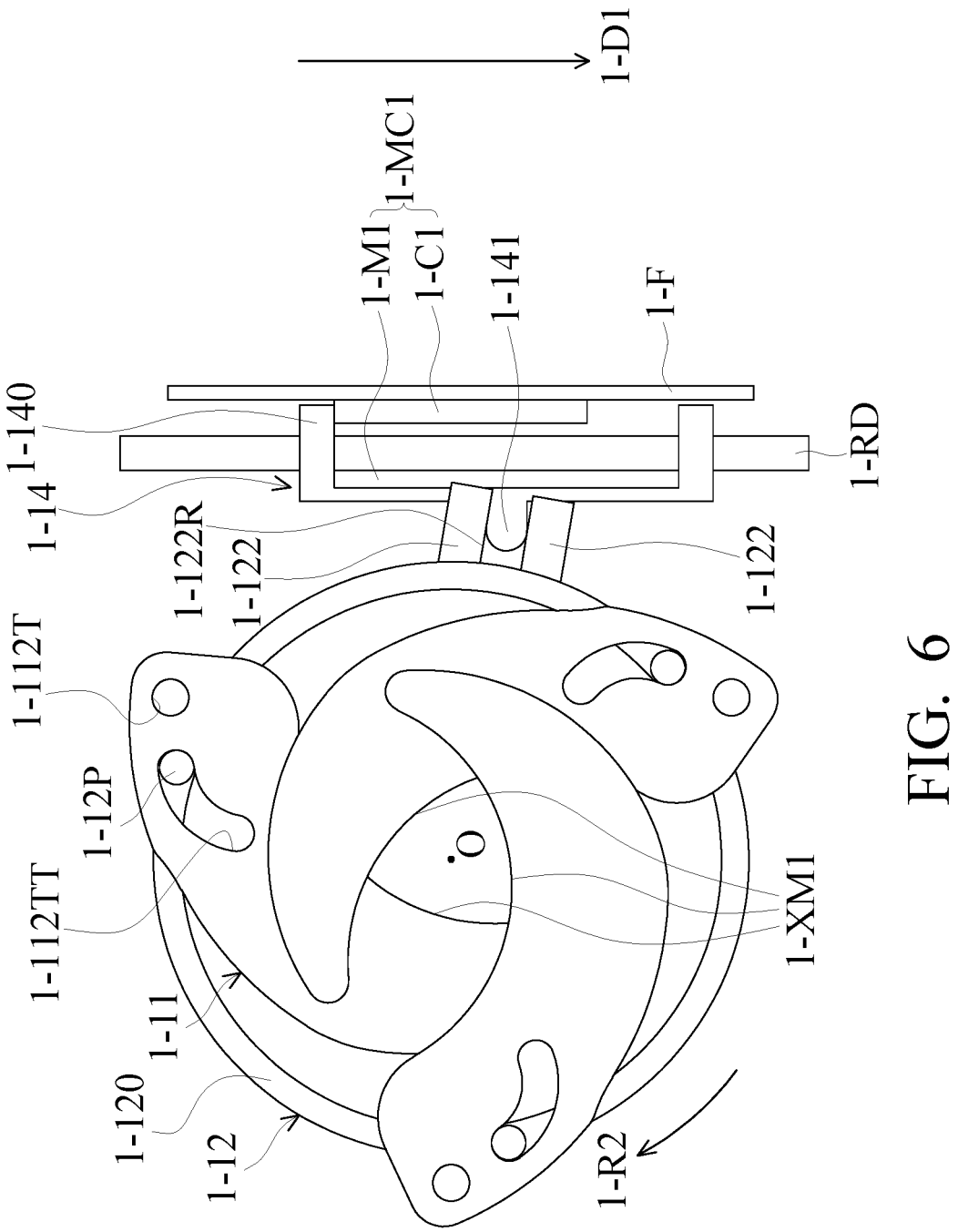
FIG. 6 is a schematic diagram of the light quantity control assembly after rotation.

As shown in FIGS. 5 and 6, the first movable part 1-14 is driven by the first magnetic element 1-M1, and the first movable part 1-14 is moved along the fixed rod 1-RD relative to the first coil 1-C1 in the first dimension (Y-axis), so that the first movable part 1-14 pushes the linkage structure 1-12, and the linkage structure 1-12 then drives the light quantity control assembly 1-11, to change the coverage area of the light quantity control assembly 1-11 covering the first opening 1-10G.

In this way, the linkage structure 1-12 is used to transmit a driving force generated by the first driving assembly 1-MC1 to the light quantity control assembly 1-11. As shown in FIG. 6, when the light quantity control assembly 1-12 moves to a limit position 1-XM1, the light quantity control assembly 1-12 and the first opening 1-10G can at least partially overlap (viewed in the optical axis 1-O direction).

Regarding the connection between the first movable part 1-14 and the linkage structure 1-12, the first guide element 1-141 of the first movable part 1-14 is connected to the second guide element 1-122 of the linkage structure 1-12. The first guide element 1-141 protrudes toward the linkage structure 1-12 in the third direction (X-axis), and the second guide element 1-122 protrudes toward the first movable part 1-14, and has a recess 1-122R (or an opening structure), corresponding and can be used to accommodate the first guide element 1-141. The first driving assembly 1-MC1 provides a driving force for the first movable part 1-14 in the first dimension. The first guide element 1-141 pushes the second guide element 1-122 to change the driving force from the first dimension converted to the second dimension. The second guide element 1-122 is connected to the guiding body 1-120, and the guiding body 1-120 is connected to the light quantity control assembly 1-11 via its protrusions 1-12P.

In some embodiments, the Young's modulus (or hardness) of the first guide element 1-141 is greater than that of the body 1-140 of the first movable part 1-14 connected to the first guide element 1-141. The first guide element 1-141 has metal material. The first guide element 1-141 is fixedly disposed on the body 1-140 of the first movable part 1-141. In some embodiments, the Young's modulus (or hardness) of the second guide element 1-122 is greater than that of the guiding body 1-120. The second guide element 1-122 has metal material. The second guide element 1-122 is fixedly disposed on the guide body 1-120.

Figure 7:
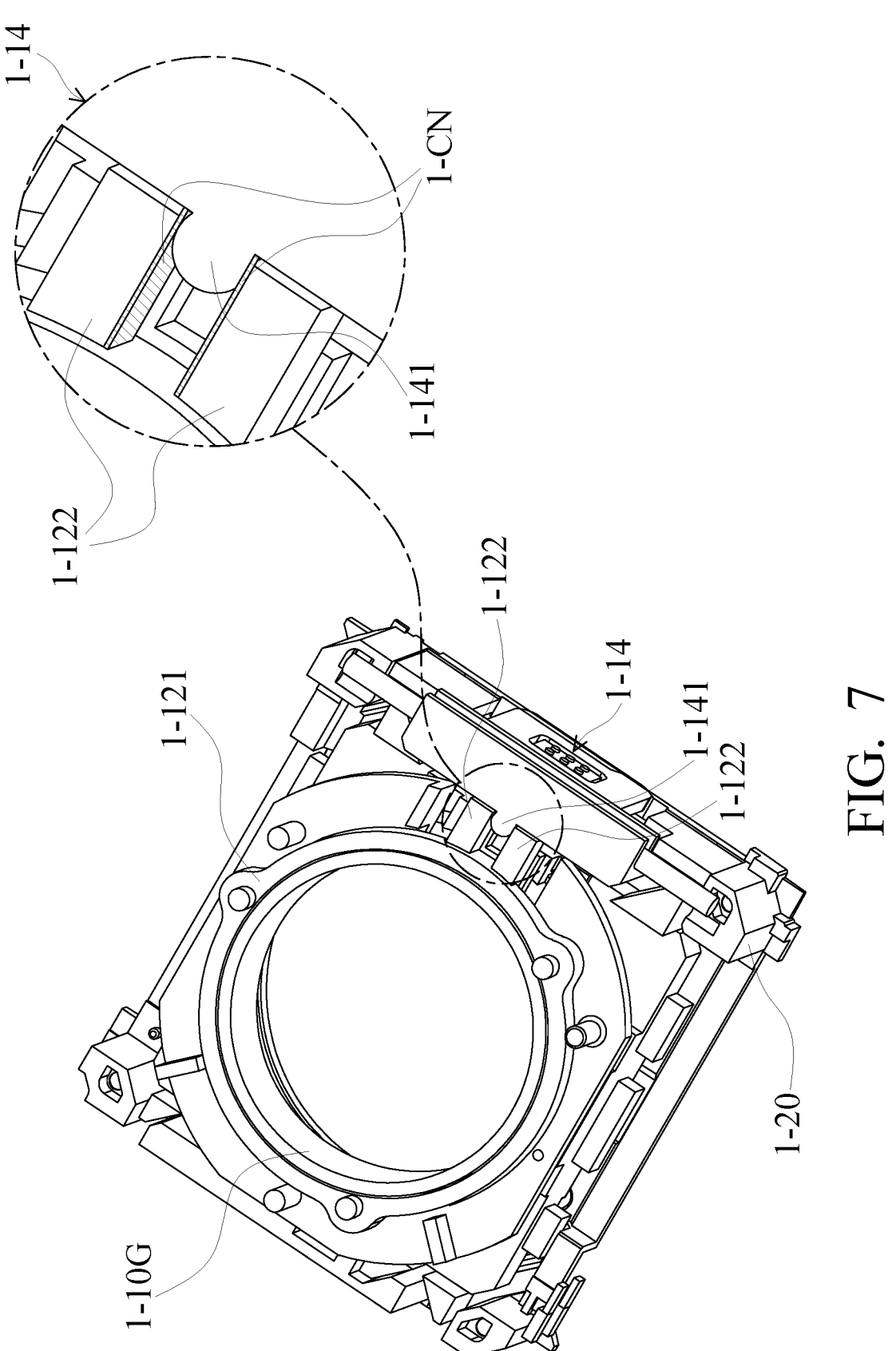
FIG. 7 is a schematic diagram showing a part of components of the optical system.

Referring to FIG. 7, in other embodiments, a connecting element 1-CN is provided between the first guide element 1-141 and the second guide element 1-122. The first guide element 1-141 is smoothly movably connected to the second guide element 1-122 via the connecting element 1-CN. The connecting element 1-CN is elastic, and the Young's modulus (or hardness) of the connecting element 1-CN is smaller than that of the first and second guide elements 1-141 and 1-122.

In some embodiments, the first driving assembly 1-MC1 may include a permeability assembly 1-PM located outside the first magnetic element 1-M1, or located between the frame 1-40 and the first magnetic element 1-M1. The magnetic force (between the first magnetic element 1-M1 and the first coil 1-C1) can be enhanced to concentrate in a predetermined direction via the permeability assembly 1-PM. In this way, the magnetic force provided by the driving assembly 1-MC1 for the first movable part 1-14 to move can be enhanced, and the effect of magnetic interference can be reduced. Moreover, the first magnetic element 1-M1 and the first coil 1-C1 can also be protected, and the overall mechanical strength can be increased.

In some embodiments, a position sensing member 1-SN, for example, a magnetoresistive sensor (MRS) or an optical sensor, may be disposed in the hollow structure of the first coil 1-C1. The position sensing member 1-SN is used to sense the first magnetic element 1-M1 and the first coil 1-C1, to sense the relative positional relationship between the first movable part 1-14 and the second base 1-20, so that a control unit (not shown, controlling the first driving assembly 1-MC1) adjusts the relative position between the two. In some embodiments, the position sensing member 1-SN is a component of the drive assembly 1-MC1. In some embodiments, the position sensing element 1-SN may include a control unit. In addition to sensing the first magnetic element 1-M1 and the first coil 1-C1, it can also control the first coil C1, such as applying a driving signal.

Referring to FIGS. 1 and 3, the second driving mechanism 1-DS2 includes a second base 1-20, a second movable part 1-25, and a second driving assembly 1-MC2, wherein the second movable part 1-25 is configured to connect the optical element 1-LS, and the second driving assembly 1-MC2 can be used to drive the second movable part 1-25 to move relative to the second base 1-20, to achieve the effect of anti-shake for optical image, auto focusing and/or optical zooming.

The second movable part 1-25 is disposed on the second base 1-20, and is movably connected to the second base 1-20 via the second elastic element 1-S2. The second movable part 1-25 is fixed to the first base 1-10 in the aforementioned first driving mechanism 1-DS1, and the first base 1-10 is movably connected to the frame 1-40 or the second base 1-20 via the first elastic element 1-S1. In some embodiments, the first base 1-10 and the second movable part 1-25 are integrally formed.

The second driving assembly 1-MC2 may also be an electromagnetic driving assembly, including a second coil 1-C2 and a second magnetic element 1-M2. The second coil 1-C2 can be fixedly arranged on the second movable part 1-25; the second magnetic element 1-M2 can be fixedly arranged on the circuit board assembly 1-F or the frame 1-40 or the second base 1-20.

Similarly, when a driving signal is applied to the driving assembly 1-MC2 to generate a magnetic force between the second magnetic element 1-M2 and the second coil 1-C2, the second coil 1-C2 can move relative to the magnetic element 1-M2, so as to drive the second movable part 1-25 to move relative to the second base 1-20. Referring to FIG. 3, in some embodiments, the second driving assembly 1-MC2 is used to drive the second movable part 1-25 to move along the optical axis 1-O in a limit range 1-EX1, wherein the protruding length 1-L1 (in Z-axis) of the first guide element 1-141 of the first movable part 1-14 is greater than the limit range 1-EX.

Continue to refer to FIGS. 1 and 3, when viewed along the direction perpendicular to the optical axis 1-O, the first driving assembly 1-MC1 at least partially overlaps the second movable part 1-25. When viewed in a direction perpendicular to the optical axis 1-O, the second driving assembly 1-MC2 at least partially overlaps the second movable part 1-25. When viewed along the optical axis 1-O, the optical system 1-100 includes a first side 1-100S1 and a second side 1-100S2. The first and second sides 1-100S1, 1-100S2 are not parallel. The first driving assembly 1-MC1 and the second driving assembly 1-MC2 are respectively located on the first side 1-100S1 and the second side 1-100S2. The first movable part 1-14 and the second driving assembly 1-MC2 are respectively located on the first side 1-100S1 and the second side 1-100S2.

In some embodiments, the circuit board assembly 1-F has an L-shaped structure, and the circuit board assembly 1-F has extension sections on the first side 1-100S1 and the second side 1-100S2. The circuit board assembly 1-F can be electrically connected to the first and second driving assemblies 1-MC1 and 1-MC2. In some embodiments, the circuit board assembly 1-F further includes a circuit 1-EC, which can be electrically connected to the second elastic element 1-S2, so that the first and second driving elements 1-MC1 and 1-MC2 can be connected to an external power source via the circuit 1-EC and the second elastic element 1-S2.

When the first movable part 1-14 is driven by the first driving assembly 1-MC1, the first movable part 1-14 will move relative to the first base 1-10 and the second base 1-20. When the second movable part 1-25 is driven by the second driving assembly 1-MC2, the second movable part 1-25 and the first base 1-10 will move relative to the second base 1-20.

Figure 8:
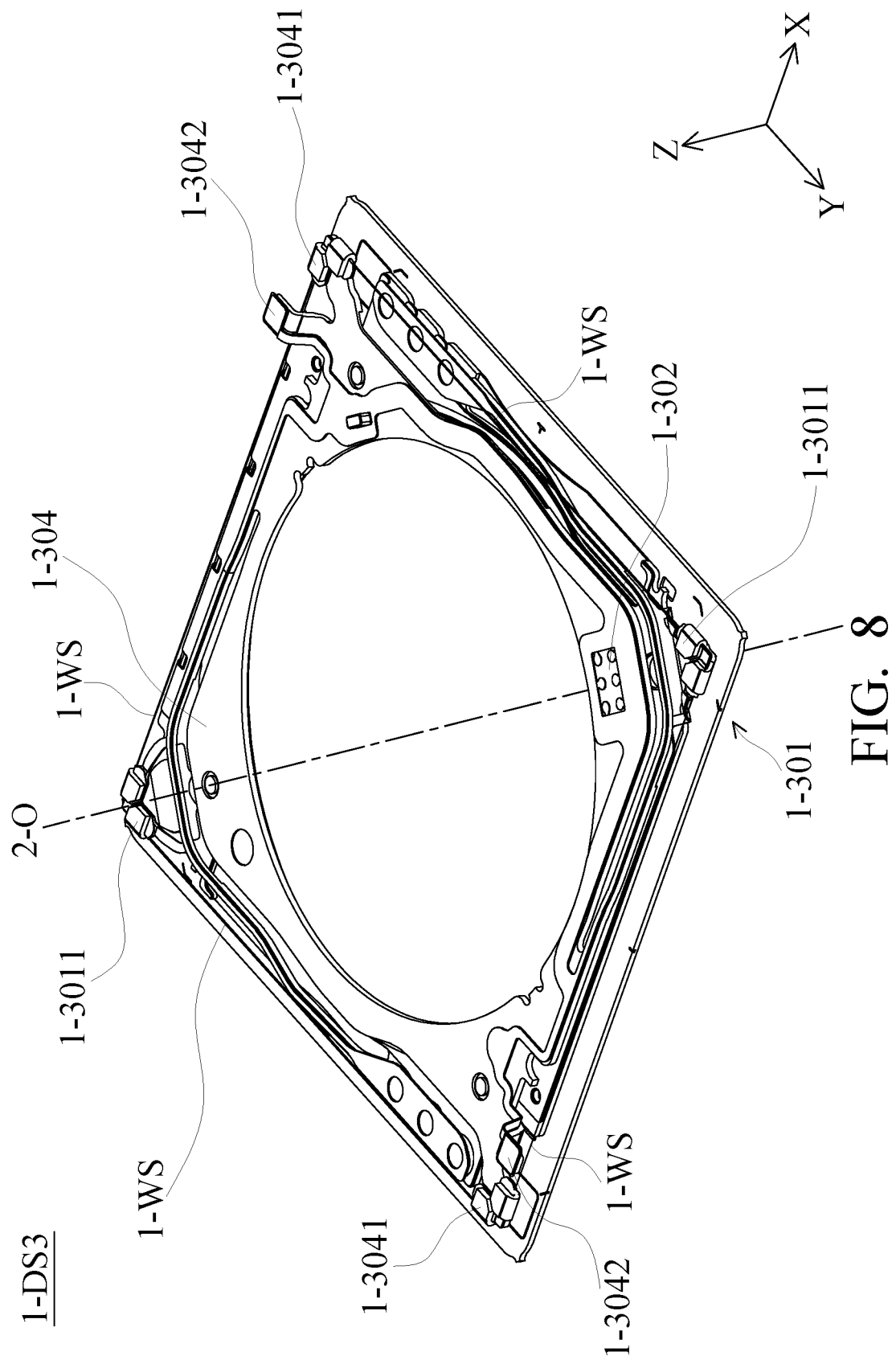
FIG. 8 is a schematic diagram of the third driving mechanism in FIG. 1.
Figure 9:
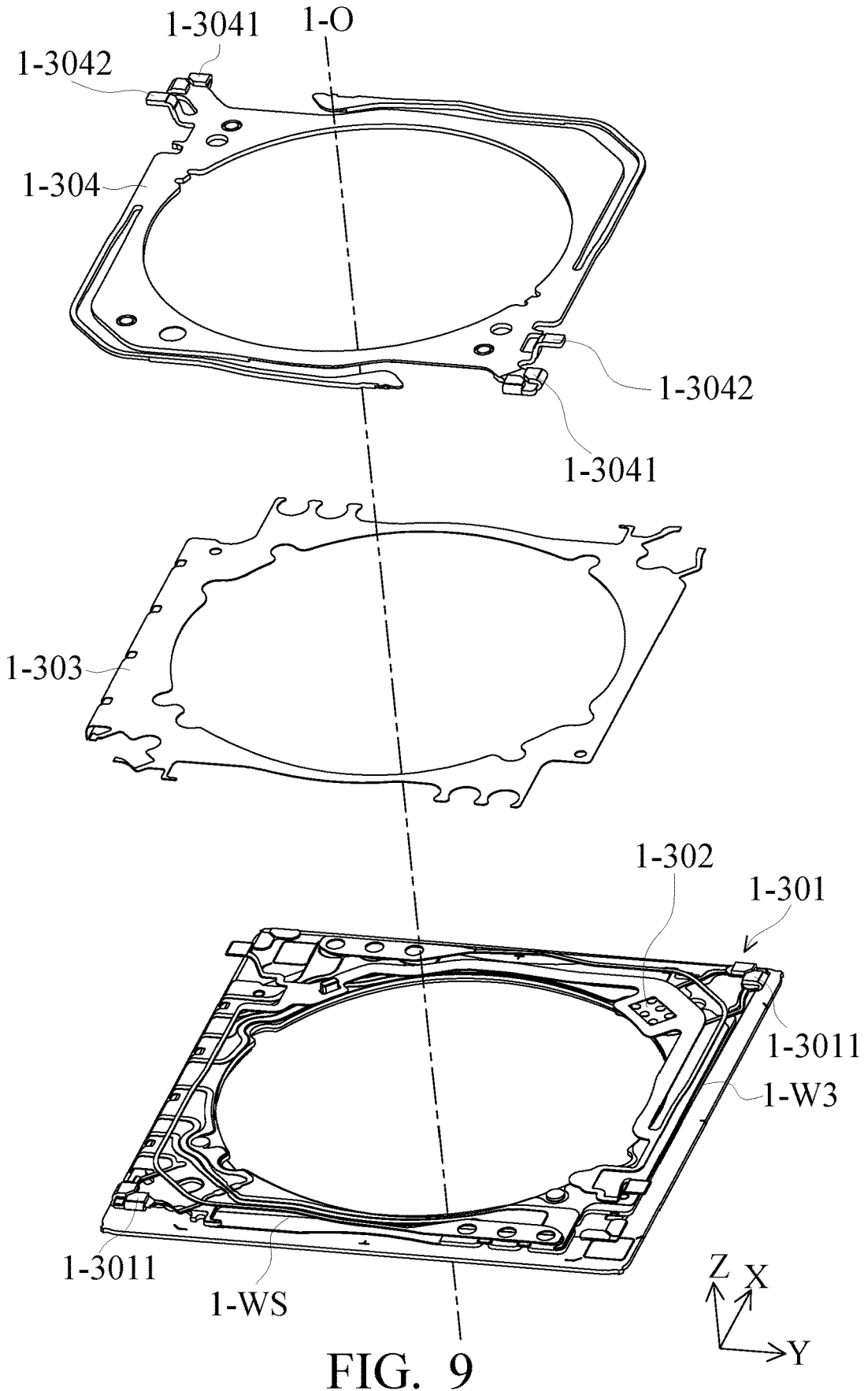
FIG. 9 is an exploded schematic diagram showing the third driving mechanism in FIG. 8.

Refer to FIGS. 8 and 9, which are schematic diagrams showing the third driving mechanism 1-DS3. The third driving mechanism 1-DS3 is arranged under the second base 1-20 of the second driving mechanism 1-DS2, which can carry an photosensitive element (the second optical element, not shown), and can drive the second driving mechanism 1-DS2, optical element 1-LS (first optical element) and the first driving mechanism 1-DS1 to move.

The third driving mechanism 1-DS3 includes a third base 1-301, an elastic connecting member 1-304, and a third driving assembly 1-WS. The third base 1-301 is configured to connect or sustain a photosensitive element. The elastic connecting member is arranged on the third base 301 and connects the third base 301 and the second base 20. In the optical axis 1-O direction, the second base 1-20, the elastic connecting piece 1-304 and the third base 1-304 are arranged sequentially.

The third driving assembly 1-WS includes a plurality of biasing elements (four biasing elements in this embodiment). The third driving assembly 1-WS is connected with the third base 1-301 and the elastic connecting member 1-304. In detail, one end of each biasing element is connected to the fixed protruding portion 1-3011 of the third base 1-301, and the other end is connected to the movable protruding portion 1-3041 of the elastic connecting member 1-304. In this embodiment, the third driving assembly 1-WS connects the third base 1-301 and the elastic connecting member 1-304 in a direction perpendicular to the optical axis 1-O. In some embodiments, the biasing element of the third driving assembly 1-WS located at 1-100S1 overlaps with the first movable part 1-14 in the direction of the optical axis 1-O.

The biasing element of the third driving assembly 1-WS is, for example, a wire made of shape memory alloy (Shape Memory Alloys, SMA), which can be driven by an external power source (not shown) and change its length. For example, when a driving signal (such as current) is applied to raise the temperature of the third driving assembly 1-WS, the third driving assembly 1-WS can be deformed and elongated or contracted; when the application of the driving signal is stopped, the third driving assembly 1-WS will be restored to the original length. In other words, by applying an appropriate driving signal, the length of the third driving assembly 1-WS can be controlled to move the elastic connecting member 1-304, thereby driving the second driving mechanism 1-DS2 (and the optical element 1-LS) to move relative to the third base 1-301, to achieve the function of focusing, anti-shake or shaking compensation.

In some embodiments, the third driving mechanism 1-DS3 further includes a conductive layer 1-302 and an insulating layer 1-303. The conductive layer 1-302 and the insulating layer 1-303 are arranged between the third base 1-301 and the elastic connecting member 1-304, and the conductive layer 1-302 is located between the third base 1-301 and the insulating layer 1-303. The conductive layer 1-302 may be electrically connected to the third driving assembly 1-WS, so that the third driving assembly 1-WS may be connected to an external source or circuit, and the insulating layer 1-303 can shield at least part of the conductive layer 1-302 to protect the conductive layer 1-302, to avoid short circuit.

In some embodiments, the elastic connecting member 1-304 further includes an extension protruding portion 1-3042 adjacent to the movable protruding portion 1-3041, which can be used to guide the second elastic element 1-S2 and the circuit 1-EC, so that the second elastic element 1-S2 and the circuit 1-EC can be disposed on the extension protruding portion 1-3042, so as to facilitate the connection with the external circuit or power supply.

In summary, an embodiment of the present invention provides an optical system, including a first base with a first opening which is configured to allow a light to pass along an optical axis; a light quantity control assembly disposed on the first base; and a first driving assembly is used to drive the light quantity control assembly to move relative to the first base. The first driving mechanism further includes a linkage structure for transmitting a driving force generated by the first driving assembly to the light quantity control assembly. When the light quantity control assembly moves to a limit position, the light quantity control assembly at least partially overlaps the first opening when viewed along the direction of the optical axis.

The embodiment of the present disclosure has at least one of the following advantages or effects. By arranging a first movable part on the side of the optical system and connecting a linkage mechanism, the movement of the first movable part in the first dimension can drive the linkage mechanism to move in the second dimension, so that the area covered by the light quantity control assembly on the first opening of the first base can be changed and adjusted. This configuration is helpful for miniaturization, improving optical quality. In addition, the special relative position, size relationship and configuration of each component in the disclosure can make the optical system thinner in a specific direction and miniaturize the overall mechanism, and also can further improve the optical quality by matching different optical modules, for example, shooting quality or depth sensing accuracy is increased. Furthermore, a multiple anti-shock system can be provided to greatly improve the effect of anti-shake with optical modules.

Figure 10:
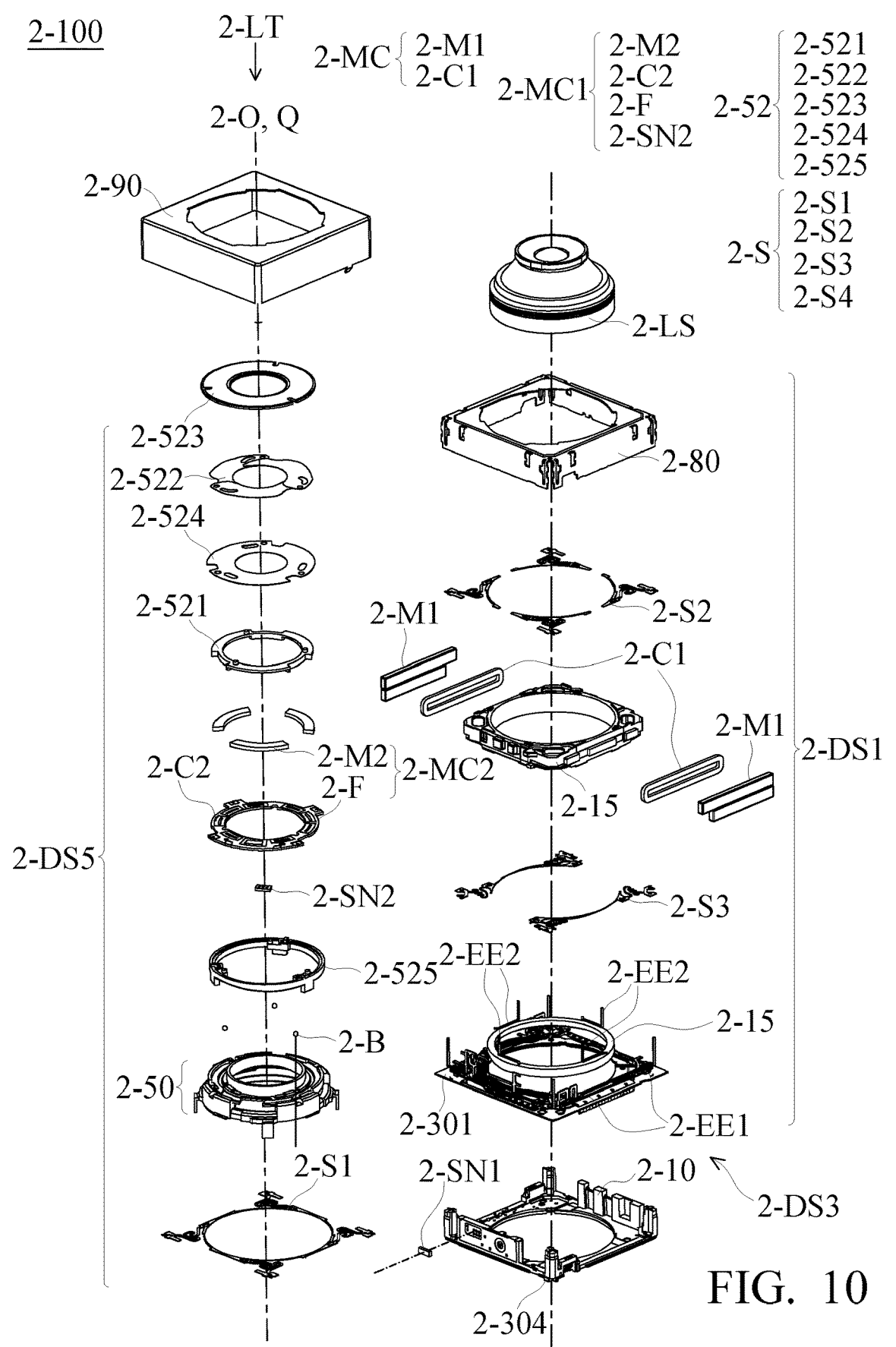
FIG. 10 is an exploded schematic diagram showing an optical system according to an embodiment of the present invention.
Figure 11:
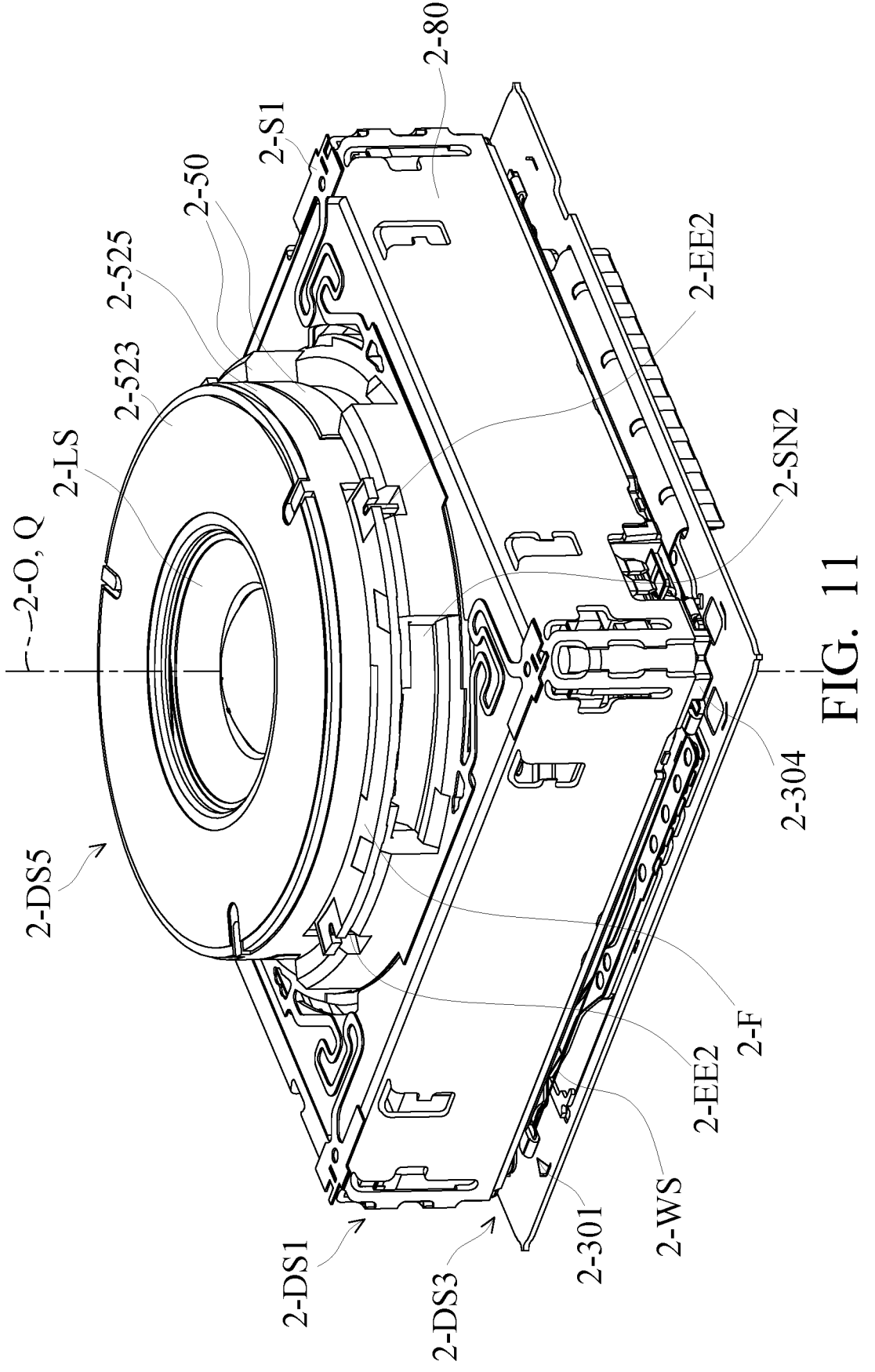
FIG. 11 is a schematic diagram of the optical system in FIG. 10 after assembly (the housing is omitted).

Please refer to FIGS. 10 and 11, FIG. 10 is an exploded schematic diagram of the optical system 2-100 according to an embodiment of the invention, and FIG. 11 is a schematic diagram of the optical system 2-100 after assembly (the housing 2-90 is omitted). The optical system 2-100 can be installed inside an electronic device (such as a camera, a tablet computer, or a mobile phone) as a mechanism of the camera unit with lens, to provide shooting and video recording functions. For example, when light 2-LT from the outside enters the optical system 2-100 along an optical axis 2-O from the incident end, the light 2-LT can pass through the optical element 2-LS (such as a lens element or a lens assembly containing a plurality of lens elements) and reach the photosensitive element (not shown, such as an image sensor, which may be set in the third driving mechanism DS1) to obtain images. Through the optical system 2-100, the optical element 2-LS and the photosensitive element can move relatively to achieve optical zooming, auto-focusing (AF) or optical image stabilization (OIS). When viewed along the optical axis 2-O direction, the optical system 2-100 has a polygonal structure. The detailed structure of the aforementioned optical system 2-100 will be described below.

Continuing to refer to FIG. 10, the optical system 2-100 comprises an optical element driving mechanism 2-DS1, a base driving mechanism 2-DS3, and a light quantity control mechanism 2-DS5. The first driving mechanism 2-DS1 may be a bearing and driving mechanism for the optical element 2-LS, which is arranged on the base driving mechanism 2-DS3, and the base driving mechanism 2-DS3 may be a bearing and driving mechanism for a photosensitive element (not shown, such as an image sensor). The light quantity control mechanism 2-DS5 can be a driving mechanism for driving aperture blades, which is arranged on the optical element driving mechanism 2-DS1.

Figure 12:
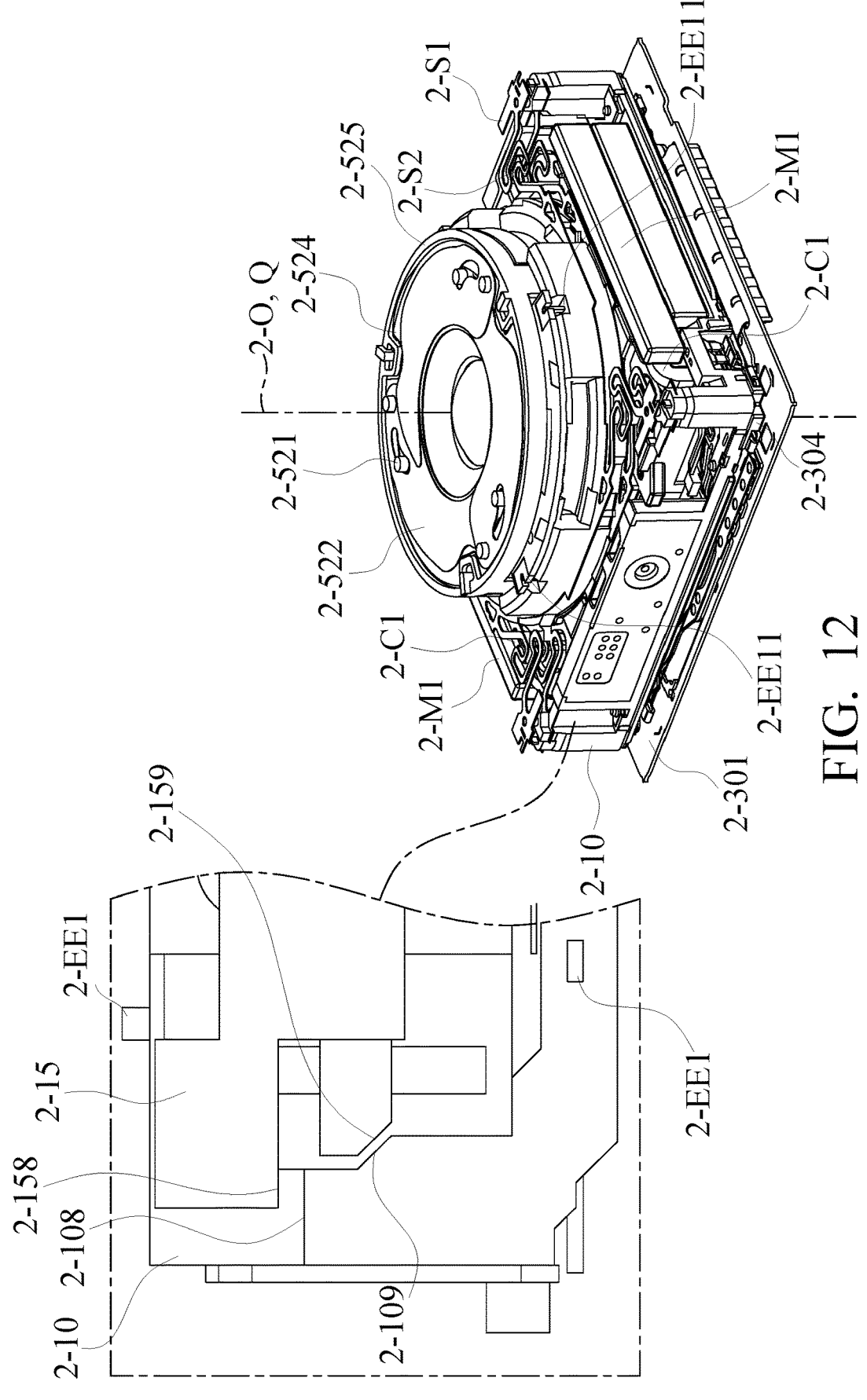
FIG. 12 is a schematic diagram showing a part of components of the optical system.

Referring to FIGS. 10 and 12, the optical element driving mechanism 2-DS1 includes: a first base 2-10, a first movable part 2-15, and a first driving assembly 2-MC1, a frame 2-80 and a housing 2-90. The first movable part 2-15 is used to connect the optical element 2-LS, and is arranged on the first base 2-10. The first movable part 2-15 is movably connected to the first base 2-10 via a second elastic element 2-S2 and a third elastic element 2-S3 of an elastic assembly 2-S. The first driving assembly 2-MC1 is used to drive the first movable part 2-15 to move relative to the first base 2-10, so that the optical element 2-LS within the first movable part 2-15 can be driven to move, so as to achieve anti-shake, auto-focus and/or optical zooming.

In this embodiment, the second and third elastic elements 2-S2 and 2-S3 have a plate-like structure and are respectively located on the upper and lower sides of the first movable part 2-15. The first movable part 2-15 is movably connected to the first base 2-10 via the second and third elastic elements 2-S2 and 2-S3. Referring to FIG. 12, the first base 2-10 in this embodiment has a first abutment surface 2-108, and the first movable part 2-15 has a second abutment surface 2-158, wherein the first and second abutment surfaces 2-108 and 2-158 correspond to each other. When the first movable part 2-15 is driven to an extreme position, the first and second abutment surfaces 2-108, 2-158 may be connected to or in contact with each other. In addition, the first base 2-10 has a first inclined surface 2-109, and the first movable part 2-15 has a second inclined surface 2-159, which face each other. With the first and second inclined surfaces 2-109, 2-159, the first movable part 2-15 can be restricted when moving relative to the first base 2-10, that is, the second inclined surface 2-159 is limited by the first inclined surface 2-109, to avoid excessive tilting on the movable part 2-15 with the optical element 2-LS, and to improve the quality of the device. In this embodiment, the first and second inclined surfaces 2-109, 2-159 are inclined with respect to the first and second abutment surfaces 2-108, 2-158, or inclined with respect to the optical axis 2-O. In some embodiments, the first and second inclined surfaces 2-109, 2-159 are located below the first and second abutment surfaces 2-108, 2-158, or the first and second inclined surfaces 2-109, 2-159 are farther from the incident end than the first and second abutment surfaces 2-108, 2-158.

The housing 2-90 can be used to protect the assemblies and components of the light quantity control mechanism 2-DS5 and the optical element driving mechanism 2-DS1. The frame 2-80 is arranged in the housing 2-90 to protect the first movable part 2-15, the first base 2-10, the first driving assembly 2-MC1 and the optical element 2-LS. In some embodiments, the housing 2-90, the first base 2-10, the second base 2-301 of the base driving mechanism 2-DS3, and the frame 2-80 are arranged along the main axis 2-Q of the optical system 2-100. The main axis 2-Q is a central axis passing through the first base 2-10 or the second base 2-301. In some embodiments, the main axis 2-Q of the optical system 2-100 may coincide with or parallel to the optical axis 2-O.

The first driving assembly 2-MC1 may be an electromagnetic driving assembly, which includes a first coil 2-C1 and a first magnetic element 2-M1. The first coil 2-C1 can be fixedly arranged on the first movable part 2-15; the second magnetic element 2-M2 can be fixedly arranged on the first base 2-10 or the inner wall of the frame 2-80.

When a driving signal is applied to the first driving assembly 2-MC1, a magnetic force is generated between the first magnetic element 2-M1 and the first coil 2-C1, so that the first coil 2-C1 can move relative to the first magnetic element 2-M1. so as to drive the first movable part 2-15 to move relative to the first base 2-10. The foregoing embodiment is a coil-moved type; in other embodiments, a magnet-moved type may be provided, or the positions of the coil and the magnet can be exchanged.

The first driving assembly 2-MC1 also includes a first control unit 2-SN1, which is electrically connected to the first coil 2-C1 for outputting driving power (first driving power) to control the first coil 2-C1. In this embodiment, the first control unit 2-SN1 may be disposed in the first base 2-10. In some embodiments, the first coil 2-C1 may be electrically connected to the first control unit 2-SN1 via the first circuit assembly 2-EE1.

Continue to refer to FIGS. 10 and 12, the light quantity control mechanism 2-DS5 is used to control the light quantity (or amount) of the light 1-LT entering the optical element 2-LS, including: a base seat 2-50, a light quantity control assembly 2-52 which is movable relative to the base seat 2-50, and a second driving assembly 2-MC2. The aforementioned second driving assembly 2-MC2 is used to control and drive the light quantity control assembly 2-52.

Figure 13:
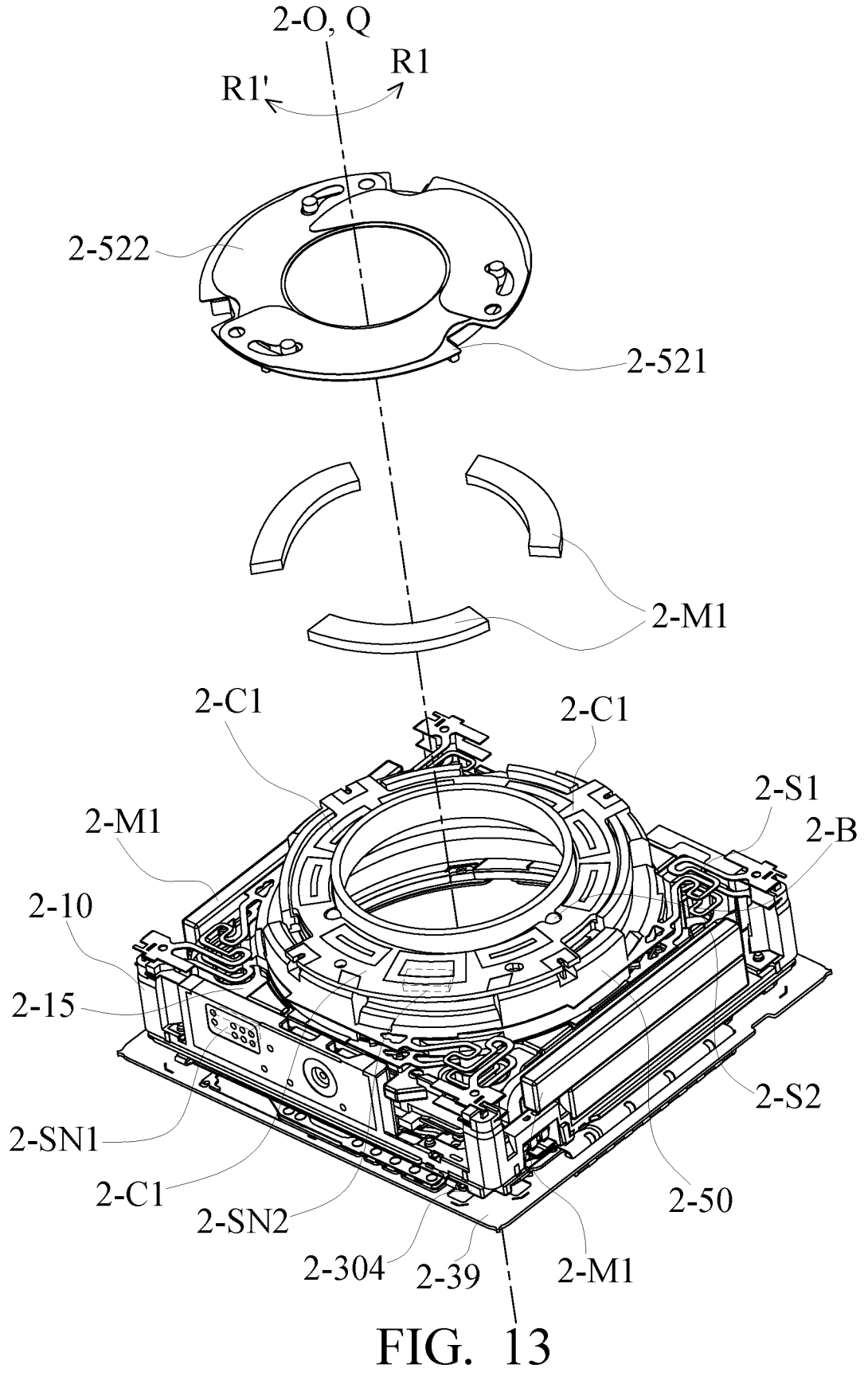
FIG. 13 is a schematic diagram showing a part of components of the optical system.

In detail, referring to FIGS. 10 and 13, the light quantity control assembly 2-52 has a linkage member 2-521 and a plurality of blades 2-522, which are movably arranged on the base seat 2-50, wherein the linkage member 2-521 is connected to and pass through the blades 2-522. In some embodiments, the light quantity control assembly 2-52 may further include: a bearing piece 2-523 and a cover sheet 2-524, which are respectively disposed on the upper and lower sides of the blades 2-522 for protection; and a protection ring 2-525, disposed on the base seat 2-50 and surround the blades 2-522, the bearing piece 2-523 and the cover sheet 2-524. In a direction perpendicular to the optical axis 2-O, the height of the protection ring 2-525 is higher than the blades 2-522, the bearing piece 2-523, and the cover sheet 2-524, that is, the protection ring 2-525 covers the blades 2-522, the bearing piece 2-523 and the cover sheet 2-524 viewed from a direction perpendicular to the optical axis 2-O, to provide protection.

Referring to FIGS. 10 and 13, the second driving assembly 2-MC2 has a circuit board 2-F, a second coil 2-C2, and a second magnetic element 2-M2. The second coil 2-C2 is disposed on the circuit board 2-F, for example, disposed on the upper surface of the circuit board 2-F, and the second magnetic element 2-M2 is disposed on the linkage member 2-521, for example, disposed on the lower surface of the linkage member 2-521. The second coil 2-C2 and the second magnetic element 2-M2 face each other.

The circuit board 2-F and the second coil 2-C2 are fixed to the base seat 2-50. The base seat 2-50 has a protruding ring 2-50P, and the linkage member 2-521 surrounds the protruding ring 2-50P and is arranged on the circuit board 2-F. The linkage member 2-521 is movably connected to the base seat 2-50 via the guide members 2-B. In this embodiment, the guide members 2-B can be used as rolling balls to allow the linkage member 2-521 to rotate around the Z axis.

The second driving assembly 2-MC1 may also be an electromagnetic driving assembly. When a driving signal is applied to the second driving assembly 2-MC2, a magnetic force is generated between the second magnetic element 2-M2 and the second coil 2-C2, so that the second magnetic element 2-M2 can move relative to the second coil 2-C2, to drive the linkage member 2-521 to move relative to the base seat 2-50. For example, the linkage member 2-521, the second magnetic element 2-M2, and the blades 2-522 rotate in the first dimension (Z-axis), such as the rotating direction 2-R1, 2-R1', and the rotating blades 2-522 of the light quantity control assembly 2-52 will change the covered area for the opening 2-50G of the base seat 2-50, to achieve light control.

Referring to FIGS. 12 and 13, the elastic element 2-S further includes a first elastic element 2-S1, and the base seat 2-50 is movably connected to the first base 2-10 via the first elastic element 2-S1. The light quantity control mechanism 2-DS5 also includes a second circuit assembly 2-EE2, which is partially embedded in the base seat 2-50, and has parts exposed by the base seat 2-50: a plurality of upper exposed parts 2-EE21 and a plurality of lower exposed parts 2-EE22. The upper exposed parts 2-EE21 are connected to the circuit board 2-F, and the lower exposed parts 2-EE22 are connected to the second elastic element 2-S2, so that the second driving assembly 2-MC2 is electrically connected to the second elastic element 2-S2, and the second elastic element 2-S2 can be connected to an external power source or circuit. In this way, with the electrical connection of the second circuit assembly 2-EE2, a driving signal (for example, current) can be provided to the second driving assembly 2-MC2.

The second driving assembly 2-MC2 also includes a second control unit 2-SN2, which is arranged on the circuit board 2-F and corresponds to the second coil 2-C2. In this embodiment, the second control unit 2-SN2 is arranged on the lower surface of the circuit board 2-F and is electrically connected to the second coil 2-C2. The second control unit 2-SN2 can be used to output driving power (second driving power) to the second coil 2-C2, thereby controlling the second coil 2-C2. In addition, the second control unit 2-SN2 is electrically connected to the first control unit 2-SN1 of the first driving assembly 2-MC1 via the first circuit assembly 2-EE1. Through the above configuration, the first and second control units 2-SN1 and 2-SN2 can share the circuit, which can greatly increase the miniaturization of the overall optical system 2-100.

Figure 14:
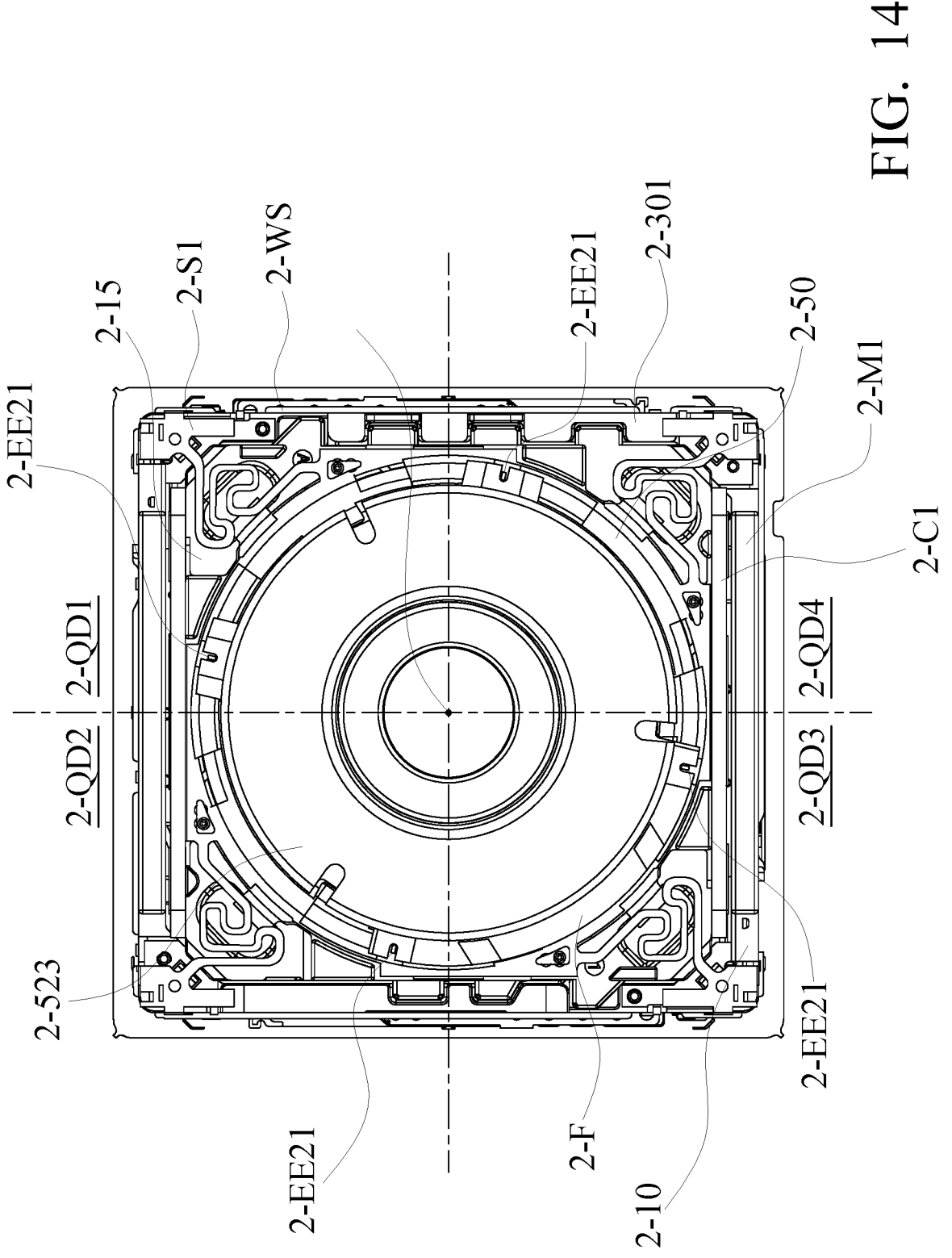
FIG. 14 is a top plan view of the optical system (the housing is omitted).

Refer to FIG. 14, which shows a top plan view of the optical system 2-100 (the housing 2-90 is omitted). The second circuit assembly 2-EE2 is disposed at different positions of the base seat 2-50. In detail, four different quadrants 2-QD1, 2-QD2, 2-QD3, 2-QD4 are defined by the center or the main axis 2-Q of the base seat 2-50, and a plurality of exposed parts 2-EE21 (or exposed electrical connections with the circuit board 2-F of the second driving assembly 2-MC2) of the second circuit assembly 2-EE2 are located in four different quadrants 2-QD1, 2-QD2, 2-QD3, 2-QD4. Therefore, the flexibility of the electrical connection of the device can be increased, to facilitate miniaturization, or a better component configuration can be obtained to avoid magnetic interference.

Figure 15:
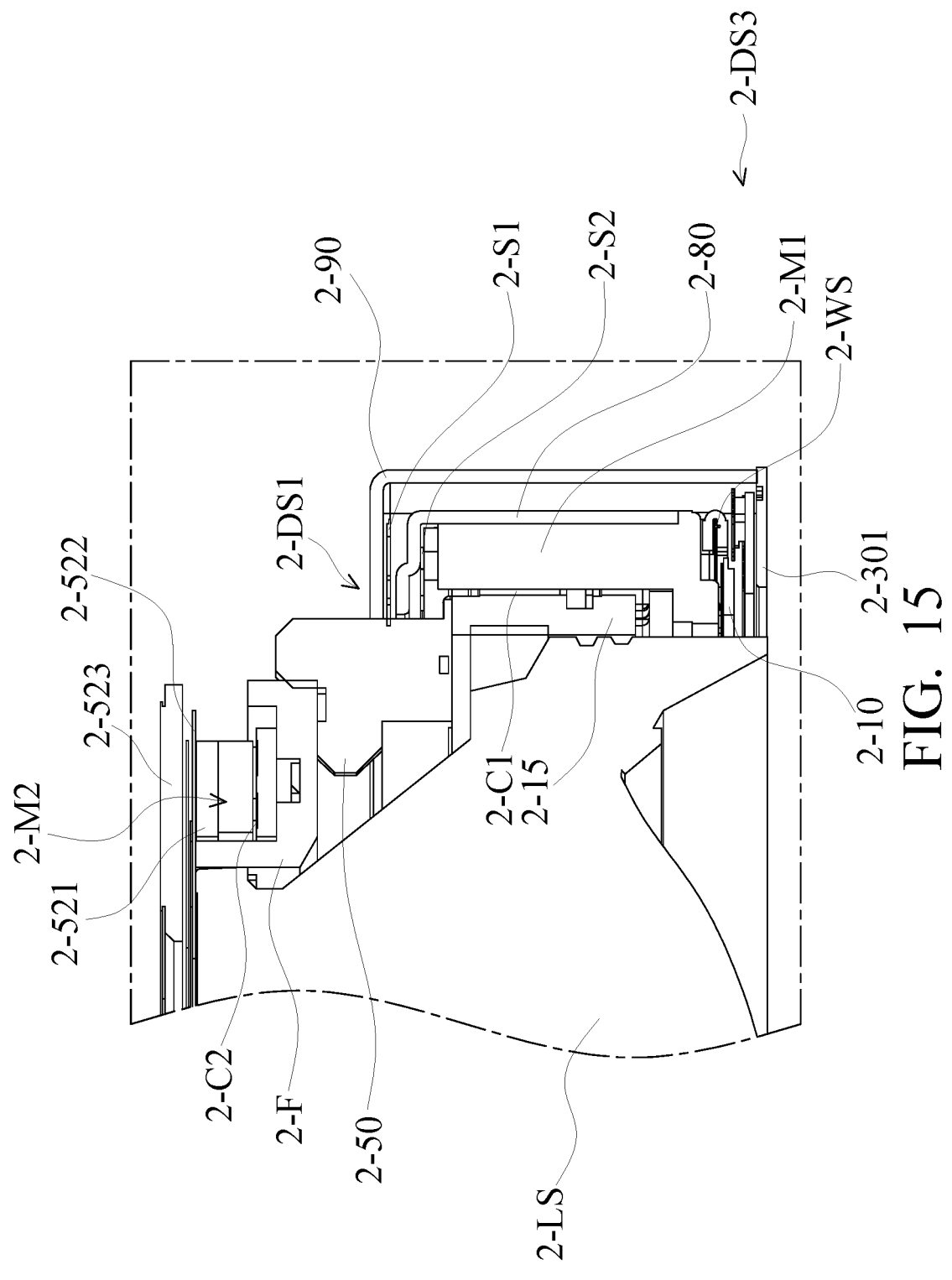
FIG. 15 is a schematic diagram of a partial cross-section of the optical system.

Refer to FIG. 15, which shows a partial cross-sectional view of the optical system 2-100. The housing 2-90 can protect the components and elements in the optical system 2-100, and the frame 2-80 is located in the housing 2-90. The aforementioned first elastic element 2-S1 is connected to the base seat 2-50 and the housing 2-90. In detail, the first elastic element 2-S1 is located above the frame 2-80, and the connecting portion 2-S11 of the first elastic element 2-S1 connects the base seat 2-50 and the inner surface 2-91 of the housing 2-90. In the direction perpendicular to the optical axis 2-O, the connecting portion 2-S11 does not overlap the frame 2-80.

Figure 16:
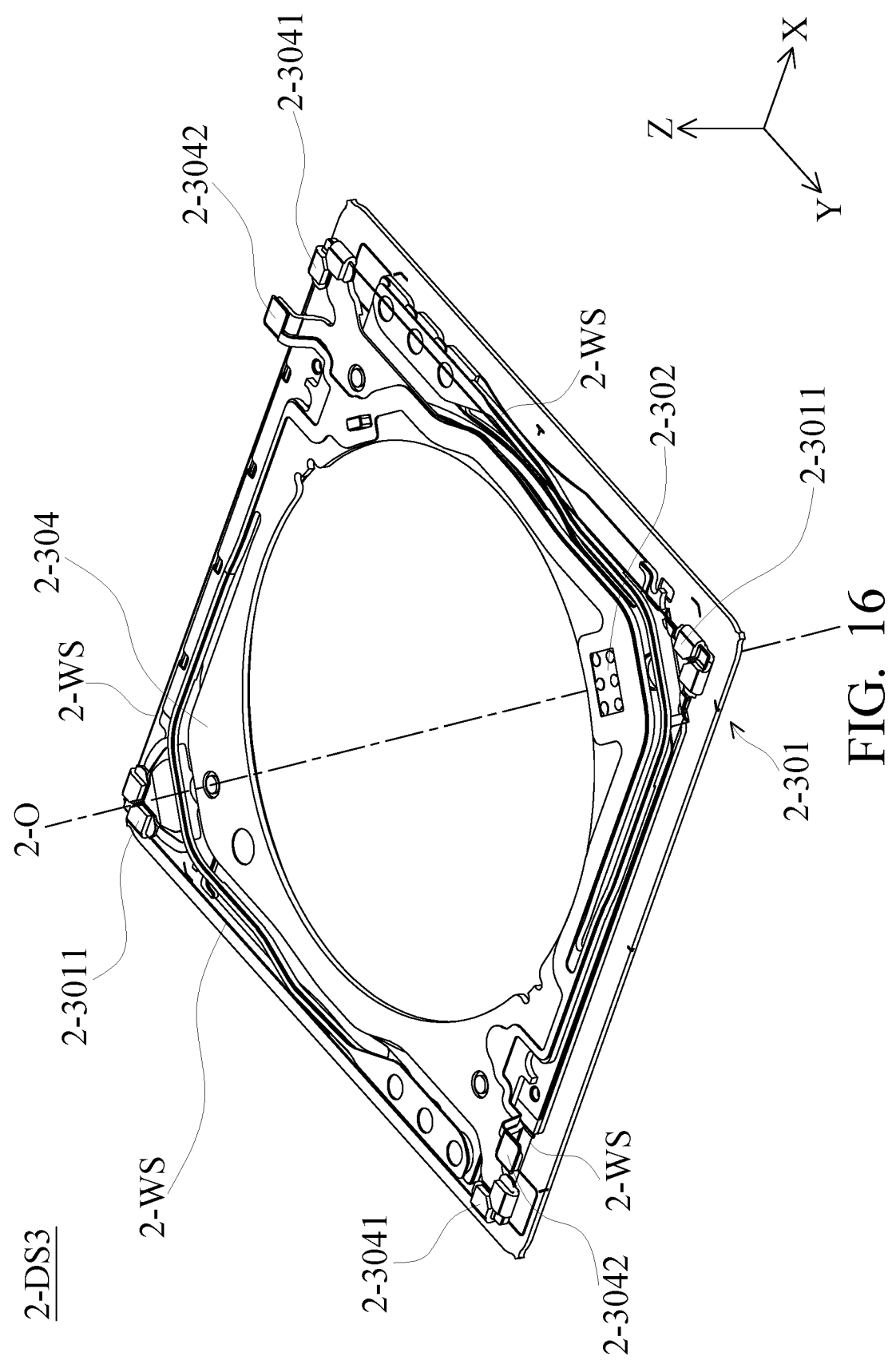
FIG. 16 is a schematic diagram showing the base driving mechanism.

Referring to FIG. 16, the aforementioned base driving mechanism 2-DS3 is disposed under the optical element driving mechanism 2-DS1, which can be used to carry a photosensitive element and used to drive the optical element driving mechanism 2-DS1 to move. The base driving mechanism 2-DS3 includes: a second base 2-301, a fourth elastic element 2-304, and a third driving assembly 2-WS. The fourth elastic element 2-304 and the third driving assembly 2-WS are arranged on the second base 2-301, the fourth elastic element 2-304 is connected to the second base 2-301 and the first base 2-10, and the third driving assembly 2-WS connects the second base 2-301 and the fourth elastic element 2-304.

The third driving assembly 2-WS is used to drive the first base 2-10 to move relative to the second base 2-301. In some embodiments, the third driving assembly 2-WS drives the second base 2-301 in the second dimension (such as X-axis) or the third dimension (such as Y-axis) or XY-plane. The base seat 2-50 also can move relative to the second base 2-301 with the first base 2-10 of the optical element driving mechanism 2-DS1.

In this embodiment, the third driving assembly 2-WS includes a plurality of biasing elements (there are four biasing elements in this embodiment), which are respectively located on different sides of the second base 2-301. The third driving assembly 2-WS connects the second base 2-301 and the fourth elastic element 2-304. In detail, one end of each biasing element is connected to the fixed protruding portion 2-3011 of the second base 2-301, and the other end is connected to the movable protruding portion 2-3041 of the fourth elastic element 2-304. In this embodiment, the third driving assembly 2-WS connects the second base 2-301 and the fourth elastic element 2-304 in a direction perpendicular to the optical axis 2-O.

The biasing element of the third driving assembly 2-WS is, for example, a wire made of shape memory alloy (SMA), which can be driven by an external power supply (not shown) to change its length. For example, when the driving signal (for example, current) is applied to raise the temperature of the third driving assembly 2-WS, the third driving assembly 2-WS can be deformed and elongated or contracted; when the application of the driving signal is stopped, the third driving assembly 2-WS can be restored to the original length. In other words, by applying an appropriate driving signal, the length of the third driving assembly 2-WS can be controlled to move the fourth elastic element 2-304, thereby driving the upper optical element driving mechanism 2-DS1 (including the carried optical element 2-LS) and the light quantity control mechanism 2-DS5 to move relative to the second base 2-301, to achieve the function of focusing, anti-shake or shaking compensation.

In this embodiment, the first circuit assembly 2-EE1 provided in the first base 2-10 is electrically connected to the second and fourth elastic elements 2-S2, 2-304. The part of the first circuit 2-EE1 exposed by the first base 2-10, such as the protruding part 2-EE11 thereof, which extends along the main axis 2-Q or optical axis 2-O and is connected to the second elastic element 2-S2. In this way, the second driving assembly 2-MC2 can be electrically connected to the fourth elastic element 2-304 via the second elastic element 2-S2 and the first circuit assembly 2-EE1 in sequence, to facilitate the electrical connection configuration of the overall mechanism. In some embodiments, the first circuit assembly 2-EE1 can be defined as a part of the first base 2-10, which is partially embedded in the body of the first base 2-10 and partially exposed outside the body of the first base 2-10.

The aforementioned third elastic element 2-S3 located on the lower side of the first movable part 2-15 and disposed on the first base 2-10, is also connected and electrically connected to the first circuit assembly 2-EE1, so that the first driving assembly 2-MC1 can be electrically connected to the third elastic element 2-S3 via the first circuit assembly 2-EE1, the second elastic element 2-S2, and the second circuit assembly 2-EE2. The first driving assembly 2-MC1 can also be electrically connected to the fourth elastic element 2-304 via the third elastic element 2-S3.

In this embodiment, the first, second, third, and fourth elastic elements 2-S1, 2-S2, 2-S3, 2-304 have a plate-like structure. In some embodiments, the first and second elastic elements 2-S1 and 2-S2 are parallel to each other. The first and third elastic elements 2-S1 and 2-S3 are parallel to each other. The first and fourth elastic elements 2-S1 and 2-304 are parallel to each other. The second and third elastic elements 2-S2 and 2-S3 are parallel to each other. The second and fourth elastic elements 2-S2 and 2-304 are parallel to each other. The third and fourth elastic elements 2-S3, 2-304 are parallel to each other. In some embodiments, when viewed along a direction that is perpendicular to the optical axis 2-O (or along the direction perpendicular to the main axis 2-Q of the optical system 2-100), the second elastic element 2-304 is located between the first and third elastic elements 2-S1 and 2-S3, and the third elastic element 2-S3 is located between the second and fourth elastic elements 2-S2, 2-304.

In summary, an embodiment of the present invention provides an optical system, including a first movable part for connecting an optical element; a first base, wherein the first movable part is movable relative to the first base; and a first driving assembly for driving the movable part to move relative to the first base. The optical system further includes a light quantity control mechanism for controlling the quantity of light entering the optical element. The light quantity control mechanism further includes a base seat and a light quantity control assembly at least partially movable relative to the base seat. The optical system further includes a second driving assembly for controlling the light quantity control assembly.

The embodiment of the present disclosure has at least one of the following advantages or effects. By controlling the light quantity control assembly through the second driving assembly, the light input quantity can be changed and the performance of the device can be improved. In addition, in some embodiments, the first and second driving assemblies can share a circuit, which contributes to the miniaturization of the overall mechanism and improves the optical quality. In addition, the special relative position, size relationship and configuration of each component in the disclosure can make the optical system thinner in a specific direction and miniaturize the overall mechanism, and also can further improve the optical quality by matching different optical modules, for example, shooting quality or depth sensing accuracy being increased. Furthermore, a multiple anti-shock system can be provided to greatly improve the effect of anti-shake with optical modules.

Figure 17:
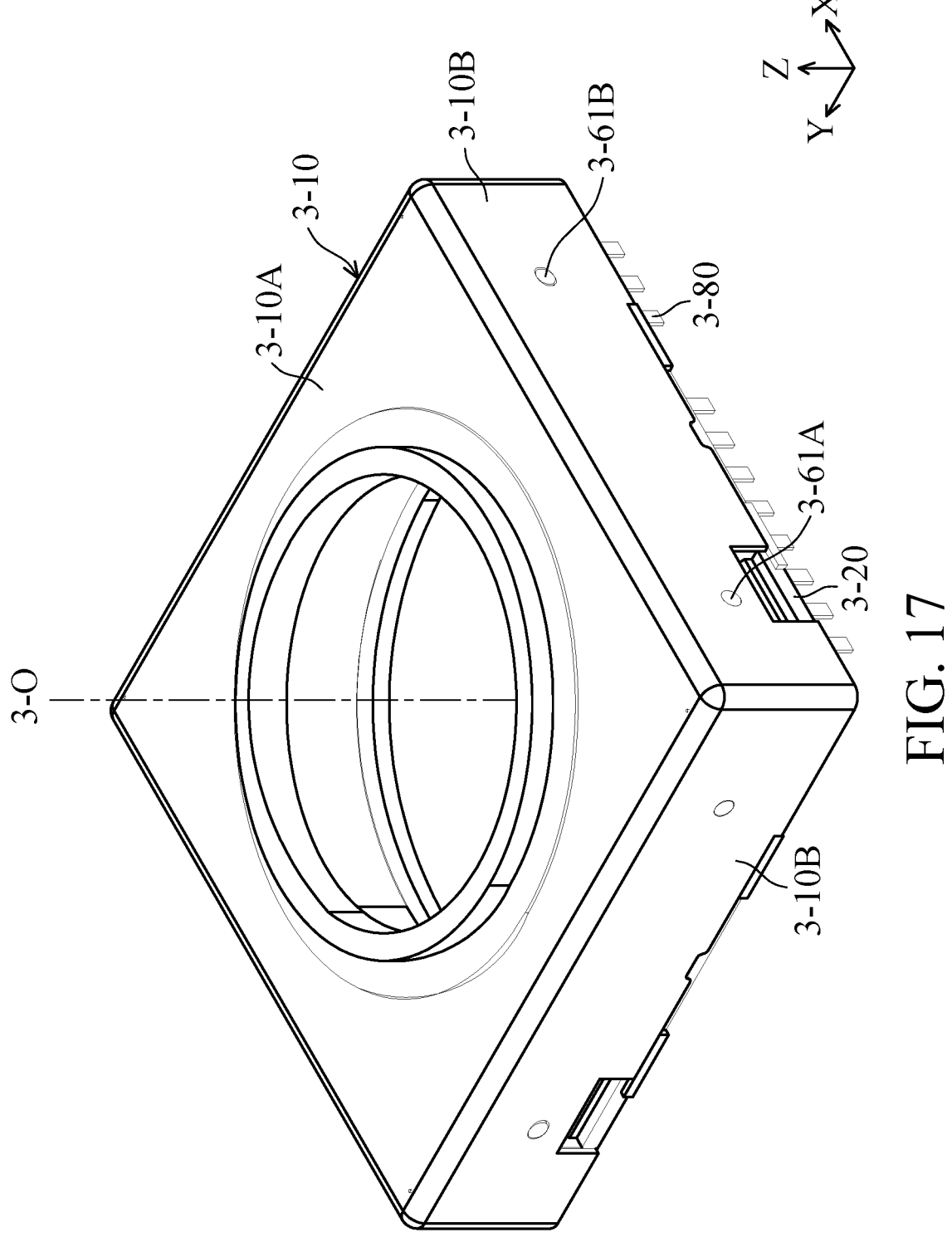
FIG. 17 is a schematic view of an optical element driving mechanism in some embodiments of the present disclosure.
Figure 18:
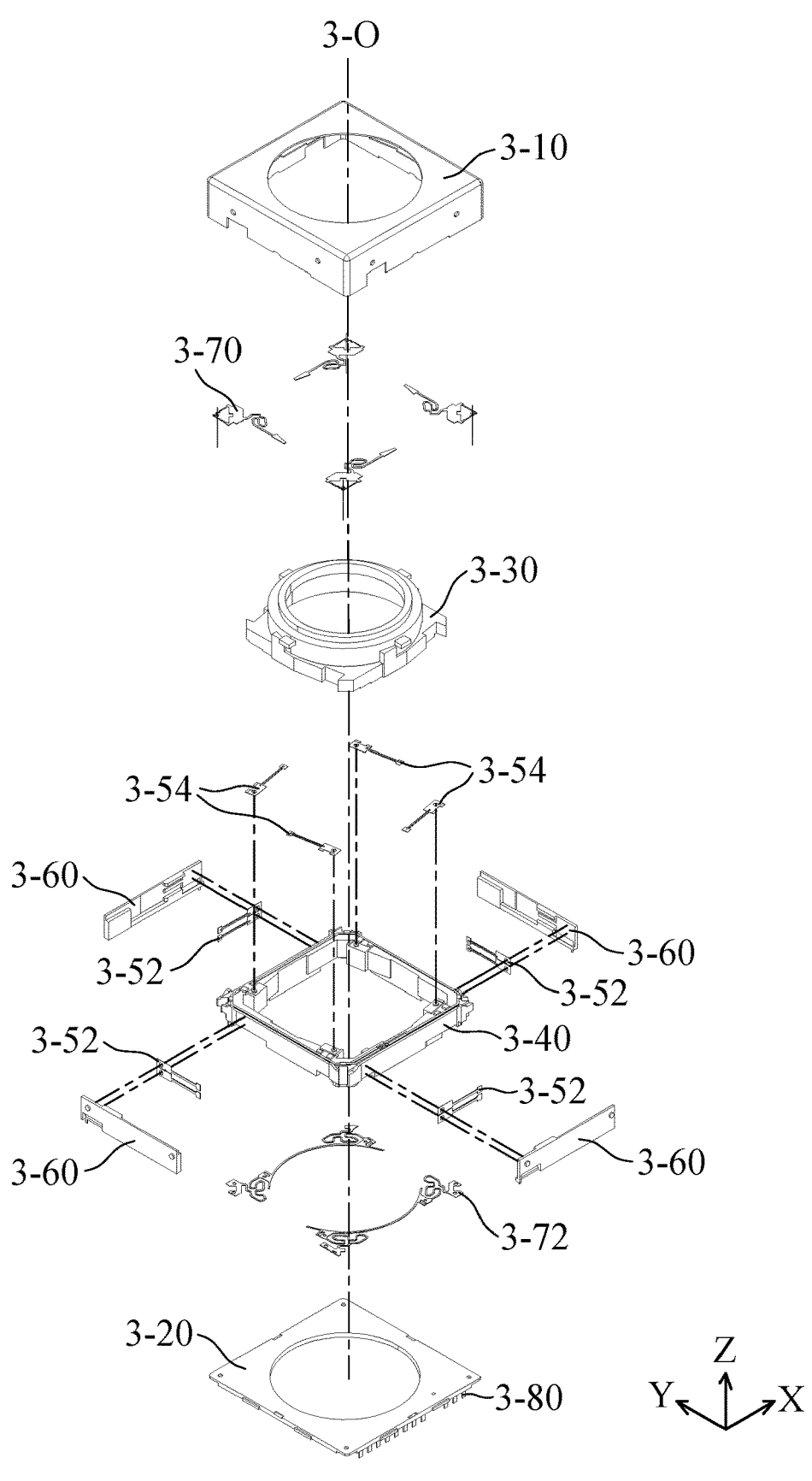
FIG. 18 is an exploded view of the optical element driving mechanism.
Figure 19:
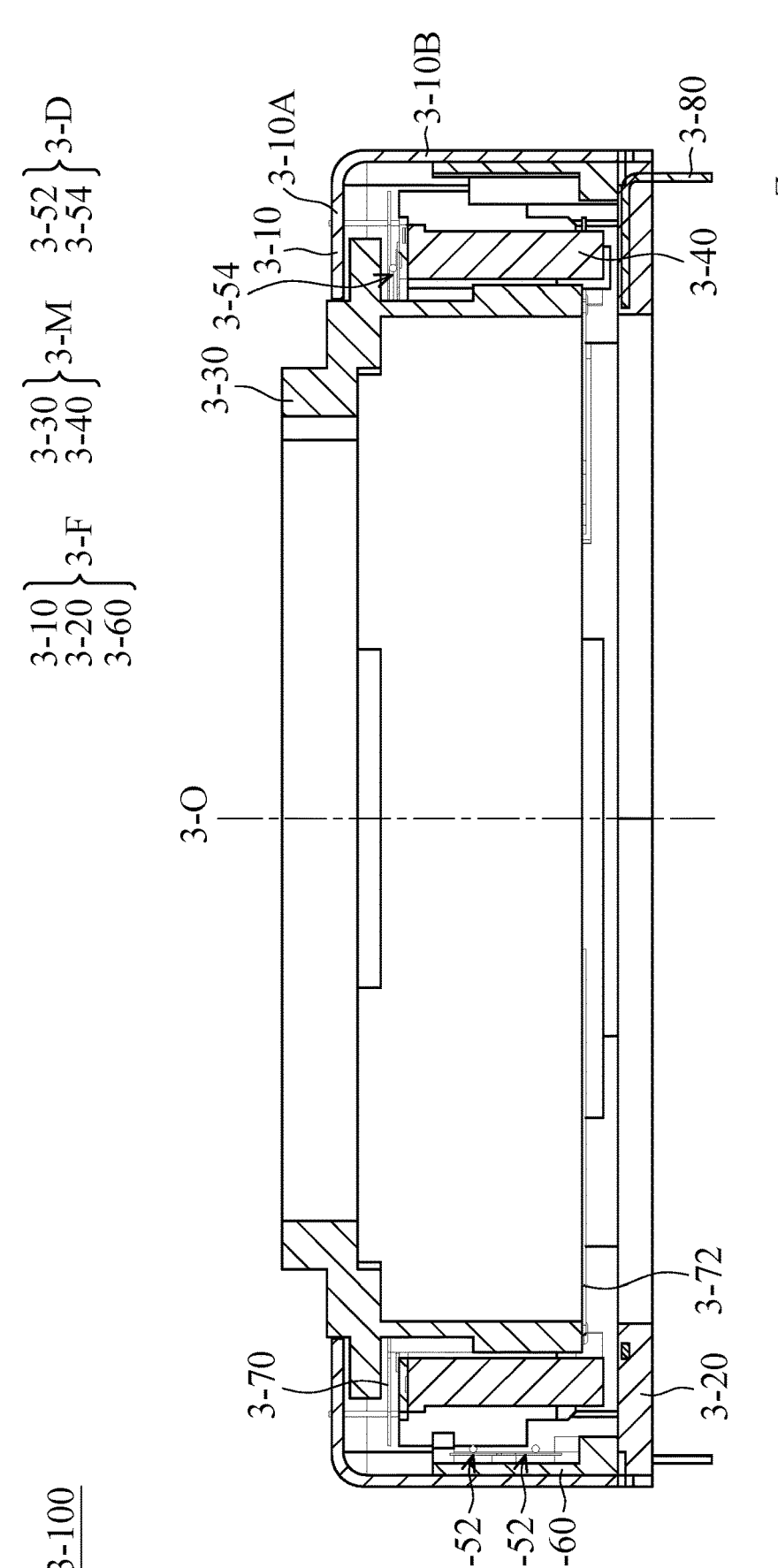
FIG. 19 is a cross-sectional view of the optical element driving mechanism.
Figure 20A:
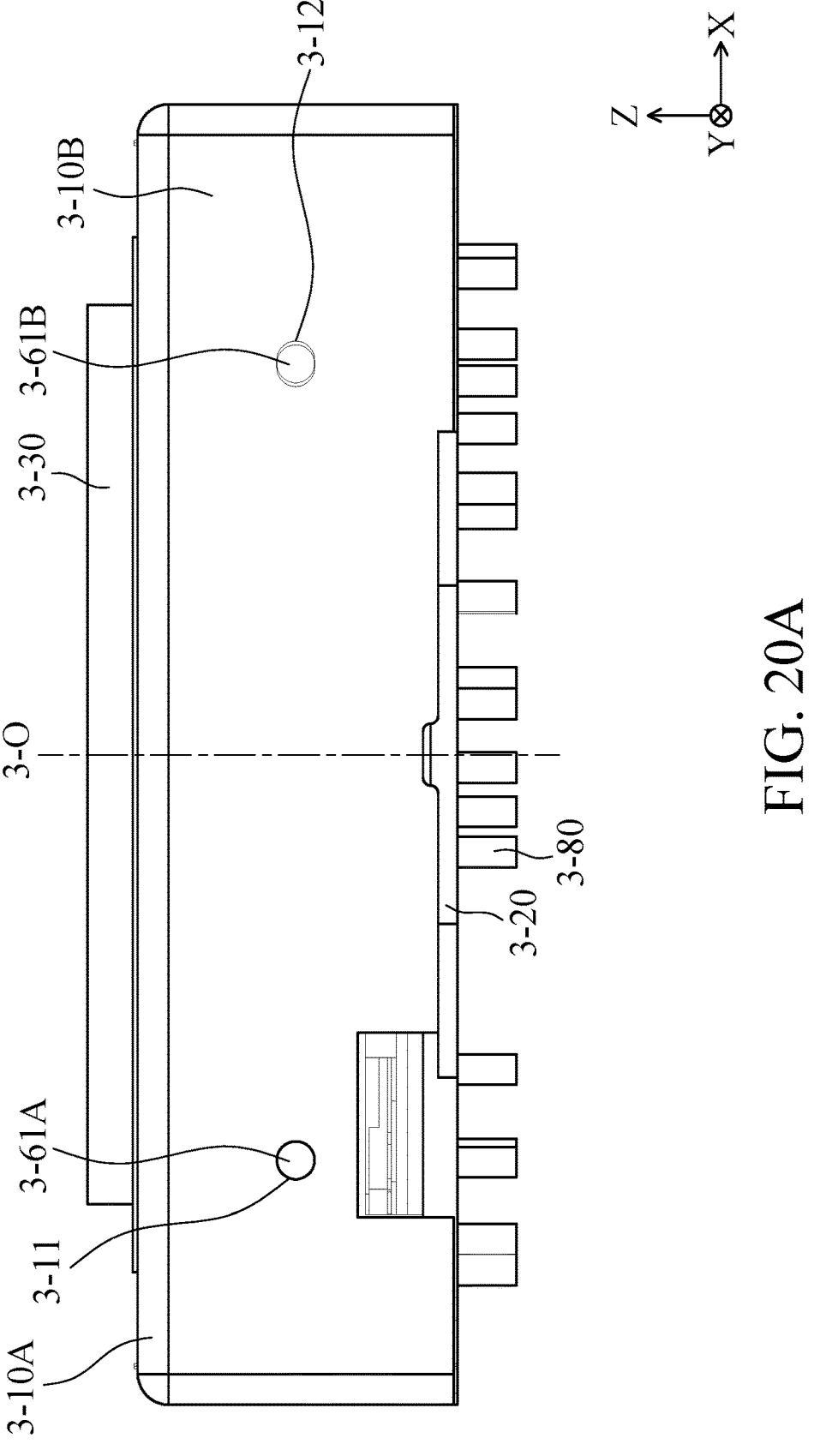
FIG. 20A is a side view of the optical element driving mechanism.
Figure 20B:
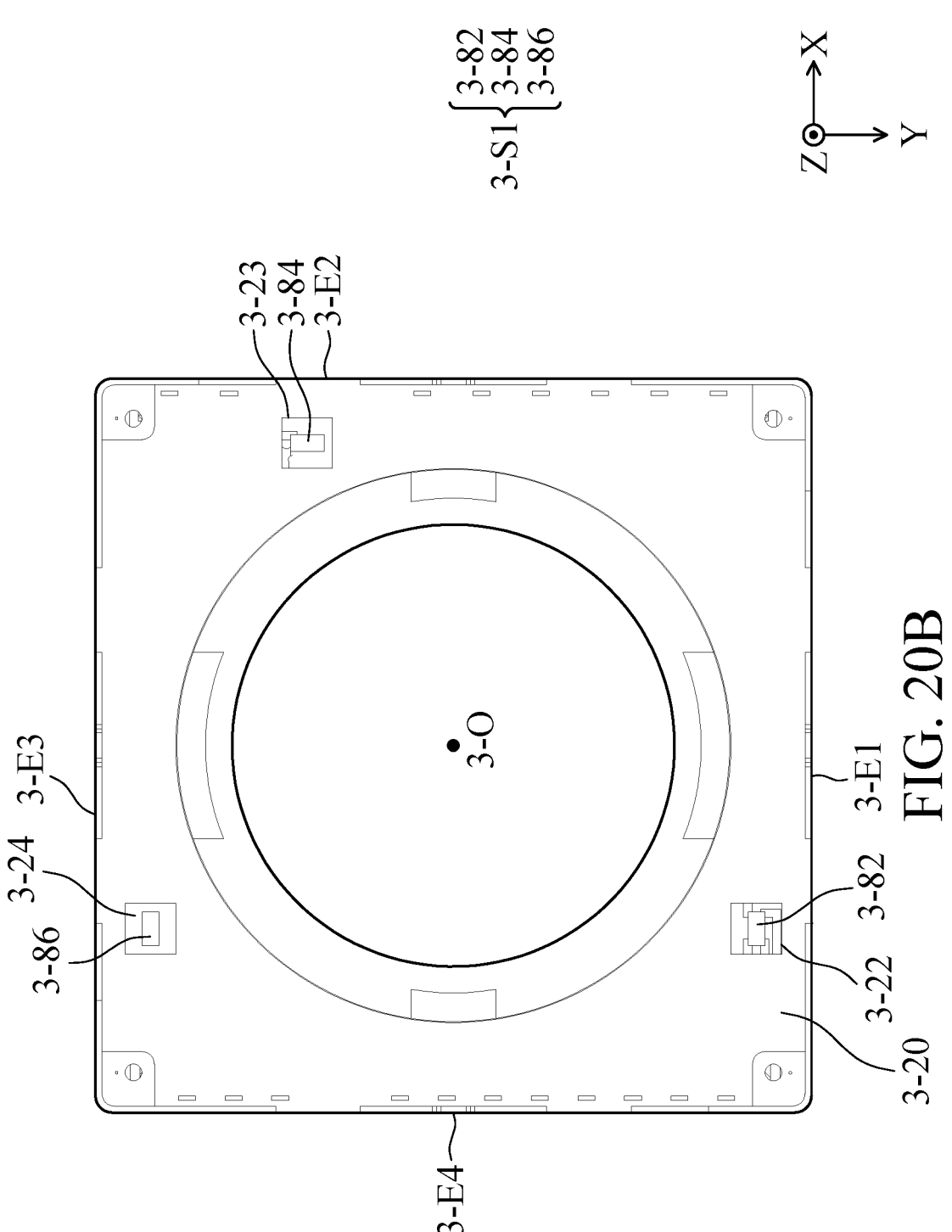
FIG. 20B is a bottom view of the optical element driving mechanism.

Refer to FIG. 17 to FIG. 20B. FIG. 17 is a schematic view of an optical element driving mechanism 3-100 in some embodiments of the present disclosure. FIG. 18 is an exploded view of the optical element driving mechanism 3-100. FIG. 19 is a cross-sectional view of the optical element driving mechanism 3-100. FIG. 20A is a side view of the optical element driving mechanism 3-100. FIG. 20B is a bottom view of the optical element driving mechanism 3-100.

As shown in FIG. 18, the optical element driving mechanism 3-100 may mainly include a case 3-10, a bottom 3-20, a holder 3-30, a frame 3-40, a driving element 3-52, a driving element 3-54, a base unit 3-60, a first resilient element 3-70, a second resilient element 3-72. The case 3-10, the bottom 3-20, and the base unit 3-60 may be called as a fixed portion 3-F. The holder 3-30 and the frame 3-40 may be called as a movable portion 3-M. The driving elements 3-52 and 3-54 may be called as a driving assembly 3-D.

The movable portion 3-M may use for holding an optical element (not shown) and is movable relative to the fixed portion 3-F. The optical element may be a lens, a mirror, a prism, a beam splitter, an aperture, a camera module, or a depth sensor. Furthermore, the driving assembly 3-D may drive the movable portion 3-M to move relative to the fixed portion 3-F. Therefore, the optical element may be driven by the optical element driving mechanism 3-100 to move in different directions, thereby achieving auto focus (AF) or optical image stabilization (OIS).

The case 3-10 and the bottom 3-20 may be combined to form a shell of the optical element driving mechanism 3-100. For example, the bottom 3-20 may be affixed on the case 3-10. It should be noted that a case opening and a bottom opening are formed on the case 3-10 and the bottom 3-20, respectively. The center of the case opening corresponds to an optical axis of the optical element. The base opening corresponds to an image sensor (not shown) disposed outside the optical element driving mechanism 3-100. Therefore, the optical element disposed in the optical element driving mechanism 3-100 may perform focus to the image sensor along the optical axis. Furthermore, when viewed along the main axis 3-O, the fixed portion 3-F has a polygonal structure.

The holder 3-30 has a through hole, and the optical element may be affixed in the through hole. The driving elements 3-52 are disposed between the frame 3-40 and the base unit 3-60, such as disposed on the base unit 3-60. The driving elements 3-54 are disposed between the holder 3-30 and the frame 3-40, such as disposed on the frame 3-40. However, the present disclosure is not limited thereto. For example, the driving element 3-54 may be disposed on the frame 3-40, or the driving element 3-54 may be disposed on the holder 3-30, depending on design requirement.

In this embodiment, the holder 3-60 and the optical element disposed therein are movably disposed in the frame 3-40. More specifically, the holder 3-60 may be connected to and suspended in the frame 3-40 by the first resilient element 3-70 and the second resilient element 3-72 made of a metal material, for example. When current is applied to the driving element 3-52, the driving element 3-52 will move the holder 3-30, the frame 3-40, and the optical element to move relative to the fixed portion 3-F in different directions to achieve optical image stabilization. When current is applied to the driving element 3-54, the driving element 3-54 will drive the holder 3-30 to move relative to the frame 3-40 along the main axis 3-O to achieve auto focus.

In some embodiments, additional circuits 3-80 may be provided on the bottom 3-20 and electrically connects to electronic elements disposed inside or outside the driving mechanism 3-100 for achieve auto focus or optical image stabilization.

The circuits 3-80 on the bottom 3-20 may transfer electrical signal to the driving elements 3-52, 3-54 through the first resilient element 3-70 or the second resilient element 3-72 to control the movement of the movable portion 3-M in X, Y, or Z directions.

The second resilient element 3-72 may be assembled with the circuits on the bottom 3-20 by soldering or laser welding to allow the driving elements 3-52 and 3-54 connecting to external circuits.

In some embodiments, the case 3-10 may include a top plate 3-10A and sidewalls 3-10B extending from the sides of the top plate 3-10A in the Z direction to the bottom 3-20. The base unit 3-60 may be affixed on the sidewall 3-10B, such as by an adhesive element (not shown). As shown in FIG. 20A, the sidewall 3-10B may include a first position structure 3-11 and a second position structure 3-12, which correspond to a third position structure 3-61A and a fourth position structure 3-61B of the base unit 3-60, respectively. For example, the first position structure 3-11 and the second position structure 3-12 may be openings, and the third position structure 3-61A and the fourth position structure 3-61B may protrude from the base unit 3-60 and in the first position structure 3-11 and the second position structure 3-12, respectively.

In some embodiments, the length of the first position structure 3-11 and the length of the second position structure 3-12 in the X direction are different. Therefore, a maximum gap between the first position structure 3-11 and the third position structure 3-61A is different from a maximum gap between the second position structure 3-12 and the fourth position structure 3-61B. For example, the length of the first position structure 3-11 in the X direction may be less than the length of the second position structure 3-12 in the X direction. Therefore, the maximum gap between the first position structure 3-11 and the third position structure 3-61A is greater than the maximum gap between the second position structure 3-12 and the fourth position structure 3-61B. In some embodiments, the adhesive element may be disposed in the first position structure 3-11 and the second position structure 3-12, and in direct contact with the third position structure 3-61A and the fourth position structure 3-61B. Therefore, the relative position of the case 3-10 and the base unit 3-60 may be affixed. In some embodiments, the adhesive element may be glue.

In some embodiments, as shown in FIG. 20B, a first position sensor 3-82, a second position sensor 3-84, and a third position sensor 3-86 may be disposed in the optical element driving mechanism 3-100, and corresponding magnetic elements (not shown) may be disposed on the movable portion 3-M. For example, the bottom 3-20 may have openings 3-22, 3-23, 3-24, and the first position sensor 3-82, the second position sensor 3-84, and the third position sensor 3-86 may be disposed in the openings 3-22, 3-23, 3-24, respectively. Therefore, the movement of the movable portion 3-M relative to the fixed portion 3-F in different dimensions may be detected. For example, the movement of the frame 3-40 relative to the fixed portion 3-F may be detected. In some embodiments, the first position sensor 3-82, the second position sensor 3-84, and the third position sensor 3-86 may be called as a first position sensing assembly 3-S1.

The first position sensor 3-82, the second position sensor 3-84, and the third position sensor 3-86 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the first position sensor 3-82 may be used to detect the movement of the frame 3-40 relative to the fixed portion 3-F in a first dimension, the second position sensor 3-84 may be used to detect the movement of the frame 3-40 relative to the fixed portion 3-F in a second dimension, the third position sensor 3-86 may be used to detect the movement of the frame 3-40 relative to the fixed portion 3-F in a third dimension. In some embodiments, the movement in the first dimension may be a movement in an eighth direction (e.g. X direction), the movement in the second dimension may be a movement in a ninth direction (e.g. Y direction), the movement in the third dimension may be a movement in a tenth direction (e.g. Y direction). In some embodiments, the eighth direction may be not parallel to the ninth direction or the tenth direction, and the ninth direction may be parallel to the tenth direction.

Moreover, the first position sensing assembly 3-S1 may be used for detecting the movement of the movable portion 3-M relative to the fixed portion 3-F. For example, the movement in the fourth dimension may be a rotation relative to an axis extending in a eleventh direction (the extending direction of the main axis 3-O). In other words, the movement in the fourth dimension may be the rotation where the rotational axis is the main axis 3-O. It should be noted that the eleventh direction (e.g. the Z direction) may be not parallel to the eighth direction (e.g. the X direction). For example, the eleventh direction may be perpendicular to the eighth direction. The eleventh direction may be not parallel to the ninth direction (e.g. the Y direction). For example, the eleventh direction may be perpendicular to the ninth direction. The eleventh direction may be not parallel to the tenth direction (e.g. the Y direction). For example, the eleventh direction may be perpendicular to the tenth direction.

As shown in FIG. 20B, when viewed along the main axis 3-O, the fixed portion has a first edge 3-E1, a second edge 3-E2, a third edge 3-E3, and a fourth edge 3-E4. The first position sensor 3-82 is at the first edge 3-E1, the second position sensor 3-84 is at the second edge 3-E2, and the third position sensor 3-86 may at the first edge 3-E1 or the third edge 3-E3. For example, the third position 3-86 may be disposed at the third edge 3-E3 in FIG. 20B, but it is not limited thereto. In other embodiments, the third position sensor 3-86 may be disposed at the first side 3-E1. The movement of the movable portion 3-M relative to the fixed portion 3-F in the fourth dimension may be detected by the first position sensor 3-82, the second position sensor 3-84, and the third position sensor 3-86. In some embodiments, the movement of the movement of the movable portion 3-M relative to the fixed portion 3-F in the first dimension may be detected by the first position sensor 3-82 and the second position sensor 3-84 of the first position sensing assembly 3-S1 to achieve more accurate result.

Figure 21A:
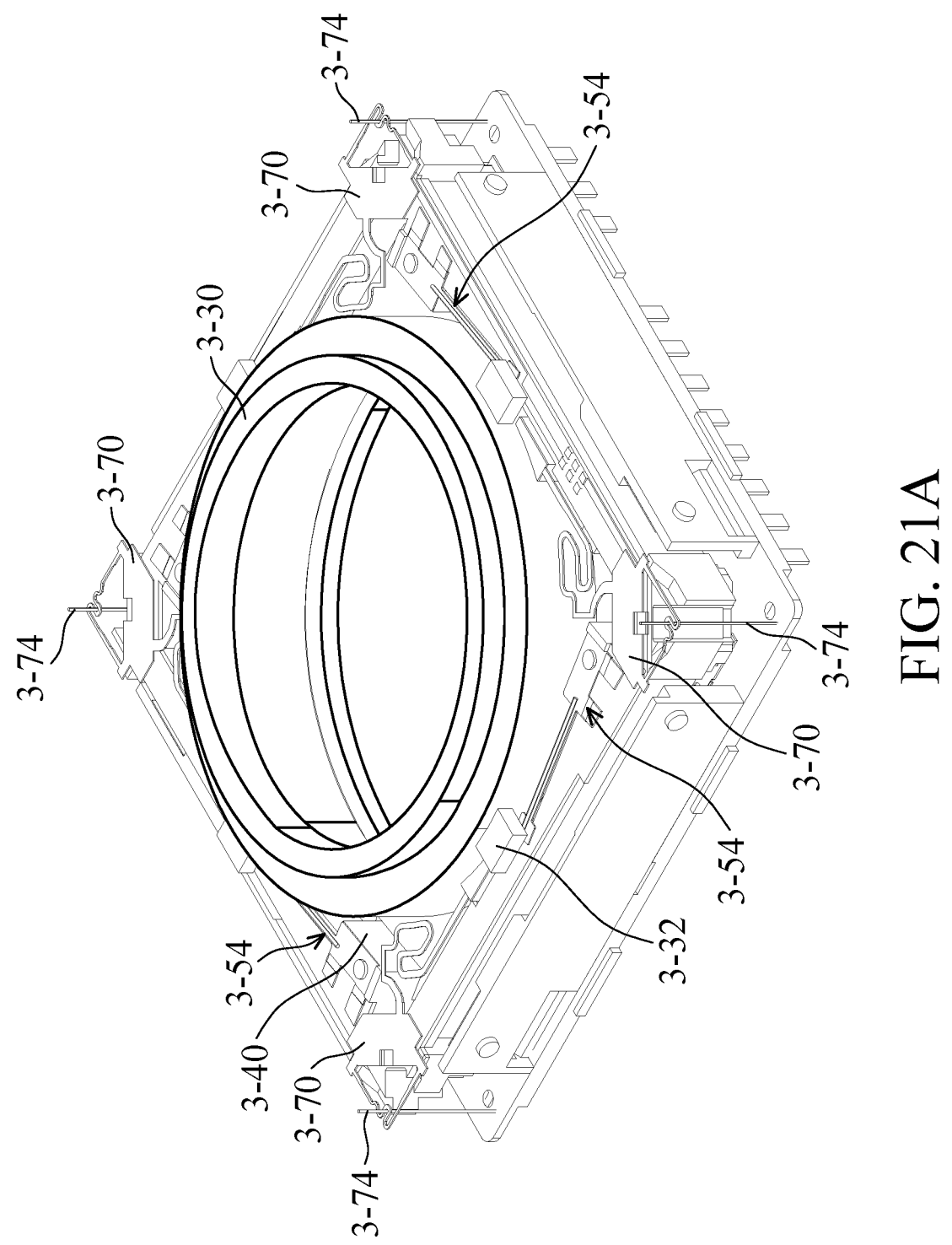
FIG. 21A is a schematic view of the optical element driving mechanism, wherein the case is omitted.
Figure 21B:
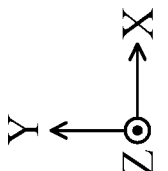
FIG. 21B is a top view of FIG. 21A.
Figure 21C:
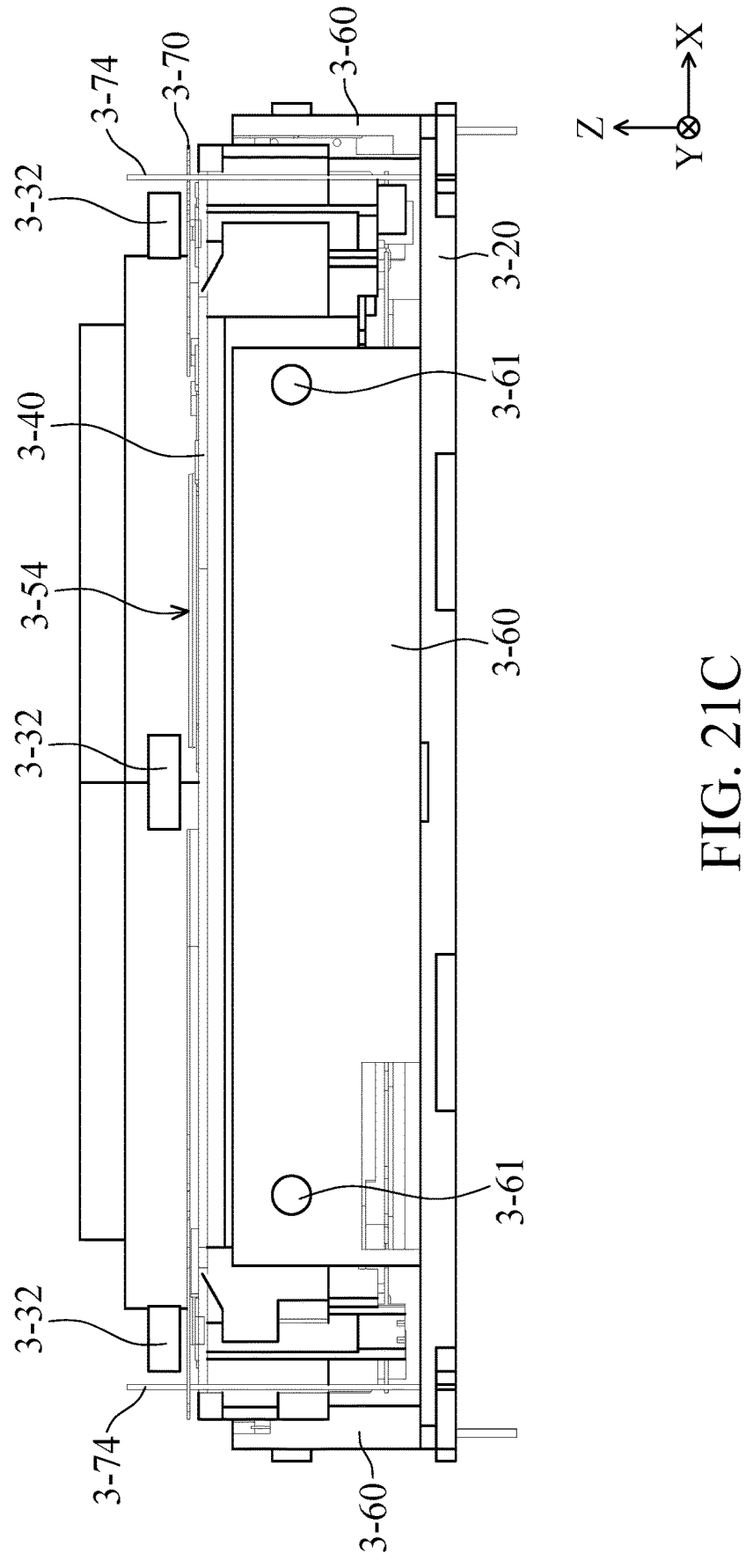
FIG. 21C is a side view of FIG. 21A.
Figure 21D:
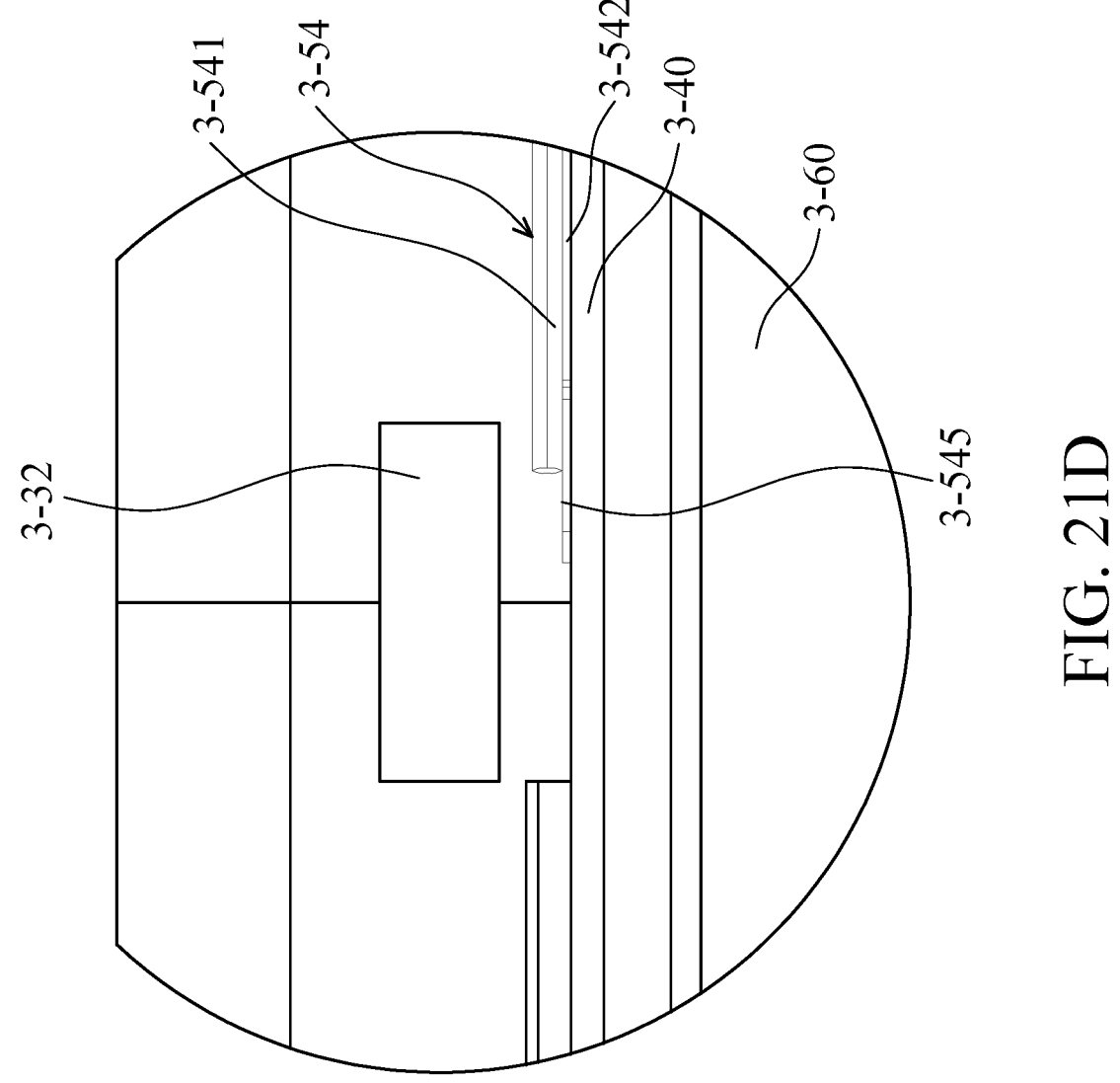
FIG. 21D is an enlarged view of FIG. 21C.

FIG. 21A is a schematic view of the optical element driving mechanism 3-100, wherein the case 3-10 is omitted. FIG. 21B is a top view of FIG. 21A. FIG. 21C is a side view of FIG. 21A. FIG. 21D is an enlarged view of FIG. 21C. The optical element driving mechanism 3-100 may further include third resilient elements 3-74 at the corners of the optical element driving mechanism 3-100. The third resilient elements 3-74 are used for movably connect the frame 3-40 and the fixed portion 3-F, so the frame 3-40 and the movable portion 3-30 disposed in the frame 3-40 may be suspended in the fixed portion 3-F. Moreover, the third resilient element 3-74 may in direct contact with the first resilient element 3-70 and the circuit 3-80 to allow the driving element 3-54 electrically connected to external environment through the first resilient element 3-70, the third resilient element 3-74, and the circuit 3-80.

As shown in FIG. 21B, when viewed along the main axis 3-O, the fixed portion 3-F is polygonal, and the third resilient element 3-74 may at the corners of the fixed portion 3-F and electrically connected to the circuit disposed in the bottom 3-20, and electrically connected to the first resilient element 3-70. Moreover, the first resilient element 3-70 may be plate-shaped, the third resilient element 3-74 may be linear-shaped, and the extension direction of the third resilient element 3-74 (the Z direction) may be parallel to the thickness direction of the first resilient element 3-70 (the Z direction).

Furthermore, the holder 3-30 may have extending portions 3-32 that extends from the radial external surface of the holder 3-30 along a direction that is perpendicular to the main axis 3-O. Moreover, as shown in FIG. 21B to FIG. 21D, the extending portion 3-32 at least overlaps a portion of the driving element 3-54 in a direction that the main axis 3-O extends. For example, the extending portion 3-32 and the contact unit 3-545 may arranged in the direction that the main axis 3-O extends. Therefore, the extending portion 3-32 may be pushed by the driving element 3-54 to allow the holder 3-30 moving in the direction that the main axis 3-O extends to achieve auto focus. How the extending portion 3-32 is pushed by the driving element 3-54 will be described later. Moreover, in the direction that the main axis 3-O extends, the driving element 3-54 may be not overlap the first resilient element 3-70 to reduce the size of the optical element driving mechanism 3-100 in the Z direction, so miniaturization may be achieved.

Figure 21E:
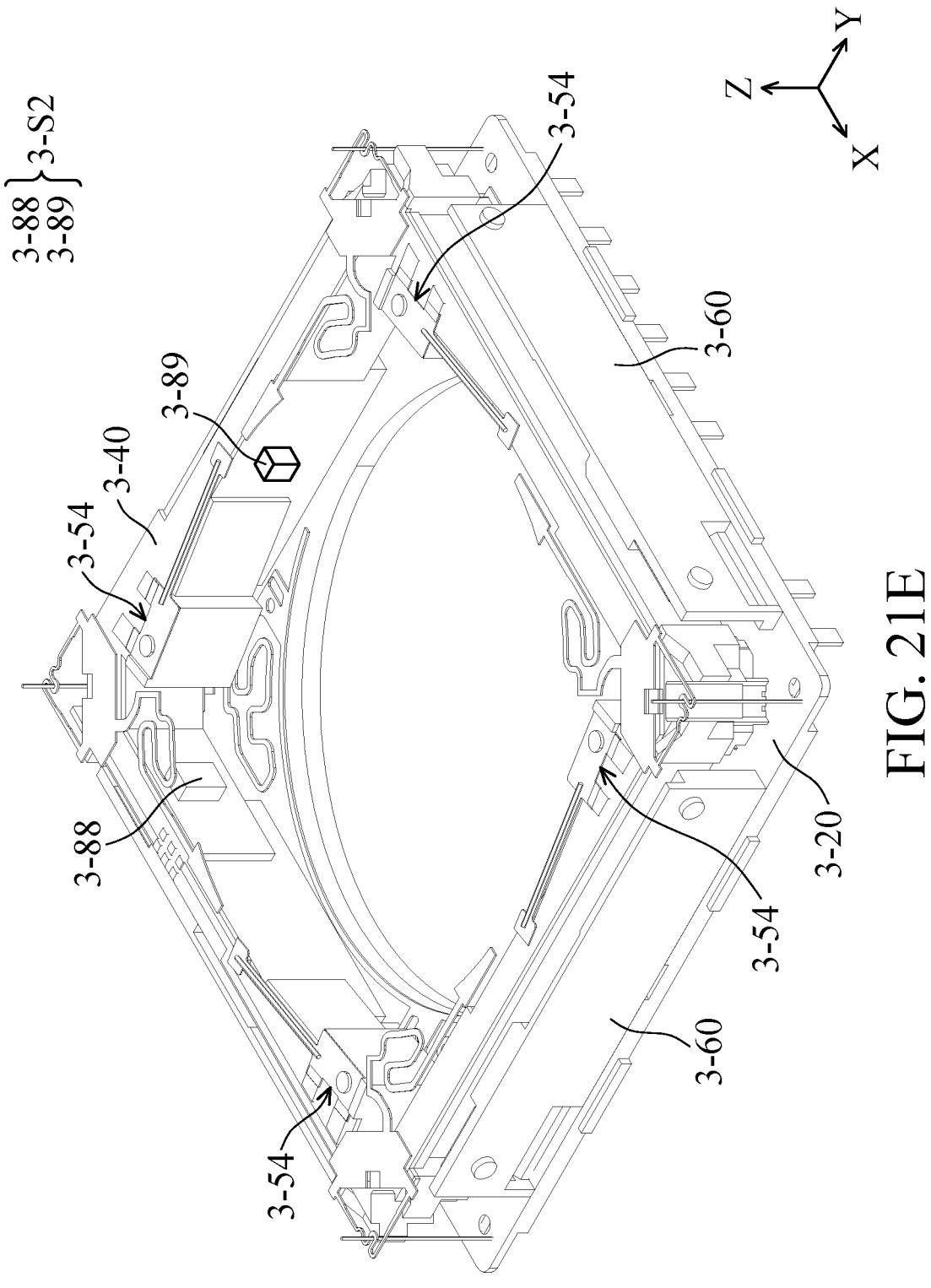
FIG. 21E is a schematic view of the elements in FIG. 21A, wherein the holder is omitted.

FIG. 21E is a schematic view of the elements in FIG. 21A, wherein the holder 3-30 is omitted. As shown in FIG. 21E, the optical element driving mechanism 3-100 may further includes a second position sensing assembly 3-S2. The second position sensing assembly 3-S2 may include a fourth position sensor 3-88 and a fifth position sensor 3-89 disposed on the frame 3-40, and corresponding magnetic elements (not shown) disposed on the holder 3-30. Therefore, when the holder 3-30 moves relative to the frame 3-40, the fourth position sensor 3-88 and the fifth position sensor 3-89 may detect the magnetic field variation of the magnetic element disposed on the holder 3-30 when the holder 3-30 is moving, so the movement of the holder 3-30 relative to the frame 3-40 may be detected.

In other words, the second position sensing assembly 3-S2 may be used for detecting the movement of the holder 3-30 relative to the frame 3-40. For example, the second position sensing assembly 3-S2 may be used for detecting the movement of the holder 3-30 relative to the frame 3-40 in a fifth dimension. It should be noted that the movement of the fifth dimension may be the movement in a twelfth direction (e.g. the Z direction). The twelfth direction may be not parallel to the eighth direction (e.g. the X direction), or the twelfth direction may be perpendicular to the eighth direction. The twelfth direction may be not parallel to the ninth direction (e.g. the Y direction), or the twelfth direction may be perpendicular to the ninth direction. The twelfth direction may be not parallel to the tenth direction (e.g. the Y direction), or the twelfth direction may be perpendicular to the tenth direction. The twelfth direction may be parallel to the eleventh direction (e.g. the Z direction). Moreover, as shown in FIG. 21E, at least a portion of the first resilient element 3-70 is affixed on the base unit 3-60.

Figure 21F:
FIG. 21F is a schematic view of a first position sensor, a second position sensor, a third position sensor, and a fourth position sensor in the optical element driving mechanism.
Figure 21F:
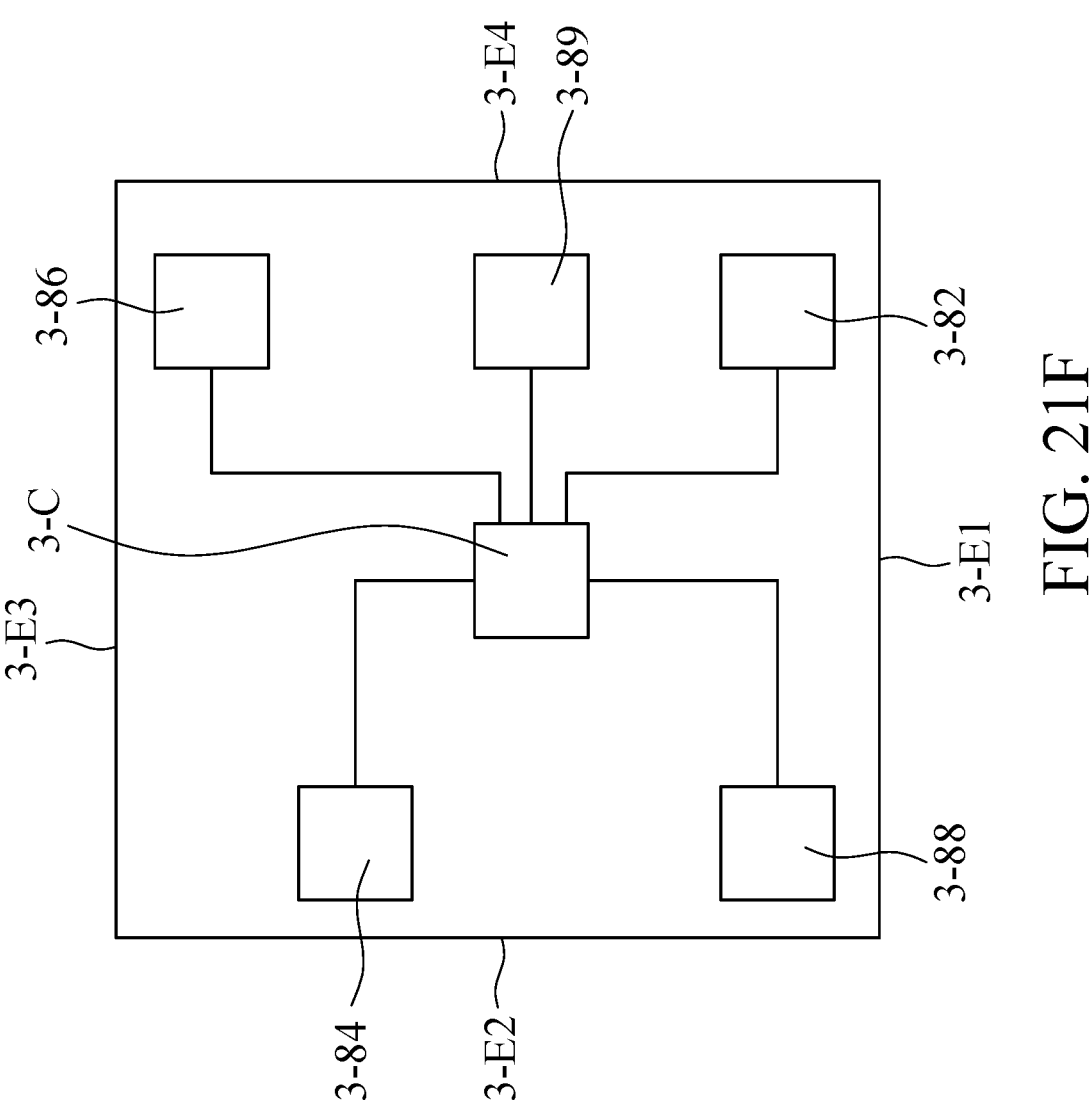

FIG. 21F is a schematic view of the first position sensor 3-82, the second position sensor 3-84, the third position sensor 3-86, the fourth position sensor 3-88, and the fifth position sensor 3-89. When viewed in the direction that the main axis 3-O extends, as shown in FIG. 21F, the fourth position sensor 3-88 of the second position sensing assembly 3-S2 is at a corner of the fixed portion 3-F, wherein the corner is formed by the first edge 3-E1 and the second edge 3-E2. Moreover, when viewed in the direction that the main axis 3-O extends, the second position sensing assembly 3-S2 (the fourth position sensor 3-88 and the fifth position sensor 3-89) does not overlap the first position sensing assembly 3-S1 (the first position sensor 3-82, the second position sensor 3-84, and the third position sensor 3-86). Therefore, magnetic interference between the position sensors and their corresponding magnetic elements may be prevented, so the accuracy may be enhanced.

Figure 22A:
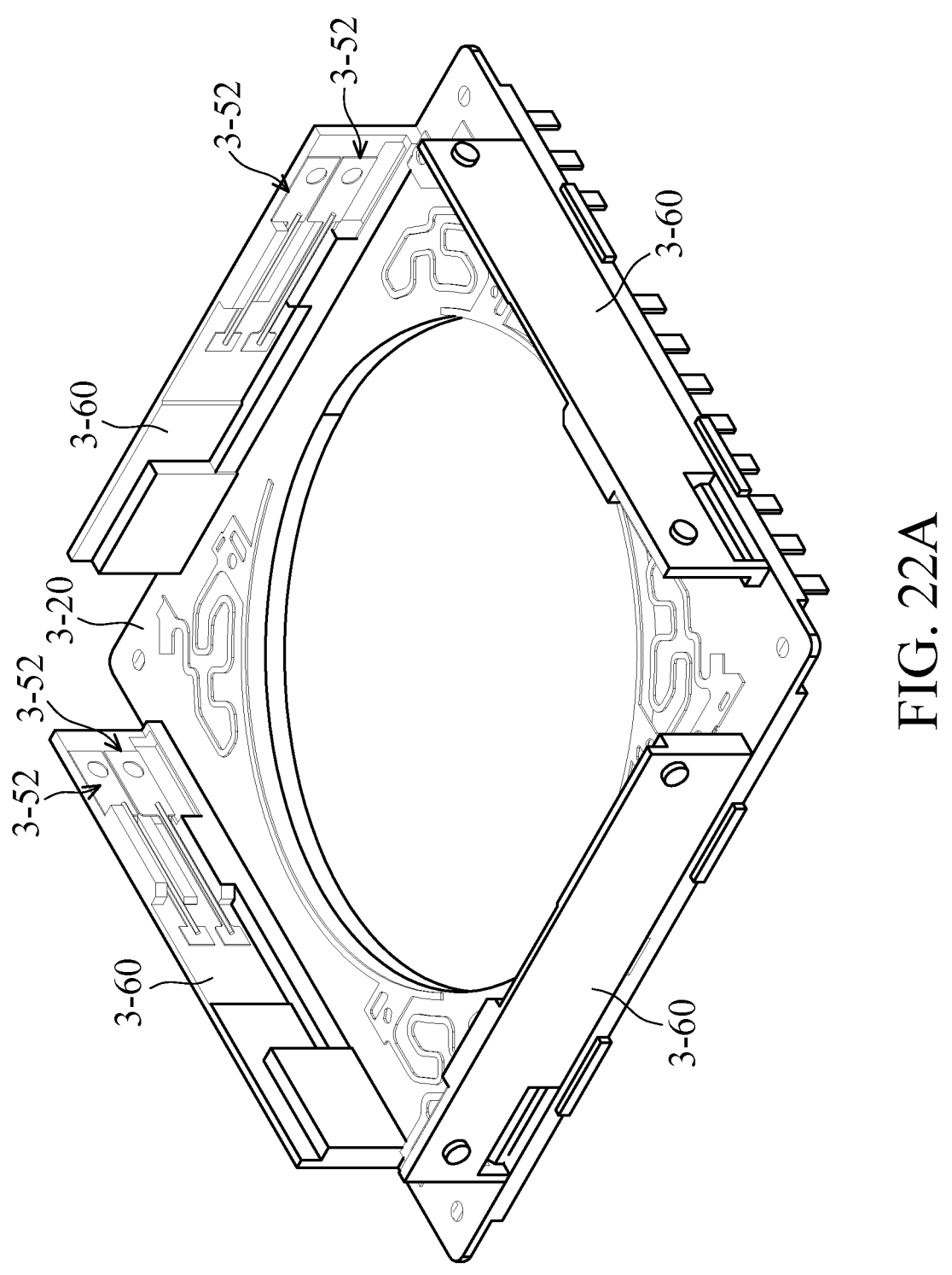
FIG. 22A is a schematic view of some elements of the optical element driving mechanism.
Figure 22B:
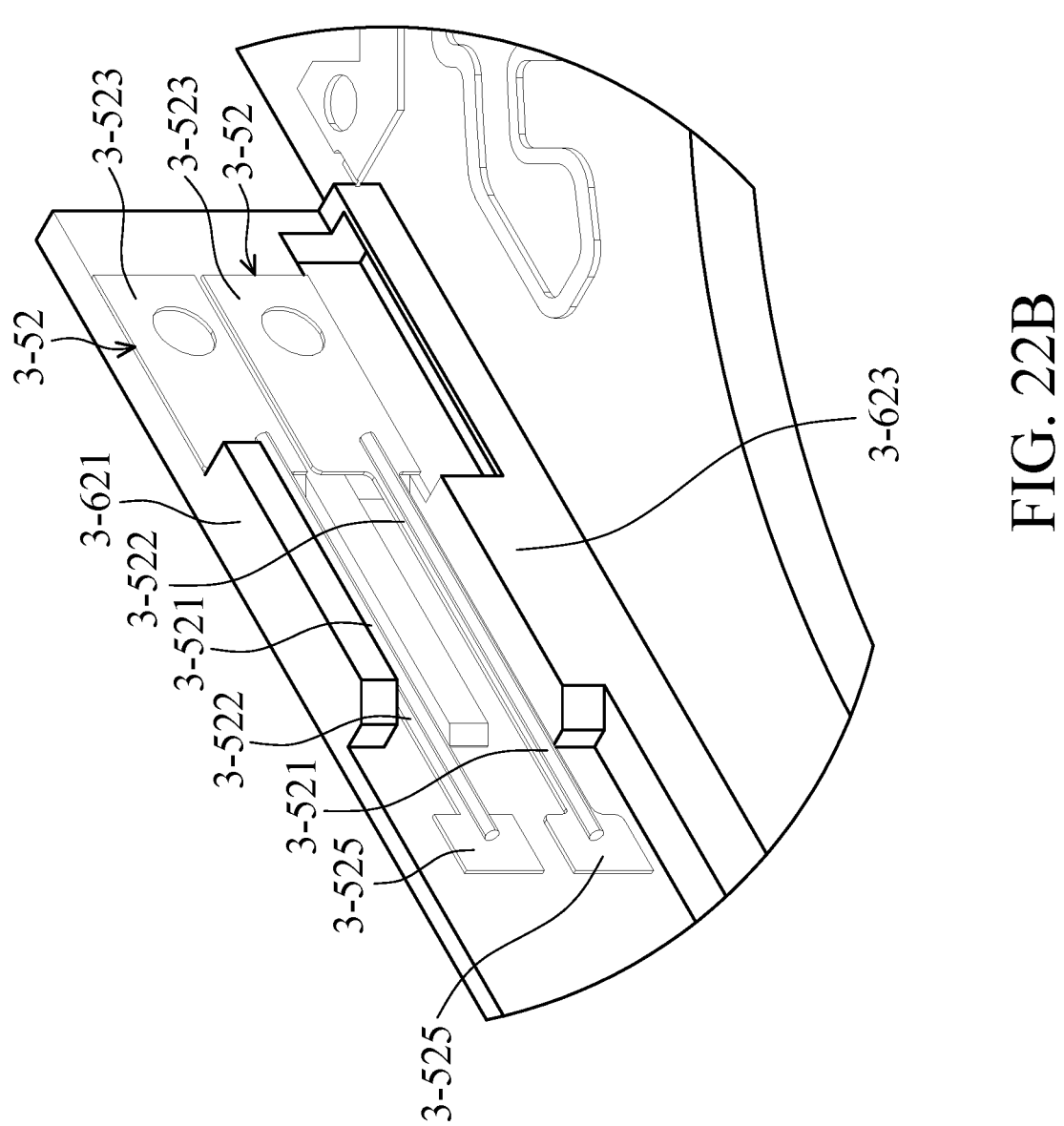
FIG. 22B is an enlarged view of FIG. 22A.
Figure 22C:
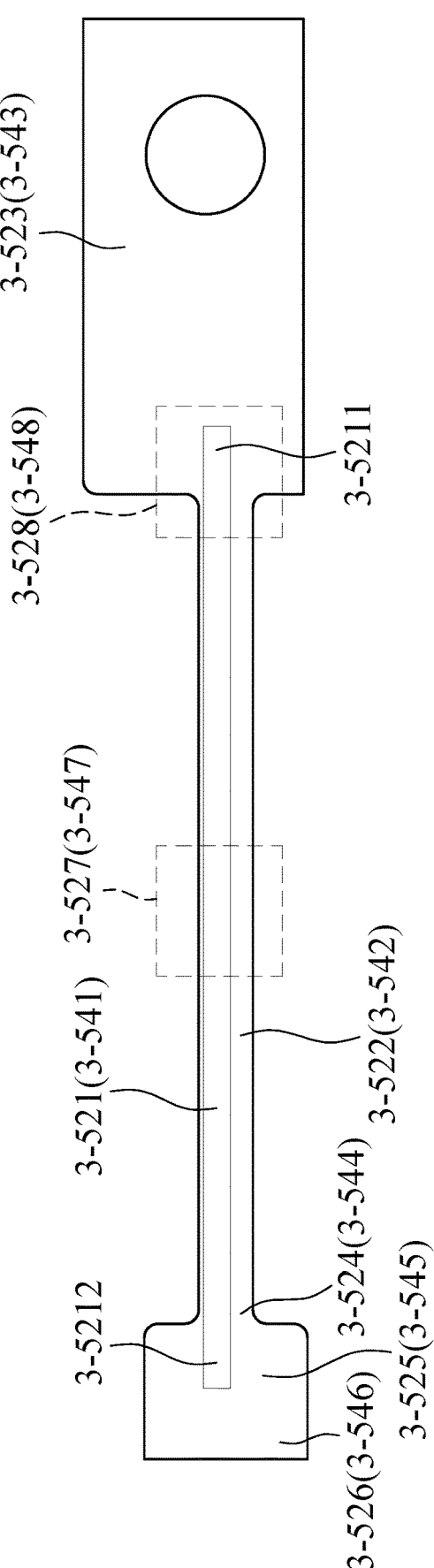
FIG. 22C is a schematic view of a driving element.

FIG. 22A is a schematic view of some elements in the optical element driving mechanism 3-100, FIG. 22B is an enlarged view of FIG. 22A, and FIG. 22C is a schematic view of the driving element 3-52 or 3-54. In some embodiments, as shown in FIG. 22A and FIG. 22B, the optical element driving mechanism 3-100 may have the driving element 3-52 on one of the base units 3-60, and more than one driving elements 3-52 may be disposed on the base unit 3-60 to movement in different direction. For example, the base unit 3-60 may have stopping portions 3-621 and 3-623 (the stopping elements of the stopping assembly) protruding to the frame 3-40 and extending in an extending direction of the driving element 3-52. The driving element 3-52 may be disposed between the stopping portions 3-621 and 3-623. In other words, the driving element 3-52 is surrounded by the stopping portions 3-621 and 3-623 to prevent the driving element 3-52 from being collided.

It should be noted that the stopping portions 3-621 and 3-623 (stopping assembly) are affixed on the base unit 3-60, the base unit 3-60 may be plate-shaped, and the material of the base unit 3-60 may include plastic. When viewed in the thickness direction of the base unit 3-60, the base unit 3-60 may be polygonal (e.g. rectangular), and the stopping portions 3-621 and 3-623 may be position at different edges of the base unit 3-60.

As shown in FIG. 22C, the driving element 3-52 may include a driving unit 3-521, a resilient unit 3-522, a connecting unit 3-523, a buffer unit 3-524, a contact unit 3-525, a contact portion 3-526, and vibration preventing units 3-527 and 3-528. The driving element 3-54 may include a driving unit 3-541, a resilient element 3-542, a connecting unit 3-543, a buffer unit 3-544, a contact unit 3-545, a contact portion 3-546, and vibration preventing units 3-547 and 3-548.

In some embodiments, the material of the driving unit 3-521 may include shape memory alloy (SMA). The driving unit 3-521 may be strip-shaped and extend in a direction. Shape memory alloy is an alloy material that can eliminate a deformation at a lower temperature and restore its original shape before deformation after heating. For example, when the shape memory alloy is subjected to a limited plastic deformation at a temperature lower than the phase transition temperature, the shape of the shape memory alloy may be restored to the original shape by heating.

In some embodiments, when a signal (e.g. voltage or current) is provided to the driving unit 3-521, the temperature may be increased by the thermal effect of a current, so that the length of the driving unit 3-521 may be decreased. On the contrary, if a signal having a lower intensity is provided which makes the heating rate lower than the heat dissipation rate of environment, the temperature of the driving unit 3-521 may be decreased, and the length may be increased.

The driving unit 3-521 may have an end 3-5211 affixed on the connecting unit 3-523 and an end 3-5212 affixed on the contact unit 3-525, and the resilient unit 3-522 is resilient, such as may include metal. Therefore, when the driving unit 3-521 is shrinking, the resilient unit 3-522 may be bent by the driving unit 3-521. Moreover, the driving unit 3-521 and the resilient unit 3-522 may include metal, so the driving unit 3-521 may be electrically connected to the resilient unit 3-522, and the heat generated by the driving unit 3-521 may be dissipated by the resilient unit 3-522. The connecting unit 3-523 may be affixed on the fixed portion 3-F, such as affixed on the base unit 3-60, and the driving element 3-52 may be electrically connected to external environment by the connecting unit 3-523. It should be noted that as shown in FIG. 22B, in the direction that the main axis 3-O extends (FIG. 21B) and in a first direction that the driving unit 3-521 extends, the driving unit 3-521 of the driving element 3-52 at least overlaps a portion of the stopping portions 3-621 and 3-623.

The contact unit 3-525 may be movably connected to the resilient unit 3-521 through the buffer unit 3-524. For example, the buffer unit 3-524 may be a connection point of the resilient unit 3-522 and the contact unit 3-525, and the buffer unit 3-524 may be bent. The resilient unit 3-522 may be strip-shaped, and the contact unit 3-525 may be rectangular or arc-shaped. However, the present disclosure is not limited thereto, and the units may have different directions. The contact unit 3-525 may be used for in contact with the movable portion 3-M (e.g. the frame 3-40) or the fixed portion 3-F (e.g. the base unit 3-60). When the shape of the driving unit 3-521 is changing (e.g. shrinking), the shape of the resilient unit 3-522 may be changed accordingly (e.g. bending), so the contact unit 3-525 will be moved. In some embodiments, the material of the contact unit 3-525 may include metal, such as the resilient unit 3-522, the buffer unit 3-524, and the contact unit 3-525 may be formed as one piece, i.e. having an identical material.

In some embodiments, the contact unit 3-525 further includes a contact portion 3-526 at an end of the contact unit 3-525 that is away from the resilient unit 3-522. Although the contact portion 3-526 is illustrated as one piece, the present disclosure is not limited thereto. For example, in some embodiments, the contact 3-525 may include a plurality of contact portions 3-526, and the contact portions 3-526 may be separated from each other, and connected to each other by the contact unit 3-525. In other words, the contact unit 3-525 and the plurality of contact portions 3-526 may be formed as one piece.

In some embodiments, the vibration preventing unit 3-527 may be disposed between the driving unit 3-521 and the resilient unit 3-522, such as disposed between the center of the driving unit 3-521 and the center of the resilient unit 3-522. The vibration preventing unit 3-528 may be disposed on the end 3-5211 of the driving unit 3-521, and the vibration preventing units 3-527 and 3-528 may be in direct contact with the driving unit 3-521 and the resilient unit 3-522 to absorb the vibration generated by the deformation of the driving unit 3-521 and the resilient unit 3-522, so the driving unit 3-521 and the resilient unit 3-522 may be prevented from being damaged.

In some embodiments, the material of the vibration preventing units 3-527 or 3-528 may include soft resin. In other words, the Young's modulus of the vibration preventing units 3-527 or 3-528 may be less than the Young's modulus of the base unit 3-60.

The structures and functions of the driving unit 3-541, the resilient unit 3-542, the connecting unit 3-543, the buffer unit 3-544, the contact unit 3-545, the contact portion 3-546, the vibration preventing units 3-547 and 3-548 of the driving unit 3-54 are respectively similar or identical to the structures and functions of the driving unit 3-521, the resilient unit 3-522, the connecting unit 3-523, the buffer unit 3-524, the contact unit 3-525, the contact portion 3-526, the vibration preventing units 3-527 and 3-528 of the driving unit 3-24, and are not repeated again.

Figure 22D:
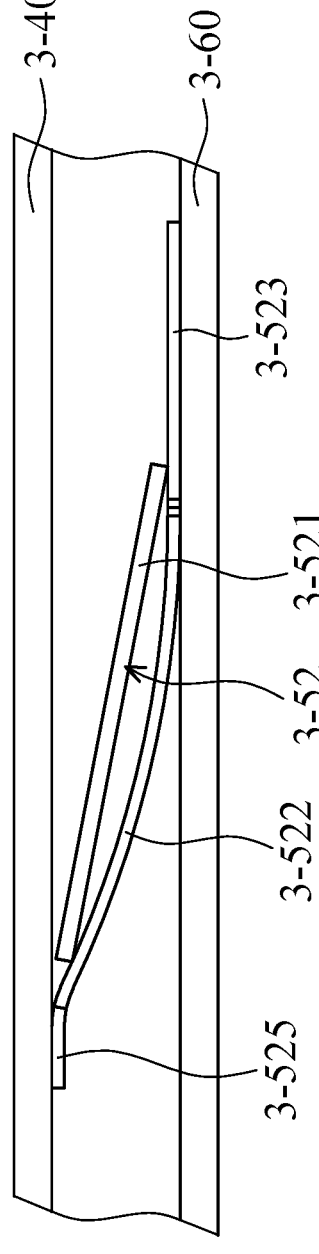
FIG. 22D is a schematic view when the frame is pushed by the driving element relative to a base unit.
Figure 22E:
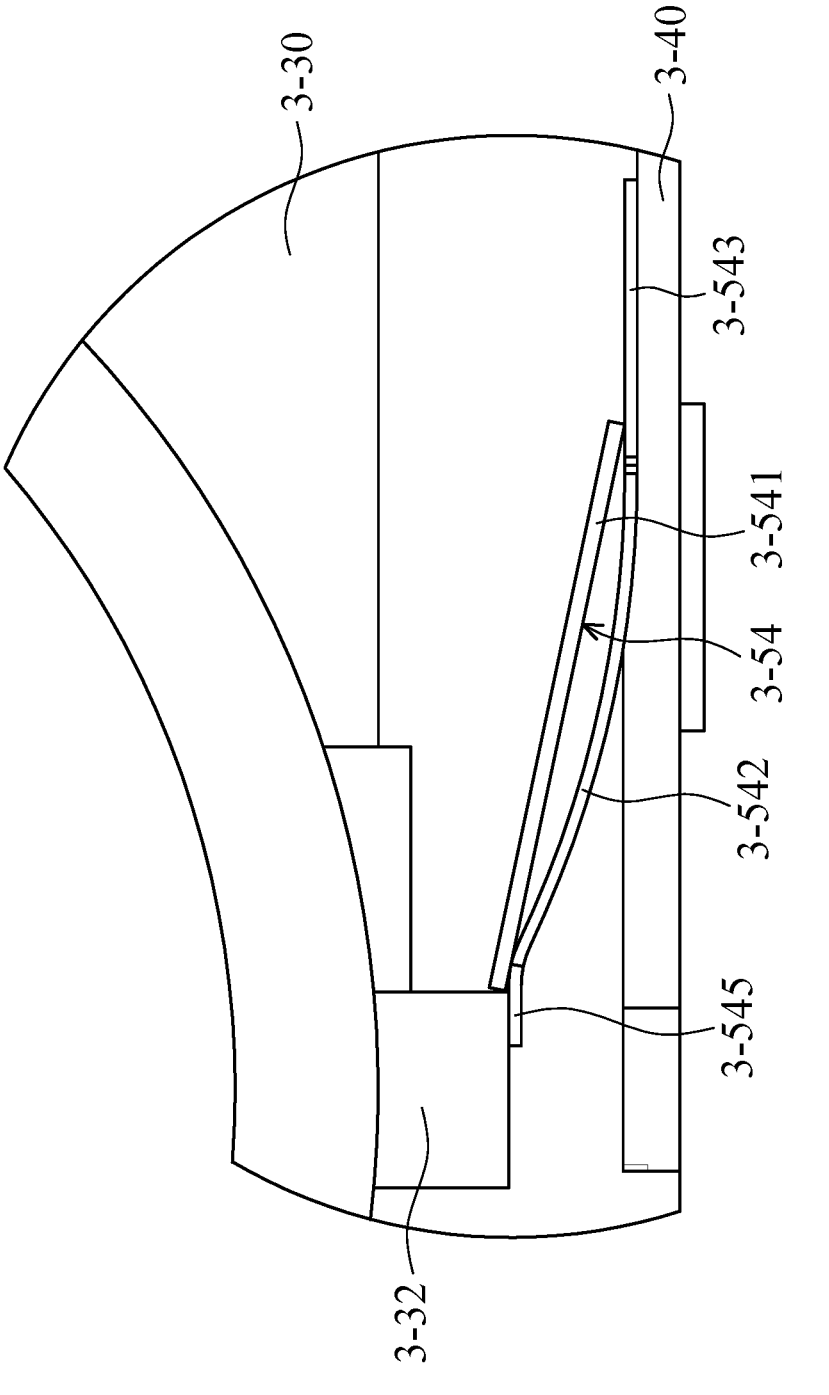
FIG. 22E is a schematic view when the holder is pushed by the driving element relative to the frame.

FIG. 22D is a schematic view when the frame 3-40 is pushed by the driving element 3-52 relative to a base unit 3-60. FIG. 22E is a schematic view when the holder 3-30 is pushed by the driving element 3-54 relative to the frame 3-40. As shown in FIG. 22D, when the driving unit 3-521 of the driving element 3-52 is shrinking, the resilient unit 3-522 may be deformed accordingly. The connecting unit 3-523 is affixed on the base unit 3-60, so only the contact unit 3-525 may be moved by the driving unit 3-521, such as moves to the frame 3-40. When the contact unit 3-525 is moved to in contact with the frame 3-40, a driving force may be applied to the frame 3-40 by the contact unit 3-525. The direction of the driving force (from the base unit 3-60 to the frame 3-40) is different from the extension direction of the driving unit 3-521 when the driving unit 3-521 is static. For example, if the driving unit 3-521 extends in the X direction when static, the direction of the driving force may be the Y direction that is perpendicular to the X direction to allow the frame 3-40 moving in the Y direction.

As shown in FIG. 22E, when the driving unit 3-541 of the driving element 3-54 is shrinking, the resilient unit 3-542 may be deformed accordingly. The connecting unit 3-543 is affixed on the frame 3-40, so only the contact unit 3-545 may be moved by the driving unit 3-541, such as moves to the extending portion 3-32 of the holder 3-30. When the contact unit 3-545 is moved to in contact with the extending portion 3-32, a driving force may be applied to the holder 3-30 by the contact unit 3-545. The direction of the driving force (from the frame 3-40 to the extending portion 3-32) is different from the extension direction of the driving unit 3-541 when the driving unit 3-541 is static. For example, if the driving unit 3-541 extends in a direction on the XY plane when static, the direction of the driving force may be the Z direction that is perpendicular to this direction to allow the holder 3-30 moving in the Z direction.

Figure 22F:
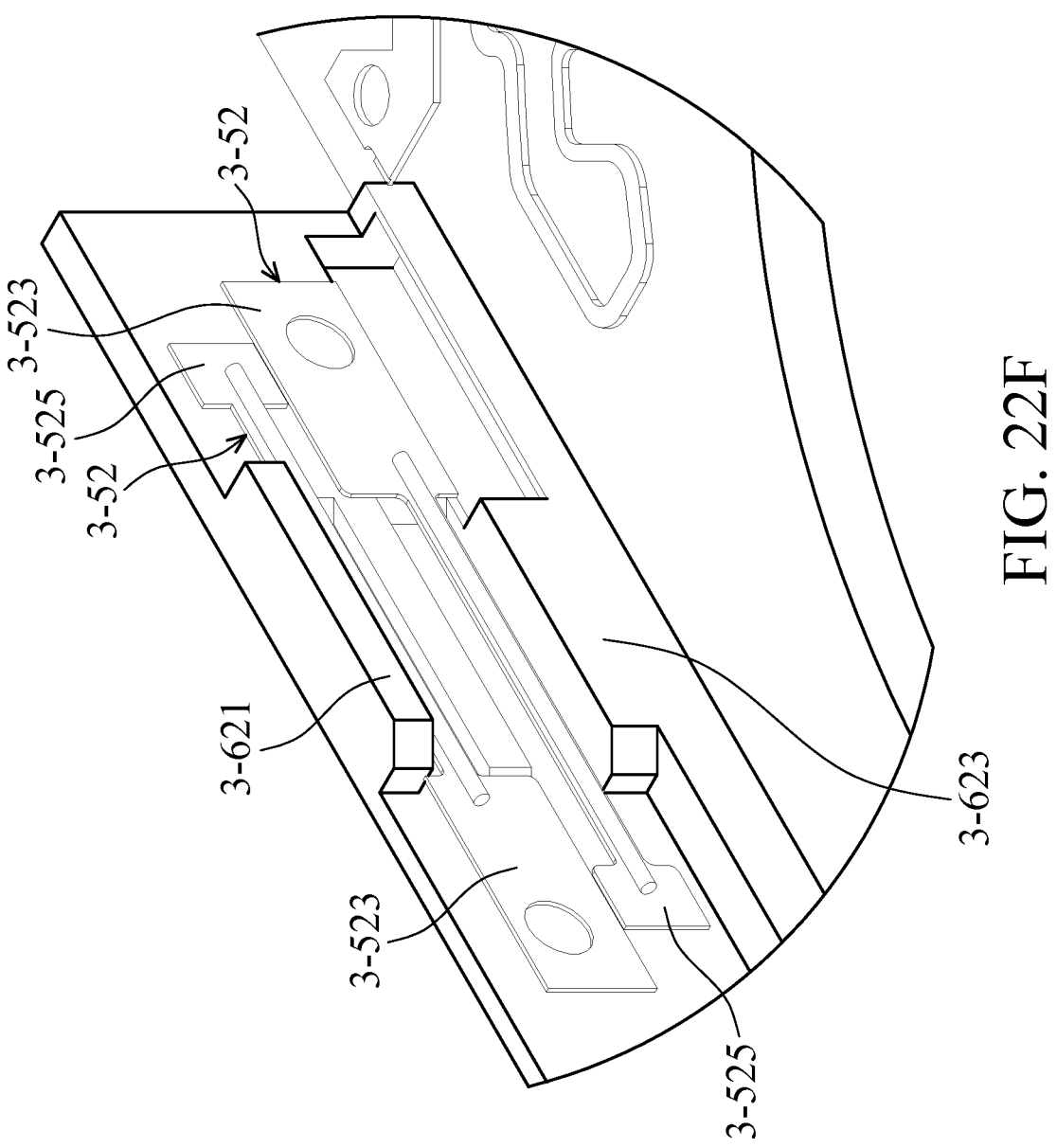
FIG. 22F is a schematic view of another configuration of the driving elements in other embodiments of the present disclosure.

Although the two driving elements 3-52 extend in an identical direction, the present disclosure is not limited thereto. For example, FIG. 22F is schematic view of another configuration of the driving units 3-52 in other embodiments of the present disclosure, wherein the two driving units 3-52 extend in opposite directions. Therefore, the contact units 3-525 of the two driving units 3-52 may push the frame 3-40 at different positions, so different torque may be provided to the frame 3-40. Therefore, the frame 3-40 may move and rotate at the same time.

Referring back to FIG. 22B. When the frame 3-40 moves relative to the fixed portion 3-F (e.g. the base unit 3-60), because the stopping portions 3-621 and 3-623 protrude to the frame 3-40, a limit range may be defined to determine a movable range of the frame 3-40 by the stopping portions 3-621 and 3-623. For example, the limit range may have a first position and a second position. When the frame 3-40 (the movable portion 3-M) is at the first position relative to the base unit 3-60 (the fixed portion 3-F), the driving unit 3-52 is not in contact with the frame 3-40. When the frame 3-40 is at the second position relative to the base unit 3-60, the driving element 3-52 may be in direct contact with the frame 3-40 and the base unit 3-60.

In some embodiments, the base unit 3-60 may further include a recess 3-624 corresponding to the contact unit 3-525, such as overlap each other in a direction that the main axis 3-O extends. Therefore, when the driving unit 3-521 is not shrink, the shape of the resilient unit 3-522 is back to the shape shown in FIG. 22B. The contact unit 3-525 may be prevented from being in direct contact with the base unit 3-60 by the recess 3-624 when the resilient unit 3-522 is deforming, so the contact unit 3-525 may be protected. Moreover, the material of the recess 3-624 does not include conductive material, such as does not include metal, so short may be prevented when the contact unit 3-525 is in contact with the recess 3-624.

It should be noted that in some embodiments, when the movable portion 3-M is driven by the driving assembly 3-D to move in the first dimension (the translational movement in X direction) relative to the fixed portion 3-F, the movable portion 3-M is also driven by the driving assembly 3-D to move in a sixth dimension. The movement in the sixth dimension may be a rotation with the optical axis of the optical element as the rotational axis. It should be noted that the optical axis may be different from the main axis 3-O. For example, when the driving assembly 3-D drives the movable portion 3-M to move in the first dimension relative to the fixed portion 3-F, the optical element may be moved, so the optical axis may be moved relative to the main axis. Therefore, the movable portion 3-M may be allowed to move in more dimensions relative to the fixed portion 3-F, and the performance of optical image stabilization may be enhanced as well.

In some embodiments, when the movable portion 3-M is driven by the driving assembly 3-D and only moves in the first dimension relative to the fixed portion, the movable portion 3-M is only movable in a first limit range of a maximum movable range in the first dimension. The first limit range is defined by the movable range of the frame 3-40. For example, if the movable portion 3-M moves in the X direction, the first limit range may be defined by the maximum movable range of the movable portion 3-M in the X direction. Afterwards, when the movable portion 3-M is driven by the driving assembly 3-D to move relative to the fixed portion 3-F in both of the first dimension and the sixth dimension, the movable portion 3-M is only movable in a second limit range of the maximum movable range in the first dimension. It should be noted that in the first dimension, the first limit range is greater than the second limit range, and the maximum movable range is greater than the first limit range. In other words, if the movable portion 3-M not only moves in the first dimension, but also moves in the sixth dimension, the movable range of the movable portion 3-M in the first dimension will be decreased accordingly.

When the movable portion 3-M moves relative to the fixed portion 3-F in the first limit range, the stopping portions 3-621 and 3-623 (the stopping assembly) is not in contact with at least one of the movable portion 3-M and the fixed portion 3-F. In this embodiments, the stopping portions 3-621 and 3-623 are disposed on the fixed portion 3-F, so the stopping portions 3-621 and 3-623 will not in direct contact with the movable portion 3-M when the movable portion 3-M is in the first limit range. However, the present disclosure is not limited thereto. For example, the stopping assembly may be disposed on the movable portion 3-M. In such embodiments, when the movable portion 3-M is in the first limit range, the stopping assembly on the movable portion 3-M will not in direct contact with the fixed portion 3-F, so the movable portion 3-M and the fixed portion 3-F may be prevented from being damaged by the collision between each other.

In some embodiments, when the movable portion 3-M is driven by the driving assembly 3-D to only move in the sixth dimension relative to the fixed portion 3-F, the movable portion 3-M is only allowed to move in a third limit range of the maximum movable range in the sixth dimension. When the movable portion 3-M is driven by the driving assembly 3-D to move in both of the first dimension and the sixth dimension relative to the fixed portion 3-F, the movable portion 3-M is only allowed to move in a fourth limit range of the maximum movable range in the sixth dimension. It should be noted that the third limit range is greater than the fourth limit range in the sixth dimension. In other words, if the movable portion 3-M not only moves in the sixth dimension, but also moves in the first dimension, the movable range of the movable portion 3-M in the sixth dimension will be decreased accordingly. Similarly, when the movable portion 3-M moves relative to the fixed portion 3-F in the third limit range, the stopping portions 3-621 and 3-623 (the stopping assembly) is not in contact with at least one of the movable portion 3-M and the fixed portion 3-F.

Moreover, as shown in FIG. 21F, a control unit 3-C may be included in the optical element driving mechanism 3-100. The control unit 3-C may be a driver IC, a storage, or a memory, etc., and may be used for recording the first limit range, the second limit range, the third limit range, and the fourth limit range to prevent the movable portion 3-M exceeding the limit ranges when moving to prevent damage. The first limit range, the second limit range, the third limit range, and the fourth limit range may be measured by an external apparatus (not shown), and the measured first limit range, the measured second limit range, the measured third limit range, and the measured fourth limit range will be stored in the control unit 3-C. It should be noted that the control unit 3-C may be electrically connected to the first position sensing assembly 3-S1 (which includes the first position sensor 3-82, the second position sensor 3-84, the third position sensor 3-86) and the second position sensing assembly 3-S2 (which includes the fourth position sensor 3-88 and the fifth position sensor 3-89). Therefore, multiple position sensors may be controlled by one control unit 3-C, and the number of the required control unit may be reduced to achieve miniaturization.

Figure 23A:
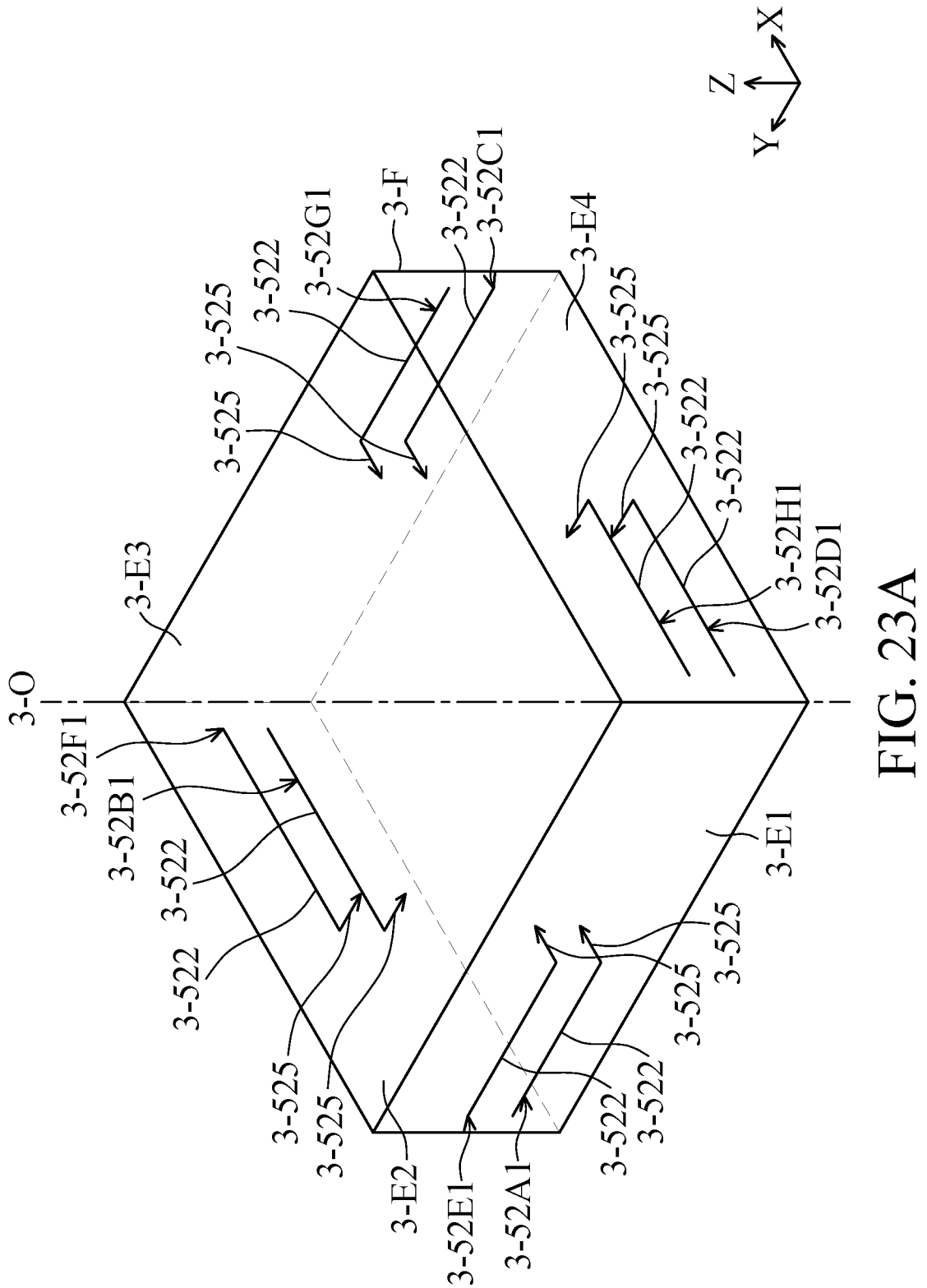
FIG. 23A to FIG. 23N are schematic views of different configurations of the driving elements in the optical element driving mechanism.
Figure 23B:
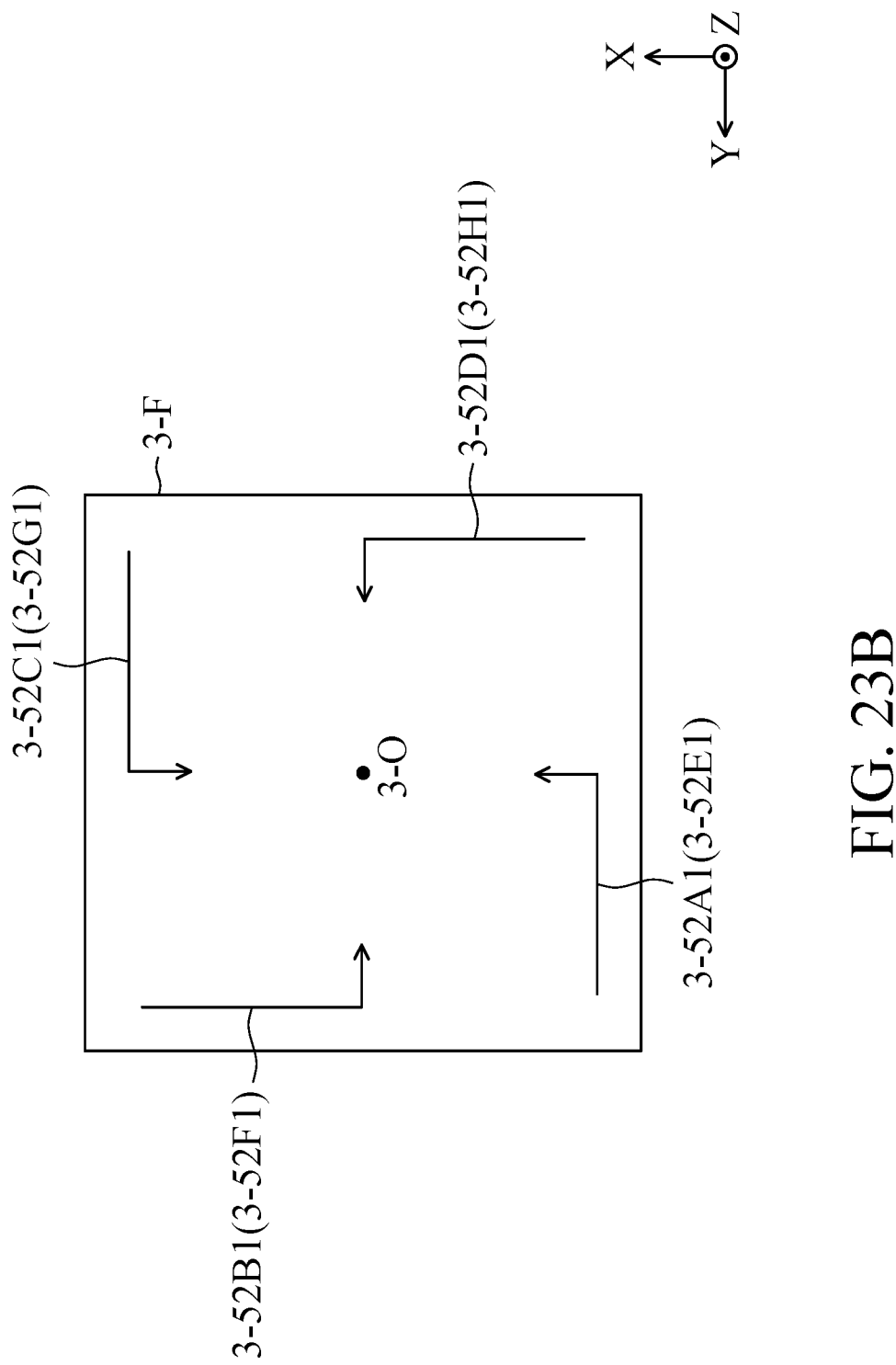
Figure 23C:
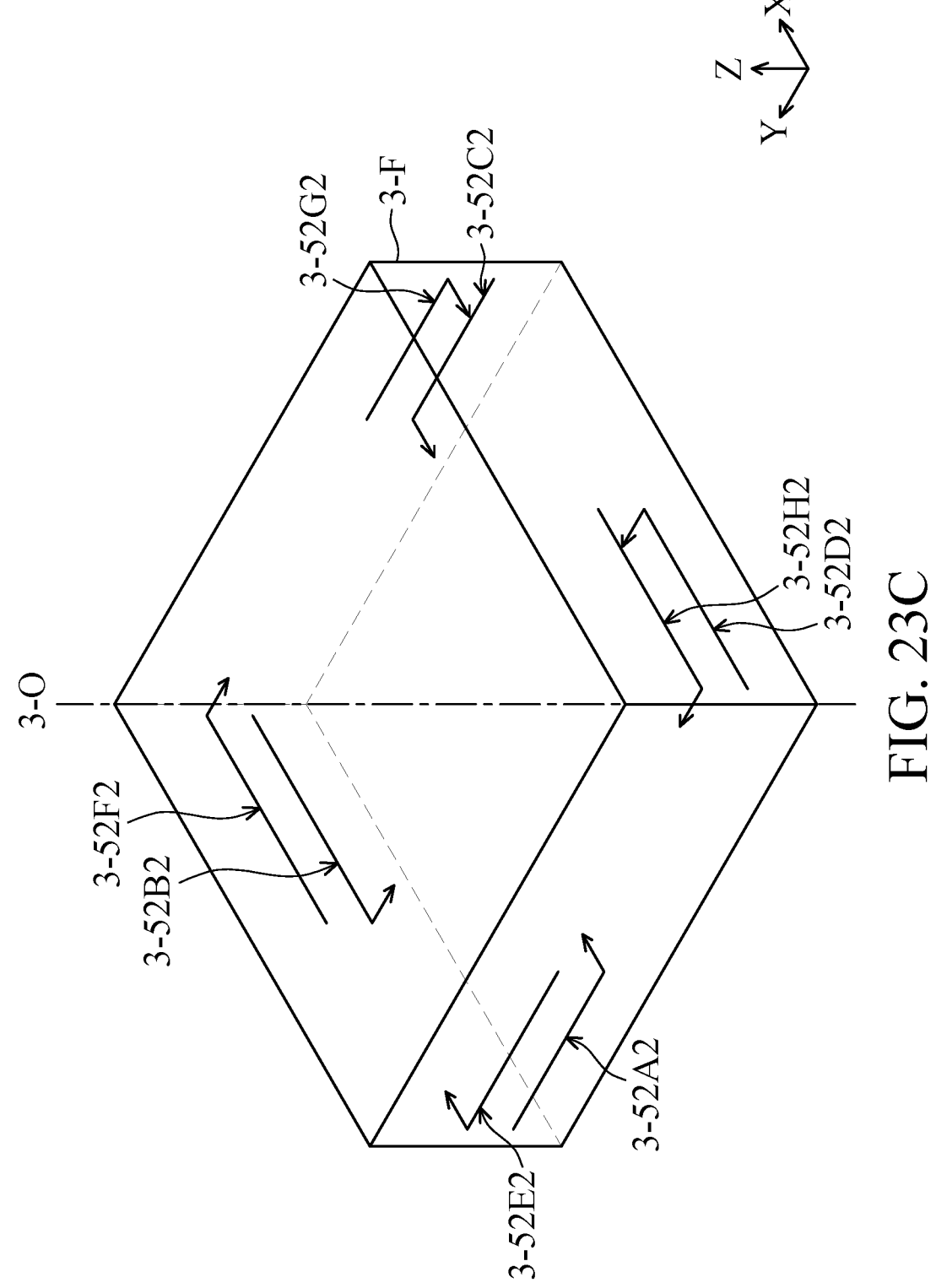
Figure 23D:
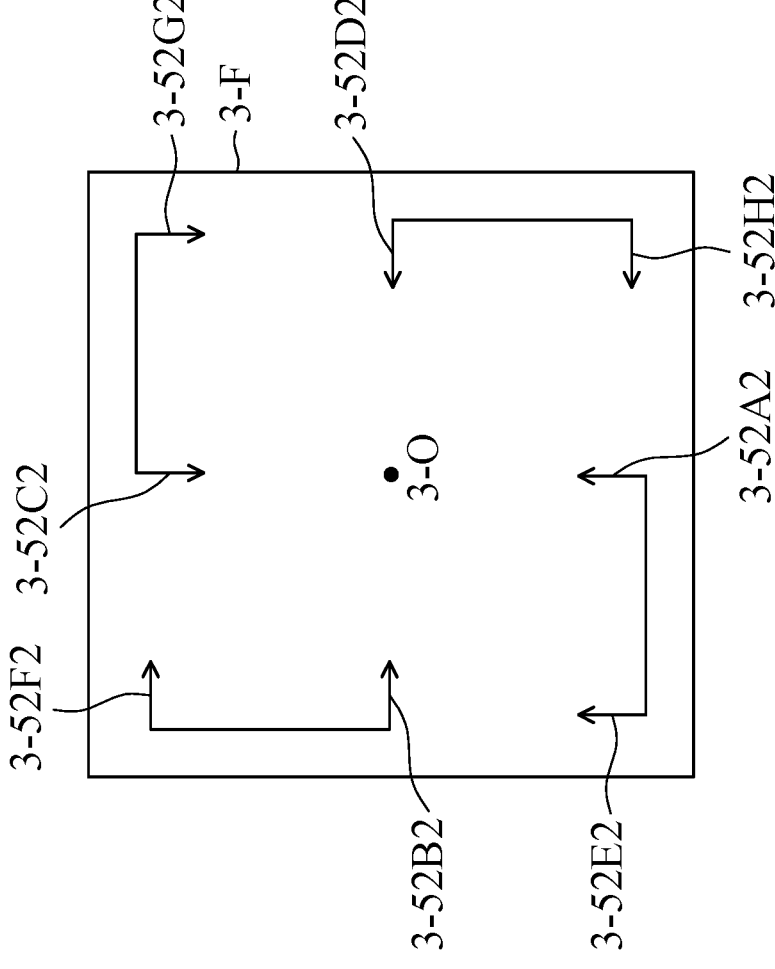
Figure 23E:
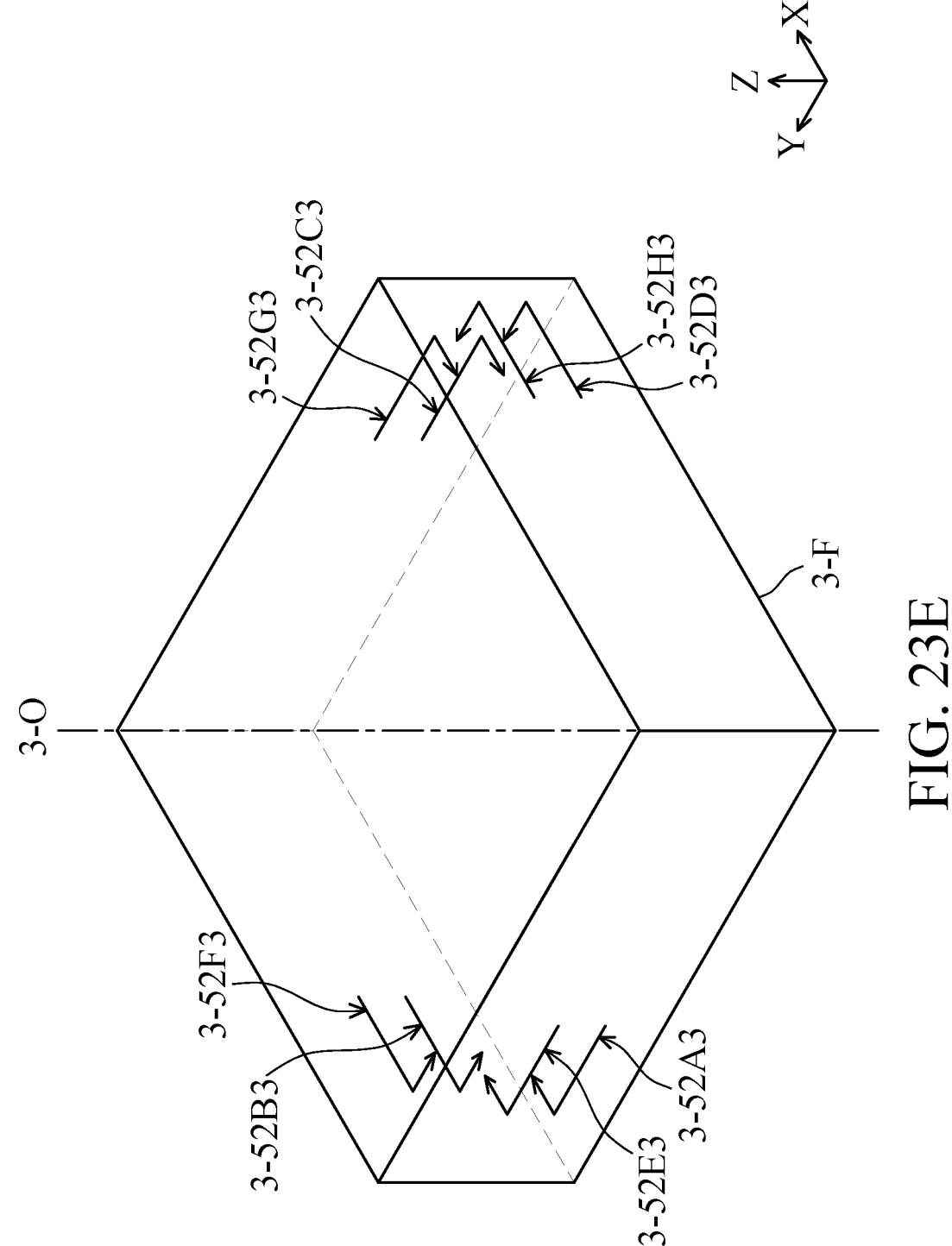
Figure 23F:
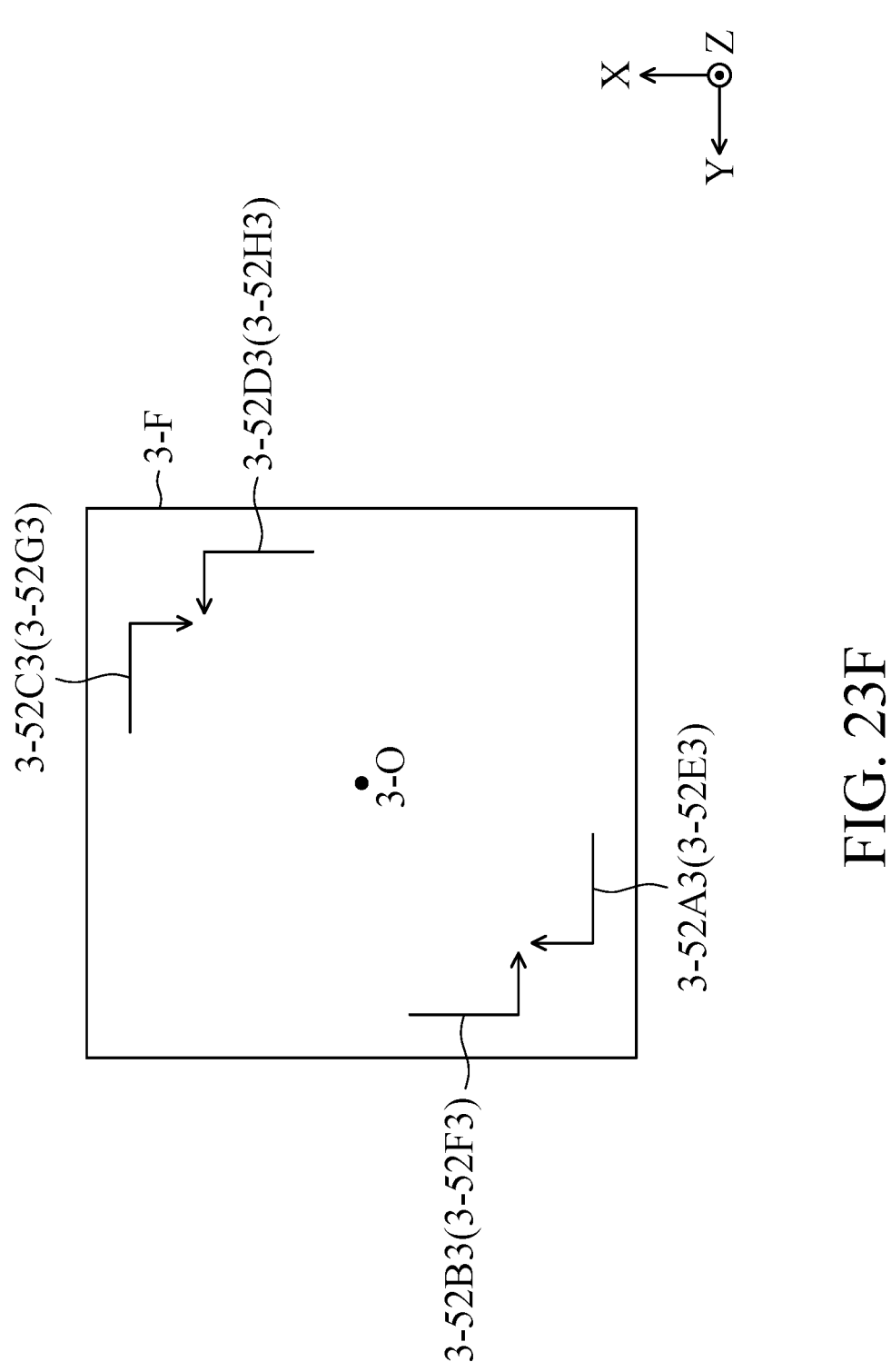
Figure 23G:
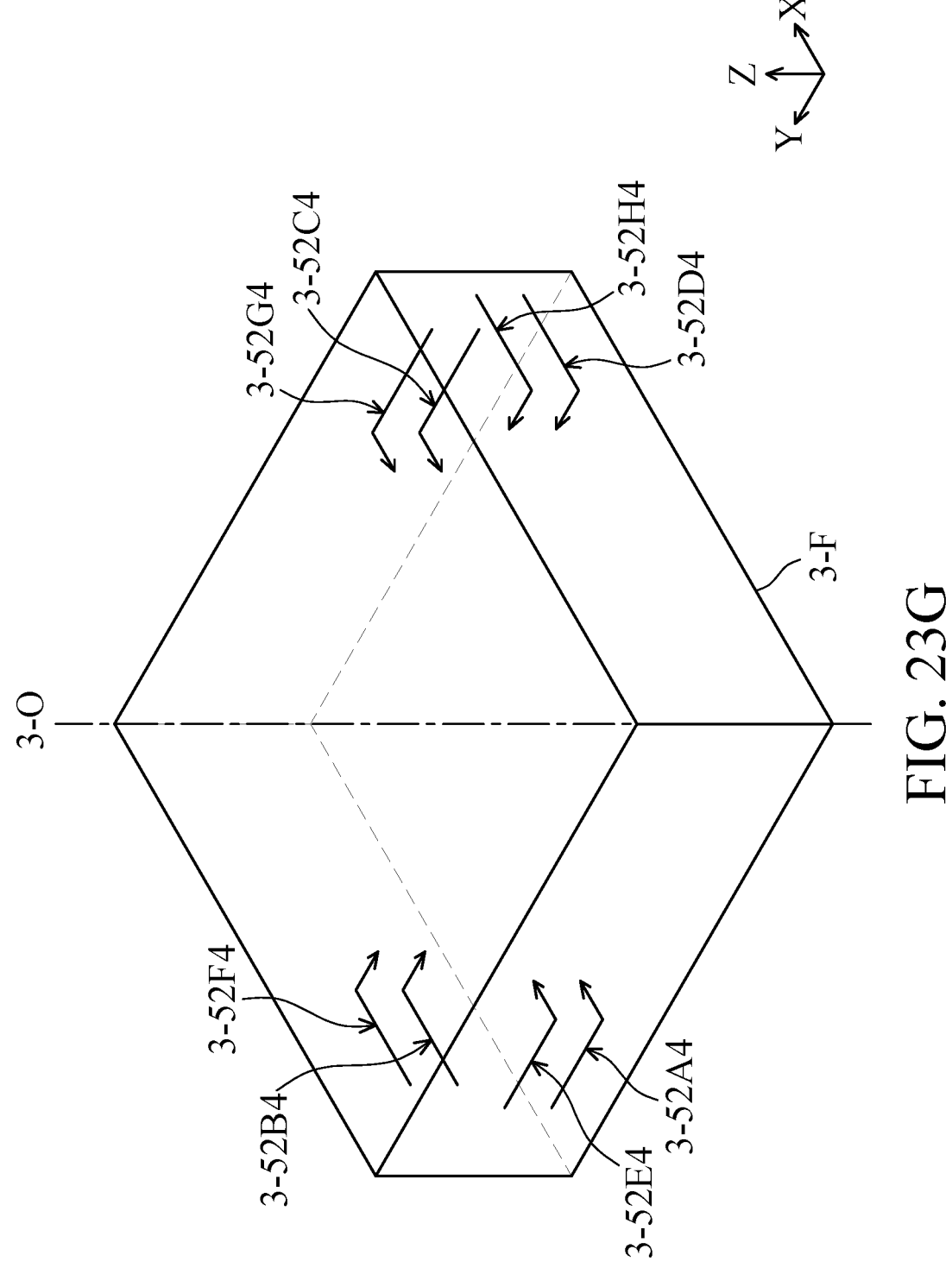
Figure 23H:
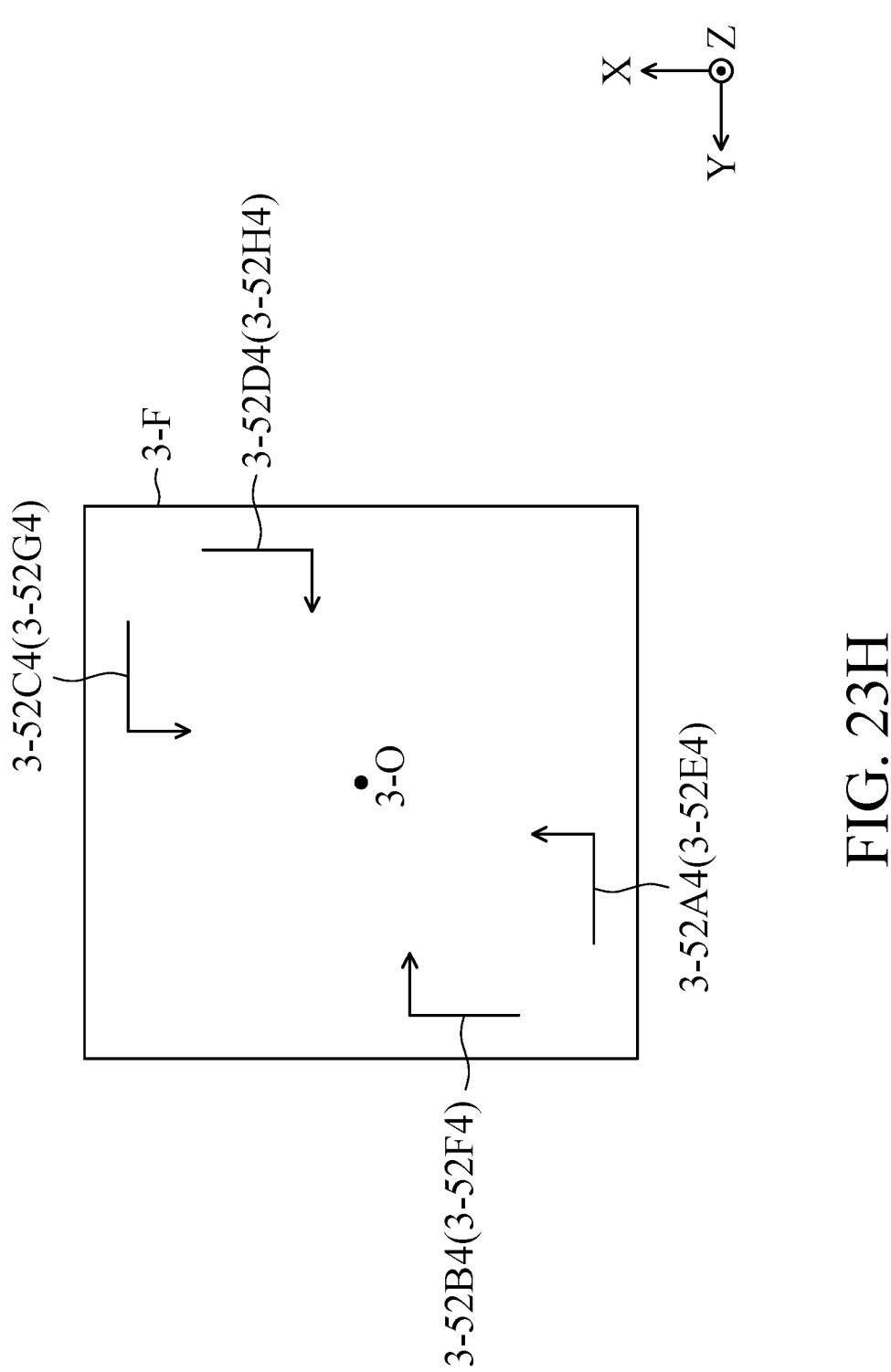
Figure 23I:
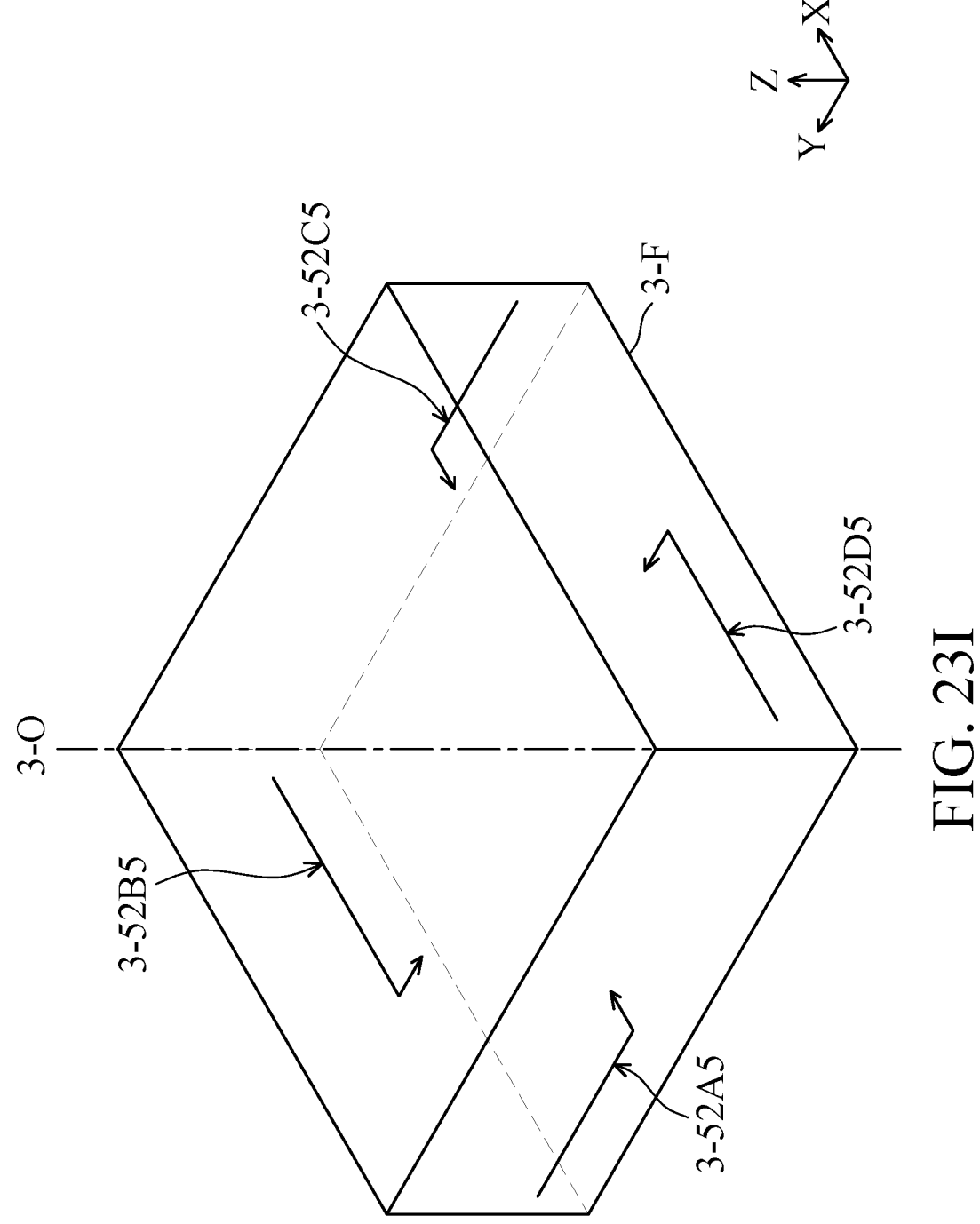
Figure 23J:
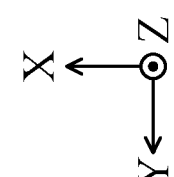
Figure 23J:
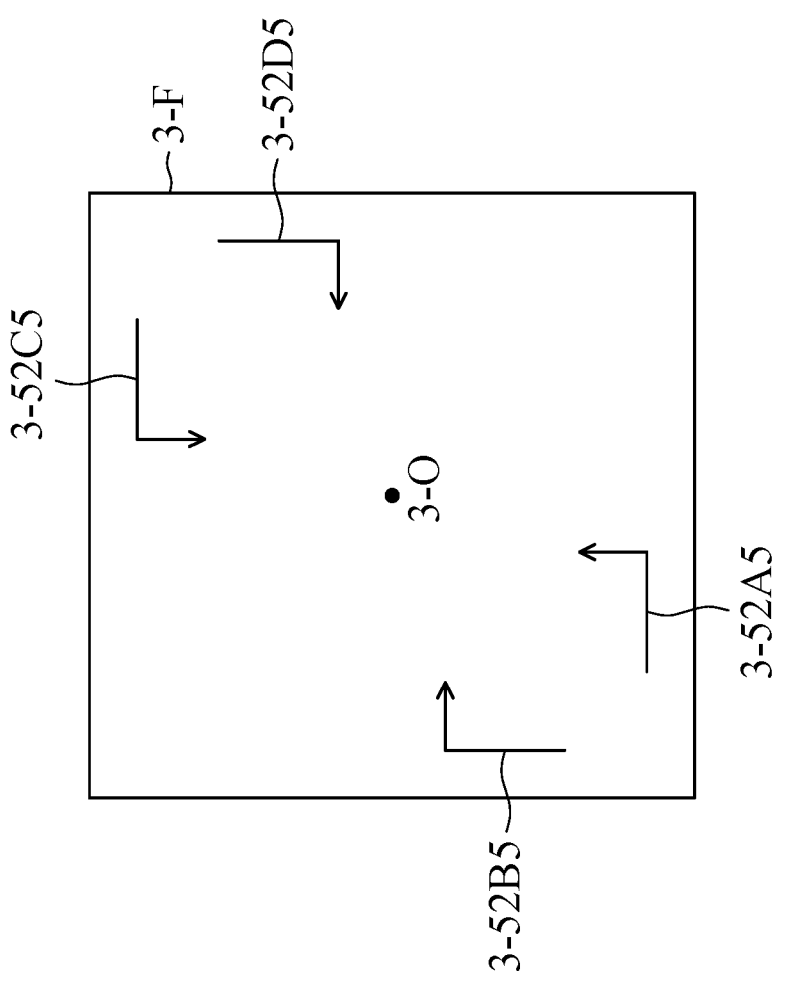
Figure 23K:
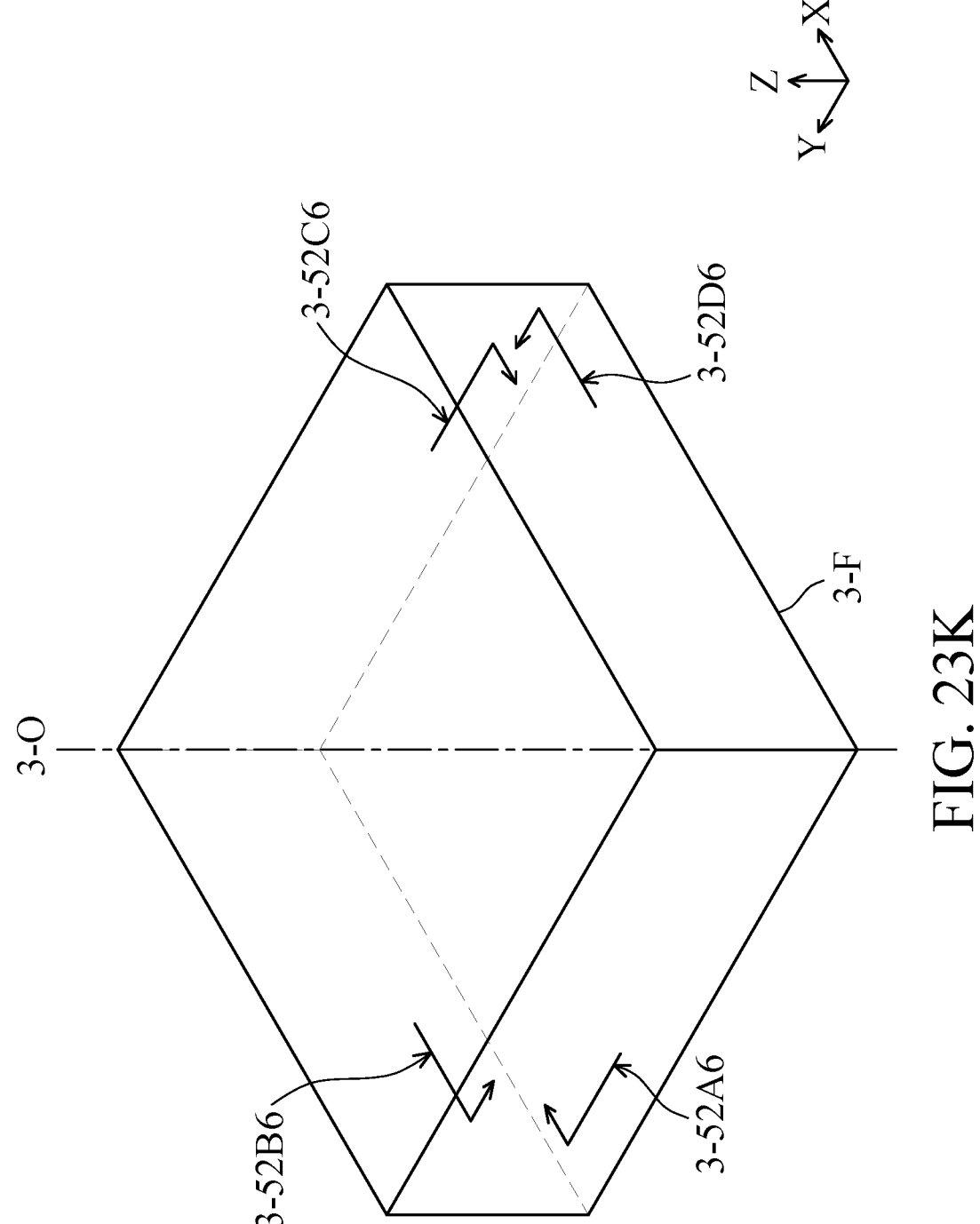
Figure 23L:
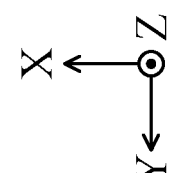
Figure 23L:
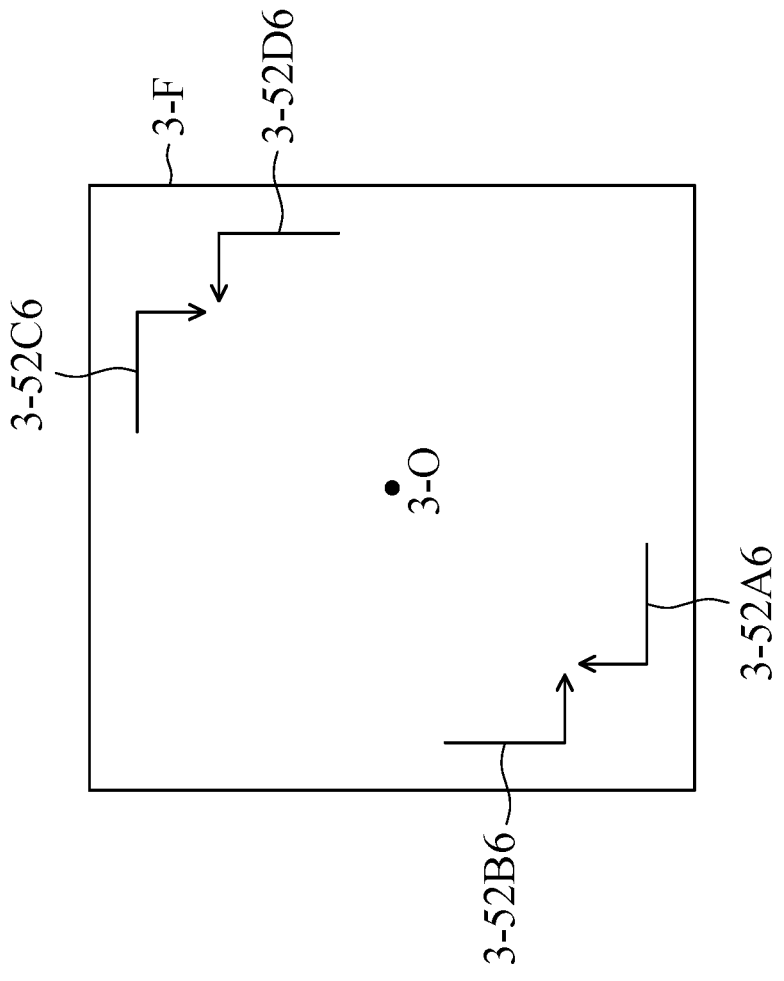
Figure 23M:
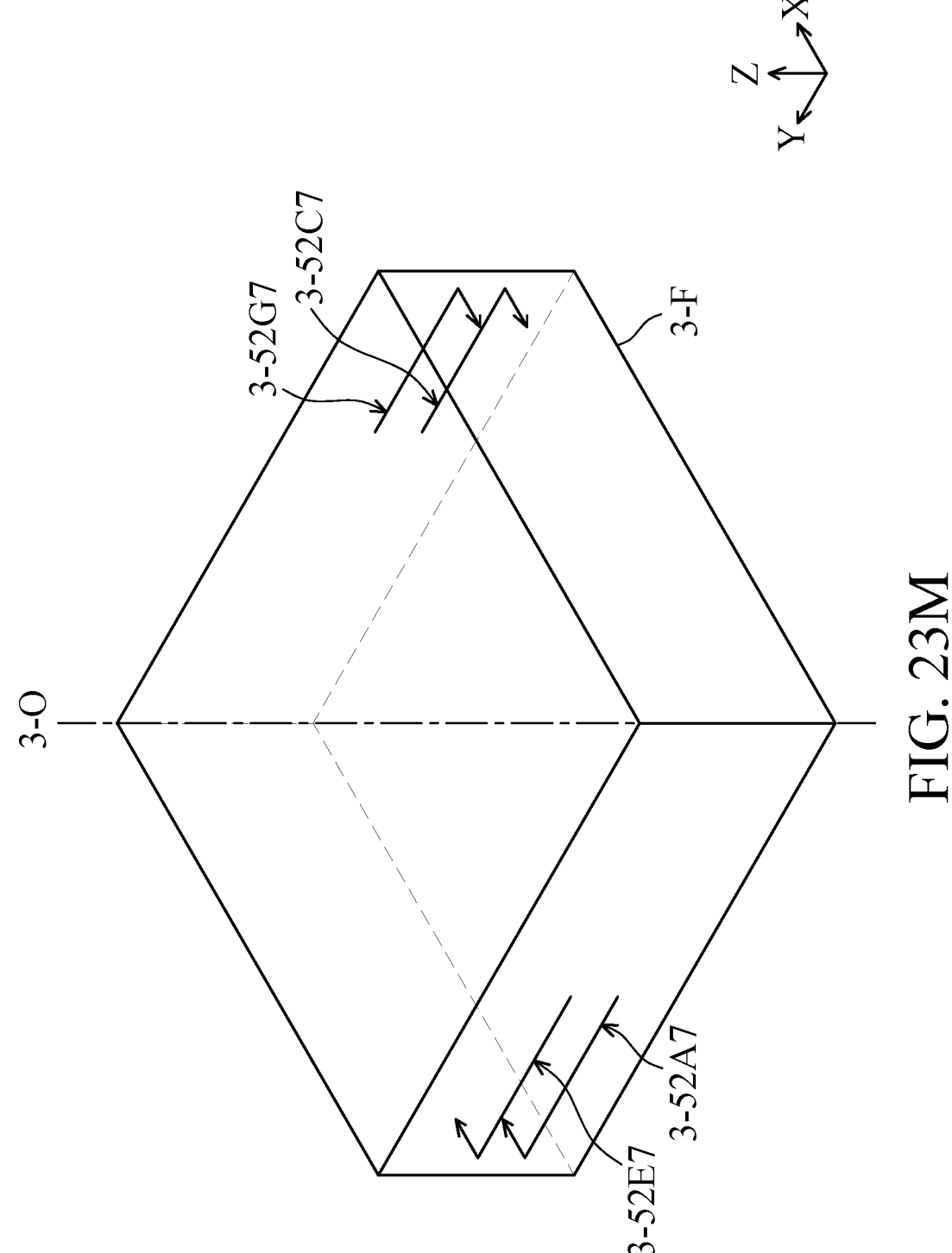
Figure 23N:
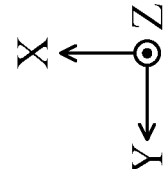
Figure 23N:
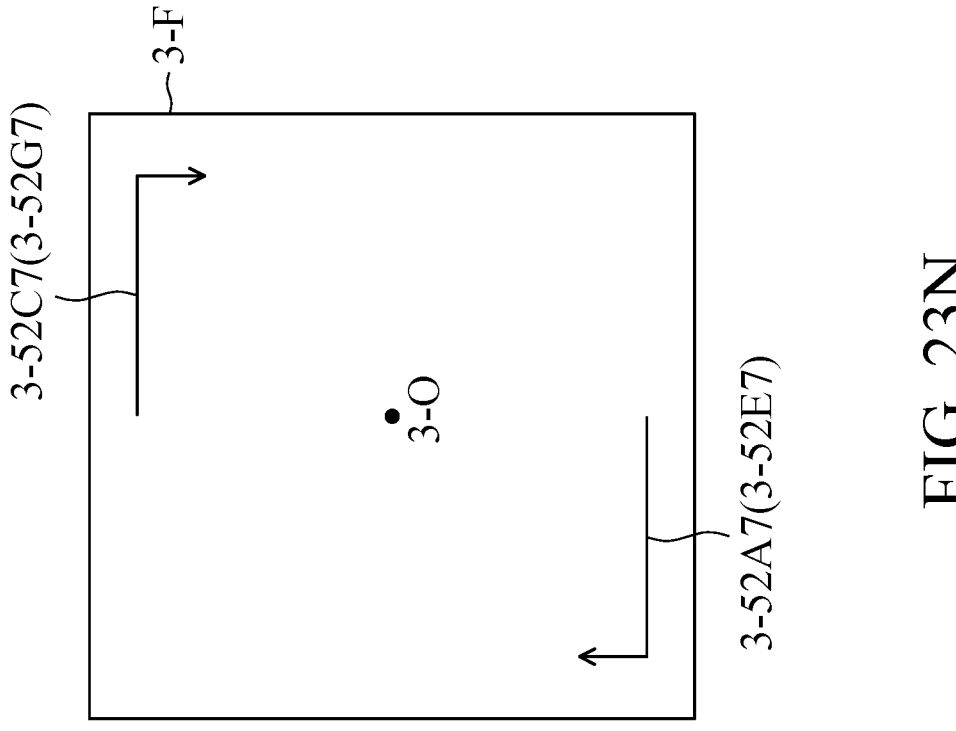

FIG. 23A to FIG. 23N are schematic views of different configurations of the driving elements in the optical element driving mechanisms 3-100A, 3-100B, 3-100C, 3-100D, 3-100E, 3-100F, and 3-100G. As shown in FIG. 23A, the driving element 3-52 is simplified as a combination of a straight line and an arrow, wherein the straight line represents the resilient unit 3-522, the arrow represents the contact unit, and other elements are omitted for clarity. The direction of the arrow means the direction of the driving force provided by the contact unit 3-525 to the frame 3-40. It should be noted that the directions of the arrows in the present embodiments are oriented to the X direction, the —X direction, the Y direction, or the Y direction for illustration, but the present disclosure is not limited thereto. The direction of the driving force may be adjusted depending on design requirement.

As shown in FIG. 23A and FIG. 23B, the optical element driving mechanism 3-100A may include driving elements 3-52A1, 3-52B1, 3-52C1, 3-52D1, 3-52E1, 3-52F1, 3-52G1, and 3-52H1. The driving elements 3-52A1, 3-52B1, 3-52C1, and 3-52D1 may position at an identical XY plane, the driving elements 3-52E1, 3-52F1, 3-52G1, and 3-52H1 may position at another XY plane, and the two XY planes are different.

In this embodiment, the driving elements 3-52A1 and 3-52E1 extend in the Y direction, the driving elements 3-52B1 and 3-52F1 extend in the —X direction, the driving elements 3-52C1 and 3-52G1 extend in the —Y direction, and the driving elements 3-52D1 and 3-52H1 extend in the X direction. Furthermore, the driving elements 3-54 (FIG. 21B) extend in a XY plane in a direction that is not parallel to the X direction and the Y direction. The driving elements 3-54 are omitted in the following embodiments for clarity, but it should be noted that the driving elements 3-54 may also be included in the following embodiments.

For description, the driving element 3-52A1 may be called as the first driving element 3-52A1, the driving element 3-52B1 may be called as the second driving element 3-52B1, the driving element 3-54 may be called as the third driving element 3-54, the driving element 3-52E1 may be called as the fourth driving element 3-52E1, the driving element 3-52F1 may be called as the fifth driving element 3-52F1, the driving element 3-52C1 may be called as the sixth driving element 3-52C1, and the driving element 3-52D1 may be called as the seventh driving element 3-52D1.

Therefore, a first driving unit (not shown, and the following driving units are not shown as well) of the first driving element 3-52A1 extends in the first direction (the X direction), and a second driving unit of the second driving element 3-52B2 extends in a second direction (the Y direction). The second driving element 3-52B1 is used for generating a second driving force to the movable portion 3-M or the fixed portion 3-F. The direction of the second driving force (the X direction) is not parallel to the second direction, and the first direction and the second direction are not parallel.

In the direction that the main axis 3-O extends, the distance between the center of the first driving element 3-52A1 (e.g. the center of the linear resilient unit 3-522) and the center of the second driving element 3-52B1 (e.g. the center of the linear resilient unit 3-522) is zero. In other words, the center of the first driving element 3-52A1 and the center of the second driving element 3-52B1 are on an identical XY plane. Therefore, in a direction that is perpendicular to the direction that the main axis 3-O extends, the first driving element 3-52A1 at least overlaps a portion of the second driving element 3-52B1, which means the first driving element 3-52A1 and the second driving element 3-52B1 have an identical height (identical on Z coordinate).

When viewed in a direction that the main axis 3-O extends (FIG. 23B), the first driving element 3-52A1 does not overlap the second driving element 3-52B1. When viewed in a direction that the main axis 3-O extends, the first driving element 3-52A1 is at the first edge 3-E1 of the fixed portion 3-F. When viewed in a direction that the main axis 3-O extends, the second driving element 3-52B1 is at the second edge 3-E2 of the fixed portion 3-F.

A third driving unit of the third driving element 3-54 extends in a third direction, which is a direction on the XY plane and is not parallel to the X direction or the Y direction. The third direction is not parallel to the first direction or the second direction. The third driving element 3-54 is used to generate a third driving force to the holder 3-30 or the frame 3-40 of the movable portion 3-M, and the direction of the third driving force (the Z direction) is not parallel to the third direction.

In the direction that the main axis 3-O extends, the distance between the center of the first driving element 3-52A1 and the center of the third driving element 3-54 is not zero. In other words, the first driving element 3-52A1 and the third driving element 3-54 are not on an identical XY plane. Therefore, in a direction that is perpendicular to the direction that the main axis 3-O extends, the first driving element 3-52A1 does not overlap the third driving element 3-54, which means the first driving element 3-52A1 and the third driving element 3-54 have different heights (different on Z coordinate). When viewed in a direction that the main axis 3-O extends, the first driving element 3-52A1 does not overlap the third driving element 3-54. When viewed in a direction that the main axis 3-O extends, the third driving element 3-54 is at the first edge 3-E1, as shown in FIG. 21B.

A fourth driving unit of the fourth driving element 3-52E1 extends in a fourth direction (the Y direction). The fourth direction is parallel to the first direction, and the fourth is not parallel to the second direction and the third direction. The fourth driving element 3-52E1 is used to generate a fourth driving force to the movable portion 3-M or the fixed portion 3-F, and the direction of the fourth driving force (the X direction) is not parallel to the fourth direction.

In the direction that the main axis 3-O extends, the distance between the center of the first driving element 3-52A1 and the center of the fourth driving element 3-52E1 is not zero. In other words, the first driving element 3-52A1 and the fourth driving element 3-52E1 are not on an identical XY plane. Therefore, in a direction that is perpendicular to the direction that the main axis 3-O extends, the first driving element 3-52A1 does not overlap the fourth driving element 3-52E1, which means the first driving element 3-52A1 and the fourth driving element 3-52E1 have different heights (different on Z coordinate). When viewed in a direction that the main axis 3-O extends, the first driving element 3-52A1 overlaps at least a portion of fourth driving element 3-52E1. When viewed in a direction that the main axis 3-O extends, the fourth driving element 3-52E1 is at the first edge 3-E1.

A fifth driving unit of the fifth driving element 3-52F1 extends in a fifth direction (the X direction). The fifth direction is not parallel to the first direction, the third direction, and the fourth direction, and the fifth direction is parallel to the second direction. The fifth driving element 3-52F1 is used to generate a fifth driving force to the movable portion 3-M or the fixed portion 3-F, and the direction of the fifth driving force (the −Y direction) is not parallel to the fifth direction.

In the direction that the main axis 3-O extends, the distance between the center of the first driving element 3-52A1 and the center of the fifth driving element 3-52F1 is not zero. In other words, the first driving element 3-52A1 and the fifth driving element 3-52F1 are not on an identical XY plane. Therefore, in a direction that is perpendicular to the direction that the main axis 3-O extends, the first driving element 3-52A1 does not overlap the fifth driving element 3-52F1, which means the first driving element 3-52A1 and the fifth driving element 3-52F1 have different heights (different on Z coordinate). When viewed in a direction that the main axis 3-O extends, the first driving element 3-52A1 does not overlap the fifth driving element 3-52F1. When viewed in a direction that the main axis 3-O extends, the second driving element 3-52B1 at least overlaps a portion of the fifth driving element 3-52F1. When viewed in a direction that the main axis 3-O extends, the fifth driving element 3-52F1 is at the second edge 3-E2.

In the direction that the main axis 3-O extends, the distance between the center of the fourth driving element 3-52E1 and the center of the fifth driving element 3-52F1 is zero. In other words, the center of the fourth driving element 3-52E1 and the center of the fifth driving element 3-52F1 are on an identical XY plane. Therefore, in a direction that is perpendicular to the direction that the main axis 3-O extends, the fourth driving element 3-52E1 at least overlaps a portion of the fifth driving element 3-52F1, which means the fourth driving element 3-52E1 and the fifth driving element 3-52F1 have an identical height (identical on Z coordinate). When viewed in a direction that the main axis 3-O extends, the fourth driving element 3-52E1 does not overlap the fifth driving element 3-52F1.

A sixth driving unit of the sixth driving element 3-52C1 extends in a sixth direction (the Y direction). The sixth direction is parallel to the first direction, and the sixth direction is not parallel to the second direction and the third direction. The sixth driving element 3-52C1 is used to generate a sixth driving force to the movable portion 3-M or the fixed portion 3-F, and the direction of the sixth driving force (the −X direction) is not parallel to the sixth direction.

In the direction that the main axis 3-O extends, the distance between the center of the first driving element 3-52A1 and the center of the sixth driving element 3-52C1 is zero. In other words, the first driving element 3-52A1 and the sixth driving element 3-52C1 are on an identical XY plane. Therefore, in a direction that is perpendicular to the direction that the main axis 3-O extends, the first driving element 3-52A1 overlaps at least a portion of the sixth driving element 3-52C1, which means the first driving element 3-52A1 and the sixth driving element 3-52C1 have an identical height (identical on Z coordinate). When viewed in a direction that the main axis 3-O extends, the first driving element 3-52A1 does not overlap the sixth driving element 3-52C1. When viewed in a direction that the main axis 3-O extends, the sixth driving element 3-52F1 is at a third edge 3-E3 of the fixed portion 3-F, and the first edge 3-E1 and the third edge 3-E3 are parallel.

A seventh driving unit of the seventh driving element 3-52D1 extends in a seventh direction (the X direction). The seventh direction is parallel to the second direction, and the seventh direction is not parallel to the first direction, the third direction, and the fourth direction. The seventh driving element 3-52D1 is used to generate a seventh driving force to the movable portion 3-M or the fixed portion 3-F, and the direction of the seventh driving force (the Y direction) is not parallel to the seventh direction.

In the direction that the main axis 3-O extends, the distance between the center of the first driving element 3-52A1 and the center of the seventh driving element 3-52D1 is zero. In other words, the first driving element 3-52A1 and the seventh driving element 3-52D1 are on an identical XY plane. Therefore, in a direction that is perpendicular to the direction that the main axis 3-O extends, the first driving element 3-52A1 overlaps at least a portion of the seventh driving element 3-52D1, which means the first driving element 3-52A1 and the seventh driving element 3-52D1 have an identical height (identical on Z coordinate). When viewed in a direction that the main axis 3-O extends, the first driving element 3-52A1 does not overlap the seventh driving element 3-52D1. When viewed in a direction that the main axis 3-O extends, the seventh driving element 3-52D1 is at a fourth edge 3-E4 of the fixed portion 3-F. The first edge 3-E1 is not parallel to the fourth edge 3-E4, and the second edge is parallel to the fourth edge 3-E4.

In this embodiment, the driving elements 3-52A1 and 3-52E1 may provide driving forces to the frame 3-40 in the X direction, the driving elements 3-52B1 and 3-52F1 may provide driving forces to the frame 3-40 in the –Y direction, the driving elements 3-52C1 and 3-52G1 may provide driving forces to the frame 3-40 in the –X direction, the driving elements 3-52D1 and 3-52H1 may provide driving forces to the frame 3-40 in the Y direction. Therefore, the frame 3-40 may be driven by the driving elements 3-52A1, 3-52B1, 3-52C1, 3-52D1, 3-52E1, 3-52F1, 3-52G1, and 3-52H1 in the X direction or the Y direction relative to the fixed portion 3-F.

Moreover, the driving elements 3-52A1, 3-52B1, 3-52C1, 3-52D1, 3-52E1, 3-52F1, 3-52G1, and 3-52H1 also allows the frame 3-40 to rotate relative to the X axis or the Y axis. For example, if only the driving elements 3-52C1 and 3-52E1 provides driving forces to the frame 3-40, because the driving elements 3-52C1 and 3-52E1 are positioned on different XY planes, the total torque applied to the frame 3-40 by the driving elements 3-52C1 and 3-52E1 is not equal to zero. Therefore, the frame 3-40 may rotate relative to the Y axis.

When the driving unit 3-521 (the first driving unit) of the first driving element 3-52A1 deforms, the resilient unit 3-522 (the first resilient unit) of the first driving element 3-52A1 deforms accordingly to move the contact unit 3-525 (the first contact unit) of the first driving element 3-52A1. When viewed in a direction that the main axis 3-O extends, the main axis 3-O looks like a point. The main axis 3-O passes through the center of the case 3-10, and a connection between the main axis 3-O and the center of the first contact unit (such as the connection point between the resilient unit 3-522 and the contact unit 3-525 in FIG. 23B, and the following centers of the contact units may be defined in identical or similar manners) is not perpendicular or parallel to the first direction (the X direction).

When the driving unit 3-521 (the second driving unit) of the second driving element 3-52B1 deforms, the contact unit 3-525 (the second contact unit) of the second driving element 3-52A1 will be moved accordingly. When viewed along the main axis 3-O, a connection between the main axis 3-O and the center of the second contact unit is not perpendicular or parallel to the second direction (the X direction).

In the optical element driving mechanism 3-100A, the driving elements 3-52A1, 3-52B1, 3-52C1, and 3-52D1 may arranged as centrosymmetric to the main axis 3-O, and the driving elements 3-52E1, 3-52F1, 3-52G1, and 3-52H1 may also arranged as centrosymmetric to the main axis 3-O. Therefore, when viewed along the main axis 3-O, a connection between the main axis 3-O and the center of the second contact unit 3-525 (the second contact unit) of the second driving element 3-52B1 is perpendicular to a connection between the main axis 3-O and the center of the contact unit 3-525 (the first contact unit) of the first driving element 3-52A1.

The contact unit 3-545 (the third contact unit) of the third driving element 3-54 is used to in contact with the holder 3-30 or the frame 3-40. When the driving unit 3-541 of the third driving element 3-54 deforms, the third contact unit will be moved accordingly. When viewed in the direction that the main axis 3-O extends, a connection between the main axis 3-O and the center of the contact unit 3-545 (the third contact unit) of the third driving element 3-54 is not perpendicular or parallel to the third direction (the direction that the third driving unit of the third driving element 3-54 extends). When viewed along the main axis 3-O, the connection between the main axis 3-O and the center of the third contact unit is not perpendicular or parallel to the connection between the main axis 3-O and the contact unit 3-525 (the first contact unit) of the first driving element 3-52A1.

FIG. 23C and FIG. 23D are schematic views of the optical element driving mechanism 3-100B viewed in different directions. The optical element driving mechanism 3-100B includes driving elements 3-52A2, 3-52B2, 3-52C2, 3-52D2, 3-52E2, 3-52F2, 3-52G2, and 3-52H2. The driving elements 3-52A2, 3-52B2, 3-52C2, 3-52D2 are similar to the driving elements 3-52A1, 3-52B1, 3-52C1, and 3-52D1 in the optical element driving mechanism 3-100A, and the driving elements 3-52E2, 3-52F2, 3-52G2, and 3-52H2 are respectively disposed in opposite directions to the driving elements 3-52E1, 3-52F1, 3-52G1, and 3-52H1 in the optical element driving mechanism 3-100A, which corresponds to the configuration of FIG. 22F.

The contact unit 3-525 (the fourth contact unit) of the fourth driving element 3-52E2 is used to in contact with the movable portion 3-M or the fixed portion 3-F. When the driving unit 3-522 (the fourth driving unit) of the fourth driving element 3-52E2 deforms, the fourth contact unit will be moved accordingly. When viewed along the main axis 3-O (FIG. 20D), the connection between the main axis 3-O and the center of the contact unit 3-525 (the fourth contact unit) of the fourth driving element 3-52E2 is not parallel or perpendicular to the fourth direction (the Y direction). When viewed along the main axis 3-O, the connection between the main axis 3-O and the center of the contact unit 3-525 (the fourth contact unit) of the fourth driving element 3-52E2 is not perpendicular to the connection between the main axis 3-O and the center of the contact unit 3-525 (the first contact unit) of the first driving element 3-52A2. Moreover, the driving units 3-52B2, 3-52F2, the driving units 3-52C2, 3-52G2, and the driving units 3-52D2, 3-52H2 also have similar relationships. Therefore, the driving elements 3-52A2, 3-52B2, 3-52C2, 3-52D2, 3-52E2, 3-52F2, 3-52G2, and 3-52H2 allow the movable portion 3-M to move in the X and Y directions and rotate relative to the X, Y or Z axes to improve the performance of optical image stabilization.

FIG. 23E and FIG. 23F are schematic views of the optical element driving mechanism 3-100C viewed in different directions. The optical element driving mechanism 3-100C includes driving elements 3-52A3, 3-52B3, 3-52C3, 3-52D3, 3-52E3, 3-52F3, 3-52G3 and 3-52H3. The difference between the optical element driving mechanism 3-100C and the optical element driving mechanisms 3-100A and 3-100B is that the contact units 3-525 of the driving elements 3-52A3, 3-52B3, 3-52C3, 3-52D3, 3-52E3, 3-52F3, 3-52G3 and 3-52H3 of the optical element driving mechanism 3-100C are positioned at the corners of the fixed portion 3-F. Therefore, the movable portion 3-M may be rotated by the optical element driving mechanism 3-100C relative to the main axis 3-O, and the performance of the optical image stabilization may be enhanced. Moreover, the movable portion 3-M may be rotated by the optical element driving mechanism 3-100C relative to the X or Y axes.

For example, when viewed along the main axis 3-O, the connection between the main axis 3-O and the center of the contact unit 3-525 of the driving element 3-52A3 is not perpendicular or parallel to the connection between the main axis 3-O and the center of the contact unit 3-525 of the driving element 3-52B3. Moreover, when viewed along the main axis 3-O, the driving element 3-52A3 may overlap a portion of the driving element 3-52E3 or the entire driving element 3-52E3. The driving element 3-52B3 may overlap a portion of the driving element 3-52F3 or the entire driving element 3-52F3. The driving element 3-52C3 may overlap a portion of the driving element 3-52G3 or the entire driving element 3-52G3. The driving element 3-52D3 may overlap a portion of the driving element 3-52H3 or the entire driving element 3-52H3. Therefore, required space in other directions may be reduced to achieve miniaturization.

FIG. 23G and FIG. 23H are schematic views of the optical element driving mechanism 3-100D viewed in different directions. The optical element driving mechanism 3-100D includes driving elements 3-52A4, 3-52B4, 3-52C4, 3-52D4, 3-52E4, 3-52F4, 3-52G4 and 3-52H4. The difference between the optical element driving mechanism 3-100D and the optical element driving mechanisms 3-100A, 3-100B, 3-100C is that the contact units 3-525 of the driving elements 3-52A4, 3-52B4, 3-52C4, 3-52D4, 3-52E4, 3-52F4, 3-52G4 and 3-52H4 of the optical element driving mechanism 3-100D are positioned at the sides of the fixed portion 3-F and are close to the center of the sides. Therefore, the movable portion 3-M in the optical element driving mechanism 3-100 may be moved further in the X or Y directions.

For example, when viewed along the main axis 3-O, the connection between the main axis 3-O and the center of contact unit 3-525 of the driving element 3-52A4 is not perpendicular or parallel to the connection between the main axis 3-O and the center of the contact unit 3-525 of the driving element 3-52B4. Moreover, when viewed along the main axis 3-O, the driving element 3-52A4 may overlap a portion of the driving element 3-52E4 or the entire driving element 3-52E4. The driving element 3-52B4 may overlap a portion of the driving element 3-52F4 or the entire driving element 3-52F4. The driving element 3-52C4 may overlap a portion of the driving element 3-52G4 or the entire driving element 3-52G4. The driving element 3-52D4 may overlap a portion of the driving element 3-52H4 or the entire driving element 3-52H4. Therefore, required space in other directions may be reduced to achieve miniaturization.

FIG. 23I and FIG. 23J are schematic views of the optical element driving mechanism 3-100E viewed in different directions. The optical element driving mechanism 3-100E includes driving elements 3-52A5, 3-52B5, 3-52C5, and 3-52D5. The difference between the optical element driving mechanism 3-100E and the optical element driving mechanisms 3-100A, 3-100B, 3-100C, 3-100D is that the driving elements 3-52A5, 3-52B5, 3-52C5, and 3-52D5 of the optical element driving mechanism 3-100E only arranged as a single layer, i.e. on an identical XY plane. For example, at least two of the driving elements 3-52A5, 3-52B5, 3-52C5, and 3-52D5 overlap each other in the direction that the main axis 3-O extends. Therefore, the required number of elements in the optical element driving mechanism 3-100E may be reduced to achieve miniaturization. Furthermore, the contact units 3-525 of the driving elements 3-52A5, 3-52B5, 3-52C5, and 3-52D5 are positioned at the sides of the fixed portion 3-F and are close to the center of the sides. Therefore, the movable portion 3-M in the optical element driving mechanism 3-100 may be moved further in the X or Y directions.

FIG. 23K and FIG. 23L are schematic views of the optical element driving mechanism 3-100F viewed in different directions. The optical element driving mechanism 3-100F includes driving elements 3-52A6, 3-52B6, 3-52C6, and 3-52D6. The difference between the optical element driving mechanism 3-100F and the optical element driving mechanisms 3-100A, 3-100B, 3-100C, 3-100D is that the driving elements 3-52A6, 3-52B6, 3-52C6, and 3-52D6 of the optical element driving mechanism 3-100F only arranged as a single layer, i.e. on an identical XY plane. For example, at least two of the driving elements 3-52A6, 3-52B6, 3-52C6, and 3-52D6 overlap each other in the direction that the main axis 3-O extends. Therefore, the required number of elements in the optical element driving mechanism 3-100F may be reduced to achieve miniaturization. Furthermore, the contact units 3-525 of the driving elements 3-52A6, 3-52B6, 3-52C6, and 3-52D6 are positioned at the corners of the fixed portion 3-F. Therefore, the movable portion 3-M in the optical element driving mechanism 3-100 may be rotated further relative to the main axis 3-O to enhance the performance of optical image stabilization.

FIG. 23M and FIG. 23N are schematic views of the optical element driving mechanism 3-100G viewed in different directions. The optical element driving mechanism 3-100G includes driving elements 3-52A7, 3-52C7, 3-52E7, and 3-52G7. The difference between the optical element driving mechanism 3-100G and the optical element driving mechanisms 3-100A, 3-100B, 3-100C, 3-100D, 3-100E, and 3-100F is that the driving elements 3-52A7, 3-52C7, 3-52E7, and 3-52G7 of the optical element driving mechanism 3-100G are only positioned at two edges of the fixed portion 3-F, and are not positioned at other two edges. Therefore, the required number of elements in the optical element driving mechanism 3-100G may be reduced to achieve miniaturization. Moreover, the driving element 3-52A7 at least overlaps a portion of or the entire driving element 3-52E7, and the driving element 3-52C7 at least overlaps a portion of or the entire driving element 3-52G7. As a result, the required space in other directions may be reduced. The movable portion 3-M of the optical element driving mechanism 3-100G may be rotated relative to the X axis, the Y axis, and the main axis 3-O to enhance the performance of optical image stabilization.

Figure 24A:
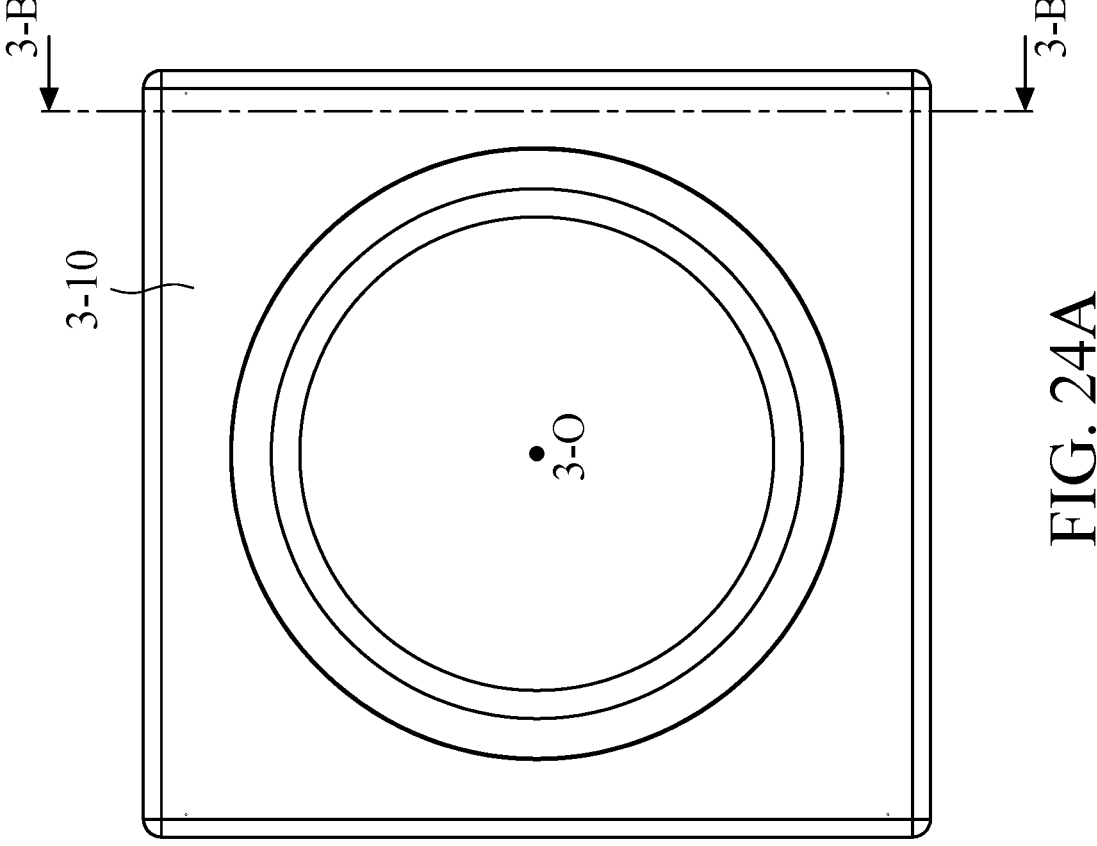
FIG. 24A is a schematic view of an optical element driving mechanism in other embodiments of the present disclosure.
Figure 24B:
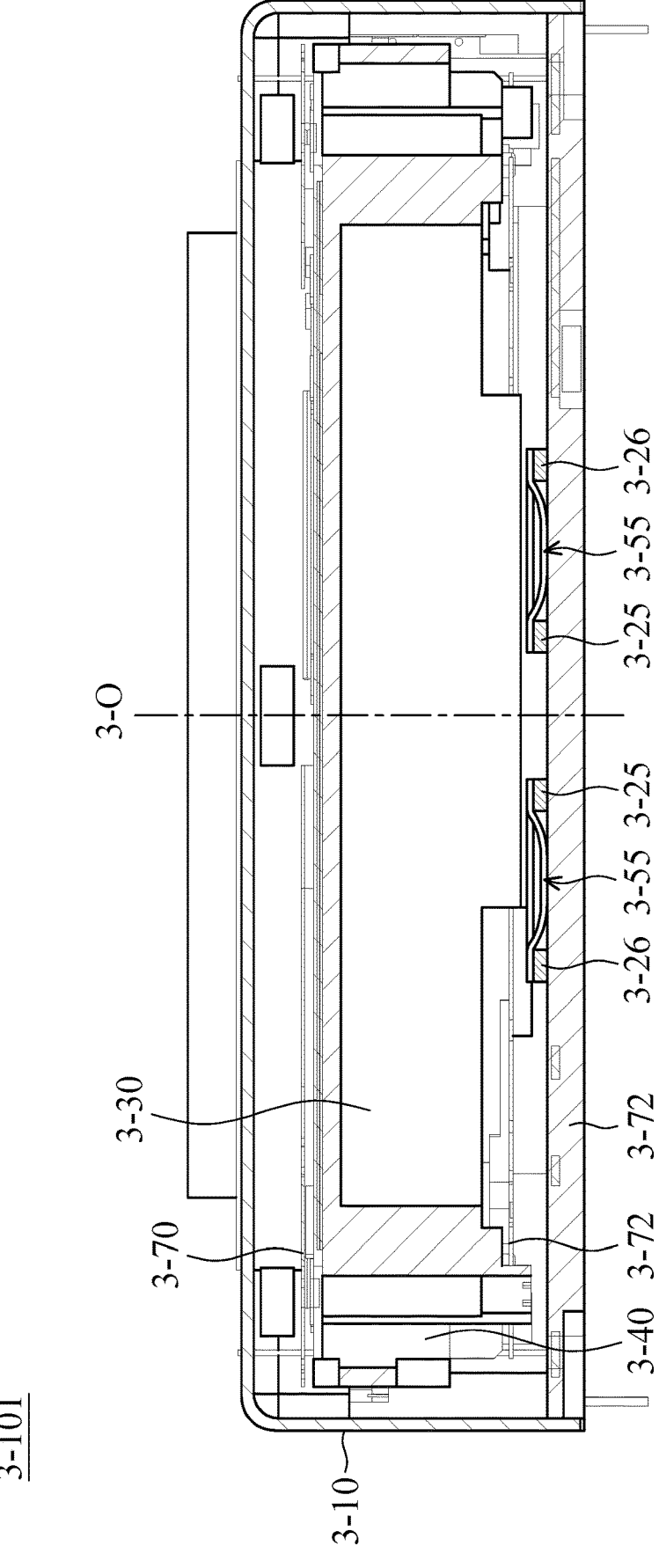
FIG. 24B is a cross-sectional view of the optical element driving mechanism illustrated along the line 3-B-3-B in FIG. 24A.

FIG. 24A is a schematic view of an optical element driving mechanism 3-101 in other embodiments of the present disclosure, and FIG. 24B is a cross-sectional view of the optical element driving mechanism 3-101 illustrated along the line 3-B B in FIG. 24A. As shown in FIG. 24B, the difference between the optical element driving mechanisms 3-101 and 3-100 is that the optical element driving mechanism 3-101 further includes driving elements 3-55 (eighth driving element), and the bottom 3-20 further includes protruding portions 3-25 and 3-26. The detail of the driving element 3-55 may be identical or similar to the driving elements 3-52 or 3-54, and is not repeated here.

In some embodiments, a second circuit element (not shown) may be provided in the protruding portion 3-26 to connect to the first position sensing assembly 3-S1, and an end of the driving element 3-55 (e.g. the connect unit) may be disposed on the protruding portion 3-26. Therefore, the first position sensing assembly 3-S1 may be electrically connected to the driving element 3-55. Moreover, another end of the driving element 3-55 (e.g. the contact unit) may be disposed on the protruding portion 3-25.

The driving element 3-55 may be used for in contact with the holder 3-30 or the bottom 3-20, and the driving unit of the driving element 3-55 may extend in a thirteenth direction (e.g. the X direction, or may be the Y direction as well). The thirteenth direction is not parallel to the first direction (e.g. the Y direction) and the third direction, and is parallel to the second direction (e.g. the X direction). The driving element 3-55 is used for generating an eighth driving force to the holder 3-30 or the frame 3-40. The direction of the eighth driving force may be the Z direction, and is parallel to the eleventh direction (e.g. the Z direction) and is not parallel to the thirteenth direction.

Figure 24C:
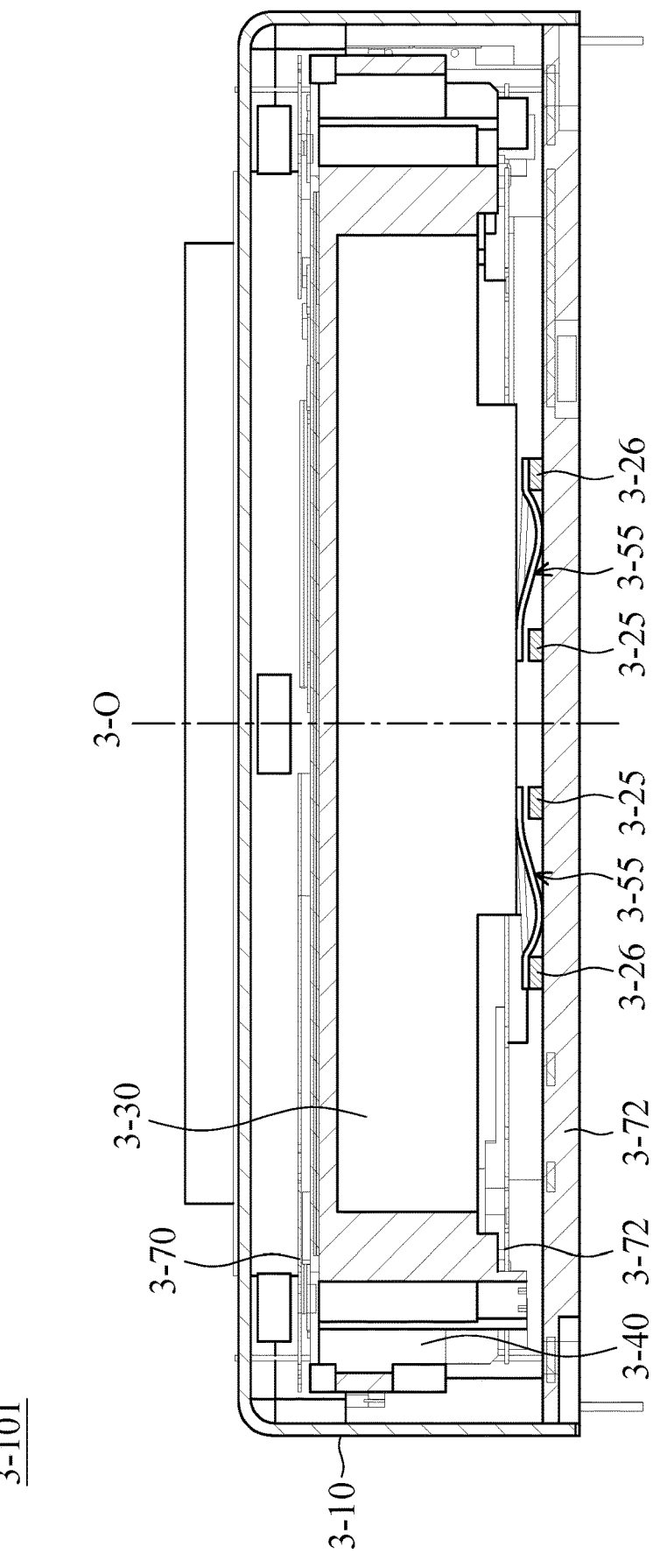
FIG. 24C is a schematic view when the driving element is operating.

FIG. 24C is a schematic view when the driving element 3-55 is operating. An end of the driving element 3-55 will be affixed on the protruding portion 3-26, and another end of the driving element 3-55 that is disposed on the protruding portion 3-25 will leave the protruding portion 3-25 to be in contact with the holder 3-30 (or may in contact with the frame 3-40 as well). Therefore, the movable portion 3-M and the optical element disposed therein will be moved along the main axis 3-O to achieve auto focus.

In summary, an optical element driving mechanism is provided in some embodiments of the present disclosure. The optical element driving mechanism includes a movable portion, a fixed portion, a driving assembly, and a stopping assembly. The movable portion is used to hold an optical element, and is movable relative to the fixed portion. The driving assembly is used to drive the movable portion to move relative to the fixed portion. The stopping assembly is used to limit the movable portion to move in a maximum movable range relative to the fixed portion.

Figure 25:
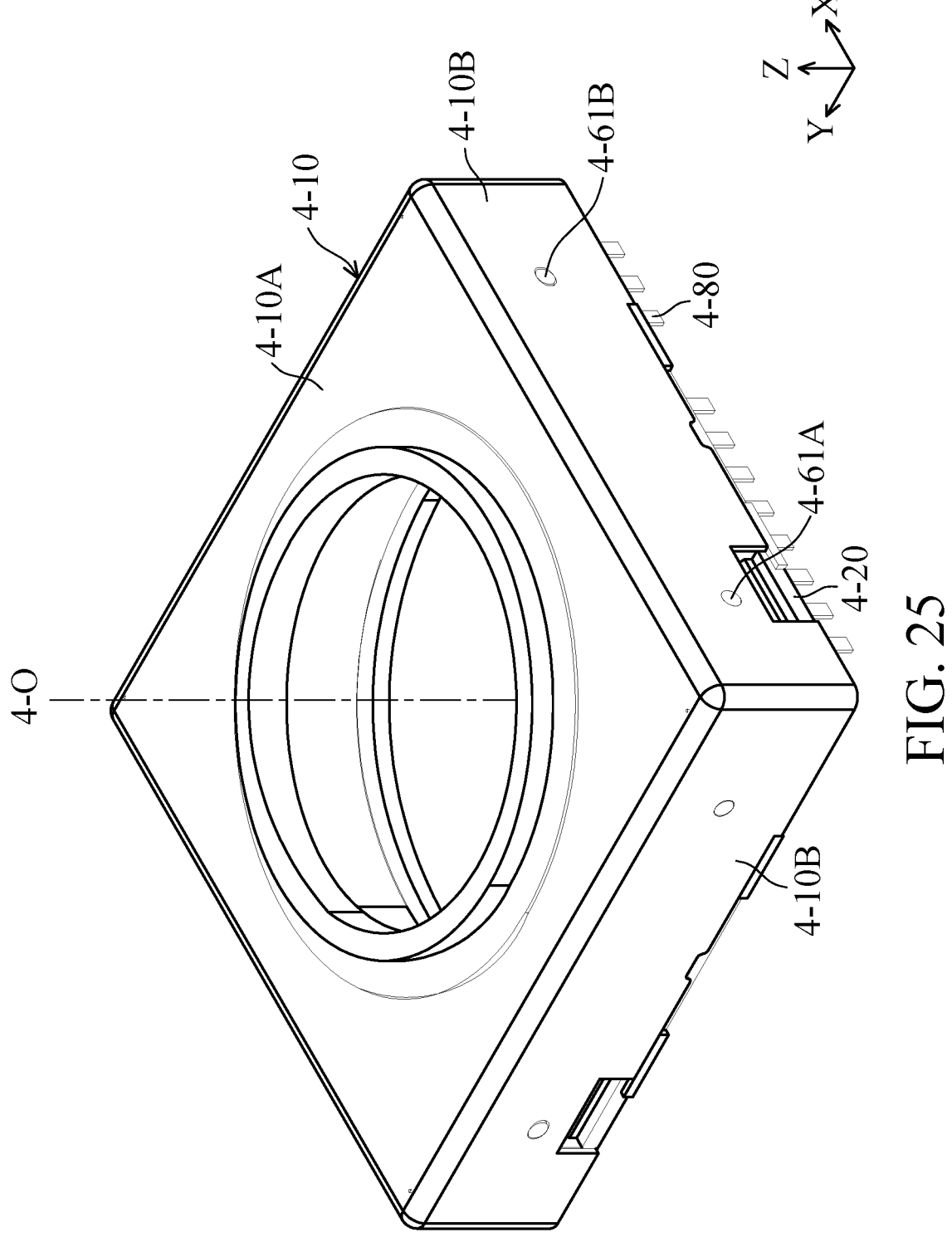
FIG. 25 is a schematic view of an optical element driving mechanism in some embodiments of the present disclosure.
Figure 26:
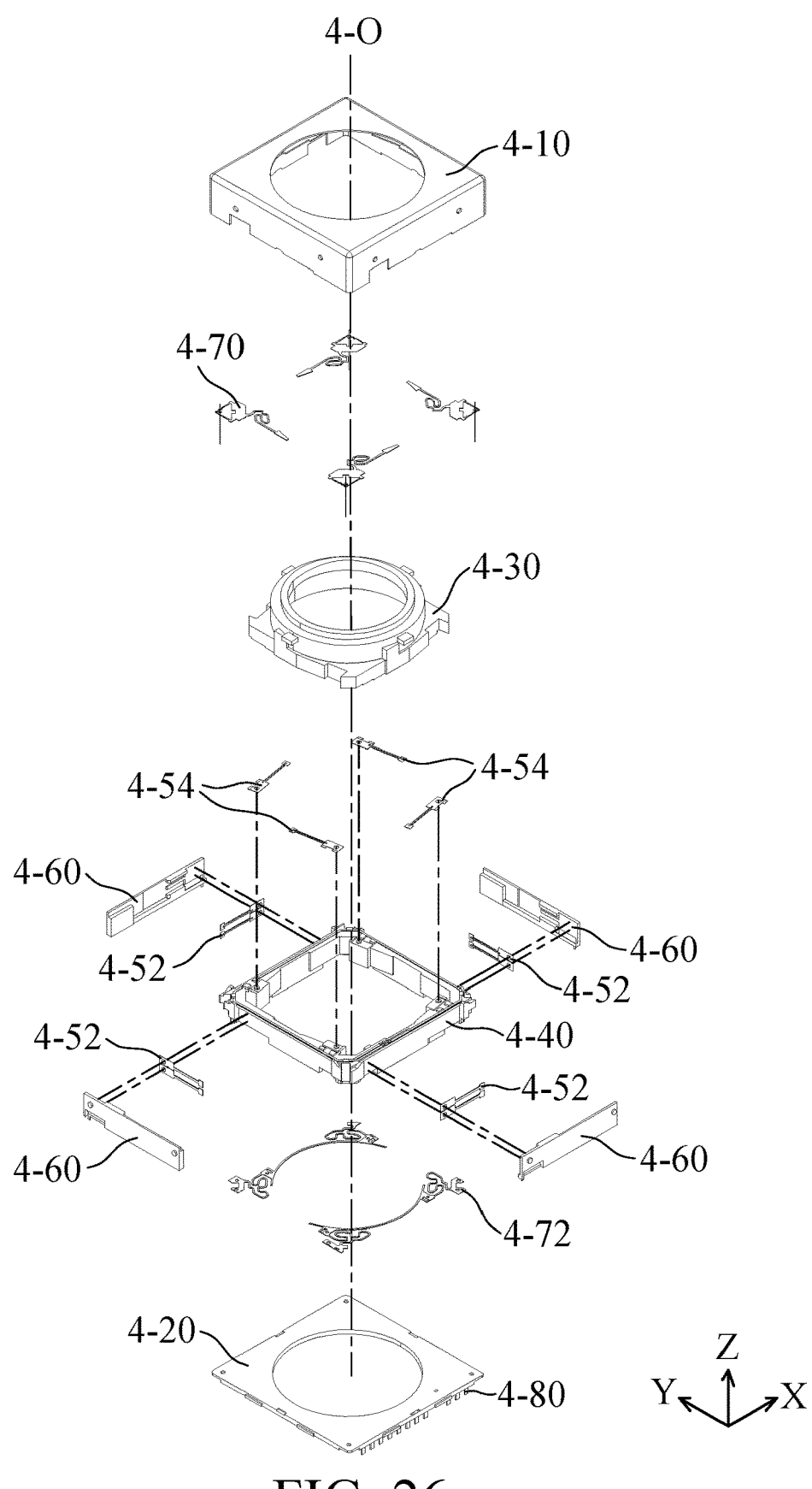
FIG. 26 is an exploded view of the optical element driving mechanism.
Figure 27:
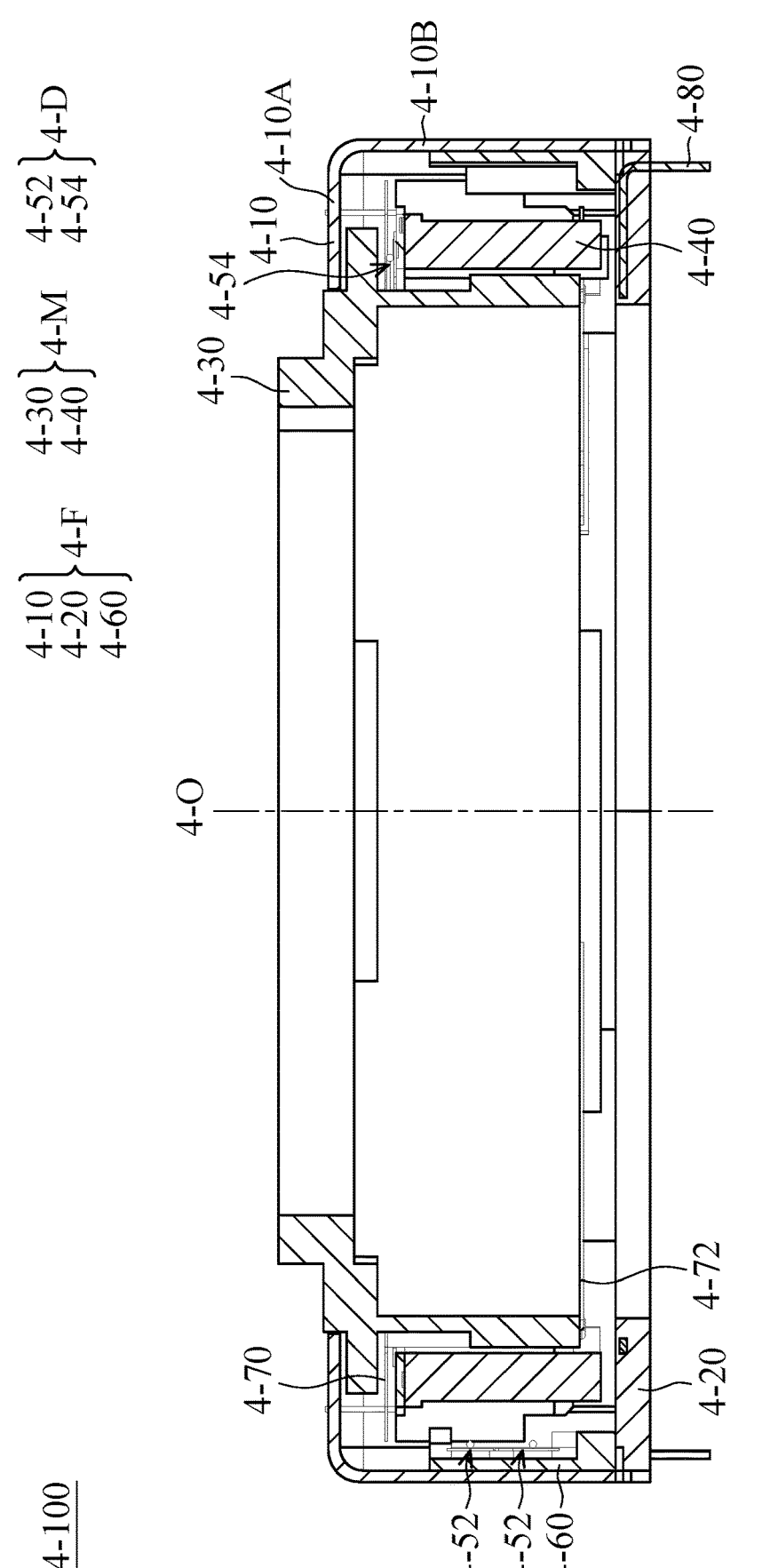
FIG. 27 is a cross-sectional view of the optical element driving mechanism.
Figure 28A:
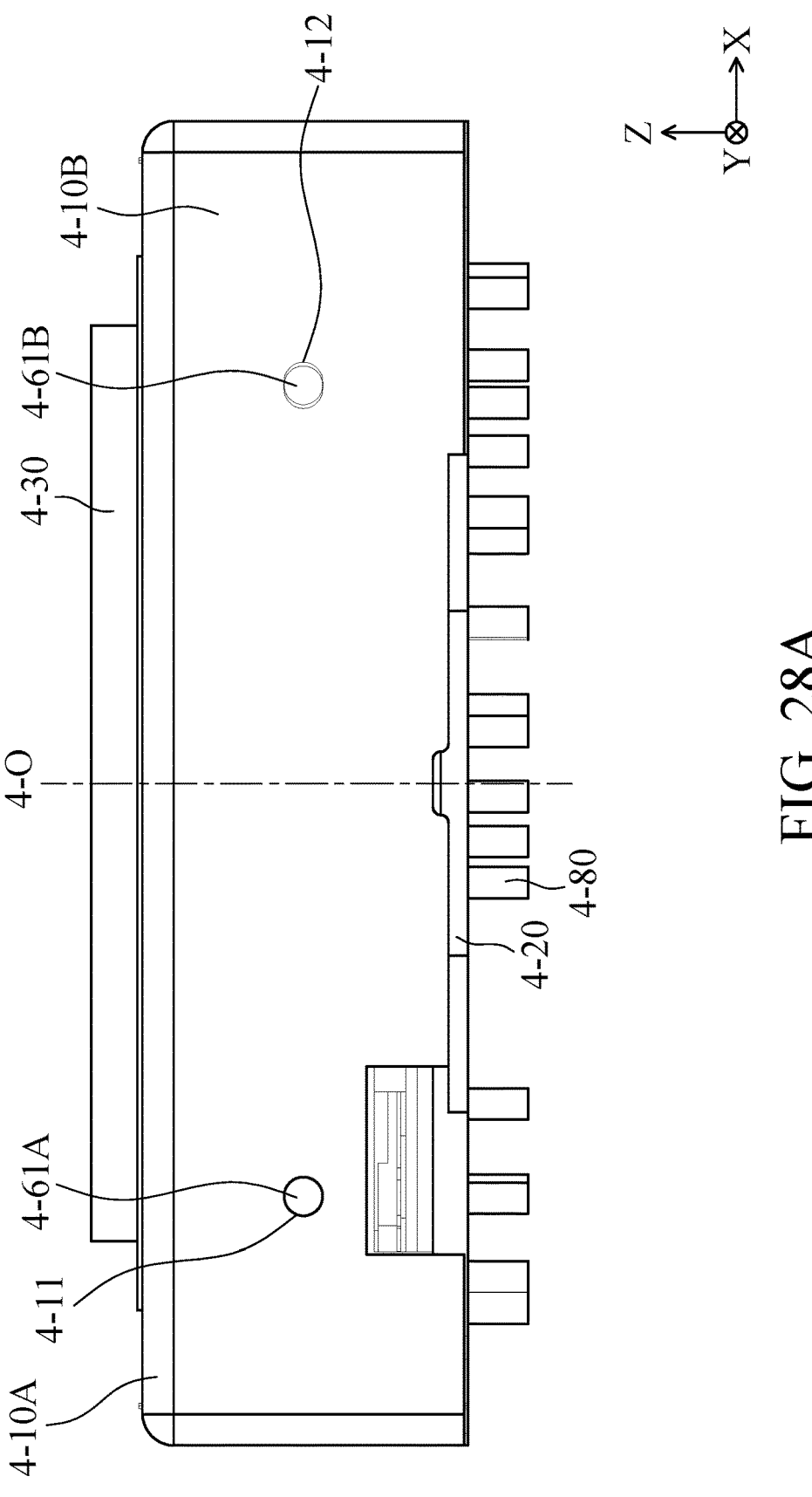
FIG. 28A is a side view of the optical element driving mechanism.
Figure 28B:
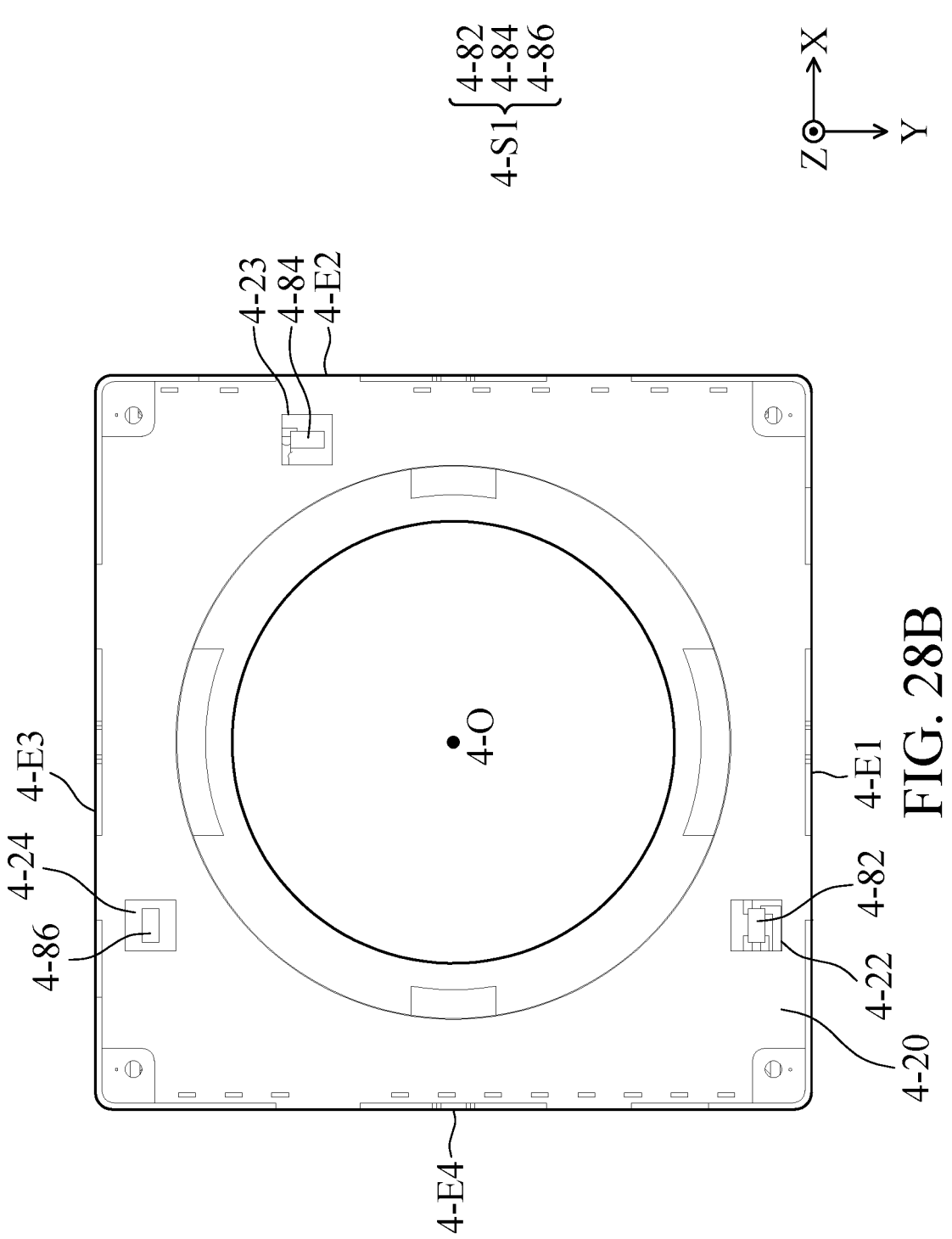
FIG. 28B is a bottom view of the optical element driving mechanism.

Refer to FIG. 25 to FIG. 28B. FIG. 25 is a schematic view of an optical element driving mechanism 4-100 in some embodiments of the present disclosure. FIG. 26 is an exploded view of the optical element driving mechanism 4-100. FIG. 27 is a cross-sectional view of the optical element driving mechanism 4-100. FIG. 28A is a side view of the optical element driving mechanism 4-100. FIG. 28B is a bottom view of the optical element driving mechanism 4-100.

As shown in FIG. 26, the optical element driving mechanism 4-100 may mainly include a case 4-10, a bottom 4-20, a holder 4-30, a frame 4-40, a driving element 4-52, a driving element 4-54, a base unit 4-60, a first resilient element 4-70, a second resilient element 4-72. The case 4-10, the bottom 4-20, and the base unit 4-60 may be called as a fixed portion 4-F. The holder 4-30 and the frame 4-40 may be called as a movable portion 4-M. The driving elements 4-52 and 4-54 may be called as a driving assembly 4-D.

The movable portion 4-M may use for holding an optical element (not shown) and is movable relative to the fixed portion 4-F. The optical element may be a lens, a mirror, a prism, a beam splitter, an aperture, a camera module, or a depth sensor. Furthermore, the driving assembly 4-D may drive the movable portion 4-M to move relative to the fixed portion 4-F. Therefore, the optical element may be driven by the optical element driving mechanism 4-100 to move in different directions, thereby achieving auto focus (AF) or optical image stabilization (OIS).

The case 4-10 and the bottom 4-20 may be combined to form a shell of the optical element driving mechanism 4-100. For example, the bottom 4-20 may be affixed on the case 4-10. It should be noted that a case opening and a bottom opening are formed on the case 4-10 and the bottom

4-20, respectively. The center of the case opening corresponds to an optical axis of the optical element. The base opening corresponds to an image sensor (not shown) disposed outside the optical element driving mechanism 4-100. Therefore, the optical element disposed in the optical element driving mechanism 4-100 may perform focus to the image sensor along the optical axis. Furthermore, when viewed along the main axis 4-O, the fixed portion 4-F has a polygonal structure.

The holder 4-30 has a through hole, and the optical element may be affixed in the through hole. The driving elements 4-52 are disposed between the frame 4-40 and the base unit 4-60, such as disposed on the base unit 4-60. The driving elements 4-54 are disposed between the holder 4-30 and the frame 4-40, such as disposed on the frame 4-40. However, the present disclosure is not limited thereto. For example, the driving element 4-54 may be disposed on the frame 4-40, or the driving element 4-54 may be disposed on the holder 4-30, depending on design requirement.

In this embodiment, the holder 4-60 and the optical element disposed therein are movably disposed in the frame 4-40. More specifically, the holder 4-60 may be connected to and suspended in the frame 4-40 by the first resilient element 4-70 and the second resilient element 4-72 made of a metal material, for example. When current is applied to the driving element 4-52, the driving element 4-52 will move the holder 4-30, the frame 4-40, and the optical element to move relative to the fixed portion 4-F in different directions to achieve optical image stabilization. When current is applied to the driving element 4-54, the driving element 4-54 will drive the holder 4-30 to move relative to the frame 4-40 along the main axis 4-O to achieve auto focus.

In some embodiments, additional circuits 4-80 may be provided on the bottom 4-20 and electrically connects to electronic elements disposed inside or outside the driving mechanism 4-100 for achieve auto focus or optical image stabilization.

The circuits 4-80 on the bottom 4-20 may transfer electrical signal to the driving elements 4-52, 4-54 through the first resilient element 4-70 or the second resilient element 4-72 to control the movement of the movable portion 4-M in X, Y, or Z directions.

The second resilient element 4-72 may be assembled with the circuits on the bottom 4-20 by soldering or laser welding to allow the driving elements 4-52 and 4-54 connecting to external circuits.

In some embodiments, the case 4-10 may include a top plate 4-10A and sidewalls 4-10B extending from the sides of the top plate 4-10A in the Z direction to the bottom 4-20. The base unit 4-60 may be affixed on the sidewall 4-10B, such as by an adhesive element (not shown). As shown in FIG. 28A, the sidewall 4-10B may include a first position structure 4-11 and a second position structure 4-12, which correspond to a third position structure 4-61A and a fourth position structure 4-61B of the base unit 4-60, respectively. For example, the first position structure 4-11 and the second position structure 4-12 may be openings, and the third position structure 4-61A and the fourth position structure 4-61B may protrude from the base unit 4-60 and in the first position structure 4-11 and the second position structure 4-12, respectively.

In some embodiments, the length of the first position structure 4-11 and the length of the second position structure 4-12 in the X direction are different. Therefore, a maximum gap between the first position structure 4-11 and the third position structure 4-61A is different from a maximum gap between the second position structure 4-12 and the fourth position structure 4-61B. For example, the length of the first position structure 4-11 in the X direction may be less than the length of the second position structure 4-12 in the X direction. Therefore, the maximum gap between the first position structure 4-11 and the third position structure 4-61A is greater than the maximum gap between the second position structure 4-12 and the fourth position structure 4-61B. In some embodiments, the adhesive element may be disposed in the first position structure 4-11 and the second position structure 4-12, and in direct contact with the third position structure 4-61A and the fourth position structure 4-61B. Therefore, the relative position of the case 4-10 and the base unit 4-60 may be affixed. In some embodiments, the adhesive element may be glue.

In some embodiments, as shown in FIG. 28B, a first position sensor 4-82, a second position sensor 4-84, and a third position sensor 4-86 may be disposed in the optical element driving mechanism 4-100, and corresponding magnetic elements (not shown) may be disposed on the movable portion 4-M. For example, the bottom 4-20 may have openings 4-22, 4-23, 4-24, and the first position sensor 4-82, the second position sensor 4-84, and the third position sensor 4-86 may be disposed in the openings 4-22, 4-23, 4-24, respectively. Therefore, the movement of the movable portion 4-M relative to the fixed portion 4-F in different dimensions may be detected. For example, the movement of the frame 4-40 relative to the fixed portion 4-F may be detected. In some embodiments, the first position sensor 4-82, the second position sensor 4-84, and the third position sensor 4-86 may be called as a first position sensing assembly 4-S1.

The first position sensor 4-82, the second position sensor 4-84, and the third position sensor 4-86 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the first position sensor 4-82 may be used to detect the movement of the frame 4-40 relative to the fixed portion 4-F in a first dimension, the second position sensor 4-84 may be used to detect the movement of the frame 4-40 relative to the fixed portion 4-F in a second dimension, the third position sensor 4-86 may be used to detect the movement of the frame 4-40 relative to the fixed portion 4-F in a third dimension. In some embodiments, the movement in the first dimension may be a movement in an eighth direction (e.g. X direction), the movement in the second dimension may be a movement in a ninth direction (e.g. Y direction), the movement in the third dimension may be a movement in a tenth direction (e.g. Y direction). In some embodiments, the eighth direction may be not parallel to the ninth direction or the tenth direction, and the ninth direction may be parallel to the tenth direction.

Moreover, the first position sensing assembly 4-S1 may be used for detecting the movement of the movable portion 4-M relative to the fixed portion 4-F. For example, the movement in the fourth dimension may be a rotation relative to an axis extending in a eleventh direction (the extending direction of the main axis 4-O). In other words, the movement in the fourth dimension may be the rotation where the rotational axis is the main axis 4-O. It should be noted that the eleventh direction (e.g. the Z direction) may be not parallel to the eighth direction (e.g. the X direction). For example, the eleventh direction may be perpendicular to the eighth direction. The eleventh direction may be not parallel to the ninth direction (e.g. the Y direction). For example, the eleventh direction may be perpendicular to the ninth direction. The eleventh direction may be not parallel to the tenth direction (e.g. the Y direction). For example, the eleventh direction may be perpendicular to the tenth direction.

As shown in FIG. 28B, when viewed along the main axis 4-O, the fixed portion has a first edge 4-E1, a second edge 4-E2, a third edge 4-E3, and a fourth edge 4-E4. The first position sensor 4-82 is at the first edge 4-E1, the second position sensor 4-84 is at the second edge 4-E2, and the third position sensor 4-86 may at the first edge 4-E1 or the third edge 4-E3. For example, the third position 4-86 may be disposed at the third edge 4-E3 in FIG. 28B, but it is not limited thereto. In other embodiments, the third position sensor 4-86 may be disposed at the first side 4-E1. The movement of the movable portion 4-M relative to the fixed portion 4-F in the fourth dimension may be detected by the first position sensor 4-82, the second position sensor 4-84, and the third position sensor 4-86. In some embodiments, the movement of the movement of the movable portion 4-M relative to the fixed portion 4-F in the first dimension may be detected by the first position sensor 4-82 and the second position sensor 4-84 of the first position sensing assembly 4-S1 to achieve more accurate result.

Figure 29A:
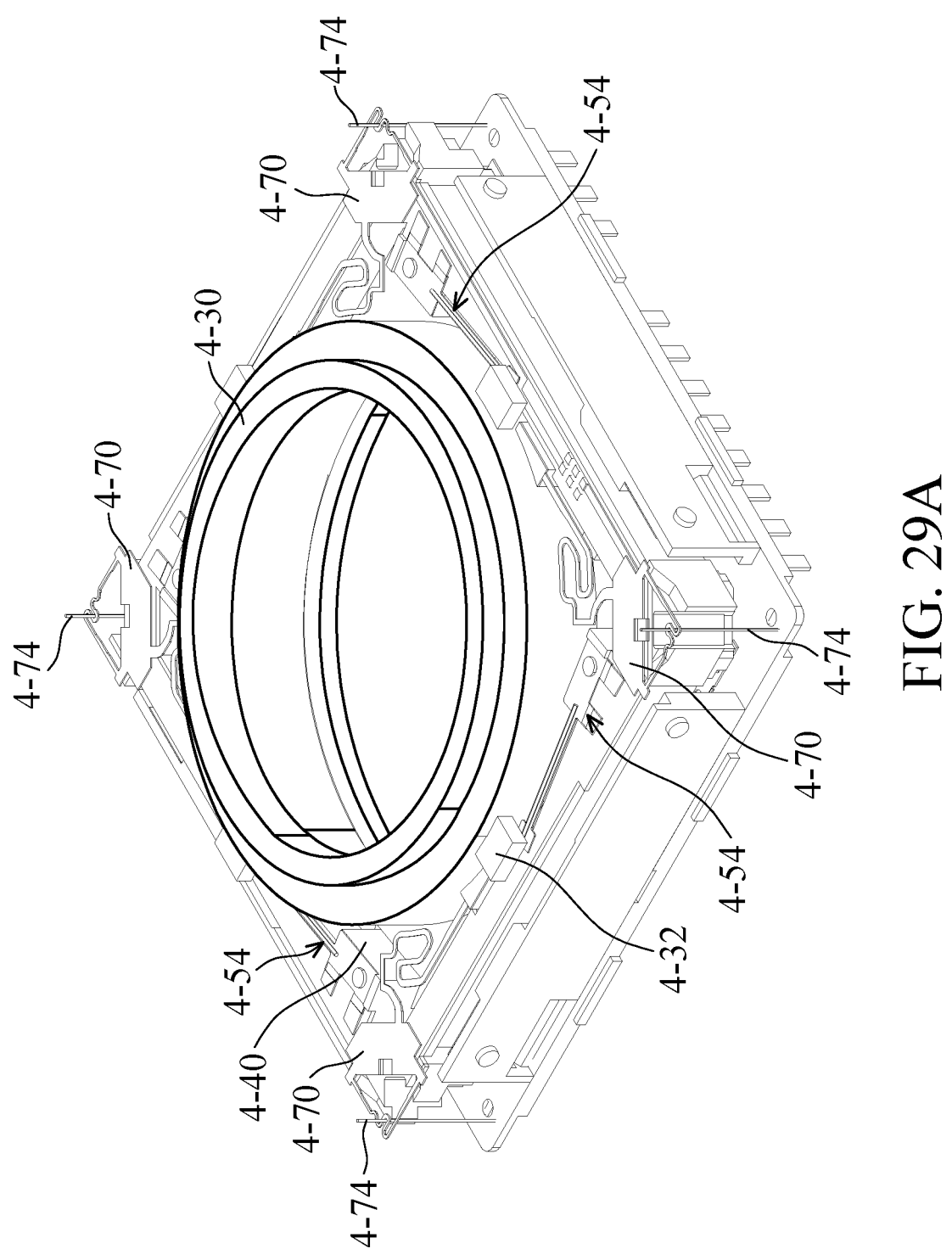
FIG. 29A is a schematic view of the optical element driving mechanism, wherein the case is omitted.
Figure 29B:
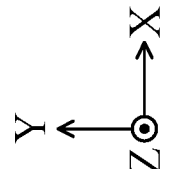
FIG. 29B is a top view of FIG. 29A.
Figure 29C:
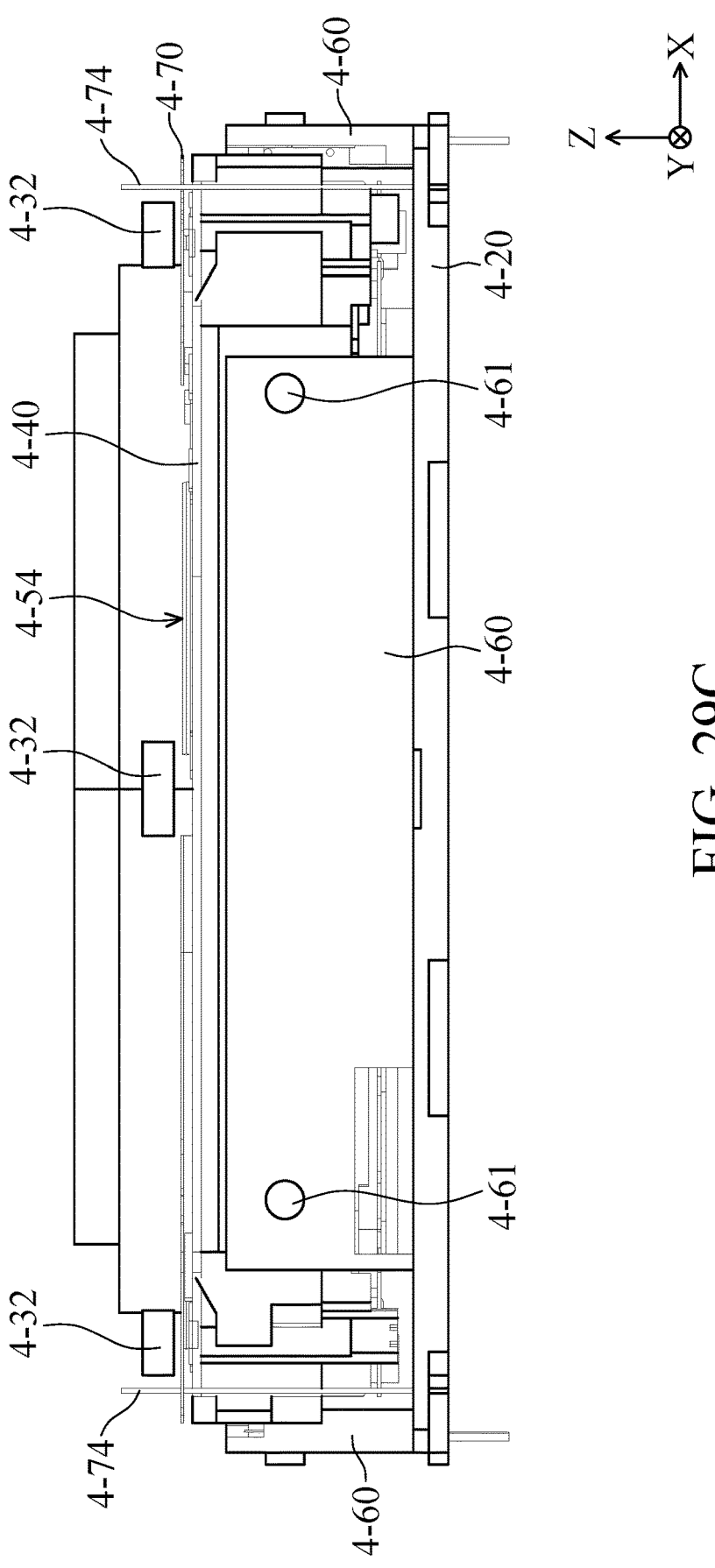
FIG. 29C is a side view of FIG. 29A.
Figure 29D:
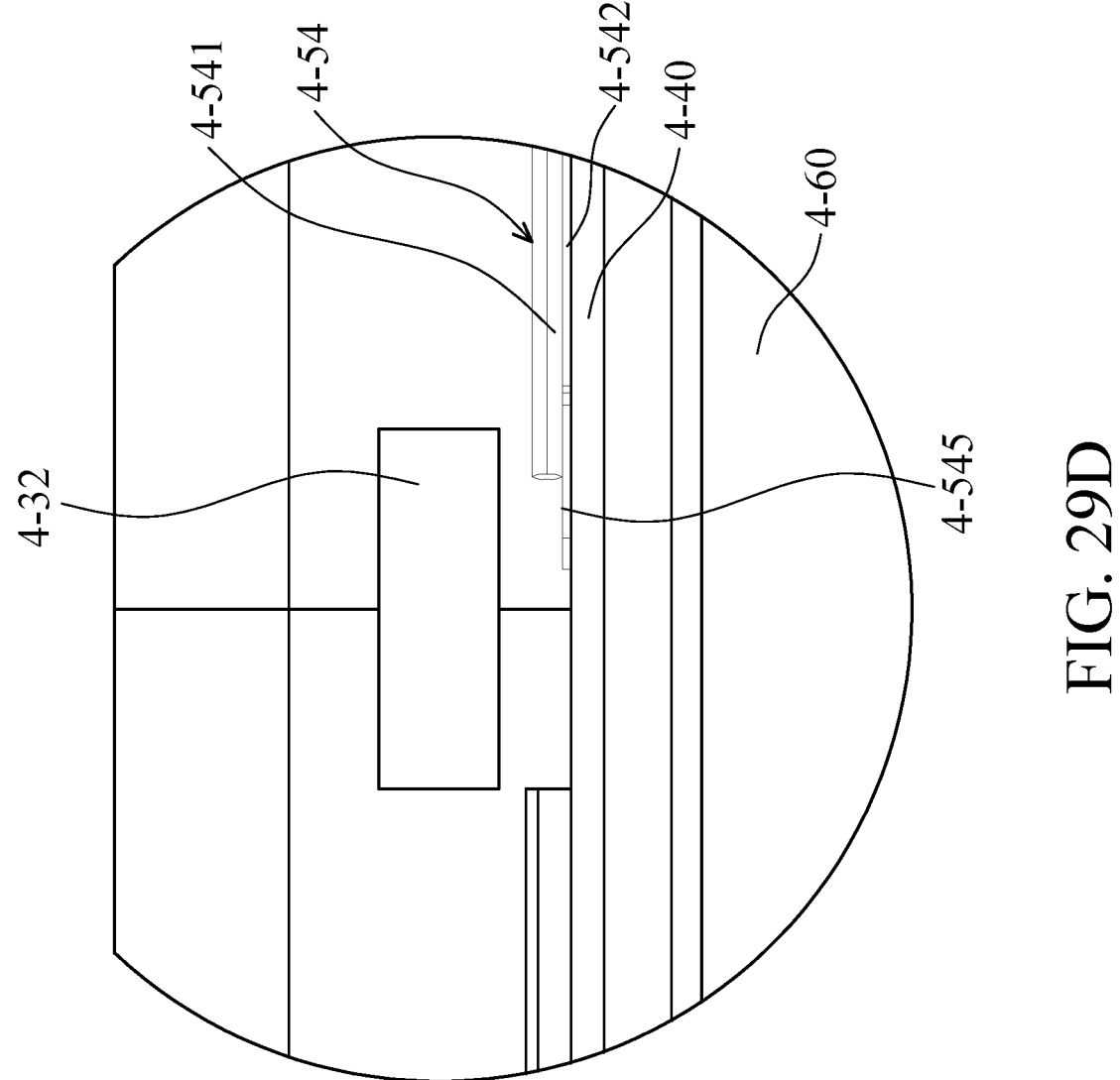
FIG. 29D is an enlarged view of FIG. 29C.

FIG. 29A is a schematic view of the optical element driving mechanism 4-100, wherein the case 4-10 is omitted. FIG. 29B is a top view of FIG. 29A. FIG. 29C is a side view of FIG. 29A. FIG. 29D is an enlarged view of FIG. 29C. The optical element driving mechanism 4-100 may further include third resilient elements 4-74 at the corners of the optical element driving mechanism 4-100. The third resilient elements 4-74 are used for movably connect the frame 4-40 and the fixed portion 4-F, so the frame 4-40 and the movable portion 4-30 disposed in the frame 4-40 may be suspended in the fixed portion 4-F. Moreover, the third resilient element 4-74 may in direct contact with the first resilient element 4-70 and the circuit 4-80 to allow the driving element 4-54 electrically connected to external environment through the first resilient element 4-70, the third resilient element 4-74, and the circuit 4-80.

As shown in FIG. 29B, when viewed along the main axis 4-O, the fixed portion 4-F is polygonal, and the third resilient element 4-74 may at the corners of the fixed portion 4-F and electrically connected to the circuit disposed in the bottom 4-20, and electrically connected to the first resilient element 4-70. Moreover, the first resilient element 4-70 may be plate-shaped, the third resilient element 4-74 may be linear-shaped, and the extension direction of the third resilient element 4-74 (the Z direction) may be parallel to the thickness direction of the first resilient element 4-70 (the Z direction).

Furthermore, the holder 4-30 may have extending portions 4-32 that extends from the radial external surface of the holder 4-30 along a direction that is perpendicular to the main axis 4-O. Moreover, as shown in FIG. 29B to FIG. 29D, the extending portion 4-32 at least overlaps a portion of the driving element 4-54 in a direction that the main axis 4-O extends. For example, the extending portion 4-32 and the contact unit 4-545 may arranged in the direction that the main axis 4-O extends. Therefore, the extending portion 4-32 may be pushed by the driving element 4-54 to allow the holder 4-30 moving in the direction that the main axis 4-O extends to achieve auto focus. How the extending portion 4-32 is pushed by the driving element 4-54 will be described later. Moreover, in the direction that the main axis 4-O extends, the driving element 4-54 may be not overlap the first resilient element 4-70 to reduce the size of the optical element driving mechanism 4-100 in the Z direction, so miniaturization may be achieved.

Figure 29E:
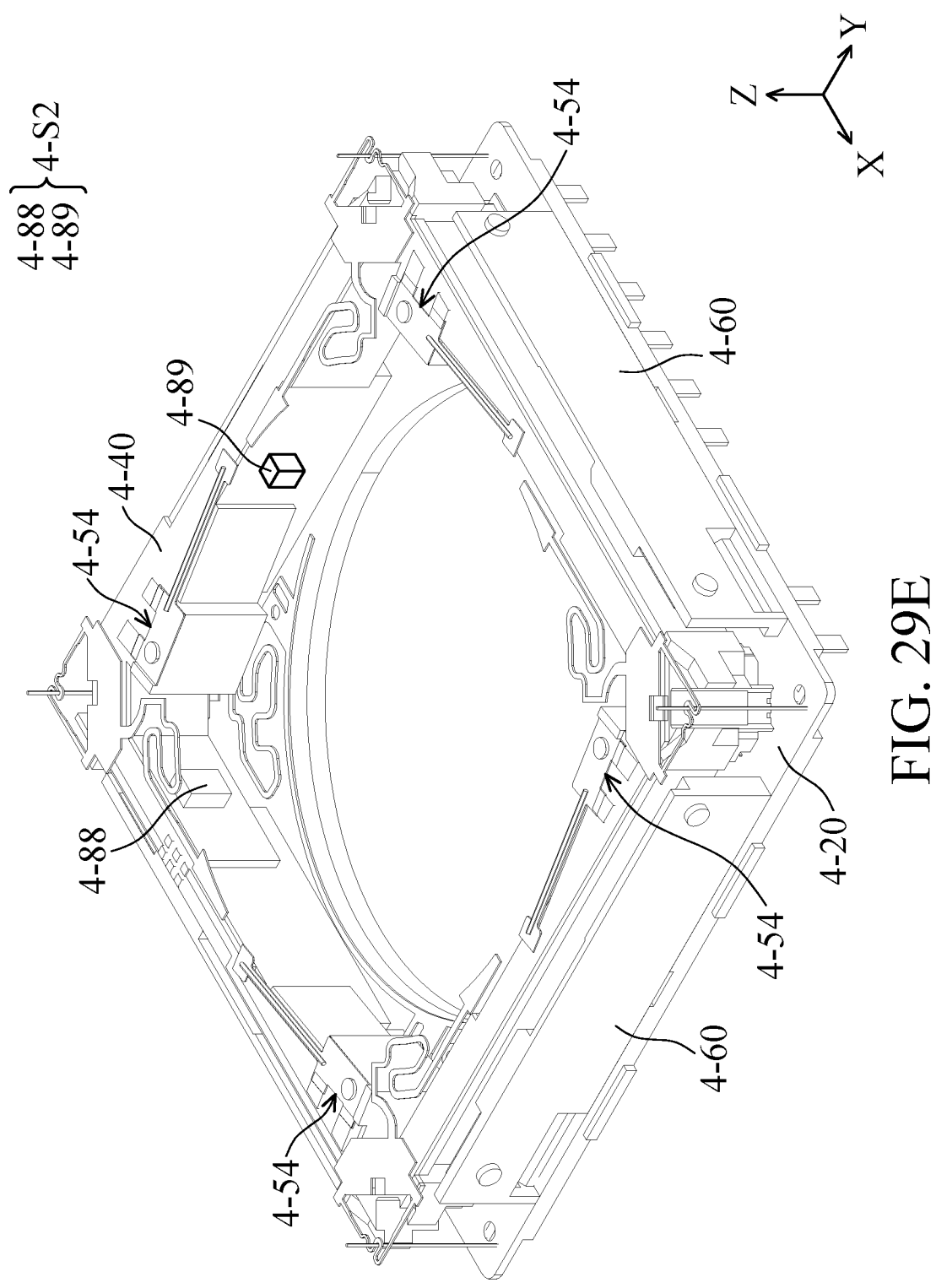
FIG. 29E is a schematic view of the elements in FIG. 29A, wherein the holder is omitted.

FIG. 29E is a schematic view of the elements in FIG. 29A, wherein the holder 4-30 is omitted. As shown in FIG. 29E, the optical element driving mechanism 4-100 may further includes a second position sensing assembly 4-S2. The second position sensing assembly 4-S2 may include a fourth position sensor 4-88 and a fifth position sensor 4-89 disposed on the frame 4-40, and corresponding magnetic elements (not shown) disposed on the holder 4-30. Therefore, when the holder 4-30 moves relative to the frame 4-40, the fourth position sensor 4-88 and the fifth position sensor 4-89 may detect the magnetic field variation of the magnetic element disposed on the holder 4-30 when the holder 4-30 is moving, so the movement of the holder 4-30 relative to the frame 4-40 may be detected.

In other words, the second position sensing assembly 4-S2 may be used for detecting the movement of the holder 4-30 relative to the frame 4-40. For example, the second position sensing assembly 4-S2 may be used for detecting the movement of the holder 4-30 relative to the frame 4-40 in a fifth dimension. It should be noted that the movement of the fifth dimension may be the movement in a twelfth direction (e.g. the Z direction). The twelfth direction may be not parallel to the eighth direction (e.g. the X direction), or the twelfth direction may be perpendicular to the eighth direction. The twelfth direction may be not parallel to the ninth direction (e.g. the Y direction), or the twelfth direction may be perpendicular to the ninth direction. The twelfth direction may be not parallel to the tenth direction (e.g. the Y direction), or the twelfth direction may be perpendicular to the tenth direction. The twelfth direction may be parallel to the eleventh direction (e.g. the Z direction). Moreover, as shown in FIG. 29E, at least a portion of the first resilient element 4-70 is affixed on the base unit 4-60.

Figure 29F:
FIG. 29F is a schematic view of a first position sensor, a second position sensor, a third position sensor, and a fourth position sensor in the optical element driving mechanism.
Figure 29F:
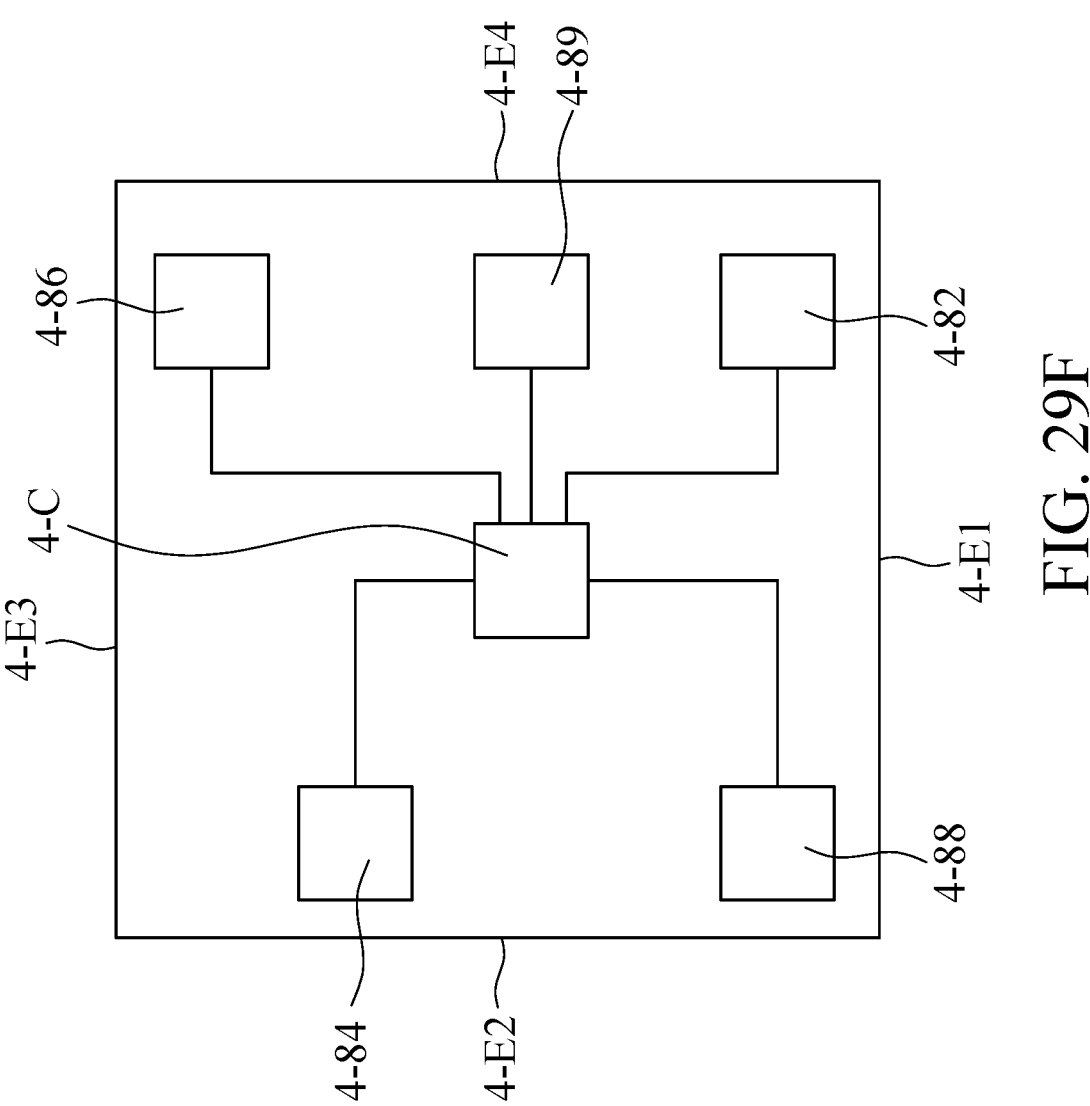

FIG. 29F is a schematic view of the first position sensor 4-82, the second position sensor 4-84, the third position sensor 4-86, the fourth position sensor 4-88, and the fifth position sensor 4-89. When viewed in the direction that the main axis 4-O extends, as shown in FIG. 29F, the fourth position sensor 4-88 of the second position sensing assembly 4-S2 is at a corner of the fixed portion 4-F, wherein the corner is formed by the first edge 4-E1 and the second edge 4-E2. Moreover, when viewed in the direction that the main axis 4-O extends, the second position sensing assembly 4-S2 (the fourth position sensor 4-88 and the fifth position sensor 4-89) does not overlap the first position sensing assembly 4-S1 (the first position sensor 4-82, the second position sensor 4-84, and the third position sensor 4-86). Therefore, magnetic interference between the position sensors and their corresponding magnetic elements may be prevented, so the accuracy may be enhanced.

Figure 30A:
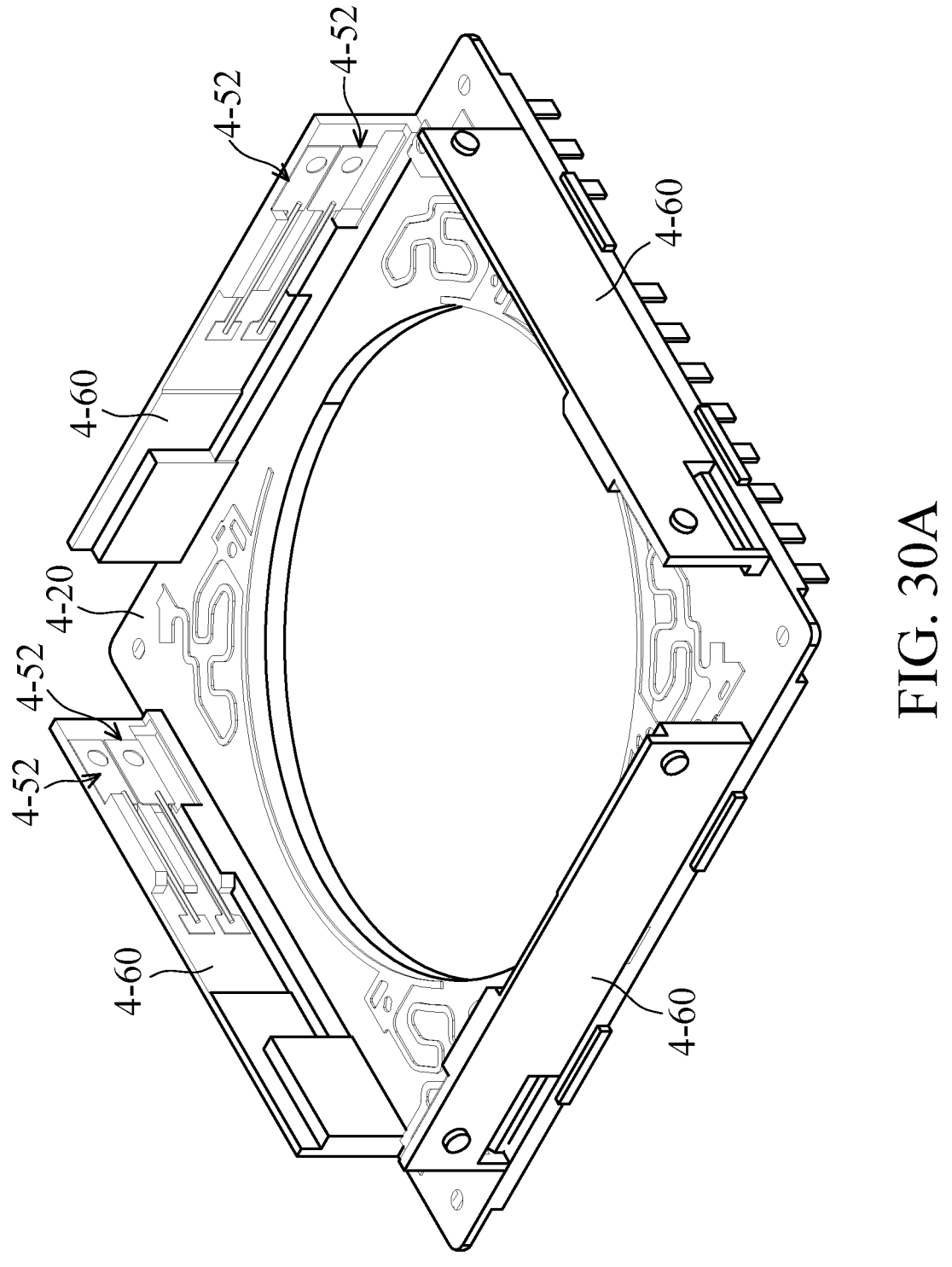
FIG. 30A is a schematic view of some elements of the optical element driving mechanism.
Figure 30B:
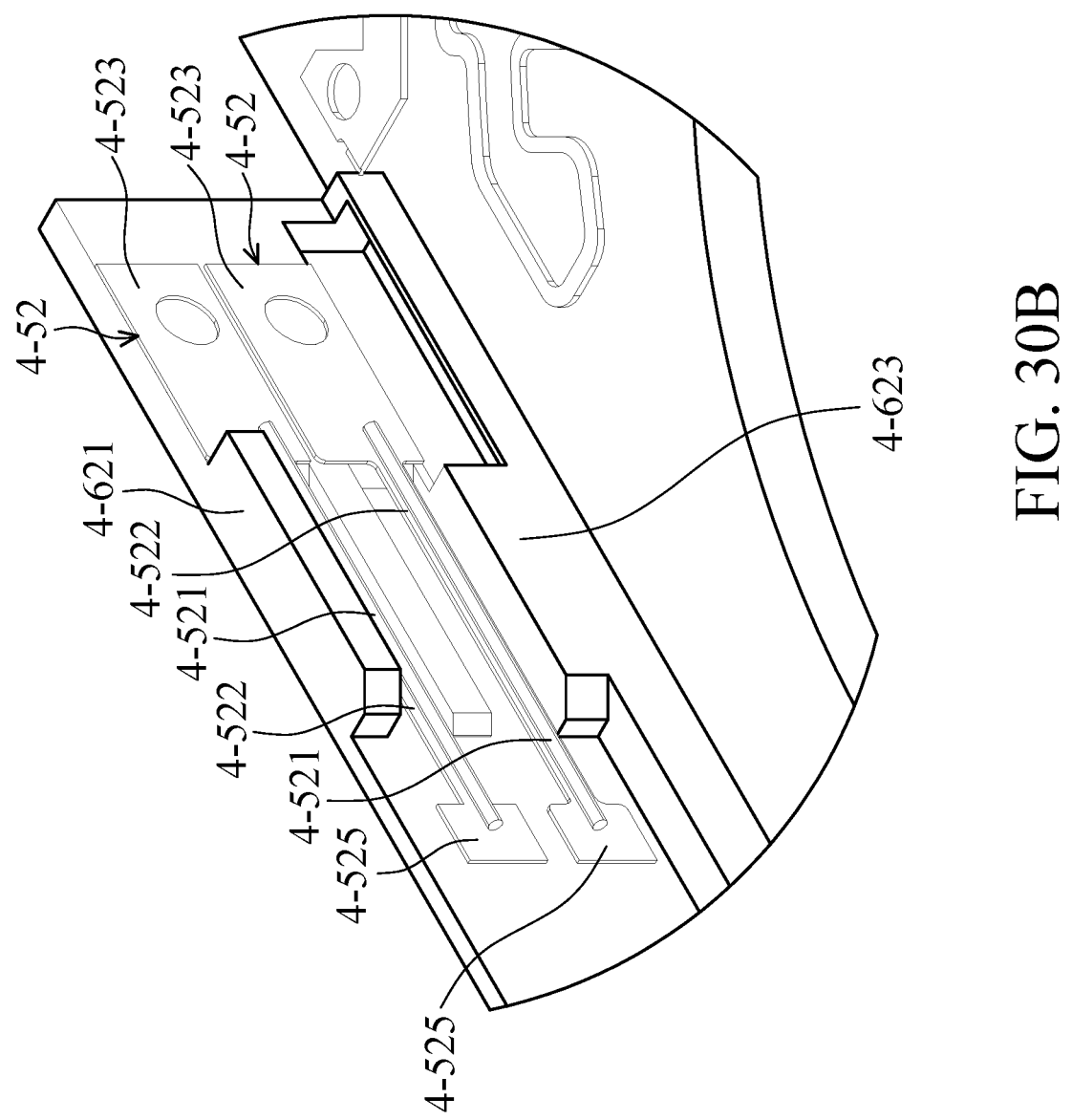
FIG. 30B is an enlarged view of FIG. 30A.
Figure 30C:
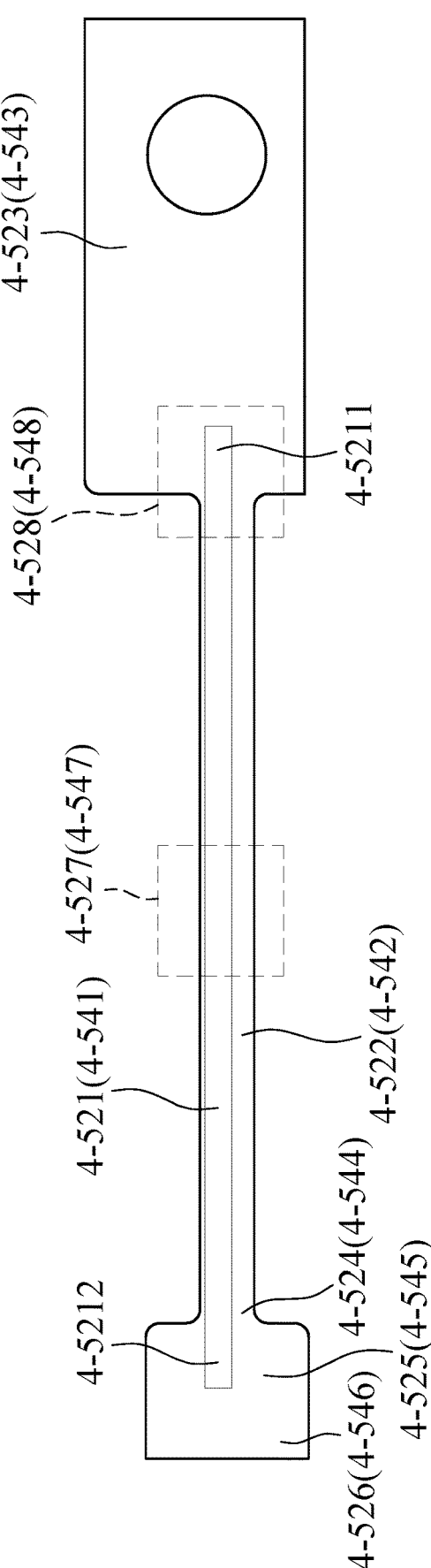
FIG. 30C is a schematic view of a driving element.

FIG. 30A is a schematic view of some elements in the optical element driving mechanism 4-100, FIG. 30B is an enlarged view of FIG. 30A, and FIG. 30C is a schematic view of the driving element 4-52 or 4-54. In some embodiments, as shown in FIG. 30A and FIG. 30B, the optical element driving mechanism 4-100 may have the driving element 4-52 on one of the base units 4-60, and more than one driving elements 4-52 may be disposed on the base unit 4-60 to movement in different direction. For example, the base unit 4-60 may have stopping portions 4-621 and 4-623 (the stopping elements of the stopping assembly) protruding to the frame 4-40 and extending in an extending direction of the driving element 4-52. The driving element 4-52 may be disposed between the stopping portions 4-621 and 4-623. In other words, the driving element 4-52 is surrounded by the stopping portions 4-621 and 4-623 to prevent the driving element 4-52 from being collided.

It should be noted that the stopping portions 4-621 and 4-623 (stopping assembly) are affixed on the base unit 4-60, the base unit 4-60 may be plate-shaped, and the material of the base unit 4-60 may include plastic. When viewed in the thickness direction of the base unit 4-60, the base unit 4-60 may be polygonal (e.g. rectangular), and the stopping portions 4-621 and 4-623 may be position at different edges of the base unit 4-60.

As shown in FIG. 30C, the driving element 4-52 may include a driving unit 4-521, a resilient unit 4-522, a connecting unit 4-523, a buffer unit 4-524, a contact unit 4-525, a contact portion 4-526, and vibration preventing units 4-527 and 4-528. The driving element 4-54 may include a driving unit 4-541, a resilient element 4-542, a connecting unit 4-543, a buffer unit 4-544, a contact unit 4-545, a contact portion 4-546, and vibration preventing units 4-547 and 4-548.

In some embodiments, the material of the driving unit 4-521 may include shape memory alloy (SMA). The driving unit 4-521 may be strip-shaped and extend in a direction. Shape memory alloy is an alloy material that can eliminate a deformation at a lower temperature and restore its original shape before deformation after heating. For example, when the shape memory alloy is subjected to a limited plastic deformation at a temperature lower than the phase transition temperature, the shape of the shape memory alloy may be restored to the original shape by heating.

In some embodiments, when a signal (e.g. voltage or current) is provided to the driving unit 4-521, the temperature may be increased by the thermal effect of a current, so that the length of the driving unit 4-521 may be decreased. On the contrary, if a signal having a lower intensity is provided which makes the heating rate lower than the heat dissipation rate of environment, the temperature of the driving unit 4-521 may be decreased, and the length may be increased.

The driving unit 4-521 may have an end 4-5211 affixed on the connecting unit 4-523 and an end 4-5212 affixed on the contact unit 4-525, and the resilient unit 4-522 is resilient, such as may include metal. Therefore, when the driving unit 4-521 is shrinking, the resilient unit 4-522 may be bent by the driving unit 4-521. Moreover, the driving unit 4-521 and the resilient unit 4-522 may include metal, so the driving unit 4-521 may be electrically connected to the resilient unit 4-522, and the heat generated by the driving unit 4-521 may be dissipated by the resilient unit 4-522. The connecting unit 4-523 may be affixed on the fixed portion 4-F, such as affixed on the base unit 4-60, and the driving element 4-52 may be electrically connected to external environment by the connecting unit 4-523. It should be noted that as shown in FIG. 30B, in the direction that the main axis 4-O extends (FIG. 29B) and in a first direction that the driving unit 4-521 extends, the driving unit 4-521 of the driving element 4-52 at least overlaps a portion of the stopping portions 4-621 and 4-623.

The contact unit 4-525 may be movably connected to the resilient unit 4-521 through the buffer unit 4-524. For example, the buffer unit 4-524 may be a connection point of the resilient unit 4-522 and the contact unit 4-525, and the buffer unit 4-524 may be bent. The resilient unit 4-522 may be strip-shaped, and the contact unit 4-525 may be rectangular or arc-shaped. However, the present disclosure is not limited thereto, and the units may have different directions. The contact unit 4-525 may be used for in contact with the movable portion 4-M (e.g. the frame 4-40) or the fixed portion 4-F (e.g. the base unit 4-60). When the shape of the driving unit 4-521 is changing (e.g. shrinking), the shape of the resilient unit 4-522 may be changed accordingly (e.g. bending), so the contact unit 4-525 will be moved. In some embodiments, the material of the contact unit 4-525 may include metal, such as the resilient unit 4-522, the buffer unit 4-524, and the contact unit 4-525 may be formed as one piece, i.e. having an identical material.

In some embodiments, the contact unit 4-525 further includes a contact portion 4-526 at an end of the contact unit 4-525 that is away from the resilient unit 4-522. Although the contact portion 4-526 is illustrated as one piece, the present disclosure is not limited thereto. For example, in some embodiments, the contact 4-525 may include a plurality of contact portions 4-526, and the contact portions 4-526 may be separated from each other, and connected to each other by the contact unit 4-525. In other words, the contact unit 4-525 and the plurality of contact portions 4-526 may be formed as one piece.

In some embodiments, the vibration preventing unit 4-527 may be disposed between the driving unit 4-521 and the resilient unit 4-522, such as disposed between the center of the driving unit 4-521 and the center of the resilient unit 4-522. The vibration preventing unit 4-528 may be disposed on the end 4-5211 of the driving unit 4-521, and the vibration preventing units 4-527 and 4-528 may be in direct contact with the driving unit 4-521 and the resilient unit 4-522 to absorb the vibration generated by the deformation of the driving unit 4-521 and the resilient unit 4-522, so the driving unit 4-521 and the resilient unit 4-522 may be prevented from being damaged.

In some embodiments, the material of the vibration preventing units 4-527 or 4-528 may include soft resin. In other words, the Young's modulus of the vibration preventing units 4-527 or 4-528 may be less than the Young's modulus of the base unit 4-60.

The structures and functions of the driving unit 4-541, the resilient unit 4-542, the connecting unit 4-543, the buffer unit 4-544, the contact unit 4-545, the contact portion 4-546, the vibration preventing units 4-547 and 4-548 of the driving unit 4-54 are respectively similar or identical to the structures and functions of the driving unit 4-521, the resilient unit 4-522, the connecting unit 4-523, the buffer unit 4-524, the contact unit 4-525, the contact portion 4-526, the vibration preventing units 4-527 and 4-528 of the driving unit 4-24, and are not repeated again.

Figure 30D:
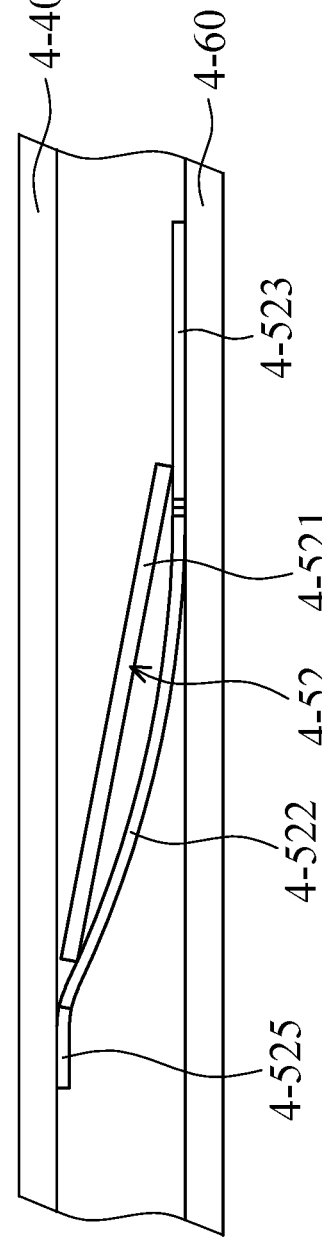
FIG. 30D is a schematic view when the frame is pushed by the driving element relative to a base unit.
Figure 30E:
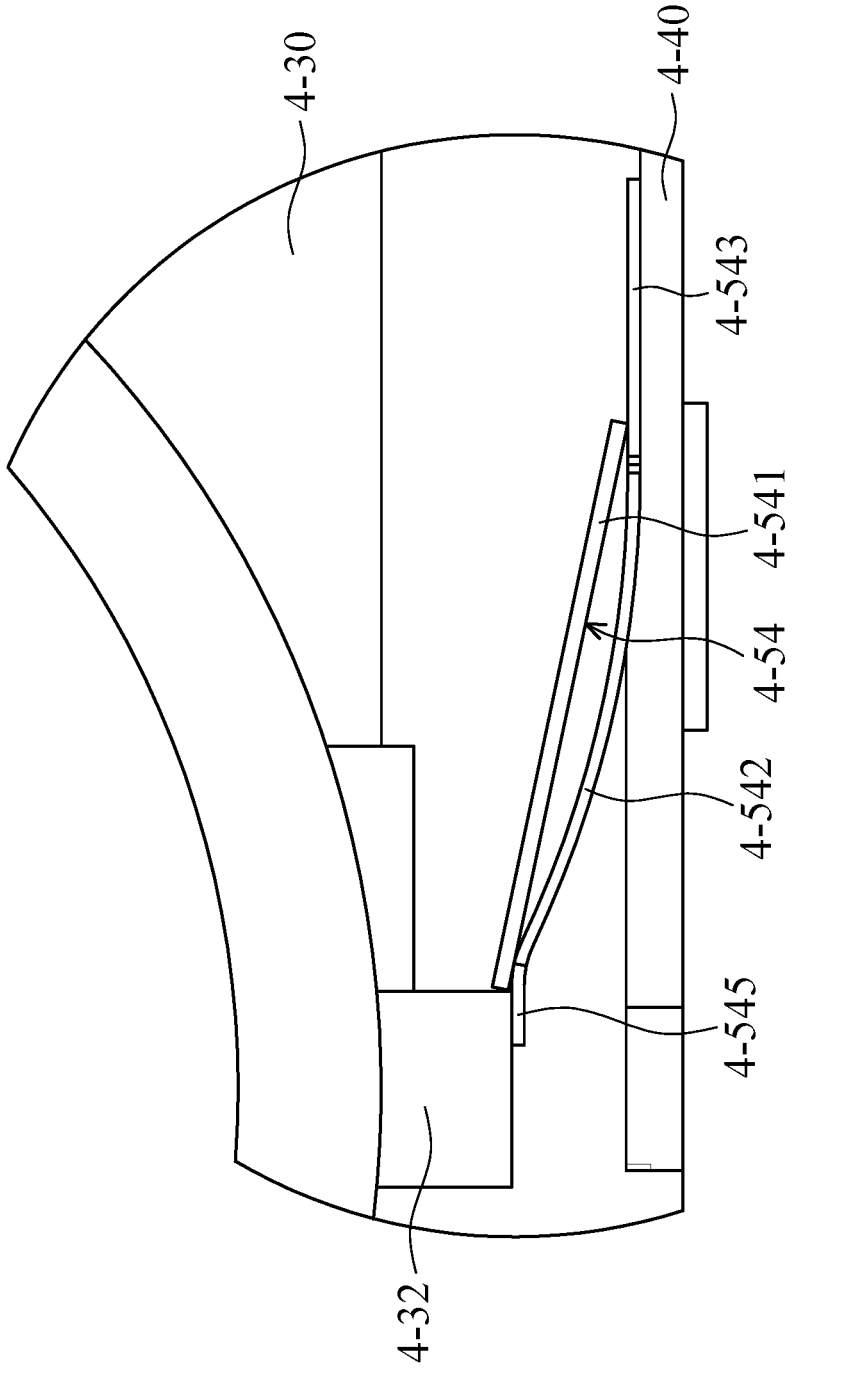
FIG. 30E is a schematic view when the holder is pushed by the driving element relative to the frame.

FIG. 30D is a schematic view when the frame 4-40 is pushed by the driving element 4-52 relative to a base unit 4-60. FIG. 30E is a schematic view when the holder 4-30 is pushed by the driving element 4-54 relative to the frame 4-40. As shown in FIG. 30D, when the driving unit 4-521 of the driving element 4-52 is shrinking, the resilient unit 4-522 may be deformed accordingly. The connecting unit 4-523 is affixed on the base unit 4-60, so only the contact unit 4-525 may be moved by the driving unit 4-521, such as moves to the frame 4-40. When the contact unit 4-525 is moved to in contact with the frame 4-40, a driving force may be applied to the frame 4-40 by the contact unit 4-525. The direction of the driving force (from the base unit 4-60 to the frame 4-40) is different from the extension direction of the driving unit 4-521 when the driving unit 4-521 is static. For example, if the driving unit 4-521 extends in the X direction when static, the direction of the driving force may be the Y direction that is perpendicular to the X direction to allow the frame 4-40 moving in the Y direction.

As shown in FIG. 30E, when the driving unit 4-541 of the driving element 4-54 is shrinking, the resilient unit 4-542 may be deformed accordingly. The connecting unit 4-543 is affixed on the frame 4-40, so only the contact unit 4-545 may be moved by the driving unit 4-541, such as moves to the extending portion 4-32 of the holder 4-30. When the contact unit 4-545 is moved to in contact with the extending portion 4-32, a driving force may be applied to the holder 4-30 by the contact unit 4-545. The direction of the driving force (from the frame 4-40 to the extending portion 4-32) is different from the extension direction of the driving unit 4-541 when the driving unit 4-541 is static. For example, if the driving unit 4-541 extends in a direction on the XY plane when static, the direction of the driving force may be the Z direction that is perpendicular to this direction to allow the holder 4-30 moving in the Z direction.

Figure 30F:
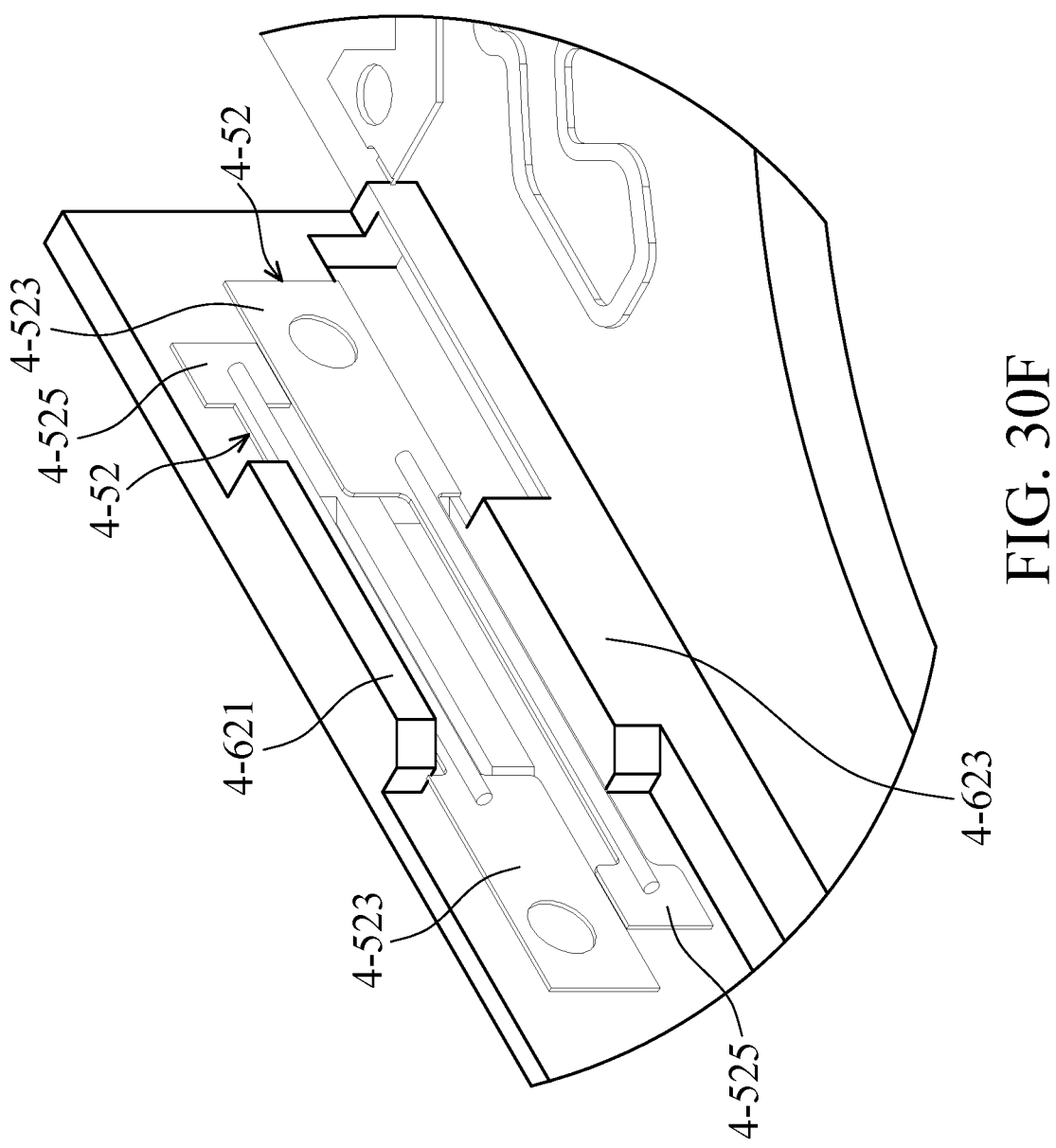
FIG. 30F is a schematic view of another configuration of the driving elements in other embodiments of the present disclosure.

Although the two driving elements 4-52 extend in an identical direction, the present disclosure is not limited thereto. For example, FIG. 30F is schematic view of another configuration of the driving units 4-52 in other embodiments of the present disclosure, wherein the two driving units 4-52 extend in opposite directions. Therefore, the contact units 4-525 of the two driving units 4-52 may push the frame 4-40 at different positions, so different torque may be provided to the frame 4-40. Therefore, the frame 4-40 may move and rotate at the same time.

Referring back to FIG. 30B. When the frame 4-40 moves relative to the fixed portion 4-F (e.g. the base unit 4-60), because the stopping portions 4-621 and 4-623 protrude to the frame 4-40, a limit range may be defined to determine a movable range of the frame 4-40 by the stopping portions 4-621 and 4-623. For example, the limit range may have a first position and a second position. When the frame 4-40 (the movable portion 4-M) is at the first position relative to the base unit 4-60 (the fixed portion 4-F), the driving unit 4-52 is not in contact with the frame 4-40. When the frame 4-40 is at the second position relative to the base unit 4-60, the driving element 4-52 may be in direct contact with the frame 4-40 and the base unit 4-60.

In some embodiments, the base unit 4-60 may further include a recess 4-624 corresponding to the contact unit 4-525, such as overlap each other in a direction that the main axis 4-O extends. Therefore, when the driving unit 4-521 is not shrink, the shape of the resilient unit 4-522 is back to the shape shown in FIG. 30B. The contact unit 4-525 may be prevented from being in direct contact with the base unit 4-60 by the recess 4-624 when the resilient unit 4-522 is deforming, so the contact unit 4-525 may be protected. Moreover, the material of the recess 4-624 does not include conductive material, such as does not include metal, so short may be prevented when the contact unit 4-525 is in contact with the recess 4-624.

It should be noted that in some embodiments, when the movable portion 4-M is driven by the driving assembly 4-D to move in the first dimension (the translational movement in X direction) relative to the fixed portion 4-F, the movable portion 4-M is also driven by the driving assembly 4-D to move in a sixth dimension. The movement in the sixth dimension may be a rotation with the optical axis of the optical element as the rotational axis. It should be noted that the optical axis may be different from the main axis 4-O. For example, when the driving assembly 4-D drives the movable portion 4-M to move in the first dimension relative to the fixed portion 4-F, the optical element may be moved, so the optical axis may be moved relative to the main axis. Therefore, the movable portion 4-M may be allowed to move in more dimensions relative to the fixed portion 4-F, and the performance of optical image stabilization may be enhanced as well.

In some embodiments, when the movable portion 4-M is driven by the driving assembly 4-D and only moves in the first dimension relative to the fixed portion, the movable portion 4-M is only movable in a first limit range of a maximum movable range in the first dimension. The first limit range is defined by the movable range of the frame 4-40. For example, if the movable portion 4-M moves in the X direction, the first limit range may be defined by the maximum movable range of the movable portion 4-M in the X direction. Afterwards, when the movable portion 4-M is driven by the driving assembly 4-D to move relative to the fixed portion 4-F in both of the first dimension and the sixth dimension, the movable portion 4-M is only movable in a second limit range of the maximum movable range in the first dimension. It should be noted that in the first dimension, the first limit range is greater than the second limit range, and the maximum movable range is greater than the first limit range. In other words, if the movable portion 4-M not only moves in the first dimension, but also moves in the sixth dimension, the movable range of the movable portion 4-M in the first dimension will be decreased accordingly.

When the movable portion 4-M moves relative to the fixed portion 4-F in the first limit range, the stopping portions 4-621 and 4-623 (the stopping assembly) is not in contact with at least one of the movable portion 4-M and the fixed portion 4-F. In this embodiments, the stopping portions 4-621 and 4-623 are disposed on the fixed portion 4-F, so the stopping portions 4-621 and 4-623 will not in direct contact with the movable portion 4-M when the movable portion 4-M is in the first limit range. However, the present disclosure is not limited thereto. For example, the stopping assembly may be disposed on the movable portion 4-M. In such embodiments, when the movable portion 4-M is in the first limit range, the stopping assembly on the movable portion 4-M will not in direct contact with the fixed portion 4-F, so the movable portion 4-M and the fixed portion 4-F may be prevented from being damaged by the collision between each other.

In some embodiments, when the movable portion 4-M is driven by the driving assembly 4-D to only move in the sixth dimension relative to the fixed portion 4-F, the movable portion 4-M is only allowed to move in a third limit range of the maximum movable range in the sixth dimension. When the movable portion 4-M is driven by the driving assembly 4-D to move in both of the first dimension and the sixth dimension relative to the fixed portion 4-F, the movable portion 4-M is only allowed to move in a fourth limit range of the maximum movable range in the sixth dimension. It should be noted that the third limit range is greater than the fourth limit range in the sixth dimension. In other words, if the movable portion 4-M not only moves in the sixth dimension, but also moves in the first dimension, the movable range of the movable portion 4-M in the sixth dimension will be decreased accordingly. Similarly, when the movable portion 4-M moves relative to the fixed portion 4-F in the third limit range, the stopping portions 4-621 and 4-623 (the stopping assembly) is not in contact with at least one of the movable portion 4-M and the fixed portion 4-F.

Moreover, as shown in FIG. 29F, a control unit 4-C may be included in the optical element driving mechanism 4-100. The control unit 4-C may be a driver IC, a storage, or a memory, etc., and may be used for recording the first limit range, the second limit range, the third limit range, and the fourth limit range to prevent the movable portion 4-M exceeding the limit ranges when moving to prevent damage. The first limit range, the second limit range, the third limit range, and the fourth limit range may be measured by an external apparatus (not shown), and the measured first limit range, the measured second limit range, the measured third limit range, and the measured fourth limit range will be stored in the control unit 4-C. It should be noted that the control unit 4-C may be electrically connected to the first position sensing assembly 4-S1 (which includes the first position sensor 4-82, the second position sensor 4-84, the third position sensor 4-86) and the second position sensing assembly 4-S2 (which includes the fourth position sensor 4-88 and the fifth position sensor 4-89). Therefore, multiple position sensors may be controlled by one control unit 4-C, and the number of the required control unit may be reduced to achieve miniaturization.

Figure 31A:
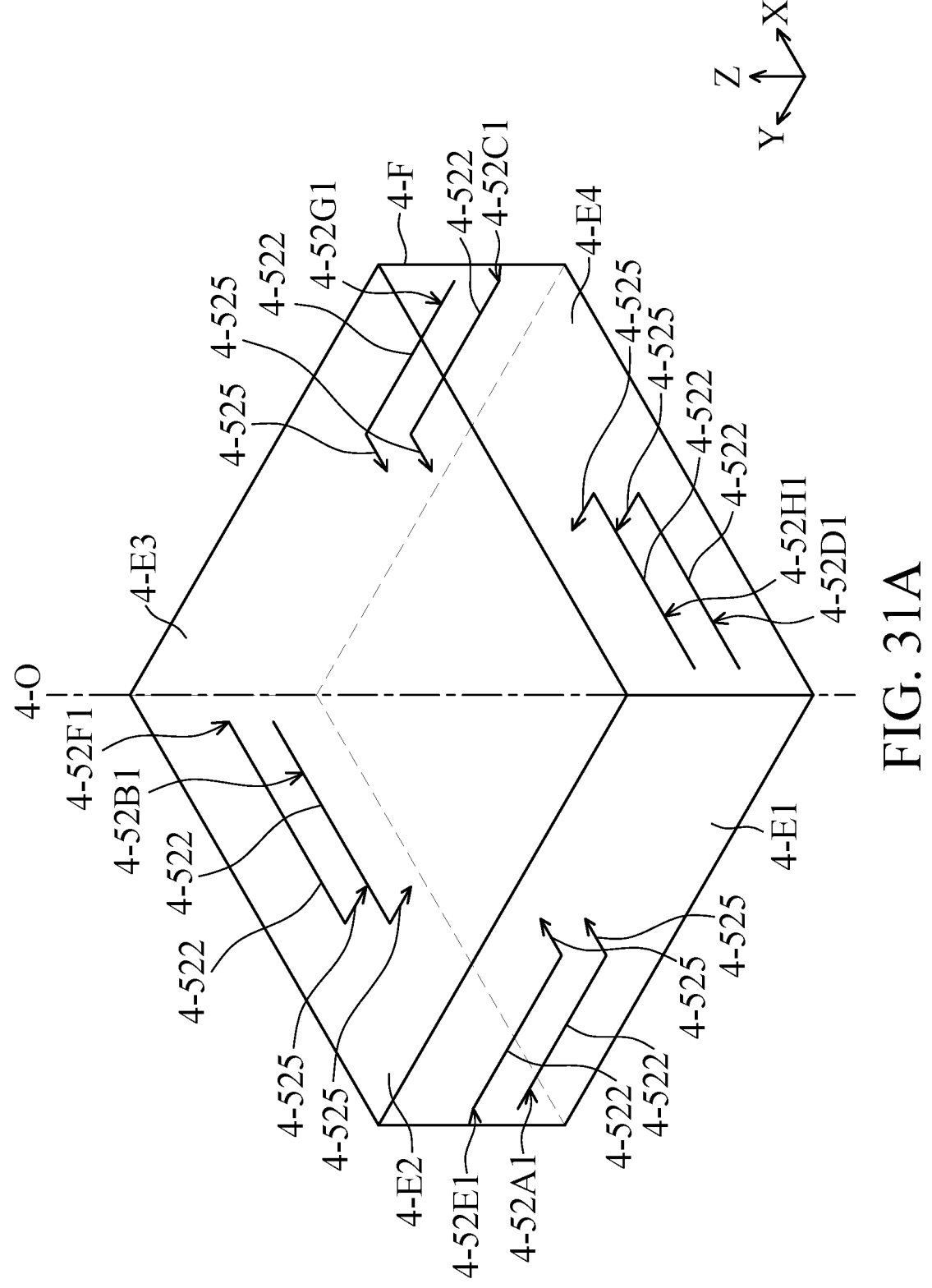
FIG. 31A to FIG. 31N are schematic views of different configurations of the driving elements in the optical element driving mechanism.
Figure 31B:
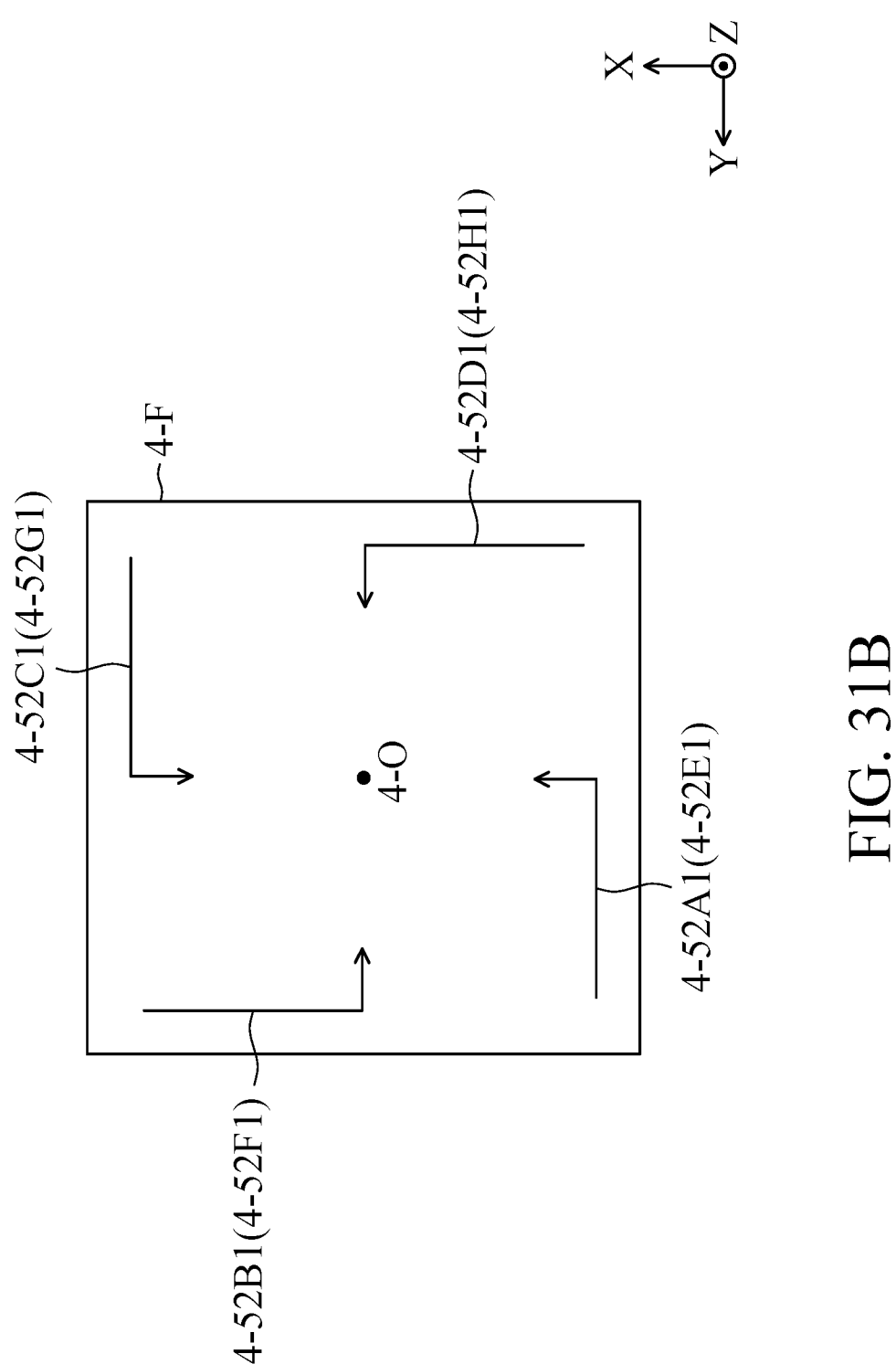
Figure 31C:
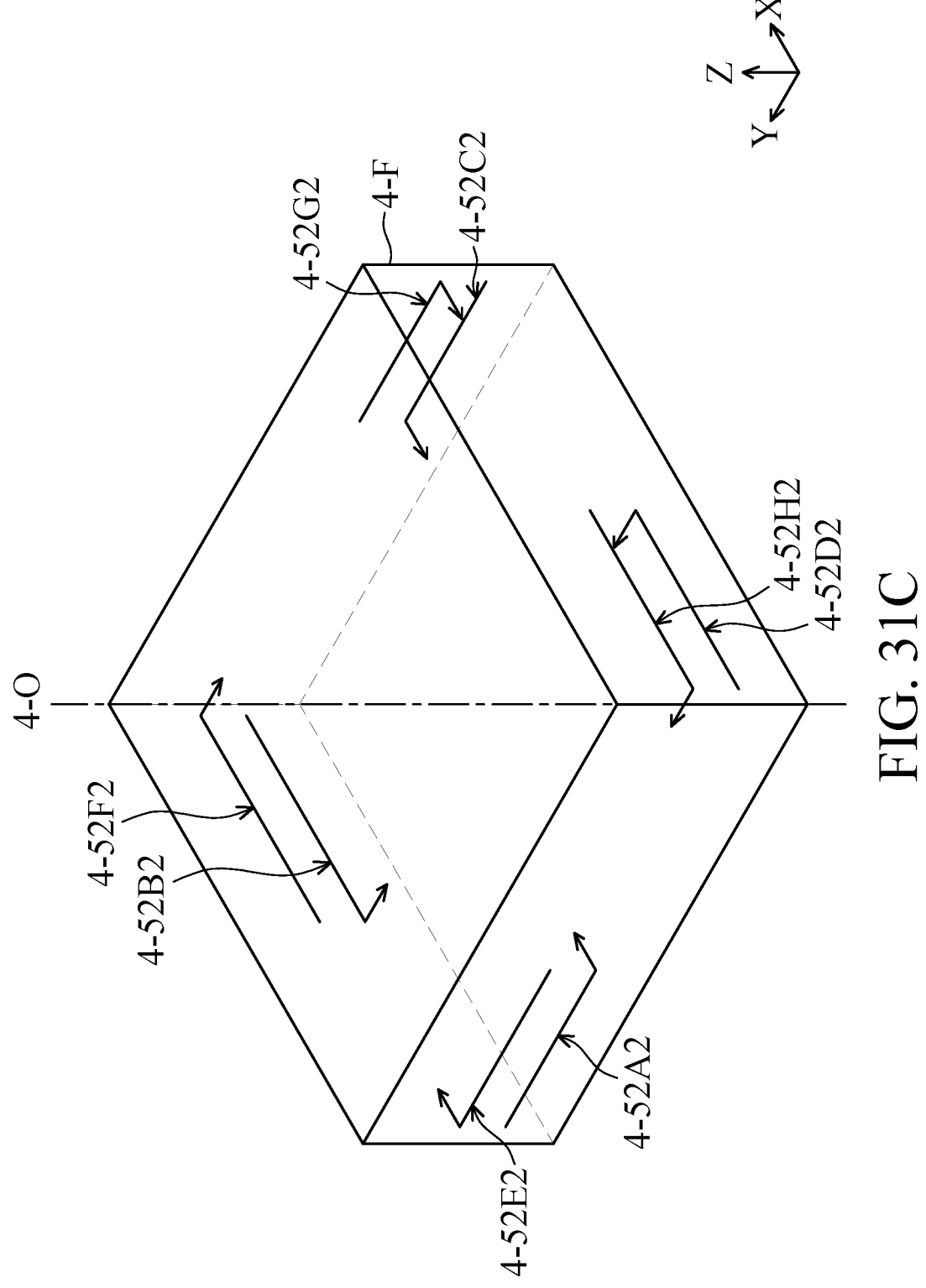
Figure 31D:
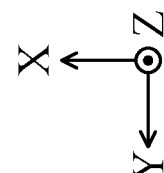
Figure 31D:
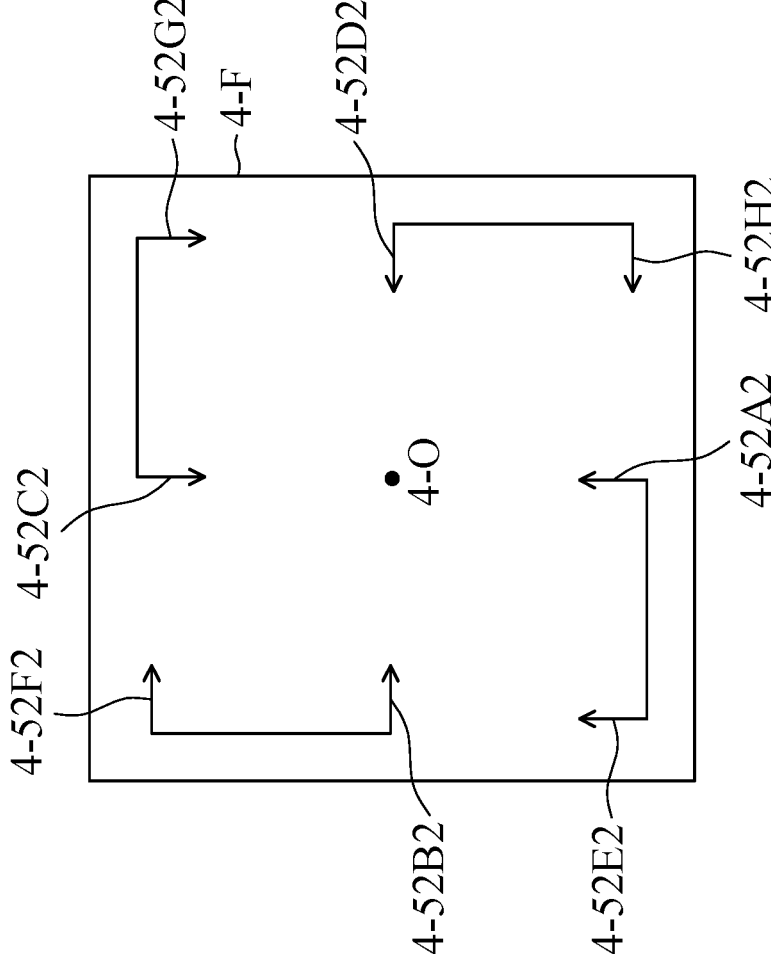
Figure 31E:
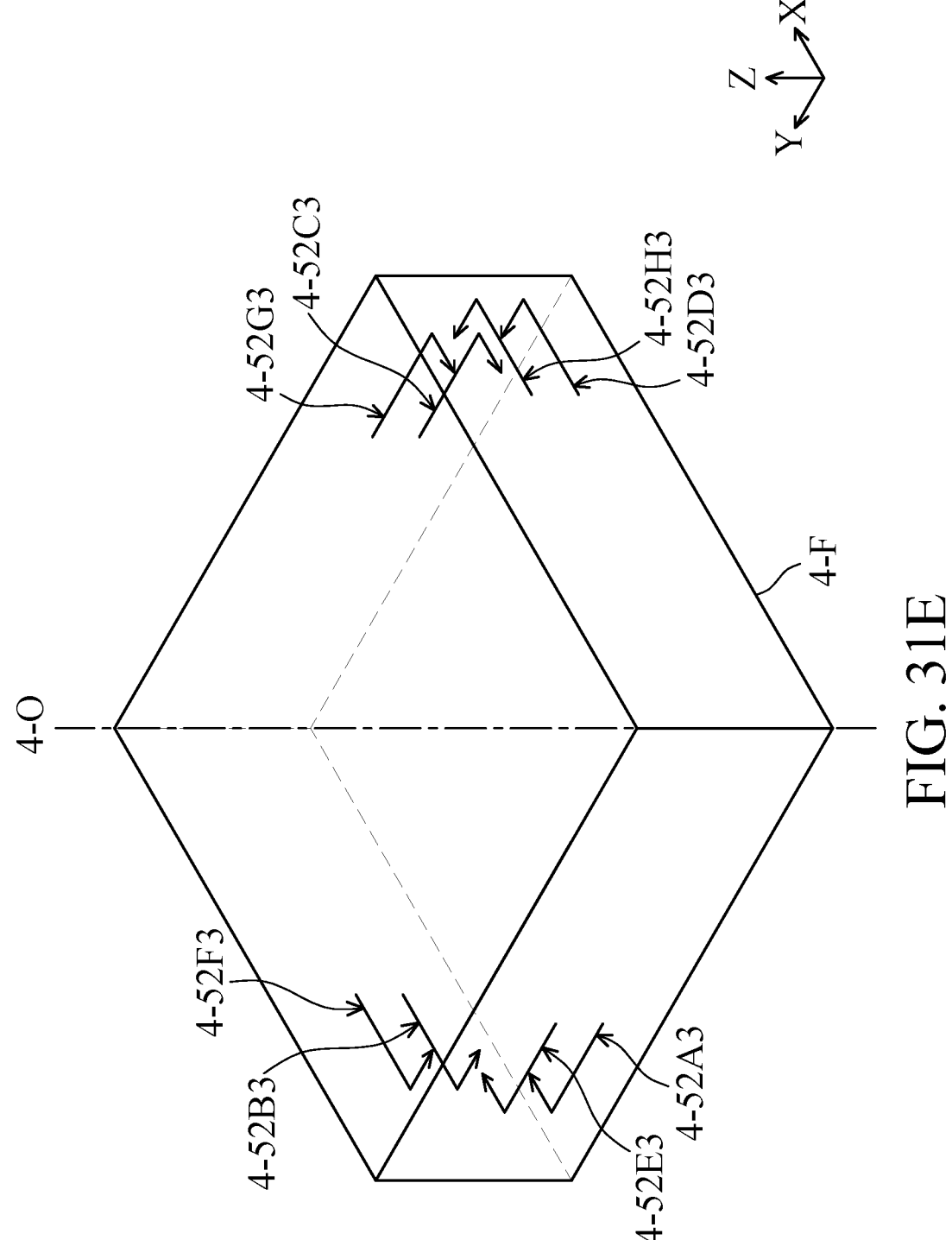
Figure 31F:
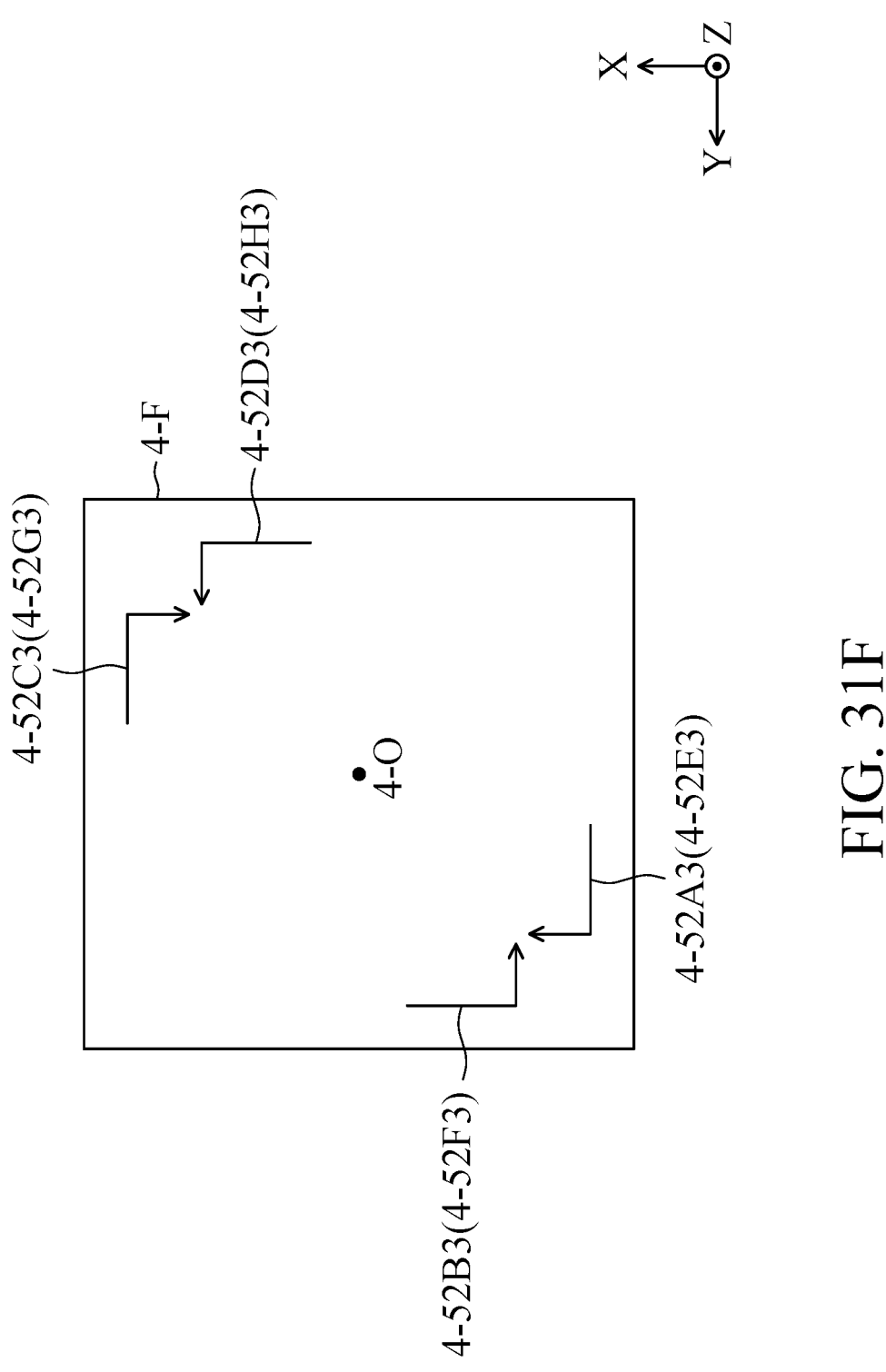
Figure 31G:
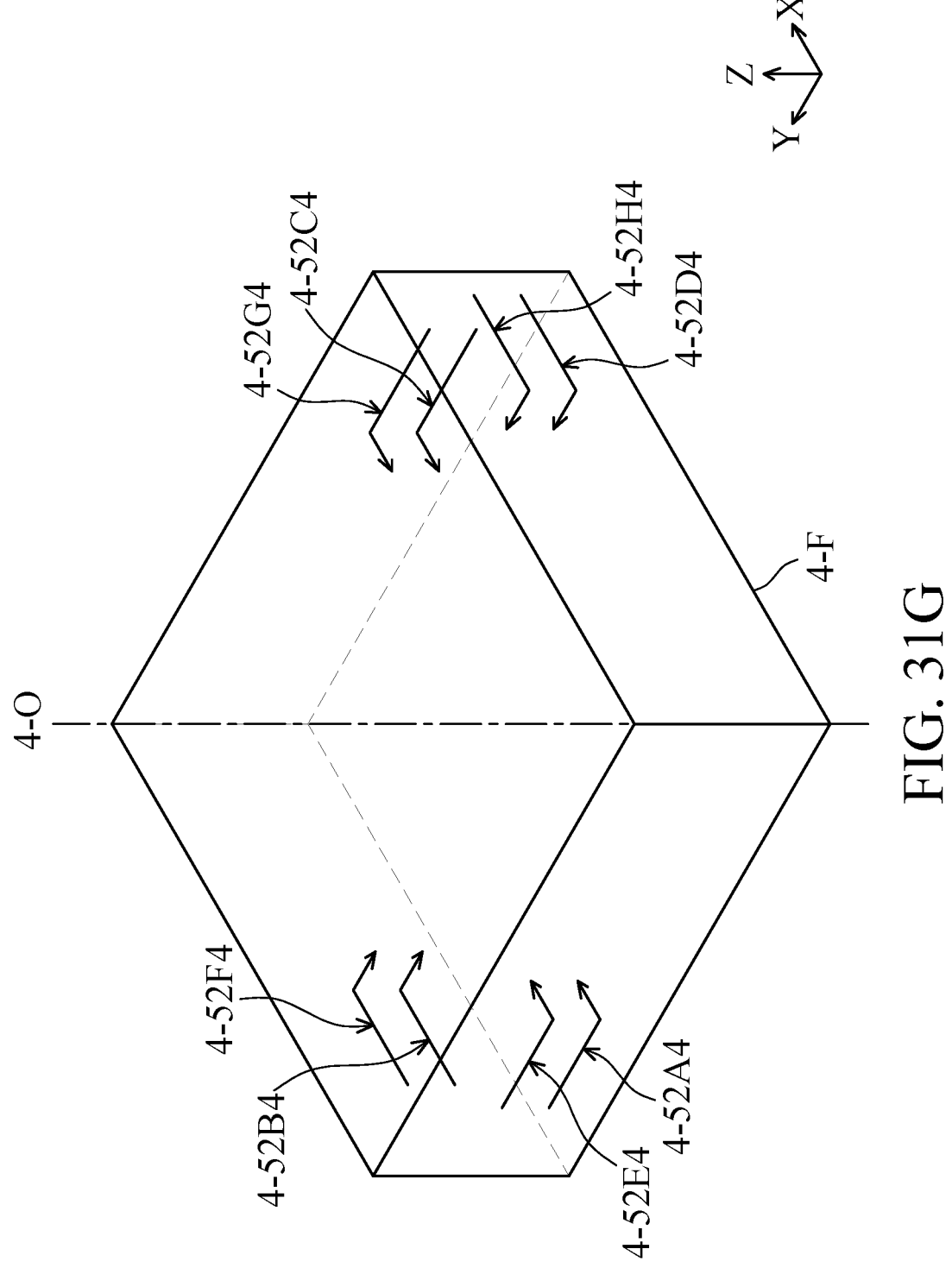
Figure 31H:
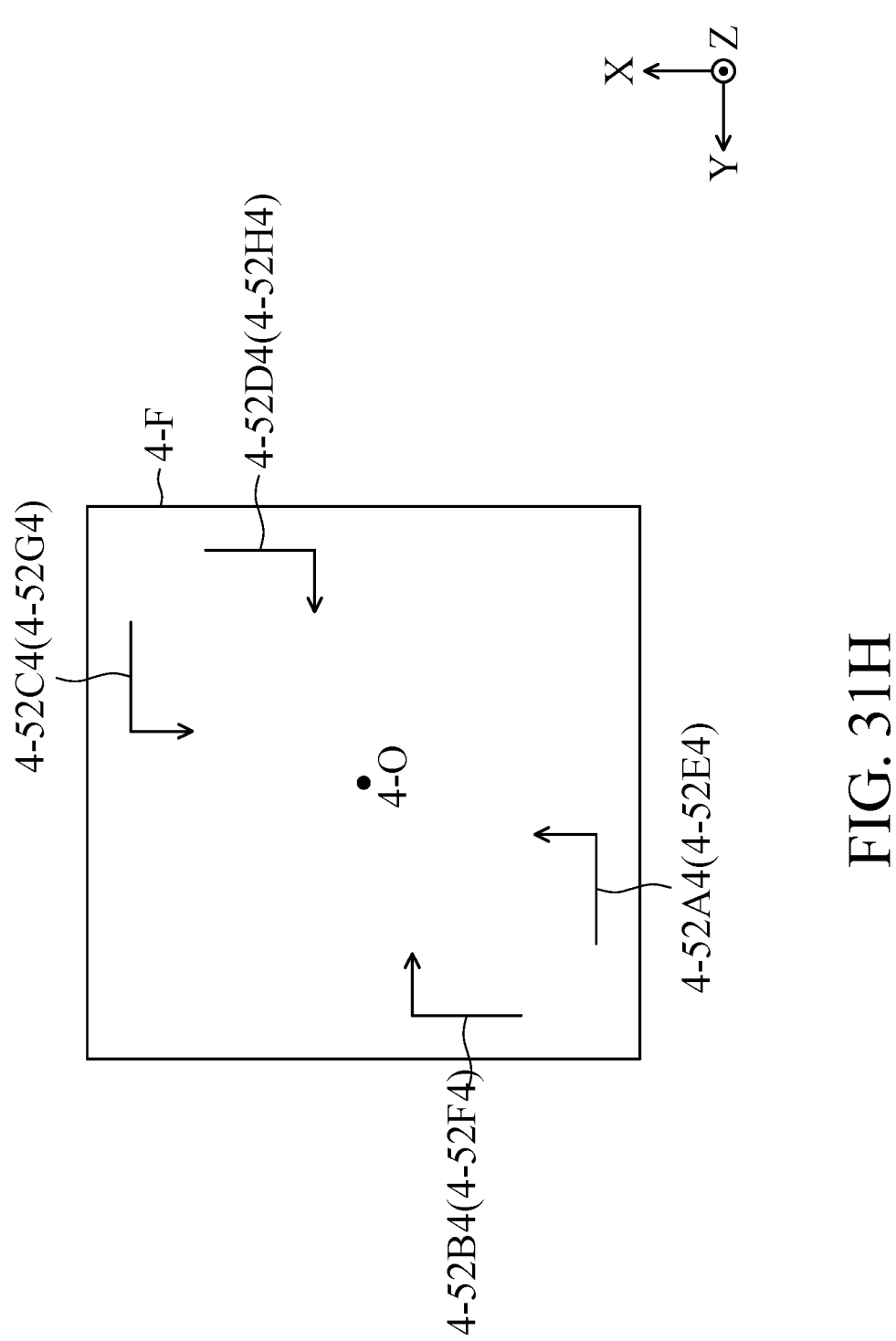
Figure 31I:
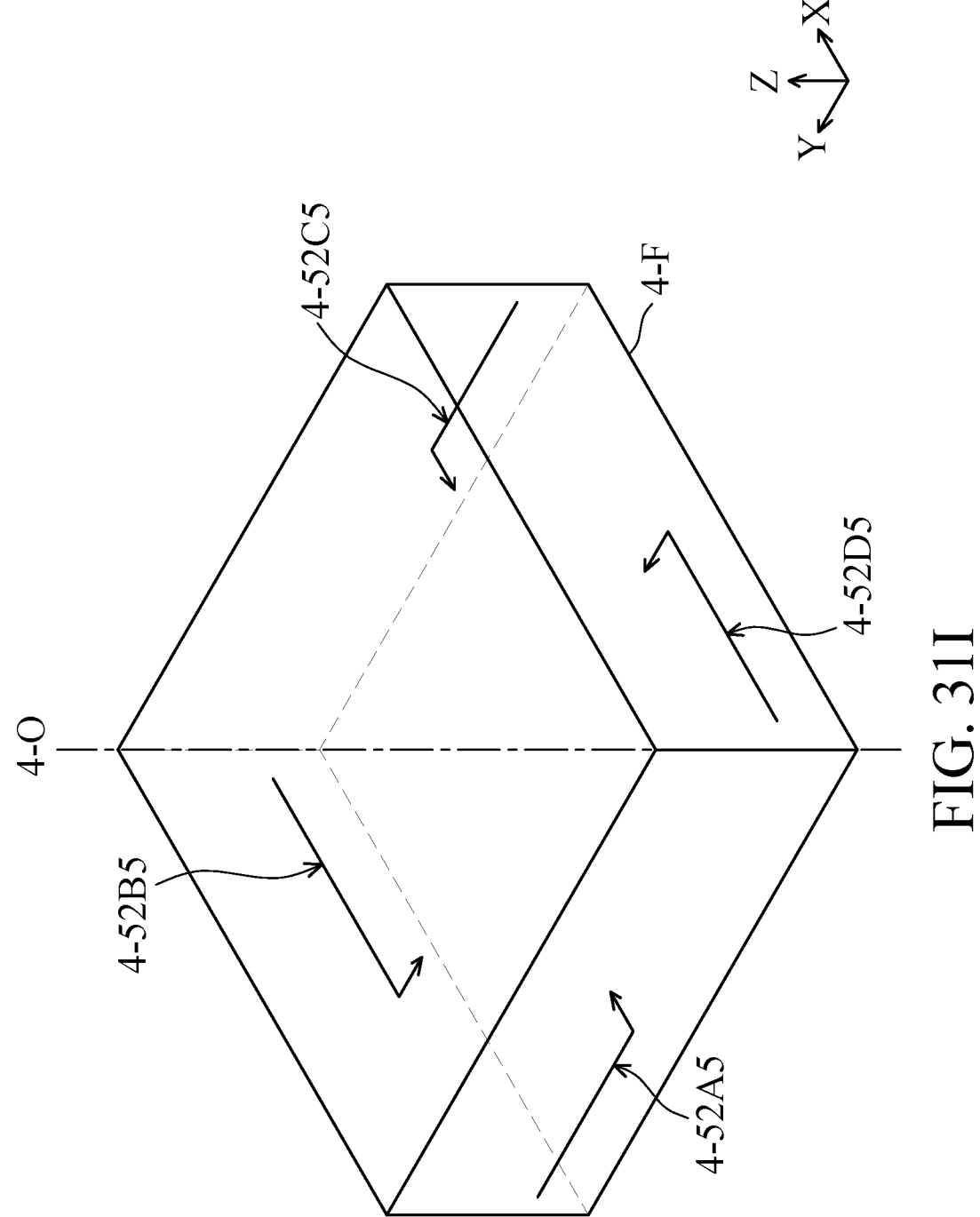
Figure 31J:
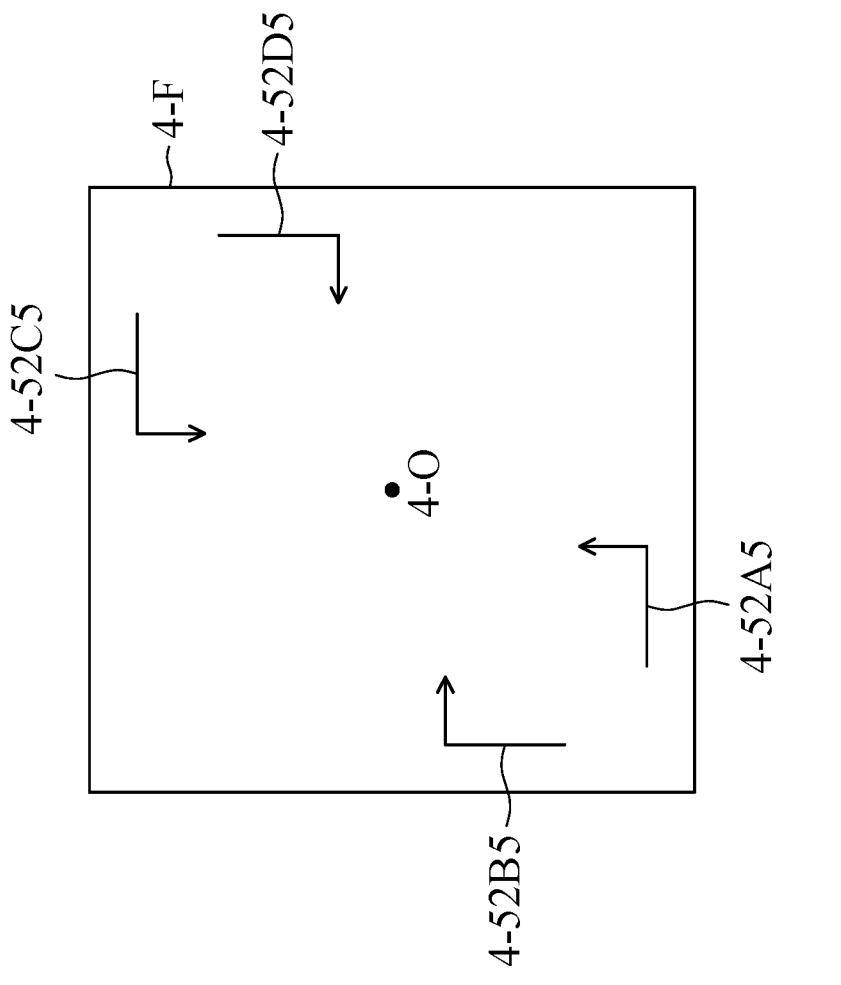
Figure 31K:
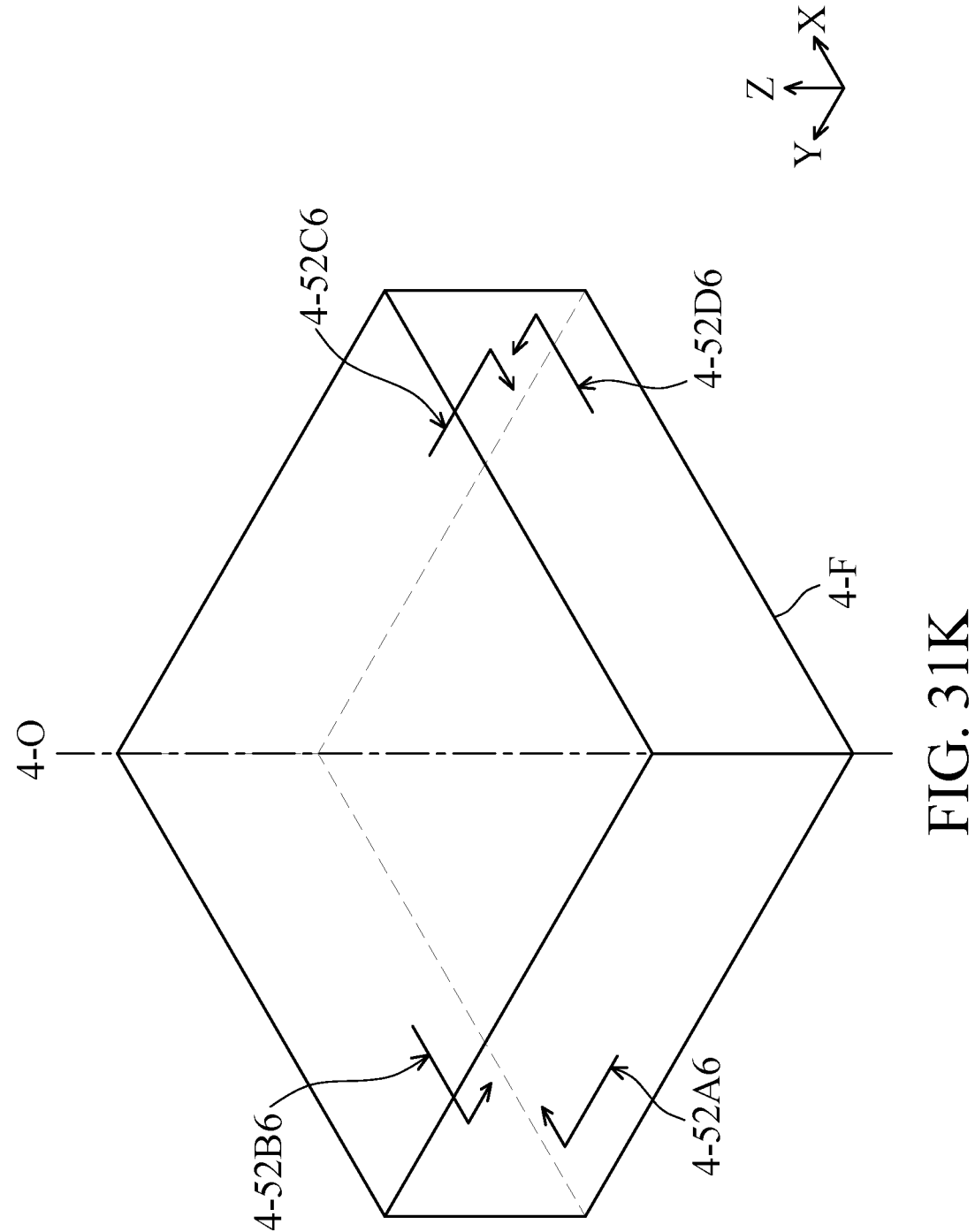
Figure 31L:
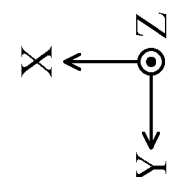
Figure 31L:
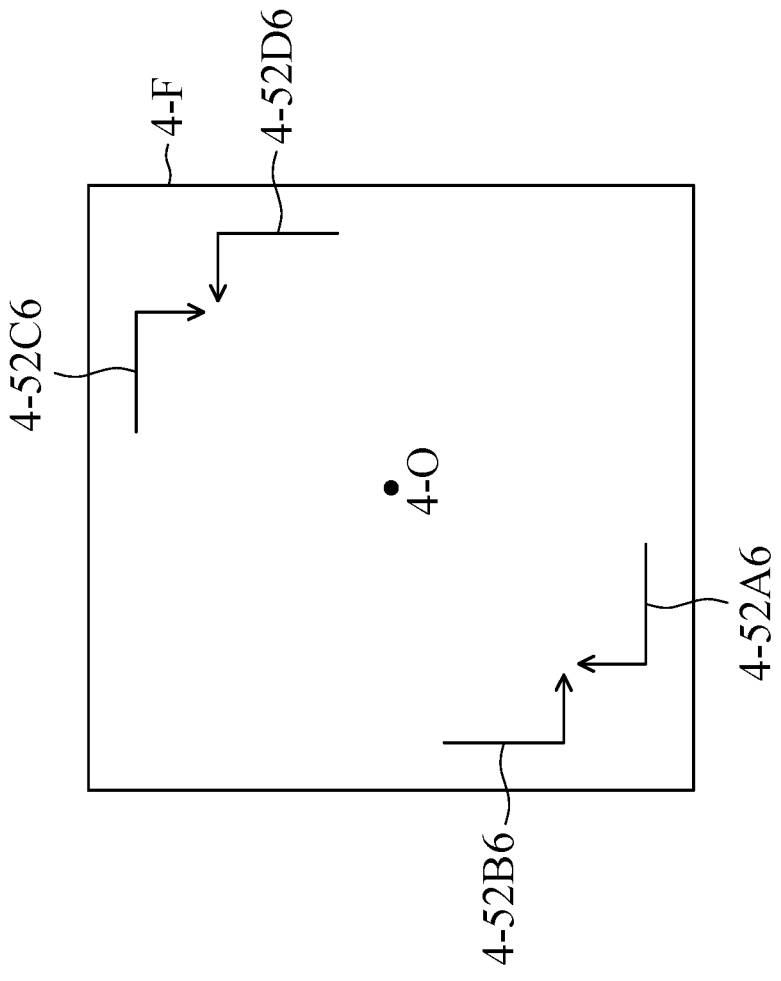
Figure 31M:
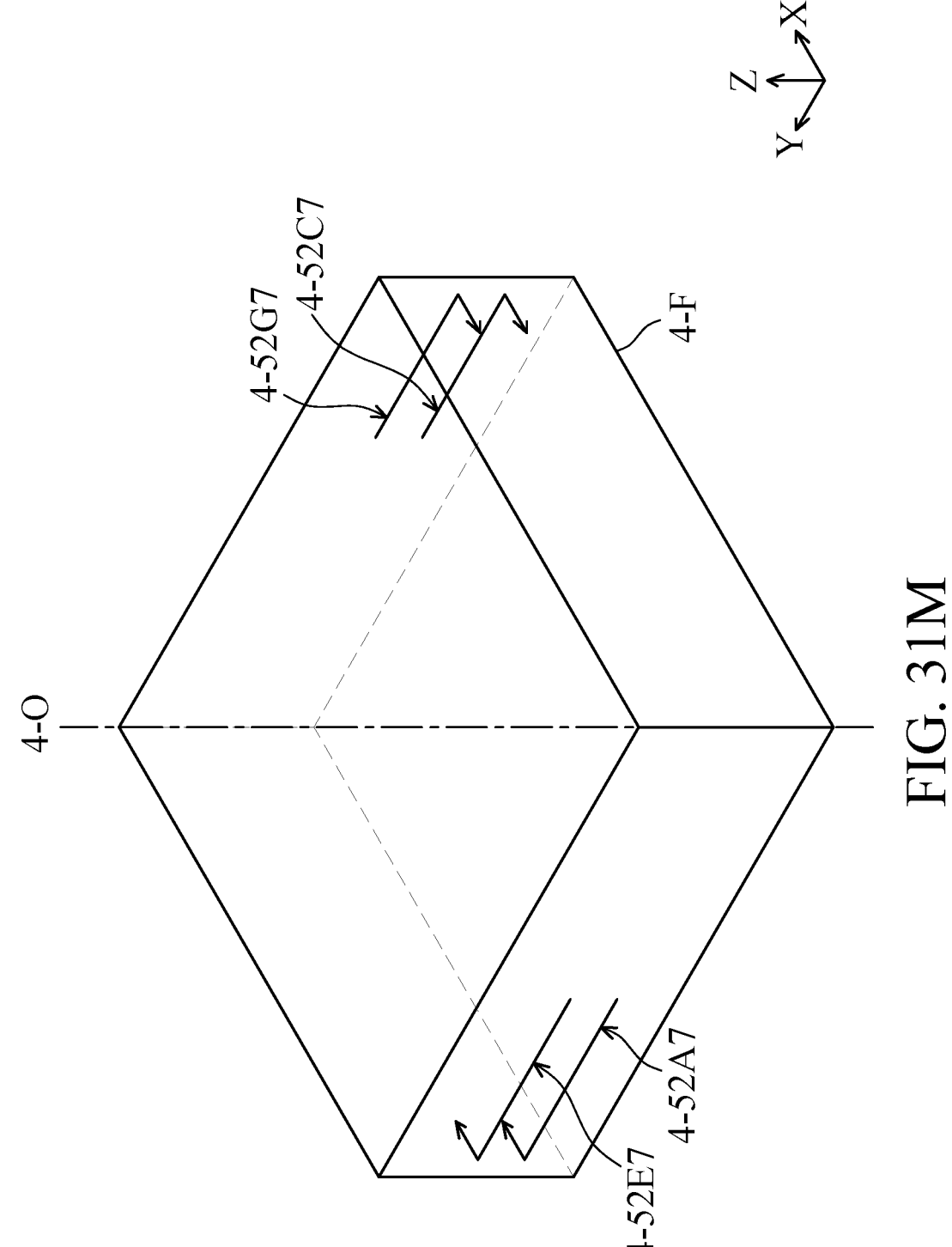
Figure 31N:
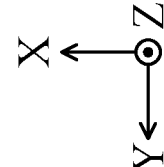
Figure 31N:
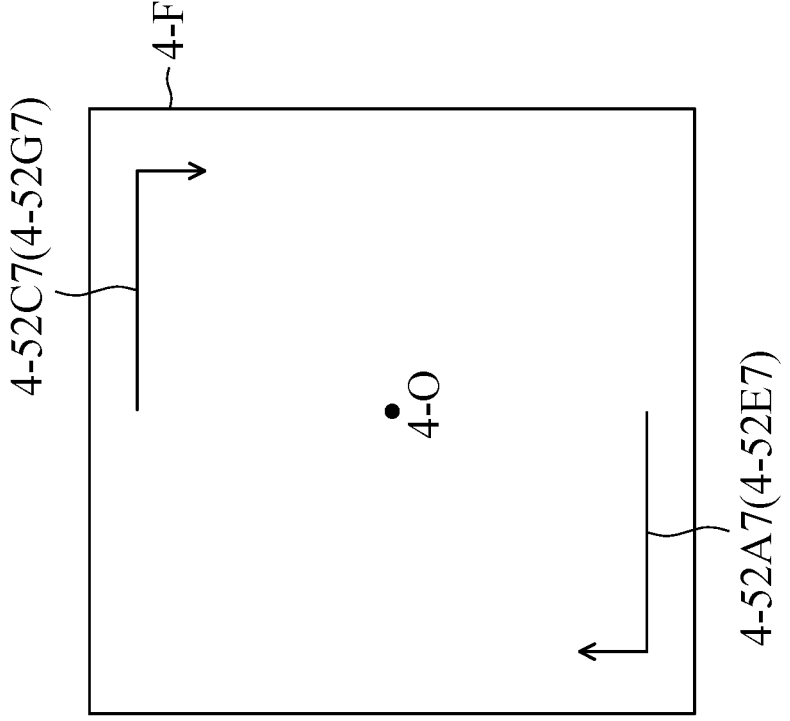

FIG. 31A to FIG. 31N are schematic views of different configurations of the driving elements in the optical element driving mechanisms 4-100A, 4-100B, 4-100C, 4-100D, 4-100E, 4-100F, and 4-100G. As shown in FIG. 31A, the driving element 4-52 is simplified as a combination of a straight line and an arrow, wherein the straight line represents the resilient unit 4-522, the arrow represents the contact unit, and other elements are omitted for clarity. The direction of the arrow means the direction of the driving force provided by the contact unit 4-525 to the frame 4-40. It should be noted that the directions of the arrows in the present embodiments are oriented to the X direction, the —X direction, the Y direction, or the Y direction for illustration, but the present disclosure is not limited thereto. The direction of the driving force may be adjusted depending on design requirement.

As shown in FIG. 31A and FIG. 31B, the optical element driving mechanism 4-100A may include driving elements 4-52A1, 4-52B1, 4-52C1, 4-52D1, 4-52E1, 4-52F1, 4-52G1, and 4-52H1. The driving elements 4-52A1, 4-52B1, 4-52C1, and 4-52D1 may position at an identical XY plane, the driving elements 4-52E1, 4-52F1, 4-52G1, and 4-52H1 may position at another XY plane, and the two XY planes are different.

In this embodiment, the driving elements 4-52A1 and 4-52E1 extend in the Y direction, the driving elements 4-52B1 and 4-52F1 extend in the —X direction, the driving elements 4-52C1 and 4-52G1 extend in the —Y direction, and the driving elements 4-52D1 and 4-52H1 extend in the X direction. Furthermore, the driving elements 4-54 (FIG. 29B) extend in a XY plane in a direction that is not parallel to the X direction and the Y direction. The driving elements 4-54 are omitted in the following embodiments for clarity, but it should be noted that the driving elements 4-54 may also be included in the following embodiments.

For description, the driving element 4-52A1 may be called as the first driving element 4-52A1, the driving element 4-52B1 may be called as the second driving element 4-52B1, the driving element 4-54 may be called as the third driving element 4-54, the driving element 4-52E1 may be called as the fourth driving element 4-52E1, the driving element 4-52F1 may be called as the fifth driving element 4-52F1, the driving element 4-52C1 may be called as the sixth driving element 4-52C1, and the driving element 4-52D1 may be called as the seventh driving element 4-52D1.

Therefore, a first driving unit (not shown, and the following driving units are not shown as well) of the first driving element 4-52A1 extends in the first direction (the X direction), and a second driving unit of the second driving element 4-52B2 extends in a second direction (the Y direction). The second driving element 4-52B1 is used for generating a second driving force to the movable portion 4-M or the fixed portion 4-F. The direction of the second driving force (the X direction) is not parallel to the second direction, and the first direction and the second direction are not parallel.

In the direction that the main axis 4-O extends, the distance between the center of the first driving element 4-52A1 (e.g. the center of the linear resilient unit 4-522) and the center of the second driving element 4-52B1 (e.g. the center of the linear resilient unit 4-522) is zero. In other words, the center of the first driving element 4-52A1 and the center of the second driving element 4-52B1 are on an identical XY plane. Therefore, in a direction that is perpendicular to the direction that the main axis 4-O extends, the first driving element 4-52A1 at least overlaps a portion of the second driving element 4-52B1, which means the first driving element 4-52A1 and the second driving element 4-52B1 have an identical height (identical on Z coordinate). When viewed in a direction that the main axis 4-O extends (FIG. 31B), the first driving element 4-52A1 does not overlap the second driving element 4-52B1. When viewed in a direction that the main axis 4-O extends, the first driving element 4-52A1 is at the first edge 4-E1 of the fixed portion 4-F. When viewed in a direction that the main axis 4-O extends, the second driving element 4-52B1 is at the second edge 4-E2 of the fixed portion 4-F.

A third driving unit of the third driving element 4-54 extends in a third direction, which is a direction on the XY plane and is not parallel to the X direction or the Y direction. The third direction is not parallel to the first direction or the second direction. The third driving element 4-54 is used to generate a third driving force to the holder 4-30 or the frame 4-40 of the movable portion 4-M, and the direction of the third driving force (the Z direction) is not parallel to the third direction.

In the direction that the main axis 4-O extends, the distance between the center of the first driving element 4-52A1 and the center of the third driving element 4-54 is not zero. In other words, the first driving element 4-52A1 and the third driving element 4-54 are not on an identical XY plane. Therefore, in a direction that is perpendicular to the direction that the main axis 4-O extends, the first driving element 4-52A1 does not overlap the third driving element 4-54, which means the first driving element 4-52A1 and the third driving element 4-54 have different heights (different on Z coordinate). When viewed in a direction that the main axis 4-O extends, the first driving element 4-52A1 does not overlap the third driving element 4-54. When viewed in a direction that the main axis 4-O extends, the third driving element 4-54 is at the first edge 4-E1, as shown in FIG. 29B.

A fourth driving unit of the fourth driving element 4-52E1 extends in a fourth direction (the Y direction). The fourth direction is parallel to the first direction, and the fourth is not parallel to the second direction and the third direction. The fourth driving element 4-52E1 is used to generate a fourth driving force to the movable portion 4-M or the fixed portion 4-F, and the direction of the fourth driving force (the X direction) is not parallel to the fourth direction.

In the direction that the main axis 4-O extends, the distance between the center of the first driving element 4-52A1 and the center of the fourth driving element 4-52E1 is not zero. In other words, the first driving element 4-52A1 and the fourth driving element 4-52E1 are not on an identical XY plane. Therefore, in a direction that is perpendicular to the direction that the main axis 4-O extends, the first driving element 4-52A1 does not overlap the fourth driving element 4-52E1, which means the first driving element 4-52A1 and the fourth driving element 4-52E1 have different heights (different on Z coordinate). When viewed in a direction that the main axis 4-O extends, the first driving element 4-52A1 overlaps at least a portion of fourth driving element 4-52E1. When viewed in a direction that the main axis 4-O extends, the fourth driving element 4-52E1 is at the first edge 4-E1.

A fifth driving unit of the fifth driving element 4-52F1 extends in a fifth direction (the X direction). The fifth direction is not parallel to the first direction, the third direction, and the fourth direction, and the fifth direction is parallel to the second direction. The fifth driving element 4-52F1 is used to generate a fifth driving force to the movable portion 4-M or the fixed portion 4-F, and the direction of the fifth driving force (the −Y direction) is not parallel to the fifth direction.

In the direction that the main axis 4-O extends, the distance between the center of the first driving element 4-52A1 and the center of the fifth driving element 4-52F1 is not zero. In other words, the first driving element 4-52A1 and the fifth driving element 4-52F1 are not on an identical XY plane. Therefore, in a direction that is perpendicular to the direction that the main axis 4-O extends, the first driving element 4-52A1 does not overlap the fifth driving element 4-52F1, which means the first driving element 4-52A1 and the fifth driving element 4-52F1 have different heights (different on Z coordinate). When viewed in a direction that the main axis 4-O extends, the first driving element 4-52A1 does not overlap the fifth driving element 4-52F1. When viewed in a direction that the main axis 4-O extends, the second driving element 4-52B1 at least overlaps a portion of the fifth driving element 4-52F1. When viewed in a direction that the main axis 4-O extends, the fifth driving element 4-52F1 is at the second edge 4-E2.

In the direction that the main axis 4-O extends, the distance between the center of the fourth driving element 4-52E1 and the center of the fifth driving element 4-52F1 is zero. In other words, the center of the fourth driving element 4-52E1 and the center of the fifth driving element 4-52F1 are on an identical XY plane. Therefore, in a direction that is perpendicular to the direction that the main axis 4-O extends, the fourth driving element 4-52E1 at least overlaps a portion of the fifth driving element 4-52F1, which means the fourth driving element 4-52E1 and the fifth driving element 4-52F1 have an identical height (identical on Z coordinate). When viewed in a direction that the main axis 4-O extends, the fourth driving element 4-52E1 does not overlap the fifth driving element 4-52F1.

A sixth driving unit of the sixth driving element 4-52C1 extends in a sixth direction (the Y direction). The sixth direction is parallel to the first direction, and the sixth direction is not parallel to the second direction and the third direction. The sixth driving element 4-52C1 is used to generate a sixth driving force to the movable portion 4-M or the fixed portion 4-F, and the direction of the sixth driving force (the −X direction) is not parallel to the sixth direction.

In the direction that the main axis 4-O extends, the distance between the center of the first driving element 4-52A1 and the center of the sixth driving element 4-52C1 is zero. In other words, the first driving element 4-52A1 and the sixth driving element 4-52C1 are on an identical XY plane. Therefore, in a direction that is perpendicular to the direction that the main axis 4-O extends, the first driving element 4-52A1 overlaps at least a portion of the sixth driving element 4-52C1, which means the first driving element 4-52A1 and the sixth driving element 4-52C1 have an identical height (identical on Z coordinate). When viewed in a direction that the main axis 4-O extends, the first driving element 4-52A1 does not overlap the sixth driving element 4-52C1. When viewed in a direction that the main axis 4-O extends, the sixth driving element 4-52F1 is at a third edge 4-E3 of the fixed portion 4-F, and the first edge 4-E1 and the third edge 4-E3 are parallel.

A seventh driving unit of the seventh driving element 4-52D1 extends in a seventh direction (the X direction). The seventh direction is parallel to the second direction, and the seventh direction is not parallel to the first direction, the third direction, and the fourth direction. The seventh driving element 4-52D1 is used to generate a seventh driving force to the movable portion 4-M or the fixed portion 4-F, and the direction of the seventh driving force (the Y direction) is not parallel to the seventh direction.

In the direction that the main axis 4-O extends, the distance between the center of the first driving element 4-52A1 and the center of the seventh driving element 4-52D1 is zero. In other words, the first driving element 4-52A1 and the seventh driving element 4-52D1 are on an identical XY plane. Therefore, in a direction that is perpendicular to the direction that the main axis 4-O extends, the first driving element 4-52A1 overlaps at least a portion of the seventh driving element 4-52D1, which means the first driving element 4-52A1 and the seventh driving element 4-52D1 have an identical height (identical on Z coordinate). When viewed in a direction that the main axis 4-O extends, the first driving element 4-52A1 does not overlap the seventh driving element 4-52D1. When viewed in a direction that the main axis 4-O extends, the seventh driving element 4-52D1 is at a fourth edge 4-E4 of the fixed portion 4-F. The first edge 4-E1 is not parallel to the fourth edge 4-E4, and the second edge is parallel to the fourth edge 4-E4.

In this embodiment, the driving elements 4-52A1 and 4-52E1 may provide driving forces to the frame 4-40 in the X direction, the driving elements 4-52B1 and 4-52F1 may provide driving forces to the frame 4-40 in the –Y direction, the driving elements 4-52C1 and 4-52G1 may provide driving forces to the frame 4-40 in the –X direction, the driving elements 4-52D1 and 4-52H1 may provide driving forces to the frame 4-40 in the Y direction. Therefore, the frame 4-40 may be driven by the driving elements 4-52A1, 4-52B1, 4-52C1, 4-52D1, 4-52E1, 4-52F1, 4-52G1, and 4-52H1 in the X direction or the Y direction relative to the fixed portion 4-F.

Moreover, the driving elements 4-52A1, 4-52B1, 4-52C1, 4-52D1, 4-52E1, 4-52F1, 4-52G1, and 4-52H1 also allows the frame 4-40 to rotate relative to the X axis or the Y axis. For example, if only the driving elements 4-52C1 and 4-52E1 provides driving forces to the frame 4-40, because the driving elements 4-52C1 and 4-52E1 are positioned on different XY planes, the total torque applied to the frame 4-40 by the driving elements 4-52C1 and 4-52E1 is not equal to zero. Therefore, the frame 4-40 may rotate relative to the Y axis.

When the driving unit 4-521 (the first driving unit) of the first driving element 4-52A1 deforms, the resilient unit 4-522 (the first resilient unit) of the first driving element 4-52A1 deforms accordingly to move the contact unit 4-525 (the first contact unit) of the first driving element 4-52A1. When viewed in a direction that the main axis 4-O extends, the main axis 4-O looks like a point. The main axis 4-O passes through the center of the case 4-10, and a connection between the main axis 4-O and the center of the first contact unit (such as the connection point between the resilient unit 4-522 and the contact unit 4-525 in FIG. 31B, and the following centers of the contact units may be defined in identical or similar manners) is not perpendicular or parallel to the first direction (the X direction).

When the driving unit 4-521 (the second driving unit) of the second driving element 4-52B1 deforms, the contact unit 4-525 (the second contact unit) of the second driving element 4-52A1 will be moved accordingly. When viewed along the main axis 4-O, a connection between the main axis 4-O and the center of the second contact unit is not perpendicular or parallel to the second direction (the X direction).

In the optical element driving mechanism 4-100A, the driving elements 4-52A1, 4-52B1, 4-52C1, and 4-52D1 may arranged as centrosymmetric to the main axis 4-O, and the driving elements 4-52E1, 4-52F1, 4-52G1, and 4-52H1 may also arranged as centrosymmetric to the main axis 4-O. Therefore, when viewed along the main axis 4-O, a connection between the main axis 4-O and the center of the contact unit 4-525 (the second contact unit) of the second driving element 4-52B1 is perpendicular to a connection between the main axis 4-O and the center of the contact unit 4-525 (the first contact unit) of the first driving element 4-52A1.

The contact unit 4-545 (the third contact unit) of the third driving element 4-54 is used to in contact with the holder 4-30 or the frame 4-40. When the driving unit 4-541 of the third driving element 4-54 deforms, the third contact unit will be moved accordingly. When viewed in the direction that the main axis 4-O extends, a connection between the main axis 4-O and the center of the contact unit 4-545 (the third contact unit) of the third driving element 4-54 is not perpendicular or parallel to the third direction (the direction that the third driving unit of the third driving element 4-54 extends). When viewed along the main axis 4-O, the connection between the main axis 4-O and the center of the third contact unit is not perpendicular or parallel to the connection between the main axis 4-O and the contact unit 4-525 (the first contact unit) of the first driving element 4-52A1.

FIG. 31C and FIG. 31D are schematic views of the optical element driving mechanism 4-100B viewed in different directions. The optical element driving mechanism 4-100B includes driving elements 4-52A2, 4-52B2, 4-52C2, 4-52D2, 4-52E2, 4-52F2, 4-52G2, and 4-52H2. The driving elements 4-52A2, 4-52B2, 4-52C2, 4-52D2 are similar to the driving elements 4-52A1, 4-52B1, 4-52C1, and 4-52D1 in the optical element driving mechanism 4-100A, and the driving elements 4-52E2, 4-52F2, 4-52G2, and 4-52H2 are respectively disposed in opposite directions to the driving elements 4-52E1, 4-52F1, 4-52G1, and 4-52H1 in the optical element driving mechanism 4-100A, which corresponds to the configuration of FIG. 30F.

The contact unit 4-525 (the fourth contact unit) of the fourth driving element 4-52E2 is used to in contact with the movable portion 4-M or the fixed portion 4-F. When the driving unit 4-522 (the fourth driving unit) of the fourth driving element 4-52E2 deforms, the fourth contact unit will be moved accordingly. When viewed along the main axis 4-O (FIG. 28D), the connection between the main axis 4-O and the center of the contact unit 4-525 (the fourth contact unit) of the fourth driving element 4-52E2 is not parallel or perpendicular to the fourth direction (the Y direction). When viewed along the main axis 4-O, the connection between the main axis 4-O and the center of the contact unit 4-525 (the fourth contact unit) of the fourth driving element 4-52E2 is not perpendicular to the connection between the main axis 4-O and the center of the contact unit 4-525 (the first contact unit) of the first driving element 4-52A2. Moreover, the driving units 4-52B2, 4-52F2, the driving units 4-52C2, 4-52G2, and the driving units 4-52D2, 4-52H2 also have similar relationships. Therefore, the driving elements 4-52A2, 4-52B2, 4-52C2, 4-52D2, 4-52E2, 4-52F2, 4-52G2, and 4-52H2 allow the movable portion 4-M to move in the X and Y directions and rotate relative to the X, Y or Z axes to improve the performance of optical image stabilization.

FIG. 31E and FIG. 31F are schematic views of the optical element driving mechanism 4-100C viewed in different directions. The optical element driving mechanism 4-100C includes driving elements 4-52A3, 4-52B3, 4-52C3, 4-52D3, 4-52E3, 4-52F3, 4-52G3 and 4-52H3. The difference between the optical element driving mechanism 4-100C and the optical element driving mechanisms 4-100A and 4-100B is that the contact units 4-525 of the driving elements 4-52A3, 4-52B3, 4-52C3, 4-52D3, 4-52E3, 4-52F3, 4-52G3 and 4-52H3 of the optical element driving mechanism 4-100C are positioned at the corners of the fixed portion 4-F. Therefore, the movable portion 4-M may be rotated by the optical element driving mechanism 4-100C relative to the main axis 4-O, and the performance of the optical image stabilization may be enhanced. Moreover, the movable portion 4-M may be rotated by the optical element driving mechanism 4-100C relative to the X or Y axes.

For example, when viewed along the main axis 4-O, the connection between the main axis 4-O and the center of the contact unit 4-525 of the driving element 4-52A3 is not perpendicular or parallel to the connection between the main axis 4-O and the center of the contact unit 4-525 of the driving element 4-52B3. Moreover, when viewed along the main axis 4-O, the driving element 4-52A3 may overlap a portion of the driving element 4-52E3 or the entire driving element 4-52E3. The driving element 4-52B3 may overlap a portion of the driving element 4-52F3 or the entire driving element 4-52F3. The driving element 4-52C3 may overlap a portion of the driving element 4-52G3 or the entire driving element 4-52G3. The driving element 4-52D3 may overlap a portion of the driving element 4-52H3 or the entire driving element 4-52H3. Therefore, required space in other directions may be reduced to achieve miniaturization.

FIG. 31G and FIG. 31H are schematic views of the optical element driving mechanism 4-100D viewed in different directions. The optical element driving mechanism 4-100D includes driving elements 4-52A4, 4-52B4, 4-52C4, 4-52D4, 4-52E4, 4-52F4, 4-52G4 and 4-52H4. The difference between the optical element driving mechanism 4-100D and the optical element driving mechanisms 4-100A, 4-100B, 4-100C is that the contact units 4-525 of the driving elements 4-52A4, 4-52B4, 4-52C4, 4-52D4, 4-52E4, 4-52F4, 4-52G4 and 4-52H4 of the optical element driving mechanism 4-100D are positioned at the sides of the fixed portion 4-F and are close to the center of the sides. Therefore, the movable portion 4-M in the optical element driving mechanism 4-100 may be moved further in the X or Y directions.

For example, when viewed along the main axis 4-O, the connection between the main axis 4-O and the center of the contact unit 4-525 of the driving element 4-52A4 is not perpendicular or parallel to the connection between the main axis 4-O and the center of the contact unit 4-525 of the driving element 4-52B4. Moreover, when viewed along the main axis 4-O, the driving element 4-52A4 may overlap a portion of the driving element 4-52E4 or the entire driving element 4-52E4. The driving element 4-52B4 may overlap a portion of the driving element 4-52F4 or the entire driving element 4-52F4. The driving element 4-52C4 may overlap a portion of the driving element 4-52G4 or the entire driving element 4-52G4. The driving element 4-52D4 may overlap a portion of the driving element 4-52H4 or the entire driving element 4-52H4. Therefore, required space in other directions may be reduced to achieve miniaturization.

FIG. 31I and FIG. 31J are schematic views of the optical element driving mechanism 4-100E viewed in different directions. The optical element driving mechanism 4-100E includes driving elements 4-52A5, 4-52B5, 4-52C5, and 4-52D5. The difference between the optical element driving mechanism 4-100E and the optical element driving mechanisms 4-100A, 4-100B, 4-100C, 4-100D is that the driving elements 4-52A5, 4-52B5, 4-52C5, and 4-52D5 of the optical element driving mechanism 4-100E only arranged as a single layer, i.e. on an identical XY plane. For example, at least two of the driving elements 4-52A5, 4-52B5, 4-52C5, and 4-52D5 overlap each other in the direction that the main axis 4-O extends. Therefore, the required number of elements in the optical element driving mechanism 4-100E may be reduced to achieve miniaturization. Furthermore, the contact units 4-525 of the driving elements 4-52A5, 4-52B5, 4-52C5, and 4-52D5 are positioned at the sides of the fixed portion 4-F and are close to the center of the sides. Therefore, the movable portion 4-M in the optical element driving mechanism 4-100 may be moved further in the X or Y directions.

FIG. 31K and FIG. 31L are schematic views of the optical element driving mechanism 4-100F viewed in different directions. The optical element driving mechanism 4-100F includes driving elements 4-52A6, 4-52B6, 4-52C6, and 4-52D6. The difference between the optical element driving mechanism 4-100F and the optical element driving mechanisms 4-100A, 4-100B, 4-100C, 4-100D is that the driving elements 4-52A6, 4-52B6, 4-52C6, and 4-52D6 of the optical element driving mechanism 4-100F only arranged as a single layer, i.e. on an identical XY plane. For example, at least two of the driving elements 4-52A6, 4-52B6, 4-52C6, and 4-52D6 overlap each other in the direction that the main axis 4-O extends. Therefore, the required number of elements in the optical element driving mechanism 4-100F may be reduced to achieve miniaturization. Furthermore, the contact units 4-525 of the driving elements 4-52A6, 4-52B6, 4-52C6, and 4-52D6 are positioned at the corners of the fixed portion 4-F. Therefore, the movable portion 4-M in the optical element driving mechanism 4-100 may be rotated further relative to the main axis 4-O to enhance the performance of optical image stabilization.

FIG. 31M and FIG. 31N are schematic views of the optical element driving mechanism 4-100G viewed in different directions. The optical element driving mechanism 4-100G includes driving elements 4-52A7, 4-52C7, 4-52E7, and 4-52G7. The difference between the optical element driving mechanism 4-100G and the optical element driving mechanisms 4-100A, 4-100B, 4-100C, 4-100D, 4-100E, and 4-100F is that the driving elements 4-52A7, 4-52C7, 4-52E7, and 4-52G7 of the optical element driving mechanism 4-100G are only positioned at two edges of the fixed portion 4-F, and are not positioned at other two edges. Therefore, the required number of elements in the optical element driving mechanism 4-100G may be reduced to achieve miniaturization. Moreover, the driving element 4-52A7 at least overlaps a portion of or the entire driving element 4-52E7, and the driving element 4-52C7 at least overlaps a portion of or the entire driving element 4-52G7. As a result, the required space in other directions may be reduced. The movable portion 4-M of the optical element driving mechanism 4-100G may be rotated relative to the X axis, the Y axis, and the main axis 4-O to enhance the performance of optical image stabilization.

In summary, an optical element driving mechanism is provided in some embodiments of the present disclosure. The optical element driving mechanism includes a movable portion, a fixed portion, a driving assembly, and a stopping assembly. The movable portion is used to hold an optical element, and is movable relative to the fixed portion. The driving assembly is used to drive the movable portion to move relative to the fixed portion. The stopping assembly is used to limit the movable portion to move in a limit range relative to the fixed portion.

Figure 32:
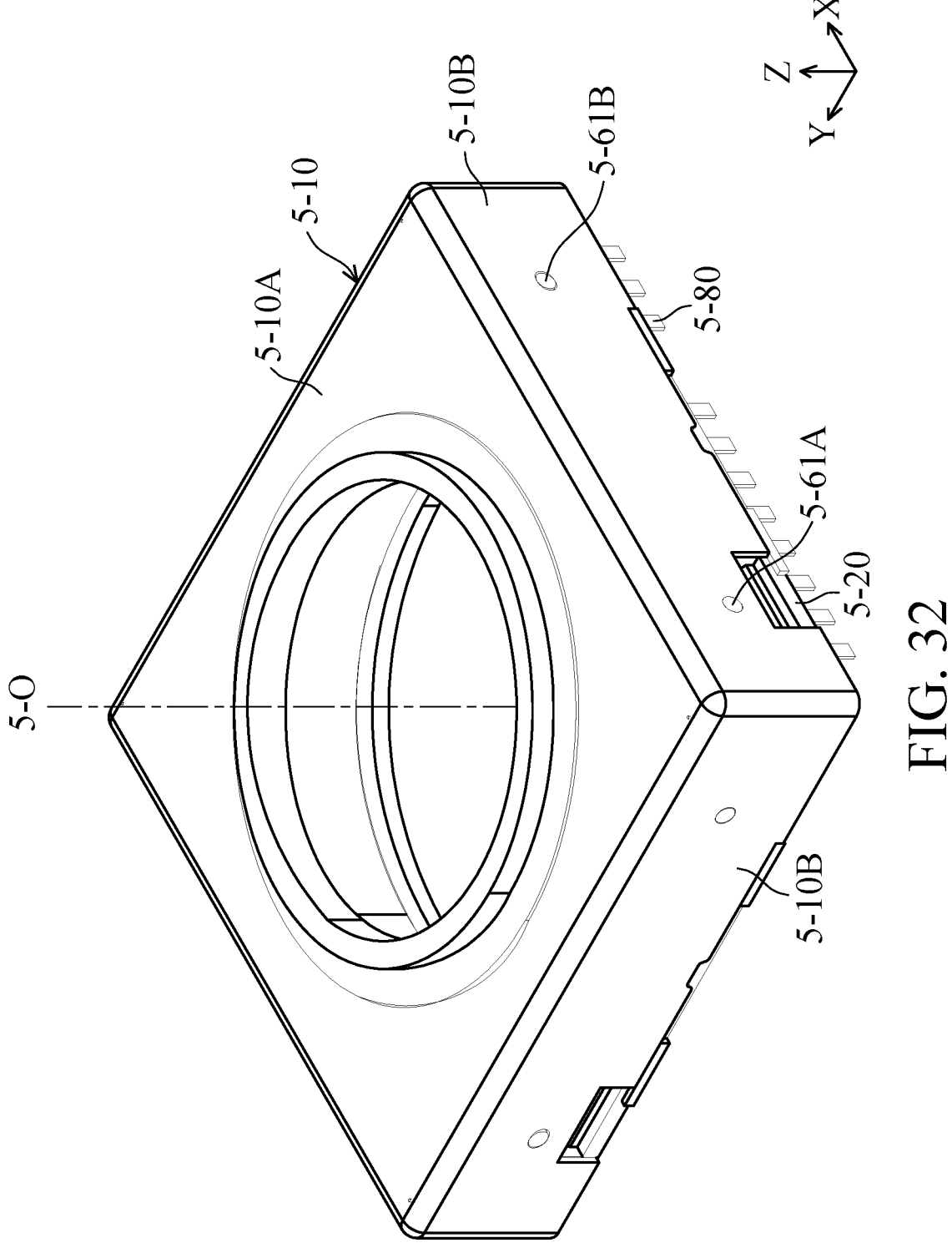
FIG. 32 is a schematic view of an optical element driving mechanism in some embodiments of the present disclosure.
Figure 33:
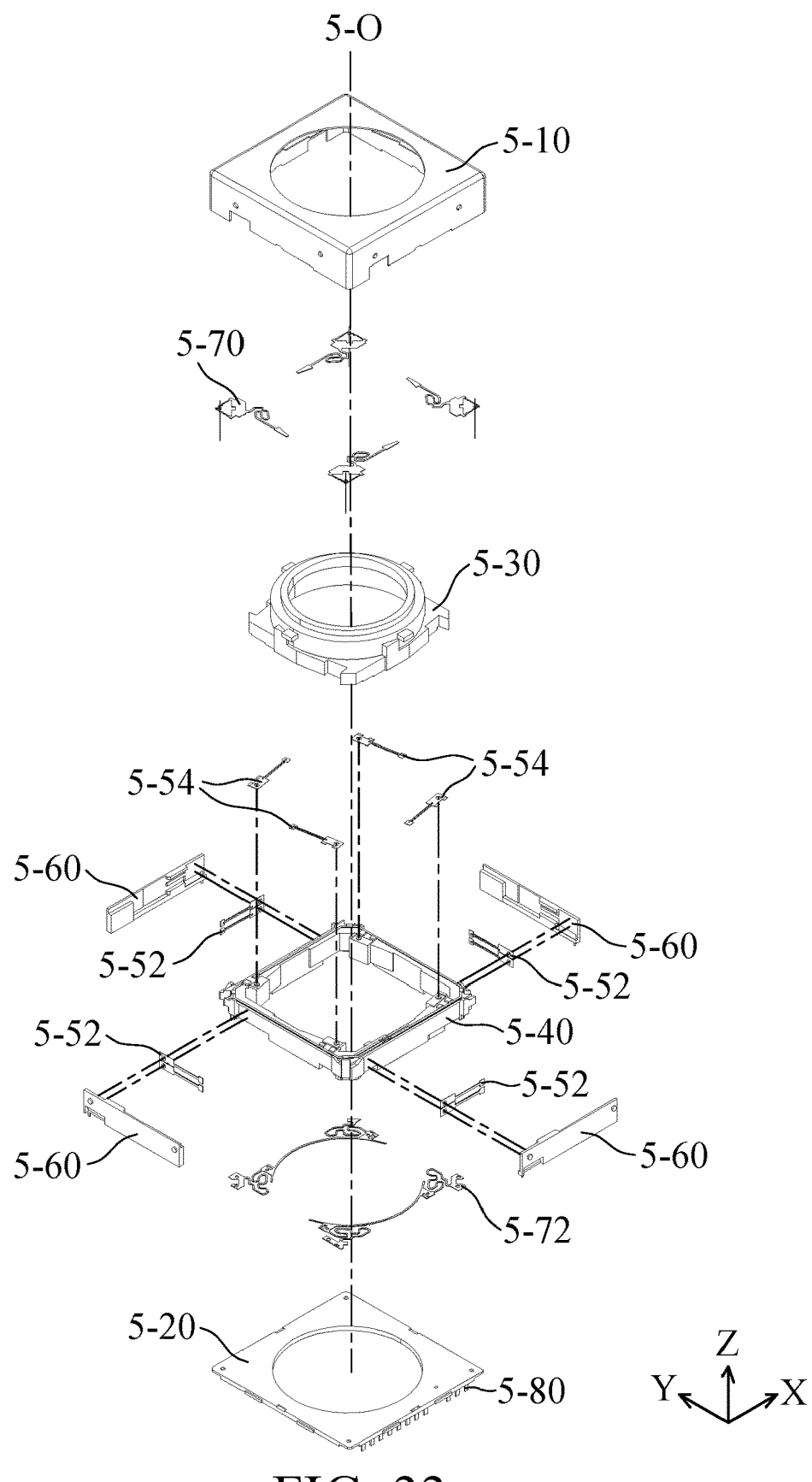
FIG. 33 is an exploded view of the optical element driving mechanism.
Figure 34:
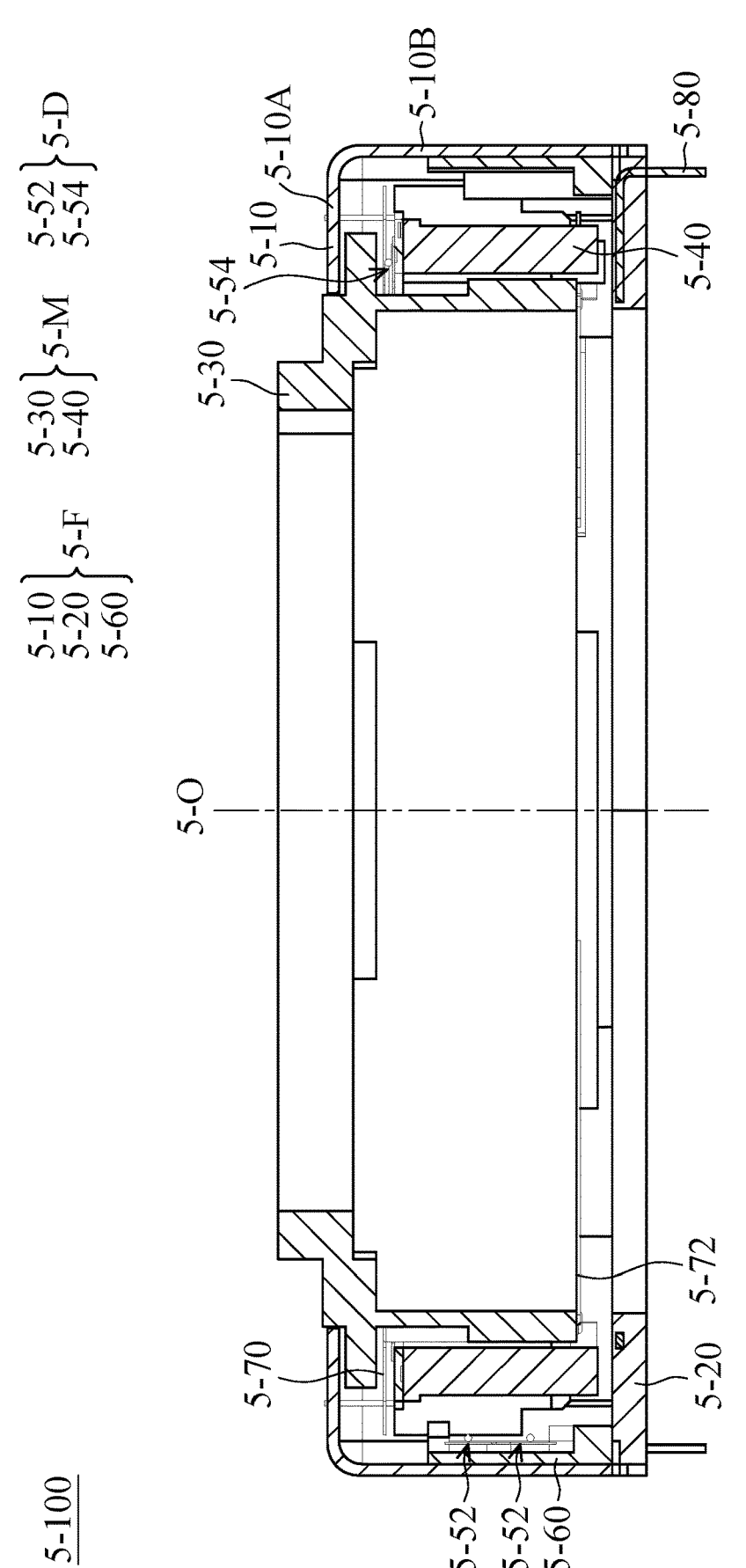
FIG. 34 is a cross-sectional view of the optical element driving mechanism.
Figure 35A:
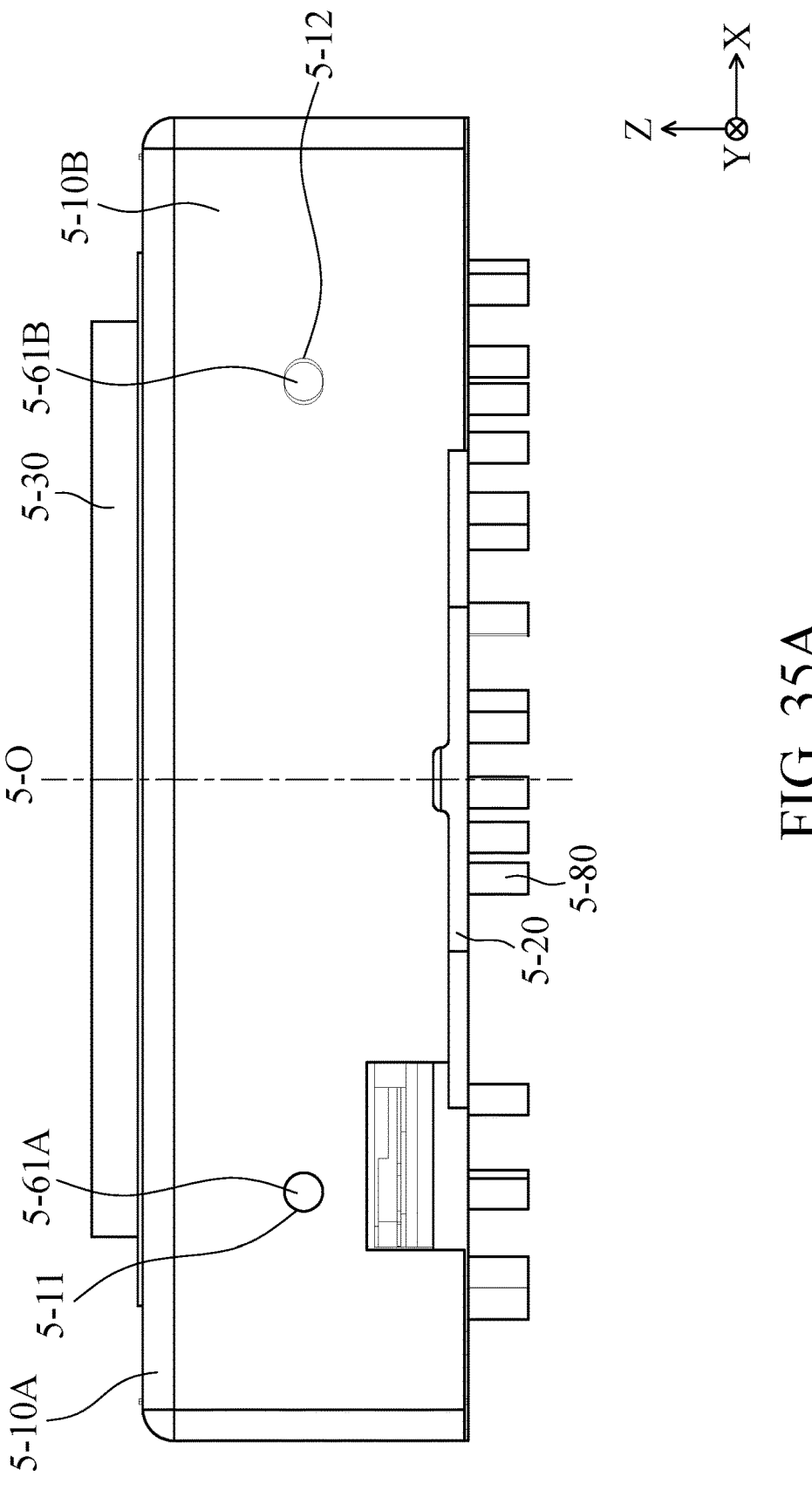
FIG. 35A is a side view of the optical element driving mechanism.
Figure 35B:
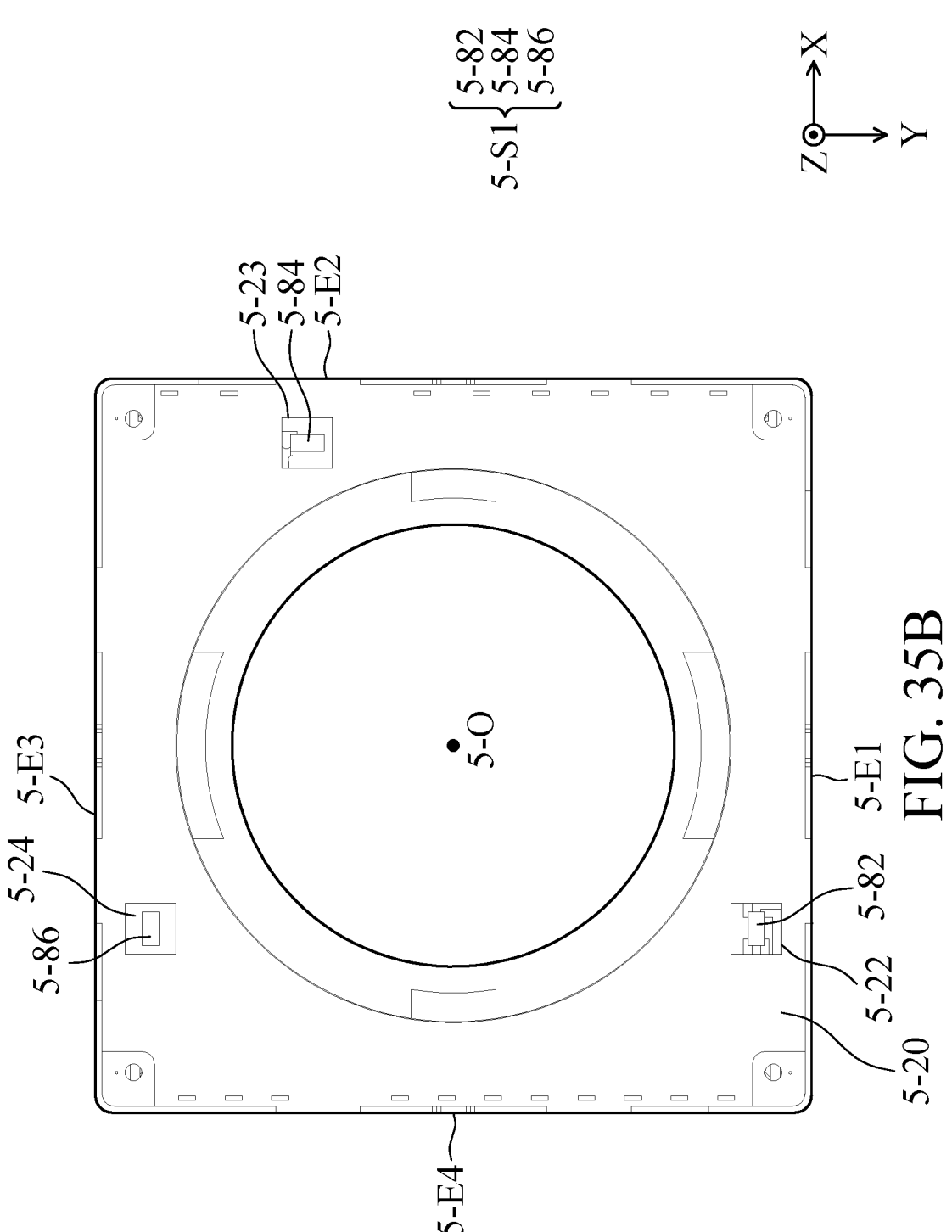
FIG. 35B is a bottom view of the optical element driving mechanism.

Refer to FIG. 32 to FIG. 35B. FIG. 32 is a schematic view of an optical element driving mechanism 5-100 in some embodiments of the present disclosure. FIG. 33 is an exploded view of the optical element driving mechanism 5-100. FIG. 34 is a cross-sectional view of the optical element driving mechanism 5-100. FIG. 35A is a side view of the optical element driving mechanism 5-100. FIG. 35B is a bottom view of the optical element driving mechanism 5-100.

As shown in FIG. 33, the optical element driving mechanism 5-100 may mainly include a case 5-10, a bottom 5-20, a holder 5-30, a frame 5-40, a driving element 5-52, a driving element 5-54, a base unit 5-60, a first resilient element 5-70, a second resilient element 5-72. The case 5-10, the bottom 5-20, and the base unit 5-60 may be called as a fixed portion 5-F. The holder 5-30 and the frame 5-40 may be called as a movable portion 5-M. The driving elements 5-52 and 5-54 may be called as a driving assembly 5-D.

The movable portion 5-M may use for holding an optical element (not shown) and is movable relative to the fixed portion 5-F. The optical element may be a lens, a mirror, a prism, a beam splitter, an aperture, a camera module, or a depth sensor. Furthermore, the driving assembly 5-D may drive the movable portion 5-M to move relative to the fixed portion 5-F. Therefore, the optical element may be driven by the optical element driving mechanism 5-100 to move in different directions, thereby achieving auto focus (AF) or optical image stabilization (OIS).

The case 5-10 and the bottom 5-20 may be combined to form a shell of the optical element driving mechanism 5-100. For example, the bottom 5-20 may be affixed on the case 5-10. It should be noted that a case opening and a bottom opening are formed on the case 5-10 and the bottom 5-20, respectively. The center of the case opening corresponds to an optical axis of the optical element. The base opening corresponds to an image sensor (not shown) disposed outside the optical element driving mechanism 5-100. Therefore, the optical element disposed in the optical element driving mechanism 5-100 may perform focus to the image sensor along the optical axis. Furthermore, when viewed along the main axis 5-O, the fixed portion 5-F has a polygonal structure.

The holder 5-30 has a through hole, and the optical element may be affixed in the through hole. The driving elements 5-52 are disposed between the frame 5-40 and the base unit 5-60, such as disposed on the base unit 5-60. The driving elements 5-54 are disposed between the holder 5-30 and the frame 5-40, such as disposed on the frame 5-40. However, the present disclosure is not limited thereto. For example, the driving element 5-54 may be disposed on the frame 5-40, or the driving element 5-54 may be disposed on the holder 5-30, depending on design requirement.

In this embodiment, the holder 5-60 and the optical element disposed therein are movably disposed in the frame 5-40. More specifically, the holder 5-60 may be connected to and suspended in the frame 5-40 by the first resilient element 5-70 and the second resilient element 5-72 made of a metal material, for example. When current is applied to the driving element 5-52, the driving element 5-52 will move the holder 5-30, the frame 5-40, and the optical element to move relative to the fixed portion 5-F in different directions to achieve optical image stabilization. When current is applied to the driving element 5-54, the driving element 5-54 will drive the holder 5-30 to move relative to the frame 5-40 along the main axis 5-O to achieve auto focus.

In some embodiments, additional circuits 5-80 may be provided on the bottom 5-20 and electrically connects to electronic elements disposed inside or outside the driving mechanism 5-100 for achieve auto focus or optical image stabilization.

The circuits 5-80 on the bottom 5-20 may transfer electrical signal to the driving elements 5-52, 5-54 through the first resilient element 5-70 or the second resilient element 5-72 to control the movement of the movable portion 5-M in X, Y, or Z directions.

The second resilient element 5-72 may be assembled with the circuits on the bottom 5-20 by soldering or laser welding to allow the driving elements 5-52 and 5-54 connecting to external circuits.

In some embodiments, the case 5-10 may include a top plate 5-10A and sidewalls 5-10B extending from the sides of the top plate 5-10A in the Z direction to the bottom 5-20. The base unit 5-60 may be affixed on the sidewall 5-10B, such as by an adhesive element (not shown). As shown in FIG. 35A, the sidewall 5-10B may include a first position structure 5-11 and a second position structure 5-12, which correspond to a third position structure 5-61A and a fourth position structure 5-61B of the base unit 5-60, respectively. For example, the first position structure 5-11 and the second position structure 5-12 may be openings, and the third position structure 5-61A and the fourth position structure 5-61B may protrude from the base unit 5-60 and in the first position structure 5-11 and the second position structure 5-12, respectively.

In some embodiments, the length of the first position structure 5-11 and the length of the second position structure 5-12 in the X direction are different. Therefore, a maximum gap between the first position structure 5-11 and the third position structure 5-61A is different from a maximum gap between the second position structure 5-12 and the fourth position structure 5-61B. For example, the length of the first position structure 5-11 in the X direction may be less than the length of the second position structure 5-12 in the X direction. Therefore, the maximum gap between the first position structure 5-11 and the third position structure 5-61A is greater than the maximum gap between the second position structure 5-12 and the fourth position structure 5-61B. In some embodiments, the adhesive element may be disposed in the first position structure 5-11 and the second position structure 5-12, and in direct contact with the third position structure 5-61A and the fourth position structure 5-61B. Therefore, the relative position of the case 5-10 and the base unit 5-60 may be affixed. In some embodiments, the adhesive element may be glue.

In some embodiments, as shown in FIG. 35B, a first position sensor 5-82, a second position sensor 5-84, and a third position sensor 5-86 may be disposed in the optical element driving mechanism 5-100, and corresponding magnetic elements (not shown) may be disposed on the movable portion 5-M. For example, the bottom 5-20 may have openings 5-22, 5-23, 5-24, and the first position sensor 5-82, the second position sensor 5-84, and the third position sensor 5-86 may be disposed in the openings 5-22, 5-23, 5-24, respectively. Therefore, the movement of the movable portion 5-M relative to the fixed portion 5-F in different dimensions may be detected. For example, the movement of the frame 5-40 relative to the fixed portion 5-F may be detected. In some embodiments, the first position sensor 5-82, the second position sensor 5-84, and the third position sensor 5-86 may be called as a first position sensing assembly 5-S1.

The first position sensor 5-82, the second position sensor 5-84, and the third position sensor 5-86 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the first position sensor 5-82 may be used to detect the movement of the frame 5-40 relative to the fixed portion 5-F in a first dimension, the second position sensor 5-84 may be used to detect the movement of the frame 5-40 relative to the fixed portion 5-F in a second dimension, the third position sensor 5-86 may be used to detect the movement of the frame 5-40 relative to the fixed portion 5-F in a third dimension. In some embodiments, the movement in the first dimension may be a movement in an eighth direction (e.g. X direction), the movement in the second dimension may be a movement in a ninth direction (e.g. Y direction), the movement in the third dimension may be a movement in a tenth direction (e.g. Y direction). In some embodiments, the eighth direction may be not parallel to the ninth direction or the tenth direction, and the ninth direction may be parallel to the tenth direction.

Moreover, the first position sensing assembly 5-S1 may be used for detecting the movement of the movable portion 5-M relative to the fixed portion 5-F. For example, the movement in the fourth dimension may be a rotation relative to an axis extending in a eleventh direction (the extending direction of the main axis 5-O). In other words, the movement in the fourth dimension may be the rotation where the rotational axis is the main axis 5-O. It should be noted that the eleventh direction (e.g. the Z direction) may be not parallel to the eighth direction (e.g. the X direction). For example, the eleventh direction may be perpendicular to the eighth direction. The eleventh direction may be not parallel to the ninth direction (e.g. the Y direction). For example, the eleventh direction may be perpendicular to the ninth direction. The eleventh direction may be not parallel to the tenth direction (e.g. the Y direction). For example, the eleventh direction may be perpendicular to the tenth direction.

As shown in FIG. 35B, when viewed along the main axis 5-O, the fixed portion has a first edge 5-E1, a second edge 5-E2, a third edge 5-E3, and a fourth edge 5-E4. The first position sensor 5-82 is at the first edge 5-E1, the second position sensor 5-84 is at the second edge 5-E2, and the third position sensor 5-86 may at the first edge 5-E1 or the third edge 5-E3. For example, the third position 5-86 may be disposed at the third edge 5-E3 in FIG. 35B, but it is not limited thereto. In other embodiments, the third position sensor 5-86 may be disposed at the first side 5-E1. The movement of the movable portion 5-M relative to the fixed portion 5-F in the fourth dimension may be detected by the first position sensor 5-82, the second position sensor 5-84, and the third position sensor 5-86. In some embodiments, the movement of the movement of the movable portion 5-M relative to the fixed portion 5-F in the first dimension may be detected by the first position sensor 5-82 and the second position sensor 5-84 of the first position sensing assembly 5-S1 to achieve more accurate result.

Figure 36A:
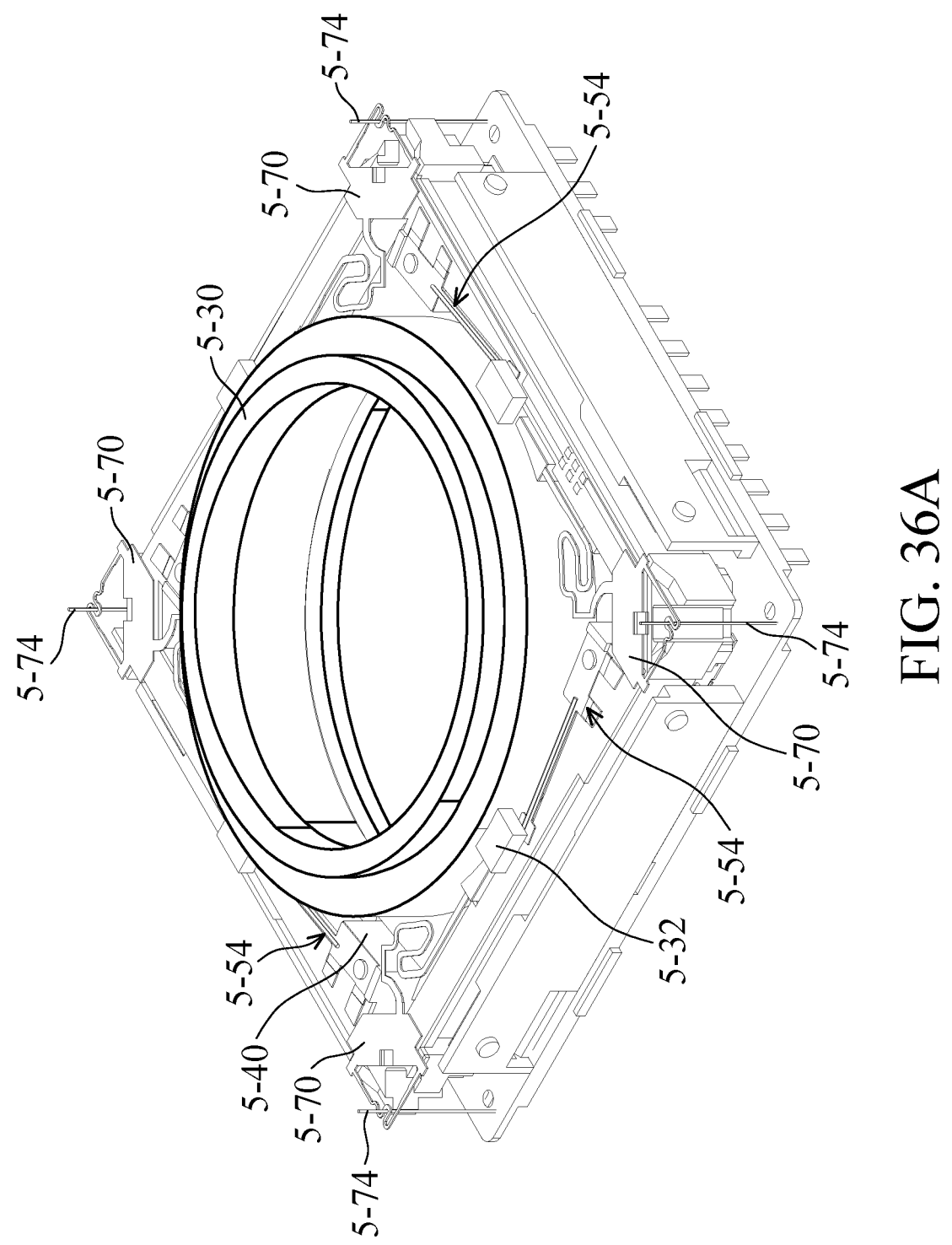
FIG. 36A is a schematic view of the optical element driving mechanism, wherein the case is omitted.
Figure 36B:
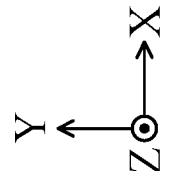
FIG. 36B is a top view of FIG. 36A.
Figure 36C:
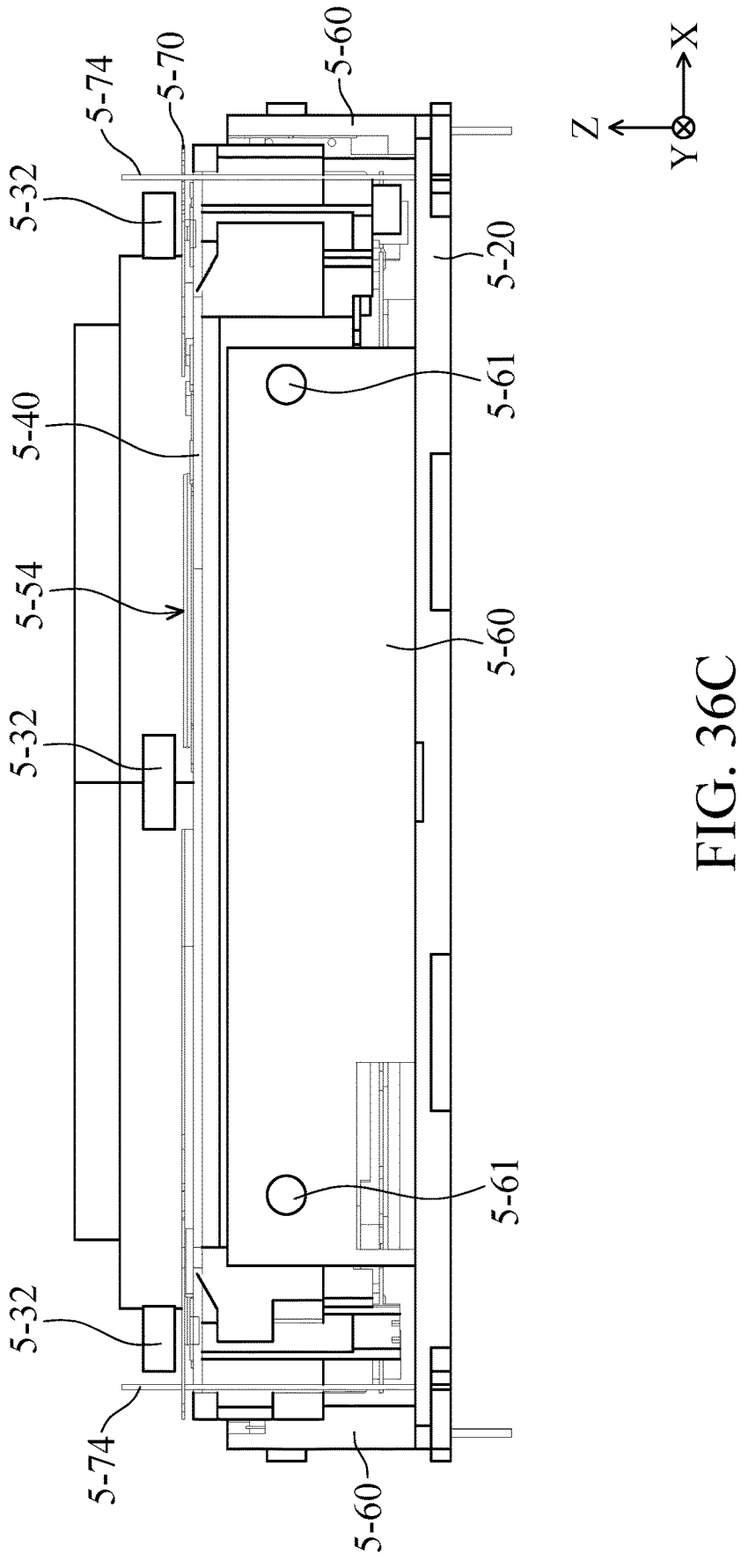
FIG. 36C is a side view of FIG. 36A.
Figure 36D:
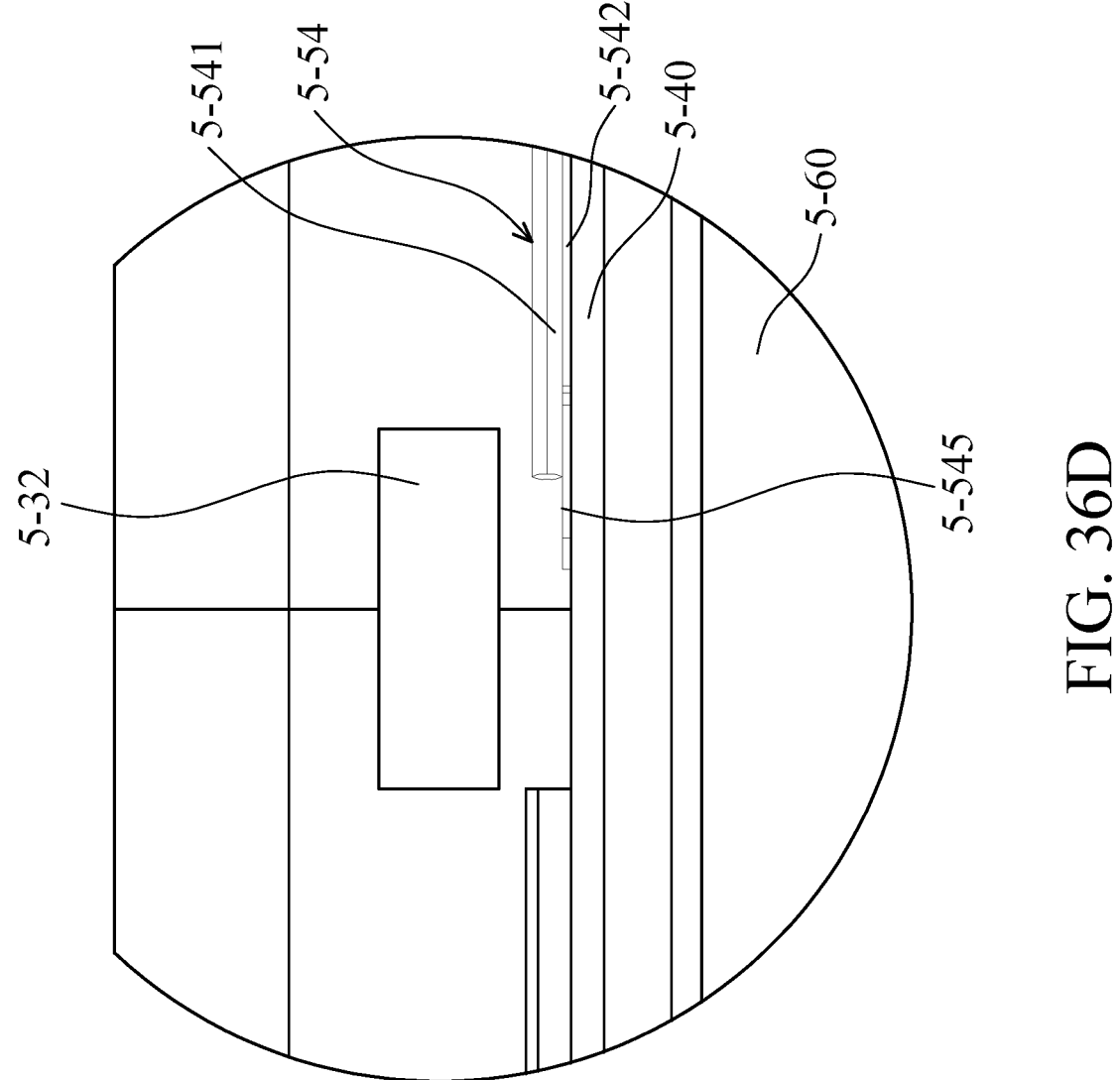
FIG. 36D is an enlarged view of FIG. 36C.

FIG. 36A is a schematic view of the optical element driving mechanism 5-100, wherein the case 5-10 is omitted. FIG. 36B is a top view of FIG. 36A. FIG. 36C is a side view of FIG. 36A. FIG. 36D is an enlarged view of FIG. 36C. The optical element driving mechanism 5-100 may further include third resilient elements 5-74 at the corners of the optical element driving mechanism 5-100. The third resilient elements 5-74 are used for movably connect the frame 5-40 and the fixed portion 5-F, so the frame 5-40 and the movable portion 5-30 disposed in the frame 5-40 may be suspended in the fixed portion 5-F. Moreover, the third resilient element 5-74 may in direct contact with the first resilient element 5-70 and the circuit 5-80 to allow the driving element 5-54 electrically connected to external environment through the first resilient element 5-70, the third resilient element 5-74, and the circuit 5-80.

As shown in FIG. 36B, when viewed along the main axis 5-O, the fixed portion 5-F is polygonal, and the third resilient element 5-74 may at the corners of the fixed portion 5-F and electrically connected to the circuit disposed in the bottom 5-20, and electrically connected to the first resilient element 5-70. Moreover, the first resilient element 5-70 may be plate-shaped, the third resilient element 5-74 may be linear-shaped, and the extension direction of the third resilient element 5-74 (the Z direction) may be parallel to the thickness direction of the first resilient element 5-70 (the Z direction).

Furthermore, the holder 5-30 may have extending portions 5-32 that extends from the radial external surface of the holder 5-30 along a direction that is perpendicular to the main axis 5-O. Moreover, as shown in FIG. 36B to FIG. 36D, the extending portion 5-32 at least overlaps a portion of the driving element 5-54 in a direction that the main axis 5-O extends. For example, the extending portion 5-32 and the contact unit 5-545 may arranged in the direction that the main axis 5-O extends. Therefore, the extending portion 5-32 may be pushed by the driving element 5-54 to allow the holder 5-30 moving in the direction that the main axis 5-O extends to achieve auto focus. How the extending portion 5-32 is pushed by the driving element 5-54 will be described later. Moreover, in the direction that the main axis 5-O extends, the driving element 5-54 may be not overlap the first resilient element 5-70 to reduce the size of the optical element driving mechanism 5-100 in the Z direction, so miniaturization may be achieved.

Figure 36E:
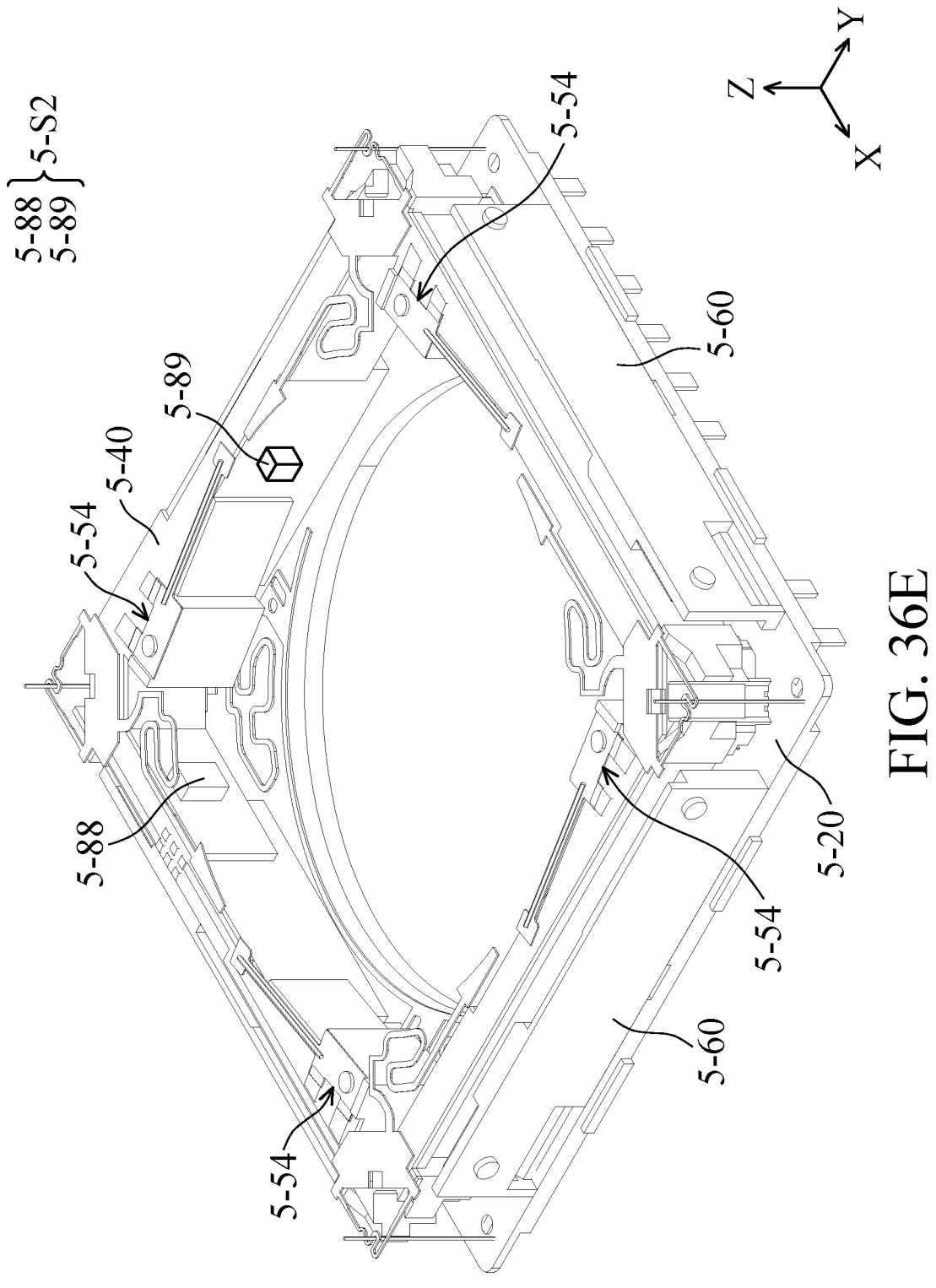
FIG. 36E is a schematic view of the elements in FIG. 36A, wherein the holder is omitted.

FIG. 36E is a schematic view of the elements in FIG. 36A, wherein the holder 5-30 is omitted. As shown in FIG. 36E, the optical element driving mechanism 5-100 may further includes a second position sensing assembly 5-S2. The second position sensing assembly 5-S2 may include a fourth position sensor 5-88 and a fifth position sensor 5-89 disposed on the frame 5-40, and corresponding magnetic elements (not shown) disposed on the holder 5-30. Therefore, when the holder 5-30 moves relative to the frame 5-40, the fourth position sensor 5-88 and the fifth position sensor 5-89 may detect the magnetic field variation of the magnetic element disposed on the holder 5-30 when the holder 5-30 is moving, so the movement of the holder 5-30 relative to the frame 5-40 may be detected.

In other words, the second position sensing assembly 5-S2 may be used for detecting the movement of the holder 5-30 relative to the frame 5-40. For example, the second position sensing assembly 5-S2 may be used for detecting the movement of the holder 5-30 relative to the frame 5-40 in a fifth dimension. It should be noted that the movement of the fifth dimension may be the movement in a twelfth direction (e.g. the Z direction). The twelfth direction may be not parallel to the eighth direction (e.g. the X direction), or the twelfth direction may be perpendicular to the eighth direction. The twelfth direction may be not parallel to the ninth direction (e.g. the Y direction), or the twelfth direction may be perpendicular to the ninth direction. The twelfth direction may be not parallel to the tenth direction (e.g. the Y direction), or the twelfth direction may be perpendicular to the tenth direction. The twelfth direction may be parallel to the eleventh direction (e.g. the Z direction). Moreover, as shown in FIG. 36E, at least a portion of the first resilient element 5-70 is affixed on the base unit 5-60.

Figure 36F:
FIG. 36F is a schematic view of a first position sensor, a second position sensor, a third position sensor, and a fourth position sensor in the optical element driving mechanism.

FIG. 36F is a schematic view of the first position sensor 5-82, the second position sensor 5-84, the third position sensor 5-86, the fourth position sensor 5-88, and the fifth position sensor 5-89. When viewed in the direction that the main axis 5-O extends, as shown in FIG. 36F, the fourth position sensor 5-88 of the second position sensing assembly 5-S2 is at a corner of the fixed portion 5-F, wherein the corner is formed by the first edge 5-E1 and the second edge 5-E2. Moreover, when viewed in the direction that the main axis 5-O extends, the second position sensing assembly 5-S2 (the fourth position sensor 5-88 and the fifth position sensor 5-89) does not overlap the first position sensing assembly 5-S1 (the first position sensor 5-82, the second position sensor 5-84, and the third position sensor 5-86). Therefore, magnetic interference between the position sensors and their corresponding magnetic elements may be prevented, so the accuracy may be enhanced.

Figure 37A:
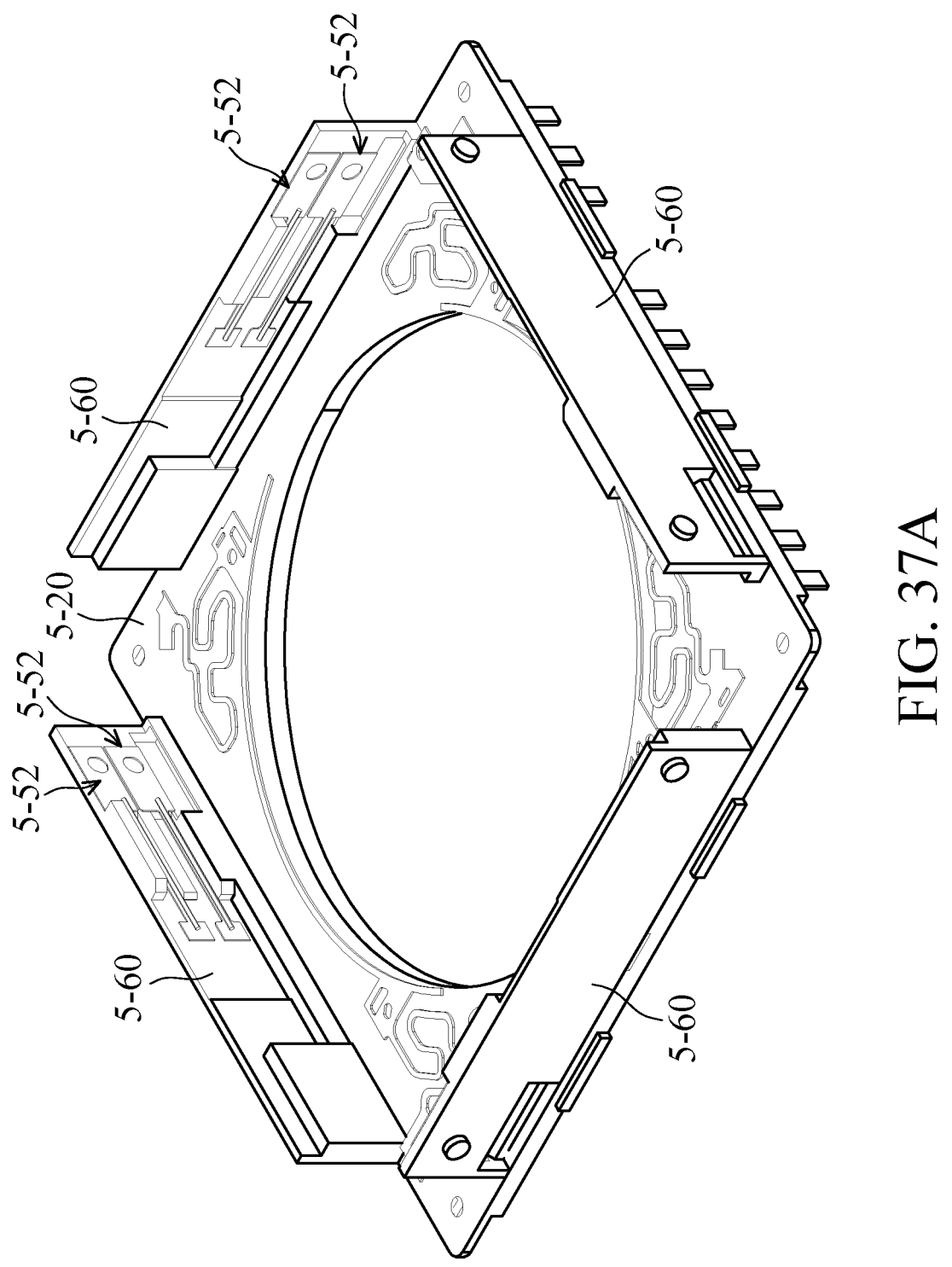
FIG. 37A is a schematic view of some elements of the optical element driving mechanism.
Figure 37B:
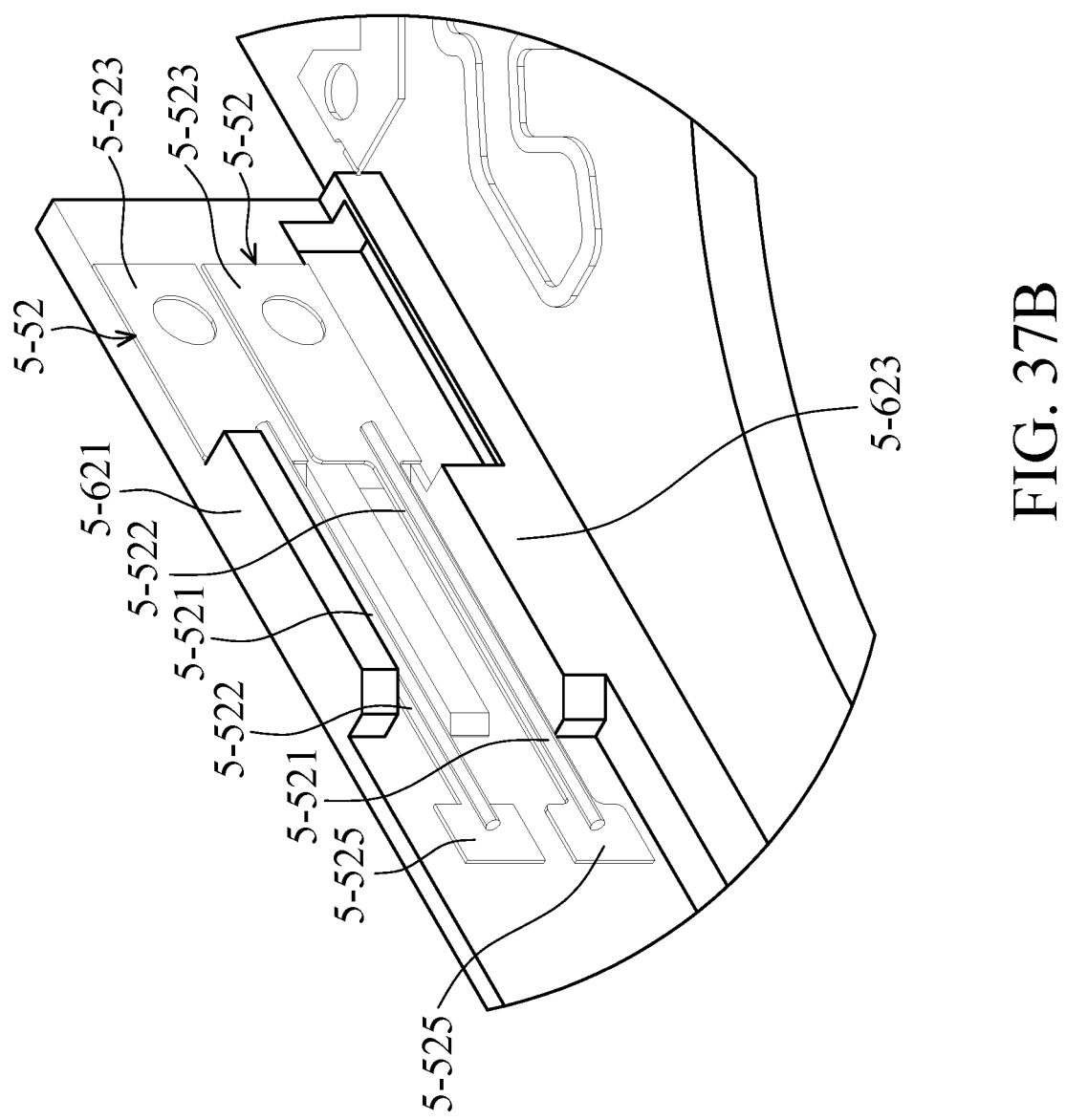
FIG. 37B is an enlarged view of FIG. 37A.
Figure 37C:
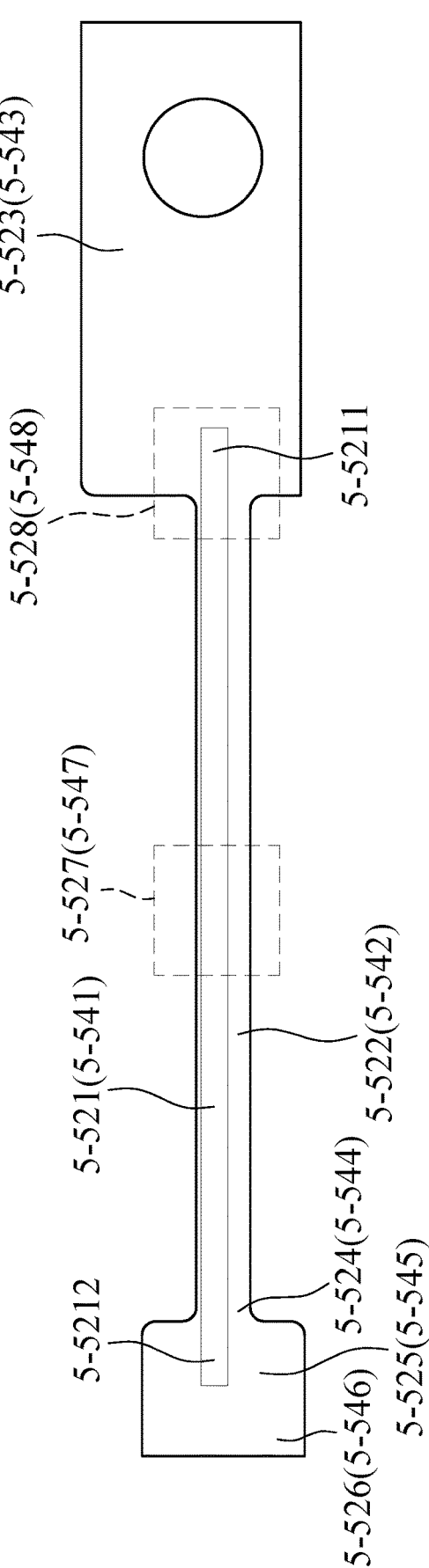
FIG. 37C is a schematic view of a driving element.

FIG. 37A is a schematic view of some elements in the optical element driving mechanism 5-100, FIG. 37B is an enlarged view of FIG. 37A, and FIG. 37C is a schematic view of the driving element 5-52 or 5-54. In some embodiments, as shown in FIG. 37A and FIG. 37B, the optical element driving mechanism 5-100 may have the driving element 5-52 on one of the base units 5-60, and more than one driving elements 5-52 may be disposed on the base unit 5-60 to movement in different direction. For example, the base unit 5-60 may have stopping portions 5-621 and 5-623 (the stopping elements of the stopping assembly) protruding to the frame 5-40 and extending in an extending direction of the driving element 5-52. The driving element 5-52 may be disposed between the stopping portions 5-621 and 5-623. In other words, the driving element 5-52 is surrounded by the stopping portions 5-621 and 5-623 to prevent the driving element 5-52 from being collided.

It should be noted that the stopping portions 5-621 and 5-623 (stopping assembly) are affixed on the base unit 5-60, the base unit 5-60 may be plate-shaped, and the material of the base unit 5-60 may include plastic. When viewed in the thickness direction of the base unit 5-60, the base unit 5-60 may be polygonal (e.g. rectangular), and the stopping portions 5-621 and 5-623 may be position at different edges of the base unit 5-60.

As shown in FIG. 37C, the driving element 5-52 may include a driving unit 5-521, a resilient unit 5-522, a connecting unit 5-523, a buffer unit 5-524, a contact unit 5-525, a contact portion 5-526, and vibration preventing units 5-527 and 5-528. The driving element 5-54 may include a driving unit 5-541, a resilient element 5-542, a connecting unit 5-543, a buffer unit 5-544, a contact unit 5-545, a contact portion 5-546, and vibration preventing units 5-547 and 5-548.

In some embodiments, the material of the driving unit 5-521 may include shape memory alloy (SMA). The driving unit 5-521 may be strip-shaped and extend in a direction. Shape memory alloy is an alloy material that can eliminate a deformation at a lower temperature and restore its original shape before deformation after heating. For example, when the shape memory alloy is subjected to a limited plastic deformation at a temperature lower than the phase transition temperature, the shape of the shape memory alloy may be restored to the original shape by heating.

In some embodiments, when a signal (e.g. voltage or current) is provided to the driving unit 5-521, the temperature may be increased by the thermal effect of a current, so that the length of the driving unit 5-521 may be decreased. On the contrary, if a signal having a lower intensity is provided which makes the heating rate lower than the heat dissipation rate of environment, the temperature of the driving unit 5-521 may be decreased, and the length may be increased.

The driving unit 5-521 may have an end 5-5211 affixed on the connecting unit 5-523 and an end 5-5212 affixed on the contact unit 5-525, and the resilient unit 5-522 is resilient, such as may include metal. Therefore, when the driving unit 5-521 is shrinking, the resilient unit 5-522 may be bent by the driving unit 5-521. Moreover, the driving unit 5-521 and the resilient unit 5-522 may include metal, so the driving unit 5-521 may be electrically connected to the resilient unit 5-522, and the heat generated by the driving unit 5-521 may be dissipated by the resilient unit 5-522. The connecting unit 5-523 may be affixed on the fixed portion 5-F, such as affixed on the base unit 5-60, and the driving element 5-52 may be electrically connected to external environment by the connecting unit 5-523. It should be noted that as shown in FIG. 37B, in the direction that the main axis 5-O extends (FIG. 36B) and in a first direction that the driving unit 5-521 extends, the driving unit 5-521 of the driving element 5-52 at least overlaps a portion of the stopping portions 5-621 and 5-623.

The contact unit 5-525 may be movably connected to the resilient unit 5-521 through the buffer unit 5-524. For example, the buffer unit 5-524 may be a connection point of the resilient unit 5-522 and the contact unit 5-525, and the buffer unit 5-524 may be bent. The resilient unit 5-522 may be strip-shaped, and the contact unit 5-525 may be rectangular or arc-shaped. However, the present disclosure is not limited thereto, and the units may have different directions. The contact unit 5-525 may be used for in contact with the movable portion 5-M (e.g. the frame 5-40) or the fixed portion 5-F (e.g. the base unit 5-60). When the shape of the driving unit 5-521 is changing (e.g. shrinking), the shape of the resilient unit 5-522 may be changed accordingly (e.g. bending), so the contact unit 5-525 will be moved. In some embodiments, the material of the contact unit 5-525 may include metal, such as the resilient unit 5-522, the buffer unit 5-524, and the contact unit 5-525 may be formed as one piece, i.e. having an identical material.

In some embodiments, the contact unit 5-525 further includes a contact portion 5-526 at an end of the contact unit 5-525 that is away from the resilient unit 5-522. Although the contact portion 5-526 is illustrated as one piece, the present disclosure is not limited thereto. For example, in some embodiments, the contact 5-525 may include a plurality of contact portions 5-526, and the contact portions 5-526 may be separated from each other, and connected to each other by the contact unit 5-525. In other words, the contact unit 5-525 and the plurality of contact portions 5-526 may be formed as one piece.

In some embodiments, the vibration preventing unit 5-527 may be disposed between the driving unit 5-521 and the resilient unit 5-522, such as disposed between the center of the driving unit 5-521 and the center of the resilient unit 5-522. The vibration preventing unit 5-528 may be disposed on the end 5-5211 of the driving unit 5-521, and the vibration preventing units 5-527 and 5-528 may be in direct contact with the driving unit 5-521 and the resilient unit 5-522 to absorb the vibration generated by the deformation of the driving unit 5-521 and the resilient unit 5-522, so the driving unit 5-521 and the resilient unit 5-522 may be prevented from being damaged.

In some embodiments, the material of the vibration preventing units 5-527 or 5-528 may include soft resin. In other words, the Young's modulus of the vibration preventing units 5-527 or 5-528 may be less than the Young's modulus of the base unit 5-60.

The structures and functions of the driving unit 5-541, the resilient unit 5-542, the connecting unit 5-543, the buffer unit 5-544, the contact unit 5-545, the contact portion 5-546, the vibration preventing units 5-547 and 5-548 of the driving unit 5-54 are respectively similar or identical to the structures and functions of the driving unit 5-521, the resilient unit 5-522, the connecting unit 5-523, the buffer unit 5-524, the contact unit 5-525, the contact portion 5-526, the vibration preventing units 5-527 and 5-528 of the driving unit 5-24, and are not repeated again.

Figure 37D:
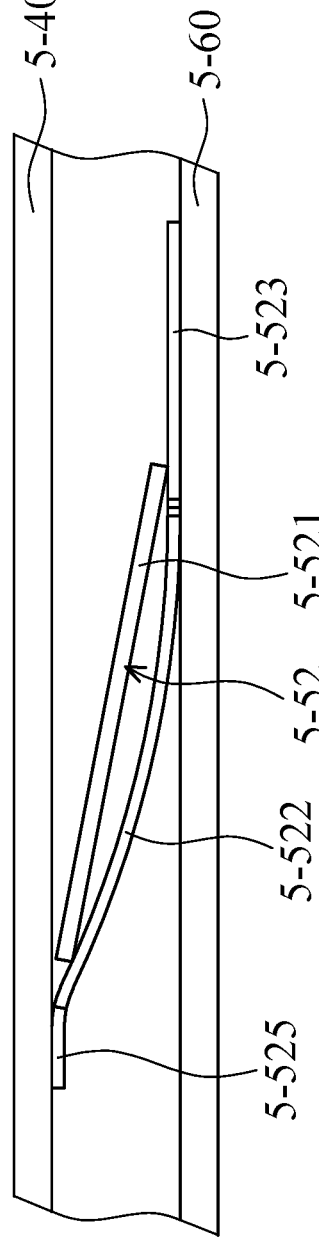
FIG. 37D is a schematic view when the frame is pushed by the driving element relative to a base unit.
Figure 37E:
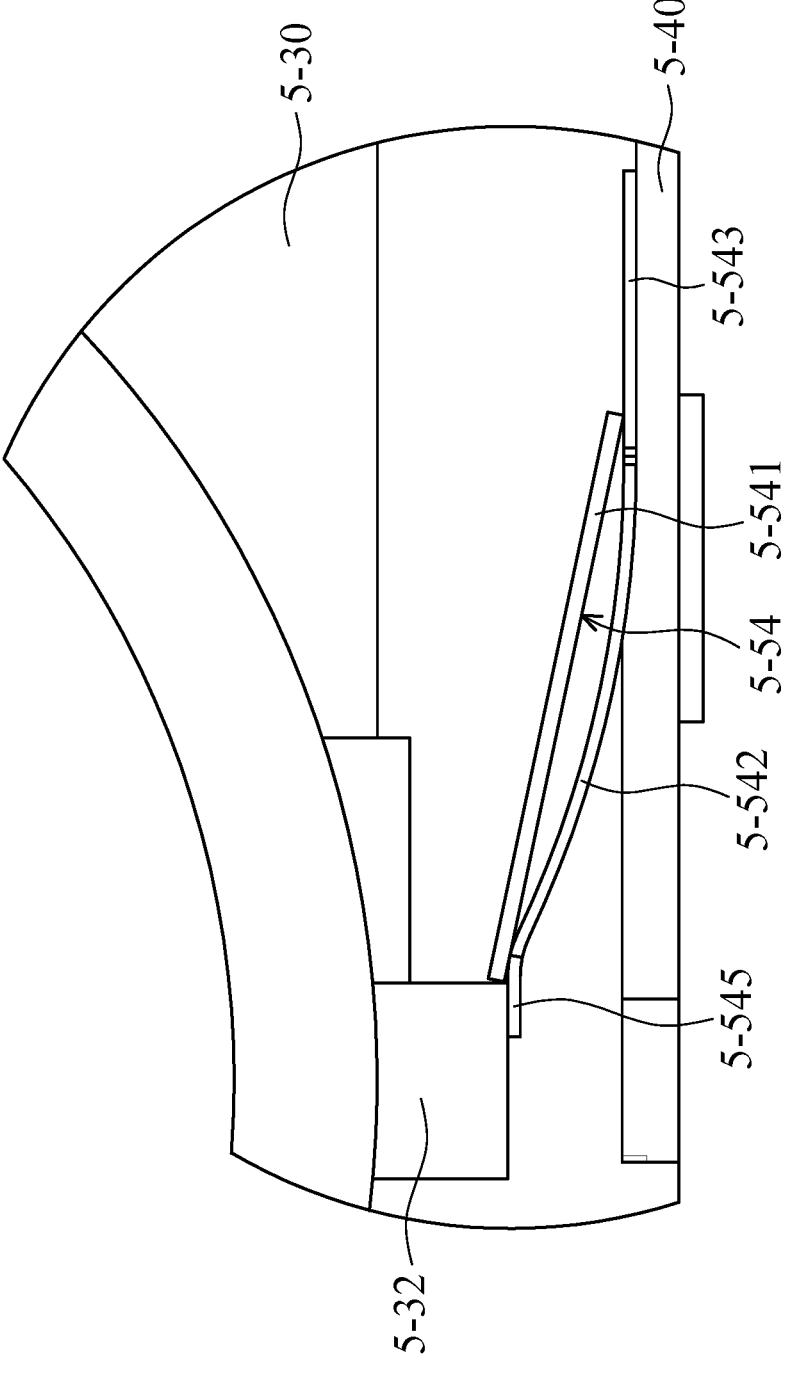
FIG. 37E is a schematic view when the holder is pushed by the driving element relative to the frame.

FIG. 37D is a schematic view when the frame 5-40 is pushed by the driving element 5-52 relative to a base unit 5-60. FIG. 37E is a schematic view when the holder 5-30 is pushed by the driving element 5-54 relative to the frame 5-40. As shown in FIG. 37D, when the driving unit 5-521 of the driving element 5-52 is shrinking, the resilient unit 5-522 may be deformed accordingly. The connecting unit 5-523 is affixed on the base unit 5-60, so only the contact unit 5-525 may be moved by the driving unit 5-521, such as moves to the frame 5-40. When the contact unit 5-525 is moved to in contact with the frame 5-40, a driving force may be applied to the frame 5-40 by the contact unit 5-525. The direction of the driving force (from the base unit 5-60 to the frame 5-40) is different from the extension direction of the driving unit 5-521 when the driving unit 5-521 is static. For example, if the driving unit 5-521 extends in the X direction when static, the direction of the driving force may be the Y direction that is perpendicular to the X direction to allow the frame 5-40 moving in the Y direction.

As shown in FIG. 37E, when the driving unit 5-541 of the driving element 5-54 is shrinking, the resilient unit 5-542 may be deformed accordingly. The connecting unit 5-543 is affixed on the frame 5-40, so only the contact unit 5-545 may be moved by the driving unit 5-541, such as moves to the extending portion 5-32 of the holder 5-30. When the contact unit 5-545 is moved to in contact with the extending portion 5-32, a driving force may be applied to the holder 5-30 by the contact unit 5-545. The direction of the driving force (from the frame 5-40 to the extending portion 5-32) is different from the extension direction of the driving unit 5-541 when the driving unit 5-541 is static. For example, if the driving unit 5-541 extends in a direction on the XY plane when static, the direction of the driving force may be the Z direction that is perpendicular to this direction to allow the holder 5-30 moving in the Z direction.

Figure 37F:
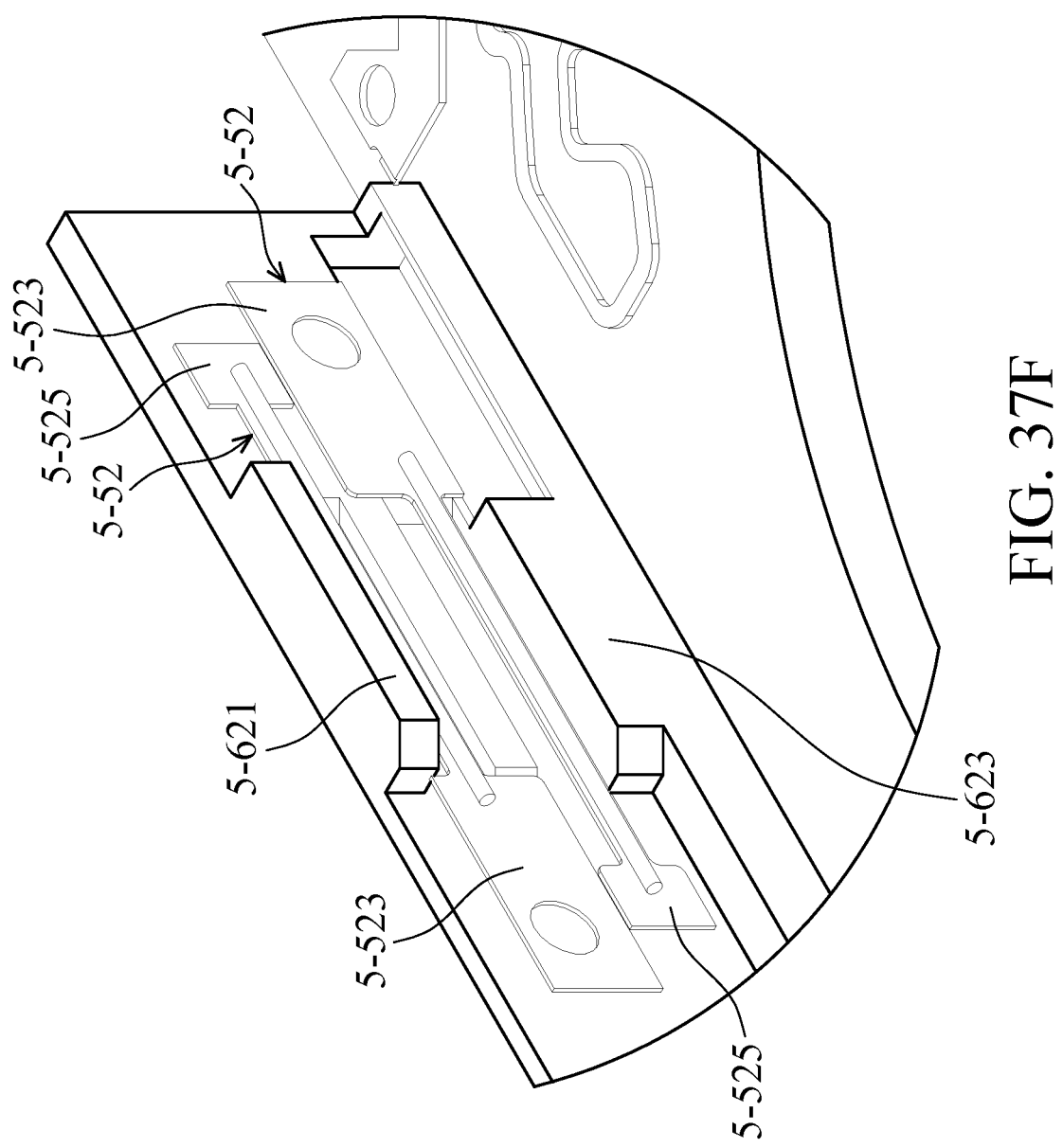
FIG. 37F is a schematic view of another configuration of the driving elements in other embodiments of the present disclosure.

Although the two driving elements 5-52 extend in an identical direction, the present disclosure is not limited thereto. For example, FIG. 37F is schematic view of another configuration of the driving units 5-52 in other embodiments of the present disclosure, wherein the two driving units 5-52 extend in opposite directions. Therefore, the contact units 5-525 of the two driving units 5-52 may push the frame 5-40 at different positions, so different torque may be provided to the frame 5-40. Therefore, the frame 5-40 may move and rotate at the same time.

Referring back to FIG. 37B. When the frame 5-40 moves relative to the fixed portion 5-F (e.g. the base unit 5-60), because the stopping portions 5-621 and 5-623 protrude to the frame 5-40, a limit range may be defined to determine a movable range of the frame 5-40 by the stopping portions 5-621 and 5-623. For example, the limit range may have a first position and a second position. When the frame 5-40 (the movable portion 5-M) is at the first position relative to the base unit 5-60 (the fixed portion 5-F), the driving unit 5-52 is not in contact with the frame 5-40. When the frame 5-40 is at the second position relative to the base unit 5-60, the driving element 5-52 may be in direct contact with the frame 5-40 and the base unit 5-60.

In some embodiments, the base unit 5-60 may further include a recess 5-624 corresponding to the contact unit 5-525, such as overlap each other in a direction that the main axis 5-O extends. Therefore, when the driving unit 5-521 is not shrink, the shape of the resilient unit 5-522 is back to the shape shown in FIG. 37B. The contact unit 5-525 may be prevented from being in direct contact with the base unit 5-60 by the recess 5-624 when the resilient unit 5-522 is deforming, so the contact unit 5-525 may be protected. Moreover, the material of the recess 5-624 does not include conductive material, such as does not include metal, so short may be prevented when the contact unit 5-525 is in contact with the recess 5-624.

It should be noted that in some embodiments, when the movable portion 5-M is driven by the driving assembly 5-D to move in the first dimension (the translational movement in X direction) relative to the fixed portion 5-F, the movable portion 5-M is also driven by the driving assembly 5-D to move in a sixth dimension. The movement in the sixth dimension may be a rotation with the optical axis of the optical element as the rotational axis. It should be noted that the optical axis may be different from the main axis 5-O. For example, when the driving assembly 5-D drives the movable portion 5-M to move in the first dimension relative to the fixed portion 5-F, the optical element may be moved, so the optical axis may be moved relative to the main axis. Therefore, the movable portion 5-M may be allowed to move in more dimensions relative to the fixed portion 5-F, and the performance of optical image stabilization may be enhanced as well.

In some embodiments, when the movable portion 5-M is driven by the driving assembly 5-D and only moves in the first dimension relative to the fixed portion, the movable portion 5-M is only movable in a first limit range of a maximum movable range in the first dimension. The first limit range is defined by the movable range of the frame 5-40. For example, if the movable portion 5-M moves in the X direction, the first limit range may be defined by the maximum movable range of the movable portion 5-M in the X direction. Afterwards, when the movable portion 5-M is driven by the driving assembly 5-D to move relative to the fixed portion 5-F in both of the first dimension and the sixth dimension, the movable portion 5-M is only movable in a second limit range of the maximum movable range in the first dimension. It should be noted that in the first dimension, the first limit range is greater than the second limit range, and the maximum movable range is greater than the first limit range. In other words, if the movable portion 5-M not only moves in the first dimension, but also moves in the sixth dimension, the movable range of the movable portion 5-M in the first dimension will be decreased accordingly.

When the movable portion 5-M moves relative to the fixed portion 5-F in the first limit range, the stopping portions 5-621 and 5-623 (the stopping assembly) is not in contact with at least one of the movable portion 5-M and the fixed portion 5-F. In this embodiments, the stopping portions 5-621 and 5-623 are disposed on the fixed portion 5-F, so the stopping portions 5-621 and 5-623 will not in direct contact with the movable portion 5-M when the movable portion 5-M is in the first limit range. However, the present disclosure is not limited thereto. For example, the stopping assembly may be disposed on the movable portion 5-M. In such embodiments, when the movable portion 5-M is in the first limit range, the stopping assembly on the movable portion 5-M will not in direct contact with the fixed portion 5-F, so the movable portion 5-M and the fixed portion 5-F may be prevented from being damaged by the collision between each other.

In some embodiments, when the movable portion 5-M is driven by the driving assembly 5-D to only move in the sixth dimension relative to the fixed portion 5-F, the movable portion 5-M is only allowed to move in a third limit range of the maximum movable range in the sixth dimension. When the movable portion 5-M is driven by the driving assembly 5-D to move in both of the first dimension and the sixth dimension relative to the fixed portion 5-F, the movable portion 5-M is only allowed to move in a fourth limit range of the maximum movable range in the sixth dimension. It should be noted that the third limit range is greater than the fourth limit range in the sixth dimension. In other words, if the movable portion 5-M not only moves in the sixth dimension, but also moves in the first dimension, the movable range of the movable portion 5-M in the sixth dimension will be decreased accordingly. Similarly, when the movable portion 5-M moves relative to the fixed portion 5-F in the third limit range, the stopping portions 5-621 and 5-623 (the stopping assembly) is not in contact with at least one of the movable portion 5-M and the fixed portion 5-F.

Moreover, as shown in FIG. 36F, a control unit 5-C may be included in the optical element driving mechanism 5-100. The control unit 5-C may be a driver IC, a storage, or a memory, etc., and may be used for recording the first limit range, the second limit range, the third limit range, and the fourth limit range to prevent the movable portion 5-M exceeding the limit ranges when moving to prevent damage. The first limit range, the second limit range, the third limit range, and the fourth limit range may be measured by an external apparatus (not shown), and the measured first limit range, the measured second limit range, the measured third limit range, and the measured fourth limit range will be stored in the control unit 5-C. It should be noted that the control unit 5-C may be electrically connected to the first position sensing assembly 5-S1 (which includes the first position sensor 5-82, the second position sensor 5-84, the third position sensor 5-86) and the second position sensing assembly 5-S2 (which includes the fourth position sensor 5-88 and the fifth position sensor 5-89). Therefore, multiple position sensors may be controlled by one control unit 5-C, and the number of the required control unit may be reduced to achieve miniaturization.

Figure 38A:
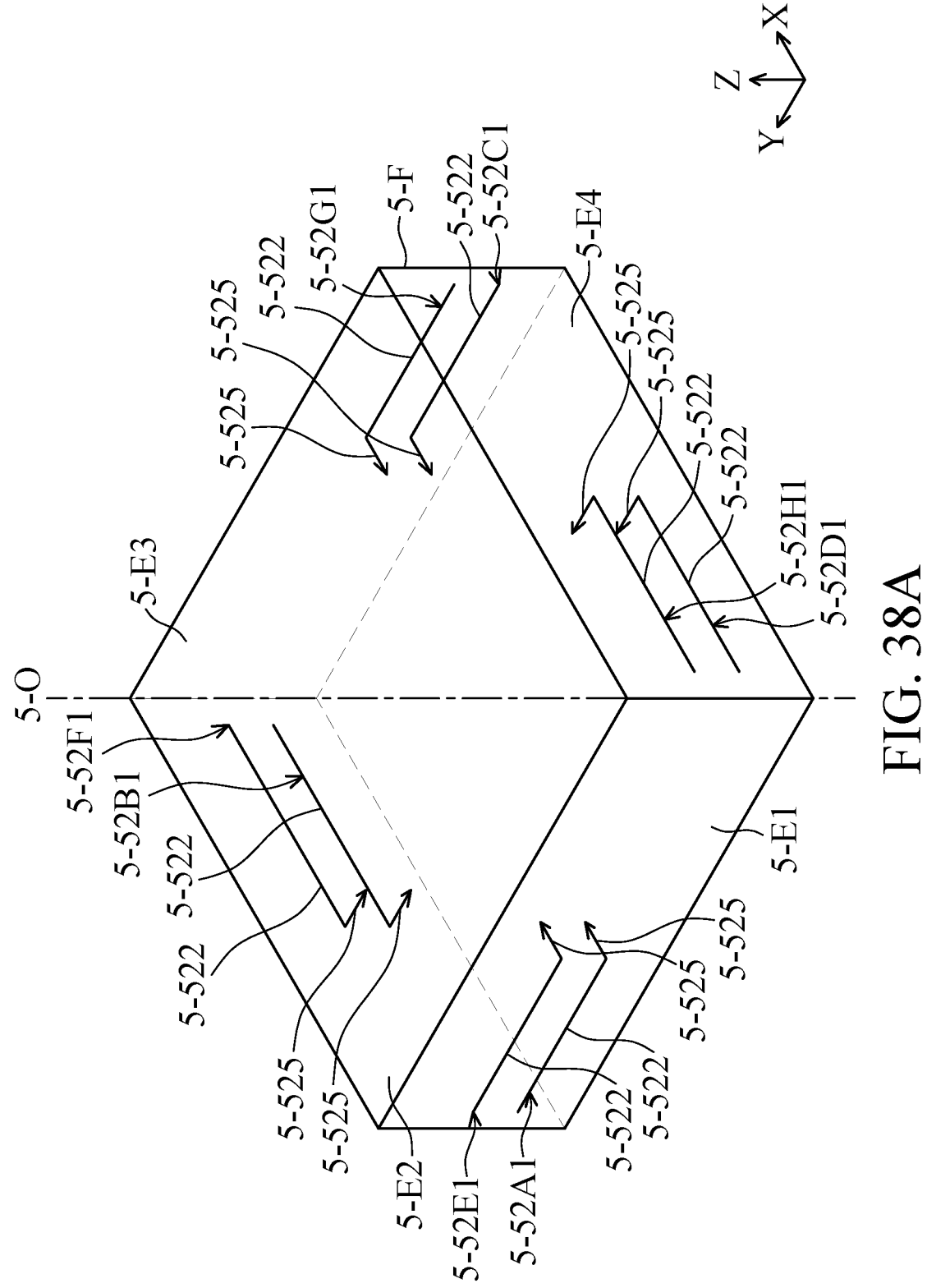
FIG. 38A to FIG. 38N are schematic views of different configurations of the driving elements in the optical element driving mechanism.
Figure 38B:
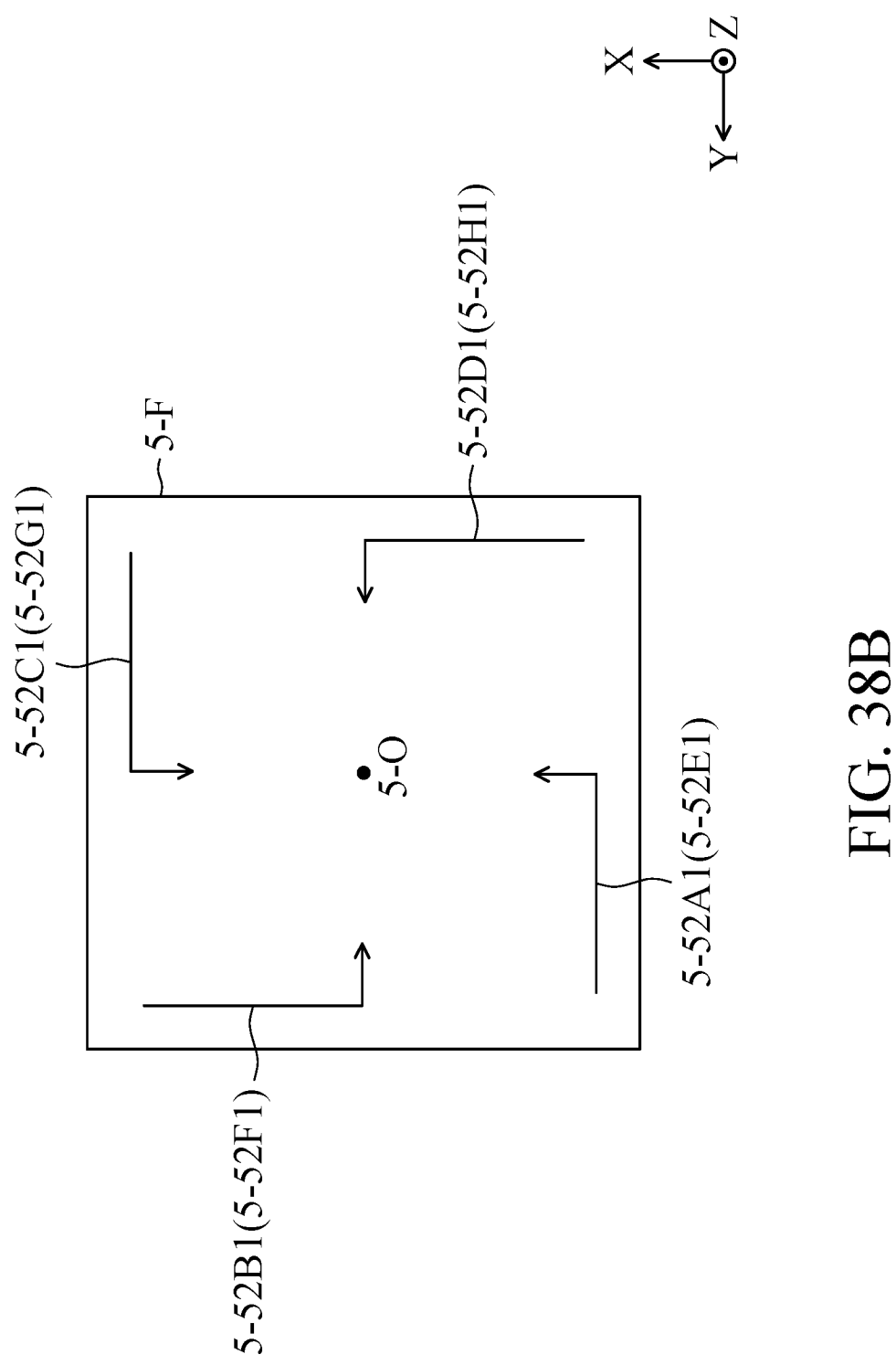
Figure 38C:
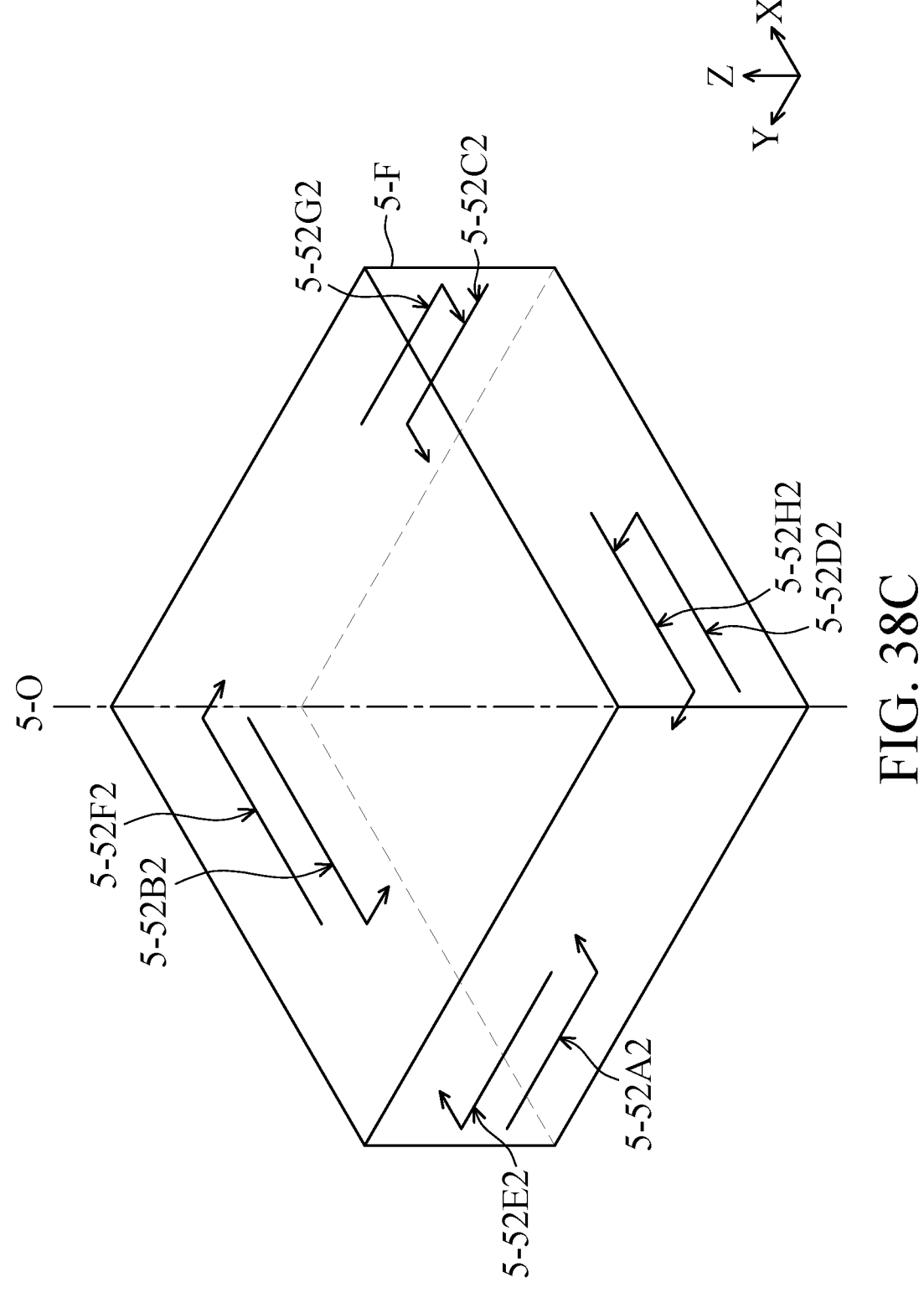
Figure 38D:
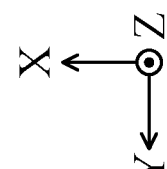
Figure 38D:
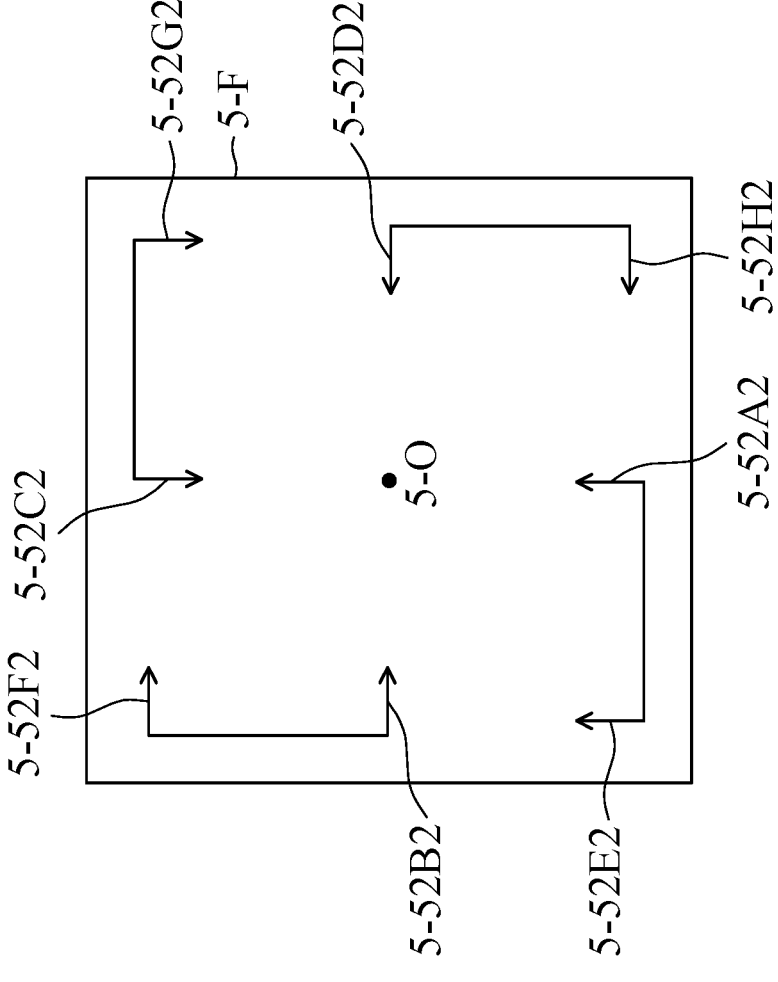
Figure 38E:
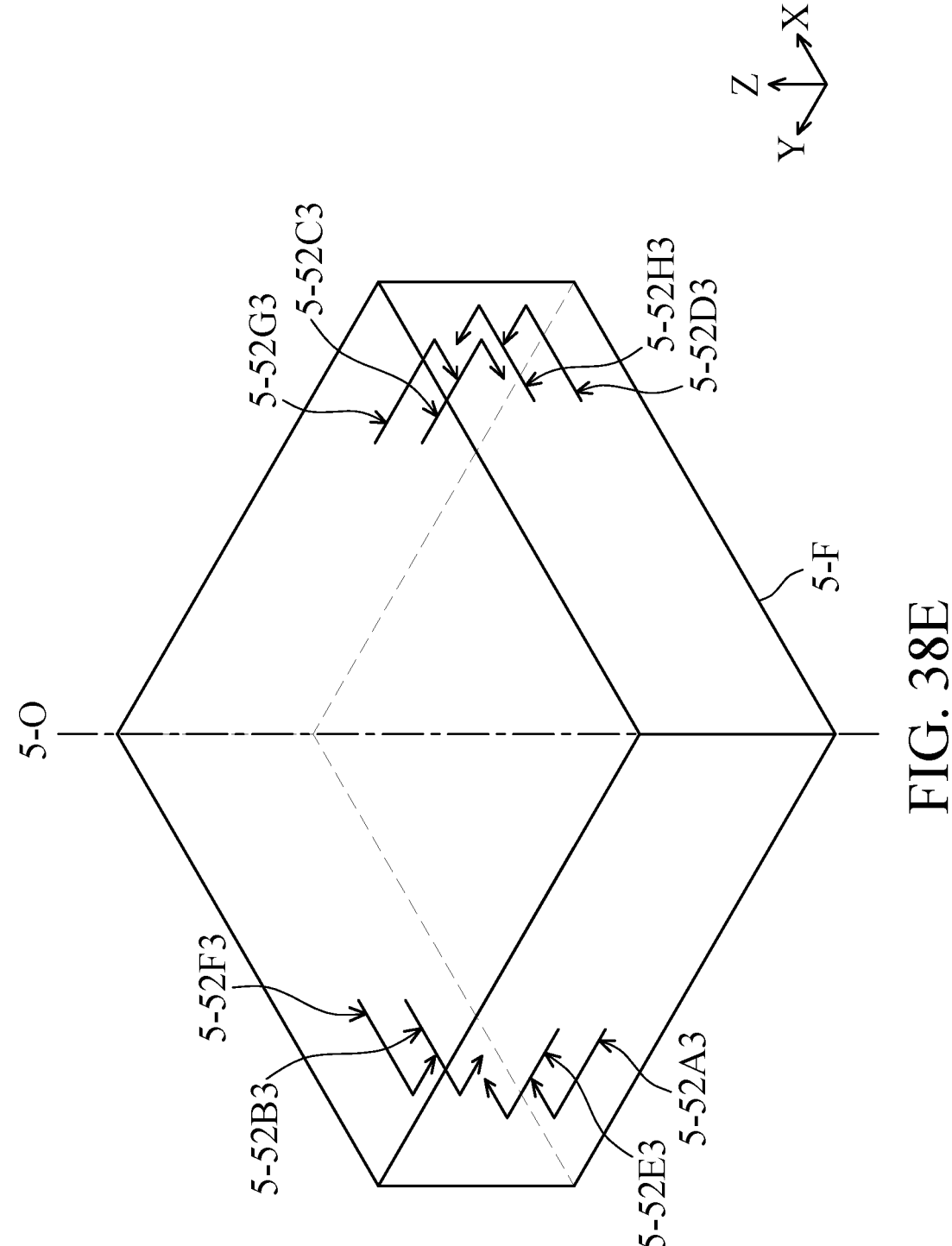
Figure 38F:
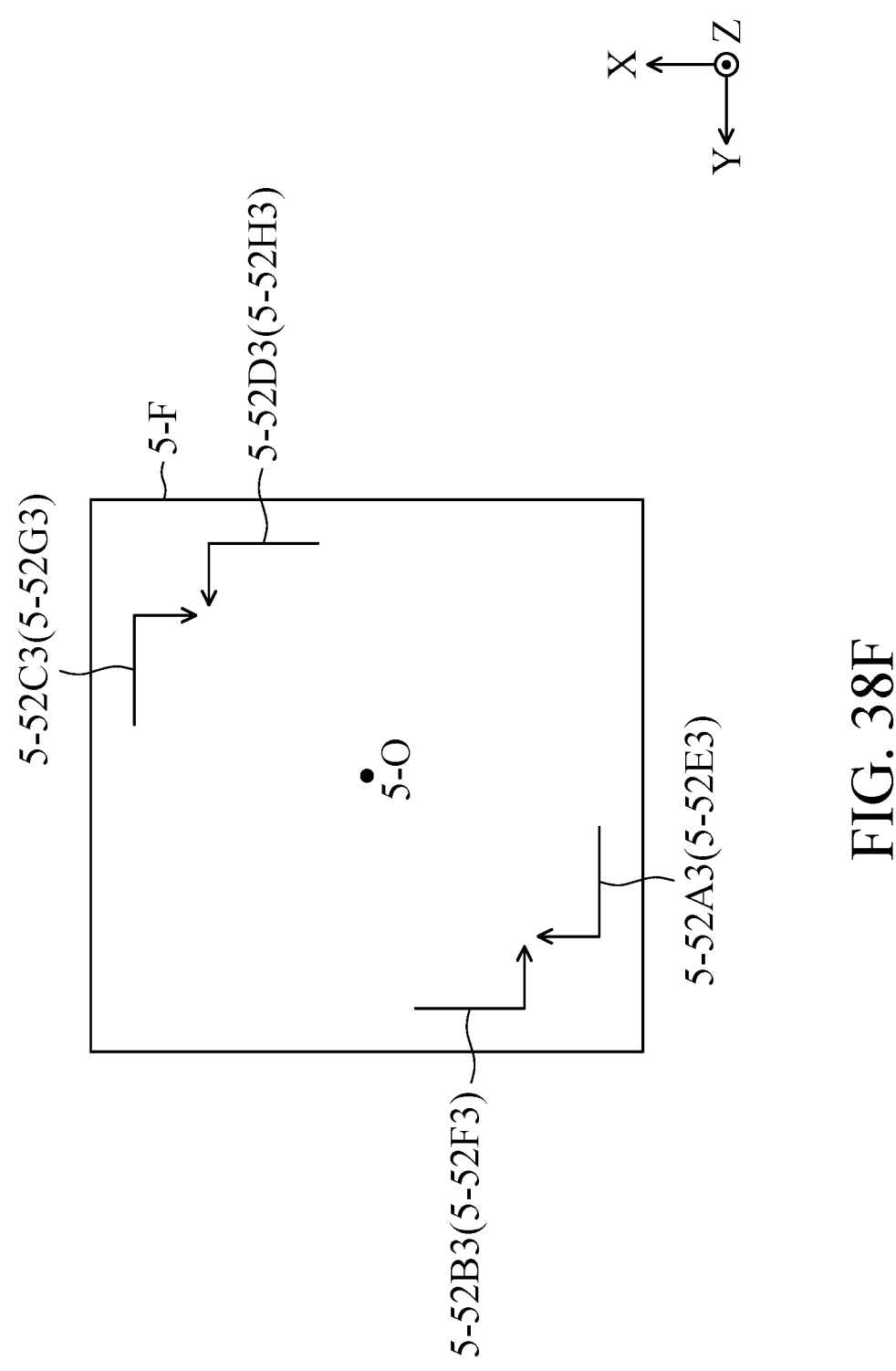
Figure 38G:
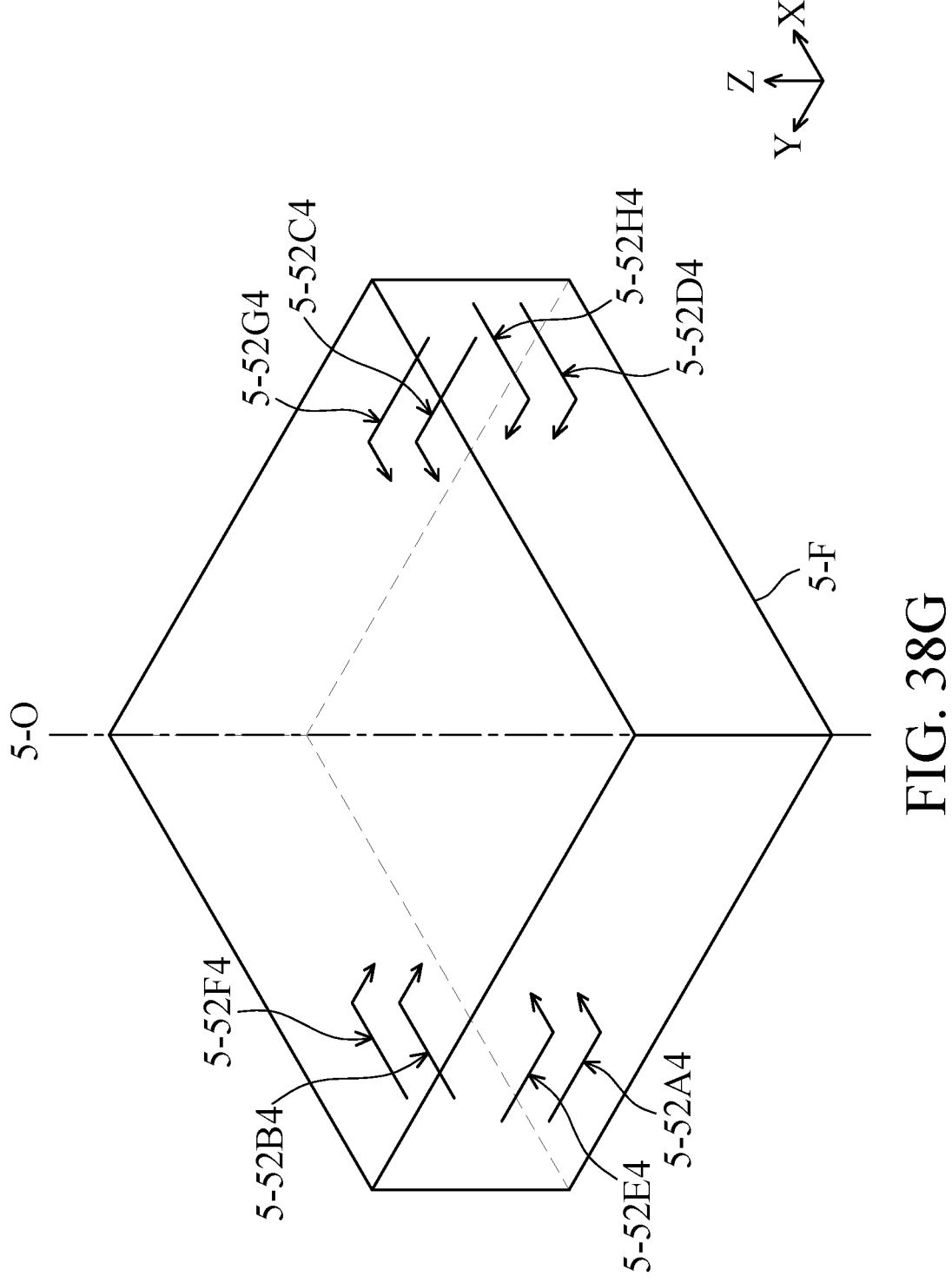
Figure 38H:
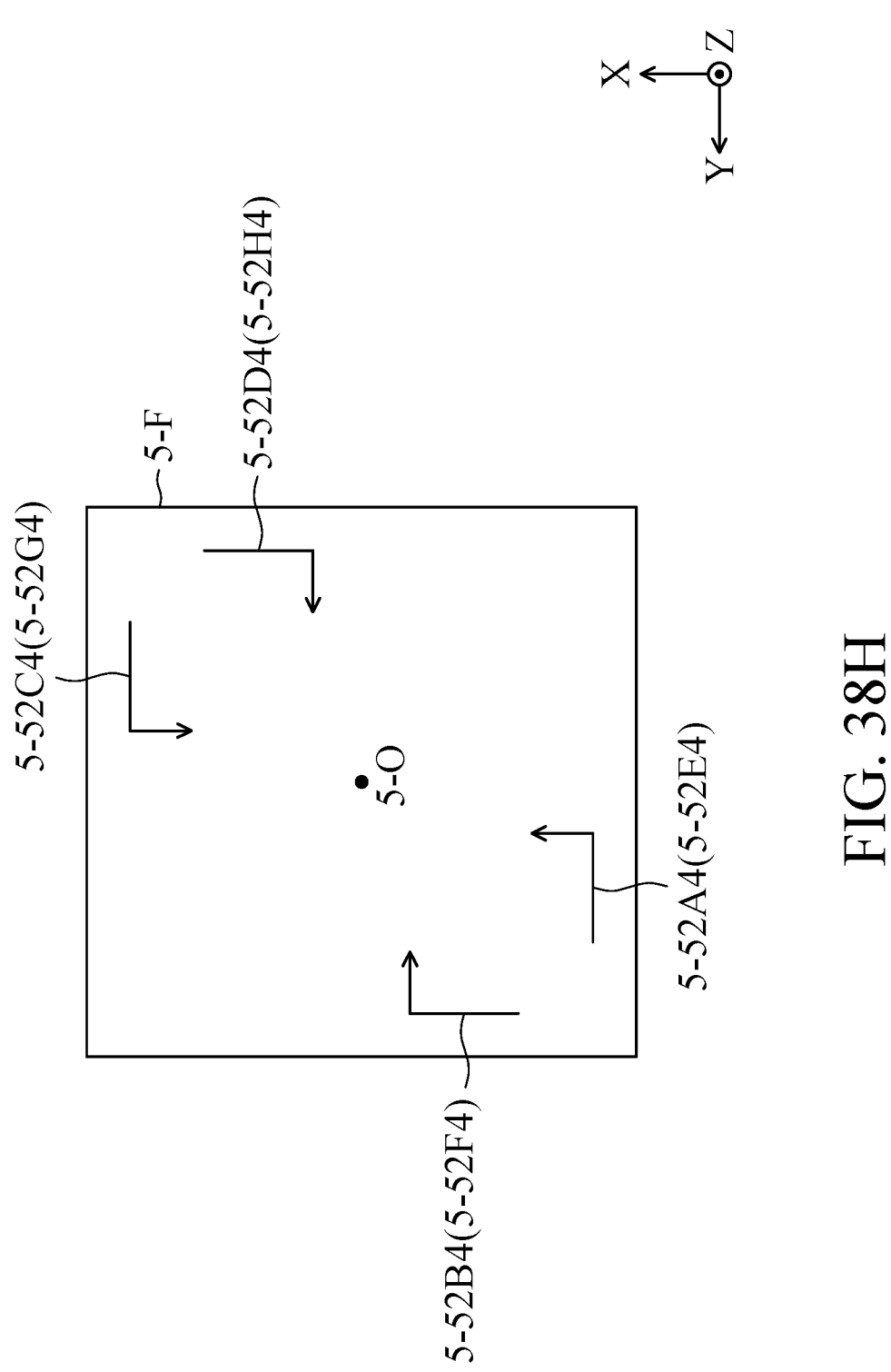
Figure 38I:
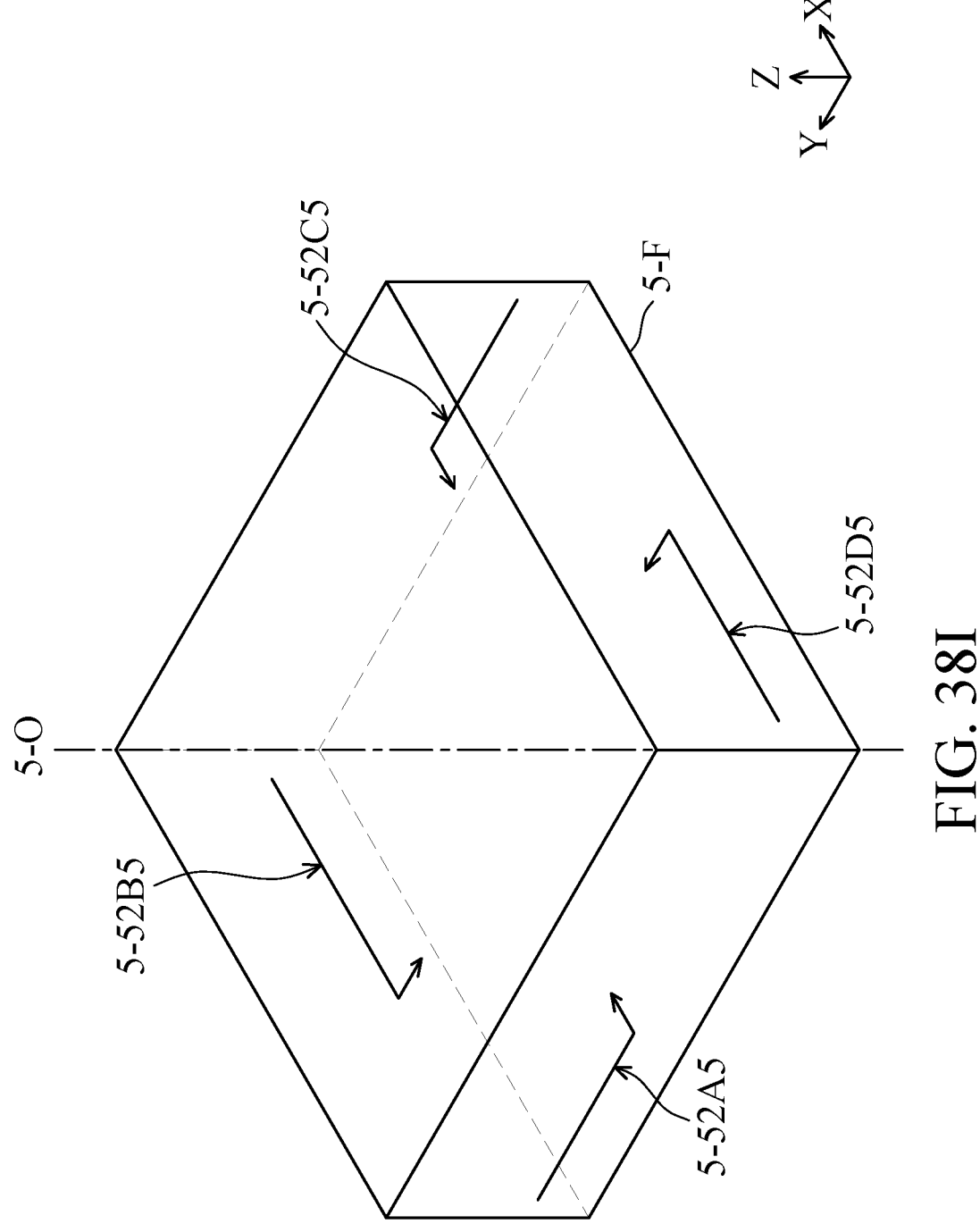
Figure 38J:
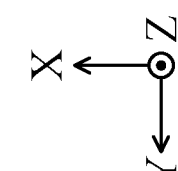
Figure 38J:
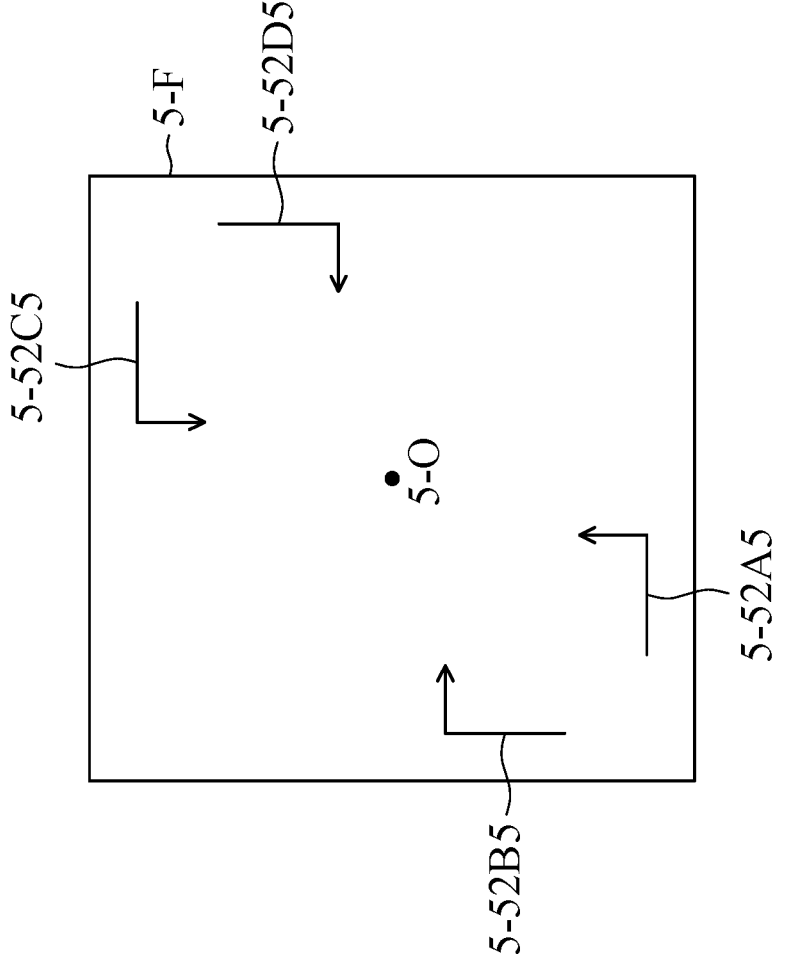
Figure 38K:
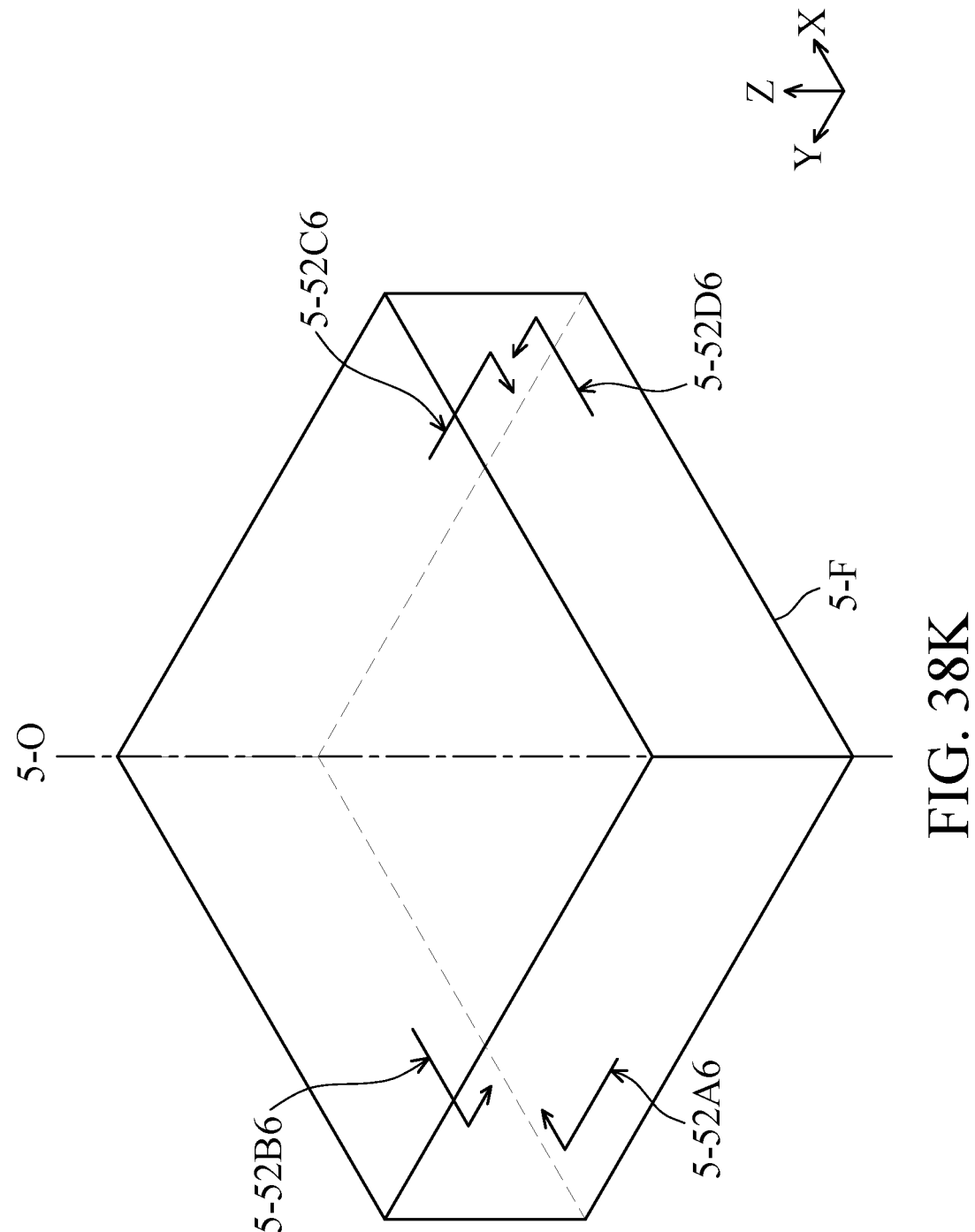
Figure 38L:
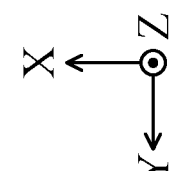
Figure 38L:
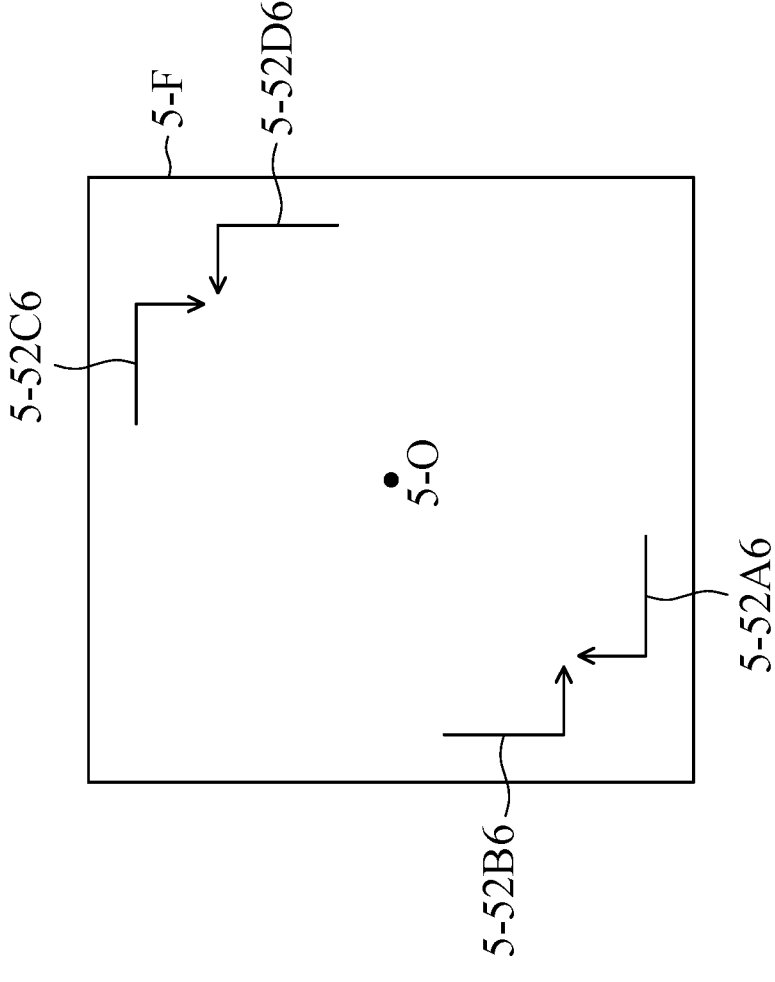
Figure 38M:
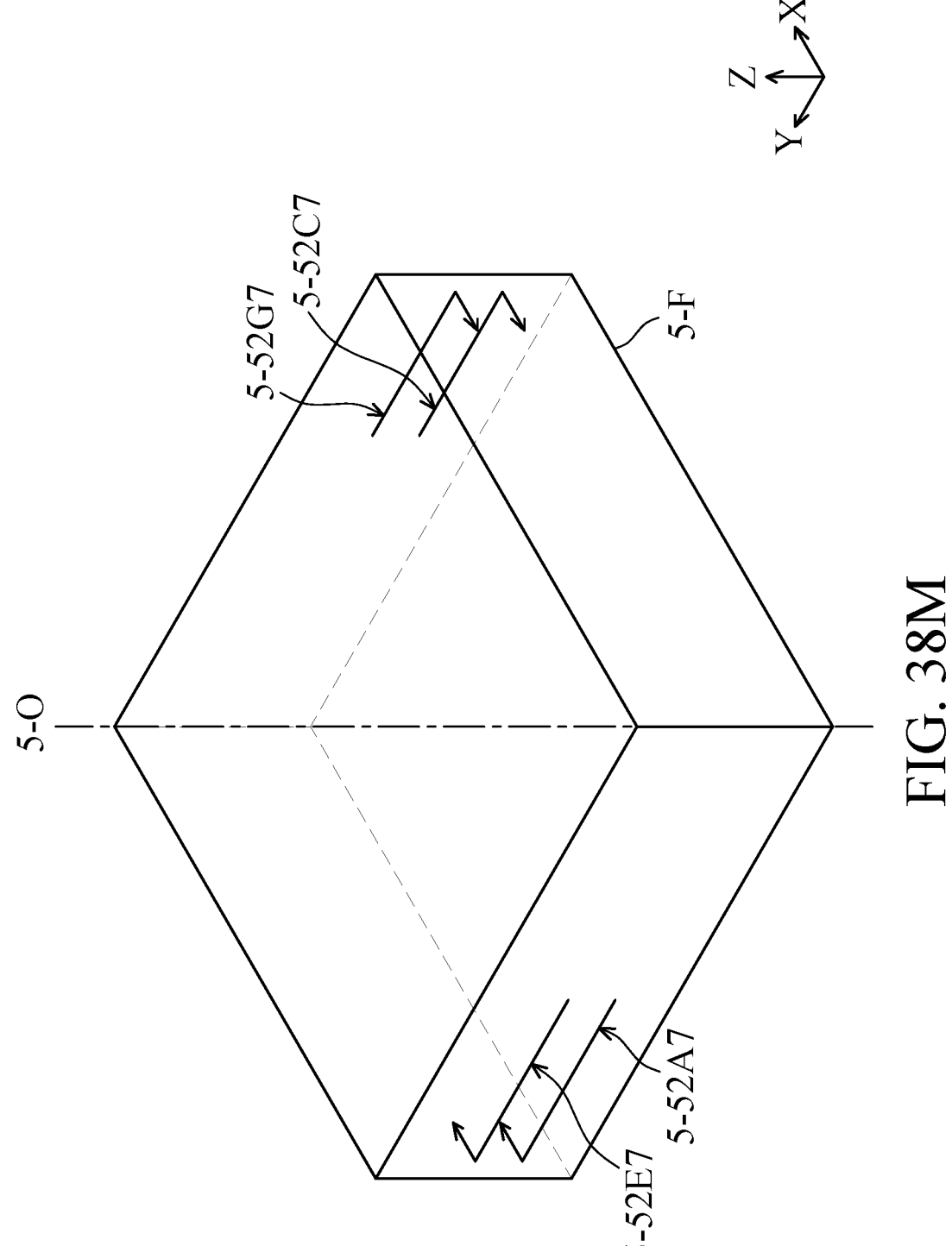
Figure 38N:
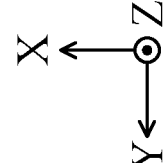
Figure 38N:
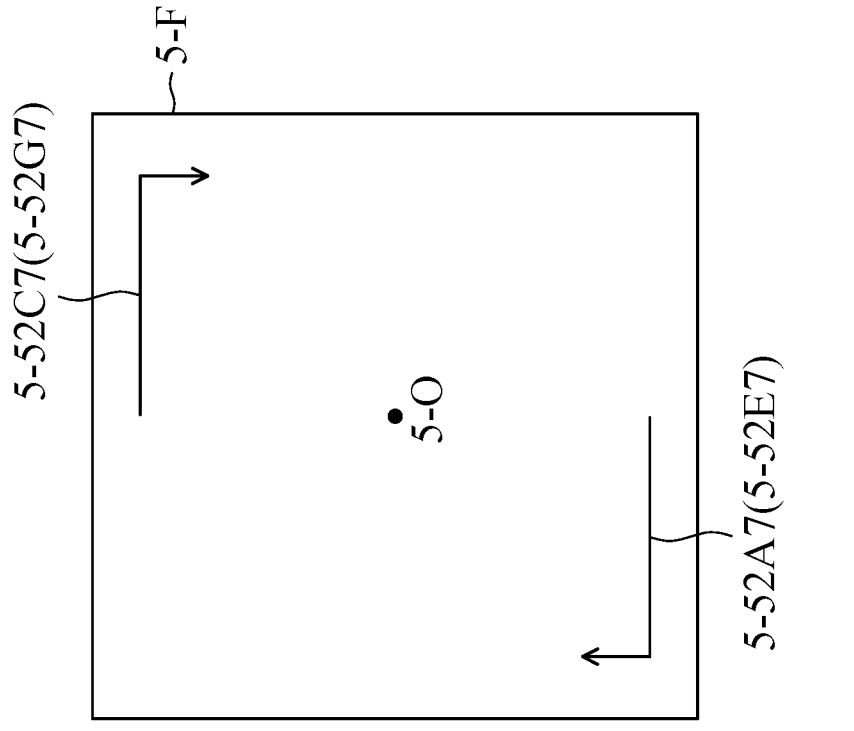

FIG. 38A to FIG. 38N are schematic views of different configurations of the driving elements in the optical element driving mechanisms 5-100A, 5-100B, 5-100C, 5-100D, 5-100E, 5-100F, and 5-100G. As shown in FIG. 38A, the driving element 5-52 is simplified as a combination of a straight line and an arrow, wherein the straight line represents the resilient unit 5-522, the arrow represents the contact unit, and other elements are omitted for clarity. The direction of the arrow means the direction of the driving force provided by the contact unit 5-525 to the frame 5-40. It should be noted that the directions of the arrows in the present embodiments are oriented to the X direction, the —X direction, the Y direction, or the Y direction for illustration, but the present disclosure is not limited thereto. The direction of the driving force may be adjusted depending on design requirement.

As shown in FIG. 38A and FIG. 38B, the optical element driving mechanism 5-100A may include driving elements 5-52A1, 5-52B1, 5-52C1, 5-52D1, 5-52E1, 5-52F1, 5-52G1, and 5-52H1. The driving elements 5-52A1, 5-52B1, 5-52C1, and 5-52D1 may position at an identical XY plane, the driving elements 5-52E1, 5-52F1, 5-52G1, and 5-52H1 may position at another XY plane, and the two XY planes are different.

In this embodiment, the driving elements 5-52A1 and 5-52E1 extend in the Y direction, the driving elements 5-52B1 and 5-52F1 extend in the −X direction, the driving elements 5-52C1 and 5-52G1 extend in the −Y direction, and the driving elements 5-52D1 and 5-52H1 extend in the X direction. Furthermore, the driving elements 5-54 (FIG. 36B) extend in a XY plane in a direction that is not parallel to the X direction and the Y direction. The driving elements 5-54 are omitted in the following embodiments for clarity, but it should be noted that the driving elements 5-54 may also be included in the following embodiments.

For description, the driving element 5-52A1 may be called as the first driving element 5-52A1, the driving element 5-52B1 may be called as the second driving element 5-52B1, the driving element 5-54 may be called as the third driving element 5-54, the driving element 5-52E1 may be called as the fourth driving element 5-52E1, the driving element 5-52F1 may be called as the fifth driving element 5-52F1, the driving element 5-52C1 may be called as the sixth driving element 5-52C1, and the driving element 5-52D1 may be called as the seventh driving element 5-52D1.

Therefore, a first driving unit (not shown, and the following driving units are not shown as well) of the first driving element 5-52A1 extends in the first direction (the X direction), and a second driving unit of the second driving element 5-52B2 extends in a second direction (the Y direction). The second driving element 5-52B1 is used for generating a second driving force to the movable portion 5-M or the fixed portion 5-F. The direction of the second driving force (the X direction) is not parallel to the second direction, and the first direction and the second direction are not parallel.

In the direction that the main axis 5-O extends, the distance between the center of the first driving element 5-52A1 (e.g. the center of the linear resilient unit 5-522) and the center of the second driving element 5-52B1 (e.g. the center of the linear resilient unit 5-522) is zero. In other words, the center of the first driving element 5-52A1 and the center of the second driving element 5-52B1 are on an identical XY plane. Therefore, in a direction that is perpendicular to the direction that the main axis 5-O extends, the first driving element 5-52A1 at least overlaps a portion of the second driving element 5-52B1, which means the first driving element 5-52A1 and the second driving element 5-52B1 have an identical height (identical on Z coordinate). When viewed in a direction that the main axis 5-O extends (FIG. 38B), the first driving element 5-52A1 does not overlap the second driving element 5-52B1. When viewed in a direction that the main axis 5-O extends, the first driving element 5-52A1 is at the first edge 5-E1 of the fixed portion 5-F. When viewed in a direction that the main axis 5-O extends, the second driving element 5-52B1 is at the second edge 5-E2 of the fixed portion 5-F.

A third driving unit of the third driving element 5-54 extends in a third direction, which is a direction on the XY plane and is not parallel to the X direction or the Y direction. The third direction is not parallel to the first direction or the second direction. The third driving element 5-54 is used to generate a third driving force to the holder 5-30 or the frame 5-40 of the movable portion 5-M, and the direction of the third driving force (the Z direction) is not parallel to the third direction.

In the direction that the main axis 5-O extends, the distance between the center of the first driving element 5-52A1 and the center of the third driving element 5-54 is not zero. In other words, the first driving element 5-52A1 and the third driving element 5-54 are not on an identical XY plane. Therefore, in a direction that is perpendicular to the direction that the main axis 5-O extends, the first driving element 5-52A1 does not overlap the third driving element 5-54, which means the first driving element 5-52A1 and the third driving element 5-54 have different heights (different on Z coordinate). When viewed in a direction that the main axis 5-O extends, the first driving element 5-52A1 does not overlap the third driving element 5-54. When viewed in a direction that the main axis 5-O extends, the third driving element 5-54 is at the first edge 5-E1, as shown in FIG. 36B.

A fourth driving unit of the fourth driving element 5-52E1 extends in a fourth direction (the Y direction). The fourth direction is parallel to the first direction, and the fourth is not parallel to the second direction and the third direction. The fourth driving element 5-52E1 is used to generate a fourth driving force to the movable portion 5-M or the fixed portion 5-F, and the direction of the fourth driving force (the X direction) is not parallel to the fourth direction.

In the direction that the main axis 5-O extends, the distance between the center of the first driving element 5-52A1 and the center of the fourth driving element 5-52E1 is not zero. In other words, the first driving element 5-52A1 and the fourth driving element 5-52E1 are not on an identical XY plane. Therefore, in a direction that is perpendicular to the direction that the main axis 5-O extends, the first driving element 5-52A1 does not overlap the fourth driving element 5-52E1, which means the first driving element 5-52A1 and the fourth driving element 5-52E1 have different heights (different on Z coordinate). When viewed in a direction that the main axis 5-O extends, the first driving element 5-52A1 overlaps at least a portion of fourth driving element 5-52E1. When viewed in a direction that the main axis 5-O extends, the fourth driving element 5-52E1 is at the first edge 5-E1.

A fifth driving unit of the fifth driving element 5-52F1 extends in a fifth direction (the X direction). The fifth direction is not parallel to the first direction, the third direction, and the fourth direction, and the fifth direction is parallel to the second direction. The fifth driving element 5-52F1 is used to generate a fifth driving force to the movable portion 5-M or the fixed portion 5-F, and the direction of the fifth driving force (the –Y direction) is not parallel to the fifth direction.

In the direction that the main axis 5-O extends, the distance between the center of the first driving element 5-52A1 and the center of the fifth driving element 5-52F1 is not zero. In other words, the first driving element 5-52A1 and the fifth driving element 5-52F1 are not on an identical XY plane. Therefore, in a direction that is perpendicular to the direction that the main axis 5-O extends, the first driving element 5-52A1 does not overlap the fifth driving element 5-52F1, which means the first driving element 5-52A1 and the fifth driving element 5-52F1 have different heights (different on Z coordinate). When viewed in a direction that the main axis 5-O extends, the first driving element 5-52A1 does not overlap the fifth driving element 5-52F1. When viewed in a direction that the main axis 5-O extends, the second driving element 5-52B1 at least overlaps a portion of the fifth driving element 5-52F1. When viewed in a direction that the main axis 5-O extends, the fifth driving element 5-52F1 is at the second edge 5-E2.

In the direction that the main axis 5-O extends, the distance between the center of the fourth driving element 5-52E1 and the center of the fifth driving element 5-52F1 is zero. In other words, the center of the fourth driving element 5-52E1 and the center of the fifth driving element 5-52F1 are on an identical XY plane. Therefore, in a direction that is perpendicular to the direction that the main axis 5-O extends, the fourth driving element 5-52E1 at least overlaps a portion of the fifth driving element 5-52F1, which means the fourth driving element 5-52E1 and the fifth driving element 5-52F1 have an identical height (identical on Z coordinate). When viewed in a direction that the main axis 5-O extends, the fourth driving element 5-52E1 does not overlap the fifth driving element 5-52F1.

A sixth driving unit of the sixth driving element 5-52C1 extends in a sixth direction (the Y direction). The sixth direction is parallel to the first direction, and the sixth direction is not parallel to the second direction and the third direction. The sixth driving element 5-52C1 is used to generate a sixth driving force to the movable portion 5-M or the fixed portion 5-F, and the direction of the sixth driving force (the –X direction) is not parallel to the sixth direction.

In the direction that the main axis 5-O extends, the distance between the center of the first driving element 5-52A1 and the center of the sixth driving element 5-52C1 is zero. In other words, the first driving element 5-52A1 and the sixth driving element 5-52C1 are on an identical XY plane. Therefore, in a direction that is perpendicular to the direction that the main axis 5-O extends, the first driving element 5-52A1 overlaps at least a portion of the sixth driving element 5-52C1, which means the first driving element 5-52A1 and the sixth driving element 5-52C1 have an identical height (identical on Z coordinate). When viewed in a direction that the main axis 5-O extends, the first driving element 5-52A1 does not overlap the sixth driving element 5-52C1. When viewed in a direction that the main axis 5-O extends, the sixth driving element 5-52F1 is at a third edge 5-E3 of the fixed portion 5-F, and the first edge 5-E1 and the third edge 5-E3 are parallel.

A seventh driving unit of the seventh driving element 5-52D1 extends in a seventh direction (the X direction). The seventh direction is parallel to the second direction, and the seventh direction is not parallel to the first direction, the third direction, and the fourth direction. The seventh driving element 5-52D1 is used to generate a seventh driving force to the movable portion 5-M or the fixed portion 5-F, and the direction of the seventh driving force (the Y direction) is not parallel to the seventh direction.

In the direction that the main axis 5-O extends, the distance between the center of the first driving element 5-52A1 and the center of the seventh driving element 5-52D1 is zero. In other words, the first driving element 5-52A1 and the seventh driving element 5-52D1 are on an identical XY plane. Therefore, in a direction that is perpendicular to the direction that the main axis 5-O extends, the first driving element 5-52A1 overlaps at least a portion of the seventh driving element 5-52D1, which means the first driving element 5-52A1 and the seventh driving element 5-52D1 have an identical height (identical on Z coordinate). When viewed in a direction that the main axis 5-O extends, the first driving element 5-52A1 does not overlap the seventh driving element 5-52D1. When viewed in a direction that the main axis 5-O extends, the seventh driving element 5-52D1 is at a fourth edge 5-E4 of the fixed portion 5-F. The first edge 5-E1 is not parallel to the fourth edge 5-E4, and the second edge is parallel to the fourth edge 5-E4.

In this embodiment, the driving elements 5-52A1 and 5-52E1 may provide driving forces to the frame 5-40 in the X direction, the driving elements 5-52B1 and 5-52F1 may provide driving forces to the frame 5-40 in the −Y direction, the driving elements 5-52C1 and 5-52G1 may provide driving forces to the frame 5-40 in the −X direction, the driving elements 5-52D1 and 5-52H1 may provide driving forces to the frame 5-40 in the Y direction. Therefore, the frame 5-40 may be driven by the driving elements 5-52A1, 5-52B1, 5-52C1, 5-52D1, 5-52E1, 5-52F1, 5-52G1, and 5-52H1 in the X direction or the Y direction relative to the fixed portion 5-F.

Moreover, the driving elements 5-52A1, 5-52B1, 5-52C1, 5-52D1, 5-52E1, 5-52F1, 5-52G1, and 5-52H1 also allows the frame 5-40 to rotate relative to the X axis or the Y axis. For example, if only the driving elements 5-52C1 and 5-52E1 provides driving forces to the frame 5-40, because the driving elements 5-52C1 and 5-52E1 are positioned on different XY planes, the total torque applied to the frame 5-40 by the driving elements 5-52C1 and 5-52E1 is not equal to zero. Therefore, the frame 5-40 may rotate relative to the Y axis.

When the driving unit 5-521 (the first driving unit) of the first driving element 5-52A1 deforms, the resilient unit 5-522 (the first resilient unit) of the first driving element 5-52A1 deforms accordingly to move the contact unit 5-525 (the first contact unit) of the first driving element 5-52A1. When viewed in a direction that the main axis 5-O extends, the main axis 5-O looks like a point. The main axis 5-O passes through the center of the case 5-10, and a connection between the main axis 5-O and the center of the first contact unit (such as the connection point between the resilient unit 5-522 and the contact unit 5-525 in FIG. 38B, and the following centers of the contact units may be defined in identical or similar manners) is not perpendicular or parallel to the first direction (the X direction).

When the driving unit 5-521 (the second driving unit) of the second driving element 5-52B1 deforms, the contact unit 5-525 (the second contact unit) of the second driving element 5-52A1 will be moved accordingly. When viewed along the main axis 5-O, a connection between the main axis 5-O and the center of the second contact unit is not perpendicular or parallel to the second direction (the X direction).

In the optical element driving mechanism 5-100A, the driving elements 5-52A1, 5-52B1, 5-52C1, and 5-52D1 may arranged as centrosymmetric to the main axis 5-O, and the driving elements 5-52E1, 5-52F1, 5-52G1, and 5-52H1 may also arranged as centrosymmetric to the main axis 5-O. Therefore, when viewed along the main axis 5-O, a connection between the main axis 5-O and the center of the contact unit 5-525 (the second contact unit) of the second driving element 5-52B1 is perpendicular to a connection between the main axis 5-O and the center of the contact unit 5-525 (the first contact unit) of the first driving element 5-52A1.

The contact unit 5-545 (the third contact unit) of the third driving element 5-54 is used to in contact with the holder 5-30 or the frame 5-40. When the driving unit 5-541 of the third driving element 5-54 deforms, the third contact unit will be moved accordingly. When viewed in the direction that the main axis 5-O extends, a connection between the main axis 5-O and the center of the contact unit 5-545 (the third contact unit) of the third driving element 5-54 is not perpendicular or parallel to the third direction (the direction that the third driving unit of the third driving element 5-54 extends). When viewed along the main axis 5-O, the connection between the main axis 5-O and the center of the third contact unit is not perpendicular or parallel to the connection between the main axis 5-O and the contact unit 5-525 (the first contact unit) of the first driving element 5-52A1.

FIG. 38C and FIG. 38D are schematic views of the optical element driving mechanism 5-100B viewed in different directions. The optical element driving mechanism 5-100B includes driving elements 5-52A2, 5-52B2, 5-52C2, 5-52D2, 5-52E2, 5-52F2, 5-52G2, and 5-52H2. The driving elements 5-52A2, 5-52B2, 5-52C2, 5-52D2 are similar to the driving elements 5-52A1, 5-52B1, 5-52C1, and 5-52D1 in the optical element driving mechanism 5-100A, and the driving elements 5-52E2, 5-52F2, 5-52G2, and 5-52H2 are respectively disposed in opposite directions to the driving elements 5-52E1, 5-52F1, 5-52G1, and 5-52H1 in the optical element driving mechanism 5-100A, which corresponds to the configuration of FIG. 37F.

The contact unit 5-525 (the fourth contact unit) of the fourth driving element 5-52E2 is used to in contact with the movable portion 5-M or the fixed portion 5-F. When the driving unit 5-522 (the fourth driving unit) of the fourth driving element 5-52E2 deforms, the fourth contact unit will be moved accordingly. When viewed along the main axis 5-O (FIG. 4D), the connection between the main axis 5-O and the center of the contact unit 5-525 (the fourth contact unit) of the fourth driving element 5-52E2 is not parallel or perpendicular to the fourth direction (the Y direction). When viewed along the main axis 5-O, the connection between the main axis 5-O and the center of the contact unit 5-525 (the fourth contact unit) of the fourth driving element 5-52E2 is not perpendicular to the connection between the main axis 5-O and the center of the contact unit 5-525 (the first contact unit) of the first driving element 5-52A2. Moreover, the driving units 5-52B2, 5-52F2, the driving units 5-52C2, 5-52G2, and the driving units 5-52D2, 5-52H2 also have similar relationships. Therefore, the driving elements 5-52A2, 5-52B2, 5-52C2, 5-52D2, 5-52E2, 5-52F2, 5-52G2, and 5-52H2 allow the movable portion 5-M to move in the X and Y directions and rotate relative to the X, Y or Z axes to improve the performance of optical image stabilization.

FIG. 38E and FIG. 38F are schematic views of the optical element driving mechanism 5-100C viewed in different directions. The optical element driving mechanism 5-100C includes driving elements 5-52A3, 5-52B3, 5-52C3, 5-52D3, 5-52E3, 5-52F3, 5-52G3 and 5-52H3. The difference between the optical element driving mechanism 5-100C and the optical element driving mechanisms 5-100A and 5-100B is that the contact units 5-525 of the driving elements 5-52A3, 5-52B3, 5-52C3, 5-52D3, 5-52E3, 5-52F3, 5-52G3 and 5-52H3 of the optical element driving mechanism 5-100C are positioned at the corners of the fixed portion 5-F. Therefore, the movable portion 5-M may be rotated by the optical element driving mechanism 5-100C relative to the main axis 5-O, and the performance of the optical image stabilization may be enhanced. Moreover, the movable portion 5-M may be rotated by the optical element driving mechanism 5-100C relative to the X or Y axes.

For example, when viewed along the main axis 5-O, the connection between the main axis 5-O and the center of the contact unit 5-525 of the driving element 5-52A3 is not perpendicular or parallel to the connection between the main axis 5-O and the center of the contact unit 5-525 of the driving element 5-52B3. Moreover, when viewed along the main axis 5-O, the driving element 5-52A3 may overlap a portion of the driving element 5-52E3 or the entire driving element 5-52E3. The driving element 5-52B3 may overlap a portion of the driving element 5-52F3 or the entire driving element 5-52F3. The driving element 5-52C3 may overlap a portion of the driving element 5-52G3 or the entire driving element 5-52G3. The driving element 5-52D3 may overlap a portion of the driving element 5-52H3 or the entire driving element 5-52H3. Therefore, required space in other directions may be reduced to achieve miniaturization.

FIG. 38G and FIG. 38H are schematic views of the optical element driving mechanism 5-100D viewed in different directions. The optical element driving mechanism 5-100D includes driving elements 5-52A4, 5-52B4, 5-52C4, 5-52D4, 5-52E4, 5-52F4, 5-52G4 and 5-52H4. The difference between the optical element driving mechanism 5-100D and the optical element driving mechanisms 5-100A, 5-100B, 5-100C is that the contact units 5-525 of the driving elements 5-52A4, 5-52B4, 5-52C4, 5-52D4, 5-52E4, 5-52F4, 5-52G4 and 5-52H4 of the optical element driving mechanism 5-100D are positioned at the sides of the fixed portion 5-F and are close to the center of the sides. Therefore, the movable portion 5-M in the optical element driving mechanism 5-100 may be moved further in the X or Y directions.

For example, when viewed along the main axis 5-O, the connection between the main axis 5-O and the center of the contact unit 5-525 of the driving element 5-52A4 is not perpendicular or parallel to the connection between the main axis 5-O and the center of the contact unit 5-525 of the driving element 5-52B4. Moreover, when viewed along the main axis 5-O, the driving element 5-52A4 may overlap a portion of the driving element 5-52E4 or the entire driving element 5-52E4. The driving element 5-52B4 may overlap a portion of the driving element 5-52F4 or the entire driving element 5-52F4. The driving element 5-52C4 may overlap a portion of the driving element 5-52G4 or the entire driving element 5-52G4. The driving element 5-52D4 may overlap a portion of the driving element 5-52H4 or the entire driving element 5-52H4. Therefore, required space in other directions may be reduced to achieve miniaturization.

FIG. 38I and FIG. 38J are schematic views of the optical element driving mechanism 5-100E viewed in different directions. The optical element driving mechanism 5-100E includes driving elements 5-52A5, 5-52B5, 5-52C5, and 5-52D5. The difference between the optical element driving mechanism 5-100E and the optical element driving mechanisms 5-100A, 5-100B, 5-100C, 5-100D is that the driving elements 5-52A5, 5-52B5, 5-52C5, and 5-52D5 of the optical element driving mechanism 5-100E only arranged as a single layer, i.e. on an identical XY plane. For example, at least two of the driving elements 5-52A5, 5-52B5, 5-52C5, and 5-52D5 overlap each other in the direction that the main axis 5-O extends. Therefore, the required number of elements in the optical element driving mechanism 5-100E may be reduced to achieve miniaturization. Furthermore, the contact units 5-525 of the driving elements 5-52A5, 5-52B5, 5-52C5, and 5-52D5 are positioned at the sides of the fixed portion 5-F and are close to the center of the sides. Therefore, the movable portion 5-M in the optical element driving mechanism 5-100 may be moved further in the X or Y directions.

FIG. 38K and FIG. 38L are schematic views of the optical element driving mechanism 5-100F viewed in different directions. The optical element driving mechanism 5-100F includes driving elements 5-52A6, 5-52B6, 5-52C6, and 5-52D6. The difference between the optical element driving mechanism 5-100F and the optical element driving mechanisms 5-100A, 5-100B, 5-100C, 5-100D is that the driving elements 5-52A6, 5-52B6, 5-52C6, and 5-52D6 of the optical element driving mechanism 5-100F only arranged as a single layer, i.e. on an identical XY plane. For example, at least two of the driving elements 5-52A6, 5-52B6, 5-52C6, and 5-52D6 overlap each other in the direction that the main axis 5-O extends. Therefore, the required number of elements in the optical element driving mechanism 5-100F may be reduced to achieve miniaturization. Furthermore, the contact units 5-525 of the driving elements 5-52A6, 5-52B6, 5-52C6, and 5-52D6 are positioned at the corners of the fixed portion 5-F. Therefore, the movable portion 5-M in the optical element driving mechanism 5-100 may be rotated further relative to the main axis 5-O to enhance the performance of optical image stabilization.

FIG. 38M and FIG. 38N are schematic views of the optical element driving mechanism 5-100G viewed in different directions. The optical element driving mechanism 5-100G includes driving elements 5-52A7, 5-52C7, 5-52E7, and 5-52G7. The difference between the optical element driving mechanism 5-100G and the optical element driving mechanisms 5-100A, 5-100B, 5-100C, 5-100D, 5-100E, and 5-100F is that the driving elements 5-52A7, 5-52C7, 5-52E7, and 5-52G7 of the optical element driving mechanism 5-100G are only positioned at two edges of the fixed portion 5-F, and are not positioned at other two edges. Therefore, the required number of elements in the optical element driving mechanism 5-100G may be reduced to achieve miniaturization. Moreover, the driving element 5-52A7 at least overlaps a portion of or the entire driving element 5-52E7, and the driving element 5-52C7 at least overlaps a portion of or the entire driving element 5-52G7. As a result, the required space in other directions may be reduced. The movable portion 5-M of the optical element driving mechanism 5-100G may be rotated relative to the X axis, the Y axis, and the main axis 5-O to enhance the performance of optical image stabilization.

Figure 39A:
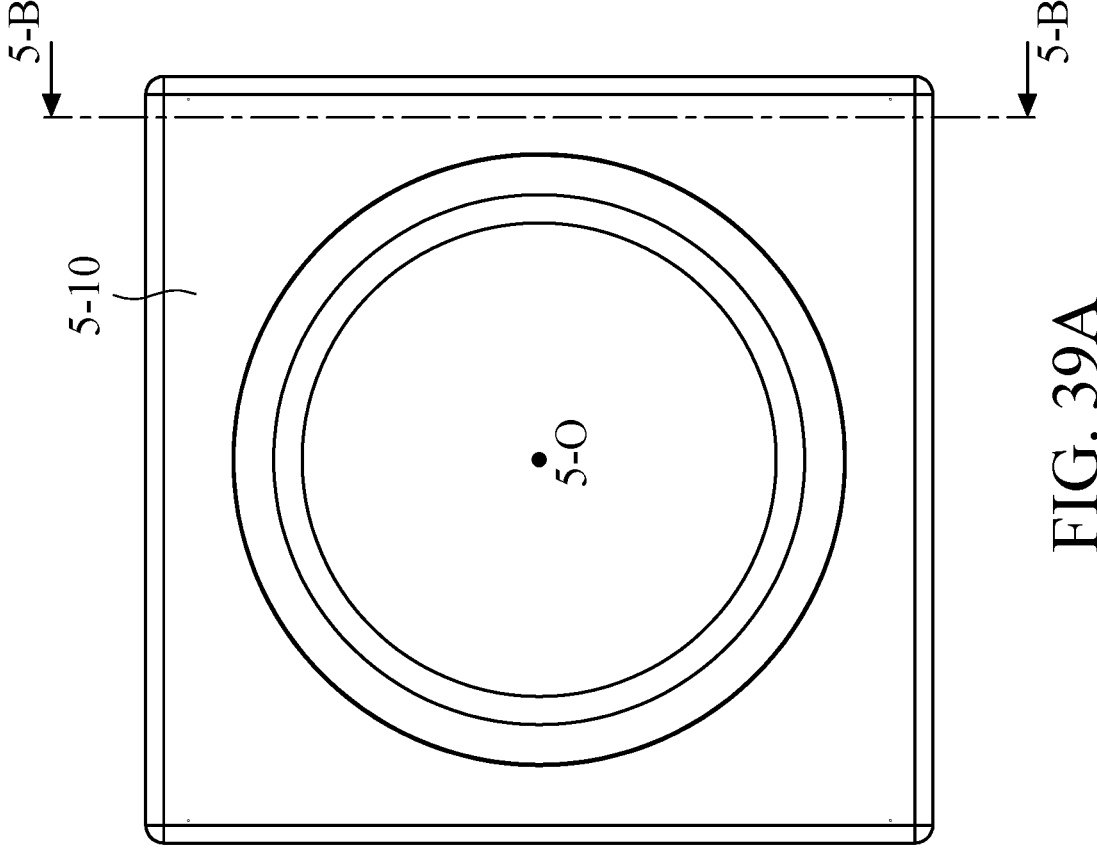
FIG. 39A is a schematic view of an optical element driving mechanism in other embodiments of the present disclosure.
Figure 39B:
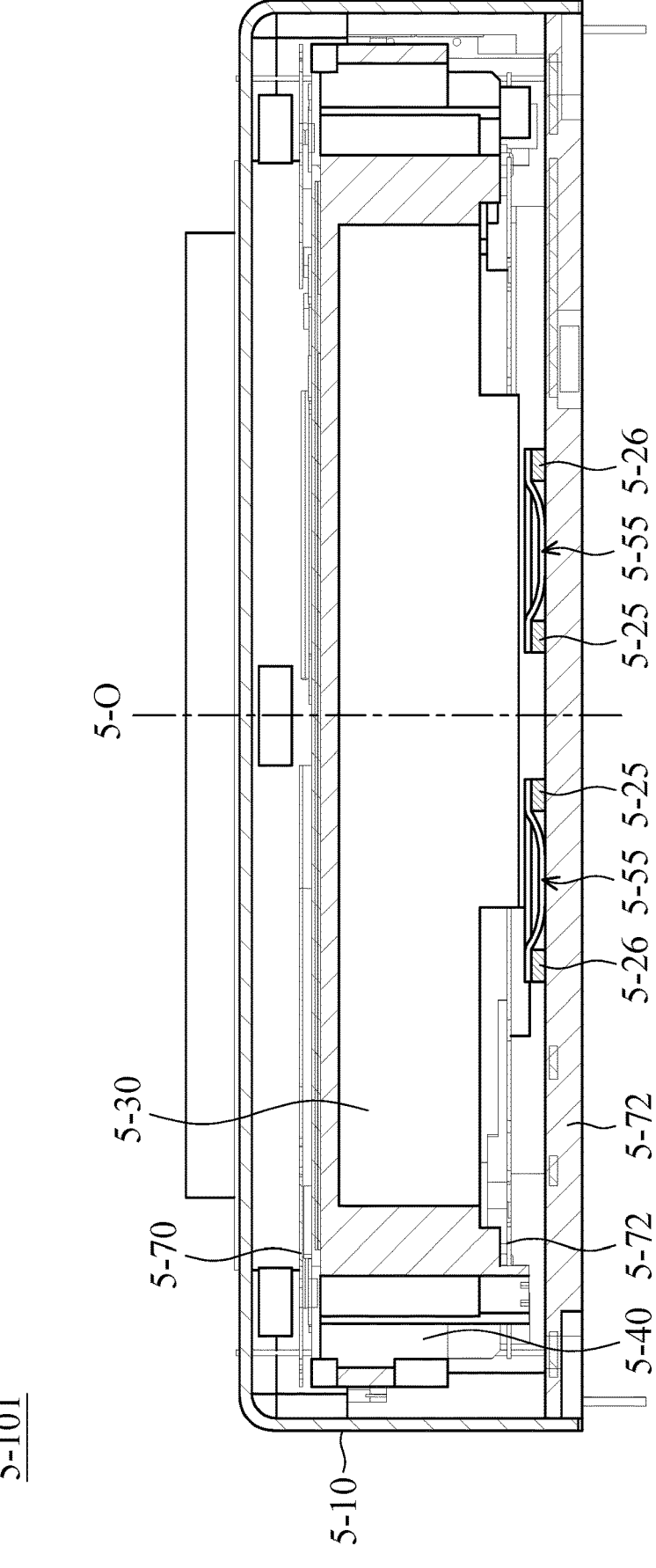
FIG. 39B is a cross-sectional view of the optical element driving mechanism illustrated along the line 5-B-5-B in FIG. 39A

FIG. 39A is a schematic view of an optical element driving mechanism 5-101 in other embodiments of the present disclosure, and FIG. 39B is a cross-sectional view of the optical element driving mechanism 5-101 illustrated along the line 5-B-5-B in FIG. 39A. As shown in FIG. 39B, the difference between the optical element driving mechanisms 5-101 and 5-100 is that the optical element driving mechanism 5-101 further includes driving elements 5-55 (eighth driving element), and the bottom 5-20 further includes protruding portions 5-25 and 5-26. The detail of the driving element 5-55 may be identical or similar to the driving elements 5-52 or 5-54, and is not repeated here.

In some embodiments, a second circuit element (not shown) may be provided in the protruding portion 5-26 to connect to the first position sensing assembly 5-S1, and an end of the driving element 5-55 (e.g. the connect unit) may be disposed on the protruding portion 5-26. Therefore, the first position sensing assembly 5-S1 may be electrically connected to the driving element 5-55. Moreover, another end of the driving element 5-55 (e.g. the contact unit) may be disposed on the protruding portion 5-25.

The driving element 5-55 may be used for in contact with the holder 5-30 or the bottom 5-20, and the driving unit of the driving element 5-55 may extend in a thirteenth direction (e.g. the X direction, or may be the Y direction as well). The thirteenth direction is not parallel to the first direction (e.g. the Y direction) and the third direction, and is parallel to the second direction (e.g. the X direction). The driving element 5-55 is used for generating an eighth driving force to the holder 5-30 or the frame 5-40. The direction of the eighth driving force may be the Z direction, and is parallel to the eleventh direction (e.g. the Z direction) and is not parallel to the thirteenth direction.

Figure 39C:
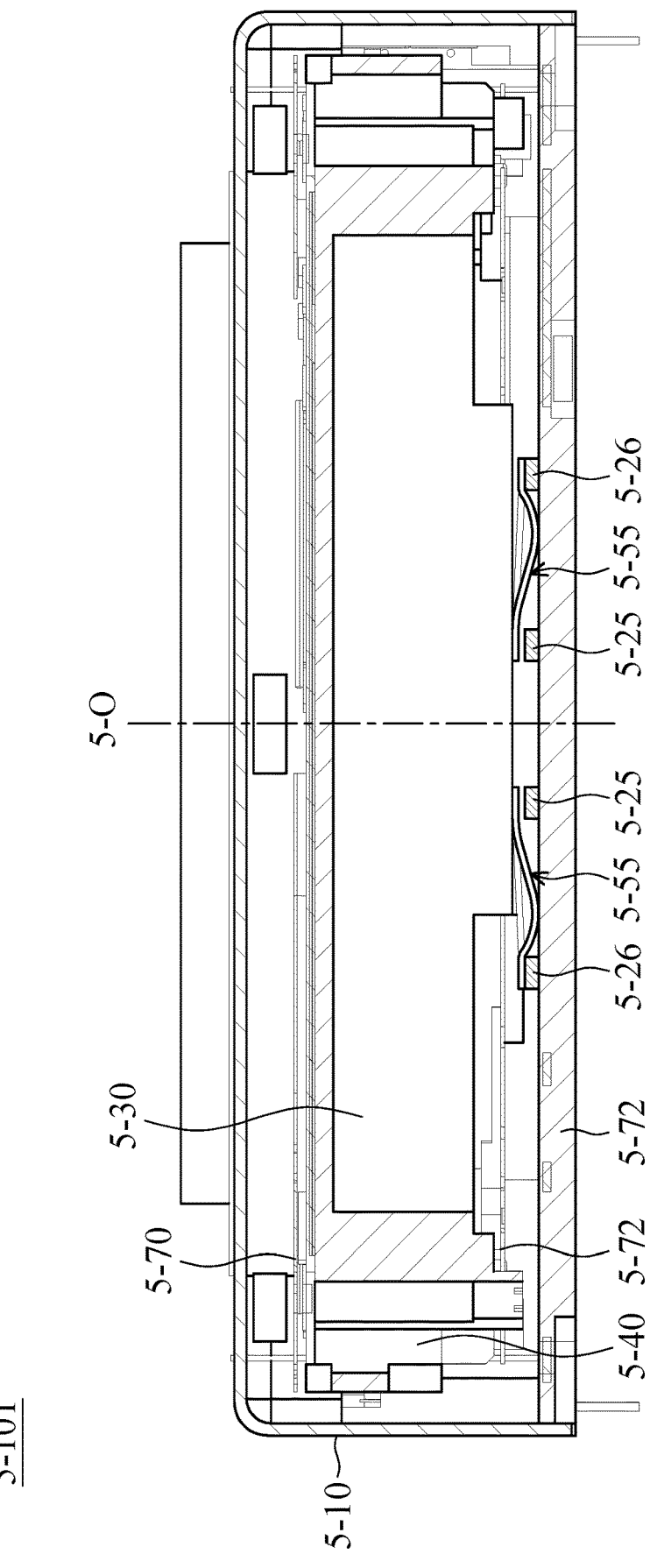
FIG. 39C is a schematic view when the driving element is operating.

FIG. 39C is a schematic view when the driving element 5-55 is operating. An end of the driving element 5-55 will be affixed on the protruding portion 5-26, and another end of the driving element 5-55 that is disposed on the protruding portion 5-25 will leave the protruding portion 5-25 to be in contact with the holder 5-30 (or may in contact with the frame 5-40 as well). Therefore, the movable portion 5-M and the optical element disposed therein will be moved along the main axis 5-O to achieve auto focus.

Figure 40A:
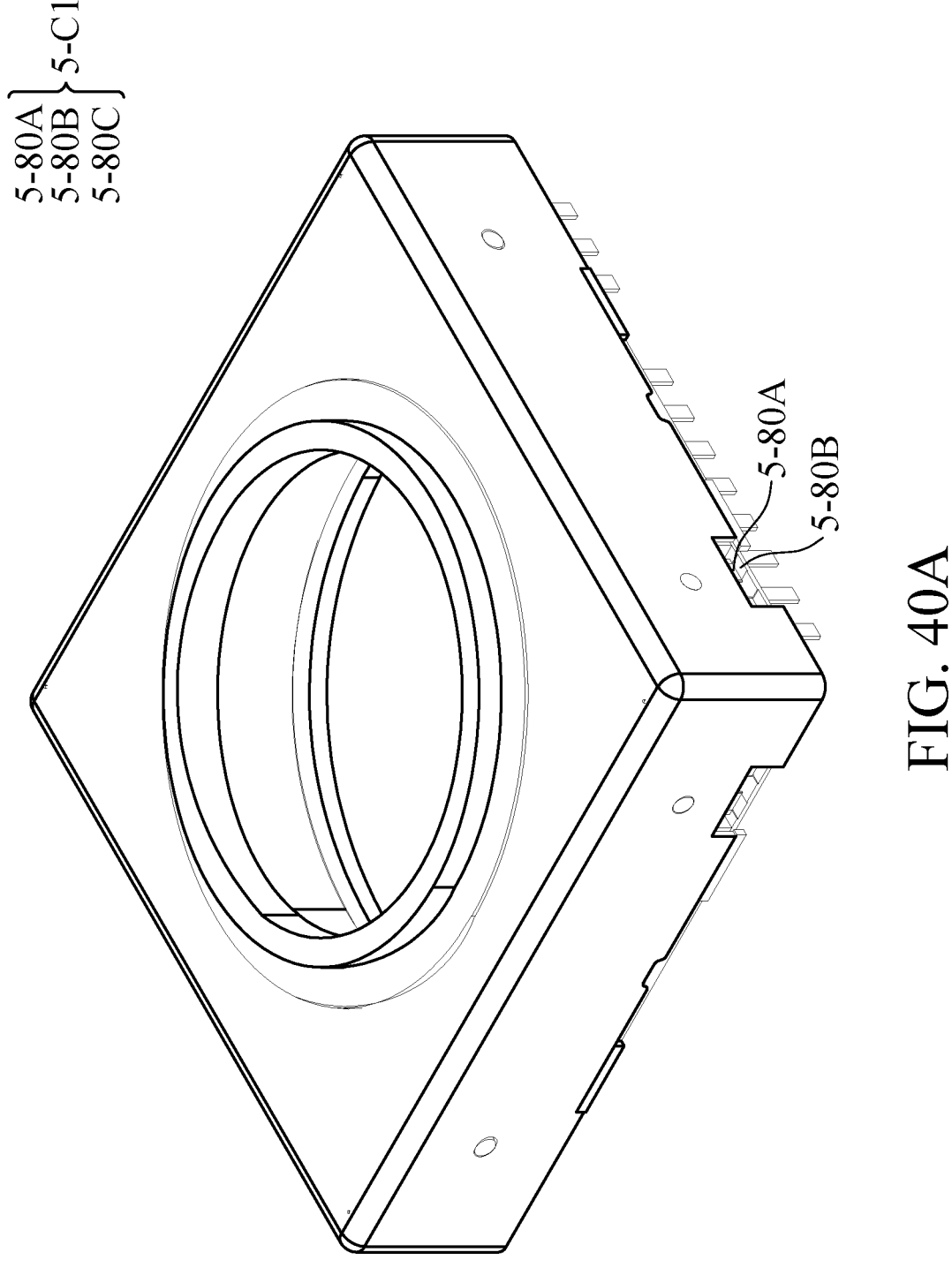
FIG. 40A and FIG. 40B are schematic views of an optical element driving mechanism in other embodiments of the present disclosure.
Figure 40B:
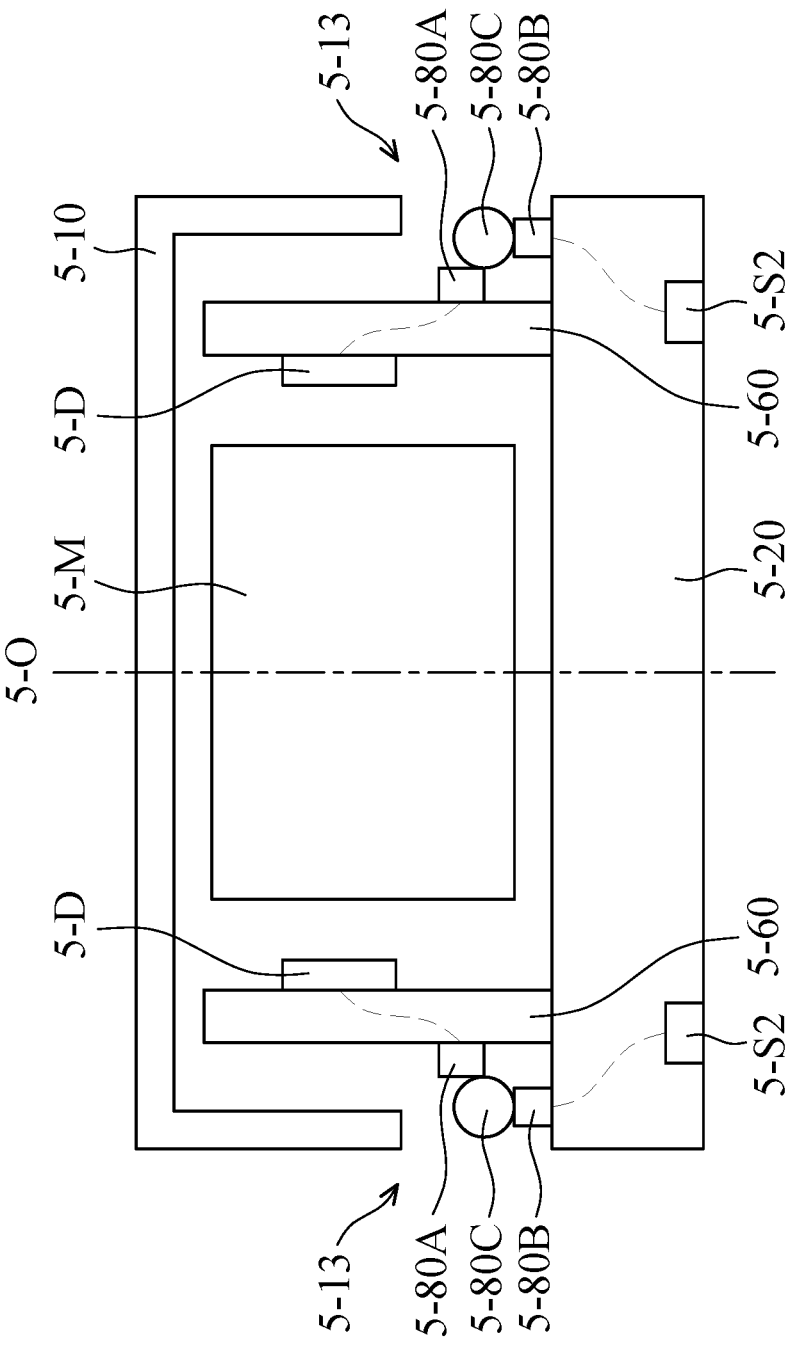

FIG. 40A and FIG. 40B are schematic views of an optical element driving mechanism 5-102 in other embodiments of the present disclosure. The structure of the optical element driving mechanism 5-102 may be substantially similar to the optical element driving mechanism 5-100, and will not be repeated here. The difference is that the optical element driving mechanism 5-102 includes a circuit assembly 5-C1, the circuit assembly 5-C1 may include a first circuit element 5-80A, a second circuit element 5-80B, and a third circuit element 5-80C. The first circuit element 5-80A may be disposed on the base unit 5-60 and may be connected to the driving assembly 5-D, and the second circuit element 5-80B may be disposed on the bottom 5-20.

As shown in FIG. 40A and FIG. 40B, the first circuit element 5-80A may include a first connecting surface, the second circuit element 5-80B may include a second connecting surface, and the first connecting surface and the second connecting surface may be exposed from the fixed portion 5-F, such as exposed from the opening 5-13 of the case 5-10. It should be noted that as shown in FIG. 40B, the first circuit element 5-80C may be disposed on the first connecting surface and the second connecting surface, such as in direct contact with the first connecting surface and the second connecting surface to connect the first circuit element 5-80A and the second circuit element 5-80B. The third circuit element 5-80C may be conductive material, such as a solder ball, conductive adhesive, etc., but it is not limited thereto.

It should be noted that as shown in FIG. 40B, the first connecting surface and the second connecting surface are the surfaces of the first circuit element 5-80A and the second circuit element 5-80B that are in contact with the third circuit element 5-80C, respectively. In some embodiments, the first connecting surface is parallel to the main axis 5-O, and the second connecting surface is not parallel to the main axis 5-O. For example, the second connecting surface may be perpendicular to the main axis 5-O. Moreover, the first connecting surface and the second connecting surface are not parallel, such as the first connecting surface may be perpendicular to the second connecting surface.

In some embodiments, the second circuit element 5-80B may include an extending circuit, such as the dashed line in the bottom 5-20. The extending circuit is disposed in the bottom 5-20 and passes through the bottom 5-20, and connects to the first position sensing assembly 5-S1. Therefore, the driving assembly 5-D and the first position sensing assembly 5-S1 are electrically connected, and the driving assembly 5-D may be controlled by the signal detected by the first position sensing assembly 5-S1.

Figure 40C:
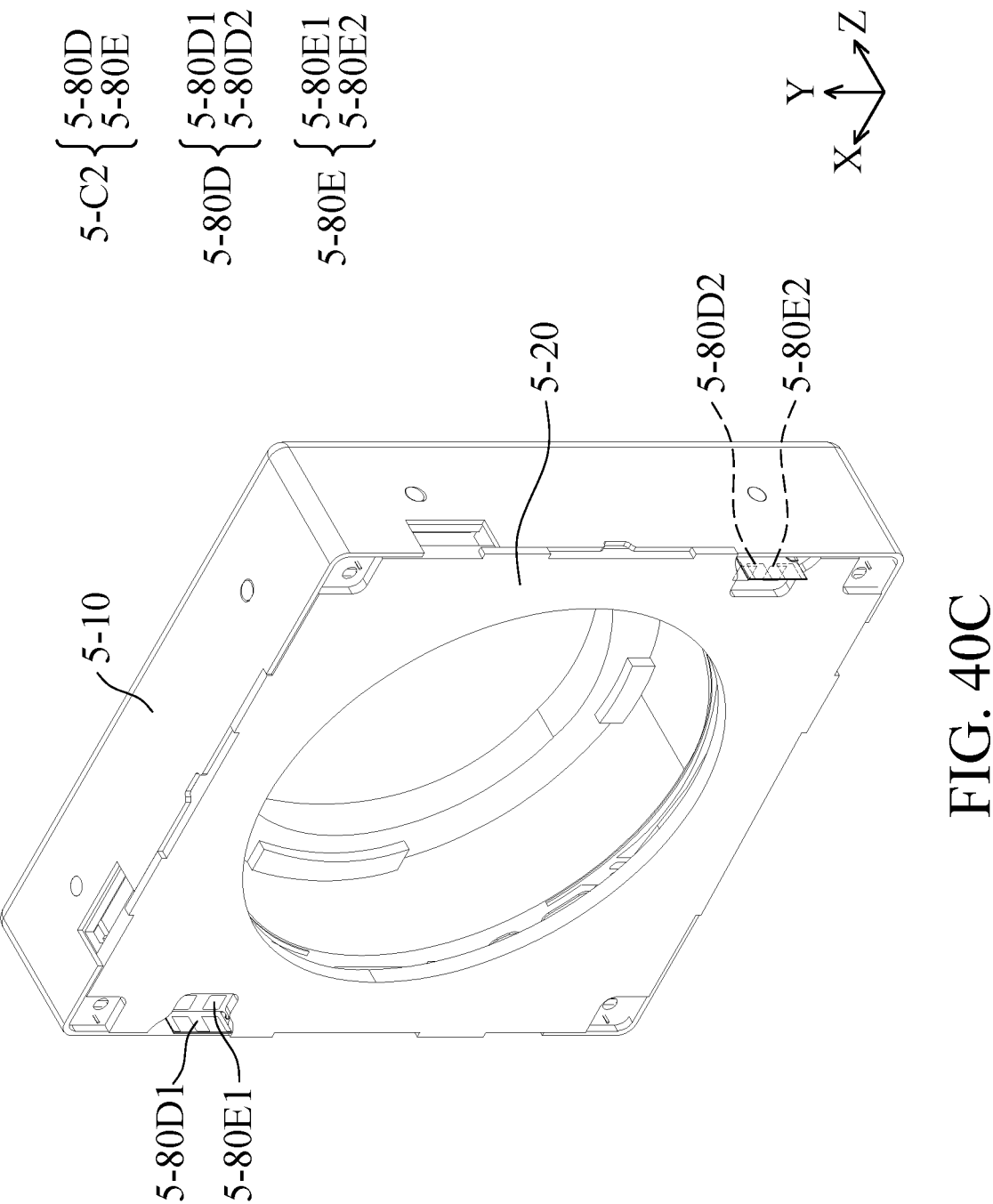
FIG. 40C, FIG. 40D, and FIG. 40E are schematic views of an optical element driving mechanism in other embodiments of the present disclosure.
Figure 40D:
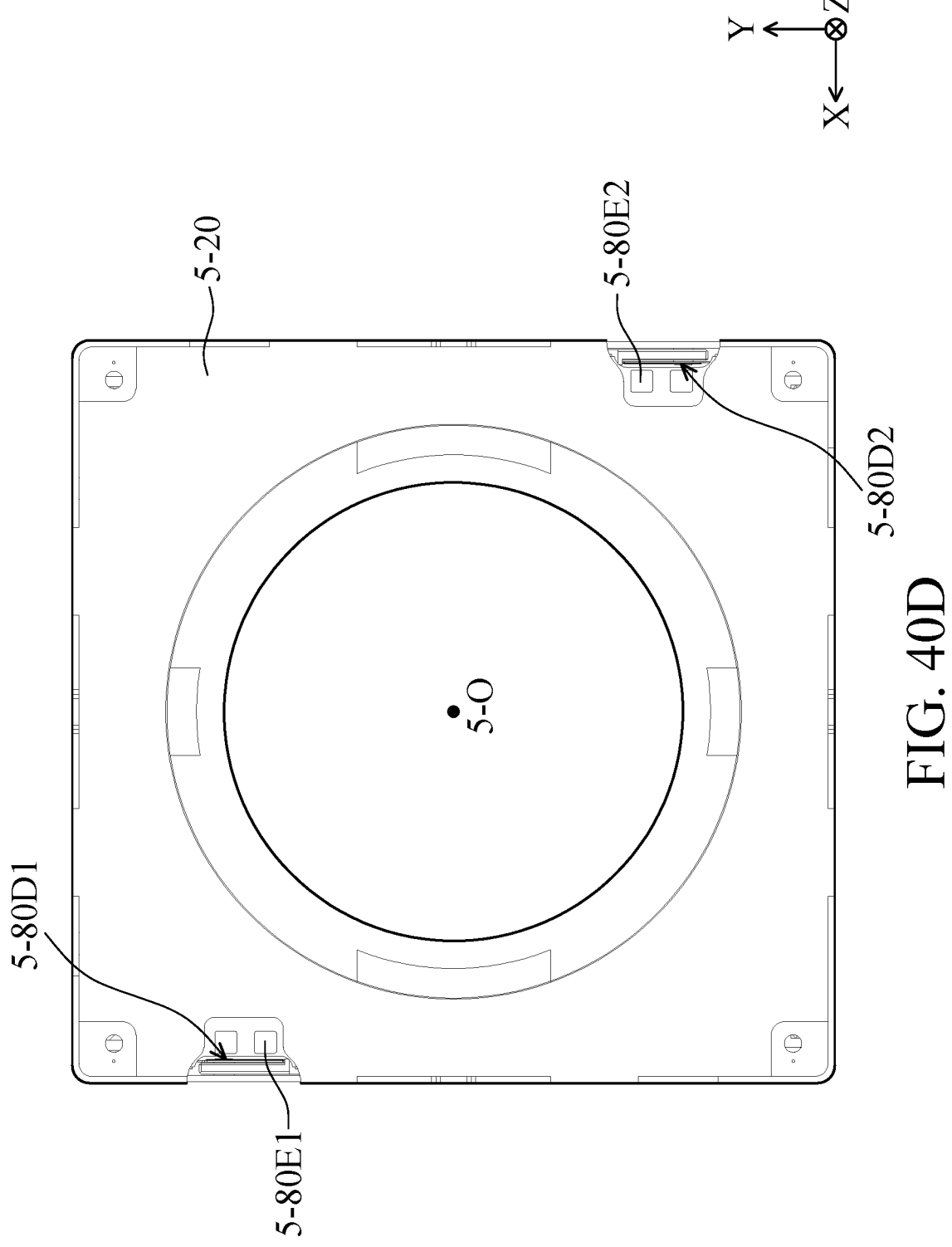
Figure 40E:
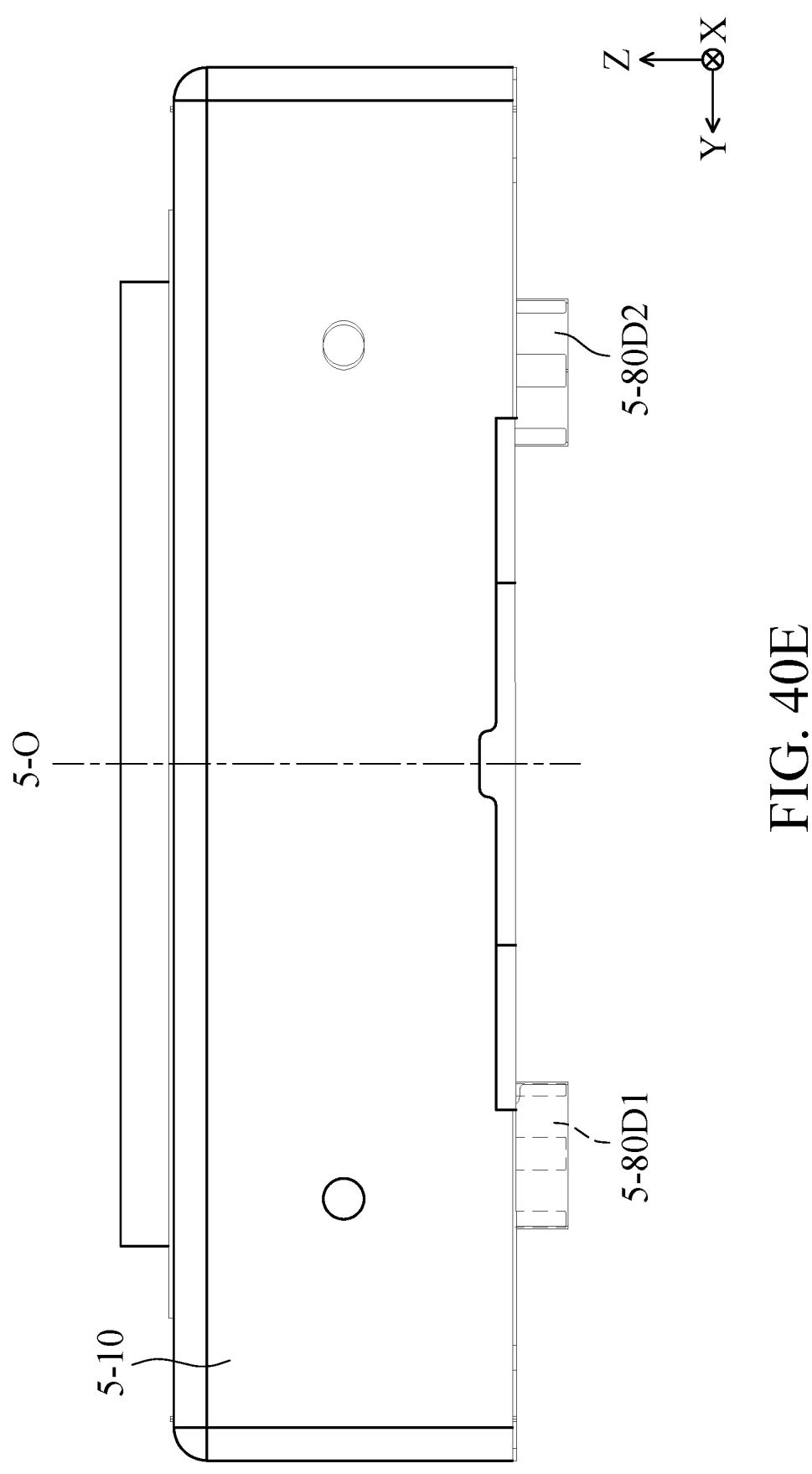

FIG. 40C, FIG. 40D, and FIG. 40E are schematic views of an optical element driving mechanism 5-103 in other embodiments of the present disclosure. The optical element driving mechanism 5-103 may be similar to the optical element driving mechanism 5-102, and the difference is that the circuit assembly 5-C2 of the optical element driving mechanism 5-103 may include a fourth circuit element 5-80D and a fifth circuit element 5-80E, and other similar elements are not repeated here.

The fourth circuit element 5-80D may be disposed on the base unit 5-60 to connect to the driving assembly 5-D. The fifth circuit element 5-80E may be disposed on the bottom 5-20. The fourth circuit element 5-80D may include a third connecting surface 5-80D1 and a fourth connecting surface 5-80D2 exposed from the fixed portion 5-F. The fifth circuit element 5-80E may include a fifth connecting surface 5-80E1 and a sixth connecting surface 5-80E2 exposed from the fixed portion 5-F, such as exposed from the bottom 5-20.

It should be noted that the third connecting surface 5-80D1 is parallel to the main axis 5-O, the fourth connecting surface 5-80D2 is parallel to the main axis 5-O, the fifth connecting surface 5-80E1 is not parallel to the main axis 5-O, such as the fifth connecting surface 5-80E1 may be perpendicular to the main axis 5-O. Moreover, the sixth connecting surface 5-80E2 is not parallel to the main axis, such as the sixth connecting surface 5-80E2 may be perpendicular to the main axis. In some embodiments, the third connecting surface 5-80D1 and the fourth connecting surface 5-80D2 may face different directions, such as may face opposite directions. The fifth connecting surface 5-80E1 and the sixth connecting surface 5-80E2 may face an identical direction. In some embodiments, as shown in FIG. 40E, the projection of the third connecting surface 5-80D1 does not overlap the projection of the fourth connecting surface 5-80D2 in the vertical direction of the third connecting surface 5-80D1.

In some embodiments, the circuit assembly 5-D2 may further include a sixth circuit element and a seventh circuit element (not shown). The structure and material of the sixth circuit element and the seventh circuit element may be similar or identical to that of the third circuit element 5-80C. The sixth circuit element may be used for connecting the third connecting surface 5-80D1 and the fifth connecting surface 5-80E1, such as disposed on the third connecting surface 5-80D1 and the fifth connecting surface 5-80E1 and in direct contact with the third connecting surface 5-80D1 and the fifth connecting surface 5-80E1. Therefore, the fourth circuit element 5-80D and the fifth circuit element 5-80E may be electrically connected. Moreover, the seventh circuit element may be used for connecting the fourth connecting surface 5-80D2 and the sixth connecting surface 5-80E2, such as disposed on the fourth connecting surface 5-80D2 and the sixth connecting surface 5-80E2 and in direct contact with the fourth connecting surface 5-80D2 and the sixth connecting surface 5-80E2. Therefore, the fourth circuit element 5-80D and the fifth circuit element 5-80E may be electrically connected.

In summary, an optical element driving mechanism is provided in some embodiments of the present disclosure. The optical element driving mechanism includes a movable portion, a fixed portion, a driving assembly, and a stopping assembly. The movable portion is used to hold an optical element, and is movable relative to the fixed portion. The driving assembly is used to drive the movable portion to move relative to the fixed portion. The stopping assembly is used to limit the movable portion to move in a maximum movable range relative to the fixed portion.

Figure 41:
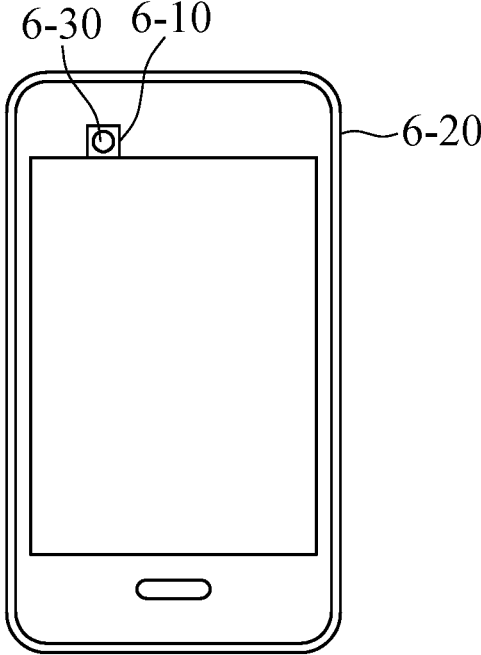
FIG. 41 is a schematic diagram of an electronic device according to an embodiment of the invention.
Figure 41:
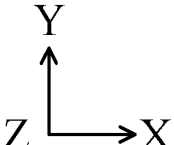

Referring to FIG. 41, in an embodiment of the invention, an optical member driving mechanism 6-10 can be disposed in an electronic device 6-20 and used to hold and drive an optical member 6-30, so that the optical member 6-30 can move relative to an image sensor (not shown) in the electronic device 6-20, and the purpose of focus and/or zoom can be achieved. For example, the electronic device 6-20 can be a smartphone, a laptop computer, or a digital camera, and the optical member 6-30 can be a lens.

Figure 42:
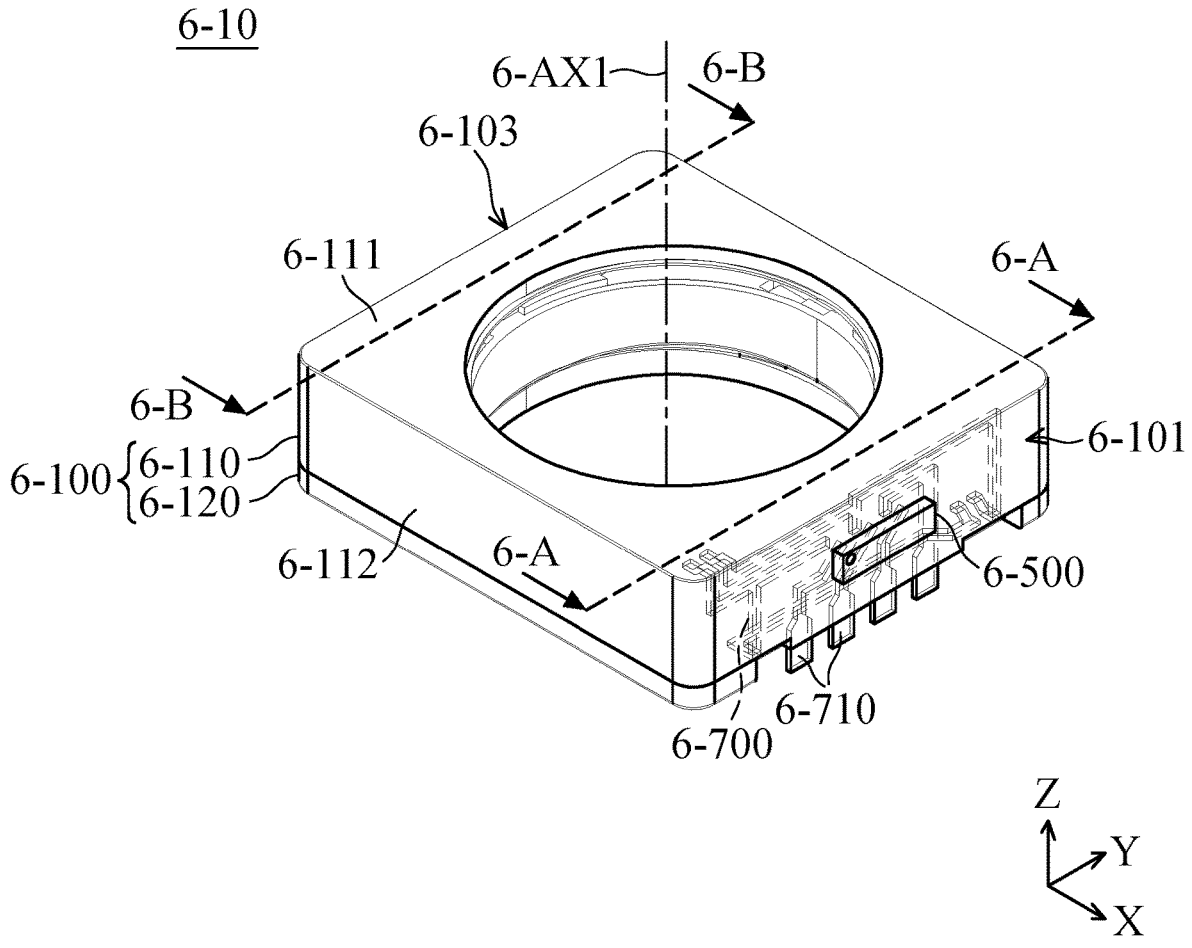
FIG. 42 is a schematic diagram of an optical member driving mechanism according to an embodiment of the invention.
Figure 43:
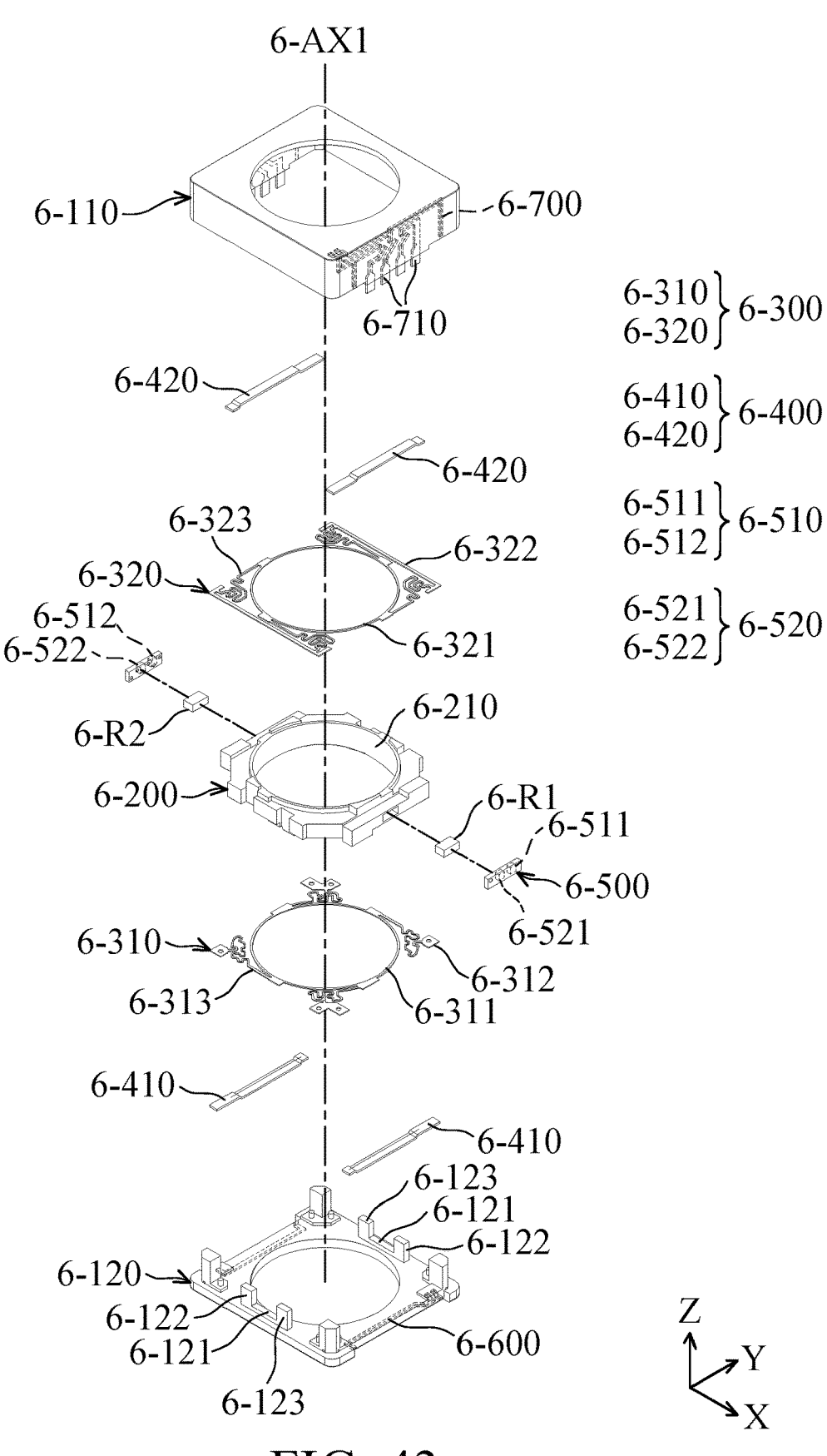
FIG. 43 is an exploded-view diagram of the optical member driving mechanism according to an embodiment of the invention.

FIG. 42 is a schematic diagram of the aforementioned optical member driving mechanism 6-10, and FIG. 43 is an exploded-view diagram of the optical member driving mechanism 6-10. As shown in FIG. 42 and FIG. 43, the optical member driving mechanism 6-10 primarily includes a fixed portion 6-100, a movable portion 6-200, a supporting assembly 6-300, a driving assembly 6-400, a control assembly 6-500, a first circuit 6-600, and a second circuit 6-700.

The fixed portion 6-100 includes a frame 6-110 and a base 6-120. The frame 6-110 and the base 6-120 can be arranged along the main axis 6-AX1 of the optical member driving mechanism 6-10 and engaged with each other to form a hollow box. The movable portion 6-200, the supporting assembly 6-300, and the driving assembly 6-400 can be accommodated in the hollow box. The first circuit 6-600 and the second circuit 6-700 are respectively embedded in the base 6-120 and the frame 6-110.

The frame 6-110 has a top wall 6-111 and a lateral wall 6-112. The top wall 6-111 is perpendicular to the main axis 6-AX1, and the lateral wall 6-112 extends from the edge of the top wall 6-111 along the main axis 6-AX1. In this embodiment, the second circuit 6-700 is embedded in both the top wall 6-111 and the lateral wall 6-112. Furthermore, the second circuit 6-700 includes at least one outward contact 6-710. The outward contact 6-710 is exposed from the top wall 6-111 or the lateral wall 6-112, so as to electrically connect an external circuit. In this embodiment, the outward contact 6-710 extends along the main axis 6-AX1 and is exposed at the lower portion of the lateral wall 6-112 of the frame 6-110 (adjacent to the base 6-120).

The movable portion 6-200 can be an optical member holder, and the optical member 6-30 can be affixed to a through hole 6-210 of the optical member holder. The movable portion 6-200 can be hung in the hollow box by the supporting assembly 6-300. In detail, the supporting assembly 6-300 includes a first elastic member 6-310 and a second elastic member 6-320. The first elastic member 6-310 is disposed between the movable portion 6-200 and the base 6-120, and includes an inner section 6-311, an outer section 6-312, and at least one string section 6-313. The inner section 6-311 and the outer section 6-312 are respectively affixed to the lower surface of the optical member holder and the base 6-120, and the string section 6-313 connects the inner section 6-311 to the outer section 6-312. The second elastic member 6-320 is disposed between the movable portion 6-200 and the top wall 6-111, and includes an inner section 6-321, an outer section 6-322, and at least one string section 6-323. The inner section 6-321 and the outer section 6-322 are respectively affixed to the upper surface of the optical member holder and the frame 6-110, and the string section 6-323 connects the inner section 6-321 to the outer section 6-322. Therefore, the first and second elastic member 6-310 and 6-320 can provide elastic force to hang the movable portion 6-200 in the hollow box.

Figure 44:
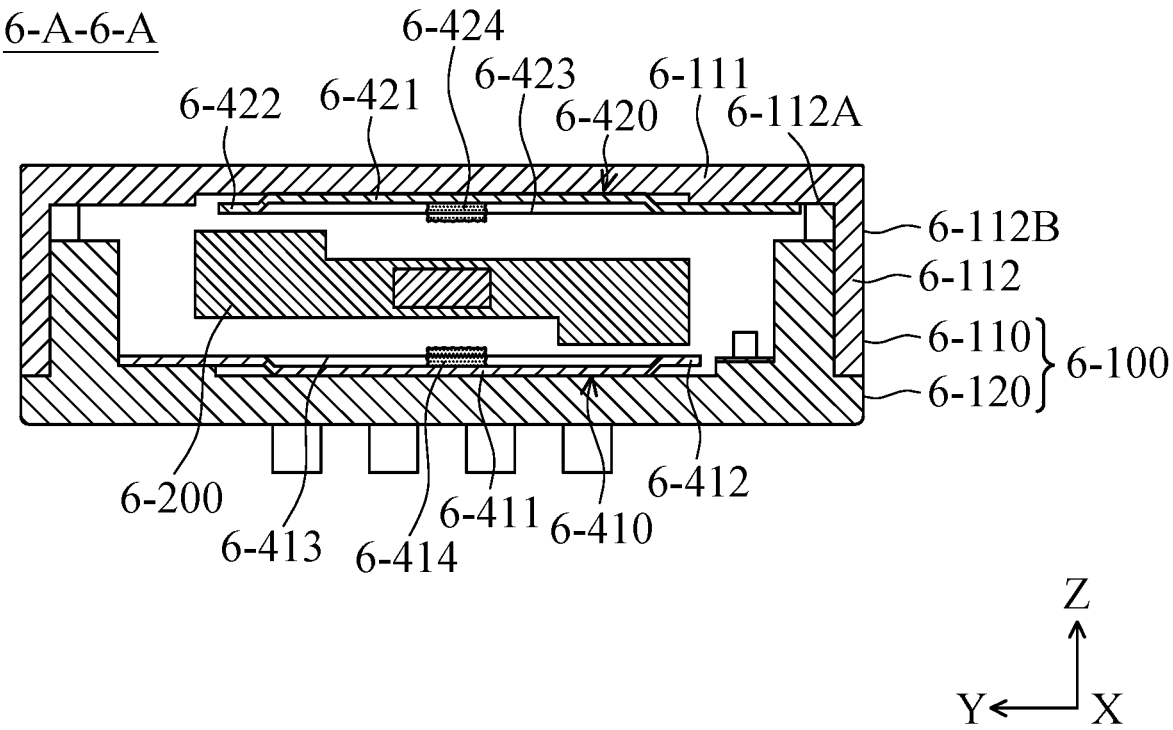
FIG. 44 is a cross-sectional view along line 6-A-6-A in FIG. 42, wherein a movable portion is in a first position.
Figure 45:
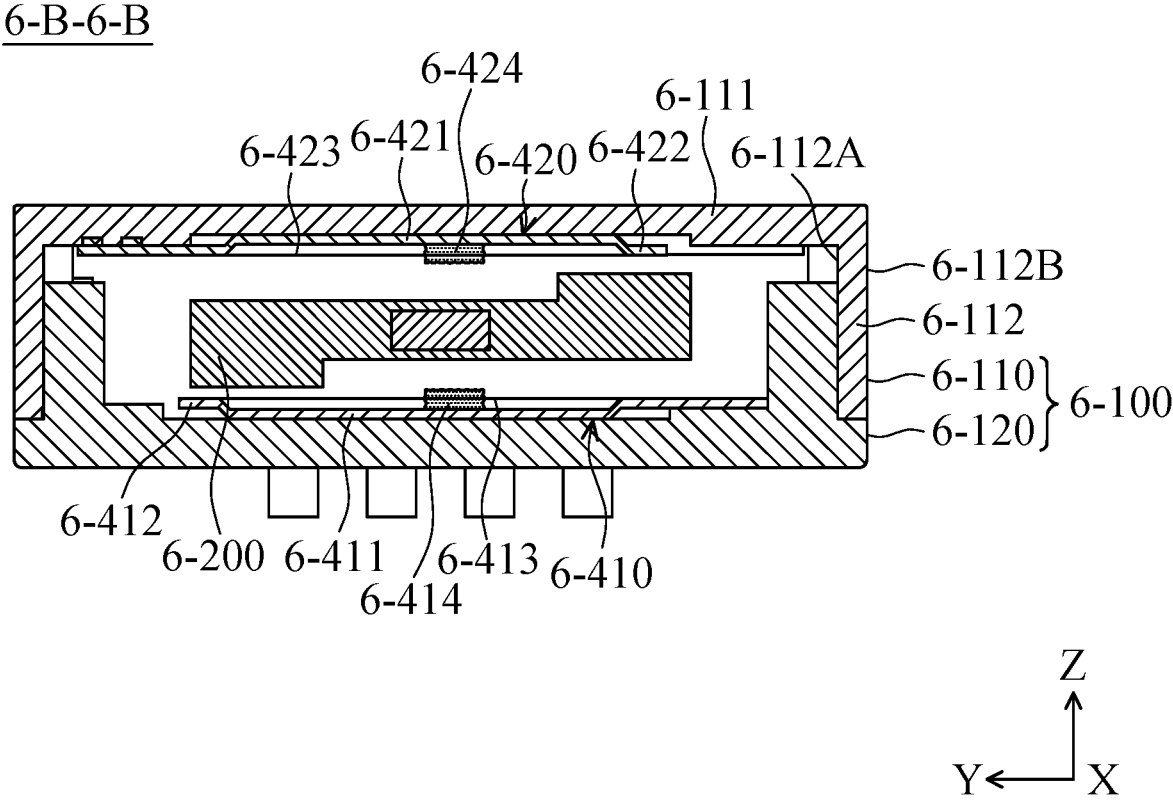
FIG. 45 is a cross-sectional view along line 6-B-5-B in FIG. 42, wherein the movable portion is in the first position.

The driving assembly 6-400 can drive the movable portion 6-200 to move relative to the fixed portion 6-100 along the main axis 6-AX1. Referring to FIG. 43 to FIG. 45, in this embodiment, the driving assembly 6-400 includes two first driving members 6-410 and two second driving members 6-420, wherein the first driving members 6-410 are disposed between the movable portion 6-200 and the base 6-120, and the second driving members 6-420 are disposed between the movable portion 6-200 and the top wall 6-111.

The first driving member 6-410 includes a first elastic unit 6-411, a first contacting unit 6-412, a first driving unit 6-413, and a first damping unit 6-414. The first elastic unit 6-411 has a C-shaped curved structure. An end of the C-shaped structure is affixed to the base 6-120, and the other end of the C-shaped structure is connected to the first contacting unit 6-412. The curved section of the first elastic unit 6-411 abuts the bottom 6-120. In this embodiment, the first elastic unit 6-411 and the first contacting unit 6-412 are integrally formed as one piece and form a flexible metal sheet. Moreover, the end of the first elastic unit 6-411 affixed to the base 6-120 can connect to the first circuit 6-600 in the base 6-120, so that the first elastic unit 6-411 and the first circuit 6-600 can be electrically connected to each other.

The first driving unit 6-413 is a shape memory alloy (SMA) having a longitudinal structure. The first driving unit 6-413 extends in the first direction (the Y-axis in the figures) which is perpendicular to the main axis 6-AX1, and the opposite ends of the first driving unit 6-413 are respectively affixed to the opposite ends of the first elastic unit 6-411. The first damping unit 6-414 includes soft resin material, and contacts the first driving unit 6-413 and the first elastic unit 6-411. It should be noted that, although the first damping unit 6-414 in this embodiment is disposed at the middle section of the first driving unit 6-413, the first damping unit 6-414 can be also disposed at the end(s) of the first driving unit 6-413 connected to the first elastic unit 6-411 in some embodiments.

Similar to the first driving member 6-410, the second driving member 6-420 includes a second elastic unit 6-421, a second contacting unit 6-422, a second driving unit 6-423, and a second damping unit 6-424. The second elastic unit 6-421 has a C-shaped curved structure. An end of the C-shaped structure is affixed to the frame 6-110, and the other end of the C-shaped structure is connected to the second contacting unit 6-422. The curved section of the second elastic unit 6-421 abuts the top wall 6-111. In this embodiment, the second elastic unit 6-421 and the second contacting unit 6-422 are integrally formed as one piece and form a flexible metal sheet. Moreover, the end of the second elastic unit 6-421 affixed to the frame 6-110 can connect to the second circuit 6-700 in the frame 6-110, so that the second elastic unit 6-421 and the second circuit 6-700 can be electrically connected to each other.

The second driving unit 6-423 is a shape memory alloy (SMA) having a longitudinal structure. The second driving unit 6-423 extends in the second direction (the Y-axis in the figures) which is perpendicular to the main axis 6-AX1, and the opposite ends of the second driving unit 6-423 are respectively affixed to the opposite ends of the second elastic unit 6-421. The second damping unit 6-424 includes soft resin material, and contacts the second driving unit 6-423 and the second elastic unit 6-421. It should be noted that, although the second damping unit 6-424 in this embodiment is disposed at the middle section of the second driving unit 6-423, the second damping unit 6-424 can be also disposed at the end(s) of the second driving unit 6-423 connected to the second elastic unit 6-421 in some embodiments.

As shown in FIG. 44 and FIG. 45, when the driving assembly 6-400 does not drive the movable portion 6-200 to move (i.e. there is no current flow through the first driving unit 6-413 or the second driving unit 6-423), the supporting assembly 6-300 positions the movable portion 6-200 in a first position. When the movable portion 6-200 is in the first position, the first driving member 6-410 and the second driving member 6-420 are spaced apart from the movable portion 6-200. In other words, the first driving member 6-410 and the second driving member 6-420 do not contact the movable portion 6-200.

Figure 46:
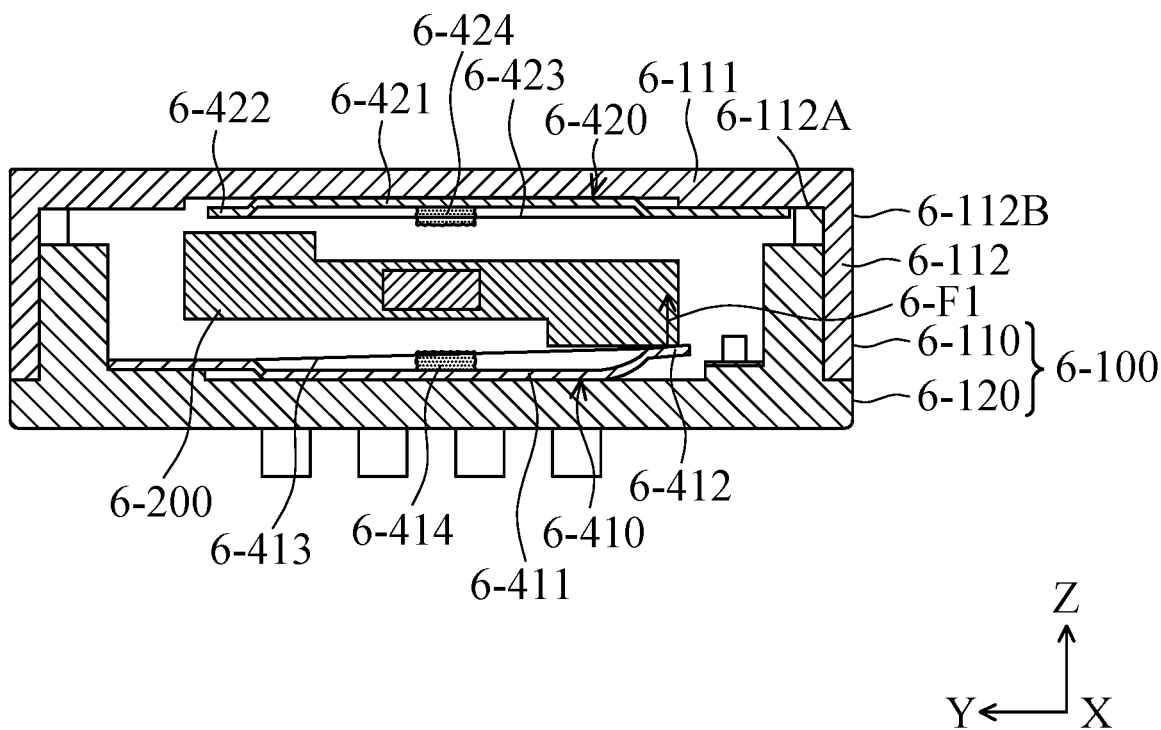
FIG. 46 is a cross-sectional view of the optical member driving mechanism according to an embodiment of the invention, wherein the movable portion is in a second position.
Figure 47:
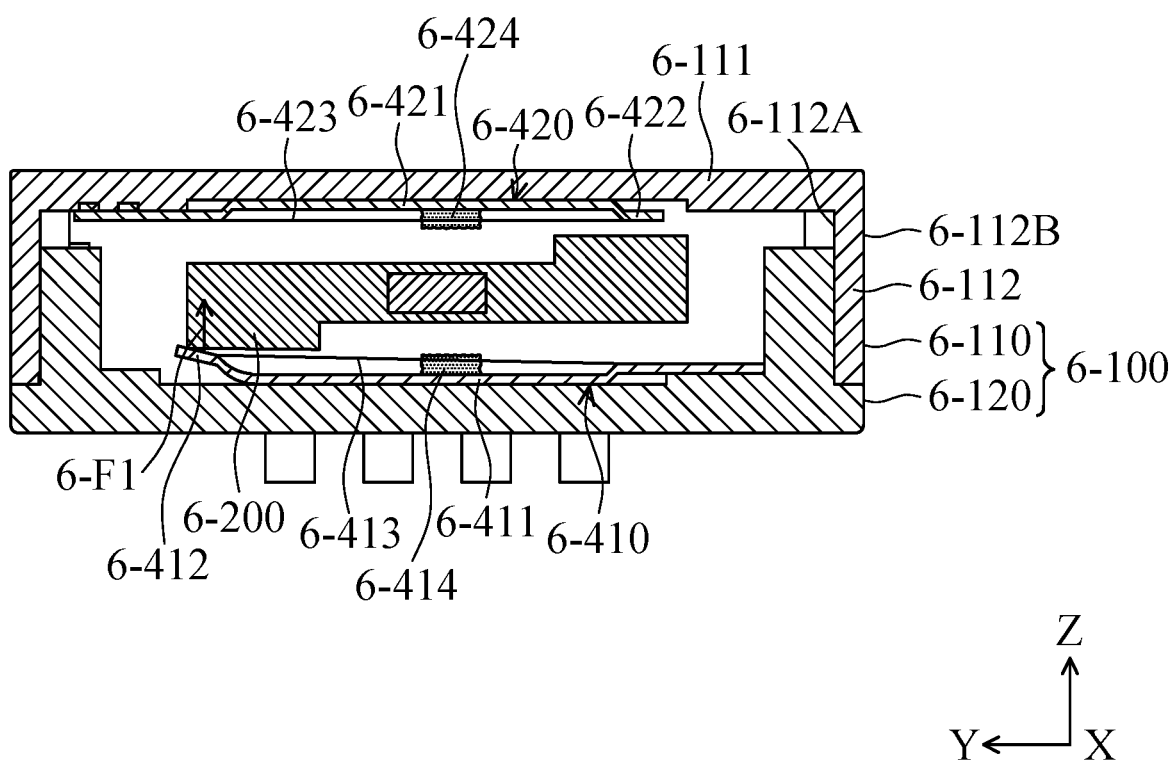
FIG. 47 is a cross-sectional view of the optical member driving mechanism according to an embodiment of the invention, wherein the movable portion is in the second position.

As shown in FIG. 46 and FIG. 47, when the user desires to move the movable portion 6-200 relative to the fixed portion 6-100 toward the top wall 6-111, a current can flow through the first driving unit 6-413. At this time, the first driving unit 6-413 contracts, and the first elastic unit 6-411 deforms accordingly. The first contacting unit 6-412 contacts the movable portion 6-200 and provides a first driving force 6-F1 onto the movable portion 6-200. Therefore, the movable portion 6-200 can move relative to the fixed portion 6-100 from the first position to a second position.

Figure 48:
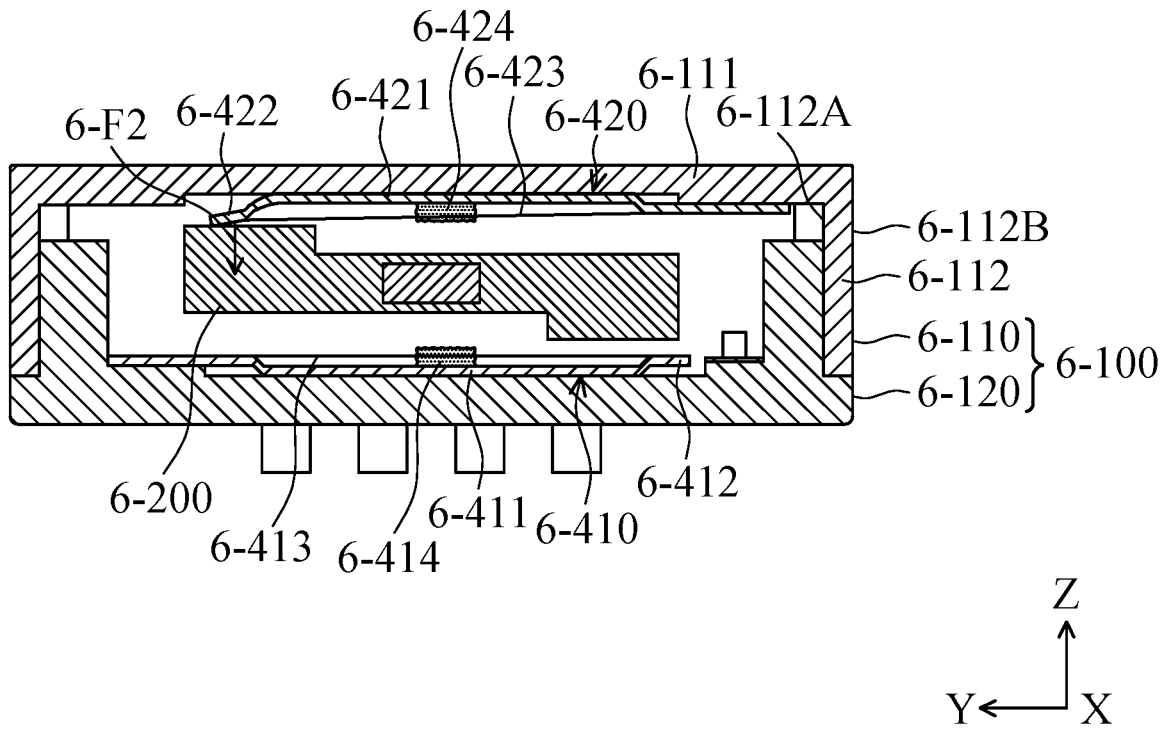
FIG. 48 is a cross-sectional view of the optical member driving mechanism according to an embodiment of the invention, wherein the movable portion is in a third position.
Figure 49:
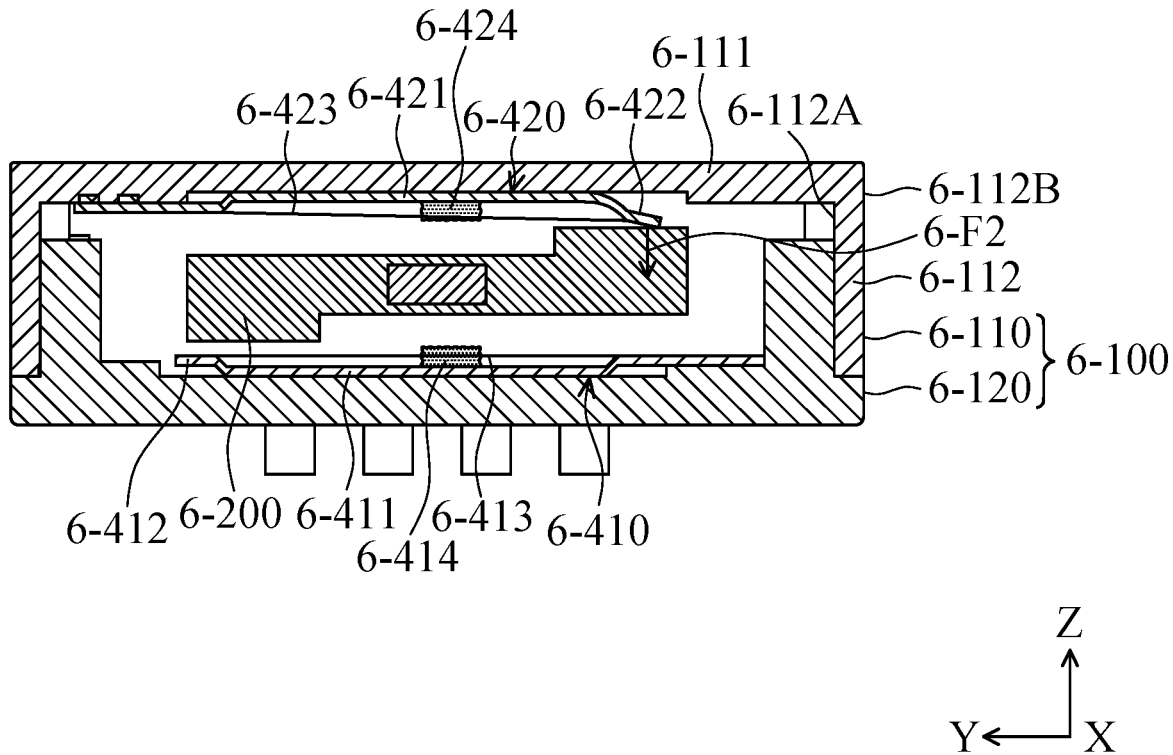
FIG. 49 is a cross-sectional view of the optical member driving mechanism according to an embodiment of the invention, wherein the movable portion is in the third position.

As shown in FIG. 48 and FIG. 49, when the user desires to move the movable portion 6-200 relative to the fixed portion 6-100 toward the base 6-120, a current can flow through the second driving unit 6-423. At this time, the second driving unit 6-423 contracts, and the second elastic unit 6-421 deforms accordingly. The second contacting unit 6-422 contacts the movable portion 6-200 and provides a second driving force 6-F2 onto the movable portion 6-200. Therefore, the movable portion 6-200 can move relative to the fixed portion 6-100 from the first position to a third position.

In this embodiment, the first driving force 6-F1 and the second driving force 6-F2 generated from the deformations of the first elastic unit 6-411 and the second elastic unit 6-421 are opposite. The first driving force 6-F1 and the second driving force 6-F2 are not parallel to the extending direction of the first driving unit 6-413 (a first direction) and the extending direction of the second driving unit 6-423 (a second direction). Moreover, in this embodiment, two first driving members 6-410 are arranged in a rotational symmetric manner relative to the main axis 6-AX1, and two second driving members 6-420 are arranged in a rotational symmetric manner relative to the main axis 6-AX1. Therefore, when the first driving members 6-410 or the second driving members 6-420 push the movable portion 6-200 to move, the movable portion 6-200 does not rotate.

Figure 50:
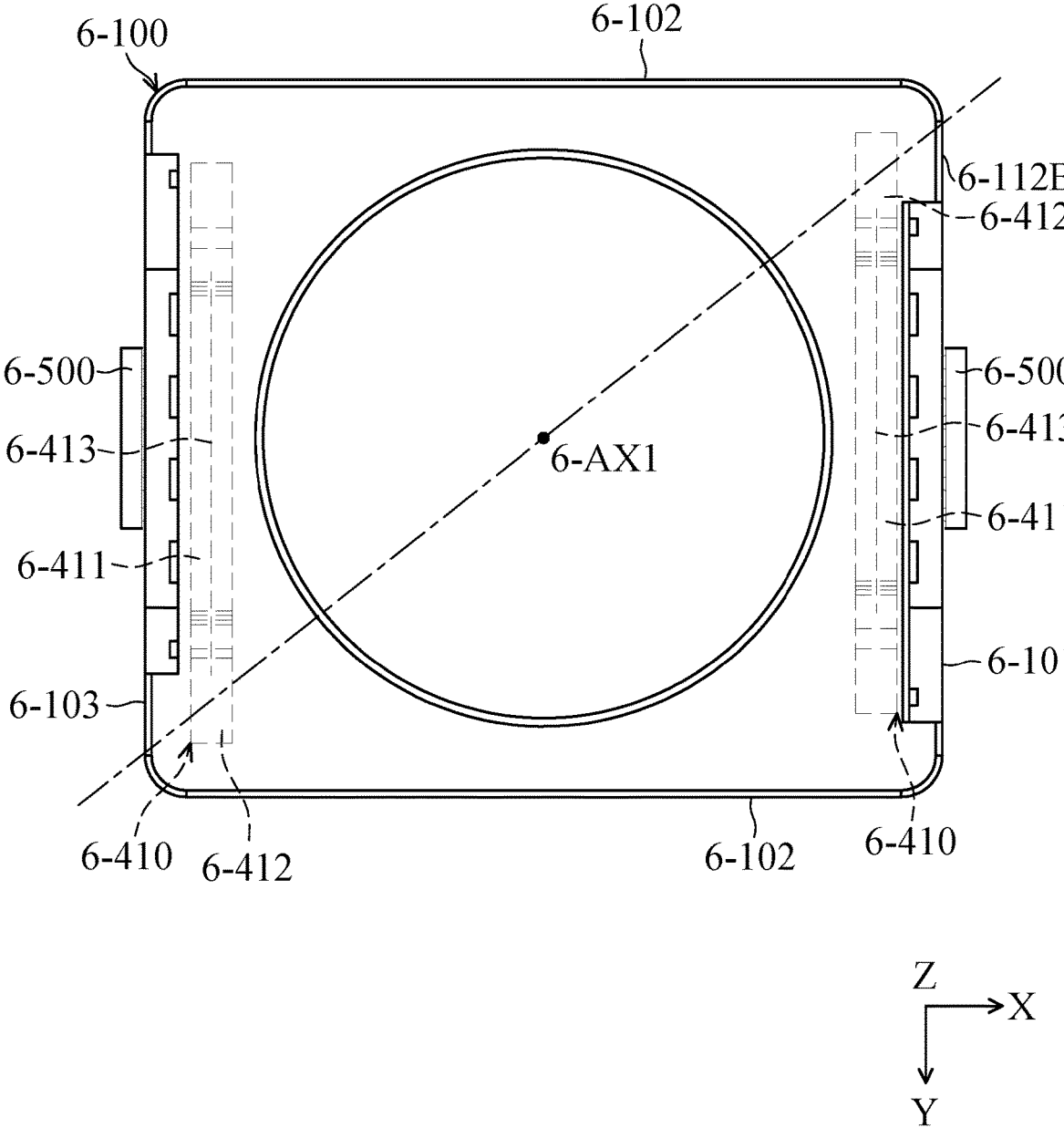
FIG. 50 is a bottom view diagram of the optical member driving mechanism according to an embodiment of the invention.
Figure 51:
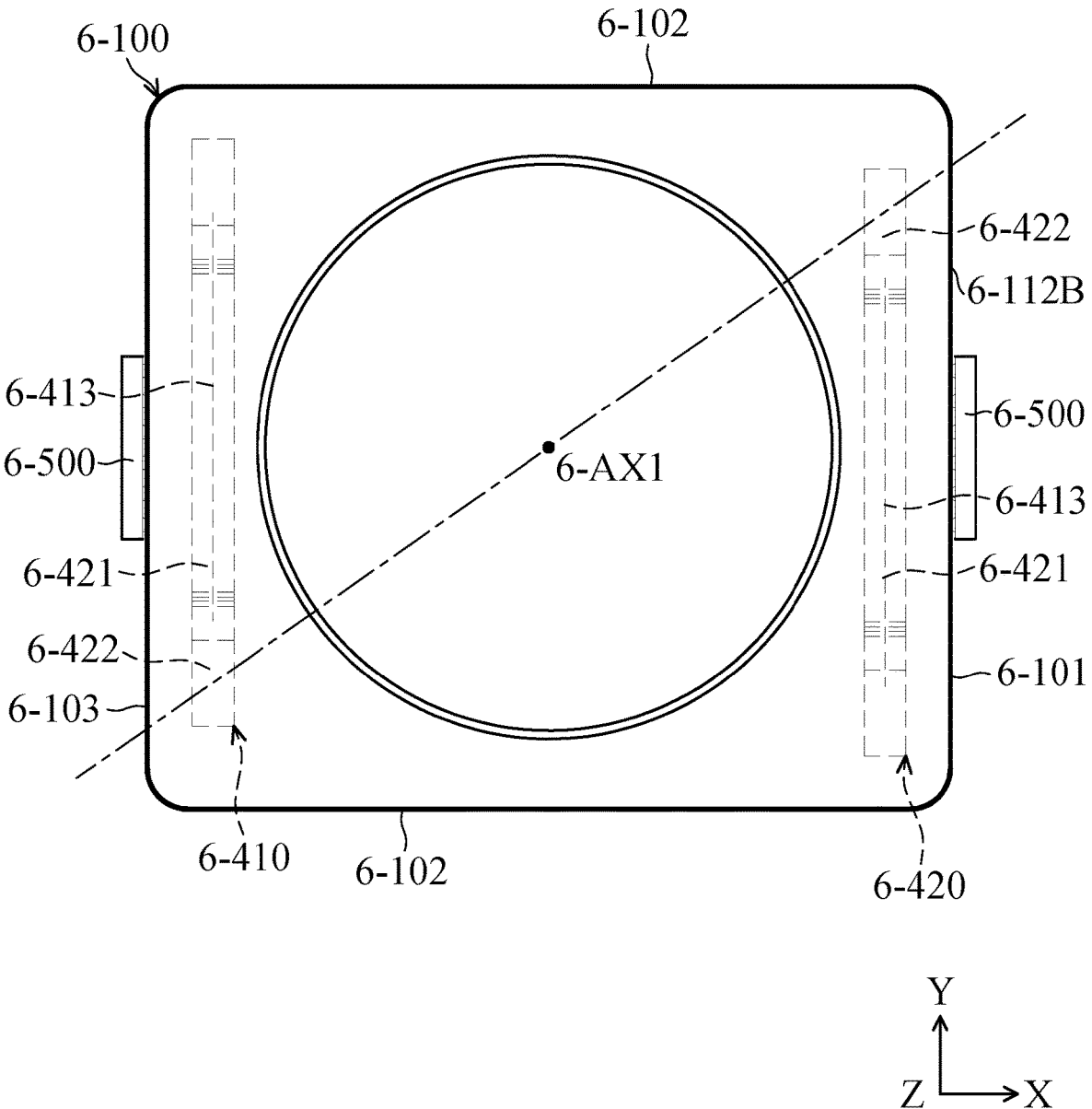
FIG. 51 is a top view diagram of the optical member driving mechanism according to an embodiment of the invention.

More in detail, as shown in FIG. 50, as seen from the main axis 6-AX1, the fixed portion 6-100 has a polygonal structure. The polygonal structure includes a first side 6-101, two second sides 6-102, and a third side 6-103. The second sides 6-102 connect the first side 6-101 to the third side 6-103, the first side 6-101 is opposite to the third side 6-103, and the extending direction of the first side 6-101 is the same as that of the third side 6-103. One of the first driving members 6-410 is disposed on a first side 6-101, and the other one is disposed on the third side 6-103. The connection line between the centers of the first contacting unit 6-412 of two first driving members 6-410 passes through the center of the movable portion (i.e. the main axis 6-AX1). Therefore, when the optical member 6-30 is disposed, the connection line between the centers of the first contacting unit 6-412 of two first driving members 6-410 passes through the optical member 6-30. Similarly, as shown in FIG. 51, one of the second driving members 6-420 is disposed on a first side 6-101, and the other one is disposed on the third side 6-103. The connection line between the centers of the second contacting unit 6-422 of two second driving members 6-420 passes through the center of the movable portion (i.e. the main axis 6-AX1). Therefore, when the optical member 6-30 is disposed, the connection line between the centers of the second contacting unit 6-422 of two second driving members 6-420 passes through the optical member 6-30.

In this embodiment, the connection line between the center of each of the first contacting units 6-412 and the main axis 6-AX1 is not perpendicular and not parallel to the first direction. The connection line between the center of each of the second contacting units 6-422 and the main axis 6-AX1 is not perpendicular and not parallel to the second direction. The connection line between the center of each of the first contacting units 6-412 and the main axis 6-AX1 is not perpendicular and not parallel to the connection line between the center of each of the second contacting units 6-422 and the main axis 6-AX1. The connection line between the centers of the first contacting units 6-412 of two first driving members 6-410 is not perpendicular and not parallel to the connection line between the centers of the second contacting units 6-422 of two second driving members 6-420. As seen from the direction that is perpendicular to the main axis 6-AX1, the second driving members 6-420 do not overlap the first driving members 6-410, two first driving members 6-410 overlap each other, and two second driving members 6-420 overlap each other.

In some embodiments, two first driving members 6-410 are arranged in an axial symmetric manner relative to a symmetric axis, wherein the symmetric axis passes the main axis 6-AX1, and is perpendicular to the main axis 6-AX1 and is parallel to the first direction. Two second driving members 6-420 are arranged in an axial symmetric manner relative to the symmetric axis too. Thus, the driving assembly 6-400 can drive the movable portion 6-200 rotate relative to the fixed portion 6-100 around a rotation axis (such as the X-axis) to achieve the efficacy of optical image stabilization, wherein the rotation axis is perpendicular to the main axis 6-AX1 and the symmetric axis. In some embodiments, the optical member driving mechanism 6-10 merely include one first driving member 6-410 and one second driving member 6-420 at the first side 6-101, and the first driving member 6-410 and the second driving member 6-420 at the third side 6-103 are omitted. The driving assembly 6-400 can also drive the movable portion 6-200 to rotate relative to the fixed portion 6-100 around the rotation axis that is perpendicular to the main axis 6-AX1 in these embodiments.

Referring to FIG. 42, FIG. 43, and FIG. 50, the control assembly 6-500 includes a control member 6-510 and a position sensing member 6-520. In this embodiment, the control member 6-510 includes a first control unit 6-511 and a second control unit 6-512, and the position sensing member 6-520 includes a first position sensing unit 6-521 and a second position sensing unit 6-522. The first control unit 6-511 and the first position sensing unit 6-521 are disposed on the first side 6-101 of the fixed portion 6-100, and the second control unit 6-512 and the second position sensing unit 6-522 are disposed on the third side 6-103 of the fixed portion 6-100. The first control unit 6-511 and the first position sensing unit 6-521 can be disposed in the same package, so that they can be integrally formed as one piece. Similarly, the second control unit 6-512 and the second position sensing unit 6-522 can be disposed in the same package, so that they can be integrally formed as one piece. In some embodiments, the control assembly 6-500 merely includes one package disposed on the first side, and a first control unit 6-511, a second control unit 6-512, and a position sensing unit are disposed in the same package.

The first position sensing unit 6-521 measures the position of the first reference member 6-R1 which is disposed on the movable portion 6-200, so as to output a first sensing signal to the first control unit 6-511. The second position sensing unit 6-522 measures the position of the second reference member 6-R2 which is disposed on the movable portion 6-200, so as to output a second sensing signal to the second control unit 6-521. The first control unit 6-511 can be electrically connected to two first driving members 6-410 via the first circuit 6-600, so that the first control unit 6-511 can control two first driving members 6-410 according to the first signal. Similarly, the second control unit 6-521 can be electrically connected to two second driving members 6-420 via the second circuit 6-700, so that the second control unit 6-521 can control two second driving members 6-420 according to the second signal.

For example, each of the first position sensing unit 6-521 and the second position sensing unit 6-522 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, and each of the first reference member 6-R1 and the second reference member 6-R2 can be a magnet.

In this embodiment, the lateral wall 6-112 has an inner surface 6-112A and an outer surface 6-112B. The control assembly 6-500 is disposed on the outer surface 6-112B. In order to prevent other components in the electronic device 6-20 impacting the control assembly 6-500 and causing the control assembly 6-500 damage, in some embodiments, the optical member driving mechanism 6-10 can include a case to protect the control assembly 6-500.

Figure 52:
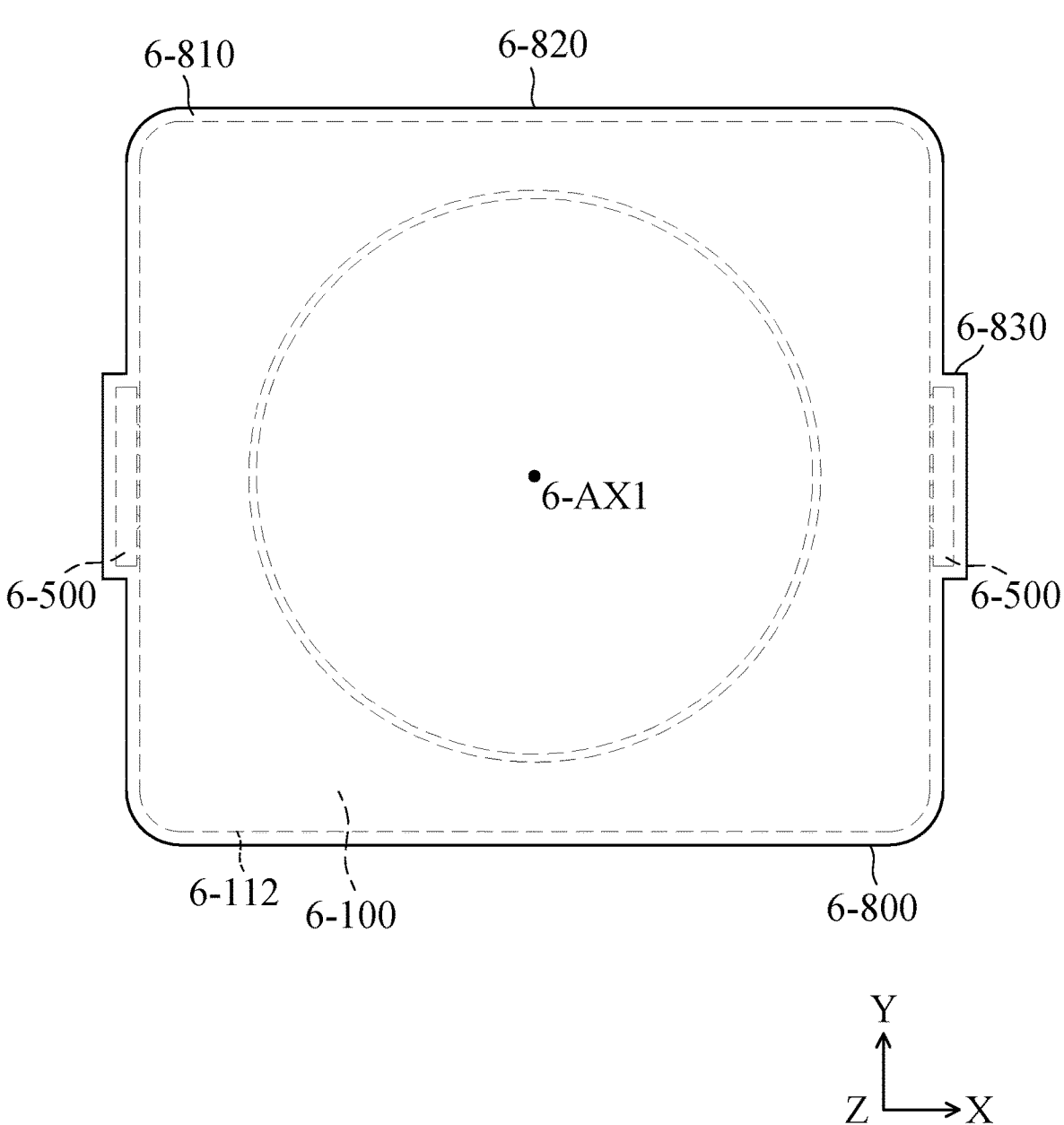
FIG. 52 is a schematic diagram of an optical member driving mechanism according to some embodiments of the invention.
Figure 53:
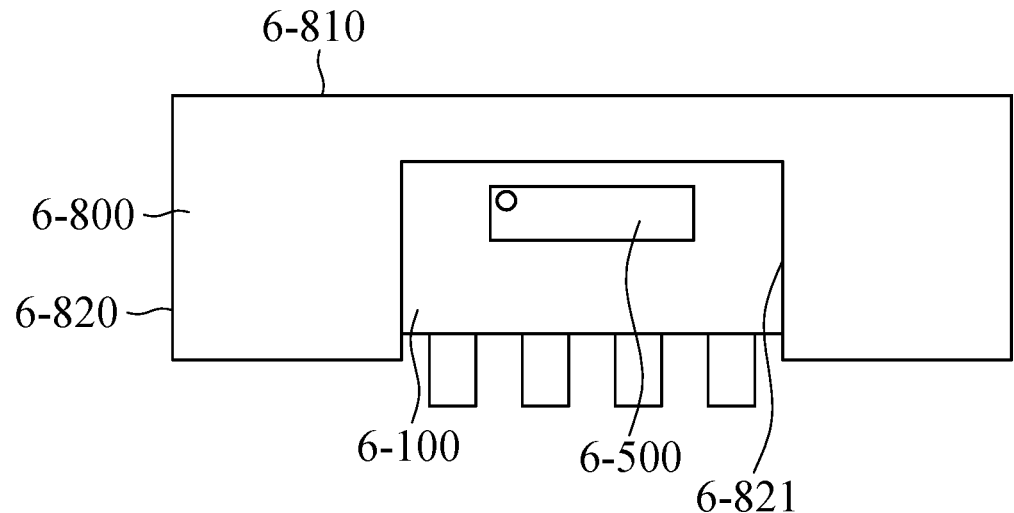
FIG. 53 is a schematic diagram of an optical member driving mechanism according to some embodiments of the invention.
Figure 53:
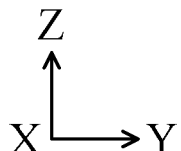

For example, as shown in FIG. 52, in some embodiments, the optical member driving mechanism 6-10 includes a case 6-800 including a top cover 6-810, a lateral cover 6-820, and at least one spacer 6-830. The top cover 6-810 is perpendicular to the main axis 6-AX1, and the lateral cover 6-820 has a plate structure. The spacer 6-830 is formed by bending the wall of the case 6-800, and disposed between the lateral cover 6-820 and the lateral wall 6-112. In the direction that is perpendicular to the lateral cover 6-820, the dimensions of the spacer 6-830 are greater than that of the control assembly 6-500. Therefore, the damage of the control assembly 6-500 due to the impact of other components in the electronic device 6-20 can be prevented, and the impact between the case 6-800 and the control assembly 6-500 when assembling the case 6-800 can also be prevented. In some embodiment, in order to further prevent the impact between the case 6-800 and the control assembly 6-500 when assembling the case 6-800, an opening 6-820 can be formed on the lateral cover 6-820 of the case 6-800 to accommodate the control assembly 6-500.

Furthermore, as shown in FIG. 43, in this embodiment, a plurality of guiding assemblies 6-121 are formed on the base 6-120. Each of the guiding assemblies 6-121 has a C-shaped structure, and includes a first protrusion 6-122 and a second protrusion 6-123 that extends along the main axis 6-AX1. After the optical member driving mechanism 6-10 is assembled, a portion of the movable portion 6-200 is disposed between the first protrusion 6-122 and the second protrusion 6-123. In other words, as seen from the arrangement direction of the first protrusion 6-122 and the second protrusion 6-123, the movable portion 6-200 overlaps the first protrusion 6-122 and the second protrusion 6-123, so that the movement of the movable portion 6-200 in the X-axis can be restricted. Moreover, the movable portion 6-200 is disposed between the guiding assemblies 6-121, so that the movement of the movable portion 6-200 in the Y-axis can be also restricted. Therefore, the guiding assembly 6-121 can guide the movable portion to move relative to the fixed portion 6-100 in a dimension (along the main axis 6-AX1). In this embodiment, the guiding assemblies 6-121 are disposed on the second lateral side 6-102.

Figure 54:
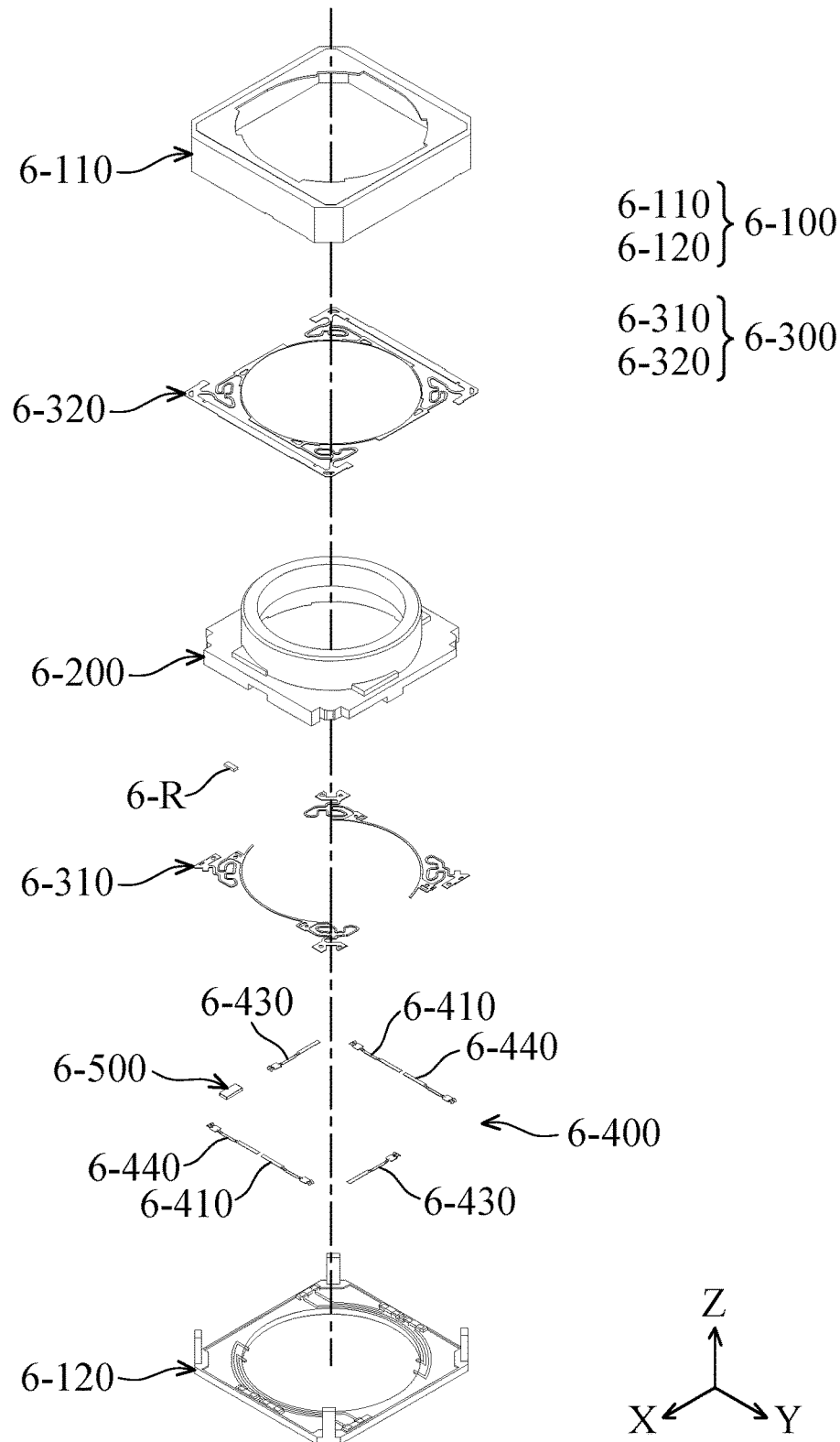
FIG. 54 is an exploded-view diagram of an optical member driving mechanism according to another embodiment of the invention.
Figure 55:
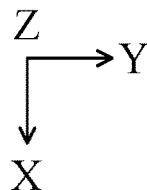
FIG. 55 is an cross-sectional view of the optical member driving mechanism according to another embodiment of the invention.
Figure 56:
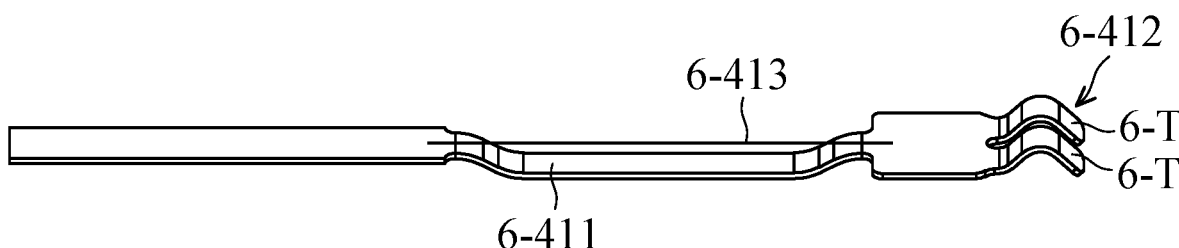
FIG. 56 is a schematic diagram of a first driving member according to another embodiment of the invention.

Referring to FIG. 54 to FIG. 56, in another embodiment of the invention, an optical member driving mechanism 6-10' primarily includes a fixed portion 6-100, a movable portion 6-200, a supporting assembly 6-300, a driving assembly 6-400, and a control assembly 6-500. The arrangement and the structure of the fixed portion 6-100, the movable portion 6-200 and the supporting assembly 6-300 of the optical member driving mechanism 6-10' are the same as that of the optical member driving mechanism 6-10, so that the features thereof are not repeated in the interest of brevity.

The driving assembly 6-400 include two first driving members 6-410, two third driving members 6-430, and two fourth driving members 6-440. The first driving members 6-410 are disposed between the movable portion 6-200 and the base 6-120 of the fixed portion 6-100, and each of the first driving members 6-410 includes a first elastic unit 6-411, a first contacting unit 6-412, and a first driving unit 6-413. The first elastic unit 6-411 has a C-shaped curved structure. An end of the C-shaped structure is affixed to the base 6-120, and the other end of the C-shaped structure is connected to the first contacting unit 6-412. The curved section of the first elastic unit 6-411 abuts the bottom 6-120. The first elastic unit 6-411 and the first contacting unit 6-412 can be integrally formed as one piece and form a flexible metal sheet.

The first driving unit 6-413 is a shape memory alloy (SMA) having a longitudinal structure. The first driving unit 6-413 extends in the first direction (the Y-axis in the figures) which is perpendicular to the main axis 6-AX1, and the opposite ends of the first driving unit 6-413 are respectively affixed to the opposite ends of the first elastic unit 6-411. When a current flows through the first driving unit 6-413, the first driving unit 6-413 contracts and the first elastic unit 6-411 deforms accordingly. The deformation of the first elastic unit 6-411 causes the first contacting unit 6-412 to move, the first contacting unit 6-412 can therefore contact the movable portion 6-200, and the movable portion 6-200 can move relative to the fixed portion 6-100.

Specifically, in this embodiments, the first contacting unit 6-412 includes a plurality of contacting sections 6-T, and each of the contacting sections 6-T has an arc-shaped structure. Thus, the debris caused from the contact between the first contacting unit 6-412 and the movable portion 6-200 can be reduced.

The third driving members 6-430 are disposed between the movable portion 6-200 and the base 6-120 of the fixed portion 6-100, and each of the third driving members 6-430 includes a third elastic unit 6-431, a third contacting unit 6-432, and a third driving unit 6-433. The structures of the third elastic unit 6-431, the third contacting unit 6-432, and the third driving unit 6-433 of the third driving member 6-430 are the same as that of the first elastic unit 6-411, the first contacting unit 6-412, and the first driving unit 6-413 of the first driving member 6-410, so that the features thereof are not repeated in the interest of brevity. The fourth driving members 6-440 are disposed between the movable portion 6-200 and the base 6-120 of the fixed portion 6-100, and each of the fourth driving members 6-440 includes a fourth elastic unit 6-441, a fourth contacting unit 6-442, and a fourth driving unit 6-443. Similarly, the structures of the fourth elastic unit 6-441, the fourth contacting unit 6-442, and the fourth driving unit 6-443 of the fourth driving member 6-440 are the same as that of the first elastic unit 6-411, the first contacting unit 6-412, and the first driving unit 6-413 of the first driving member 6-410, so that the features thereof are not repeated in the interest of brevity.

As shown in FIG. 54 and FIG. 55, in this embodiment, one of the first driving members 6-410 is disposed on the first side 6-101 of the fixed portion 6-100, and the other one of the first driving members 6-410 is disposed on the third side 6-103 of the fixed portion 6-100. One of the fourth driving members 6-440 is disposed on the first side 6-101 of the fixed portion 6-100, and the other one of the fourth driving members 6-440 is disposed on the third side 6-103 of the fixed portion 6-100. The third driving members 6-430 are disposed on the different second sides 6-102.

The first driving units 6-413, the third driving units 6-433, and the fourth driving units 6-443 extend respectively in the first direction (the Y-axis in the figures), the third direction (the X-axis in the figures), and the fourth direction (the Y-axis in the figures). As seen from the main axis 6-AX1, the connection line between the center of each of the third contacting units 6-432 and the main axis 6-AX1 is perpendicular to the third direction, and the connection line between the center of each of the fourth contacting units 6-442 and the main axis 6-AX1 is not perpendicular and not parallel to the fourth direction. Since the first driving member 6-410, the third driving member 6-430, and the fourth driving member 6-440 are disposed on the same level, as seen from the direction that is perpendicular to the main axis 6-AX1, the third driving members 6-430 overlap the first driving members 6-410, and the fourth driving members 6-440 overlap the first driving members 6-410.

Moreover, when the third contacting unit 6-432 of the third driving member 6-430 pushes the movable portion 6-200, a third driving force can be applied on the movable portion 6-200. The third driving force is not parallel to the third direction. When the fourth contacting unit 6-442 of the fourth driving member 6-440 pushes the movable portion 6-200, a fourth driving force can be applied on the movable portion 6-200. The fourth driving force is not parallel to the fourth direction. The directions of the third driving force and the fourth driving force are the same as that of the first driving force.

The control assembly 6-500 is disposed on the base 6-120 and situated at the second side 6-102. The control assembly 6-500 and the third driving member 6-430 are arranged along the third direction, so that the space in the optical driving mechanism 6-10' can be fully used. The control assembly 6-500 includes a control member and a position sensing member. The control member and the position sensing member are disposed in the same package, so that they can be integrally formed as one piece. The position sensing member measures the position of a reference member 6-R, which is disposed on the movable portion 6-200, so as to output a sensing signal to the control member. The control member can control the first driving units 6-413, the third driving units 6-433, and the fourth driving units 6-443 according to the sensing signal.

In summary, an optical member driving mechanism is provided, including a movable portion, a fixed portion, a driving assembly, and a supporting assembly. The movable portion is configured to hold an optical member. The driving assembly is configured to drive the movable portion to move relative to the fixed portion. When the driving assembly does not drive the movable portion to move, the supporting assembly positions the movable portion in a first position. Owing to the structure of the aforementioned optical member driving mechanism, the driving assembly can provide a greater driving force on the movable portion, so that the optical member with more optical lenses can be used.

Figure 57:
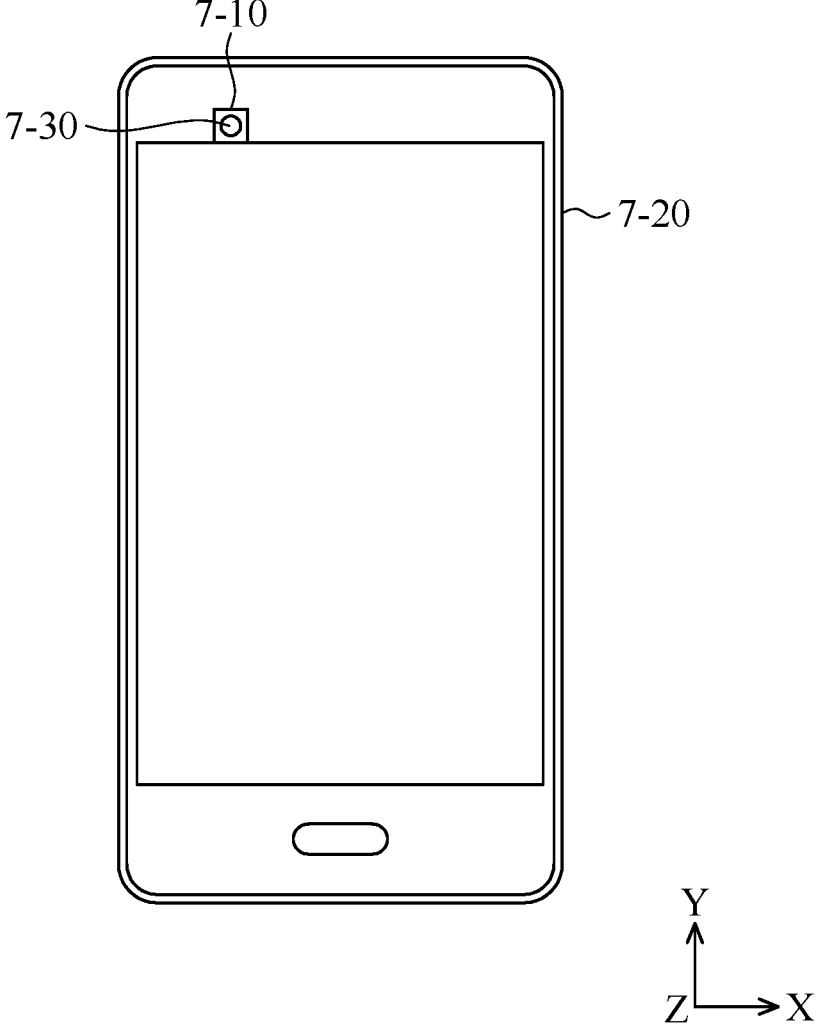
FIG. 57 is a schematic diagram of an electronic device according to an embodiment of the invention.

Referring to FIG. 57, in an embodiment of the invention, an optical member driving mechanism 7-10 can be disposed in an electronic device 7-20 and used to hold and drive an optical member 7-30, so that the optical member 7-30 can move relative to an image sensor (not shown) in the electronic device 7-20, and the purpose of focus and/or zoom can be achieved. For example, the electronic device 7-20 can be a smartphone, a laptop computer, or a digital camera, and the optical member 7-30 can be a lens.

Figure 58:
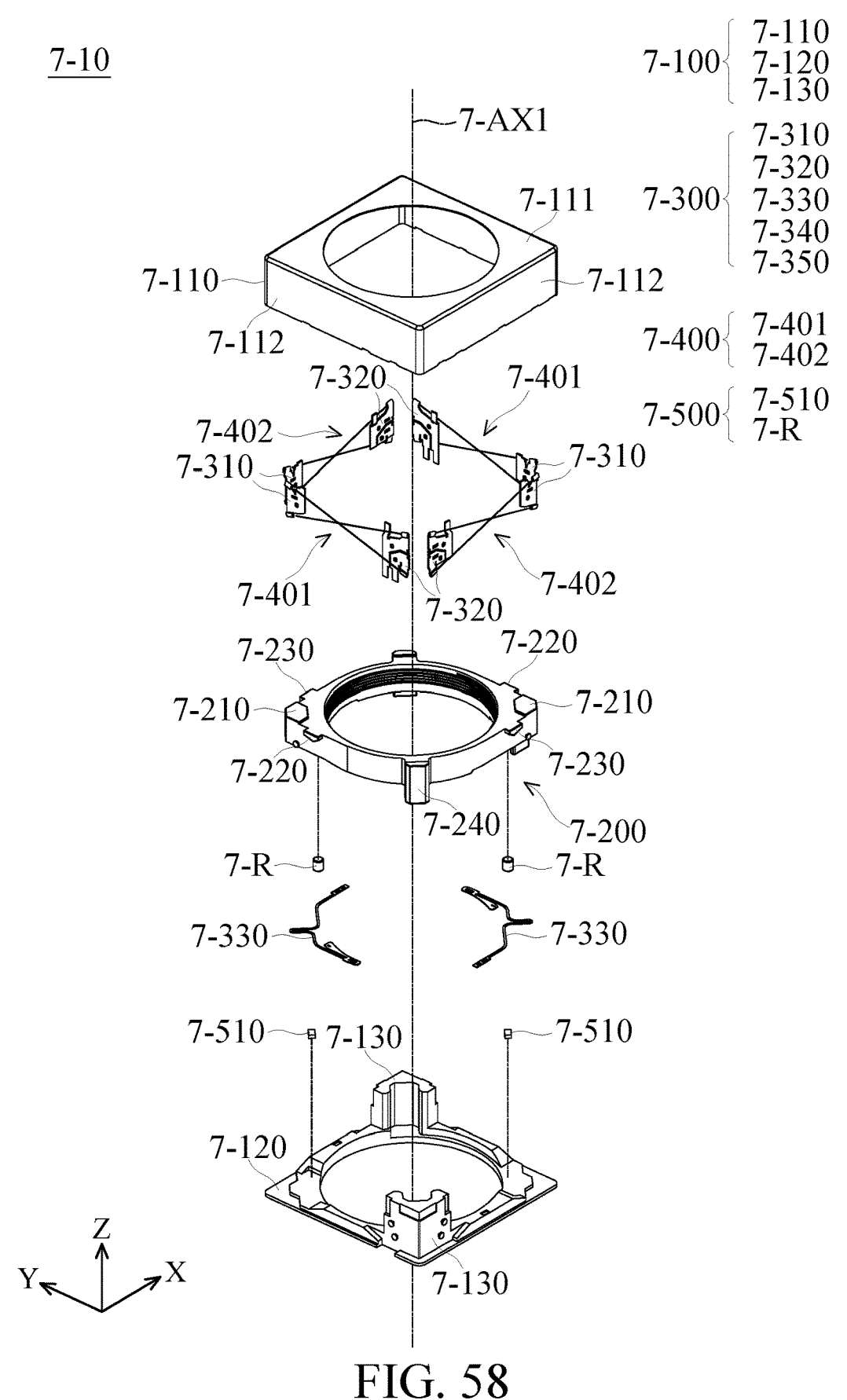
FIG. 58 is an exploded-view diagram of an optical member driving mechanism according to an embodiment of the invention.
Figure 59:
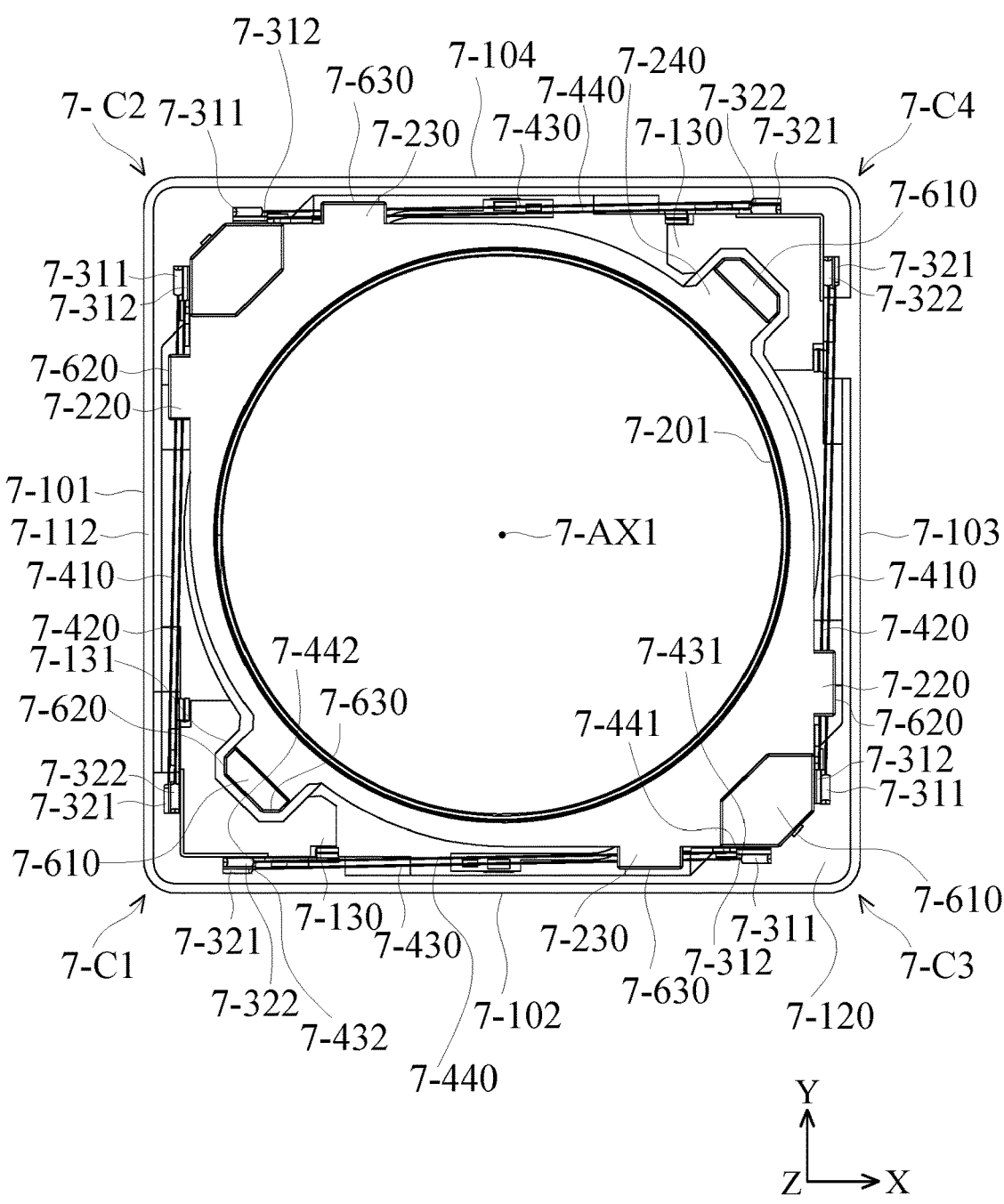
FIG. 59 is a cross-sectional view of the optical member driving mechanism according to an embodiment of the invention.

FIG. 58 is an exploded-view diagram of the aforementioned optical member driving mechanism 7-10, and FIG. 59 is a cross-sectional view of the optical member driving mechanism 7-10. As shown in FIG. 58 and FIG. 59, the optical member driving mechanism 7-10 primarily includes a fixed portion 7-100, a movable portion 7-200, a circuit assembly 7-300, a driving assembly 7-400, and a position sensing assembly 7-500.

The fixed portion 7-100 includes a frame 7-110, a base 7-120, and at least one fixed member 7-130. The frame 7-110 and the base 7-120 are arranged along the main axis 7-AX1 of the optical member driving mechanism 7-10 and engaged with each other to form a hollow box. The movable portion 7-200, the circuit assembly 7-300, the driving assembly 7-400, and the fixed member 7-130 are accommodated in the hollow box. The main axis 7-AX1 is parallel to the optical axis of the optical member 7-30.

The frame 7-110 has a top wall 7-111 and a plurality of lateral walls 7-112. The top wall 7-111 is perpendicular to the main axis 7-AX1, and the lateral walls 7-112 are extended from the edge of the top wall 7-111 along the main axis 7-AX1. As seen from the main axis 7-AX1, the fixed portion 7-100 includes a polygonal structure (a rectangular structure in this embodiment, for example), and has a first side 7-101, a second side 7-102, a third side 7-103, and a fourth side 7-104. A first corner 7-C1 is formed at the connection point between the first side 7-101 and the second side 7-102, a second corner 7-C2 is formed at the connection point between the first side 7-101 and the fourth side 7-104, a third corner 7-C3 is formed at the connection point between the second side 7-102 and the third side 7-103, and a fourth corner 7-C4 is formed at the connection point between the third side 7-103 and the fourth side 7-104.

The fixed member 7-130 is affixed to the base 7-120, and includes a longitudinal structure extending along the main axis 7-AX1. In this embodiment, the fixed portion 7-100 includes two fixed members 7-130 respectively disposed on the first corner 7-C1 and the fourth corner 7-C4, and these fixed members 7-130 and the base 7-120 are integrally formed as one piece. In some embodiments, the fixed member(s) 7-130 can be affixed to the frame 7-110, and the fixed member(s) 7-130 and the frame 7-110 can be integrally formed as one piece.

The movable portion 7-200 can be an optical member holder, and the optical member 7-30 can be affixed to a through hole 7-201 of the optical member holder. As shown in FIG. 58 and FIG. 59, in this embodiment, a stopping assembly 7-600 can be disposed on the movable portion 7-200, so as to restrict the moving range of the movable portion 7-200. In detail, the stopping assembly 7-600 includes a plurality of first stopping members 7-610, a plurality of second stopping members 7-620, and a plurality of third stopping members 7-630. The first stopping members 7-610 are configured to restrict the movement of the movable portion 7-200 in the Z-axis (the third direction), the second stopping members 7-620 are configured to restrict the movement of the movable portion 7-200 in the X-axis (the fourth direction), and the third stopping members 7-630 are configured to restrict the movement of the movable portion 7-200 in the Y-axis (the fifth direction).

A plurality of first protruding parts 7-210, a plurality of second protruding parts 7-220, and a plurality of third protruding parts 7-230 are formed on the movable portion 7-200, and respectively extended along the Z-axis, the X-axis, and the Y-axis. Therefore, the first protruding parts 7-210, the second protruding parts 7-220, and the third protruding parts 7-230 can be respectively referred to as the first stopping members 7-610, the second stopping members 7-620, and the third stopping members 7-630. In this embodiment, at least one first stopping member 7-610 and at least one second stopping member 7-620 are situated at the second corner 7-C2, and at least one third stopping member 7-630 is situated at the third corner 7-C3.

In this embodiment, at least one protrusion 7-240 is formed on the movable portion. The protrusion 7-24 extends toward the first corner 7-C1 and/or the fourth corner 7-C4 and enters a guiding slot 7-131 of the fixed member 7-130. Since the extending direction of the protrusion 7-240 is inclined relative to the lateral walls 7-112, the extending direction of the protrusion 7-240 is not parallel and not perpendicular to extending directions of the first protruding parts 7-210, the extending directions of the second protruding parts 7-220, and the extending directions of the third protruding parts 7-230. Since the appearance of the guiding slot 7-131 in the XY-plane is complementary to the appearance of the protrusion 7-240, the movement of the movable portion 7-200 in the X-axis and the Y-axis can be restricted. In other words, the guiding slot 7-131 can guide the movable portion 7-200 to move relative to the fixed portion 7-100 in a first dimension (the Z-axis).

Since the guiding slot 7-131 and the protrusion 7-240 can restrict the movement of the movable portion 7-200 in the X-axis and the Y-axis, a portion of the protrusion 7-240 can be referred to as the second stopping member 7-620, and another portion of the protrusion 7-240 can be referred to as the third stopping member 7-630. Moreover, in this embodiment, one first stopping member 7-610 is formed on the protrusion 7-240. Therefore, in this embodiment, at least one first stopping member 7-610, at least one second stopping member 7-620, and at least one third stopping member 7-630 are situated at the first corner 7-C1.

Figure 60:
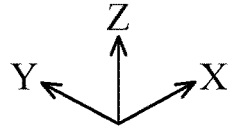
FIG. 60 is a schematic diagram of the optical member driving mechanism according to an embodiment of the invention, wherein the frame in omitted.

FIG. 60 is a schematic diagram of the optical member driving mechanism 7-10, wherein the frame 7-110 is omitted. As shown in FIG. 58 to FIG. 60, the circuit assembly 7-300 includes a plurality of first circuit units 7-310, a plurality of second circuit units 7-320, at least one third circuit unit 7-330, at least one fourth circuit unit 7-340, and at least one fifth circuit unit 7-350. The driving assembly 7-400 includes two first driving members 7-401 and two second driving members 7-402. Each of the first driving members 7-401 includes a first driving unit 7-410 and a second driving unit 7-420, and each of the second driving members 7-402 includes a third driving unit 7-430 and a fourth driving unit 7-440.

Figure 61:
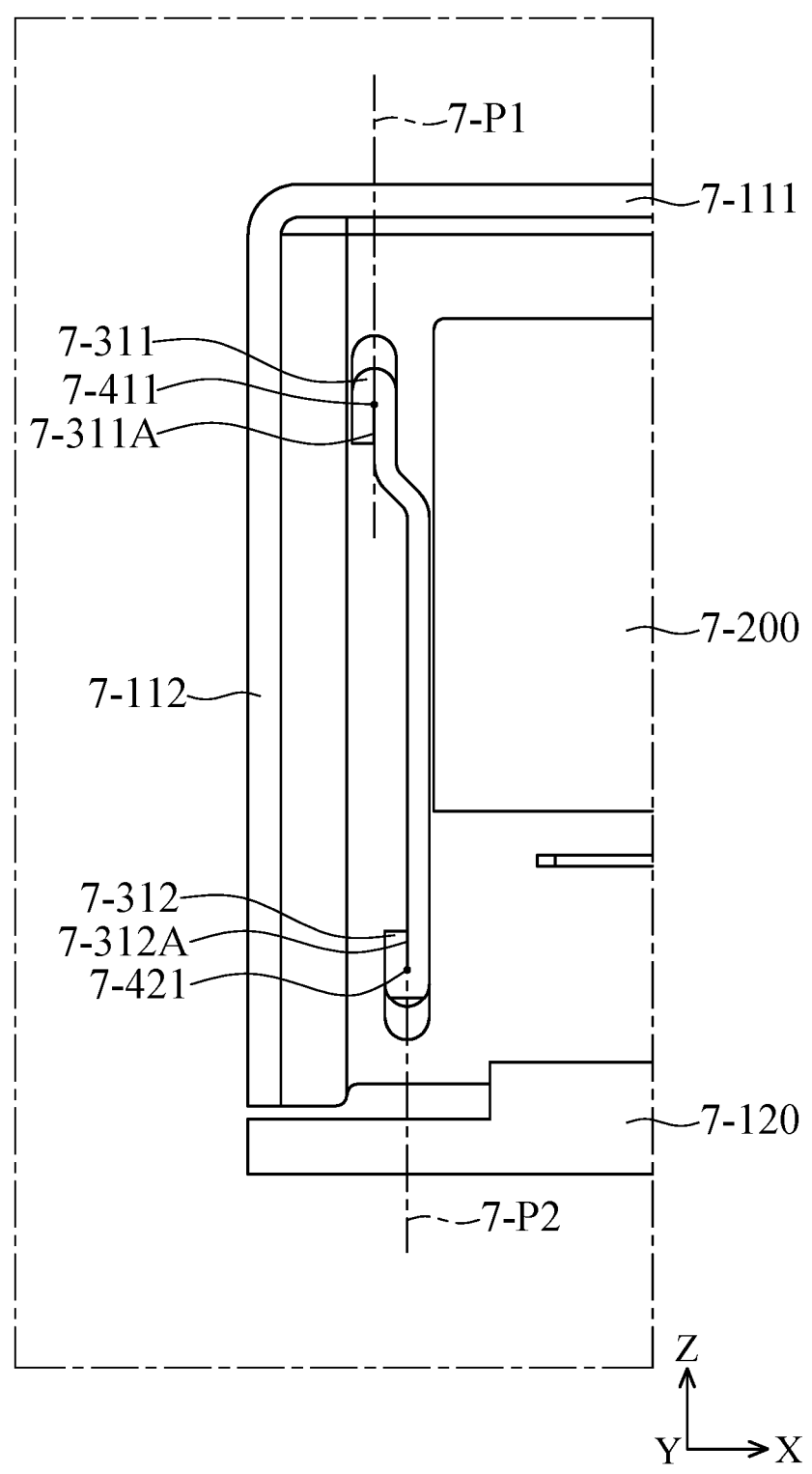
FIG. 61 is a partial cross-sectional view of the optical member driving mechanism according to an embodiment of the invention.

At the first side 7-101, one first circuit unit 7-310, one second circuit unit 7-320, and one first driving member 7-401 are disposed. As shown in FIG. 59 to FIG. 61, the first circuit unit 7-310 at the first side 7-101 is affixed to the movable portion 7-200 at the second corner 7-C2, and includes an elastic deformable portion 7-311 and an elastic deformable portion 7-312, wherein the elastic deformable portions 7-311 and 7-312 are plastic deformable. The distance between the elastic deformable portion 7-311 and the top wall 7-111 is less than the distance between the elastic deformable portion 7-312 and the top wall 7-111, and the distance between the elastic deformable portion 7-311 and the lateral wall 7-112 on the first side 7-101 is less than the distance between the elastic deformable portion 7-312 and the lateral wall 7-112 on the first side 7-101.

The first driving unit 7-410 is a shape memory alloy (SMA) having a longitudinal structure, and an end of the first driving unit 7-410 is affixed to the elastic deformable portion 7-311. The portion of the first driving unit 7-410 affixed to the elastic deformable portion 7-311 can be defined as a first movable portion connecting point 7-411. The second driving unit 7-420 is a shape memory alloy having a longitudinal structure too, and an end of the second driving unit 7-420 is affixed to the elastic deformable portion 7-312. The portion of the second driving unit 7-420 affixed to the elastic deformable portion 7-312 can be defined as a second movable portion connecting point 7-421.

The first movable portion connecting point 7-411 is in contact with a first electrical connecting surface 7-311A of the first circuit unit 7-310, and the second movable portion connecting point 7-421 is in contact with a second electrical connecting surface 7-312A of the first circuit unit 7-310. The first electrical connecting surface 7-311A is situated on a first virtual plane 7-P1, and the second electrical connecting surface 7-312A is situated on a second virtual plane 7-P2. The first virtual plane 7-P1 is parallel to the second virtual plane 7-P2. Since the shortest distance between the first movable portion connecting point 7-411 and the lateral wall 7-112 on the first side 7-101 is less than the shortest distance between the second movable portion connecting point 7-421 and the lateral wall 7-112 on the first side 7-101, a gap between the first virtual plane 7-P1 and the second virtual plane 7-P2 is greater than zero.

Figure 62:
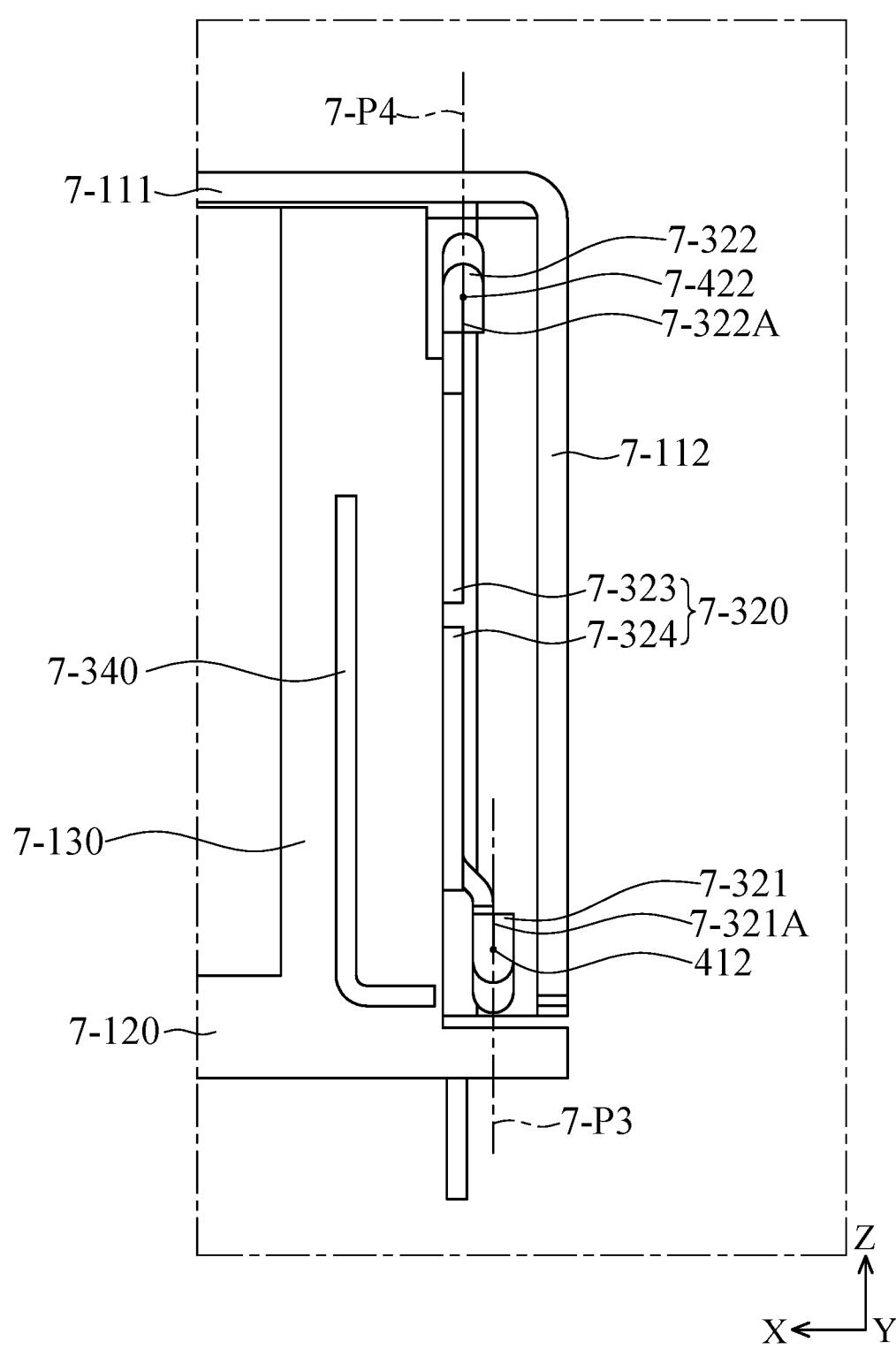
FIG. 62 is a partial cross-sectional view of the optical member driving mechanism according to an embodiment of the invention.

As shown in FIG. 59, FIG. 60, and FIG. 62, the second circuit unit 7-320 at the first side 7-101 is affixed to the fixed member 7-130, and includes an elastic deformable portion 7-321 and an elastic deformable portion 7-322, wherein the elastic deformable portions 7-321 and 7-322 are plastic deformable. The second circuit unit 7-320 includes a plate structure, and can be divided into an upper section 7-323 and a lower section 7-324. The upper section 7-323 and the lower section 7-324 are electrically independent and separated from each other. The elastic deformable portion 7-321 and the elastic deformable portion 7-322 are respectively disposed on the lower section 7-324 and the upper section 7-323. Therefore, the distance between the elastic deformable portion 7-322 and the top wall 7-111 is less than the distance between the elastic deformable portion 7-321 and the top wall 7-111. Moreover, the distance between the elastic deformable portion 7-321 and the lateral wall 7-112 on the first side 7-101 is less than the distance between the elastic deformable portion 7-322 and the lateral wall 7-112 on the first side 7-101.

The other end of the first driving unit 7-410 is affixed to the elastic deformable portion 7-321. The portion of the first driving unit 7-410 affixed to the elastic deformable portion 7-321 can be defined as a first fixed portion connecting point 7-412. Similarly, the other end of the second driving unit 7-420 is affixed to the elastic deformable portion 7-322. The portion of the second driving unit 7-420 affixed to the elastic deformable portion 7-322 can be defined as a second fixed portion connecting point 7-422.

The first fixed portion connecting point 7-412 is in contact with a third electrical connecting surface 7-321A of the second circuit unit 7-320, and the second fixed portion connecting point 7-422 is in contact with a fourth electrical connecting surface 7-322A of the second circuit unit 7-320. The third electrical connecting surface 7-321A is situated on a third virtual plane 7-P3, and the fourth electrical connecting surface 7-322A is situated on a fourth virtual plane 7-P4. The third virtual plane 7-P3 is parallel to the fourth virtual plane 7-P4. Since the shortest distance between the first fixed portion connecting point 7-412 and the lateral wall 7-112 on the first side 7-101 is less than the shortest distance between the second fixed portion connecting point 7-422 and the lateral wall 7-112 on the first side 7-101, a gap between the third virtual plane 7-31 and the fourth virtual plane 7-P4 is greater than zero.

As shown in FIG. 60, since the distance between the elastic deformable portion 7-311 and the top wall 7-111 is less than the distance between the elastic deformable portion 7-321 and the top wall 7-111, the first driving unit 7-410 is inclined from the top wall 7-111 to the base 7-120. The extending direction of the first driving unit 7-410 (the first direction) is not perpendicular and not parallel to the main axis 7-AX1. Similarly, since the distance between the elastic deformable portion 7-312 and the top wall 7-111 is greater than the distance between the elastic deformable portion 7-322 and the top wall 7-111, the second driving unit 7-420 is inclined from the base 7-120 to the top wall 7-111. The extending direction of the second driving unit 7-420 (the second direction) is not perpendicular and not parallel to the main axis 7-AX1, and the extending direction of the first driving unit 7-410 is not parallel to the extending direction of the second driving unit 7-420.

As shown in FIG. 59, in this embodiment, the distance between the first movable portion connecting point 7-411 and the second movable portion connecting point 7-421 is substantially the same as the distance between the first fixed portion connecting point 7-412 and the second fixed portion connecting point 7-422, and the shortest distance between the first movable portion connecting point 7-411 and the lateral wall 7-112 on the first side 7-101 is greater than the shortest distance between the shortest distance between the first fixed portion connecting point 7-412 and the lateral wall 7-112 on the first side 7-101. Thus, as seen from the main axis 7-AX1, the first driving unit 7-410 and the second driving unit 7-420 are parallel to each other, and are not parallel to the lateral wall 7-112, the first virtual plane 7-P1, the second virtual plane 7-P2, the third virtual plane 7-P3, and the fourth virtual plane 7-P4. In some embodiments, the first driving unit 7-410 and the second driving unit 7-420 can be parallel to the lateral wall 7-112.

It should be noted that, the lengths of the first driving unit 7-410 and the second driving unit 7-420 can be greater than the lengths shown in figures. The first driving unit 7-410 and the second driving unit 7-420 in the figures are in the state that they contract but do not drive the movable portion 7-200 to move.

In this embodiment, both the upper section 7-323 and the lower section 7-324 of the second circuit unit 7-320 are extended downwardly to connect an external circuit, so that the upper section 7-323 overlaps the lower section 7-324 as seen from a direction parallel to the third virtual plane 7-P3.

Referring to FIG. 58 to FIG. 60, at the second side 7-102, one first circuit unit 7-310, one second circuit unit 7-320, and one second driving member 7-402 are disposed. The first circuit unit 7-310 at the second side 7-102 is affixed to the movable portion 7-200 at the third corner 7-C3, and second circuit unit 7-320 at the second side 7-102 is affixed to the fixed member 7-130. The arrangements and the structures of the first circuit unit 7-310 and the second circuit unit 7-320 at the second side 7-102 are the same as that at the first side 7-101, so that the features thereof are not repeated in the interest of brevity.

The third driving unit 7-430 is a shape memory alloy having a longitudinal structure, and includes a third movable portion connecting point 7-431 and a third fixed portion connecting point 7-432. The third movable portion connecting point 7-431 and the third fixed portion connecting point 7-432 are respectively affixed to the elastic deformable portion 7-311 of the first circuit unit 7-310 and the elastic deformable portion 7-321 of the second circuit unit 7-320 at the second side 7-102. The fourth driving unit 7-440 is a shape memory alloy having a longitudinal structure too, and includes a fourth movable portion connecting point 7-441 and a fourth fixed portion connecting point 7-442. The fourth movable portion connecting point 7-441 and the fourth fixed portion connecting point 7-442 are respectively affixed to the elastic deformable portion 7-312 of the first circuit unit 7-310 and the elastic deformable portion 7-322 of the second circuit unit 7-320 at the second side 7-102. Since the structures and the arrangements of the third driving unit 7-430 and the fourth driving unit 7-440 are the same as that of the first driving unit 7-410 and the second driving unit 7-420, so that the extending direction of the third driving unit 7-430 (the sixth direction) is not parallel to the extending direction of the fourth driving unit 7-440 (the seventh direction).

At the third side 7-103, one first circuit unit 7-310, one second circuit unit 7-320, and one first driving member 7-401 are disposed. The arrangement of the first circuit unit 7-310, the second circuit unit 7-320, and the first driving member 7-401 at the third side 7-103 and the arrangement of the first circuit unit 7-310, the second circuit unit 7-320, and the first driving member 7-401 at the first side 7-101 are rotational symmetric relative to the main axis 7-AX1, so that the features thereof are not repeated in the interest of brevity. At the fourth side 7-104, one first circuit unit 7-310, one second circuit unit 7-320, and one second driving member 7-402 are disposed. The arrangement of the first circuit unit 7-310, the second circuit unit 7-320, and the second driving member 7-402 at the fourth side 7-104 and the arrangement of the first circuit unit 7-310, the second circuit unit 7-320, and the second driving member 7-402 at the second side 7-102 are rotational symmetric relative to the main axis 7-AX1, so that the features thereof are not repeated in the interest of brevity.

Referring to FIG. 58 to FIG. 60, the third circuit unit 7-330 of the circuit assembly 7-300 can be one or more sheet metal springs, and can be disposed between the movable portion 7-200 and the base 7-120. Thus, when the driving assembly 7-400 does not drive the movable portion 7-200 to move, the third circuit unit 7-330 can provide elastic force to support the movable portion 7-200. The fourth circuit unit 7-340 of the circuit assembly 7-300 can be one or more wires embedded in the base 7-120, and can be affixed to the third circuit unit 7-330 by welding or using conductive glue. Thus, the fourth circuit unit 7-340 can be electrically connected to the first driving unit 7-410, the second driving unit 7-420, the third driving unit 7-430, or the fourth driving unit 7-440 via the third circuit unit 7-330. The fifth circuit unit 7-350 of the circuit assembly 7-300 can be one or more wires embedded in the movable portion 7-200, and can be affixed to the first circuit unit 7-310 by welding or using conductive glue. The third circuit unit 7-330 can also be affixed to the fifth circuit unit 7-350 by welding or using conductive glue. Thus, the third circuit unit 7-330 can be electrically connected to the first driving unit 7-410, the second driving unit 7-420, the third driving unit 7-430, or the fourth driving unit 7-440 via the fifth circuit unit 7-350. In some embodiments, the third circuit unit 7-330 can be directly affixed to the first circuit unit 7-310 by welding or using conductive glue.

When the user desires to use the driving assembly 7-400 to drive the movable portion 7-200 to move relative to the fixed portion 7-100 toward the base 7-120, current can flow through the first driving units 7-410 and the third driving units 7-430. When current flows through the first driving units 7-410 and the third driving units 7-430, they contract and pull the movable portion 7-200, and the movable portion 7-200 moves along the main axis 7-AX1 toward the base 7-120.

When the user desires to use the driving assembly 7-400 to drive the movable portion 7-200 to move relative to the fixed portion 7-100 toward the top wall 7-111, current can flow through the second driving units 7-420 and the fourth driving units 7-440. When current flows through the second driving units 7-420 and the fourth driving units 7-440, they contract and pull the movable portion 7-200, and the movable portion 7-200 moves along the main axis 7-AX1 toward the top wall 7-111.

It should be noted that, since the elastic deformable portions 7-311, 7-312, 7-21, and 7-322 are plastic deformable, they can disperse the impact when the first driving units 7-410, the second driving units 7-420, the third driving units 7-430, and the fourth driving units 7-440 contract, and the damage of the members can be avoided.

In this embodiment, the driving assembly 7-400 is disposed around the fixed portion 7-100 in a rotational symmetric manner, and the fixed portion 7-100 includes the guiding slot 7-131, so that the driving assembly 7-400 can drive the movable portion 7-200 to move relative to the fixed portion 7-100 in the first dimension (the Z-axis). In some embodiments, the driving assembly 7-400 can be disposed in an axial symmetric manner, and the guiding slot 7-131 can be omitted. In these embodiments, the driving assembly 7-400 can drive the movable portion 7-200 to move in a second dimension, wherein the second dimension is the rotation of the movable portion 7-200 around a rotation axis that is the main axis 7-AX1.

The position sensing assembly 7-500 includes two position sensing members 7-510 and two reference members 7-R. Two position sensing members 7-510 are disposed on the base 7-120 and respectively situated at the second corner 7-C2 and the third corner 7-C3. The reference members 7-R are disposed on the movable portion 7-200, and the positions of the reference members 7-R correspond to the position sensing members 7-510. The position sensing members 7-510 can measure the positions of the reference members 7-R, which are disposed on the movable portion 7-200, in the main axis 7-AX1, so as to detect the movement of the movable portion 7-200 relative to the fixed portion 7-100.

For example, each of the position sensing members 7-510 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, and each of the reference members 7-R can be a magnet.

In summary, an optical member driving mechanism is provided, including a movable portion, a fixed portion, a driving assembly, and a circuit assembly. The movable portion is configured to connect to an optical member. The driving assembly is configured to drive the movable portion to move relative to the fixed portion. The driving assembly is electrically connected to an external circuit via the circuit assembly. Owing to the structure of the aforementioned optical member driving mechanism, the driving assembly can provide a greater driving force on the movable portion, so that the optical member with more optical lenses can be used.

Figure 63:
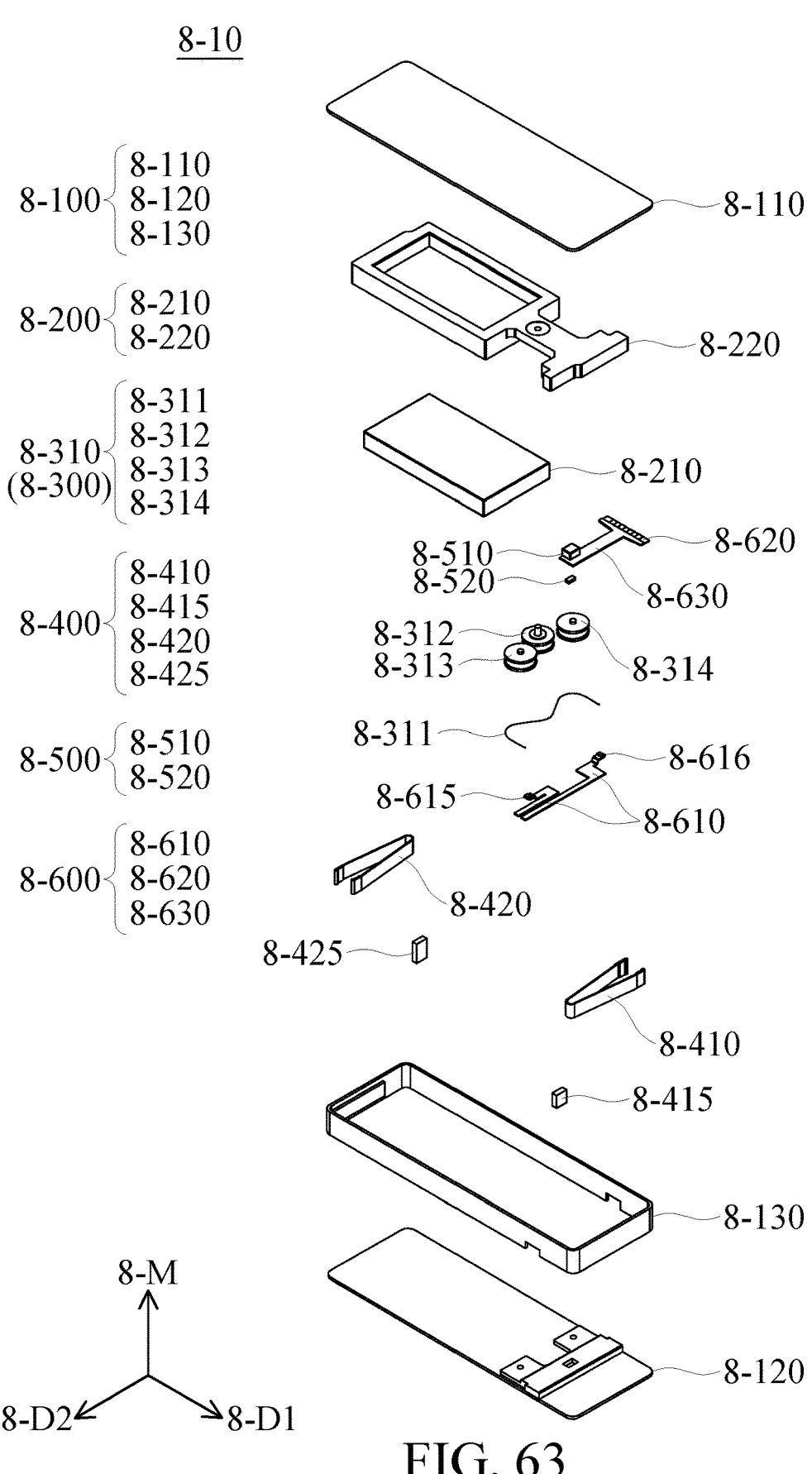
FIG. 63 is an exploded view of a haptic feedback module, according to some embodiments of the present disclosure.

Firstly, referring to FIG. 63, FIG. 63 is an exploded view of a haptic feedback module 8-10, according to some embodiments of the present disclosure. As shown in FIG. 63, the haptic feedback module 8-10 mainly includes a fixed portion 8-100, a movable portion 8-200, a driving mechanism 8-300, a supporting assembly 8-400, a position sensing assembly 8-500, and a circuit assembly 8-600.

In the embodiments shown in FIG. 63, the fixed portion 8-100 includes a top board 8-110, a bottom board 8-120, and a sidewall 8-130. The top board 8-110 and the bottom board 8-120 both have tabular structures. The top board 8-110 and the bottom board 8-120 are arranged along the main axis 8-M. The sidewall 8-130 extends along the main axis 8-M, surrounding the top board 8-110 and the bottom board 8-120. The sidewall 8-130 connects the top board 8-110 with the bottom board 8-120. In some embodiments of the present disclosure, the top board 8-110, the bottom board 8-120, and the sidewall 8-130 are generally rectangular.

The movable portion 8-200 includes a counterweight 8-210 and a holder 8-220. The counterweight 8-210 is held in the holder 8-220. The counterweight 8-210 and the holder 8-220 move relative to the fixed portion 8-100 together. In some embodiments, the counterweight 8-210 is made of metal that has a density greater than 10 g/cm$^3$, such as tungsten steel (which has a density of 14 g/cm$^3$). By using high-density materials, the weight of the movable portion 8-200 may be increased without increasing the volume of the haptic feedback module 8-10, thereby increasing the gravitational acceleration of the haptic feedback module 8-10 when it vibrates. As a result, the overall feedback effect is improved. In some embodiments, the holder 8-220 may be made of plastic, which is convenient for manufacturing.

The movable portion 8-200 is movably connected to the fixed portion 8-100 via the supporting assembly 8-400. The supporting assembly 8-400 includes a first resilient element 8-410 and a second resilient element 8-420. Both of the first resilient element 8-410 and the second resilient element 8-420 are flexible, have V-shaped structures, and made of metal. The first resilient element 8-410 and the second resilient element 8-420 are arranged in the first direction 8-D1 (see FIG. 64). The first resilient element 8-410 and the second resilient element 8-420 deform in the first direction 8-D1, the movable portion 8-200 may thus be able to move relative to the fixed portion 8-100 in the first direction 8-D1.

Figure 64:
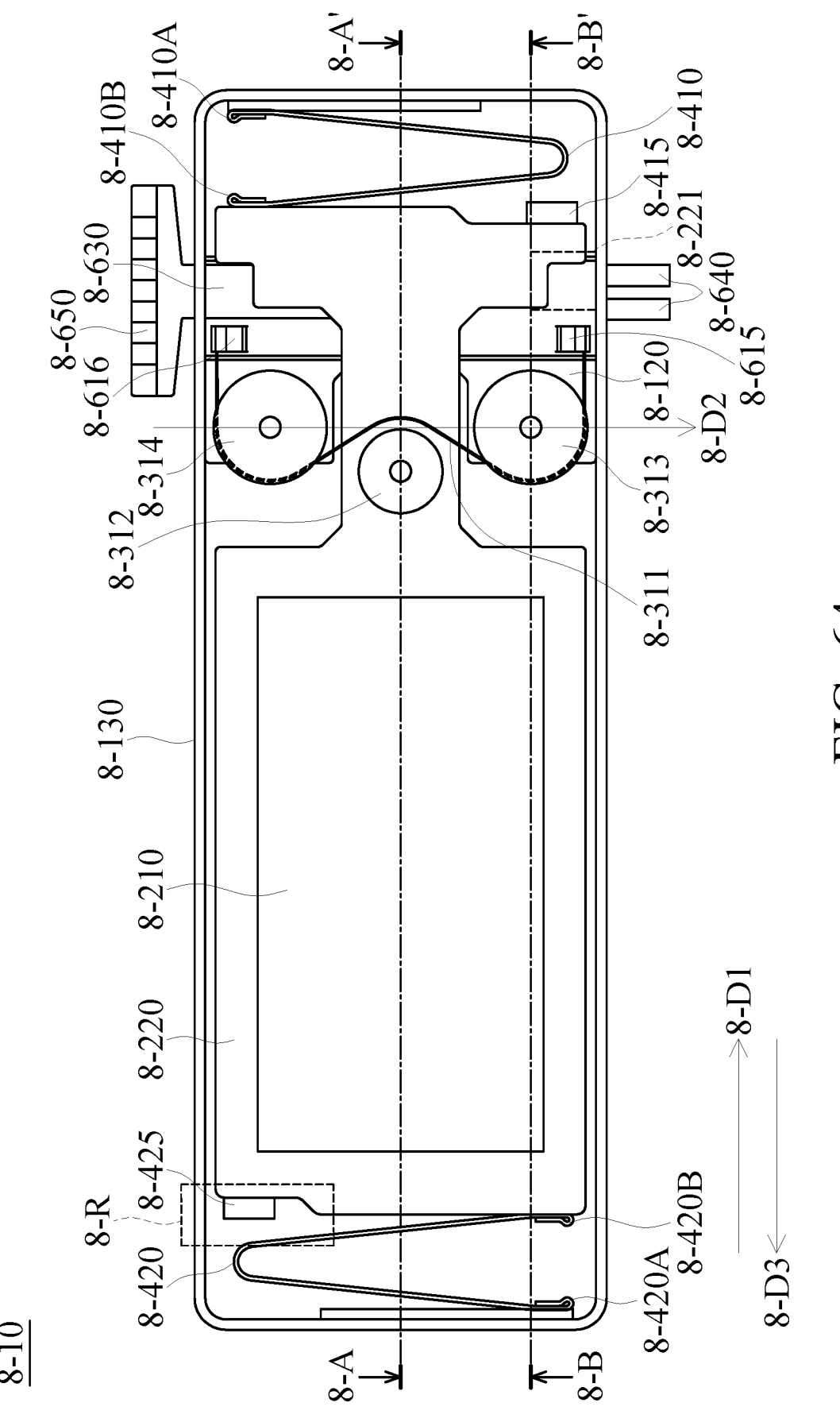
FIG. 64 is a top view of the haptic feedback module, according to some embodiments of the present disclosure. For illustrative purposes, the top board is omitted and not shown.

Referring to FIG. 64, FIG. 64 is a top view of the haptic feedback module 8-10, according to some embodiments of the present disclosure, wherein the top board 8-110 is omitted and not shown. In the embodiments shown in FIG. 64, the driving mechanism 8-300 includes a first driving assembly 8-310. The first driving assembly 8-310 drives the movable portion 8-200 to move relative to the fixed portion 8-100 in the first direction 8-D1. The first driving assembly 8-310 includes a first driving element 8-311, a first contact element 8-312, a first guidance element 8-313, and a second guidance element 8-314. The first contact element 8-312 is disposed on the movable portion 8-200, contacting the first driving element 8-311. The first guidance element 8-313 and the second guidance element 8-314 are both disposed on the fixed portion 8-100, contacting the first driving element 8-311. The first driving element 8-311 includes a shape memory alloy (SMA) and an insulated element. The insulated element covers the shape memory alloy. The insulated element is located between the shape memory alloy and the first contact element 8-312, between the shape memory alloy and the first guidance element 8-313, and between the shape memory alloy and the second guidance element 8-314. Since the first contact element 8-312, the first guidance element 8-313, and the second guidance element 8-314 are made of metal, short circuit between the first driving element 8-311 and the first contact element 8-312, the first guidance element 8-313, or the second guidance element 8-314 may be avoided by the disposal of the insulated element.

In the embodiments shown in FIG. 64, the first contact element 8-312 is located between the first guidance element 8-313 and the second guidance element 8-314 in the second direction 8-D2. The second direction 8-D2 is perpendicular to the first direction 8-D1. In addition, as shown in FIG. 64, the first contact element 8-312 and the first guidance element 8-313 are located on different sides of the first driving element 8-311, and the first guidance element 8-313 and the second guidance element 8-314 are located on the same side of the first driving element 8-311. By applying a driving signal (e.g. a current) to the first driving element 8-311, the shape memory alloy deforms (e.g. relatively shortens or elongates). When the shape memory alloy shortens, the first contact element 8-312 is moved away from the first guidance element 8-313 and the second guidance element 8-314 by the first driving element 8-311. In contrast, when the shape memory alloy elongates, the first contact element 8-312 is moved toward the first guidance element 8-313 and the second guidance element 8-314 by the resilience of the supporting assembly 8-400. By repeatedly shortening and elongating the shape memory alloy, the first contact element 8-312, along with the movable portion 8-200, moves back and forth in the first direction 8-D1, thereby producing a vibration.

To create a desirable vibration, the shape of the shape memory alloy must be able to change quickly. Using the shape memory alloy of the present disclosure, it is important for it to be cooled down quickly. Therefore, in the embodiments of the present disclosure, the first contact element 8-312, the first guidance element 8-313 and the second guidance element 8-314 that are in contact with the shape memory alloy of the first driving element 8-311 are made of metal, by which the heat generated by friction may be reduced, further improving the efficiency of heat removal.

Figure 65:
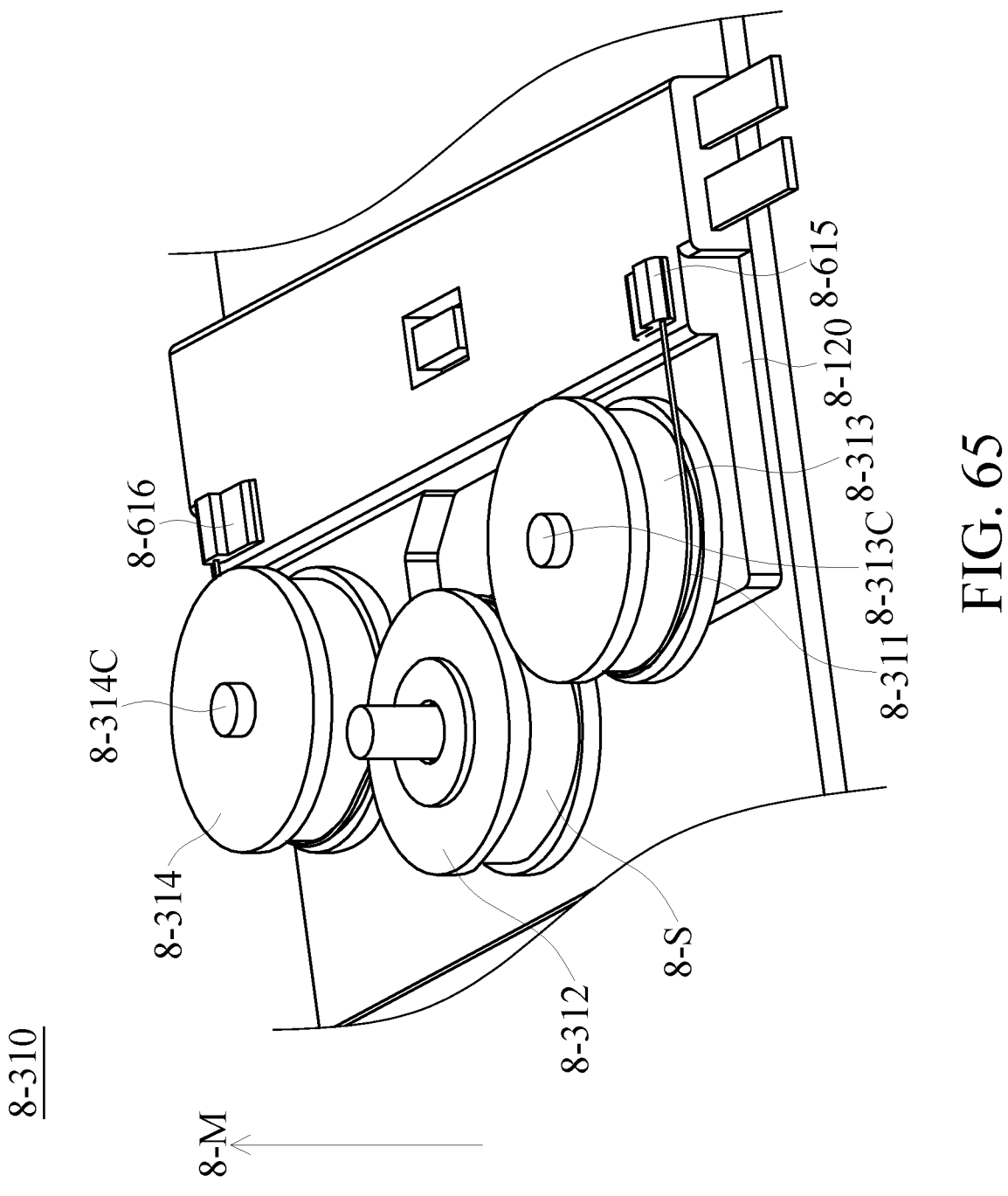
FIG. 65 is a perspective view of the first driving assembly, according to some embodiments of the present disclosure.

Next, referring to FIG. 65, FIG. 65 is a perspective view of the first driving assembly 8-310, according to some embodiments of the present disclosure. As shown in FIG. 65, the first driving assembly 8-310 further includes a first rotation shaft 8-313C and a second rotation shaft 8-314C. The first rotation shaft 8-313C and the second rotation shaft 8-314C are disposed parallel to the main axis 8-M. The first guidance element 8-313 may rotate about the first rotation shaft 8-313C, and the second guidance element 8-314 may rotate about the second rotation shaft 8-314C, so that when the shape memory alloy of the first driving element 8-311 deforms, the first guidance element 8-313 and the second guidance element 8-314 may move along with the first driving element 8-311, thereby reducing the friction therebetween, and improving the effect of heat removal. In some embodiments, the first contact element 8-312 may be fixedly disposed on the movable portion 8-200. That is, the first contact element 8-312 does not rotate while the first driving element 8-311 deforms. In some other embodiments, the first contact element 8-312 may rotate about the rotation shaft in the center relative to the movable portion 8-200. It should be noted that in some embodiments, the first guidance element 8-313 and the second guidance element 8-314 may be fixedly disposed on the fixed portion 8-100, while the first contact element 8-312 may rotate relative to the movable portion 8-200. In such cases, the friction therebetween may also be reduced. In some other embodiments, the first guidance element 8-313 and the second guidance element 8-314 may be fixedly disposed on the fixed portion 8-100, and the first contact element 8-312 may also be fixedly disposed on the movable portion 8-200.

As shown in FIG. 65, the first contact element 8-312, the first guidance element 8-313, and the second guidance element 8-314 may have recessed structures (e.g. the recessed structure 8-S) that correspond to the first driving element 8-311. As such, during operation, the first driving element 8-311 does not slide out of the first contact element 8-312, the first guidance element 8-313, and the second guidance element 8-314 due to its deformation. Therefore, the overall stability of the mechanism is improved.

Figures 66, 67:
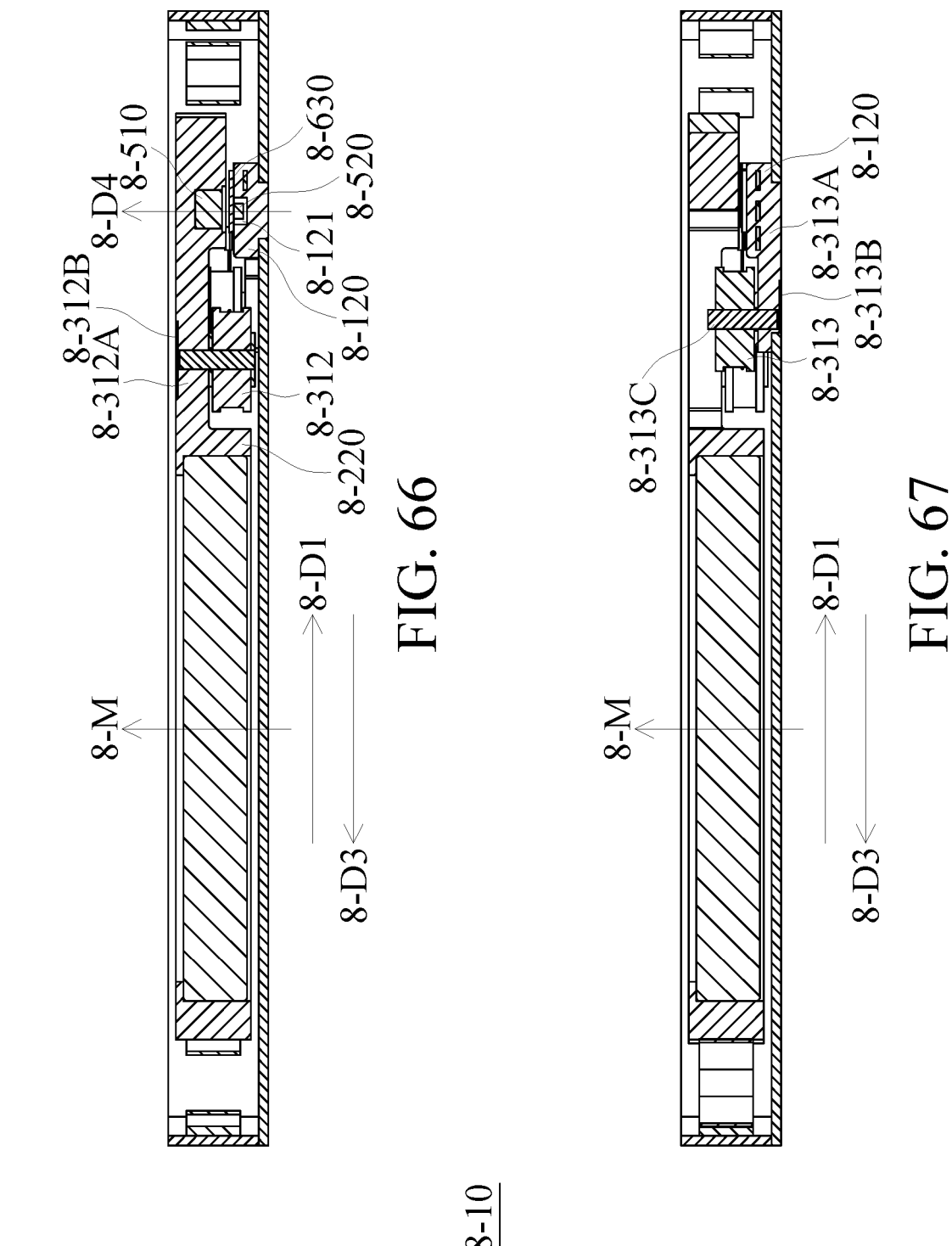
FIG. 66 is a cross-sectional view of the haptic feedback module along a line 8-A-8-A' in FIG. 64, according to some embodiments of the present disclosure.
FIG. 67 is a cross-sectional view of the haptic feedback module along a line 8-B-8-B' in FIG. 64, according to some embodiments of the present disclosure.

FIG. 66 is a cross-sectional view of the haptic feedback module 8-10 along a line 8-A-8-A' in FIG. 64, according to some embodiments of the present disclosure. As shown in FIG. 66, the first driving assembly 8-310 further includes a first base 8-312A and a first securing element 8-312B. In some embodiments, the first base 8-312A is made of plastic, and is integral with the holder 8-220 of the movable portion 8-200. The first contact element 8-312 is disposed on the first base 8-312A, connected to the first securing element 8-312B on the other side of the first base 8-312A. In other words, the first base 8-312A is located between the first contact element 8-312 and the first securing element 8-312B. At least a portion of the first contact element 8-312 (e.g. the end portion of the center shaft) is fixedly disposed (e.g. by soldering) at the first securing element 8-312B. The first securing element 8-312B is made of metal, and has a tabular structure for improving the overall structural strength.

FIG. 67 is a cross-sectional view of the haptic feedback module 8-10 along a line 8-B-8-B' in FIG. 64, according to some embodiments of the present disclosure. Similar to the disposal method of the first contact element 8-312 mentioned above, the first driving assembly 8-310 further includes a second base 8-313A and a second securing element 8-313B. In some embodiments, the second base 8-313A is made of plastic, and is integral with the bottom board 8-120 of the fixed portion 8-100. The first guidance element 8-313 is disposed on the second base 8-313A, connected to the second securing element 8-313B on the other side of the second base 8-313A. In other words, the second base 8-313A is located between the first guidance element 8-313 and the second securing element 8-313B. At least a portion of the first guidance element 8-313 (e.g. the end portion of the first rotation shaft 8-313C) is fixedly disposed (e.g. by soldering) at the second securing element 8-313B. The second securing element 8-313B is made of metal, and has a tabular structure for improving the overall structural strength. It should be noted that the disposal method for the second guidance element 8-314 may be the same as the method for first guidance element 8-313 that is mentioned above. For the purpose of simplicity and clarity, it is not repeated here.

Referring to FIG. 66 again, the position sensing assembly 8-500 of the haptic feedback module 8-10 includes a reference object 8-510 and a position sensing element 8-520. In some embodiments of the present disclosure, the reference object 8-510 is disposed in the holder 8-220 of the movable portion 8-200, and the position sensing element 8-520 is disposed in the bottom board 8-120 of the fixed portion 8-100. As shown in FIG. 66, the bottom board 8-120 may have a cavity 8-121 for receiving the position sensing element 8-520. In some embodiments, in the fourth direction 8-D4 that is parallel to the main axis 8-M, the largest dimension of the cavity 8-121 is greater than the largest dimension of the position sensing element 8-520. As such, the position sensing element 8-520 may not protrude from the bottom board 8-120, thereby avoiding collision with other components and therefore the undesirable interferences. The position of the reference object 8-510 corresponds to the position sensing element 8-520. For example, the reference object 8-510 and the position sensing element 8-520 are arranged in the fourth direction 8-D4 (as shown in FIG. 66). The reference object 8-510 may be made of magnetic materials, such as magnets. The position sensing element 8-520 directly or indirectly senses the movement of the movable portion 8-200 relative to the fixed portion 8-100 by sensing position of the reference object 8-510. The position sensing element 8-520 may be, for example, a Hall sensor, a MR sensor, a fluxgate, an optical position sensor, an optical encoder, or the like. The position sensing element 8-520 detects the amount of displacement of the movable portion 8-200.

Referring to FIGS. 63-64, the circuit assembly 8-600 of the haptic feedback module 8-10 includes a first circuit 8-610, a second circuit 8-620, a substrate 8-630 a first exterior connecting portion 8-640, and a second exterior connecting portion 8-650. The first circuit 8-610 is embedded in the bottom board 8-120 of the fixed portion 8-100. As such, other than the first connection point 8-615 and the second connection point 8-616 that are for electrical connection, the first circuit 8-610 is not exposed from the bottom board 8-120 (as shown in FIG. 64). The first circuit 8-610 is electrically connected to the first exterior connecting portion 8-640. The first circuit 8-610 is electrically connected to an external circuit (e.g. a control module, etc.) via the first exterior connecting portion 8-640. In addition, the first connection point 8-615 and the second connection point 8-616 of the first circuit 8-610 are electrically connected to the two ends of the first driving element 8-311, respectively. The driving signal received from the external circuit is then transmitted to the first driving element 8-311, so that the first driving element 8-311 may deform according to the driving signal. As shown in FIG. 64, in some embodiments, the holder 8-220 may have an avoidance portion 8-221 that has a recessed structure, and corresponds to the first connection point 8-615 and the second connection point 8-616. The avoidance portion 8-221 prevents the holder 8-220 from colliding with the first connection point 8-615 and the second connection point 8-616 and therefore the undesirable interferences during movement. As a result, the stability of the mechanism may be improved.

The second circuit 8-620 is disposed in the substrate 8-630 that is disposed on the bottom board 8-120 of the fixed portion 8-100. The substrate 8-630 is made of a non-conductive material, and has a tabular structure, preventing the second circuit 8-620 from external interference. The second circuit 8-620 is electrically connected to the second exterior connecting portion 8-650. The second circuit 8-620 is electrically connected to an external circuit (e.g. a control module, etc.) via the second exterior connecting portion 8-650. The second circuit 8-620 is also electrically connected to the position sensing element 8-520, providing electricity to the position sensing element 8-520 for it to perform the sensing functions, and transmitting the sensing result to the external circuit. In addition, referring to FIG. 66, when viewed in the fourth direction 8-D4, the substrate 8-630 is at least partially located between the reference object 8-510 and the position sensing element 8-520. It is advantageous for the second circuit 8-620 to be electrically connected to the position sensing element 8-520, and it is also advantageous for miniaturization.

As shown in FIG. 64, when viewed along the main axis 8-M, the first connection point 8-615 and the second connection point 8-616 of the first circuit 8-610 are located on two sides of the substrate 8-630, which is advantageous for the connection with the first driving element 8-311. In addition, when viewed along the main axis 8-M, the first exterior connecting portion 8-640 and the second exterior connecting portion 8-650 are also located on two sides of the substrate 8-630. As such, the connected external circuit may be disposed separately, and the space (e.g. the space inside the electronic device) may be utilized effectively. It should be understood that in some other embodiments, the first connection point 8-615 and the second connection point 8-616 may be located on the same side of the substrate 8-630, the first exterior connecting portion 8-640 and the second exterior connecting portion 8-650 may be located on the same side of the substrate 8-630 as well.

Still referring to FIG. 64, the first resilient element 8-410 and the second resilient element 8-420 of the supporting assembly 8-400 of the haptic feedback module 8-10 respectively connect the fixed portion 8-100 with the movable portion 8-200. As shown in FIG. 64, the first resilient element 8-410 and the second resilient element 8-420 are located on different sides of the movable portion 8-200. The first resilient element 8-410 is affixed to the fixed portion 8-100 at a first fixed point 8-410A, and is affixed to the movable portion 8-200 at a second fixed point 8-410B; the second resilient element 8-420 is affixed to the fixed portion 8-100 at a third fixed point 8-420A, and is affixed to the movable portion 8-200 at a fourth fixed point 8-420B. When viewed in the first direction 8-D1, there is a distance between the first fixed point 8-410A and the third fixed point 8-420A, and there is a distance between the second fixed point 8-410B and the fourth fixed point 8-420B. In other words, when viewed in the first direction 8-D1, the first fixed point 8-410A does not overlap the third fixed point 8-420A, and the second fixed point 8-410B does not overlap the fourth fixed point 8-420B. The first resilient element 8-410 and the second resilient element 8-420 with V-shaped structures are disposed opposite from each other. That is, the openings of the "Vs" are facing different directions. As such, the resilience from the supporting assembly 8-400 received by the movable portion 8-200 is balanced, avoiding displacement or rotation caused by forces applied on the same side.

The supporting assembly 8-400 further includes a first damping element 8-415 and a second damping element 8-425. The first damping element 8-415 and the second damping element 8-425 are disposed on the fixed portion 8-100 or on the movable portion 8-200. In the embodiments shown in FIG. 64, the first damping element 8-415 and the second damping element 8-425 are disposed on the movable portion 8-200. In some embodiments, the movable portion 8-200 has a receiving portion 8-R that has a recessed structure for accommodating the damping elements. The first damping element 8-415 and the second damping element 8-425 are located on different sides of the movable portion 8-200, corresponding to the first resilient element 8-410 and the second resilient element 8-420, respectively. In the embodiments shown in FIG. 64, since the first resilient element 8-410 and the second resilient element 8-420 are disposed opposite from each other, there is a distance between the first damping element 8-415 and the second damping element 8-425 when viewed in the first direction 8-D1. That is, the first damping element 8-415 does not overlap the second damping element 8-425. In some other embodiments, the first damping element 8-415 and the second damping element 8-425 may be located at any suitable positions. The first damping element 8-415 and the second damping element 8-425 may be made of shock absorbing materials for reducing the impact from the first resilient element 8-410 and the second resilient element 8-420 to the fixed portion 8-100 or the movable portion 8-200.

It is noted that, according to some embodiments of the present disclosure, the driving mechanism 8-300 of the haptic feedback module 8-10 may further include a second driving assembly (not shown). The second driving assembly may have the same constitution as the first driving assembly 8-310 (e.g. including a driving element, a contact element, and two guidance elements). The second driving assembly may be disposed, symmetrical with the first driving assembly 8-310, on the other side of the haptic feedback module 8-10. The first driving assembly 8-310 and the second driving assembly may be arranged in the first direction 8-D1. When viewed along the main axis 8-M, the movable portion 8-200 is located between the first driving assembly 8-310 and the second driving assembly. The second driving assembly may drive the movable portion 8-200 to move relative to the fixed portion 8-100 in the third direction 8-D3 that is parallel to and opposite from the first direction 8-D1. By disposing the second driving assembly, the amplitude of vibration or the efficiency of the movable portion 8-200 may be increased, creating a desirable vibration.

According to some embodiments of the present disclosure, the natural resonance frequency of the movable portion 8-200 moving relative to the fixed portion 8-100 is between 50 Hz and 400 Hz. Preferably, the natural resonance frequency is between 100 Hz and 200 Hz. More specifically, the natural resonance frequency of the movable portion 8-200 moving relative to the fixed portion 8-100 may be about 100 Hz.

In summary, the haptic feedback module 8-10 of the present disclosure provides a possibility where the volume of the driving mechanism 8-300 may be reduced, the volume of the movable portion 8-200 may be increased, and thereby the weight of the movable portion 8-200 may be increased. By using the shape memory alloy (SMA) as its drive source, the haptic feedback module 8-10 of the present disclosure may actuate the movable portion 8-200 to achieve the same or even better vibration feedback effect than the conventional linear resonant actuators. The miniaturization of the driving mechanism 8-300 may reduce the required configuration space inside electronic devices, which is helpful for the overall miniaturization of electronic devices.

Figure 68:
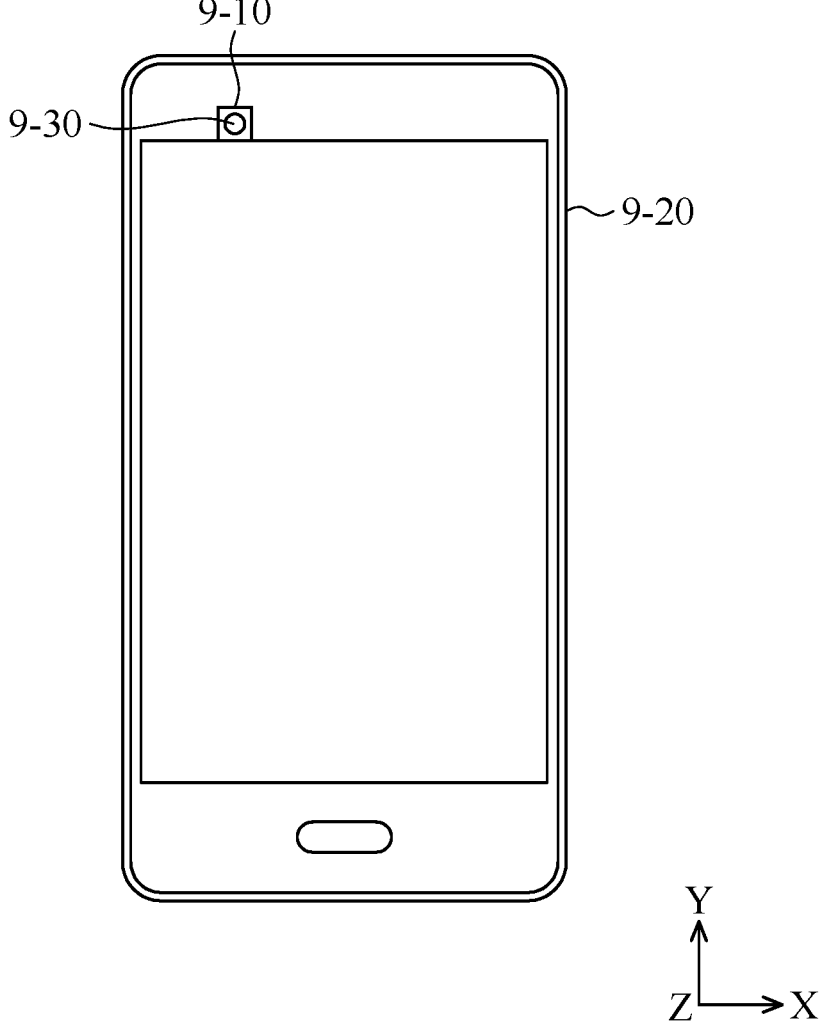
FIG. 68 is a schematic diagram of an electronic device according to an embodiment of the invention.

Referring to FIG. 68, in an embodiment of the invention, an optical member driving mechanism 9-10 can be disposed in an electronic device 9-20 and used to hold and drive an optical member 9-30, so that the optical member 9-30 can move relative to an image sensor (not shown) in the electronic device 9-20, and the purpose of focus and/or zoom can be achieved. For example, the electronic device 9-20 can be a smartphone, a laptop computer, or a digital camera, and the optical member 9-30 can be a lens.

Figure 69:
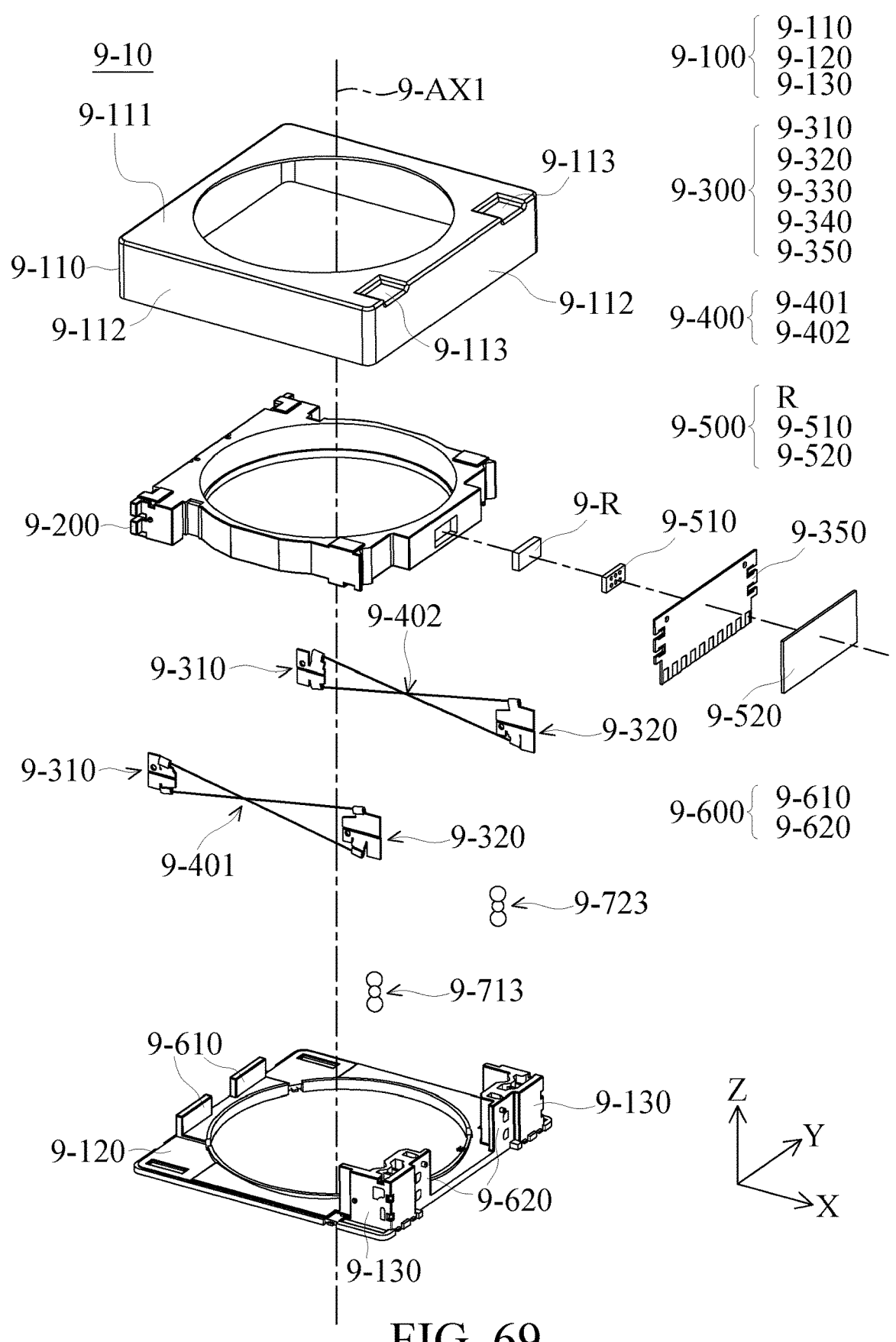
FIG. 69 is an exploded-view diagram of an optical member driving mechanism according to an embodiment of the invention.
Figure 70:
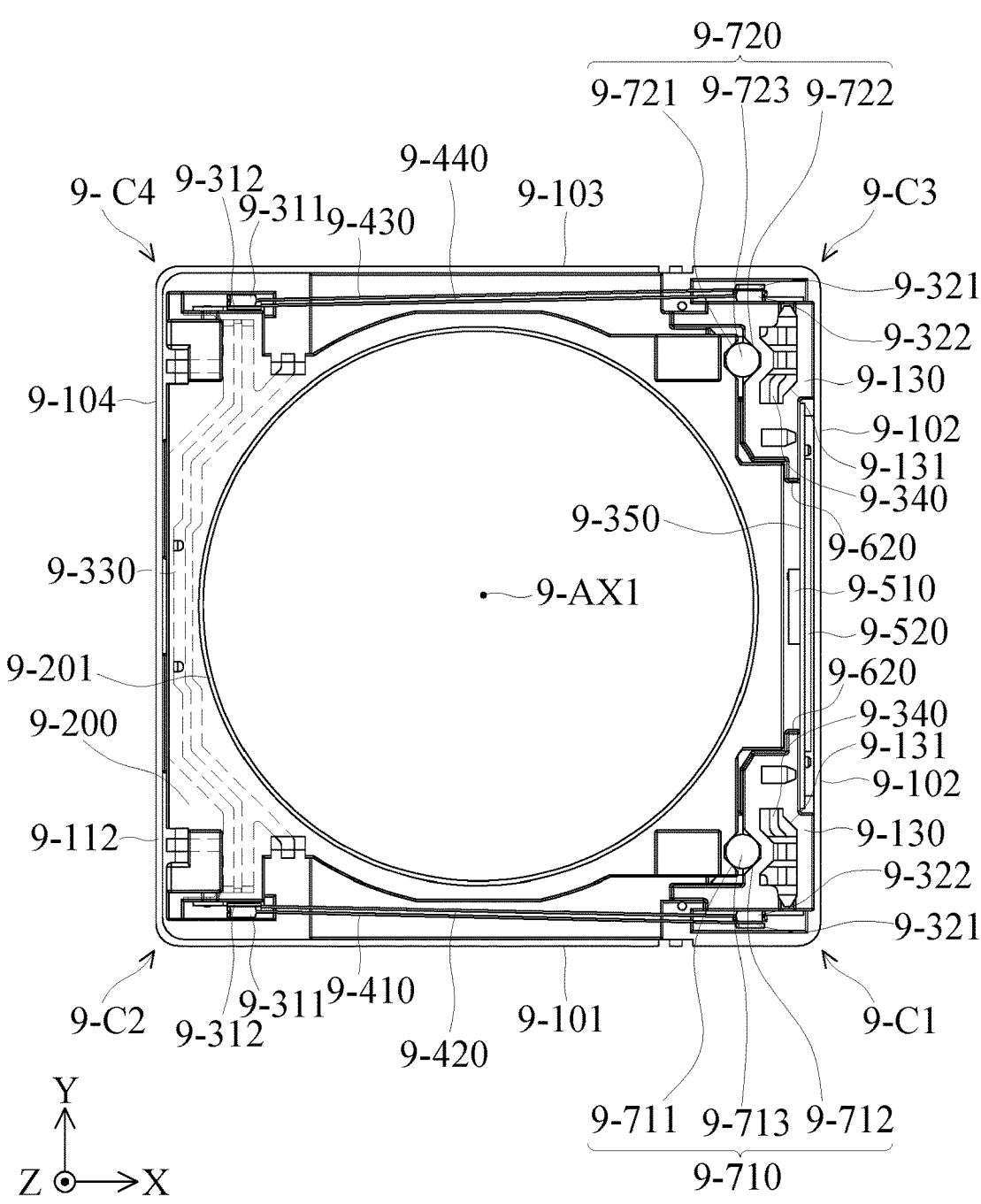
FIG. 70 is a cross-sectional view of the optical member driving mechanism according to an embodiment of the invention.

FIG. 69 is an exploded-view diagram of the aforementioned optical member driving mechanism 9-10, and FIG. 70 is a cross-sectional view of the optical member driving mechanism 9-10. As shown in FIG. 69 and FIG. 70, the optical member driving mechanism 9-10 primarily includes a fixed portion 9-100, a movable portion 9-200, a circuit assembly 9-300, a driving assembly 9-400, and a position sensing assembly 9-500.

The fixed portion 9-100 includes a frame 9-110, a base 9-120, and two fixed members 9-130. The frame 9-110 and the base 9-120 are arranged along the main axis 9-AX1 of the optical member driving mechanism 9-10 and engaged with each other to form a hollow box. The movable portion

9-200, the circuit assembly 9-300, the driving assembly 9-400, and the fixed members 9-130 are accommodated in the hollow box. The main axis 9-AX1 is parallel to the optical axis of the optical member 9-30 (in the figures, the main axis 9-AX1 is parallel to the Z-axis).

The frame 9-110 has a top wall 9-111 and a plurality of lateral walls 9-112. The top wall 9-111 is perpendicular to the main axis 9-AX1, and the lateral walls 9-112 are extended from the edge of the top wall 9-111 along the main axis 9-AX1. As seen from the main axis 9-AX1, the fixed portion 9-100 includes a polygonal structure (a rectangular structure in this embodiment, for example), and has a first side 9-101, a second side 9-102, a third side 9-103, and a fourth side 9-104. A first corner 9-C1 is formed at the connection point between the first side 9-101 and the second side 9-102, a second corner 9-C2 is formed at the connection point between the first side 9-101 and the fourth side 9-104, a third corner 9-C3 is formed at the connection point between the second side 9-102 and the third side 9-103, and a fourth corner 9-C4 is formed at the connection point between the third side 9-103 and the fourth side 9-104.

In this embodiment, the main axis 9-AX1 is disposed between the first side 9-101 and the third side 9-103, and between the second side 9-102 and the fourth side 9-104. Furthermore, the first side 9-101 is parallel to the third side 9-103, and the second side 9-102 is parallel to the fourth side 9-104. The connection line between the first corner 9-C1 and the third corner 9-C3 coincides or is parallel to the second side 9-102.

The fixed member 9-130 is affixed to the base 9-120. In this embodiment, two fixed members 9-130 are respectively disposed on the first corner 9-C1 and the third corner 9-C3, and these fixed members 9-130 and the base 9-120 are integrally formed as one piece. In some embodiments, the fixed members 9-130 can be affixed to the frame 9-110, and the fixed members 9-130 and the frame 9-110 can be integrally formed as one piece.

In this embodiment, the base 9-120 has a plate structure, and the main axis 9-AX1 is perpendicular to the base 9-120. A stopping assembly 9-600 can be disposed on the base 9-120, so as to restrict the moving range of the movable portion 9-200. In detail, the stopping assembly 9-600 includes at least one first stopping member 9-610 and at least one second stopping member 9-620. The first stopping member 9-610 is disposed on the fourth side 9-104, the second stopping member 9-620 is disposed on the second side 9-102, and both the first stopping member 9-610 and the second stopping member 9-620 extend toward the top wall 9-111 along the main axis 9-AX1. Since the first stopping member 9-610 and the second stopping member 9-620 are respectively configured to restrict the movement of the movable portion 9-200 in the Z-axis (the first direction) and the X-axis (the second direction), the first stopping member 9-610 is disposed between the movable portion 9-200 and the base 9-120, and the second stopping member 9-620 is disposed on a side of the movable portion 9-200. Therefore, in the direction parallel to the main axis 9-AX1, the dimensions (the thickness) of the first stopping member 9-610 are less than that of the second stopping member 9-620.

The movable portion 9-200 can be an optical member holder, and the optical member 9-30 can be affixed to a through hole 9-201 of the optical member holder. At the boundary between the movable portion 9-200 and the fixed members 9-130, at least one guiding assemblies can be disposed to guide the movable portion 9-200 to move relative to the fixed portion 9-100 in a predetermined dimension (such as along the main axis 9-AX1). For example, in this embodiment, a first guiding assembly 9-710 is disposed between the fixed member 9-130 at the first corner 9-C1 and the movable portion 9-200, and a second guiding assembly 9-720 is disposed between the fixed member 9-130 at the third corner 9-C3 and the movable portion 9-200.

The first guiding assembly 9-710 includes a first guiding structure 9-711, a second guiding structure 9-712, and an intermediary member 9-713. The first guiding structure 9-711 is a depression formed on the movable portion 9-200, and the appearance and the position of the first guiding structure 9-711 corresponds to the intermediary member 9-713. The second guiding structure 9-712 is a depression formed on the fixed member 9-130 at the first corner 9-C1, and the appearance and the position of the second guiding structure 9-712 also corresponds to the intermediary member 9-713. In this embodiment, the intermediary member 9-713 includes a plurality of balls stacked along the direction parallel to the main axis 9-AX1. When the optical member driving mechanism 9-10 is assembled, the intermediary member 9-713 is disposed between the first guiding structure 9-711 and the second guiding structure 9-712, and in contact with the walls thereof. Therefore, when the driving assembly 9-400 drives the movable portion 9-200 to move, the first guiding assembly 9-710 can guide the movable portion 9-200 to move in the predetermined dimension (i.e. along the main axis 9-AX1). Moreover, when the movable portion 9-200 moves, the intermediary member 9-713 rolls, slides, and moves relative to the movable portion 9-200 and/or the fixed portion 9-100, so that the debris caused by the friction can be reduced. In some embodiments, the intermediary member 9-713 can be a guiding pillar affixed to the fixed portion 9-100.

The second guiding assembly 9-720 includes a first guiding structure 9-721, a second guiding structure 9-722, and an intermediary member 9-723. The first guiding structure 9-721 is a depression formed on the movable portion 9-200, and the appearance and the position of the first guiding structure 9-721 corresponds to the intermediary member 9-723. The second guiding structure 9-722 is a depression formed on the fixed member 9-130 at the third corner 9-C3, and the appearance and the position of the second guiding structure 9-722 also corresponds to the intermediary member 9-723. In this embodiment, the intermediary member 9-723 includes a plurality of balls stacked along the direction parallel to the main axis 9-AX1. When the optical member driving mechanism 9-10 is assembled, the intermediary member 9-723 is disposed between the first guiding structure 9-721 and the second guiding structure 9-722, and in contact with the walls thereof. Therefore, when the driving assembly 9-400 drives the movable portion 9-200 to move, the second guiding assembly 9-720 can guide the movable portion 9-200 to move in the predetermined dimension (i.e. along the main axis 9-AX1). Moreover, when the movable portion 9-200 moves, the intermediary member 9-723 rolls, slides, and moves relative to the movable portion 9-200 and/or the fixed portion 9-100, so that the debris caused by the friction can be reduced. In some embodiments, the intermediary member 9-723 can be a guiding pillar affixed to the fixed portion 9-100.

As shown in FIG. 69, in this embodiment, a plurality of restricting structures 9-113 are formed on the top wall 9-111 of the frame 9-110. These restricting structures 9-113 extend toward the base 9-120 and protrude from the inner surface of the top wall 9-111. As seen from the main axis 9-AX1, the positions of the restricting structures 9-113 correspond to the intermediary member 9-713 and the intermediary member

9-723. Thus, the moving range of the intermediary member 9-713 in the Z-axis can be restricted by the restricting structures 9-113, and the intermediary member 9-713 can be prevented from leaving the position between the first guiding structure 9-711 and the second guiding structure 9-712. Similarly, the moving range of the intermediary member 9-723 in the Z-axis can be restricted by the restricting structures 9-113, and the intermediary member 9-723 can be prevented from leaving the position between the first guiding structure 9-721 and the second guiding structure 9-722.

Figure 71:
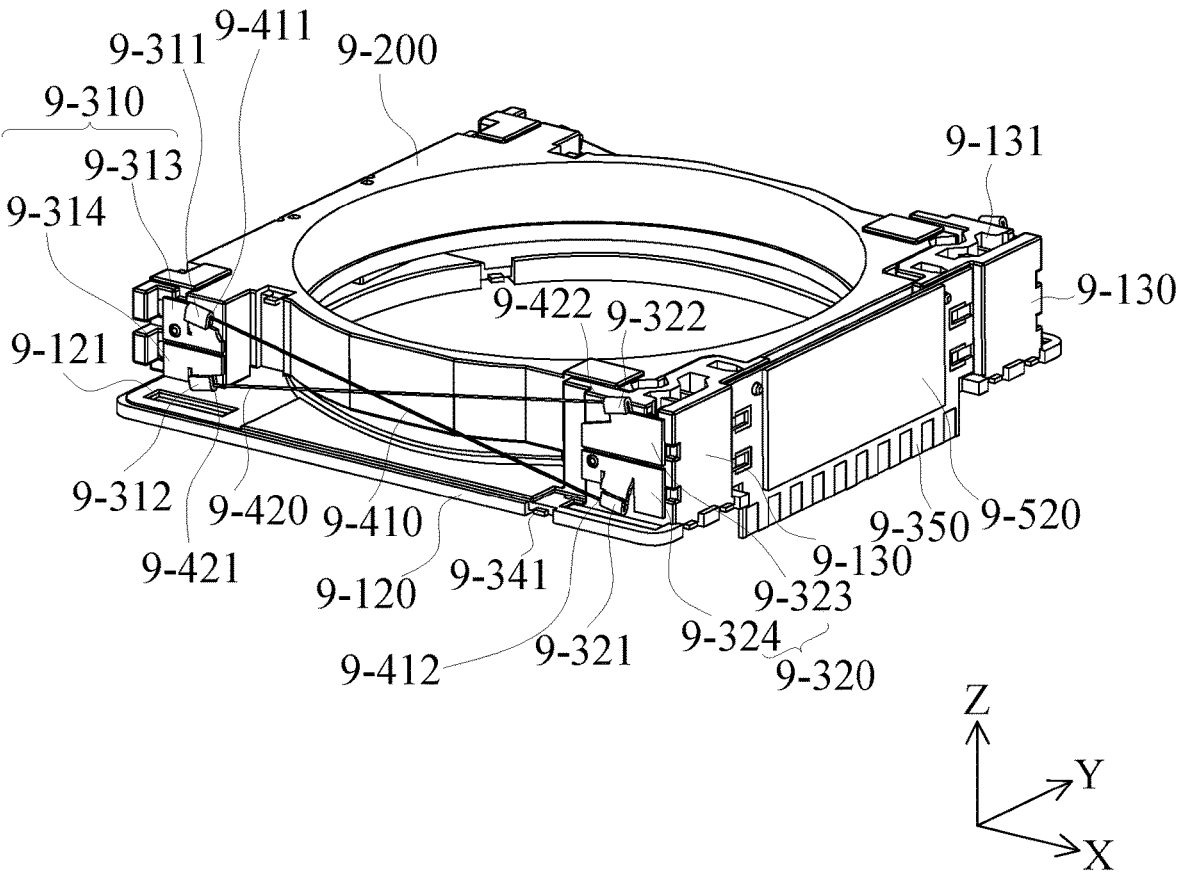
FIG. 71 is a schematic diagram of the optical member driving mechanism according to an embodiment of the invention, wherein the frame in omitted.
Figure 72:
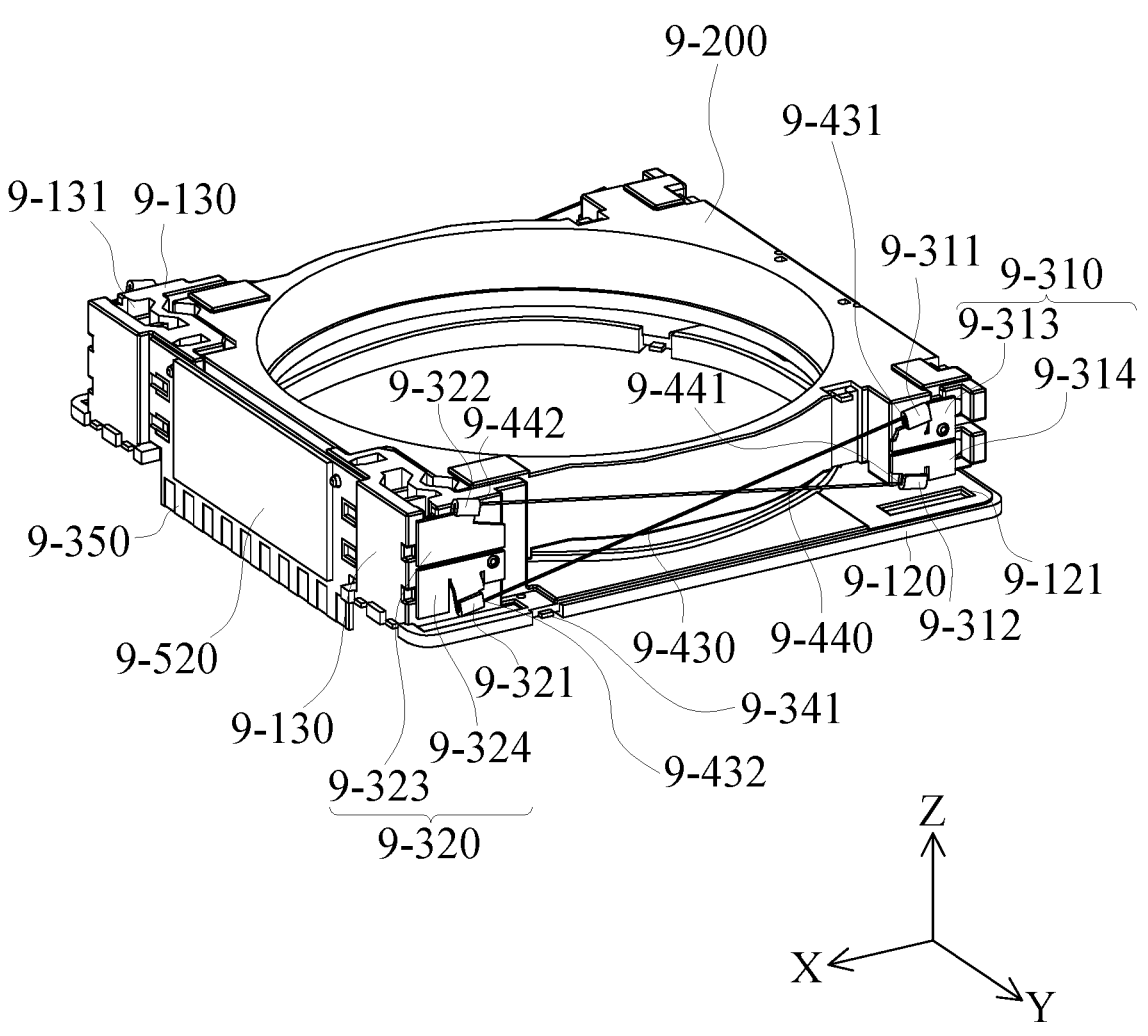
FIG. 72 is a schematic diagram of the optical member driving mechanism in another view according to an embodiment of the invention, wherein the frame in omitted.

FIG. 71 and FIG. 72 are schematic diagrams of the optical member driving mechanism 9-10, wherein the frame 9-110 is omitted. As shown in FIG. 69 to FIG. 72, the circuit assembly 9-300 includes two first circuit units 9-310, two second circuit units 9-320, at least one third circuit unit 9-330, at least one fourth circuit unit 9-340, and at least one fifth circuit unit 9-350. The driving assembly 9-400 includes a first driving member 9-401 and a second driving member 9-402.

At the first side 9-101, one first circuit unit 9-310, one second circuit unit 9-320, and the first driving member 9-401 are disposed. The first circuit unit 9-310 at the first side 9-101 is affixed to the movable portion 9-200 at the second corner 9-C2, and includes an elastic deformable portion 9-311 and an elastic deformable portion 9-312, wherein the elastic deformable portions 9-311 and 9-312 are plastic deformable. The first circuit unit 9-310 includes a plate structure, and can be divided into an upper section 9-313 and a lower section 9-314. The upper section 9-313 and the lower section 9-314 are electrically independent and separated from each other. The elastic deformable portion 9-311 and the elastic deformable portion 9-312 are respectively disposed on the upper section 9-313 and the lower section 9-314. Therefore, the distance between the elastic deformable portion 9-311 and the top wall 9-111 is less than the distance between the elastic deformable portion 9-312 and the top wall 9-111. Moreover, the distance between the elastic deformable portion 9-311 and the lateral wall 9-112 on the first side 9-101 is less than the distance between the elastic deformable portion 9-312 and the lateral wall 9-112 on the first side 9-101.

The second circuit unit 9-320 at the first side 9-101 is affixed to the fixed member 9-130 at the first corner 9-C1, and includes an elastic deformable portion 9-321 and an elastic deformable portion 9-322, wherein the elastic deformable portions 9-321 and 9-322 are plastic deformable. The second circuit unit 9-320 includes a plate structure, and can be divided into an upper section 9-323 and a lower section 9-324. The upper section 9-323 and the lower section 9-324 are electrically independent and separated from each other. The elastic deformable portion 9-321 and the elastic deformable portion 9-322 are respectively disposed on the lower section 9-324 and the upper section 9-323. Therefore, the distance between the elastic deformable portion 9-322 and the top wall 9-111 is less than the distance between the elastic deformable portion 9-321 and the top wall 9-111. Moreover, the distance between the elastic deformable portion 9-321 and the lateral wall 9-112 on the first side 9-101 is less than the distance between the elastic deformable portion 9-322 and the lateral wall 9-112 on the first side 9-101.

The first driving member 9-401 includes a first driving unit 9-410 and a second driving unit 9-420. The first driving unit 9-410 is a shape memory alloy (SMA) having a longitudinal structure, and includes a first movable portion connecting point 9-411 and a first fixed portion connecting point 9-412. The first movable portion connecting point 9-411 is affixed to the elastic deformable portion 9-311, and the first fixed portion connecting point 9-412 is affixed to elastic deformable portion 9-321. Since the distance between the elastic deformable portion 9-311 and the top wall 9-111 is less than the distance between the elastic deformable portion 9-321 and the top wall 9-111, the first driving unit 9-410 is inclined from the top wall 9-111 to the base 9-120.

The second driving unit 9-420 is a shape memory alloy (SMA) having a longitudinal structure too, and includes a second movable portion connecting point 9-421 and a second fixed portion connecting point 9-422. The second movable portion connecting point 9-421 is affixed to the elastic deformable portion 9-312, and the second fixed portion connecting point 9-422 is affixed to elastic deformable portion 9-322. Since the distance between the elastic deformable portion 9-312 and the top wall 9-111 is greater than the distance between the elastic deformable portion 9-322 and the top wall 9-111, the second driving unit 9-420 is inclined from the base 9-120 to the top wall 9-111. Therefore, the extending direction of the second driving unit 9-420 is not parallel to the extending direction of the first driving unit 9-410.

Since the distance between the elastic deformable portion 9-311 and the lateral wall 9-112 on the first side 9-101 is less than the distance between the elastic deformable portion 9-312 and the lateral wall 9-112 on the first side 9-101, and the distance between the elastic deformable portion 9-321 and the lateral wall 9-112 on the first side 9-101 is less than the distance between the elastic deformable portion 9-322 and the lateral wall 9-112 on the first side 9-101, the first driving unit 9-410 and the second driving unit 9-420 do not contact each, so that the short circuit can be avoided.

At the third side 9-103, another first circuit unit 9-310, another second circuit unit 9-320, and the second driving member 9-401 are disposed. The first circuit unit 9-310 at the third side 9-103 is affixed to the movable portion 9-200 at the third corner 9-C3, and includes an elastic deformable portion 9-311 and an elastic deformable portion 9-312, wherein the elastic deformable portions 9-311 and 9-312 are plastic deformable. The first circuit unit 9-310 includes a plate structure, and can be divided into an upper section 9-313 and a lower section 9-314. The upper section 9-313 and the lower section 9-314 are electrically independent and separated from each other. The elastic deformable portion 9-311 and the elastic deformable portion 9-312 are respectively disposed on the upper section 9-313 and the lower section 9-314. Therefore, the distance between the elastic deformable portion 9-311 and the top wall 9-111 is less than the distance between the elastic deformable portion 9-312 and the top wall 9-111. Moreover, the distance between the elastic deformable portion 9-311 and the lateral wall 9-112 on the third side 9-103 is less than the distance between the elastic deformable portion 9-312 and the lateral wall 9-112 on the third side 9-103.

The second circuit unit 9-320 at the third side 9-103 is affixed to the fixed member 9-130 at the third corner 9-C3, and includes an elastic deformable portion 9-321 and an elastic deformable portion 9-322, wherein the elastic deformable portions 9-321 and 9-322 are plastic deformable. The second circuit unit 9-320 includes a plate structure, and can be divided into an upper section 9-323 and a lower section 9-324. The upper section 9-323 and the lower section 9-324 are electrically independent and separated from each other. The elastic deformable portion 9-321 and the elastic deformable portion 9-322 are respectively disposed on the lower section 9-324 and the upper section 9-323. Therefore, the distance between the elastic deformable portion 9-322 and the top wall 9-111 is less than the distance between the elastic deformable portion 9-321 and the top wall 9-111. Moreover, the distance between the elastic deformable portion 9-321 and the lateral wall 9-112 on the third side 9-103 is less than the distance between the elastic deformable portion 9-322 and the lateral wall 9-112 on the third side 9-103.

The second driving member 9-402 includes a third driving unit 9-430 and a fourth driving unit 9-440. The third driving unit 9-430 is a shape memory alloy (SMA) having a longitudinal structure, and includes a third movable portion connecting point 9-431 and a third fixed portion connecting point 9-432. The third movable portion connecting point 9-431 is affixed to the elastic deformable portion 9-311, and the third fixed portion connecting point 9-412 is affixed to elastic deformable portion 9-321. Since the distance between the elastic deformable portion 9-311 and the top wall 9-111 is less than the distance between the elastic deformable portion 9-321 and the top wall 9-111, the third driving unit 9-430 is inclined from the top wall 9-111 to the base 9-120.

The fourth driving unit 9-440 is a shape memory alloy (SMA) having a longitudinal structure too, and includes a fourth movable portion connecting point 9-441 and a fourth fixed portion connecting point 9-442. The fourth movable portion connecting point 9-441 is affixed to the elastic deformable portion 9-312, and the fourth fixed portion connecting point 9-442 is affixed to elastic deformable portion 9-322. Since the distance between the elastic deformable portion 9-312 and the top wall 9-111 is greater than the distance between the elastic deformable portion 9-322 and the top wall 9-111, the fourth driving unit 9-440 is inclined from the base 9-120 to the top wall 9-111. Therefore, the extending direction of the fourth driving unit 9-440 is not parallel to the extending direction of the third driving unit 9-430.

Since the distance between the elastic deformable portion 9-311 and the lateral wall 9-112 on the third side 9-103 is less than the distance between the elastic deformable portion 9-312 and the lateral wall 9-112 on the third side 9-103, and the distance between the elastic deformable portion 9-321 and the lateral wall 9-112 on the third side 9-103 is less than the distance between the elastic deformable portion 9-322 and the lateral wall 9-112 on the third side 9-103, the first driving unit 9-410 and the second driving unit 9-420 do not contact each, so that the short circuit can be avoided.

When the user desires to use the driving assembly 9-400 to drive the movable portion 9-200 to move relative to the fixed portion 9-100 toward the base 9-120, current can flow through the first driving units 9-410 and the third driving units 9-430. When current flows through the first driving units 9-410 and the third driving units 9-430, they contract and pull the movable portion 9-200, and the movable portion 9-200 moves along the main axis 9-AX1 toward the base 9-120.

When the user desires to use the driving assembly 9-400 to drive the movable portion 9-200 to move relative to the fixed portion 9-100 toward the top wall 9-111, current can flow through the second driving units 9-420 and the fourth driving units 9-440. When current flows through the second driving units 9-420 and the fourth driving units 9-440, they contract and pull the movable portion 9-200, and the movable portion 9-200 moves along the main axis 9-AX1 toward the top wall 9-111.

In this embodiment, in order to prevent the elastic deformable portions 9-312 from impacting the base 9-120 when the movable portion 9-200 moves, a plurality of crashworthy portions 9-121 are formed on the base 9-120. Each of the crashworthy portions 9-121 has a depression structure. When the first driving unit 9-410 and the third driving unit 9-430 pull the movable portion 9-200 to move to a terminal position (i.e. the movable portion 9-200 moves a maximum distance which is restricted by the first stopping member 9-610), the elastic deformable portions 9-312 and the second and fourth movable portion connecting points 9-421 and 9-441 disposed thereon enter the depression structures. In other words, when the movable portion 9-200 is in the terminal position, the depression structures overlaps the second movable portion connecting point 9-421 and the fourth movable portion connecting point 9-441 as seen from the direction that is perpendicular to the main axis 9-AX1.

As shown in FIG. 70, the third circuit unit 9-330 of the circuit assembly 9-300 can be one or more wires embedded in the movable portion 9-200. One of the wires connects the upper section 9-313 of the first circuit unit 9-310 at the first side 9-101 to the upper section 9-313 of the first circuit unit 9-310 at the third side 9-103, and another one of the wires connects the lower section 9-314 of the first circuit unit 9-310 at the first side 9-101 to the lower section 9-314 of the first circuit unit 9-310 at the third side 9-103. Therefore, the first driving unit 9-410 and the third driving unit 9-430 are electrically connected to each other. When current flow through the first driving unit 9-410, this current also flows through the third driving unit 9-430. The second driving unit 9-420 and the fourth driving unit 9-440 are electrically connected to each other. When current flow through the second driving unit 9-420, this current also flows through the fourth driving unit 9-440.

The fourth circuit unit 9-340 of the circuit assembly 9-300 can be one or more wires embedded in the fixed portion 9-100. The fourth circuit unit 9-340 is electrically connected to the first circuit units 9-310, and has at least one contact 9-341 to electrically connect an external circuit. Specifically, in this embodiment, at least one recess 9-131 is formed on the fixed member 9-130, and at least a portion of the fourth circuit unit 9-340 is exposed from the recess 9-131. Therefore, the user can determine and position the fourth circuit unit 9-340 via the recess 9-131.

The fifth circuit unit 9-350 of the circuit assembly 9-300 can be a circuit board. The fifth circuit unit 9-350 is disposed on the second side 9-102 and affixed to the second stopping member 9-620. The distance between the first movable portion connecting point 9-411 and the fifth circuit unit 9-350 is greater than the distance between the first fixed portion connecting point 9-412 and the fifth circuit unit 9-350, and the distance between the third movable portion connecting point 9-431 and the fifth circuit unit 9-350 is greater than the distance between the third fixed portion connecting point 9-432 and the fifth circuit unit 9-350. Since the distance between the first fixed portion connecting point 9-412 and the lateral wall 9-112 on the first side 9-101 is less than the distance between the first movable portion connecting point 9-411 and the lateral wall 9-112 on the first side 9-101, and the distance between the third fixed portion connecting point 9-432 and the lateral wall 9-112 on the third side 9-103 is less than the distance between the third movable portion connecting point 9-431 and the lateral wall 9-112 on the third side 9-103, as seen from the main axis 9-AX1, the shortest distance between the first movable portion connecting point 9-411 and the third movable portion connecting point 9-431 is less than the shortest distance between the first fixed portion connecting point 9-412 and the third fixed portion connecting point 9-432, and the extending direction of the first driving unit 9-410 is not parallel to the extending direction of the third driving unit 9-430.

As shown in FIG. 69 and FIG. 70, the position sensing assembly 9-500 includes a reference member 9-R, a position sensing member 9-510, and a magnetic permeability member 9-520. The reference member 9-R and the position sensing member 9-510 are respectively disposed on the fixed portion 9-200 and the fifth circuit unit 9-350, and the position of the position sensing member 9-510 corresponds that of the reference member 9-R. The position sensing member 9-510 can be electrically connected to the fifth circuit unit 9-350, and can detect the position of the reference member 9-R, so that the movement of the movable portion 9-200 relative to the fixed portion 9-100 can be measured.

For example, the position sensing member 9-510 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, and each of the reference members 9-R can be a magnet.

The magnetic permeability member 9-520 is disposed on the fifth circuit unit 9-350, and the position of the magnetic permeability member 9-520 corresponds to that of the reference member 9-R. As seen from the main axis 9-AX1, the position sensing member 9-510 is disposed between the reference member 9-R and the magnetic permeability member 9-520, and the fifth circuit unit 9-350 is disposed between the position sensing member 9-510 and the magnetic permeability member 9-520. The magnetic permeability member 9-520 can include magnetic permeability material, so that the magnetic permeability member 9-520 and the reference member 9-R can generate a pushing force on the movable portion 9-200. Thus, the movable portion 9-200 can abut the fixed members 9-130 due to the pushing force. The direction of the pushing force is parallel to the X-axis, and is perpendicular to the main axis 9-AX1. The movable portion 9-200 can be positioned in a predetermined position by the pushing force.

Moreover, as shown in FIG. 70, in this embodiment, in the X-axis, the largest dimensions of the second stopping member 9-620 is greater than that of the position sensing member 9-510, so as to prevent the movable portion 9-200 from impacting the position sensing member 9-510.

Figure 73:
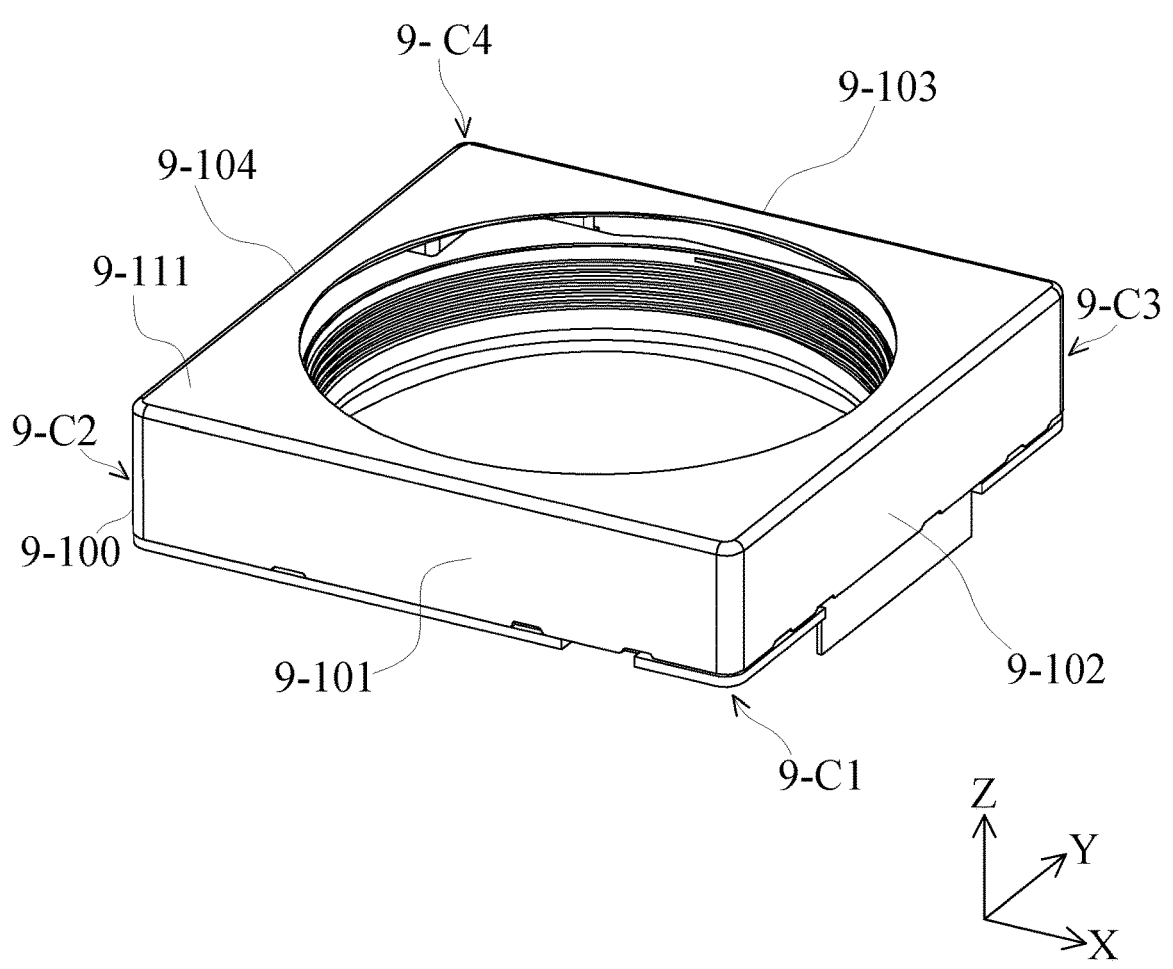
FIG. 73 is a schematic diagram of an optical member driving mechanism according to another embodiment of the invention.
Figure 74:
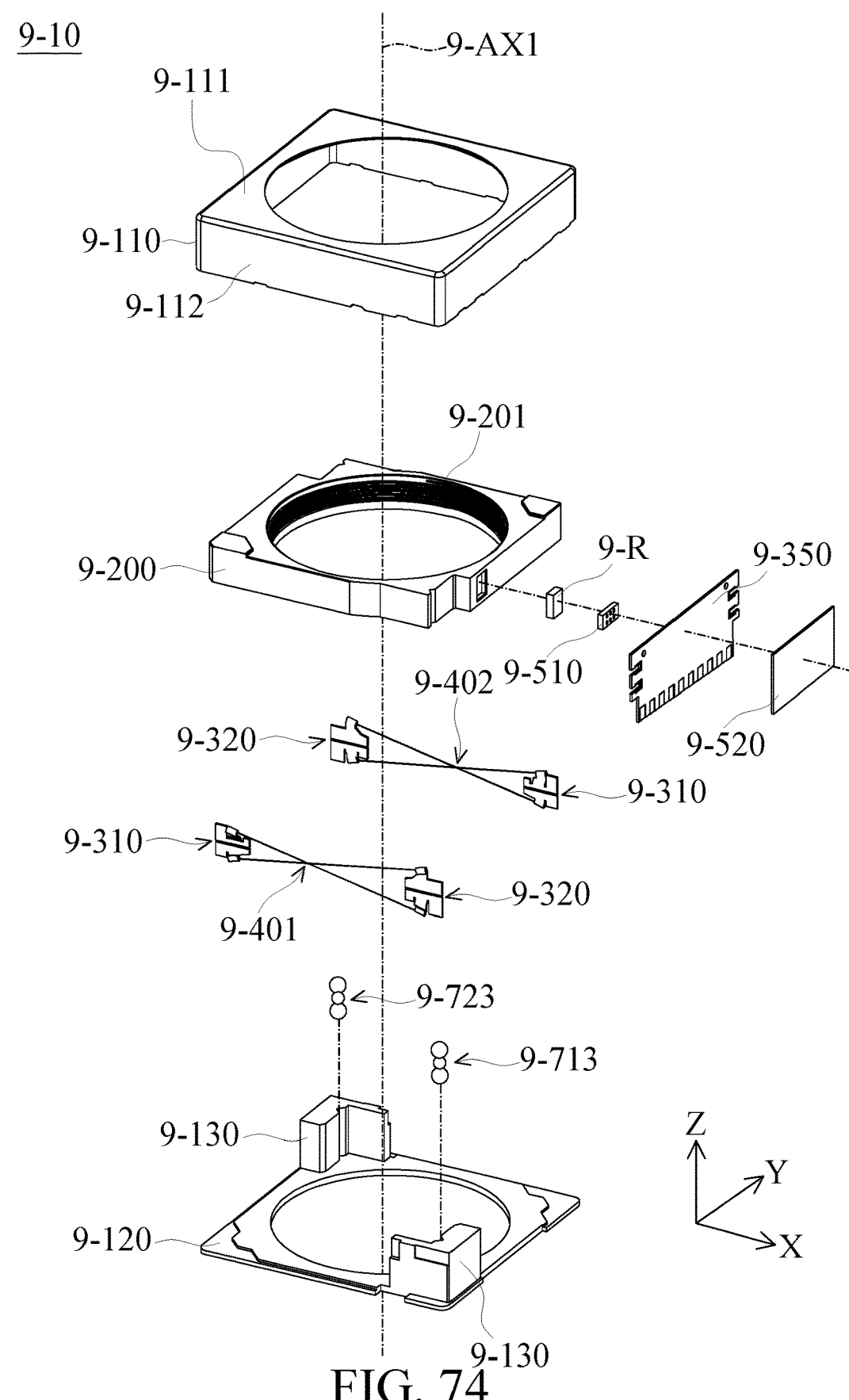
FIG. 74 is an exploded-view diagram of the optical member driving mechanism according to another embodiment of the invention.

FIG. 73 is a schematic diagram of an optical member driving mechanism 9-10 according to another embodiment of the invention, and the FIG. 73 is an exploded-view diagram thereof. The difference is in that two fixed members 9-130 in this embodiment are respectively disposed at the first corner 9-C1 and the fourth corner 9-C4. Thus, the first guiding assembly 9-710 and the second guiding assembly 9-720 are respectively disposed at the first corner 9-C1 and the fourth corner 9-C4. Moreover, the arrangement of the first circuit unit 9-310, the second circuit unit 9-320, and the first driving member 9-401 on the first side 9-101 and the arrangement of the first circuit unit 9-310, the second circuit unit 9-320, and the second driving member 9-402 on the third side 9-103 are rotational symmetric relative to the main axis 9-AX1.

In summary, an optical member driving mechanism is provided, including a movable portion, a fixed portion, a driving assembly, and a circuit assembly. The movable portion is configured to hold an optical member. The driving assembly is connected to the movable portion and the fixed portion, and configured to drive the movable portion to move relative to the fixed portion. The driving assembly is electrically connected the circuit assembly. Owing to the structure of the aforementioned optical member driving mechanism, the driving assembly can provide a greater driving force on the movable portion, so that the optical member with more optical lenses can be used.

Figure 75:
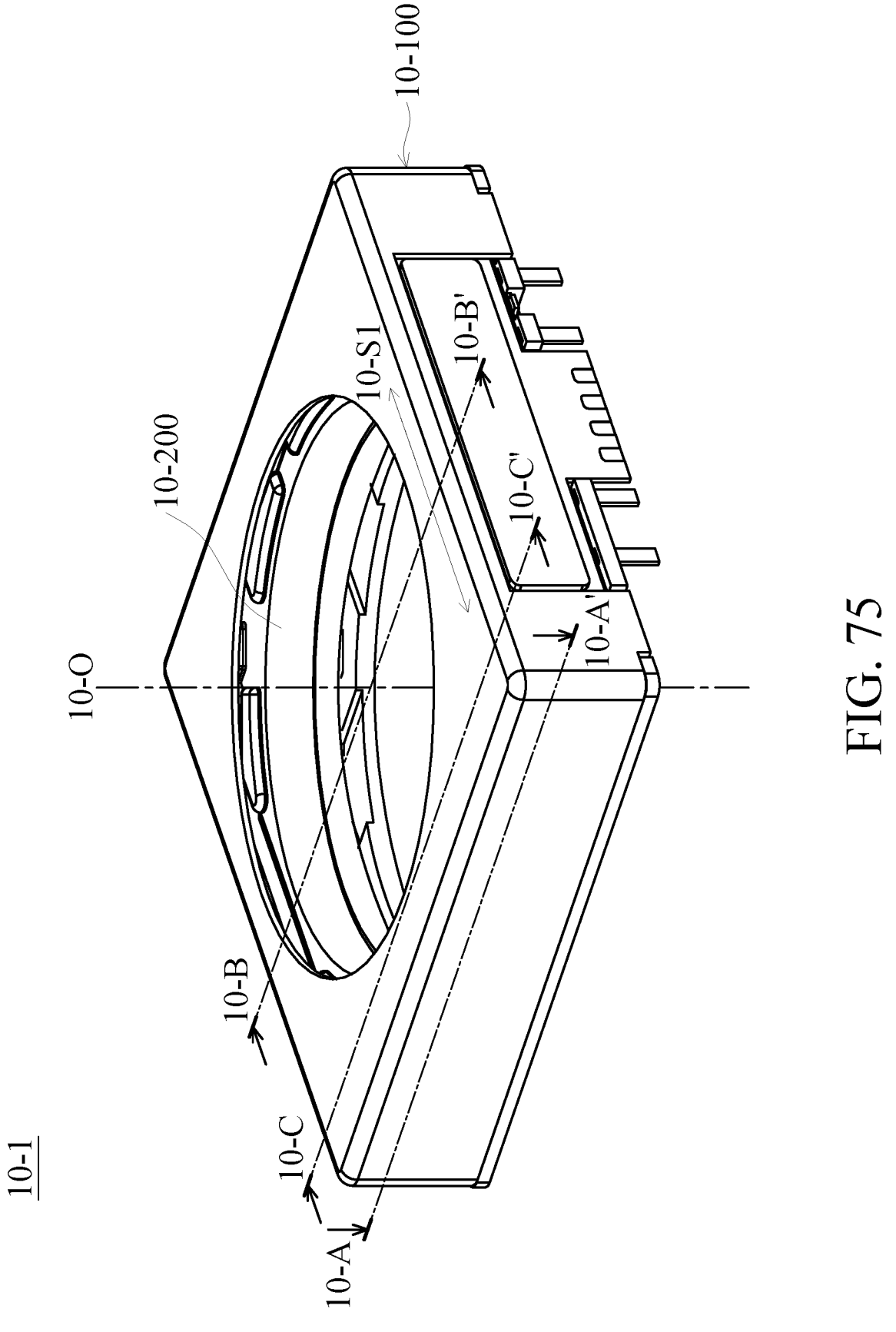
FIG. 75 is a perspective view of an optical element driving mechanism according to an embodiment of the present disclosure.
Figure 76:
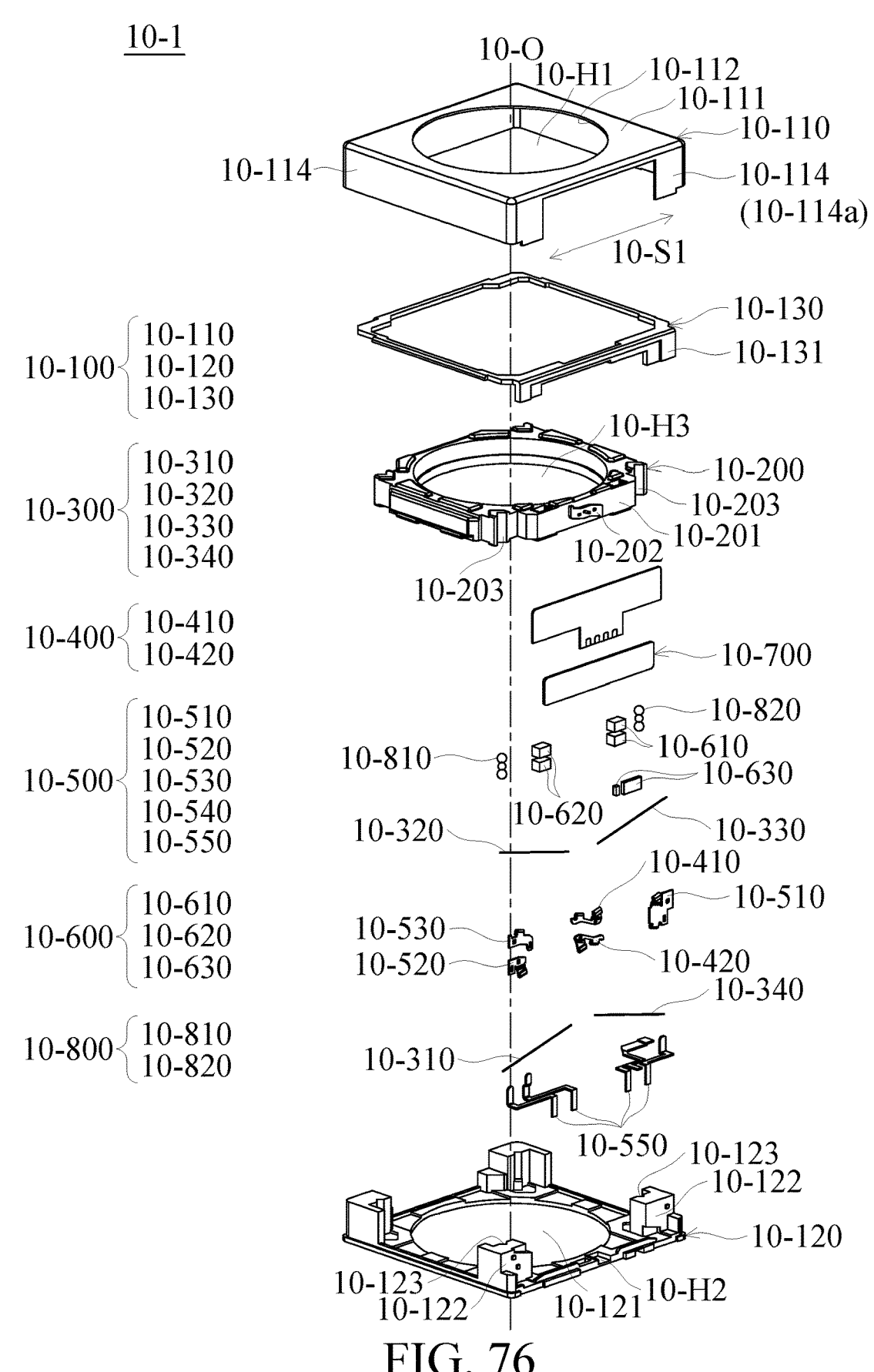
FIG. 76 is an exploded view of the optical element driving mechanism according to an embodiment of the present disclosure.
Figure 77:
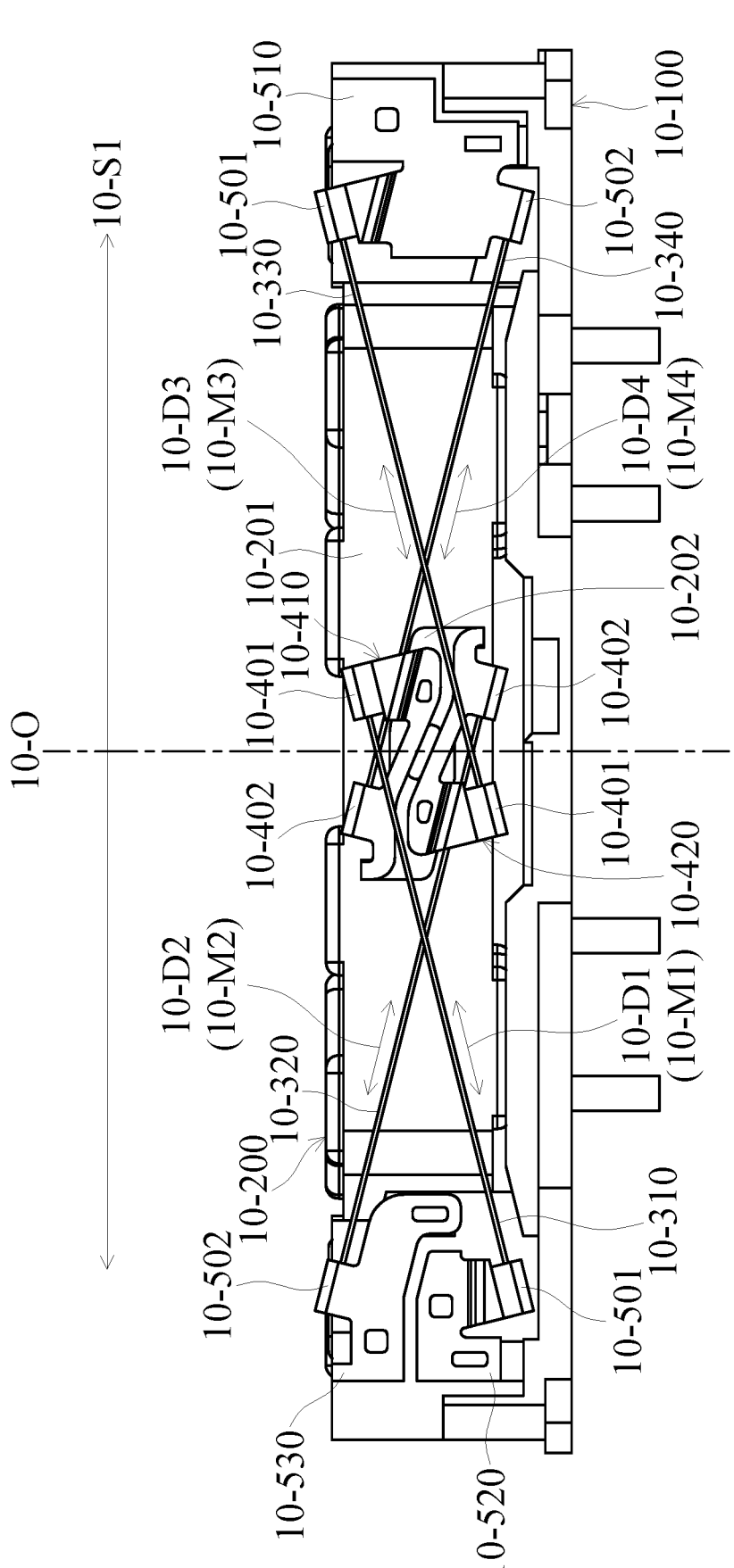
FIG. 77 is a side view of a partial structure of the optical element driving mechanism according to an embodiment of the present disclosure.

Refer to FIG. 75 to FIG. 77. FIG. 75 is a perspective view of an optical element driving mechanism 10-1 according to an embodiment of the present disclosure. FIG. 76 is an exploded view of the optical element driving mechanism 10-1 according to an embodiment of the present disclosure. FIG. 77 is a side view of a partial structure of the optical element driving mechanism 10-1 according to an embodiment of the present disclosure. The optical element driving mechanism 10-1 includes a fixed portion 10-100, a movable portion 10-200, a driving assembly 10-300, a limiting element 10-400, a circuit assembly 10-500, and a position sensing assembly 10-600, a magnetically permeable element 10-700, and a guiding assembly 10-800. In this embodiment, the optical element driving mechanism 10-1 is a voice coil motor (VCM) with an auto focus (AF) function, but it is not limited to this. In some embodiments, the optical element driving mechanism 10-1 may also have auto focus and optical image stabilization (OIS) functions.

The fixed portion 10-100 has a polygonal structure. In this embodiment, the fixed portion 10-100 is a quadrangular structure with a first side 10-S1. In the following description, the first side 10-S1 may refer to a direction of the long side of the first side 10-S1, and the first side 10-S1 may also refer to a structure included in the fixed portion 10-100 on the first side 10-S1. As shown in FIG. 76, the fixed portion 10-100 includes an outer frame 10-110, a base 10-120, and a frame 10-130. The outer frame 10-110 has a top surface 10-111, an inner top surface 10-112, two restricting structures 10-113 (refer to FIG. 81), and four side walls 10-114. One of four side walls 10-114 extending along the first side 10-S1 from an edge of the top surface 10-111 is a first side wall 10-114a. The inner top surface 10-112 faces the base 10-120 and is opposite to the top surface 10-111. The restricting structure 10-113 extends from the inner top surface 10-112 toward base 10-120.

The base 10-120 and the outer frame 10-110 are arranged along a main axis 10-O, and have a receiving portion 10-121, a first side wall 10-122, and two guiding structures 10-123. The receiving portion 10-121 receives a part of the limiting element 10-400. The first side wall 10-122 of the base 10-120 is closer to the main axis 10-O than the first side wall 10-114a of the outer frame 10-110. Two guiding structures 10-123 are arranged along the first side 10-S1, and may respectively accommodate a part of the guiding assembly 10-800. It should be understood that the outer frame 10-110 and the base 10-120 are respectively formed with an outer frame opening 10-H1 and a base opening 10-H2, and the outer frame opening 10-H1 corresponds to the base opening 10-H2, and the base opening 10-H2 corresponds to the image sensing element (not shown) disposed outside the optical element driving mechanism 10-1. The external light may enter the outer frame 10-110 through the outer frame opening 10-H1. After passing through an optical element (not shown) and the base opening 10-H2, it is received by the image sensing element to generate a digital image signal. The frame 10-130 has a first frame edge 10-131, and the first frame edge 10-131 corresponds to the first side wall 10-114a of the outer frame 10-110.

The movable portion 10-200 may be connected to an optical element and move relative to the fixed portion 10-100. In this embodiment, the movable portion 10-200 is a holder and has a through hole 10-H3, a first side wall 10-201, a protruding portion 10-202, and two guiding structures 10-203. A screw structure (not shown) is disposed between the through hole 10-H3 and the optical element, so that the optical element can be locked in the through hole 10-H3. The first side wall 10-201 is parallel to the first side wall 10-114a of the outer frame 10-110, and is closer to the main axis 10-O than the first side wall 10-114a of the outer frame 10-110. The protruding portion 10-202 extends from the first side wall 10-201 of the movable portion 10-200 to the first side wall 10-114a of the outer frame 10-110. The two guiding structures 10-203 are respectively arranged corresponding to the guiding structure 10-123 of the fixed portion 10-100, extend in a direction that is parallel to the main axis 10-O, and may accommodate a part of the guiding assembly 10-800.

The driving assembly 10-300 is disposed on the first side 10-S1, and includes a first driving element 10-310, a second driving element 10-320, a third driving element 10-330, and a fourth driving element 10-340. The first driving element 10-310, the second driving element 10-320, the third driving element 10-330, and the fourth driving element 10-340 all have shape memory alloys (SMA) and have a long strip structure, and none of them touched each other. The first driving element 10-310, the second driving element 10-320, the third driving element 10-330, and the fourth driving element 10-340 may have an insulating material, and the insulating material is disposed between the shape memory alloy of the first driving element 10-310, the second driving element 10-320, the third driving element 10-330, and the fourth driving element 10-340 and the limiting element 10-400. That is, the insulating material may be fixedly disposed on the shape memory alloy of the first driving element 10-310, the second driving element 10-320, the third driving element 10-330, and the fourth driving element 10-340. For example, a layer of insulating material covers the shape memory alloy of the first driving element 10-310, the second driving element 10-320, the third driving element 10-330, and the fourth driving element 10-340, so that the driving elements may not cause a short circuit even if they contact each other during the driving process.

As shown in FIG. 77, the first driving element 10-310 extends along a first direction D1, and may drive the movable portion 10-200 to move relative to the fixed portion 10-100 in a first dimension 10-M1. The second driving element 10-320 extends along a second direction 10-D2, and may drive the movable portion 10-200 to move relative to the fixed portion 10-100 in a second dimension 10-M2. The third driving element 10-330 extends along a third direction 10-D3, and may drive the movable portion 10-200 to move relative to the fixed portion 10-100 in a third dimension 10-M3. The fourth driving element 10-340 extends along a fourth direction 10-D4, and may drive the movable portion 10-200 to move relative to the fixed portion 10-100 in a fourth dimension 10-M4. The first direction 10-D1 is different from the second direction 10-D2, and the first direction 10-D1 and the second direction 10-D2 are neither perpendicular nor parallel. The first direction 10-D1 is parallel to the third direction 10-D3. The first direction 10-D1 is different from the fourth direction 10-D4, and the first direction 10-D1 and the fourth direction 10-D4 are neither perpendicular nor parallel. The second direction 10-D2 is different from the third direction 10-D3, and the second direction 10-D2 and the third direction 10-D3 are neither perpendicular nor parallel. The second direction 10-D2 is parallel to the fourth direction 10-D4.

Figure 78:
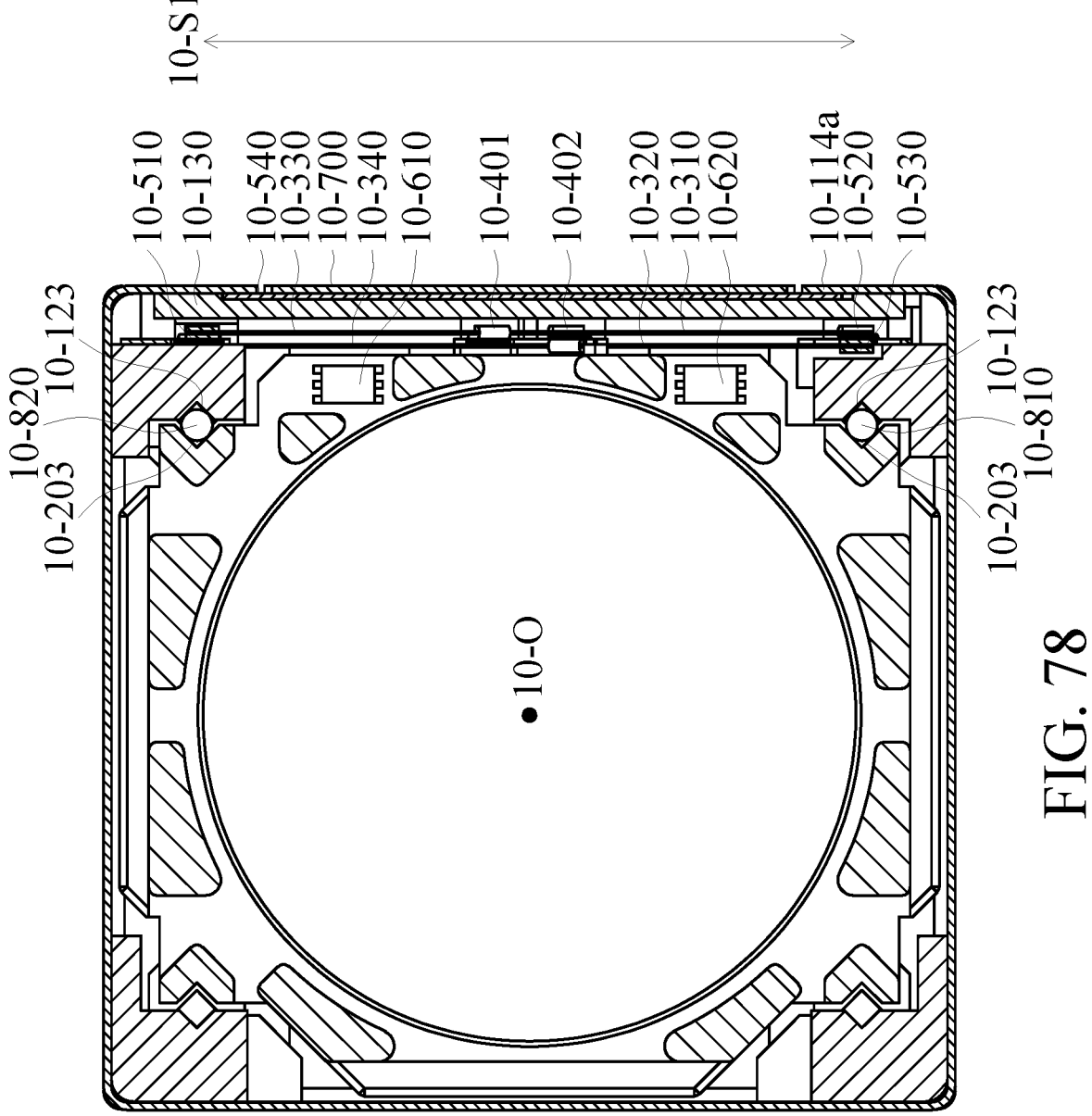
FIG. 78 is a cross-sectional view of the optical element driving mechanism taken along the line 10-A-10-A' of FIG. 75.

Refer to FIGS. 77 and 4. FIG. 78 is a cross-sectional view of the optical element driving mechanism 10-1 taken along the line 10-A-10-A' of FIG. 75. The shortest distance between the first driving element 10-310 and the first side wall 10-114a of the outer frame 10-110 is different from the shortest distance between the second driving element 10-320 and the first side wall 10-114a of the outer frame 10-110. In this embodiment, the shortest distance between the first driving element 10-310 and the first side wall 10-114a of the outer frame 10-110 is smaller than the shortest distance between the second driving element 10-320 and the first side wall 10-114a of the outer frame 10-110. The shortest distance between the third driving element 10-330 and the first side wall 10-114a of the outer frame 10-110 is different from the shortest distance between the fourth driving element 10-340 and the first side wall 10-114a of the outer frame 10-110. In this embodiment, the shortest distance between the third driving element 10-330 and the first side wall 10-114a of the outer frame 10-110 is smaller than the shortest distance between the fourth driving element 10-340 and the first side wall 10-114a of the outer frame 10-110.

When viewed along a direction that is parallel to the main axis 10-O, there is a gap greater than zero between the first driving element 10-310 and the second driving element 10-320, there is a gap greater than zero between the first driving element 10-310 and the driving elements 10-340, there is a gap greater than zero between the second driving element 10-320 and the third driving element 10-330, and there is a gap greater than zero between the third driving element 10-330 and the fourth driving element 10-340. When viewed along the direction that is perpendicular to the main axis 10-O and the first side 10-S1, there is a gap greater than zero between the first driving element 10-310 and the third driving element 10-330, and there is a gap greater than zero between the second driving element 10-320 and the fourth driving element 10-340.

Figure 79:
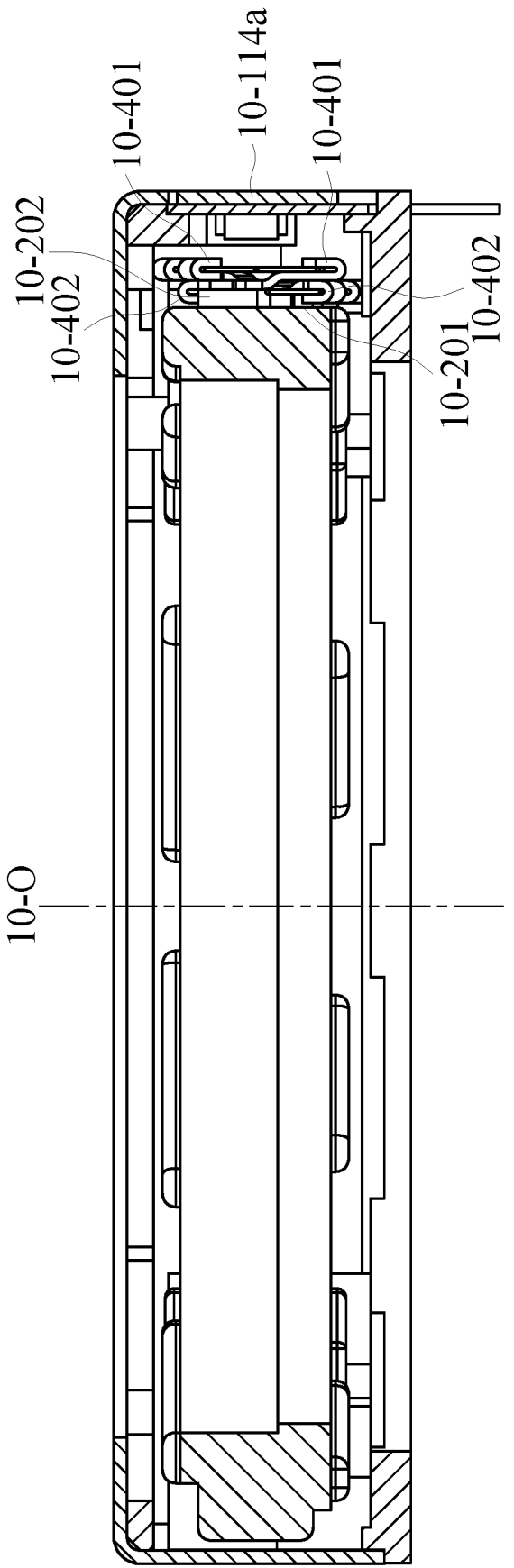
FIG. 79 is a cross-sectional view of the optical element driving mechanism taken along the line 10-B-10-B' in FIG. 75.

Refer to FIGS. 76 to 79. FIG. 79 is a cross-sectional view of the optical element driving mechanism 10-1 taken along the line 10-B-10-B' in FIG. 75. The limiting element 10-400 is made of metal material, including a first limiting unit 10-410 and a second limiting unit 10-420, which may be disposed on the movable portion 10-200 or the fixed portion 10-100. In this embodiment, the limiting element 10-400 is disposed on the movable portion 10-200, and limits the driving assembly 10-300 to move within a range of movement relative to the fixed portion 10-100. A distance between the limiting element 10-400 and the first side wall 10-114a of the outer frame 10-110 is larger than a distance between the limiting element 10-400 and the first side wall 10-201 of the movable portion 10-200. When viewed along a direction that is parallel to the main axis 10-O, the limiting element 10-400 overlaps a central portion of the first side 10-S1 of the fixed portion 10-100.

The first limiting unit 10-410 and the second limiting unit 10-420 have the same shape and structure, and are symmetrically disposed on the protruding portion 10-202 of the movable portion 10-200, and the first limiting unit 10-410 is closer to the inner top surface 10-112 of the outer frame 10-110 than the second limiting unit 10-420. When viewed along the direction that is parallel to the main axis 10-O, the first limiting unit 10-410 at least partially overlaps the second limiting unit 10-420. The first limiting unit 10-410 and the second limiting unit 10-420 respectively have an outer curved portion 10-401 and an inner curved portion 10-402, and the outer curved portion 10-401 is curved toward the first side wall 10-114a of the outer frame 10-110, and the inner curved portion 10-402 is curved toward the first side wall 10-201 of the movable portion 10-200. When viewed along the direction that is parallel to the first side

10-S1, the outer curved portion 10-401 and the inner curved portion 10-402 do not overlap. When viewed along a direction that is perpendicular to the main axis 10-O and the first side 10-S1, the first limiting unit 10-410 does not overlap the second limiting unit 10-420.

Figure 80:
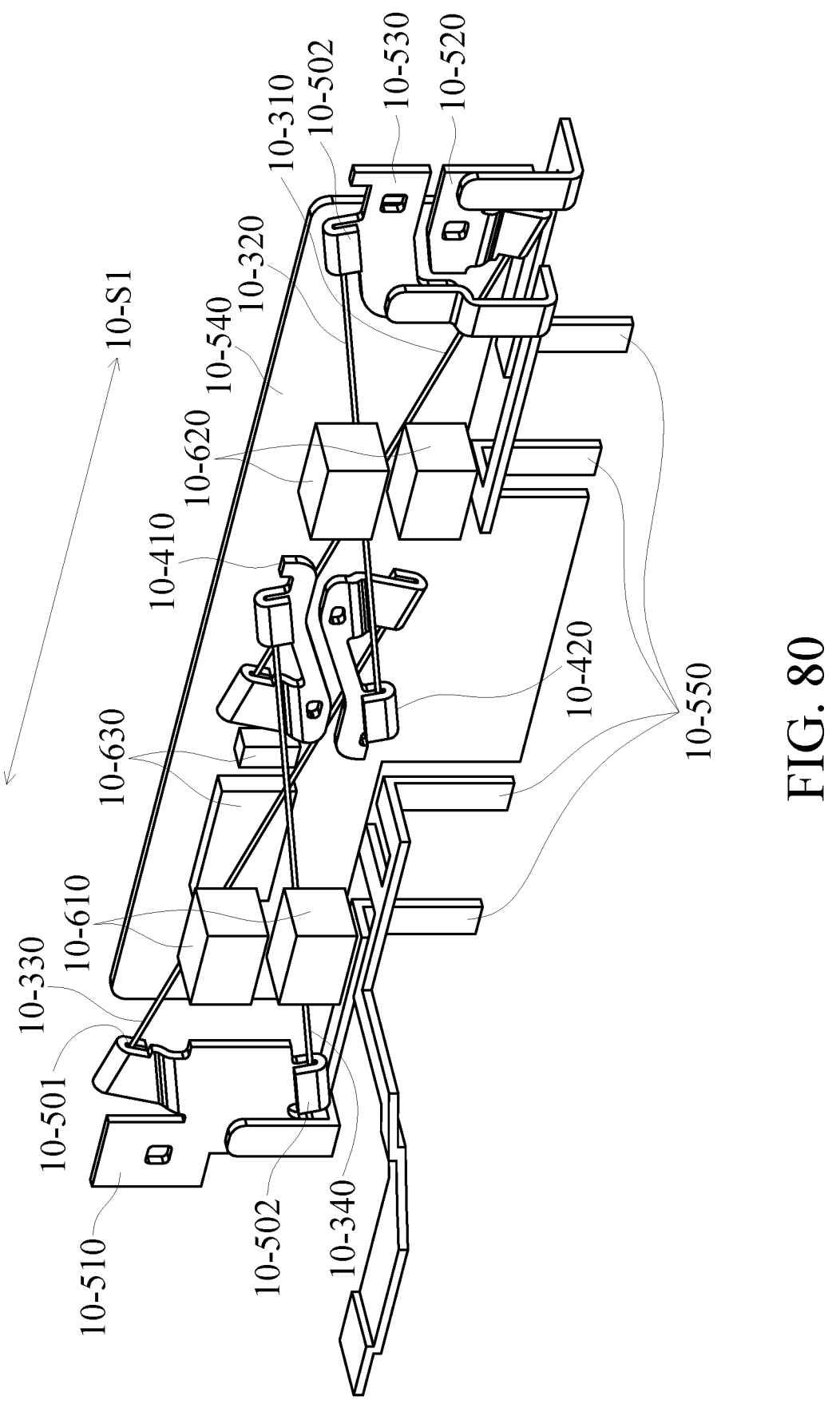
FIG. 80 is a schematic diagram of a partial structure of the optical element driving mechanism according to an embodiment of the present disclosure.

Refer to FIGS. 76 to 80. FIG. 80 is a schematic diagram of a partial structure of the optical element driving mechanism 10-1 according to an embodiment of the present disclosure. The circuit assembly 10-500 is connected to the driving assembly 10-300, and is disposed on the first side 10-S1 of the fixed portion 10-100, and includes a first circuit element 10-510, a second circuit element 10-520, and a third circuit assembly 10-530, a circuit board 10-540, and four circuit components 10-550. The first circuit element 10-510, the second circuit element 10-520, and the third circuit element 10-530 are disposed on the first side wall 10-122 of the base 10-120, and respectively have an outer curved portion 10-501 and an inner curved portion 10-502, the outer curved portion 10-501 are curved toward a direction that is close to the first side wall 10-114a of the outer frame 10-110, and the inner curved portion 10-502 is curved toward a direction that is away from the first side wall 10-114a of the outer frame 10-110.

The circuit board 10-540 has a flat plate shape, parallel to the first side 10-S1, and is fixed between the base 10-120 and the frame 10-130. When viewed along the direction that is parallel to the main axis 10-O, the frame 10-130 is closer to the movable portion 10-200 than the circuit board 10-540 and the position sensing assembly 10-600, so as to prevent the movable portion 10-200 from colliding with the circuit board 10-540 and the position sensing assembly 10-600 when the movable portion 10-200 is moved.

The three circuit components 10-550 are respectively connected to the first circuit element 10-510, the second circuit element 10-520, and the third circuit element 10-530, and extend out of the base 10-120 along the direction that is parallel to the main axis 10-O to connect to the external circuit. The remaining circuit component 10-550 is grounded to maintain the equipotential of each element in the optical element driving mechanism 10-1 to avoid possible damage by static electricity in the optical element driving mechanism 10-1.

When viewed along the direction that is parallel to the main axis 10-O, the first circuit element 10-510 and the second circuit element 10-520 do not overlap, the first circuit element 10-510 and the third circuit element 10-530 do not overlap, and the second circuit element 10-520 and the third circuit element 10-530 at least partially overlap. When viewed along the direction that is parallel to the first side 10-S1, the first circuit element 10-510, the second circuit element 10-520, and the third circuit element 10-530 at least partially overlap.

The first driving element 10-310 connects the outer curved portion 10-501 of the second circuit element 10-520 and the outer curved portion 10-401 of the first limiting unit 10-410. The second driving element 10-320 connects the inner curved portion 10-502 of the third circuit element 10-530 and the inner curved portion 10-402 of the second limiting unit 10-420. The third driving element 10-330 connects the outer curved portion 10-501 of the first circuit element 10-510 and the outer curved portion 10-401 of the second limiting unit 10-420. The fourth driving element 10-340 connects the inner curved portion 10-502 of the first circuit element 10-510 and the inner curved portion 10-402 of the first limiting unit 10-410.

The position sensing assembly 10-600 is disposed on the circuit board 10-540, and includes a first reference element 10-610, a second reference element 10-620, and a position sensing element 10-630. The first reference element 10-610 includes a first magnet, and the second reference element 10-620 includes a second magnet. The first reference element 10-610 and the second reference element 10-620 are arranged along the direction that is parallel to the first side 10-S1. The position sensing element 10-630 corresponds to the first reference element 10-610 to sense the movement of the movable portion 10-200 relative to the fixed portion 10-100, and the second reference element 10-620 does not correspond to the position sensing element 10-630. The first reference element 10-610 and the second reference element 10-620 have a distance greater than zero. When viewed along the direction that is perpendicular to the main axis 10-O and the first side 10-S1, the first reference element 10-610 and the second reference element 10-620 are symmetrically arranged with the main axis 10-O as the center. When viewed along the direction that is parallel to the main axis 10-O, the position sensing element 10-630 is closer to the movable portion 10-200 than the circuit board 10-540, and is disposed between the first reference element 10-610 and the magnetically permeable element 10-700. In this embodiment, although the position sensing element 10-630 is disposed on the fixed portion 10-100, and the first reference element 10-610 and the second reference element 10-620 are disposed on the movable portion 10-200, it is not limited to this. It is also possible that the position sensing element 10-630 is disposed on the movable portion 10-200, and the first reference element 10-610 and the second reference element 10-620 are disposed on the fixed portion 10-100.

The magnetically permeable element 10-700 has a flat plate shape, and is disposed on the first side 10-S1. The magnetically permeable element 10-700 has a magnetically permeable material, and corresponds to the first reference element 10-610 and the second reference element 10-620. More specifically, the magnetically permeable element 10-700 may be attached to the circuit board 10-540 by a bonding element (not shown). When viewed along the direction that is parallel to the first side 10-S1, the circuit board 10-540 is closer to the movable portion 10-200 than the magnetically permeable element 10-700. When viewed along the direction that is parallel to the main axis 10-O, the first side wall 10-114a of the outer frame 10-110 and the magnetically permeable element 10-700 at least partially overlap, and the circuit assembly 10-500 is at least partially disposed between the sensing element 10-630 and the magnetically permeable element 10-700.

Figure 81:
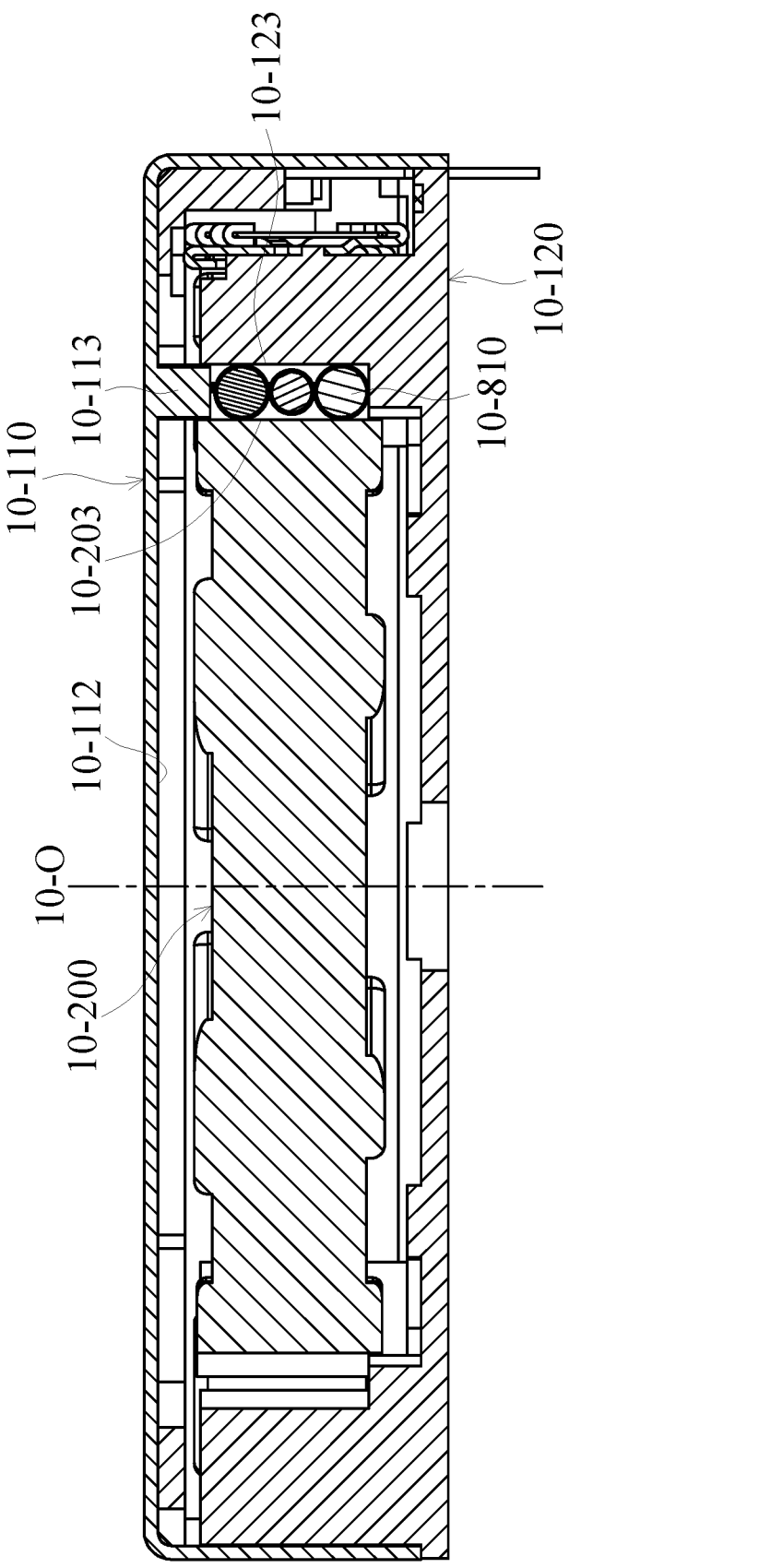
FIG. 81 is a cross-sectional view of the optical element driving mechanism 10-1 taken along the line 10-C-10-C' in FIG. 75.

Refer to FIGS. 76 to 81. FIG. 81 is a cross-sectional view of the optical element driving mechanism 10-1 taken along the line 10-C-10-C' in FIG. 75. The guiding assembly 10-800 includes a first intermediate element 10-810 and a second intermediate element 10-820. The first intermediate element 10-810 is disposed between the restricting structure 10-113 of the outer frame 10-110 and the base 10-120. The first intermediate element 10-810 and the second intermediate element 10-820 are disposed between the guiding structures 10-123 of the fixed portion 10-100 and the guiding structures 10-203 of the movable portion 10-200. The first intermediate element 10-810 and the second intermediate element 10-820 are movable relative to the fixed portion 10-100 and the movable portion 10-200. Therefore, the restricting structure 10-113 and the base 10-120 restrict a range of movement of the guiding assembly 10-800 in the direction that is parallel to the main axis 10-O. When viewed along the direction that is perpendicular to the main axis 10-O and the first side 10-S1, the first intermediary element 10-810 and the second intermediary element 10-820 are symmetrically arranged with the main axis 10-O as the center. In this embodiment, the first intermediary element 10-810 and the second intermediary element 10-820 respectively comprise three balls arranged in the direction that is parallel to the main axis 10-O, but the shape or number is not limited to this, and may be changes as required.

Next, the operation of the driving assembly 10-300 will be described. When a current is passed through the circuit component 10-550 to the third circuit element 10-530, the driving assembly 10-300 having the shape memory alloy will contract due to a heat generated by passing through the current. That is, the second driving element 10-320 connected to the third circuit element 10-530 will contract in the second direction 10-D2, so that the movable portion 10-200 is moved in the second dimension 10-M2. Similarly, when a current is passed through the circuit component 10-550 to the second circuit element 10-520, the first driving assembly 10-310 connected to the second circuit element 10-520 will contract in the first direction 10-D1, so that the movable portion 10-200 is moved in the first dimension 10-M1. When current is passed to the first circuit element 10-510 through the circuit component 10-550, the third driving element 10-330 and the fourth driving element 10-340 connected to the first circuit element 10-510 may contract in the third direction 10-D3 and the fourth direction 10-D4 respectively, so that the movable portion 10-200 is moved in the third dimension 10-M3 and the fourth dimension 10-M4.

Therefore, a current may be controlled and simultaneously passed to the third circuit element 10-530 and the first circuit element 10-510, so as to control the degree of contraction of the second driving element 10-320, the third driving element 10-330 and the fourth driving element 10-340. Thus, the resultant force of contraction of the second driving element 10-320, the third driving element 10-330, and the fourth driving element 10-340 may be toward the direction that is parallel to the main axis 10-O toward the inner top surface 10-112, so that the movable portion 10-200 may move in the direction that is parallel to the main axis 10-O toward the inner top surface 10-112.

Similarly, a current may be controlled and simultaneously passed to the second circuit element 10-520 and the first circuit element 10-510, so as to control the degree of contraction of the first driving element 10-310, the third driving element 10-330 and the fourth driving element 10-340. Thus, the resultant force of contraction of the first driving element 10-310, the third driving element 10-330, and the fourth driving element 10-340 may be toward the direction that is parallel to the main axis 10-O away from the inner top surface 10-112, so that the movable portion 10-200 may move in the direction that is parallel to the main axis 10-O away from the inner top surface 10-112.

In this embodiment, because the outer frame 10-110 is made of a non-magnetic metal material, and the magnetic permeability of the outer frame 10-110 is equal to the magnetic permeability of the magnetically permeable element 10-700, the magnetically permeable element 10-700 and the first reference element 10-610 are configured to generate a force on the movable portion 10-200 to make the movable portion 10-200 approach the first side 10-S1 of the fixed portion 10-100, and the magnetically permeable element 10-700 and the second reference element 10-620 are configured to generate another force on the movable portion 10-200. The directions of the two forces are not parallel to the main axis 10-O. More specifically, the directions of the two forces are perpendicular to the main axis 10-O. With the force between the magnetically permeable element 10-700 and the movable portion 10-200, the guiding assembly 10-800 may closely contact the guiding structure 10-203 of the movable portion 10-200 and the guiding structure 10-123 of the fixed portion 10-100. Therefore, when the driving assembly 10-300 drives the movable portion 10-200 to move, the movable portion 10-200 may move more stably along the guiding assembly 10-800 in a direction that is parallel to the main axis 10-O.

Figure 82:
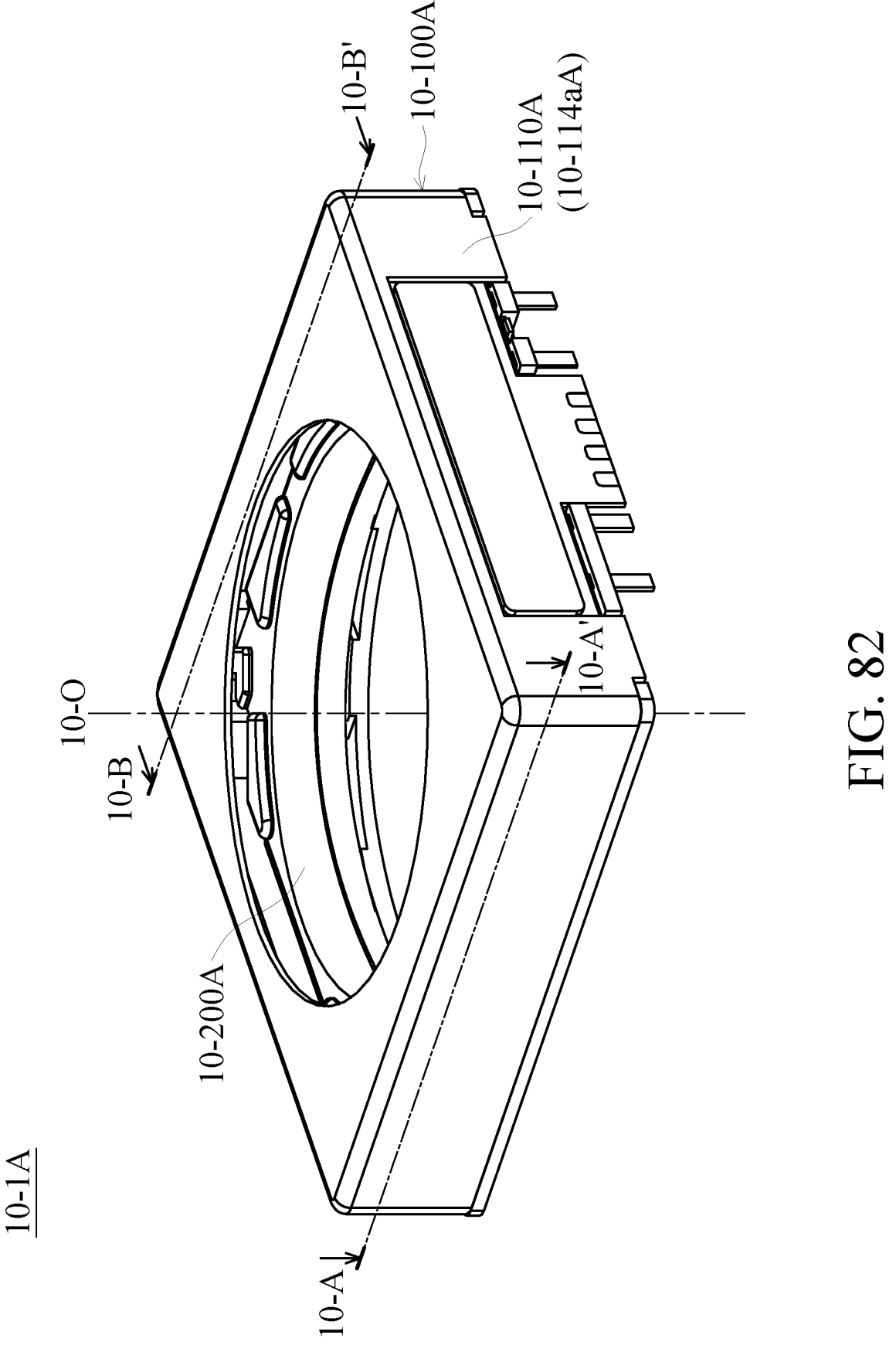
FIG. 82 is a perspective view of an optical element driving mechanism according to an embodiment of the present disclosure.
Figure 83:
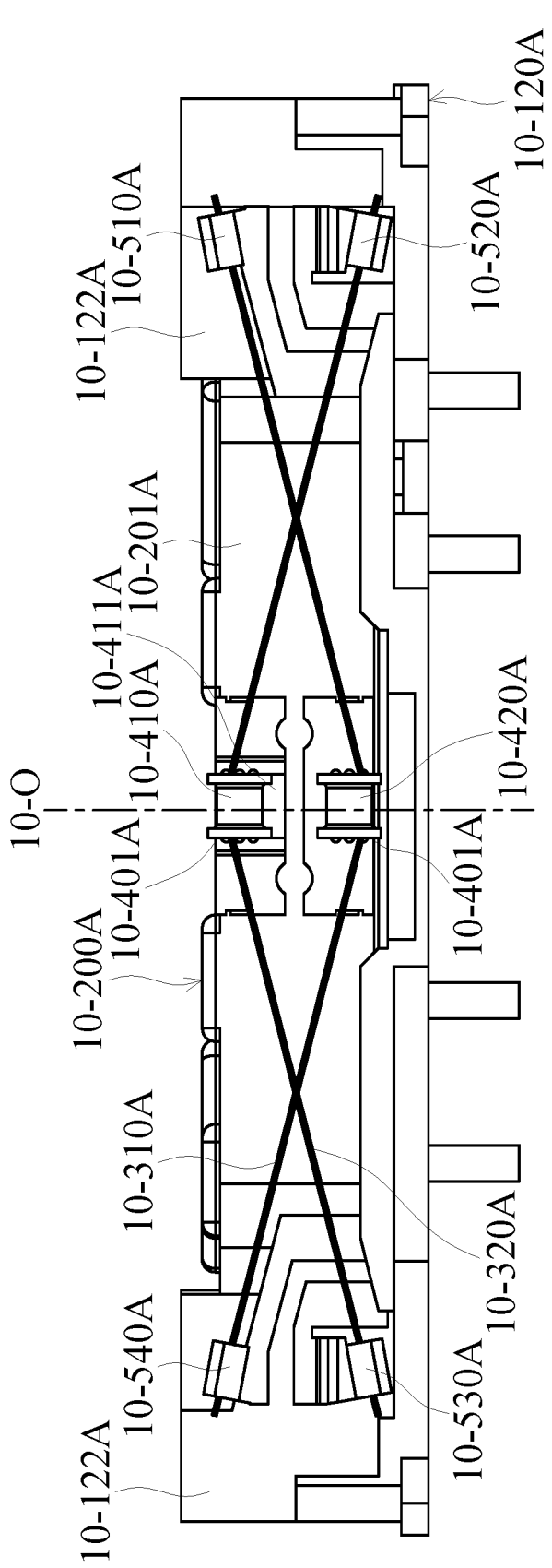
FIG. 83 is a schematic diagram of a partial structure of the optical element driving mechanism according to another embodiment of the present disclosure.
Figure 84:
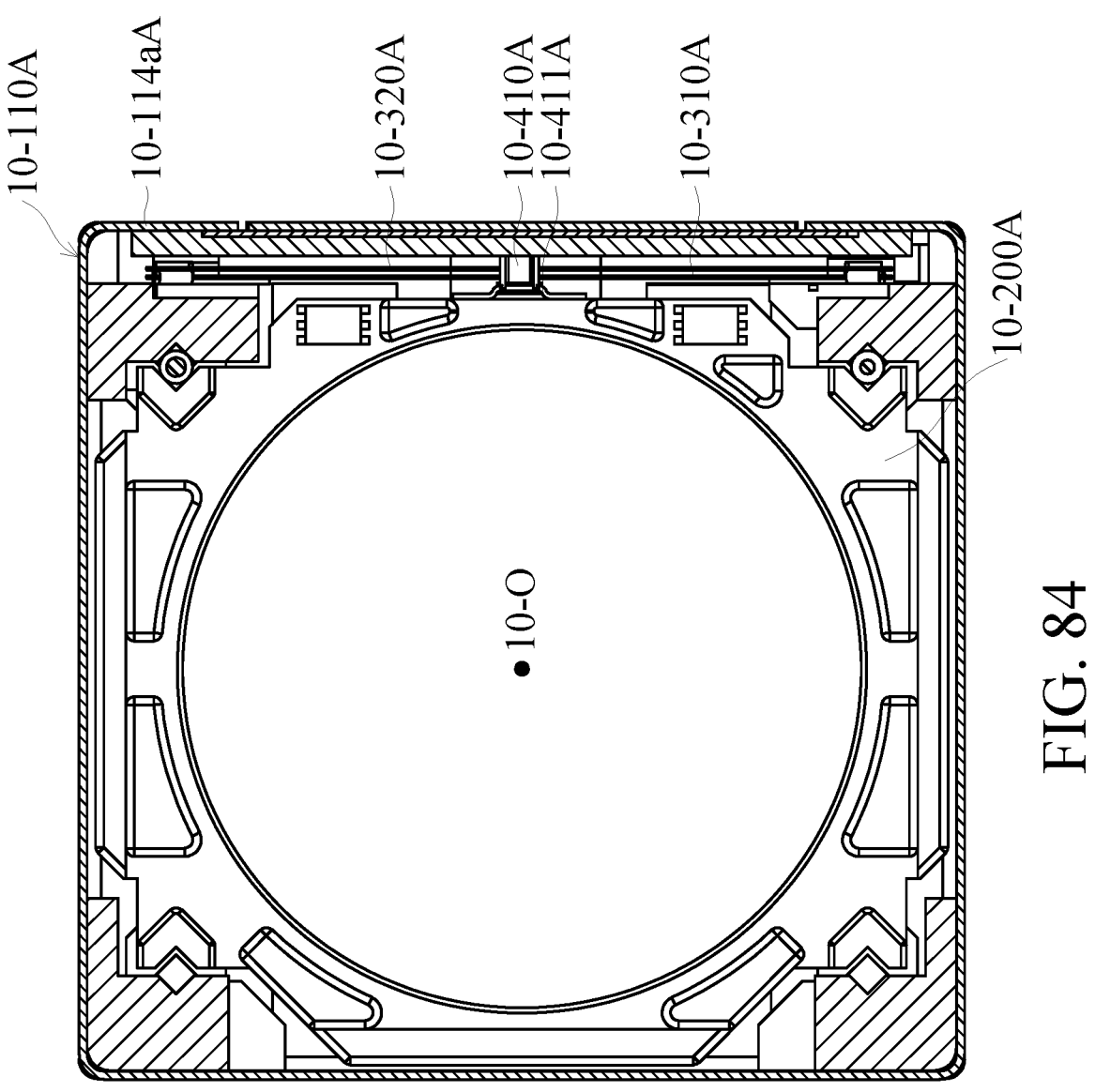
Figure 85:
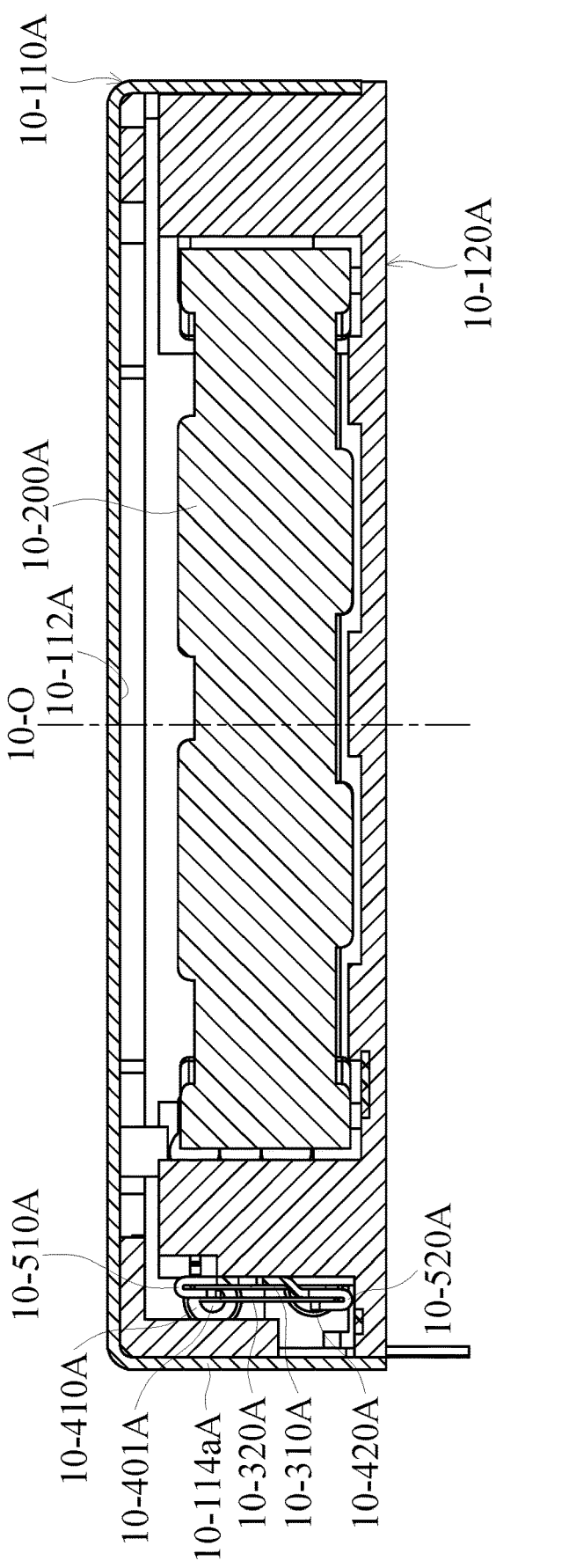

Refer to FIGS. 82 to 85. FIG. 82 is a perspective view of an optical element driving mechanism 10-1A according to an embodiment of the present disclosure. FIG. 83 is a schematic diagram of a partial structure of the optical element driving mechanism 10-1A according to another embodiment of the present disclosure. FIG. 84 is a cross-sectional view of the optical element driving mechanism 10-1A taken along the line 10-A-10-A' in FIG. 82. FIG. 85 is a cross-sectional view of the optical element driving mechanism 10-1A taken along the line 10-B-10-B' in FIG. 82. In this embodiment, the differences from the optical element driving mechanism 10-1 are the driving assembly 10-300A, the limiting element 10-400A, and the circuit assembly 10-500A. The driving assembly 10-300A includes a first driving assembly 10-310A and a second driving assembly 10-320A. The limiting element 10-400A includes a first limiting unit 10-410A and a second limiting unit 10-420A. The circuit assembly 10-500A includes a first circuit element 10-510A, a second circuit element 10-520A, a third circuit element 10-530A, and a fourth circuit element 10-540A. The first driving element 10-310A is connected to the second circuit element 10-520 and the third circuit element 10-530 through the first limiting unit 10-410, and the second driving element 10-320A is connected to the first circuit element 10-510A and the fourth circuit element 10-540A through the second limiting unit 10-420A.

The first limiting unit 10-410A and the second limiting unit 10-420A have similar shapes, are arranged on the first side wall 10-201A of the movable portion 10-200A, and respectively have an opening 10-401A. The driving assembly 10-300A pass through the openings 10-401A. The first limiting unit 10-410A has a protruding portion 10-411A, and the protruding portion 10-410A makes the opening 10-401A of the first limiting unit 10-410A be closer to the first side wall 10-114aA of the outer frame 10-110A than the opening 10-401A of the second limiting unit 10-420A. When viewed along the direction that is parallel to the main axis 10-O, the first limiting unit 10-410A at least partially overlaps the second limiting unit 10-420A, and the limiting unit 10-410A is closer to the first side wall 10-114aA of the outer frame 10-110A than the second limiting unit 10-420A. When viewed along the direction that is perpendicular to the main axis 10-O, the first limiting unit 10-410A does not overlap the second limiting unit 10-420A.

The first circuit element 10-510A, the second circuit element 10-520A, the third circuit element 10-530A, and the fourth circuit element 10-540A are disposed on the first side wall 10-122A of the base 10-120A. The first circuit element 10-510A and the fourth circuit element 10-540A have a similar shape, and are symmetrically arranged on the fixed portion 10-100A with the limiting element 10-400A as the center. The second circuit element 10-520A and the third circuit element 10-530A have a similar shape, and are symmetrically arranged on the fixed portion 10-100A with the limiting element 10-400A as the center. When viewed along the direction that is parallel to the main axis 10-O, the first circuit element 10-510A and the second circuit element

10-520A at least partially overlap, and the third circuit element 10-530A and the fourth circuit element 10-540A at least partially overlap.

When viewed along the direction that is parallel to the first side 10-S1, the first circuit element 10-510A, the second circuit element 10-520A, the third circuit element 10-530A, and the fourth circuit element 10-540A are at least partially overlapped, the distance between the first circuit element 10-510A and the first side wall 10-114aA of the outer frame 10-110A is greater than the distance between the second circuit element 10-520A and the first side wall 10-114aA of the outer frame 10-110A, the distance between the fourth circuit element 10-540A and the first side wall 10-114aA of the outer frame 10-110A is greater than the distance between the third circuit element 10-530A and the first side wall 10-114aA of the outer frame 10-110A, the distance between the first circuit element 10-510A and the first side wall 10-114aA of the outer frame 10-110A is the same as the distance between the fourth circuit element 10-540A and the first side wall 10-114aA of the outer frame 10-110A, and the distance between the second circuit element 10-520A and the first side wall 10-114aA of the outer frame 10-110A is the same as the distance between the third circuit element 10-530A and the first side wall 10-114aA of the outer frame 10-110A. Therefore, due to the different distances between the limiting element 10-400A, the circuit element and the first side wall 10-114aA, the first driving element 10-310A and the second driving element 10-320A do not contact each other.

When a current is passed to the first circuit element 10-510aA and the fourth circuit element 10-540A, the second driving element 10-320A passing through the second limiting unit 10-420A may abut an upper edge of the opening 10-401A, so that the movable portion 10-200A may move along the direction that is parallel to the main axis 10-O and toward the inner top surface 10-112A. Similarly, when a current is passed to the second circuit element 10-520A and the third circuit element 10-530A, the first driving element 10-310A passing through the first limiting unit 10-410A may abut a lower edge of the opening 10-401A, so that the movable portion 10-200A may move along the direction that is parallel to the main axis 10-O and away from the inner top surface 10-112A.

Figure 86:
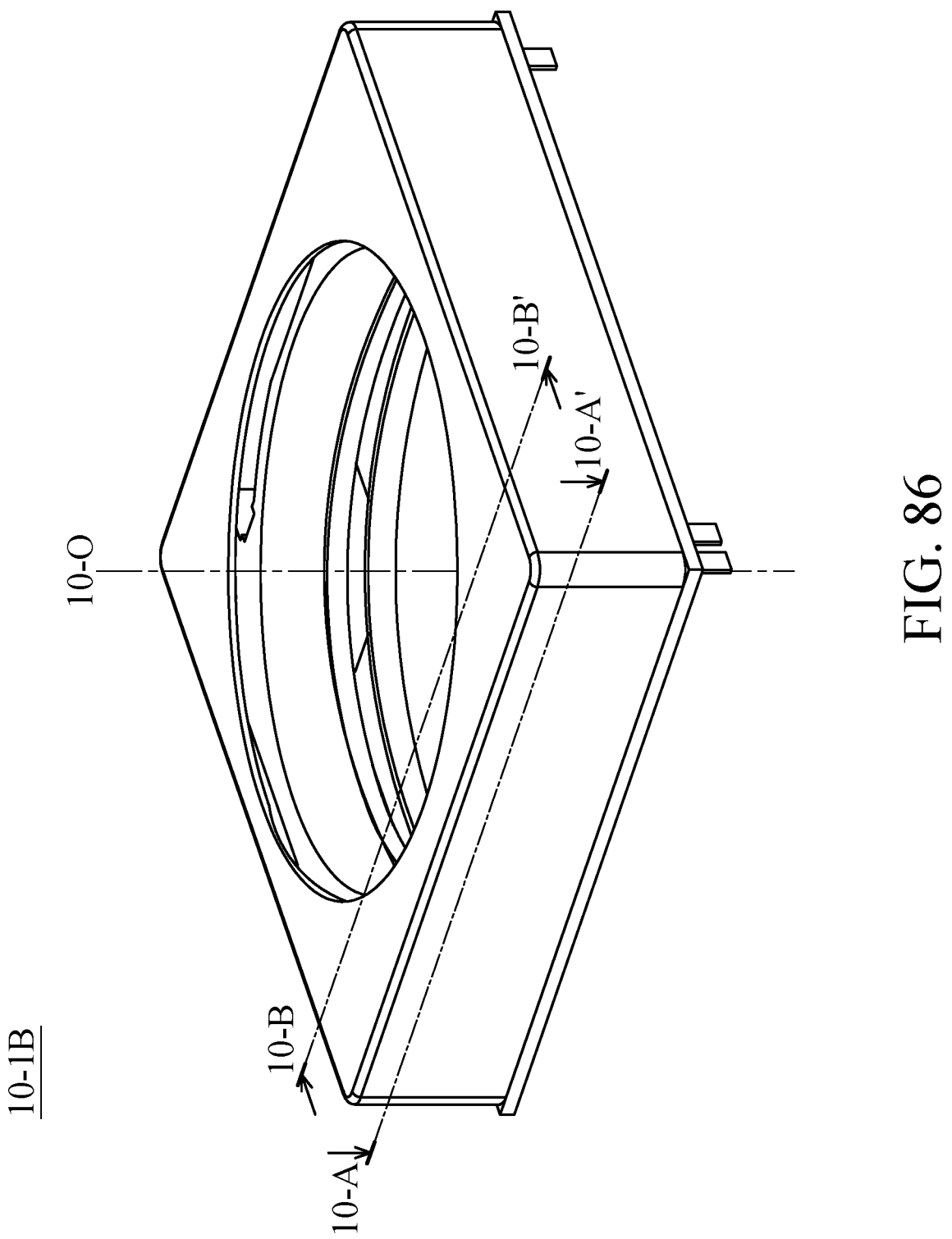
Figure 87:
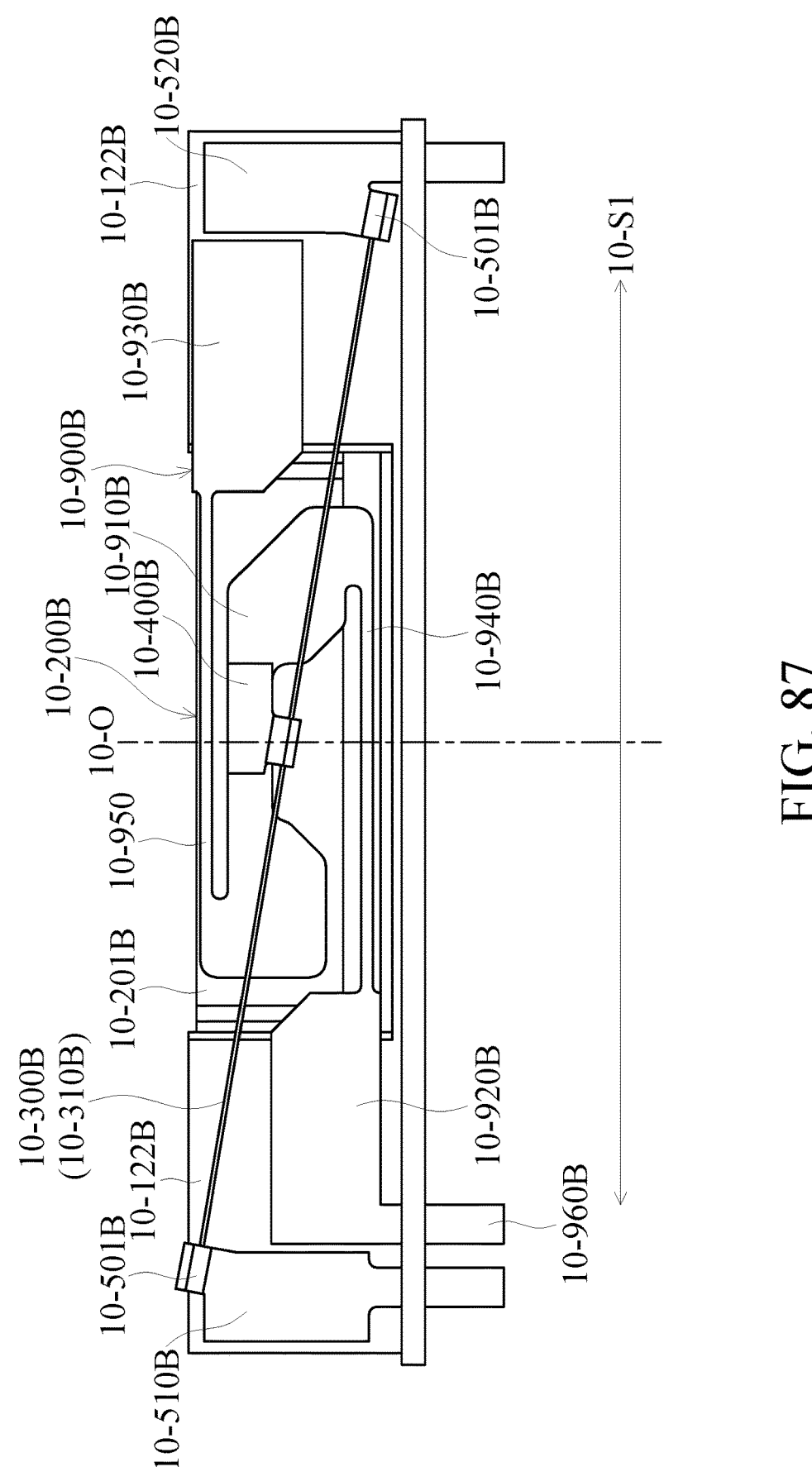
Figure 88:
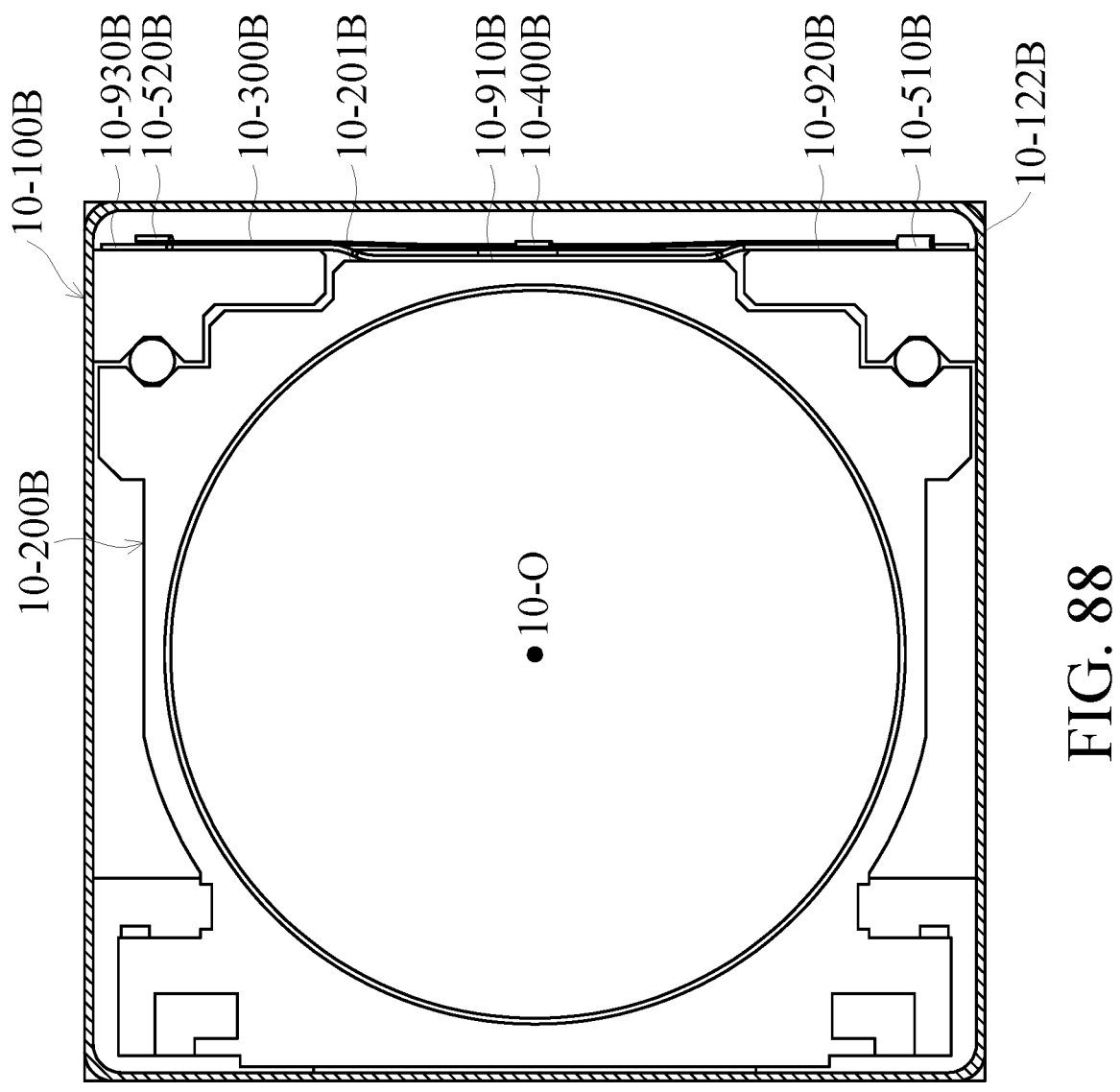
Figure 89:
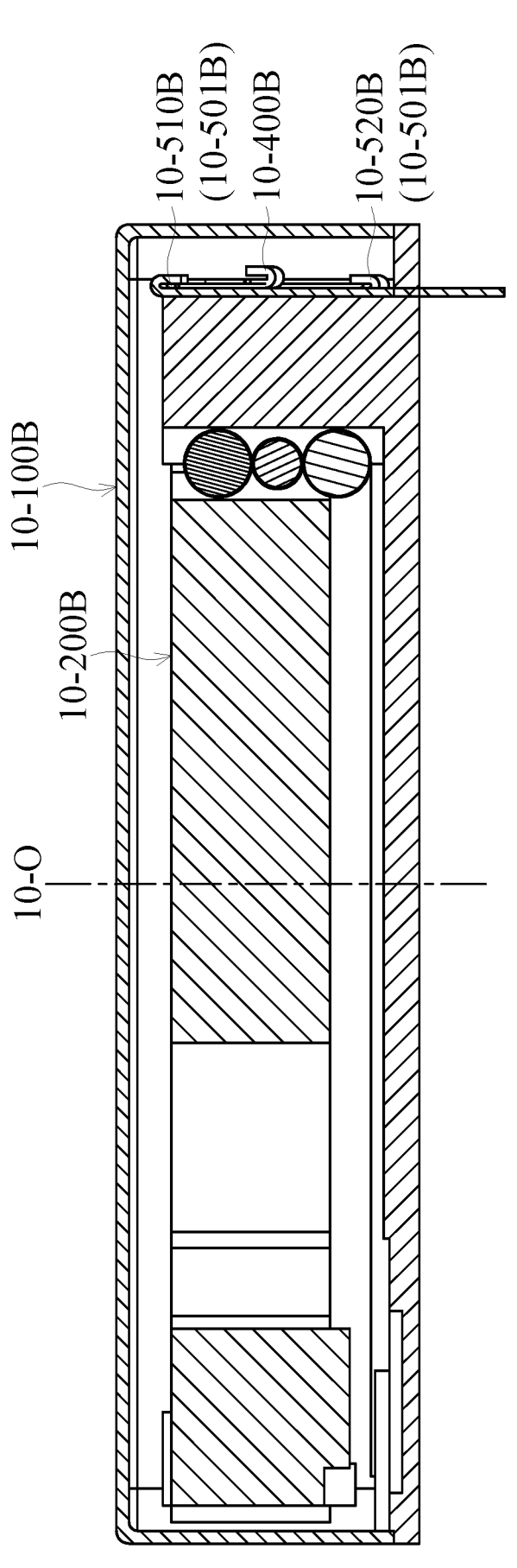

Refer to FIG. 86 to FIG. 89. FIG. 86 is a perspective view of an optical element driving mechanism 10-1B according to another embodiment of the present disclosure. FIG. 87 is a schematic diagram of a partial structure of the optical element driving mechanism 10-1B according to another embodiment of the present disclosure. FIG. 88 is a cross-sectional view of the optical element driving mechanism 10-1B taken along the line 10-A-10-A' in FIG. 86. FIG. 89 is a cross-sectional view of the optical element driving mechanism 10-1B taken along the line 10-B-10-B' in FIG. 86. In this embodiment, the differences from the optical element driving mechanisms 10-1 and 10-1A are the driving assembly 10-300B, the limiting element 10-400B, and the circuit assembly 10-500B. In addition, the optical element driving mechanism 10-1B further include a metal assembly 10-900B. The driving assembly 10-300B is a first driving element 10-310B. The limiting element 10-400B is disposed on the metal assembly 10-900B. The circuit assembly 10-500B includes a first circuit assembly 10-510B and a second circuit assembly 10-520B.

The metal assembly 10-900B has a metal material and a flat plate structure corresponding to the first driving element 10-310B. The metal assembly 10-900B is disposed on the first side 10-S1, and includes a movable-portion-fixed-end 10-910B, a first fixed-portion-fixed-end 10-920B, a second
fixed-portion-fixed-end 10-930B, a first elastic portion
10-940B, a second elastic portion 10-950B, and an external
connection portion 10-960B. The movable-portion-fixed-
end 10-910B is fixedly connected to the movable portion
10-200B and the limiting element 10-400B, and the first
fixed-portion-fixed-end 10-920B is fixedly connected to the
fixed portion 10-100B. The second fixed-portion-fixed-end
10-930B is fixedly connected to the fixed portion 10-100B.
The first elastic portion 10-940B has an elastic material, and
the movable-portion-fixed-end 10-910B is movably con-
nected to the first fixed-portion-fixed-end 10-920B via the
first elastic portion 10-940B. The second elastic portion
10-950B is made of elastic material, and the movable-
portion-fixed-end 10-910B is movably connected to the
second fixed-portion-fixed-end 10-930B via the first elastic
portion 10-940B. The external connection portion 10-960B
is fixedly connected to the first fixed-portion-fixed-end
10-920B, and the external connection portion 10-960B may
be electrically connected to the external circuit.

The first fixed-portion-fixed-end 10-920B and the second
fixed-portion-fixed-end 10-930B are arranged on the first
side wall 10-122B of the fixed portion 10-100B, and the
movable-portion-fixed-end 10-910B is arranged on the first
side wall 10-201B of the movable portion 10-200B. The first
side wall 10-122B of the fixed portion 10-100B and the first
side wall 10-201B of the movable portion 10-200B are
parallel to each other, and the first side wall 10-122B of the
fixed portion 10-100B and the first side wall 10-201B of the
movable portion 10-200B is not co-planar and has a distance
greater than zero.

When viewed along the direction that is parallel to the
main axis 10-O, the first elastic portion 10-940B and the
second elastic portion 10-950B at least partially overlap.
When viewed along the direction that is parallel to the first
side 10-S1, a boundary between the first elastic portion
10-940B and the first fixed-portion-fixed-end 10-920B does
not overlap a boundary between the second fixed-portion-
fixed-end 10-930B and the second elastic portion 10-950B.
When viewed along the direction that is parallel to the first
side 10-S1, the boundary between the first elastic portion
10-940B and the movable-portion-fixed-end 10-910B does
not overlap a boundary between the second elastic portion
10-950B and the movable-portion-fixed-end 10-910B.
When viewed along the direction that is perpendicular to the
main axis 10-O and the first side 10-S1, the fixed portion
10-100 has a rectangular structure, and a boundary between
the first elastic portion 10-940B and the first fixed-portion-
fixed-end 10-920B and a boundary between the second
elastic portion 10-950B and the second fixed-portion-fixed-
end 10-930B are disposed on different corners of the fixed
portion 10-100B. The boundary between the first elastic
portion 10-940B and the first fixed-portion-fixed-end
10-920B and a boundary between the second elastic portion
10-950B and the second fixed-portion-fixed-end 10-930B
are disposed on the opposite corners of the fixed portion
10-100B.

The first circuit element 10-510B and the second circuit
element 10-520B are symmetrically disposed on the first
side wall 10-122B of the base 10-120B, and each has an
electrical connection portion 10-501B for electrically con-
necting the first driving element 10-310B. When viewed
along the direction that is parallel to the first side 10-S1, the
electrical connection portion 10-501B of the first circuit
element 10-510B and the electrical connection portion
10-501B of the second circuit element 10-520B do not
overlap. When viewed along the direction that is perpendicular to the main axis 10-O and the first side 10-S1, the
electrical connection portion 10-501B of the first circuit
element 10-510B, the electrical connection portion 10-501B
of the second circuit element 10-520B, the boundary
between the first elastic portion 10-940B and the first
fixed-portion-fixed-end 10-920B, and the boundary between
the second elastic portion 10-950B and the second fixed-
portion-fixed-end 10-930B are respectively disposed at dif-
ferent corners of the fixed portion 10-100B.

The first driving element 10-310B is fixed to the limiting
element 10-400B and connected to the first circuit element
10-510B and the second circuit element 10-520B, and the
first driving element 10-310B may be electrically connected
to the external connection portion 10-960B via the limiting
element 10-400B. More specifically, a current is passed to
the first circuit element 10-510B, and passed through the
first driving element 10-310B, the limiting element
10-400B, the movable-portion-fixed-end 10-910B, the first
elastic portion 10-940B, the first fixed-portion-fixed-end
10-920B, and then passed to the external connection part
10-960B. At the same time, a part of the first driving element
10-310B contracts due to the passage of current. Because the
elastic coefficient of the metal assembly 10-900B in the
direction that is parallel to the main axis 10-O is smaller than
the elastic coefficient of the metal assembly 10-900B in the
direction that is parallel to the first side 10-S1, so forces
applied to the movable portion 10-200B are a force that is
parallel to the first side 10-S1 and close to the first circuit
element 10-510B and a force that is parallel to the main axis
10-O and close to the inner top surface 10-112B. Therefore,
the movable portion 10-200B may be controlled to move in
a direction that is parallel to the main axis 10-O by passing
a current to the second circuit element 10-520B at the same
time. And by controlling the magnitude of the current, the
movable portion 10-200B may be close to the inner top
surface 10-112B or far away from the inner top surface
10-112B.

Figure 90:
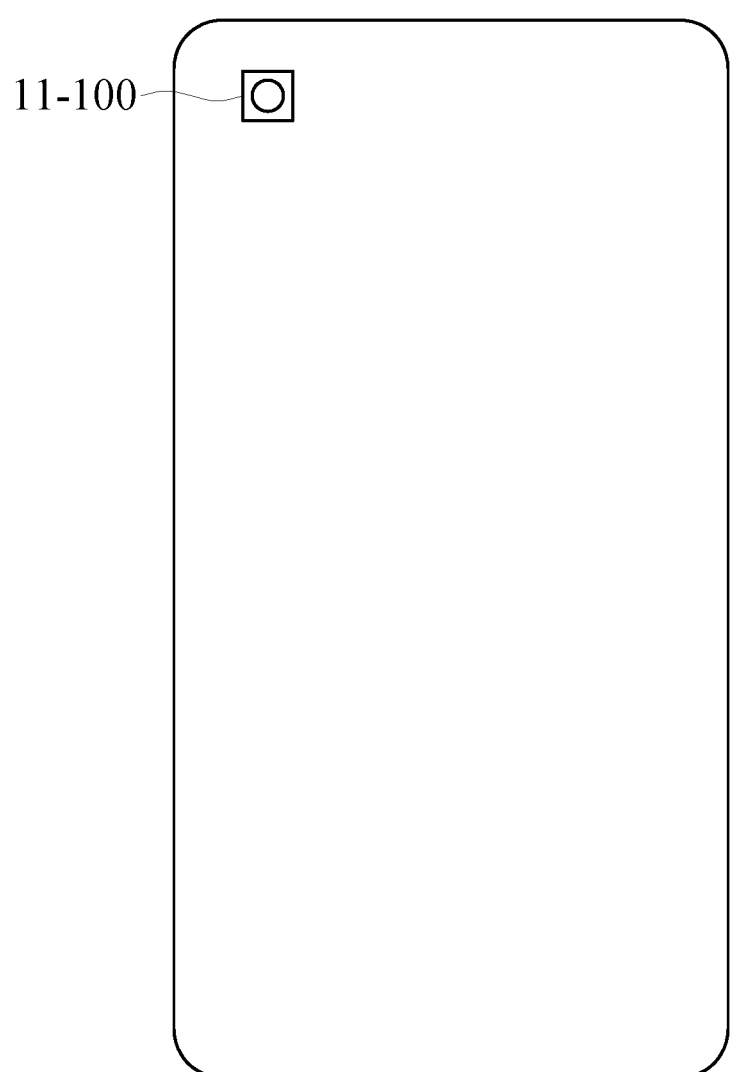

Firstly, please refer to FIG. 90, an optical element driving
mechanism 11-100 of an embodiment of the present disclo-
sure may be mounted in an electrical device 11-1 for taking
photos or videos, wherein the aforementioned electrical
device 11-1 may, for example, be a smartphone or a digital
camera, but the present disclosure is not limited to these. It
should be noted that the position and the size between the
optical element driving mechanism 11-100 and the electrical
device 11-1 shown in FIG. 90 are only an example, which is
not for limiting the position and the size between the optical
element driving mechanism 11-100 and the electrical device
11-1. In fact, according to different needs, the optical ele-
ment driving mechanism 11-100 may be mounted at differ-
ent positions in the electrical device 11-1.

Figure 91:
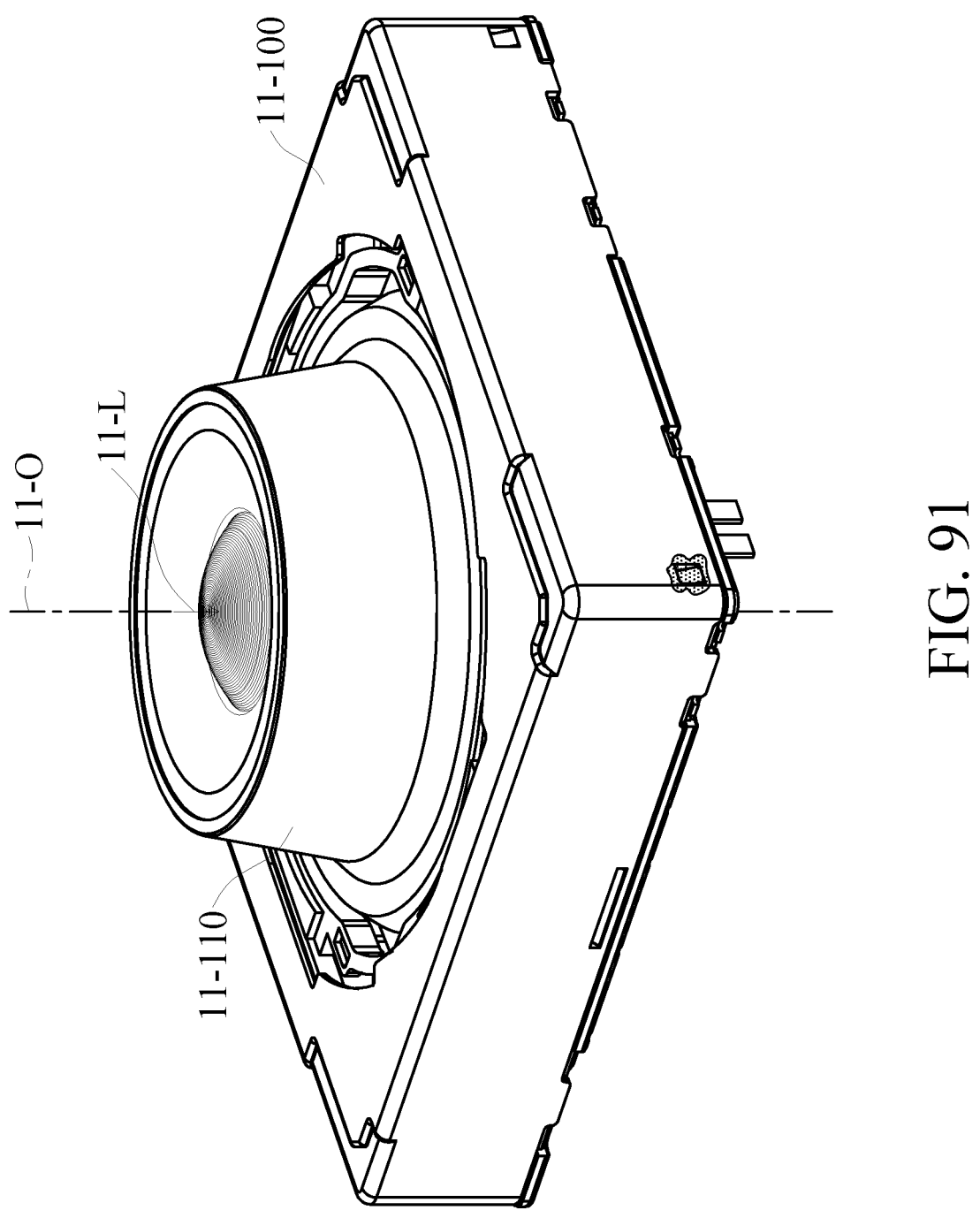

Please refer to FIG. 91, the optical element driving
mechanism 11-100 carries an optical element 11-110. An
image sensor module may be disposed inside or outside of
the optical element driving mechanism 11-100. The image
sensor module is located at the downstream of the light entry
of the optical element driving mechanism 11-100. A light
11-L incident to the optical element 11-110 in the optical
element driving mechanism 11-100 along an optical axis
11-O, and then arrives at the image sensor module for
imaging.

Figure 92:
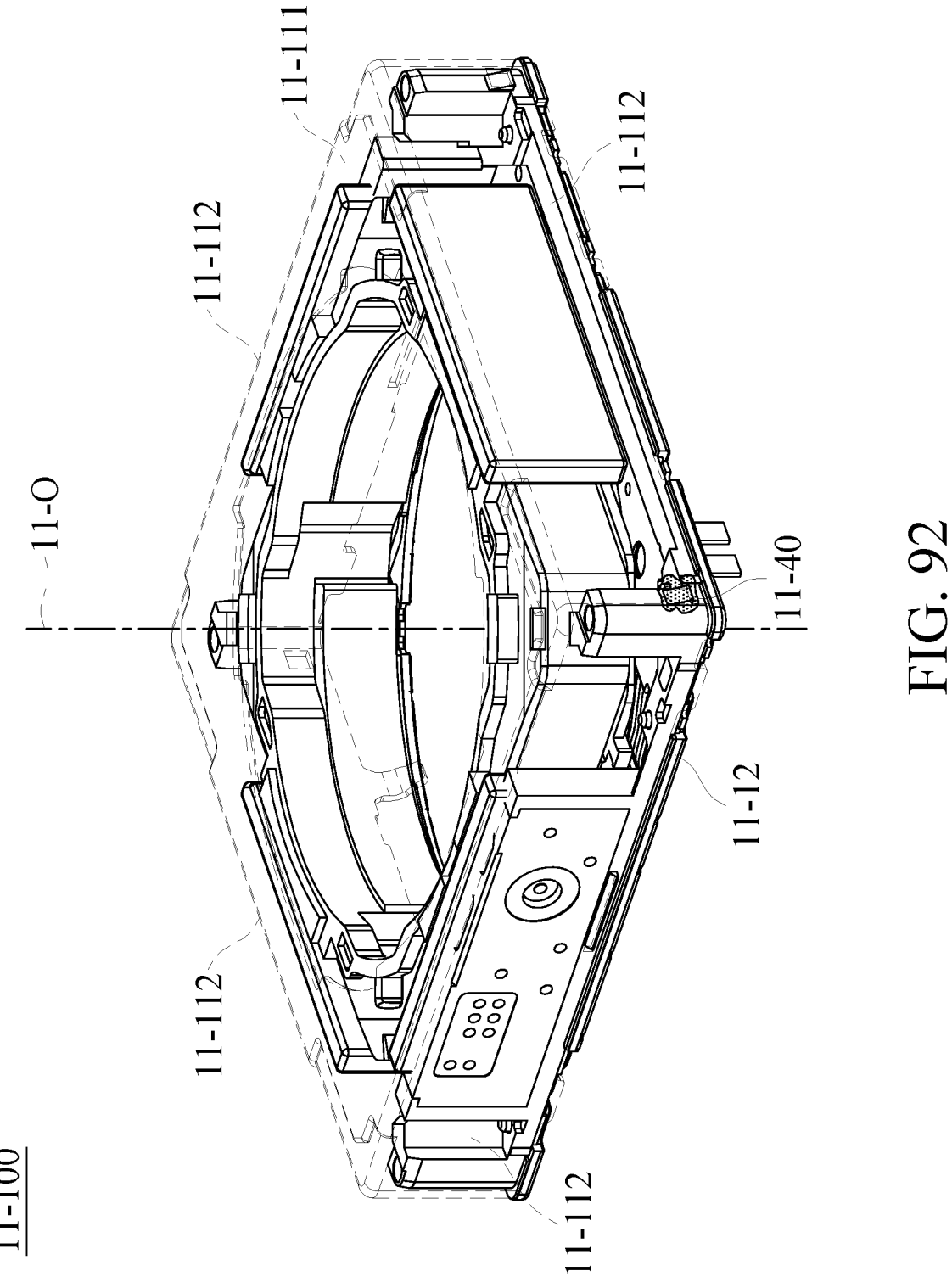
Figure 93:
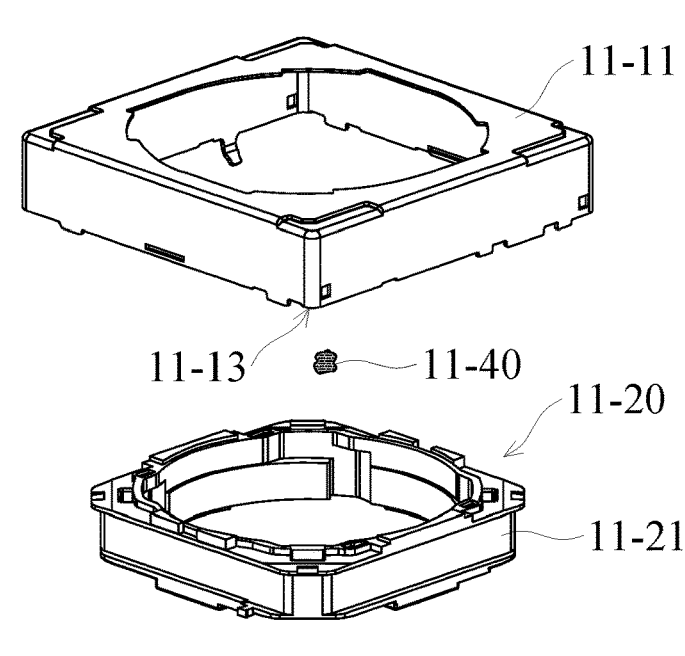
Figure 93:
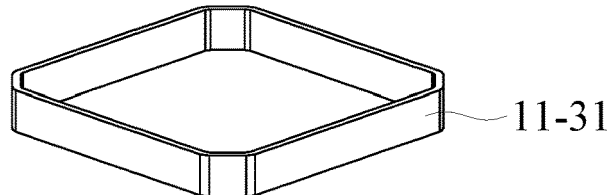
Figure 93:
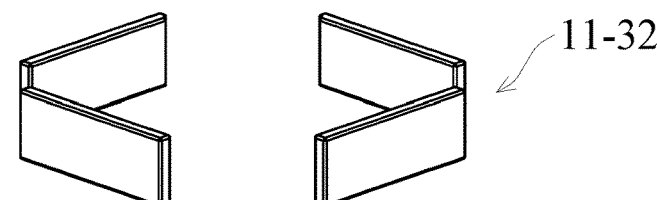
Figure 93:
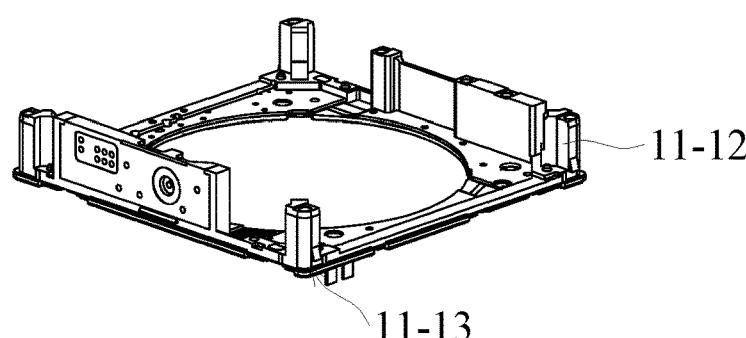

Please refer to FIG. 92 and FIG. 93, the optical element
driving mechanism 11-100 includes a fixed part 11-10, a
movable part 11-20, a driving assembly 11-30, and an
adhesion element 11-40. The driving assembly 11-30 drives
the movable part 11-20 to move relative to the fixed part
11-10.

The fixed part 11-10 includes an outer frame 11-11, a base 11-12, and a connecting structure 11-13. The movable part 11-20 includes an optical element holder 11-21. The driving assembly 11-30 includes a driving coil 11-31 and a driving magnetic element 11-32.

The movable part 11-20 is in contact with and connected to the optical element 11-110. Specifically, the optical element holder 11-21 of the movable part 11-20 carries and is connected to the optical element 11-110. The optical element holder 11-21 may be any shape that is suitable for carrying and connecting it to the optical element 11-110.

The driving coil 11-31 of the driving assembly 11-30 corresponds to the driving magnetic element 11-32. The driving coil 11-31 may interact with the magnetic field of the driving magnetic element 11-32 and generate electromagnetic driving force to drive the optical element holder 11-21 of the movable part 11-20 and the optical element 11-110 to move relative to the fixed part 11-10.

Please continue to refer to FIG. 92, the outer frame 11-11 of the fixed part 11-10 includes an outer frame top surface 11-111, and four outer frame sidewalls 11-112. The outer frame top surface 11-111 is not parallel to the optical axis 11-O. The four outer frame sidewalls 11-112 are parallel to the optical 11-O, and the four outer frame sidewalls 11-112 extend from the outer frame top surface 11-111 along the optical axis 11-O. The base 11-12 has a plate-like structure, and the base 11-12 is not parallel to the optical axis 11-O.

Figure 94:
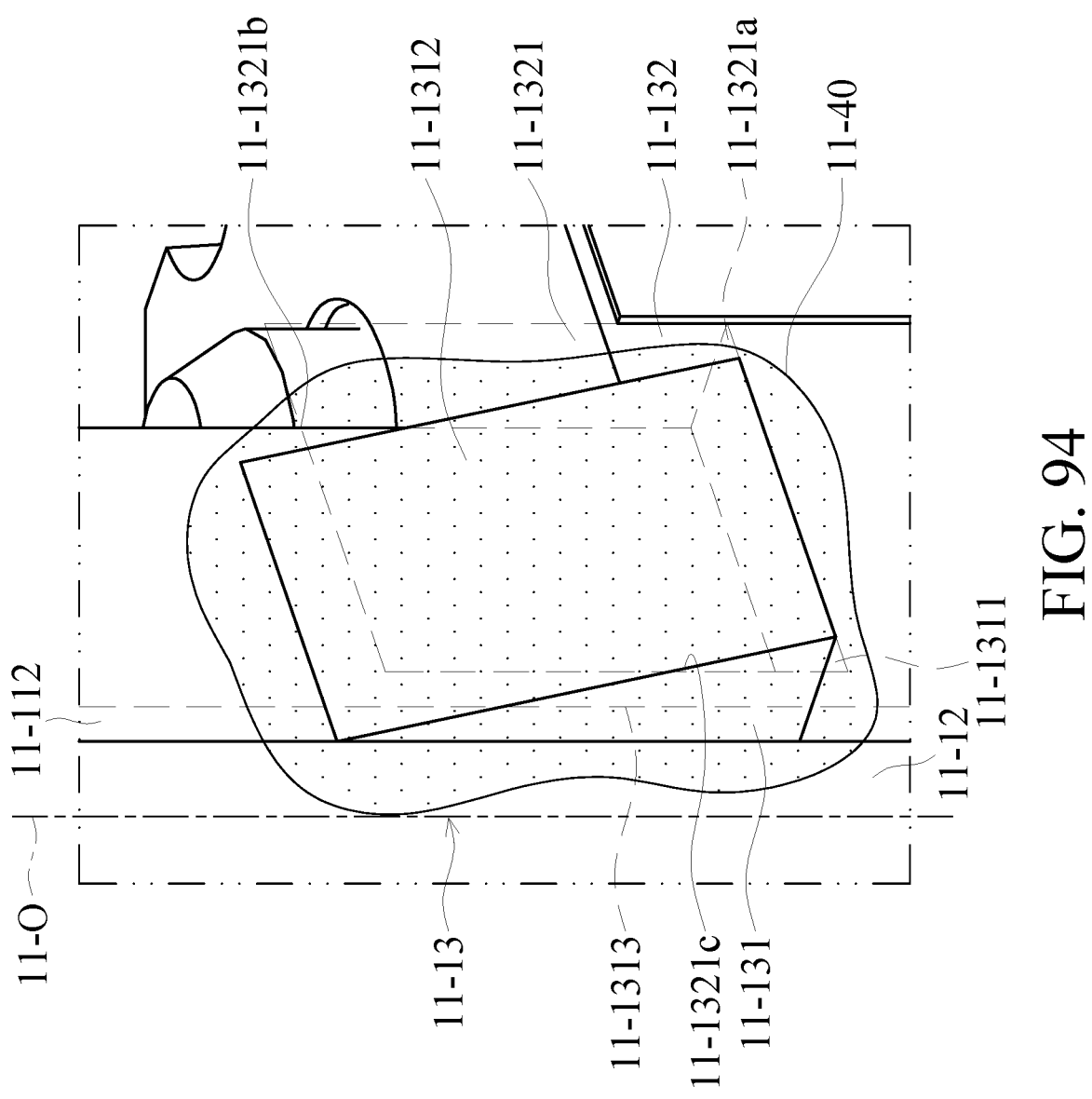

Please refer to FIG. 94, the connecting structure 11-13 of the fixed part 11-10 includes a protruding portion 11-131 and an accommodating portion 11-132. As shown in FIG. 94, in one embodiment, the protruding portion 11-131 is formed on the base 11-12. The accommodating portion 11-132 is formed on the outer frame sidewall 11-112. In another embodiment, the protruding portion 11-131 is formed on the outer frame sidewall 11-112, and the accommodating portion 11-132 is formed on the base 11-12 (not shown in FIG. 94).

Please continue to refer to FIG. 94, the protruding portion 11-131 may be accommodated in the accommodating portion 11-132. Thus, the outer frame sidewall 11-112 of the outer frame 11-11 of may be secured to the base 11-12 by the connecting structure 11-13. As shown in FIG. 94, the adhesion element 11-40 may cover the connecting structure 11-13, so that the protruding portion 11-131 of the connecting structure 11-13 may be accommodated in the accommodating portion 11-132 more securely, thereby avoiding the outer frame 11-11 from separating from the base 11-12.

As shown in FIG. 94, in one embodiment, the protruding portion 11-131 includes a protruding portion bottom surface 11-1311, a protruding portion inclined surface 11-1312, and a protruding portion side surface 11-1313. The accommodating portion 11-132 includes an accommodating portion opening 11-1321. The accommodating portion opening 11-1321 includes an accommodating portion opening bottom surface 11-1321a, an accommodating portion opening top surface 11-1321b, and an accommodating portion opening side surface 11-1321c.

Please refer to FIG. 94, the protruding portion bottom surface 11-1311 is in direct contact with the accommodating portion opening bottom surface 11-1321a. The accommodating portion opening top surface 11-1321b faces the base 11-12. The protruding portion inclined surface 11-1312 faces the accommodating portion opening top surface 11-1321b, and the protruding portion inclined surface 11-1312 is not in contact with the accommodating portion opening top surface 11-1321b. More specifically, the protruding portion 11-131 is not in contact with the accommodating portion opening top surface 11-1321b. The protruding portion side surface 11-1313 is not in contact with the accommodating portion opening side surface 11-1321c. The protruding portion inclined surface 11-1312 at least partially overlaps the outer frame sidewall 11-112 when viewed along the optical axis 11-O. With this configuration, the protruding portion 11-131 may be favorably accommodated in the accommodating portion 11-132, and the damage caused by excessive friction between the protruding portion 11-131 and the accommodating portion 11-132 is prevented.

Figure 95:
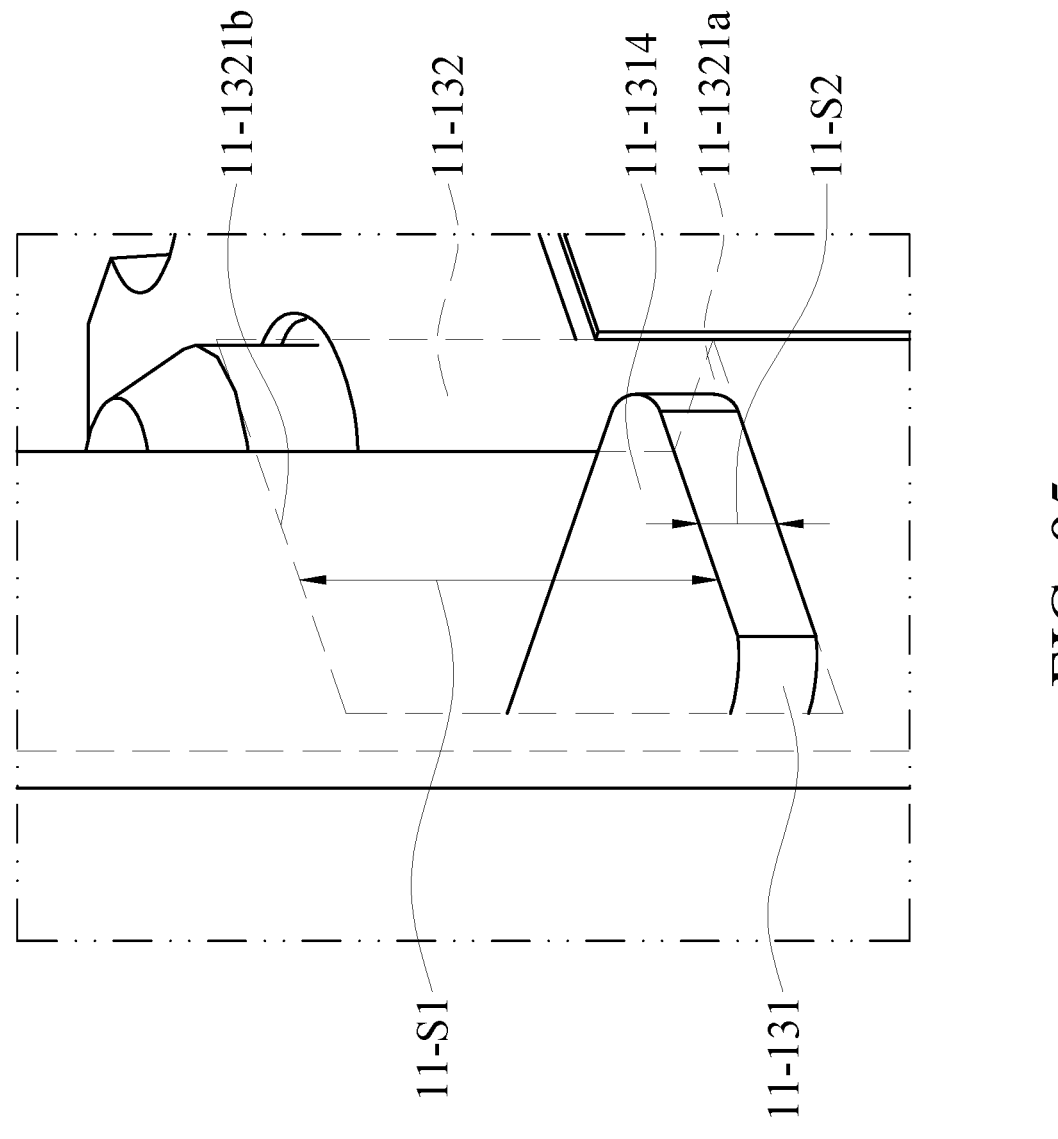

Please refer to FIG. 95, in one embodiment, the protruding portion 11-131 may further includes a protruding portion top surface 11-1314. A minimum distance 11-S1 between the protruding portion top surface 11-1314 and the accommodating portion opening top surface 11-1321b is greater than a minimum distance 11-S2 between the protruding portion top surface 11-1314 and the accommodating portion opening bottom surface 11-1321a. With this configuration, the protruding portion 11-131 may be easily accommodated in the accommodating portion 11-132, which is helpful to the manufacture and assembly of the optical element driving mechanism 11-100.

Please refer to FIG. 96, in one embodiment, the accommodating portion 11-132 includes at least two accommodating portion extensions 11-1322. The protruding portion 11-131 is in direct contact with the accommodating portion extensions 11-1322. The protruding portion 11-131 abuts against the accommodating portion extensions 11-1322.

Please continue to refer to FIG. 96, in one embodiment, the protruding portion 11-131 extends in an insertion direction 11-DI (the insertion direction 11-DI may be parallel to the optical axis 11-0), and the accommodating portion extensions 11-1322 are arranged along an arrangement direction 11-DA that is perpendicular to the insertion direction 11-DI. In the arrangement direction 11-DA, a maximum width 11-131' of the protruding portion 11-131 is greater than a minimum distance 11-S3 between the accommodating portion extensions 11-1322. Moreover, the protruding portion 11-131 is exposed to the accommodating portion extensions 11-1322 when viewed along the arrangement direction 11-DA. Thus, the protruding portion 11-131 may be stably disposed between the accommodating portion extensions 11-1322, and the separation of the protruding portion 11-131 from the accommodating portion 11-132 is prevented. The accommodating portion extensions 11-1322 press toward the protruding portion 11-131 along the arrangement direction 11-DA. Therefore, the friction force between the protruding portion 11-131 and the accommodating portion extensions 11-1322 may prevent the movement of the protruding portion 11-131 relative to the accommodating portion extensions 11-1322, thereby the separation of the protruding portion 11-131 from the accommodating portion 11-132 is prevented.

Please refer to FIG. 97 and FIG. 98, in other embodiments, the protruding portion 11-131 may also include a protruding portion barb 11-1315, a protruding portion bottom 11-1316, and a protruding portion top 11-1317. As shown in FIG. 97, the protruding portion barb 11-1315 is in direct contact with and abuts against the accommodating portion extensions 11-1322. Therefore, when the optical element driving mechanism 11-100 is impacted, the protruding portion 11-131 may still be maintained between the accommodating portion extensions 11-1322, and the separation of the protruding portion 11-131 from the accommodating portion 11-132 is prevented.

As shown in FIG. 98, the protruding portion top 11-1317 is in direct contact with the outer frame sidewall 11-112, and a maximum width 11-1317' of the protruding portion top 11-1317 is greater than a maximum width 11-1316' of the protruding portion bottom 11-1316. Therefore, the protruding portion 11-131 is prevented from upwardly slipping out from the gap between the accommodating portion extensions 11-1322 along the optical axis 11-O, thereby the separation of the protruding portion 11-131 from the accommodating portion 11-132 is prevented.

Please refer to FIG. 99, in one embodiment, the protruding portion 11-131 may further include a protruding portion bending part 11-1318. The protruding portion bending part 11-1318 extends in an extending direction 11-DE that is perpendicular to the insertion direction 11-DI and the arrangement direction 11-DA. Moreover, the base 11-12 is located between the protruding portion bending part 11-1318 and the outer frame 11-11. Therefore, when the optical element driving mechanism 11-100 is impacted, the base 11-12 may still be maintained between the protruding portion bending part 11-1318 and the outer frame 11-11. The separation of the outer frame 11-11 from the base 11-12 is thereby prevented.

In general, the outer frame 11-11 of the optical element driving mechanism 11-100 of the present disclosure may be secured to the base 11-12 by the connecting structure 11-13. Therefore, the structure of the outer frame 11-11 of the optical element driving mechanism 11-100 may be more stable, and it is easier to assemble the optical element driving mechanism 11-100.

As described above, the embodiment of the present disclosure provides an optical element driving mechanism, including a fixed portion, a movable portion, a driving assembly, and a circuit assembly. The movable portion is connected with the optical element and may move relative to the fixed portion. The driving assembly drives the movable portion to move relative to the fixed portion. The driving assembly is electrically connected to the external circuit through the circuit assembly. By controlling the current passing from the external circuit to the driving assembly, the condition of contraction of the driving assembly may be controlled, and then the movement of the movable portion holding the optical component (such as a lens) may be controlled to complete functions such as zooming. The special position and size relationship of each element disclosed in the present invention may enable the optical element driving mechanism to achieve a specific direction of thinning and overall miniaturization. In addition, by applying with different optical modules, the optical element driving mechanism may further improve the optical quality (such as shooting quality or depth sensing accuracy, etc.).

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a first movable part, configured to connecting an optical element;
a first base, wherein the first movable part is movable relative to the first base;
a first driving assembly, for driving the first movable part relative to the first base to move; and
an elastic assembly, the first movable part is movably connected to the first base via the elastic assembly;
wherein the optical system further comprises a light quantity control mechanism for controlling the light quantity of light entering the optical element;
wherein the light quantity control mechanism further comprises a base seat and a light quantity control assembly which is at least partially movable relative to the base seat;
wherein the optical system further comprises a second driving assembly for controlling the light quantity control assembly;
wherein the elastic assembly comprises:
a first elastic element, wherein the base seat is movably connected to the first base via the first elastic element;
a second elastic element, wherein the first movable part is movably connected to the first base via the second elastic element;
a third elastic element, wherein the first movable part is movably connected to the first base via the third elastic element; and
a fourth elastic element, wherein the first base is movably connected to the second base via the fourth elastic element;
wherein the second driving assembly is electrically connected to the second elastic element; and
wherein the first driving assembly is electrically connected to the third elastic element.

2. The optical system as claimed in claim 1, further comprising:
a second base, the second base is movable relative to the first base; and
a third driving assembly, for driving the first base to move relative to the second base;
wherein the first driving assembly is configured to drive the first movable part to move in a first dimension relative to the first base;
the third driving assembly is configured to drive the first base to move in a second dimension relative to the second base;
the base seat is movable relative to the second base; and
the base seat is movable relative to the first base.

3. The optical system as claimed in claim 2,
wherein the base seat is movable relative to the second base via the elastic assembly; and
wherein the base seat is movable relative to the first base via the elastic assembly.

4. The optical system as claimed in claim 1, wherein:
the first elastic element has a plate-shaped structure;
the second elastic element has a plate-shaped structure;
the third elastic element has a plate-shaped structure;
the fourth elastic element has a plate-shaped structure;
the first and second elastic elements are parallel to each other;
the first and third elastic elements are parallel to each other;

the first and fourth elastic elements are parallel to each other;

the second and third elastic elements are parallel to each other;

the second and fourth elastic elements are parallel to each other; and the third and fourth elastic elements are parallel to each other.

5. The optical system as claimed in claim 1, wherein when viewed along a direction perpendicular to the main axis, the second elastic element is located between the first and third elastic elements.

6. The optical system as claimed in claim 1, wherein when viewed along a direction perpendicular to the main axis, the third elastic element is located between the second and fourth elastic elements.

7. The optical system as claimed in claim 2, further comprising:

a housing, arranged along a main axis direction with the first base; and a frame, arranged along the main axis with the second base, wherein the frame is located in the housing.

8. The optical system as claimed in claim 7, wherein the first elastic element is located above the frame, and the first elastic element connects the base seat and an inner surface of the housing.

9. The optical system as claimed in claim 8, wherein in a direction perpendicular to an optical axis, a connecting portion of the first elastic element connected to the inner surface of the housing does not overlap with the frame.

10. The optical system as claimed in claim 1, wherein the second driving assembly is electrically connected to the fourth elastic element via the second elastic element; and wherein the first driving assembly is electrically connected to the fourth elastic element via the third elastic element.

11. The optical system as claimed in claim 1, wherein the second driving assembly is electrically connected to the fourth elastic element via the second elastic element and a first circuit assembly of the first base;

wherein the first circuit assembly is at least partially embedded in the first base and not exposed on the first base;

wherein the first driving assembly is electrically connected to the fourth elastic element via the third elastic element and the first circuit assembly; and wherein the first circuit assembly has a protruding portion exposed on the first base, and the protruding portion extends along the main axis direction.

12. The optical system as claimed in claim 11, wherein the second driving assembly has a second control unit which is electrically connected to a first control unit of the first driving assembly via the first circuit assembly; and wherein the first driving assembly has a first coil which is electrically connected to the first control unit.

13. The optical system as claimed in claim 12, wherein the first control unit is configured to output a first driving power to control the first coil;

wherein the second driving assembly has a second coil which is electrically connected to the second control unit; and wherein the second control unit is configured to output a second driving power to control the second coil.

14. The optical system as claimed in claim 13, further comprising a second circuit assembly, wherein at least a part of the second circuit assembly is embedded in the base seat, and at least a part of the second circuit assembly is exposed outside the base seat.

15. The optical system as claimed in claim 14, wherein the second circuit assembly has a plurality of upper exposed parts; and wherein four different quadrants are defined by a center of the base seat, and the upper exposed parts are located in the four different quadrants respectively.

16. The optical system as claimed in claim 1, wherein the first base has a first abutment surface and a first inclined surface;

wherein the first movable part has a second abutment surface and a second inclined surface;

wherein the first and second inclined surfaces are inclined with respect to the first and second abutment surfaces; and wherein when viewed along a normal direction of the first abutment surface, the first abutment surface does not overlap with the second inclined surface.

17. The optical system as claimed in claim 16, wherein the first abutment surface corresponds to the second abutment surface, and the first inclined surface corresponds to the second inclined surface.

18. The optical system as claimed in claim 16, wherein the first abutment surface is configured to limit the second abutment surface; and wherein the first inclined surface is configured to limit the second inclined surface.

\* \* \* \* \*